CLOCK PULSE DRIVER

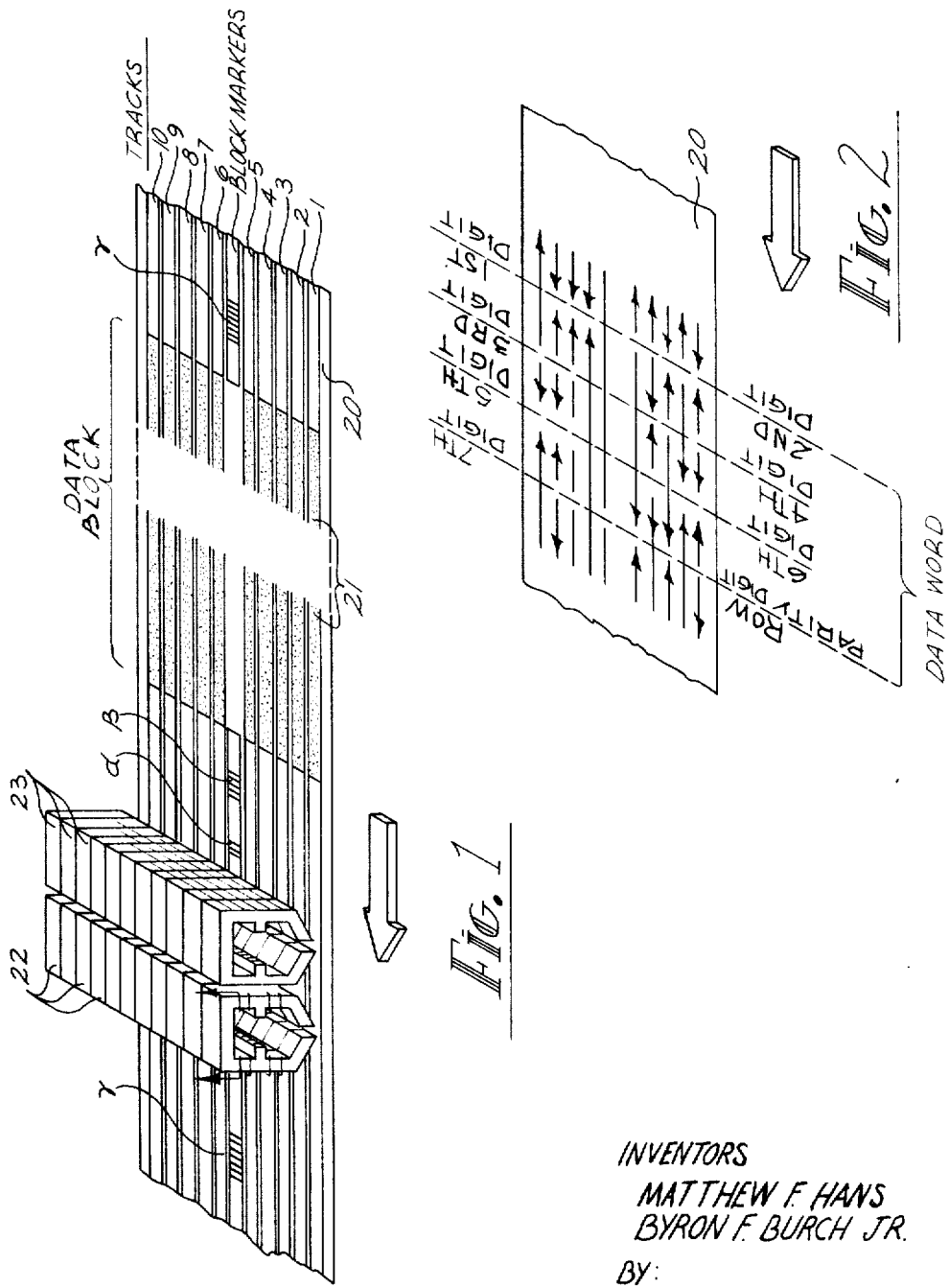

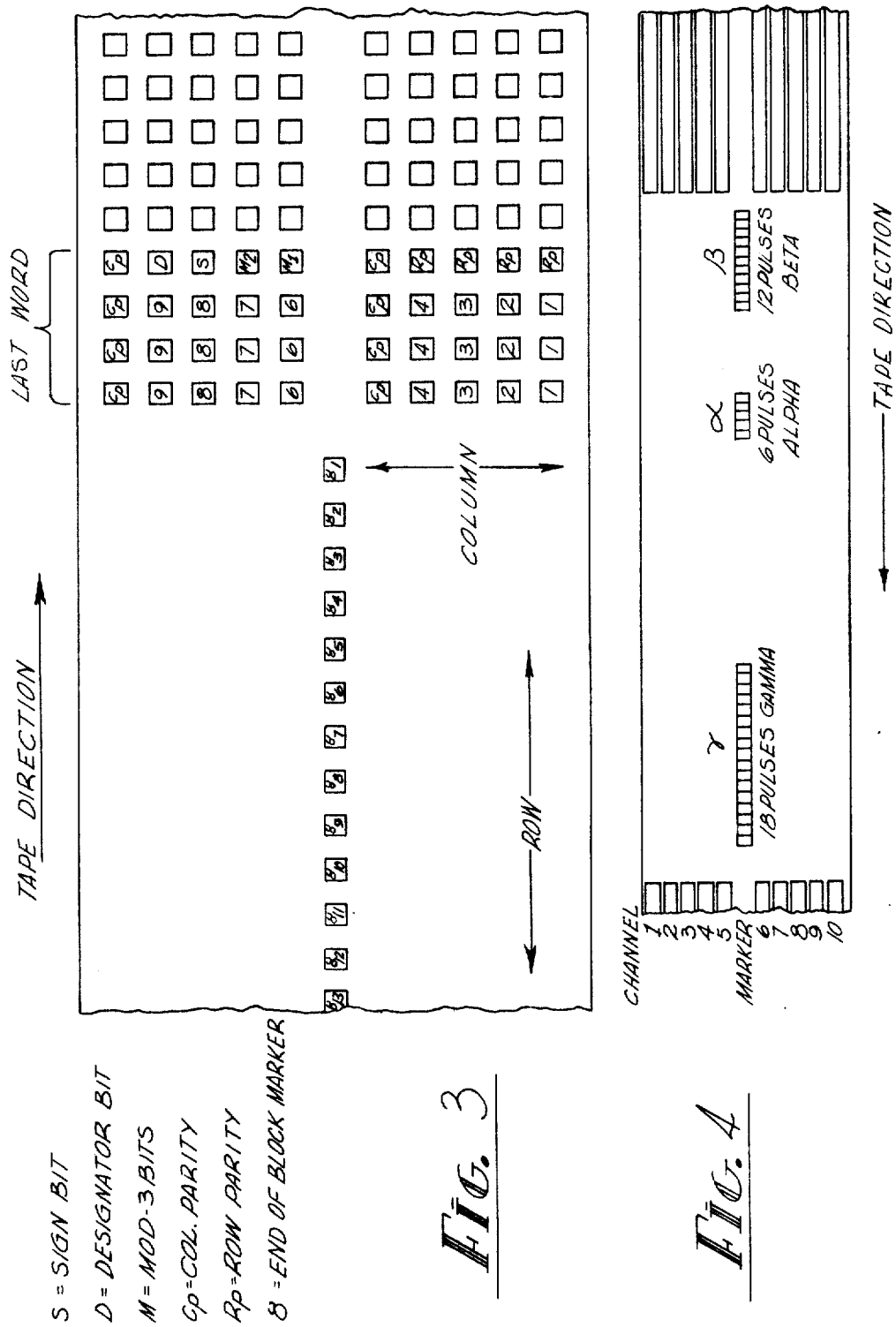

Fig. 7, FLIP-FLOP

AND GATE

OR-GATE

INVERTER

EMITTER FOLLOWERS

REGISTER TRANSFER

ONE SHOT

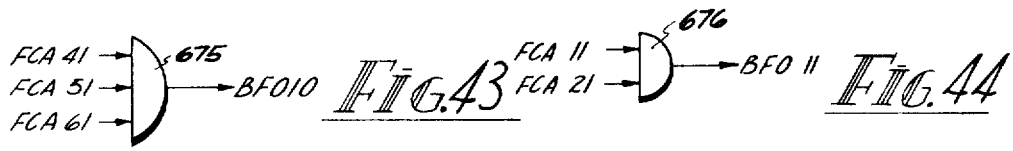
Fig. 43
Fig. 44
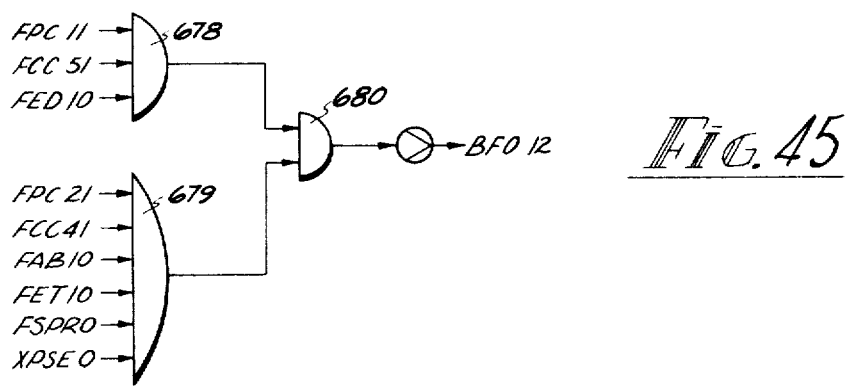
Fig. 45
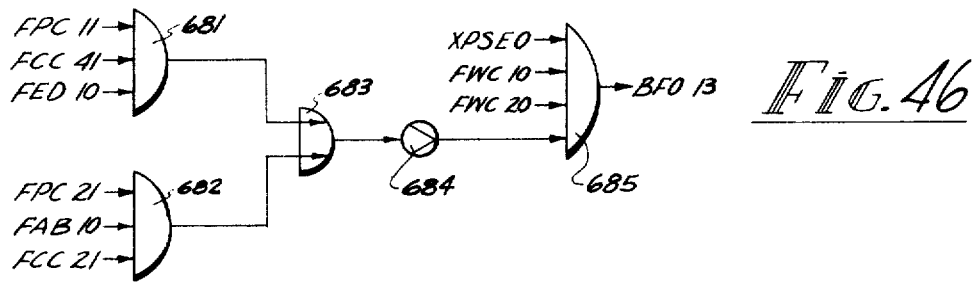
Fig. 46
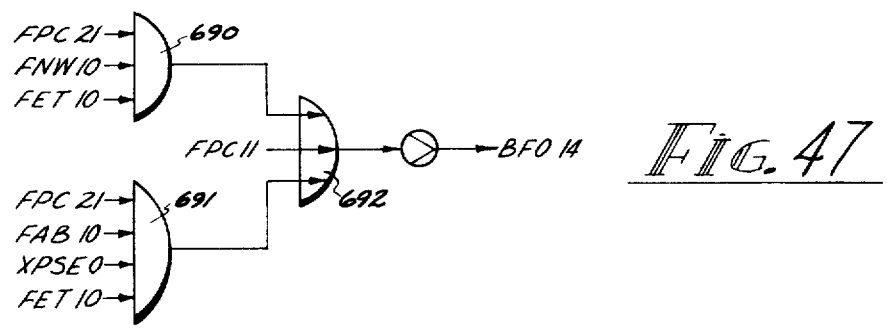
Fig. 47

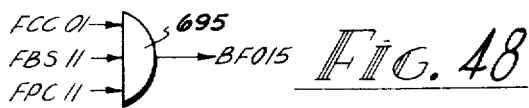
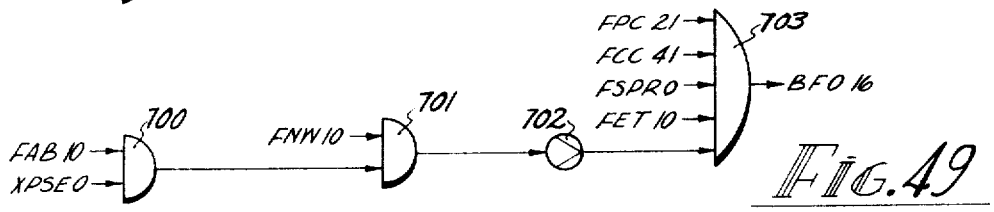
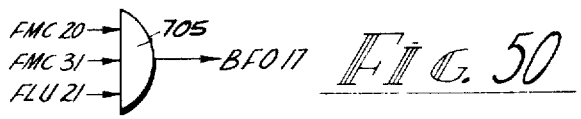
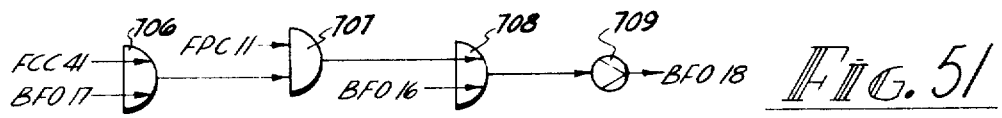
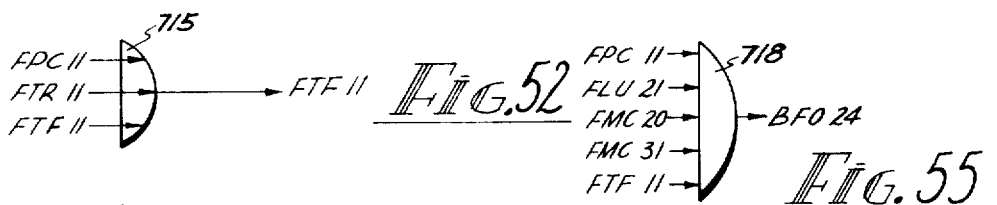
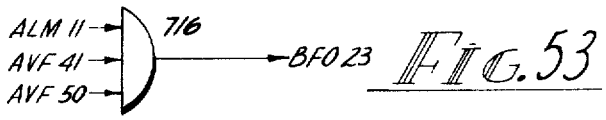
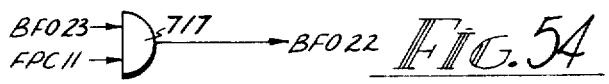
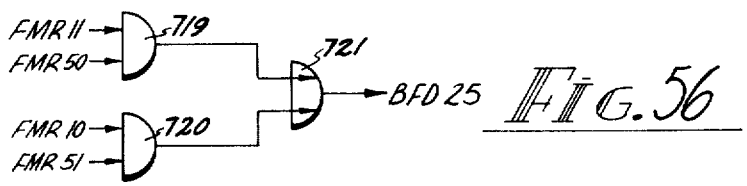

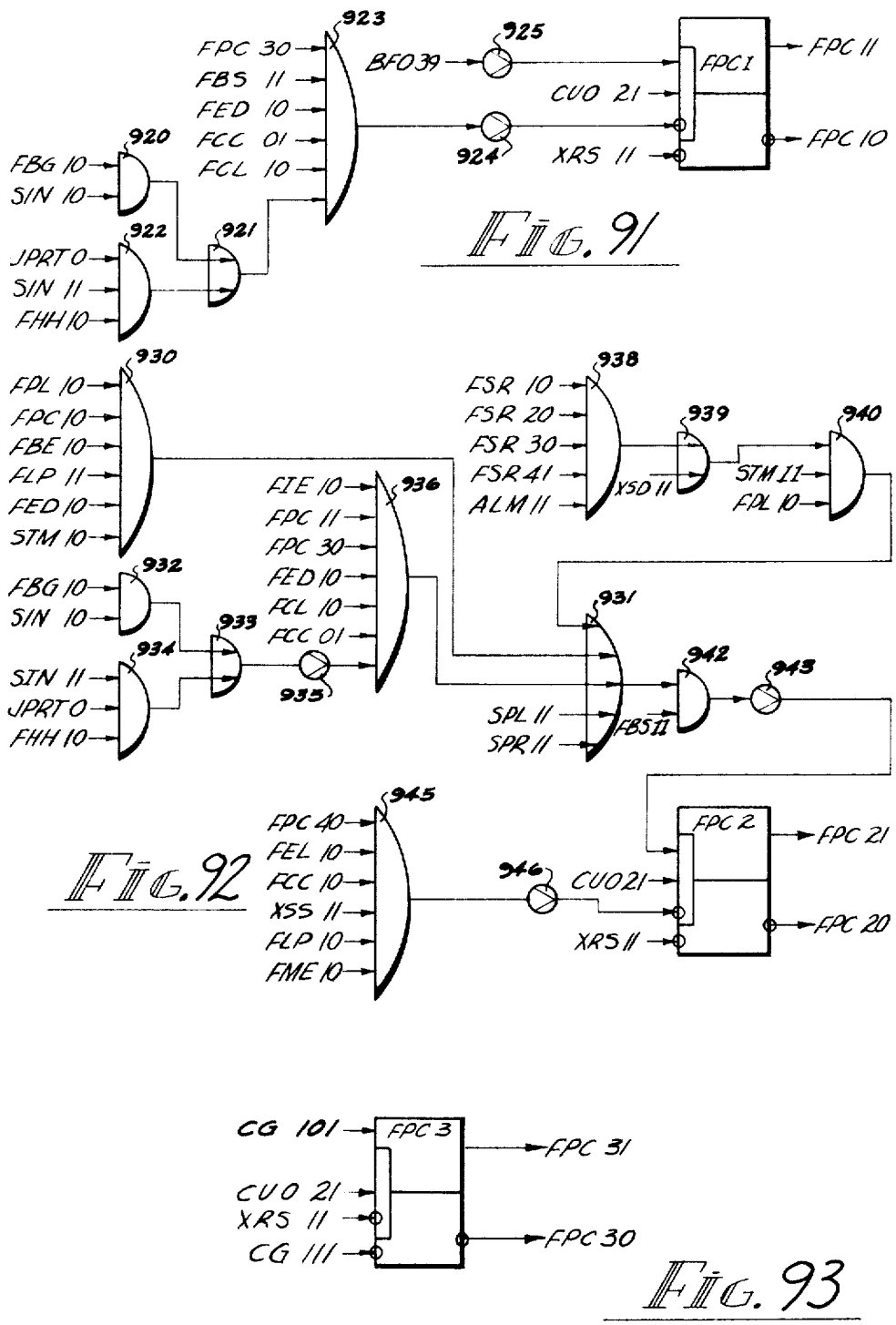

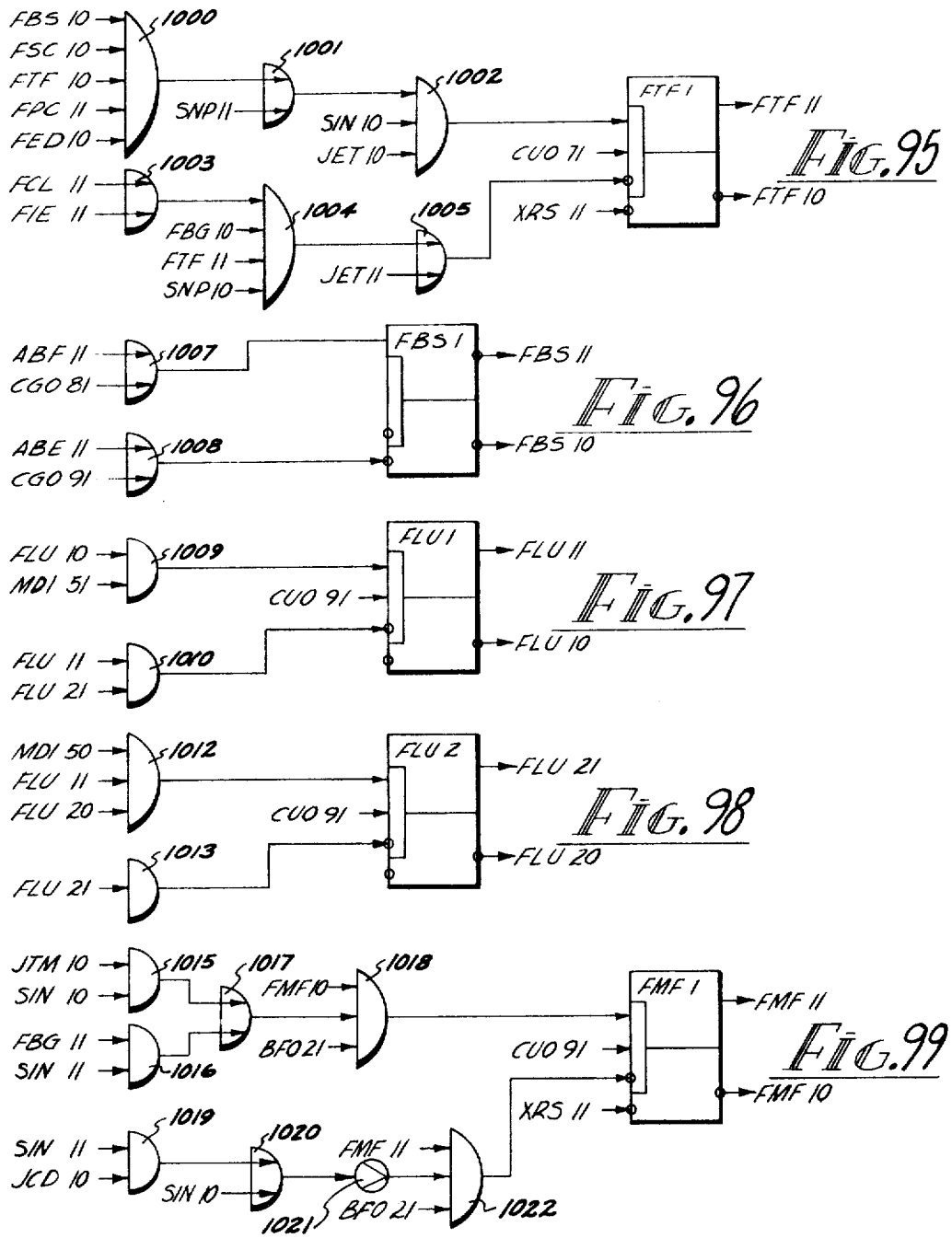

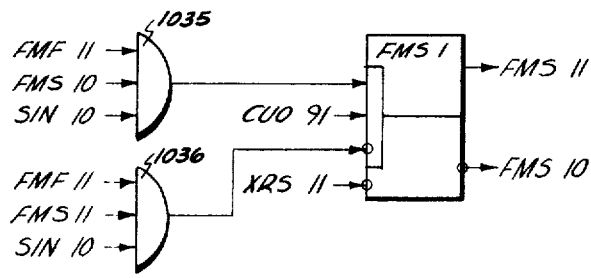
Fig. 103
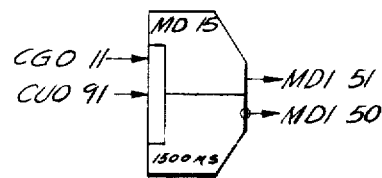
Fig. 104
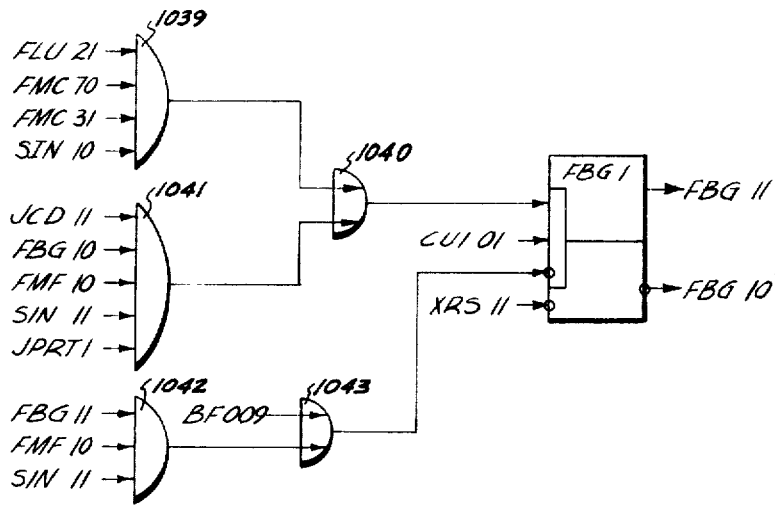
Fig. 105
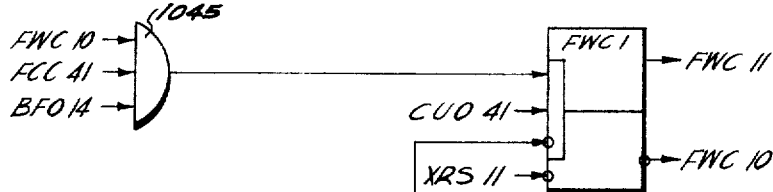
Fig. 106
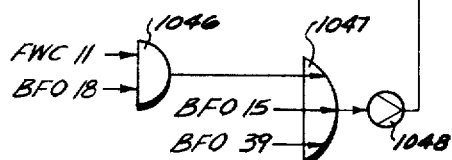

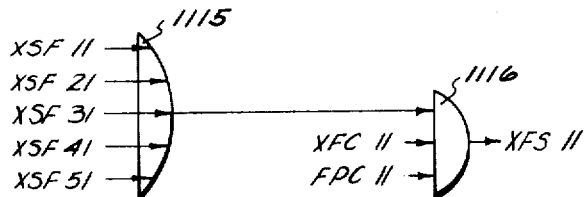
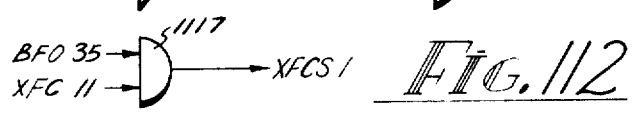
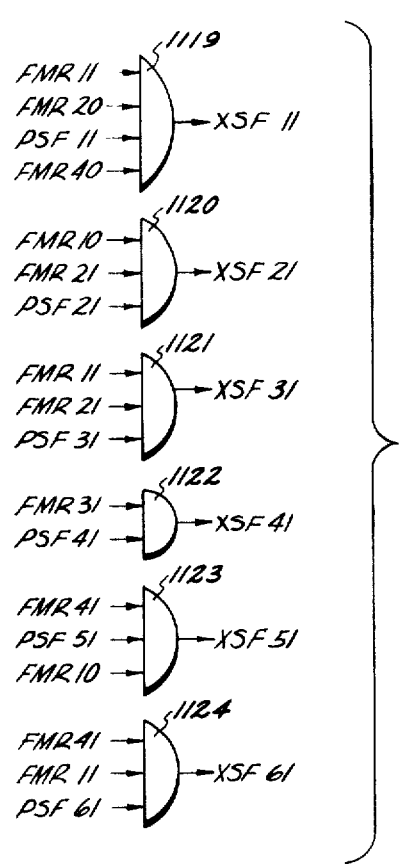
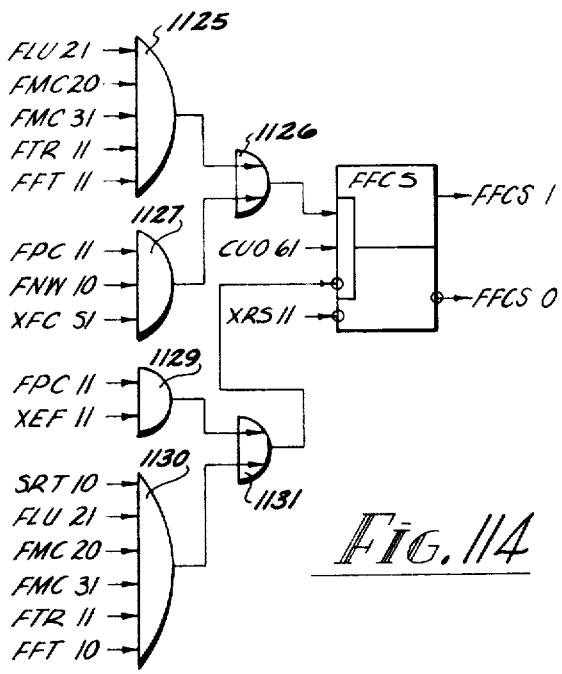
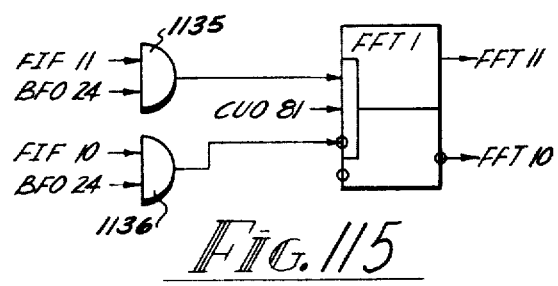

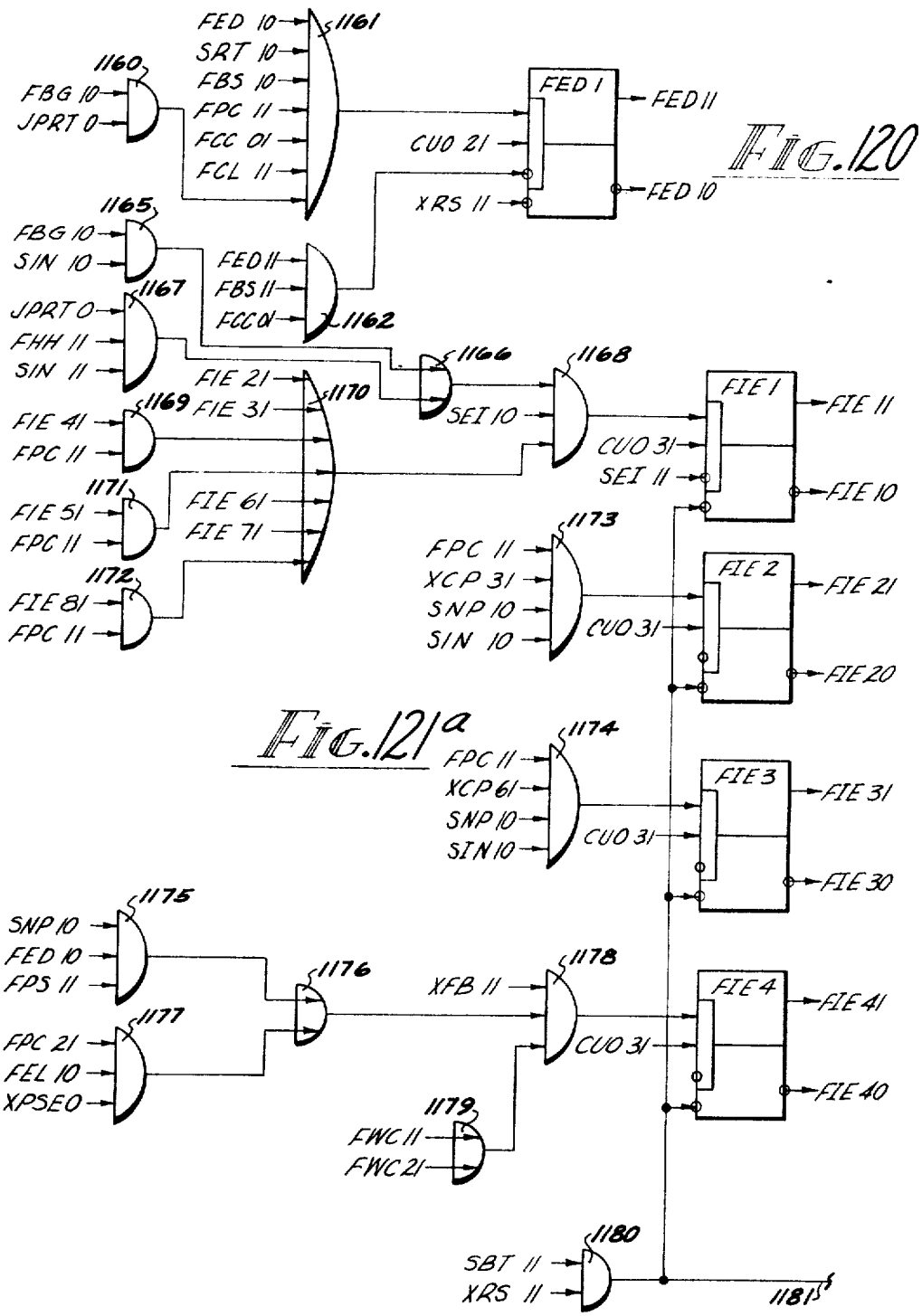

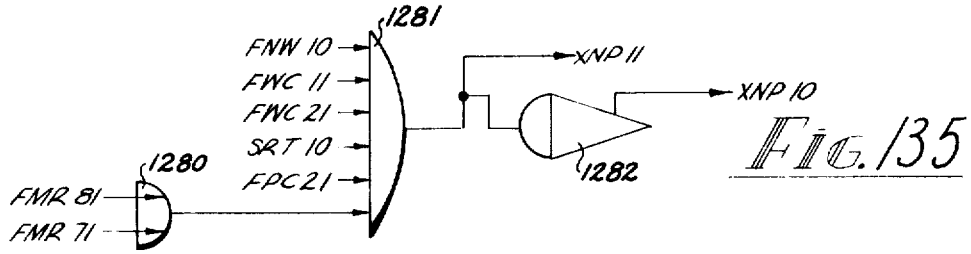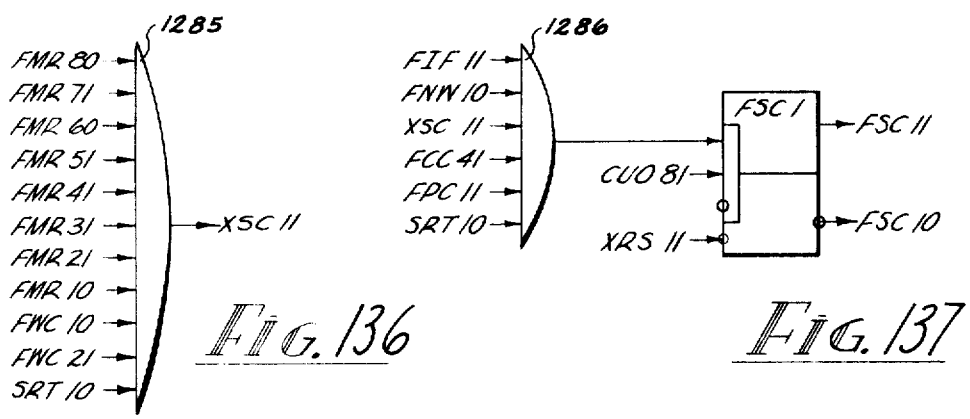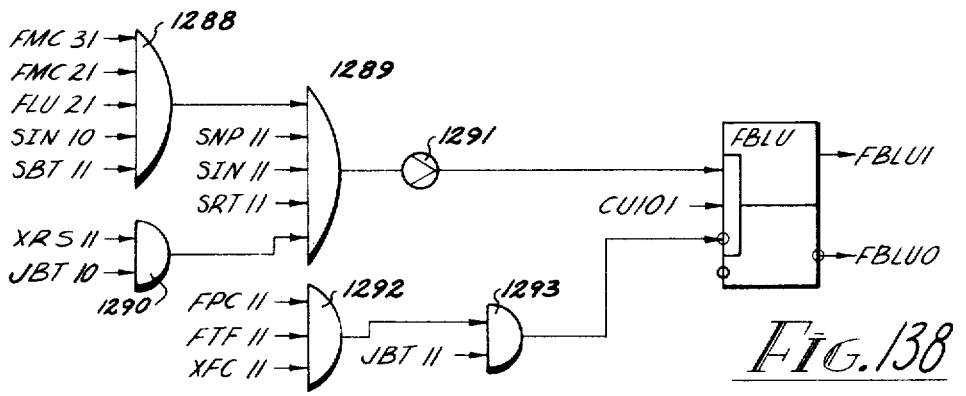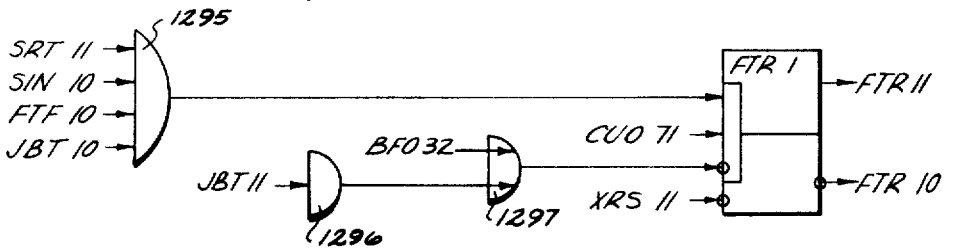

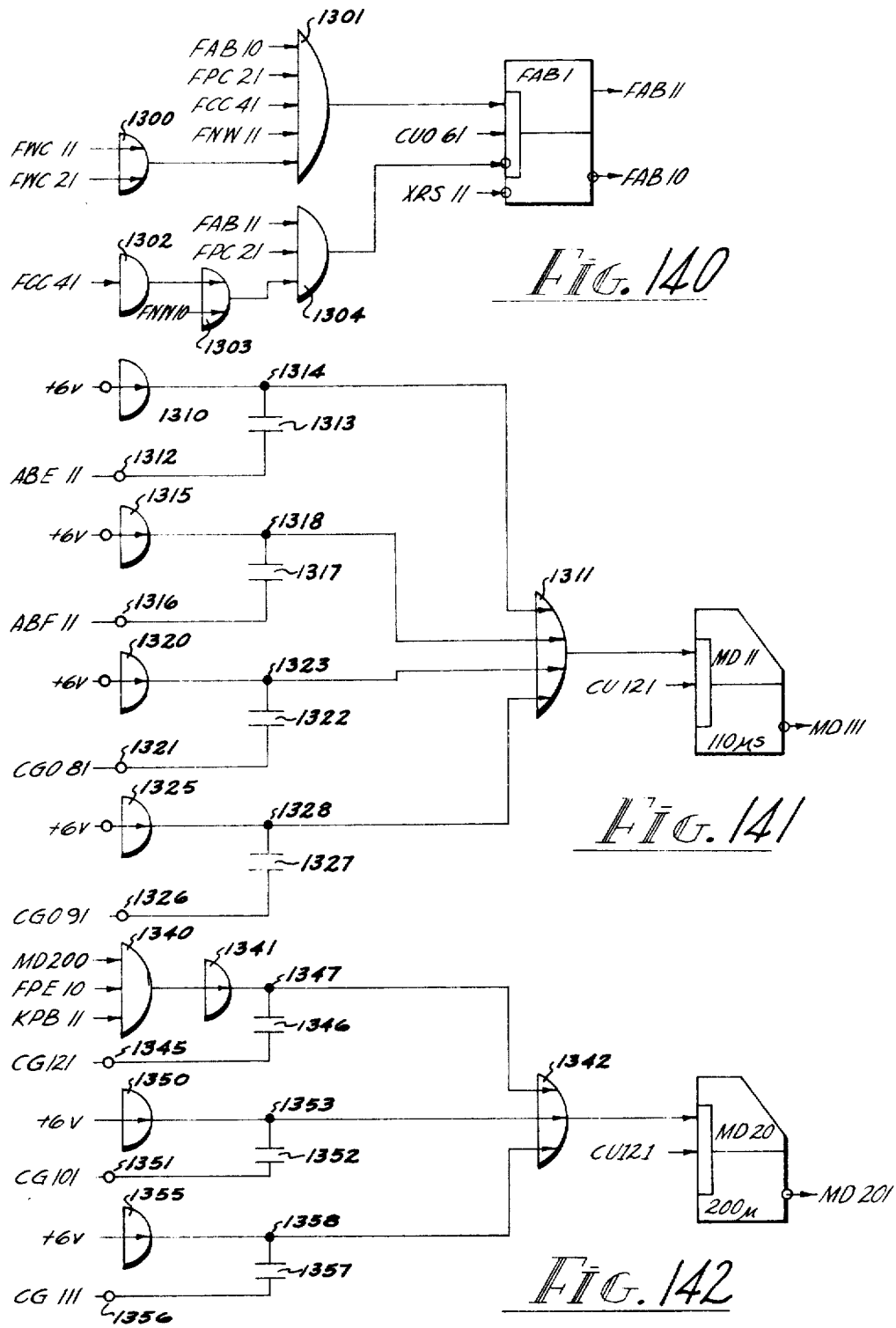

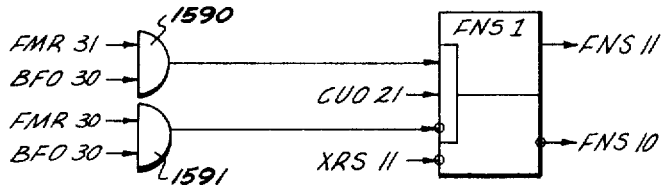
Fig. 164
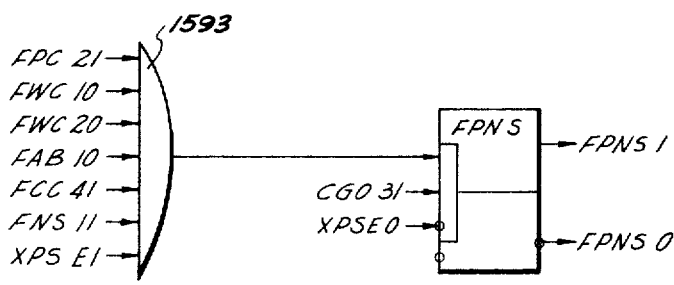
Fig. 165
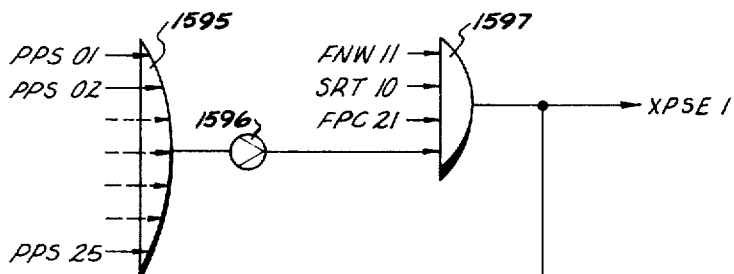
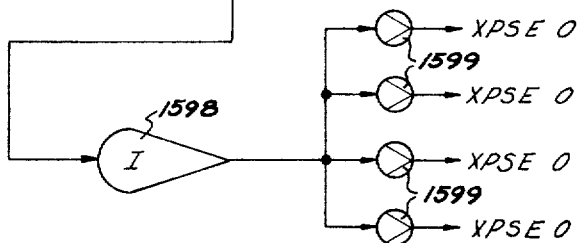
Fig. 166

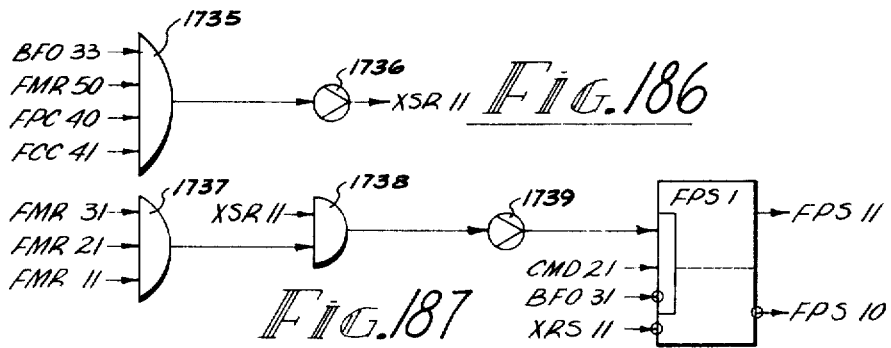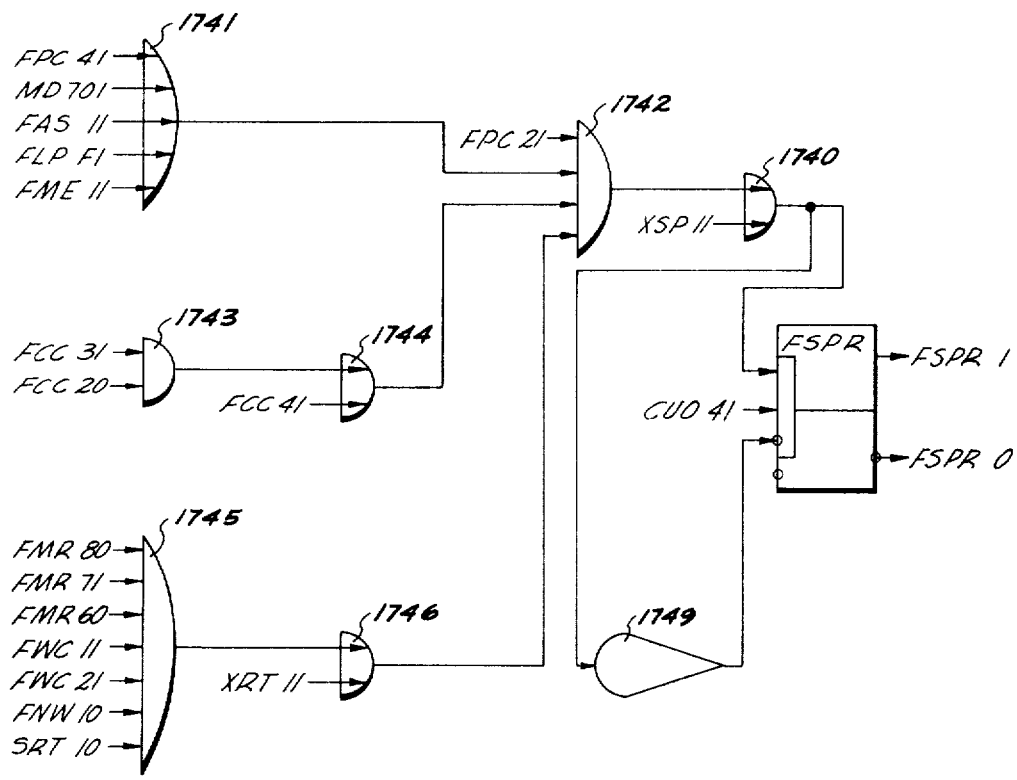

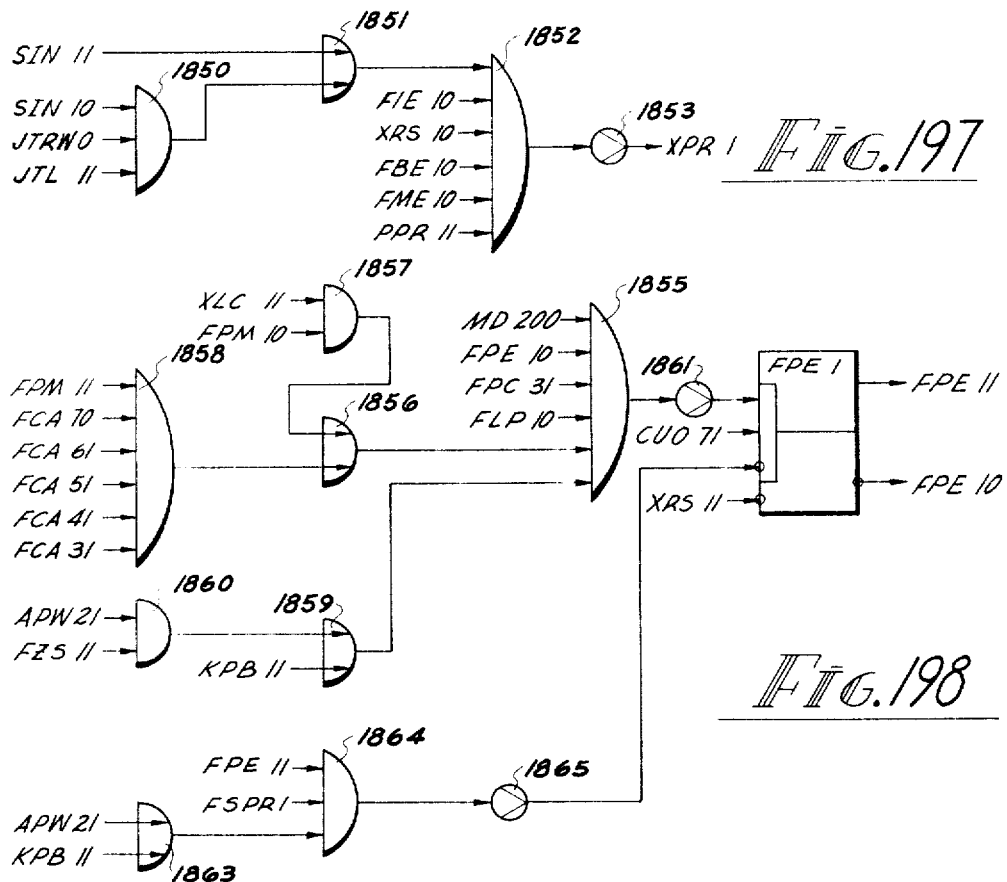
Fig. 197
Fig. 198
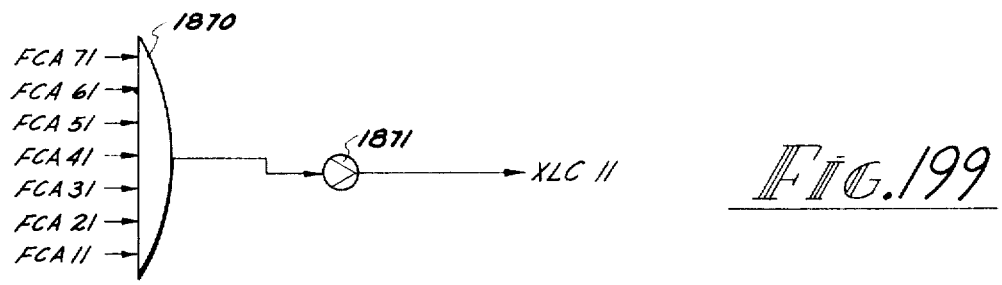
Fig. 199

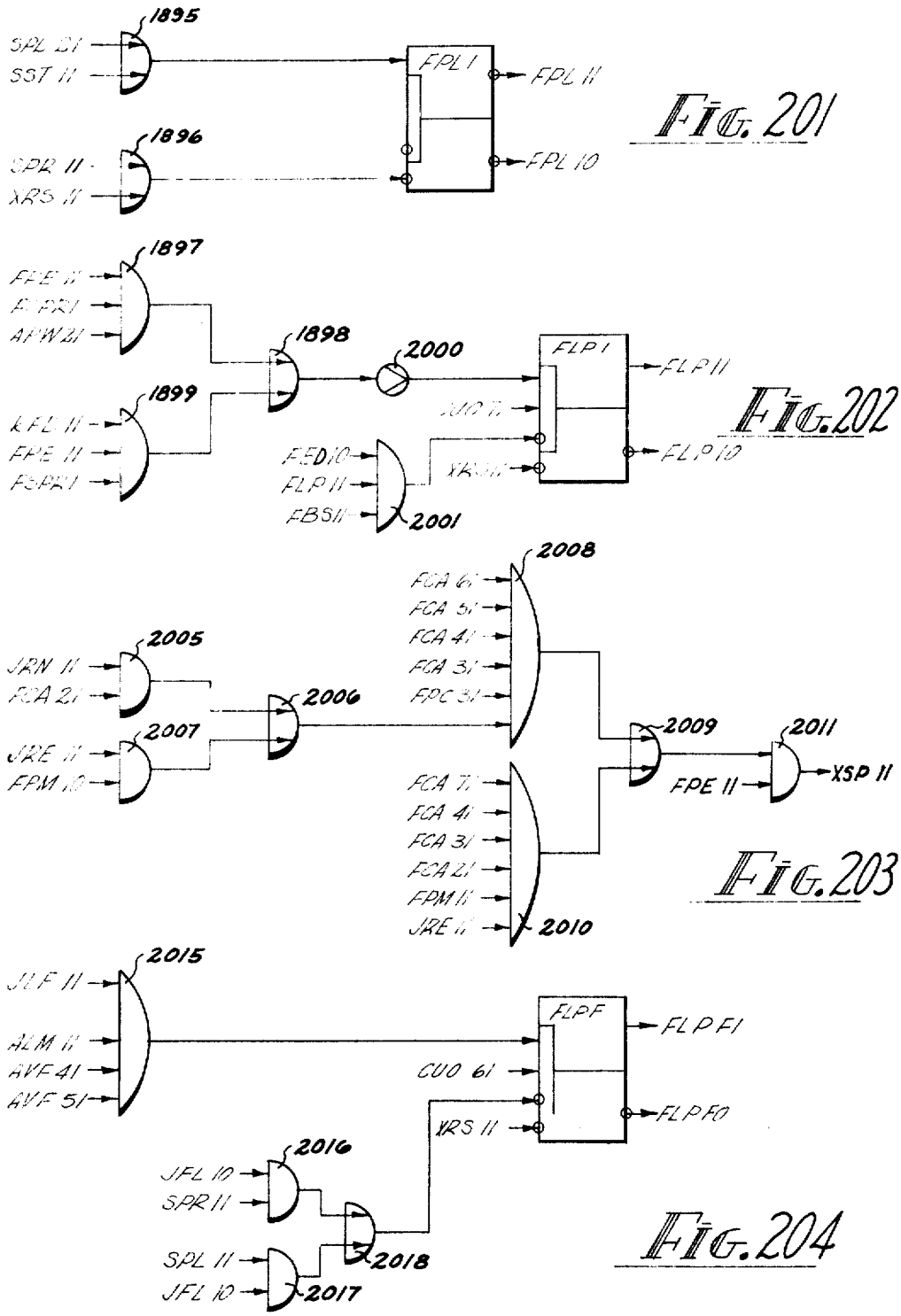

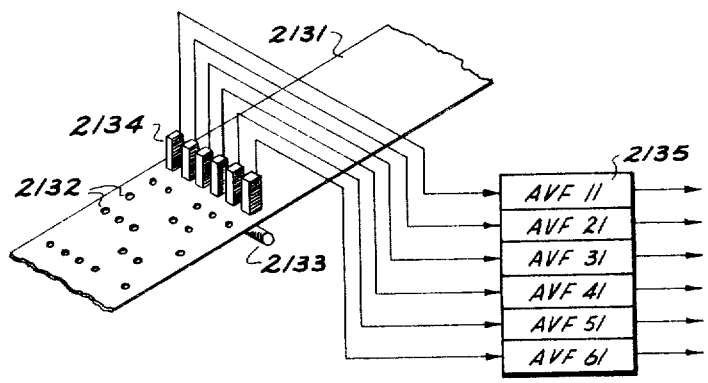
Fig. 212
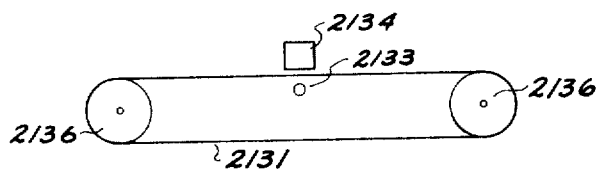
Fig. 213
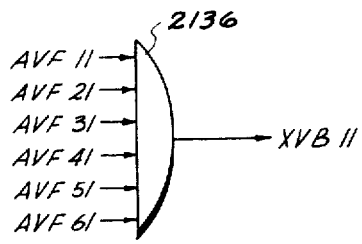
Fig. 214
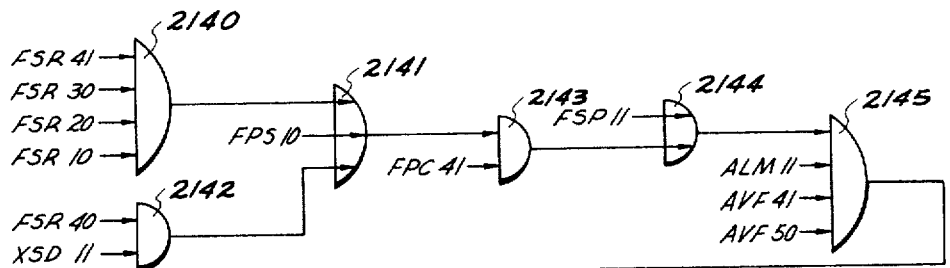
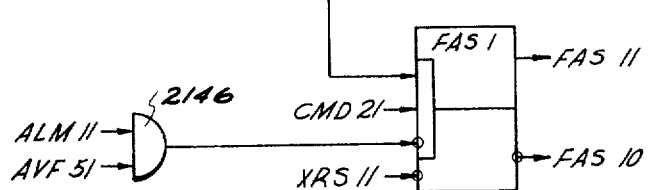
Fig. 215

United States Patent Office 3,283,305
Patented Nov. 1, 1966

3,283,305
MULTIPLE FONT HIGH SPEED PRINTER CONTROL SYSTEM
Matthew F. Hans and Byron F. Burch, Jr., Phoenix, Ariz., assignors to General Electric Company, a corporation of New York
Filed June 22, 1962, Ser. No. 204,309
51 Claims. (Cl. 340—172.5)

TABLE OF CONTENTS

| | Column |
|---|---|
| General | 1 |
| Index of Figures | 3 |
| Introduction | 9 |
| Logic Terminology | 10 |
| Information Format | 11 |
| Off Line (Tape) | 11 |
| On Line | 13 |
| System Circuit Elements | 14 |
| Clock Pulse Generator | 14 |
| Clock Pulse Driver | 15 |
| Flip-Flops | 17 |
| AND-Gate | 20 |
| OR-Gate | 20 |
| Inverter | 21 |
| Emitter Follower | 22 |
| Register Transfer | 22 |
| One-Shot | 23 |
| Relay Driver | 25 |
| Synchronous Timing Circuit | 25 |
| General System Description | 30 |
| Fill Cycle | 33 |
| Transfer Cycle | 36 |
| Print-Slew Cycle | 40 |
| Index of Components and Signals | 43 |
| Detailed System Description | 52 |
| Operator's Panel | 52 |
| Code | 54 |
| Clock System | 55 |
| Bus Functions | 59 |
| Control Counter | 66 |
| Program Counter | 70 |
| Fill Cycle Components | 72 |
| Transfer Cycle Components | 94 |
| Print-Slew Cycle Components | 117 |
| Index of Logic Equations | 129 |
| System Operation | 141 |
| Normal Mode—Off-Line | 141 |
| Normal Mode—On-Line | 152 |
| Unedited Mode—On-Line or Off-Line | 153 |

GENERAL

The present invention pertains to high speed printer controls, and more particularly, to high speed printer controls for controlling printers capable of accepting electronic data processing signals and reproducing the signals in the form of machine readable and human readable print.

Modern electronic data processing systems are characterized by the rapidity with which they are capable of performing logical functions and operations upon information represented by electrical signals. Generally, electronic data processing systems operate on information stored in a particular address of a memory, and perform operations on this information in accordance with instructions which may be stored in a similar, or the same, memory, or may be supplied to the system from an external source.

The electronic data processing system may be programmed to perform given operations and follow specified routines and sub-routines. Although these data processors perform the designated operations rapidly, it is necessary to supply, or store, the information to be processed prior to its entry into the data processing system. Further, the results of the operation or computation performed by the data processing system must be made available to other equipment and/or to a human operator. The information upon which the operation is to be performed is usually provided by a document, or similar device, having the information to be operated upon contained thereon in a form recognizable to a human operator. The information may be transferred from one type of documentation to another such as, for example, from machine cards to magnetic tape. Regardless of the origin of the information, this humanly intelligible information must be transduced into machine readable language so that the data processing system may derive electrical signals indicative of the information and perform the logical operation thereon. At the end of a data processing cycle, the resultant information, representing the answer to the calculations for which the processing system was programmed, must be reduced to some form for storage and for human interpretation.

It is the function of peripheral equipment to provide a data processing system with a machine readable form of information for computation, and to provide the data processing system with a transducer for deriving humanly interpretable information representing the results of the data processing operation. Since peripheral equipment is inherently slower than the central processors of data processing systems, the operating speed of peripheral equipment is extremely important.

Printers have commonly been used as the output of data processing systems. Frequently, to more efficiently utilize the high speed capabilities of a data processor, the result of operations and computations of the processing system is first recorded on magnetic tape; subsequently, the magnetic tape is used as an input to a printing sub-system. As is frequently the case, if the information to be printed at the computer output is information which subsequently may be used for further calculations at a later time in the data processing system (re-entry of information), it has been necessary to transcribe the information that has been printed into a form for re-entry into the computing system such as, for example, punched cards. This step of transcription introduces errors into the system which could be eliminated if the output of the printer is in machine readable language. However, the prime purpose of a printer is the presentation of information in human readable form; thus, a printer capable of performing a re-entry function must be capable of printing both in machine readable and human readable language. Further, it is frequently important to print information which may be necessary to a human reader of the document but which may not be necessary to the data processing system, or information important only to the system if the information contained on the document is to be re-entered into the data processing system. Therefore, a printer utilized for printing documents re-entryable into a data processing system must be controlled to distinguish between information necessary for human intelligibility and necessary for both human and machine intelligibility.

Prior art printers lack the high speed capabilities combined with the necessary multiple font requirements for a highly reliable re-entry printer. The re-entry printer system "closes the data processing loop" since the output information printed by the printer may subsequently be fed directly into the data processing system for reprocessing; thus, the reliability of the printer becomes of paramount importance since any error in the re-entry printing may become compounded by subsequent recirculation in the data processing system. The re-entry printer must be capable of printing a human readable language, and selectively, a machine readable language. This selectivity must not require excessive control time, and the control system for controlling a re-entry printer must not only be capable of determining the font to be printed, but also must provide protection against error in the selection to avoid compounding errors upon re-entry.

Accordingly, it is an object of the present invention to provide an improved high speed printer control.

It is also an object of the present invention to provide a high speed printer control capable of controlling a printer for printing re-entry information.

It is also an object of the present invention to provide a high speed printer control for controlling a printer for printing machine readable language.

It is a further object of the present invention to provide a high speed printer control capable of controlling a printer for selectively printing machine and human readable languages.

It is a further object of the present invention to provide a high speed printer control capable of controlling a printer for detecting errors in the information supplied to it for printing.

It is still another object of the present invention to provide a high speed printer control capable of controlling a printer for indicating in human language errors occurring in machine language.

It is also an object of the present invention to provide a high speed printer control capable of controlling a printer for accepting information to print while printing information already received.

It is still another object of the present invention to provide a high speed printer control capable of controlling a printer for storing information to be printed in any of a plurality of fonts.

It is still another object of the present invention to provide a high speed printer control capable of controlling a printer for receiving information and selectively printing only a portion of the received information.

It is still another object of the present invention to provide a high speed printer control capable of controlling a printer for detecting errors in information supplied to the printer control even though the information is not to be printed.

It is a further object of the present invention to provide a high speed printer control capable of controlling a printer for printing algebraic signs for numeric information.

It is a further object of the present invention to provide a high speed printer control capable of controlling a printer for printing algebraic signs in only predetermined locations and only for numeric information.

It is also an object of the present invention to provide a high speed printer control capable of controlling a printer for printing information in a plurality of fonts in a selected format.

It is also an object of the present invention to provide a high speed printer control capable of controlling a printer for printing information in a plurality of fonts in a selected one of a plurality of formats.

It is still another object of the present invention to provide a high speed printer control capable of controlling a printer for printing a given format in accordance with the information to be printed.

Further objects and advantages of the present invention will become apparent as the description thereof proceeds.

INDEX OF FIGURES

FIGS. 1–4 are illustrations of a magnetic tape format that may be useful for supplying information to the Printer Control System of the present invention.

FIGS. 37–51 are schematic illustrations of the development of Bus Functions BF004–BF018, respectively.

FIG. 52 is a schematic illustration of the development of Bus Function BF021.

FIG. 53 is a schematic illustration of the development of Bus Function BF023.

FIG. 54 is a schematic illustration of the development of Bus Function BF022.

FIGS. 55–64 illustrate the development of Bus Functions BF024–BF033, respectively.

FIG. 91 is a schematic illustration of the Program Counter flip-flop FPC1 and the associated logical circuitry.

FIG. 92 is a schematic illustration of the Program Counter flip-flop FPC2 and the associated logical circuitry.

FIG. 93 is a schematic illustration of the Program Counter flip-flop FPC3 and the associated logical circuitry.

FIG. 95 is a schematic illustration of the Tape Forward flip-flop FTF1 and the associated logical circuitry.

FIG. 96 is a schematic illustration of the Block Buffer Status flip-flop FBS1.

FIG. 97 is a schematic illustration of the Marker Track Lockup flip-flop FLU1.

FIG. 98 is a schematic illustration of the Marker Track Lockup flip-flop FLU2.

FIG. 99 is a schematic illustration of the Marker Follower flip-flop FMF1 and the associated logical circuitry.

FIG. 103 is a schematic illustration of the Marker Scaling flip-flop FMS1 and the associated logical circuitry.

FIG. 104 is a schematic illustration of the Marker Track Detect Enable one-shot MD15.

FIG. 105 is a schematic illustration of the Beta-Gamma Tracking flip-flop FBG1.

FIGS. 106 and 107 are schematic illustrations of the Word Character Counter flip-flops FWC1 and FWC2 and the associated logical circuitry.

FIG. 111 is a schematic illustration of the decoding circuit for the development of the File Select decode signal XFS11.

FIG. 112 is a schematic illustration of the decoding circuit for the development of the File Code Start detect decode signal XFCS1.

FIG. 113 is a schematic illustration of the decoding circuit for the development of the Start of File N code detect signals XFS11–61.

FIG. 114 is a schematic illustration of the File Code Sequence flip-flop FFCS and the associated logical circuitry.

FIG. 115 is a schematic illustration of the File Tracking flip-flop FFT1 and the associated logical circuitry.

FIG. 120 is a schematic illustration of the End of Data Character flip-flop FED1 and the associated logical circuitry.

FIGS. 121a and 121b illustrate the Input Error flip-flops FIE1–8 and the associated logical circuitry.

FIG. 135 is a schematic illustration of the decoding circuit for the development of Non-Print Character code detect signals XNP10 and XNP11.

FIG. 136 is a schematic illustration of the decoding circuit for the development of the Stop Code detect signal XSC11.

FIG. 137 is a schematic illustration of the Stop Code detect flip-flop FSC1 and the associated logical circuitry.

FIG. 138 is a schematic illustration of the Backspace Lockup flip-flop FBLU and the associated logical circuitry.

FIG. 139 is a schematic illustration of the Tape Reverse flip-flop FTR1 and the associated logical circuitry.

FIG. 140 is a schematic illustration of the Numeric Word A-B Select flip-flop FAB1.

FIG. 141 is a schematic illustration of the block buffer load-unload inhibit one-shot MD11.

FIG. 142 is a schematic illustration of the typeline buffer unload inhibit one-shot MD20.

FIG. 164 is a schematic illustration of the Numeric Sign flip-flops FNS1 and the associated logical circuitry.

FIG. 165 is a schematic illustration of the Print Numeric Sign flip-flops FPNS and the associated logical circuitry.

FIG. 166 is a schematic illustration of the decoding circuit for the development of the print numeric sign enable decode signals XPSE1 and XPSE0.

FIG. 186 is a schematic illustration of the decoding circuit for the development of the slew code detect signal XSR11.

FIG. 187 is a schematic illustration of the Program Slew flip-flop FPS1 and the associated logical circuitry.

FIG. 188 is a schematic illustration of the Stop Processing flip-flop FSPR and the associated logical circuitry.

FIG. 197 is a schematic illustration of the decoding circuit for the development of the printer ready signal XTR1.

FIG. 198 is a schematic illustration of the Print Enable flip-flop FPE1 and the associated logical circuitry.

FIG. 199 is a schematic illustration of the decoding circuit for the development of the column address counter lockout count detect signal XLC11.

FIG. 201 is a schematic illustration of the Print One Line flip-flop FTL1 and the associated logical circuitry.

FIG. 202 is a schematic illustration of the Line Printed flip-flop FLP1.

FIG. 203 is a schematic illustration of the decoding circuit for the development of the stop print detect signal XSP11.

FIG. 204 is a schematic illustration of the Last Paper Form flip-flop FLPF.

FIGS. 212 and 213 are schematic illustrations of a typical vertical format unit suitable for use in the system of the present invention.

FIG. 214 is a schematic illustration of the decoding circuit for the development of the broken vertical format unit tape detect signal XVB11.

FIG. 215 is a schematic illustration of the Automatic Slew flip-flop FAS1 and the associated logical circuitry.

INTRODUCTION

Figure 5:
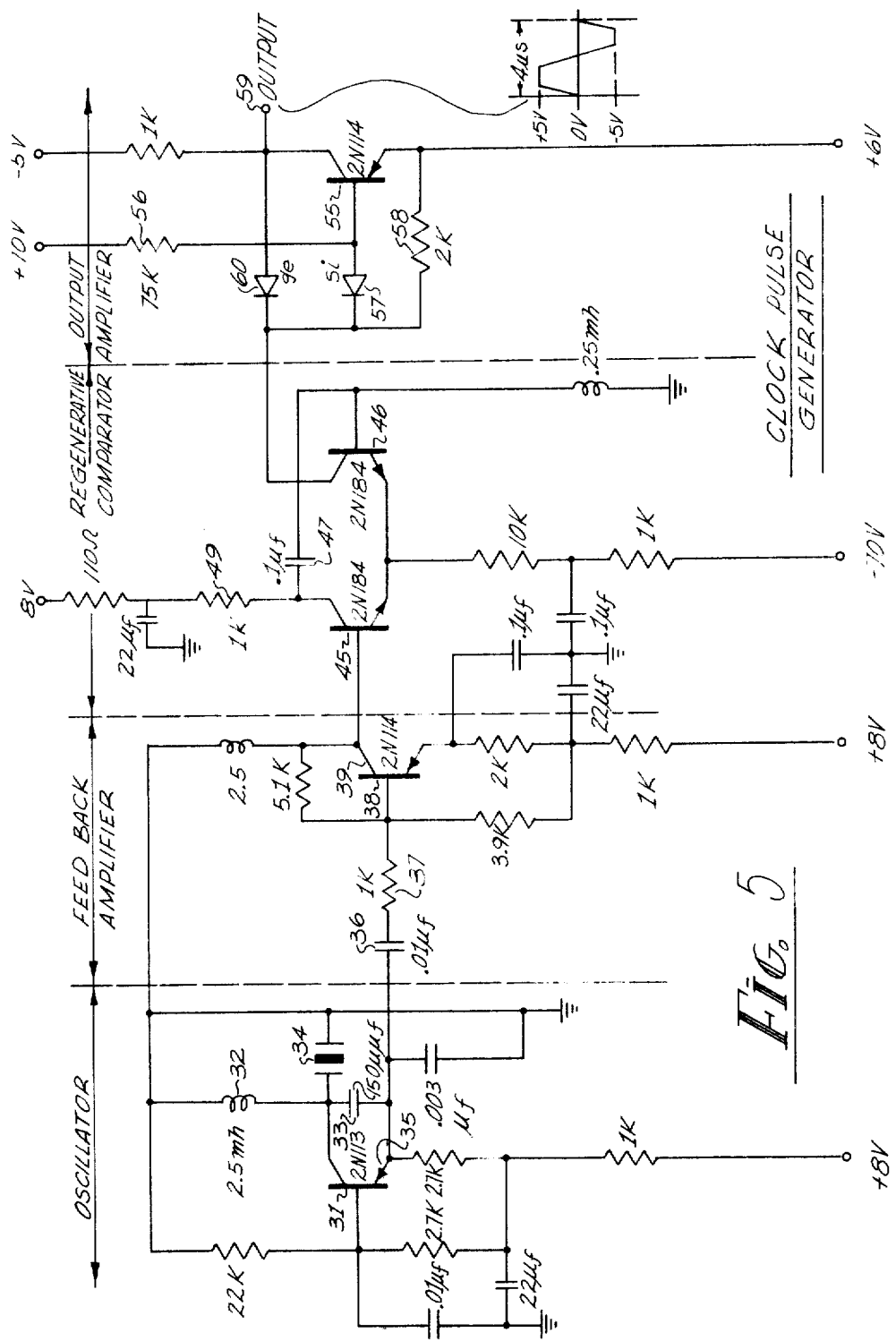
FIG. 5 is a clock pulse generator circuit suitable for use in the system of the present invention.

Briefly, in accordance with one embodiment of the present invention, a high speed re-entry printer control is provided for receiving information in the form of electrical signals representing digital quantities. A memory register receives the information in predetermined block quantities and transfers the information to a block buffer for temporary storage. The transfer from the memory register to the block buffer is accompanied by code and parity checking as well as various housekeeping error checks. Upon the completion of the transfer of a block of information to a block buffer, a signal is generated to cause the buffer to empty through the memory register and a character decoder into a typeline buffer.

During the transfer of the information from the block buffer to the typeline buffer, the information contained in digital form first stored in the block buffer is transformed by the character decode into appropriate form for storage in the typeline buffer for the subsequent control of a printing operation. An address means is provided for addressing the typeline buffer in accordance with a predetermined address selection sequence to provide a transfer of the information stored in the typeline buffer to a lister. The lister provides suitable transformation for the logic level signals derived from the typeline buffer to the voltage level necessary for the operation of the printer. The output of the lister is directed through a plugboard to enable a manual adjustment of the specific location of each column to be printed. Suitable amplifiers are provided for amplifying signals derived from the plugboard prior to the application of the signals to the typeline.

During the transfer of the information from the memory register to the typeline buffer, codes are presented representing a particular font in which the respective information is to be printed. This code is detected and temporarily stored, and subsequently utilized to permit the information in various fonts to be stored in the same typeline buffer positions as other fonts. A signal is derived from a positional indicator on the typeline to provide a means for detecting the position of the typeline print wheels. This signal, combined with the detected code indicating the appropriate font in which the information is to be printed, yields a particular column address decode signal to the typeline buffer. Finally, the appropriate synchronization signal causes the information to be typed in the selected font.

The particular font or fonts utilized in a printer controlled by the printer control of the present invention may be any font suitable for human and/or machine recognition. For example, human readable font such as ordinary Gothic type font may be utilized for the human language; whereas, Magnetic Ink Character Recognition (MICR) E13B font may be utilized, or Optical Character Recognition (OCR) symbols may be utilized as the machine readable language. For simplicity, the embodiment described hereinafter will be concerned with the American Banking Association's standardized MICR font (E13B), and conventional human-readable Gothic font.

LOGIC TERMINOLOGY

The printer control system of the present invention is adapted to receive information in the form of electrical pulses. These pulses may be representative of information in any one of several codes; for example, in the binary code, each element of information, termed a "bit," is represented by either a 1 or a 0. In the instant example, a 1 may be represented by an electrical signal or pulse of a positive polarity and a 0 by a negative signal or pulse of an opposite polarity. For purposes of illustration, the present system will be described in terms of a binary code utilizing a positive electrical signal of 6 volt magnitude to represent a binary 1, and a negative 5 volt signal to represent a binary 0.

The fundamental unit of data for printing is the data character. The data character may comprise any number of bits; however, for purposes of illustration, it will be assumed that the data character comprises 8 bits for an alphanumeric character, and 4 bits for a numeric character.

To facilitate the description of the present invention, specific designations will be applied to points in the printer control system to indicate the signal existing at that point, to indicate whether the signal is a 1 or a 0, and to indicate the source of the signal. The designations will be divided into Prime Logic Descriptors, and Secondary Logic Descriptors. The Prime Logic Descriptors are used in generating the logical equations of operation. In the implementation of the logic equation in terms of circuitry, however, parallel sources of signals are sometimes required, and in many instances gating fan-outs require the designation of similar signals in a different manner. As a result, the Prime Logic Descriptors must provide the necessary indication of signal source. Prime Logic Descriptors are five digit alpha numeric characters divided as follows.

Digit position 1: describes the class of element from which the logic signal emanates
A—amplifying element or reshaper
B—bus function
C—clocks
F—flip-flops
J—cable signal
K—relay
L—line driver
M—monostable device
N—inverters
P—plugboard
S—switches
X—decoders Digit positions 2 and 3: these digit positions are uitlized for pneumonic coding of the logic signal.

Digit position 4: this digit position is generally numeric and will describe the serial number of the digit positions 2 and 3. For example, if a counter has four stages, digit position 4 will identify the particular stage of that counter from which the designated signal emanates. In some instances, this digit may be used as the third pneumonic coding position, but only in those cases where there is no more than one such element.

Digit position 5: this digit position is a numeric—usually a 1 or a 0. The number describes the true or false condition required. For example, in the case of a flip-flop, a 1 indicates the "set" state true, and conversely the "0" indicates the "reset" state true. Stated differently, for the particular case chosen for illustration, a 1 indicates that a set output of a flip-flop is at a positive 6 volt level, whereas a 0 indicates that the set output of a flip-flop is at a −5 volt level, and the reset output is at a +6 volts.

To further describe the implementation of the Prime

Logic Descriptors, an example will now be given. The term FMR21 reveals the following facts:

(1) The "F" indicates that the signal emanates from a flip-flop.
(2) The "MR" is a pneumonic coding which indicates that the flip-flop is a flip-flop of the Memory Register.
(3) The "2" indicates that the flip-flop is the second flip-flop of the Memory Register.
(4) The "1" indicates that the signal is a positive 6 volts when the "set" output of the designated flip-flop is true.

Thus, the Prime Logic Descriptor FMR21 immediately indicates that the signal is the signal present at the set output of the second flip-flop of the Memory Register.

A Secondary Logic Descriptor is a one digit alphabetic when describing a signal source, and a four digit alphanumeric when describing a level of input gating. The Secondary Logive Descriptor may also be a one digit symbol when describing particular inputs to flip-flops or other circuits having symbol-identified inputs. The Secondary Logic Descriptor is used only when there is a possibility of ambiguity in the system of Prime Logic Descriptors. The digit positions of Secondary Logic Descriptors are allotted as follows.

Digit position 1: when used to designate a source of logic signals, the first digit position is a letter starting with A, B, . . . etc. to Z. (To avoid confusion, if the utilization of a particular letter for the first digit position of a Secondary Logic Descriptor implies the connotation designated under the Prime Logic Descriptors, then other letters of the alphabet are chosen.) When the first digit position is used to identify a level of gating, a numeric is used to identify the output of which level, i.e. 1, 2, 3, etc. from the ultimate input being fed.

Digit position 2: this digit position contains the letter G to imply the "gating" level described by digit position 1 when the first digit position is a numeric.

Digits 3 and 4: digits 3 and 4 are numerics describing the serial number of the "Nth" gate of the level described by digits 1 and 2.

When an emitter follower is introduced into a single line for power purposes, the fourth digit of the Secondary Logic Descriptor is converted to an alphabetic on the line describing the output, and is the counterpart of the numeric used on the input, i.e., 1 converts to A, 2 to B, 3 to C, etc.

INFORMATION FORMAT

High speed printer systems are generally incorporated in data processing systems for the reduction of information resulting from computations from the central processor into printed form. The present invention may be utilized in two modes; first, receiving information from a tape unit with tape unit operation monitored by the Printer Control; and, direct printing of information received directly from a Central Processor. The former mode of operation is termed "off line"; whereas, the second mode of operation is termed "on line." Since reducing the information into recorded bits on magnetic tape is usually faster than printing the information in a printer sub-system, the present invention will be described in terms of a printing sub-system receiving information from a magnetic tape unit. To understand the receipt of information and the process involved in the reduction of the information to a selected printed format, the format of the information presented to the printer sub-system will now be described.

Off line (tape)

FIGURES 1 and 2 illustrate the scheme for storing data on magnetic tape and for reading the data therefrom. Data is stored on magnetic tape 20 in groups of data words, which are designated as data blocks 21. Each data block comprises 100 data words wherein each data word comprises eight tape digits. Each tape digit comprises five bits, four bits being the system code for a numeric character, or part of an alpha-numeric character, to be processed, and the fifth bit of the tape digit being the column parity bit for the tape digit. Six of the eight tape digits of each tape data word include the six digits of the data word to be printed in the printer system and the six corresponding column parity bits. The seventh and eighth tape digits contain the five row parity bits for the tape data word and control bits.

Data is stored on the magnetic tape in the ten parallel tracks spaced across the tape, and extending parallel to the length of the tape. Ten bits are stored on a line substantially perpendicular to the length of the tape in the ten tape tracks, which are numbered 1–10. The line on which the ten bits are stored perpendicularly to the length of the tape is termed a transverse recording position. The four data bits of one digit are stored in tracks 1–4 and the corresponding column parity bit in track five. The four data bits of another digit are stored in tracks 6–9 and the corresponding column parity bit in track ten. Therefore, two tape digits are stored side by side on a transverse recording position. These two tape digits combined may represent an alphanumeric character, or, each tape digit may represent a numeric character. A full tape data word is stored in four adjacent transverse recording positions, so that a data block of 100 words comprises 400 transverse recording positions. As shown in FIG. 2, the row parity digit and the sixth, fourth, and second tape digits of the tape data word are stored in tracks 1–5, and the seventh, fifth, third and first tape digits are stored in tracks 6–10. The spacing between transverse recording positions and the speed of the tape are adjusted so that a transverse recording position is recorded or read approximately once during each sixteen clock periods. Therefore, the reading or writing of a complete data word occurs in approximately 64 clock periods.

A plurality of writing heads 22, one opposite each track, are adapted to write data on the magnetic tape in the corresponding track. During the writing process, current is passed continuously through the write head in a direction to magnetize to saturation the corresponding track in a direction parallel to the length of the tape. The direction of this write head current depends on the data to be written. Only 0 bits are stored on magnetic tape. A 0 bit is denoted by a reversal in the direction of saturation in a track. Therefore, whenever a writing head is to write a 0, the current in the winding thereof is reversed. A 1 bit is represented by the absence of any change of magnetic field direction in a transverse recording position.

A plurality of reading heads 23, one opposite each track, are adapted to sense the magnetic field provided by the corresponding track and to deliver an output pulse wherever a 0 bit is sensed. Where a 1 bit is represented, no output signal is delivered by the corresponding read head.

The individual data bits and the representation in which they are stored are illustrated in FIG. 2. The arrows indicate the magnetic saturation of a track in the direction indicated. Thus, at the transverse recording position for the 4th digit, the 1st, 3rd, and 4th tracks have the saturation direction therein reversed, whereas the 2nd and 5th tracks have the saturation direction unchanged. Consequently, the column parity bit for the 4th digit is a 1 and the four data bits in tracks 4–1 are respectively 0010. The table below illustrates the data word represented in FIG. 2.

DATA DIGITS ON MAGNETIC TAPE (FIG. 2)

| Row Parity Digit | 7th | 6th | 5th | 4th | 3rd | 2nd | 1st |
|---|---|---|---|---|---|---|---|
| 0 | 1 | 1 | 0 | 1 | 0 | 0 | 1 |
| 1 | 0 | 0 | 0 | 0 | 0 | 0 | 0 |
| 0 | 0 | 1 | 0 | 0 | 0 | 0 | 0 |
| 1 | 1 | 0 | 1 | 1 | 1 | 0 | 0 |
| 0 | 0 | 0 | 1 | 1 | 1 | 0 | 1 |

The bits below the horizontal ruled line and to the right of the vertical ruled line are the data bits. The top row of bits are the column parity bits for the corresponding digits. The bits in the 2nd, 3rd, 4th, and 5th rows of the left-hand column are the row parity bits for the corresponding rows. The bit in the first row of the left-hand column is the column parity bit for that digit. No row parity bit is provided for the first row.

A block marker track provides indicia thereon for notifying the printer system of the area on the magnetic tape wherein a data block is to be read. Three block markers are employed, designated respectively as the α-block marker, β-block marker and γ-block marker. Each different block marker comprises a different number of recorded zeros. The magnetic tape which is utilized may suitably be of a ¾-inch width and may be divided into eleven 0.025-inch channels with a 0.0625-inch spacing, center to center. Ten of the channels are utilized to record two binary coded decimal digits, plus an odd parity bit in parallel. Each word is composed of six dgits. These digits are recorded on tape in three linear columns, and a fourth column is provided for row parity and control bits. The words are recorded in groups of 100 to comprise a data block. FIGURE 3 illustrates the layout of data on magnetic tape, and FIG. 4 illustrates the block marker arrangement on tape.

The eleventh, or block marker channel, indicates the begin-write point (alpha), the begin-read point (beta), and the stop-write point (gamma) positions for each block. The sum of maximum stop and start distances determines the spacing between an alpha and a gamma of the preceding block. Beta follows alpha by a distance less than the inter-head spacing. All data for a given block is recorded between the beta and gamma block markers.

As desribed above, a non-return-to-zero form of recording is utilized whereby binary 0-bits are indicated by a flux reversal in either direction and binary 1-bits are indicated by no change. The tape is saturated in either polarity between recorded 0-bits. Upon reading, 0-bits are detected as voltage pulses of amplitudes proportional to the time derivative of flux change at the read head gap as it traverses the tape at constant speed. No information is carried in the sense of the flux or its resultant pulse, but only in the fact that a change indicates a 0-bit. No change is either a 1-bit or the absense of information.

On line

When the printer system is connected to a data processing system and is being utilized "on-line," the information to be printed is received directly from the data processing unit. Consequently, for the particular embodiment chosen for illustration, the information would be received from the data processing unit in ten bit parallel communication. The ten bits simultaneously received from the data processor indicate either two numeric characters plus parity bits or an alphanumeric character, plus parity bits. The information thus received from the data processor will be handled in the same manner as similar information received from a tape handler. Of course, the appropriate mode selection switch of the printer control will provide the necessary switching signals to deenergize the elements normally utilized to control a tape unit at the printer control input. Since printer systems are generally utilized as "off-line" peripheral equipment, and are fed information from tape units, the description of the present invention will be concerned primarily with tape unit input.

SYSTEM CIRCUIT ELEMENTS

Circuits useful as elements of the Printer Control System will now be described. The system will function with these elements or with other similar elements well-known in the art; therefore, this invention is not to be considered as limited to the employment of the specific circuits shown.

The following circuits find general employment in the system: clock pulse generator, clock pulse driver, flip-flop, AND-gate, OR-gate, inverter, emitter follower, one-shot, and synchronous one-shot: Illustrated with the respective drawings of the circuit elements are symbols representative thereof. These symbols will be employed for simplicity in the description of the invention to follow.

In the figures for the circuit elements, specific values of the circuit components are shown. These values are not to be considered as limiting, and the circuit elements will often function satisfactorily with considerable variation from the values provided.

Clock pulse generator

The clock pulse generator of FIG. 5 provides synchronizing signals for clock pulse drivers located throughout the system. The synchronizing signals are provided at a repetition rate of 250 kc. The clock pulse generator comprises the following four circuits connected in tandem: an oscillator, a feedback amplifier, a regenerative comparator, and an output amplifier.

The oscillator comprises a transistor 31 coupled to a resonant circuit comprising an inductor 32 and capacitor 33. A crystal 34, coupled to the resonant circuit, locks the oscillator at the desired frequency. The sine wave output signal of the oscillator is taken from the emitter electrode 35 of transistor 31.

The output signal of the oscillator is transmitted through a capacitor 36 and a resistor 37 to the base electrode of transistor 38 of the feedback amplifier. The feedback amplifier has a substantial voltage gain, whereby the output signal thereof, delivered at collector electrode 39, is a sine wave having an amplitude of approximately 1 volt peak-to-peak.

The output signal of the feedback amplifier is applied directly to the base electrode of transistor 45 of the regenerative comparator. The regenerative comparator is a bistable circuit delivering a substantially square wave in response to the received sine wave, and is provided for obtaining a waveform with a steep wavefront from the input signal. The regenerative comparator operates substantially as follows: Consider the portion of the cycle of operation when the input signal is negative with respect to ground, but is increasing positively. At this time transistor 45 is non-conducting and transistor 46 is conducting. In this stable state, the base electrode of transistor 46 is 0 volt (v.), or ground. The collector electrode of transistor 45 is at +8 v., and capacitor 47 is charged to +8 v. The emitters of both of transistors 45 and 46 will be a fraction of a volt negative with respect to ground, since transistor 46 is conducting. As the input voltage applied to the collector electrode of the transistor 45 increases positively and reaches 0 v., the emitter-base junction of transistor 45 becomes forward biased and collector current commences to flow therein. A sharp regenerative action thereupon ensues, with transistor 45 turning on sharply and transistor 46 turning off sharply. During this regenerative action, the negative swing at the collector electrode of transistor 45 is coupled through capacitor 47 to the base electrode of transistor 46. As the emitter current of transistor 46 decreases, the emitter voltage thereof becomes more negative, increasing the forward bias of transistor 45 and sustaining the regenerative action. The time constant of capacitor 47, inductor 48 and resistor 49 is adjusted so that the sharp negative pulse at the base electrode of transistor 46 terminates in about 2 microseconds (μsecs.).

So long as the input signal now remains positive, transistor 45 continues to conduct and transistor 46 remains non-conducting. After the input voltage has passed its positive peak value and is decreasing negatively, all switching transients have terminated and the base electrode of transistor 46 is again at 0 v. The emitter electrode of transistor 46 is only a fraction of a volt less than the positive voltage applied to the base electrode of transistor 45 and, therefore, is positive with respect to the base electrode of transistor 46 at this time. When the signal applied to transistor 45 decreases negatively and reaches 0 v., transistor 46 becomes forward biased and commences to conduct. As the emitter current of transistor 46 starts to increase, the increasing voltage drop across resistor 50 decreases the forward bias of transistor 45. As the emitter current of transistor 45 decreases, the collector current thereof decreases, allowing the collector voltage to swing sharply positive. The positive swing at the collector electrode of transistor 45 is coupled by capacitor 47 to the base electrode of transistor 46, causing a sharp regenerative action which cuts off transistor 45 very rapidly and turns on transistor 46 very rapidly. As the input voltage now continues in its negative half cycle, transistor 46 continues conducting and transistor 45 continues non-conducting.

When transistor 46 is conducting the emitter current thereof is relatively constant, so that square waves of current appear at the collector electrode thereof. Because of the regenerative action, the slope of the leading edge of the current waveform will depend but little on the amplitude of the input signal applied to the base electrode of transistor 45, but will depend primarily on the circuit parameters of the regenerative comparator.

The signal available at the collector electrode of transistor 46 is employed as the output signal of the regenerative comparator.

The output signal of the regenerative comparator is coupled to an output amplifier, which functions to isolate the regenerative comparator from the clock pulse generator load, while preserving the steep wavefront of the waveforms generated. A transistor 55 of the output amplifier and its associated circuit is adapted to receive the output signal of the regenerative comparator and to provide amplification thereof. When the collector electrode current of transistor 46 is zero, transistor 55 is maintained cutoff by the current passing through resistor 56, silicon diode 57 and resistor 58. At this time the clock pulse generator output signal from terminal 59 is −5 v. When transistor 46 is conducting the potential at the collector electrode thereof is sufficiently negative to provide forward bias for transistor 55, which thereupon conducts. When transistor 55 conducts, the potential at output terminal 59 is approximately +5 v. The combination of silicon diode 57 and germanium diode 60 prevents transistor 55 from saturating, thus insuring more rapid cutoff of transistor 55 when transistor 46 is cutoff.

An approximate waveshape of the output signal from terminal 59 is illustrated in the waveform immediately below output terminal 59.

*Clock pulse driver*

Figure 6:
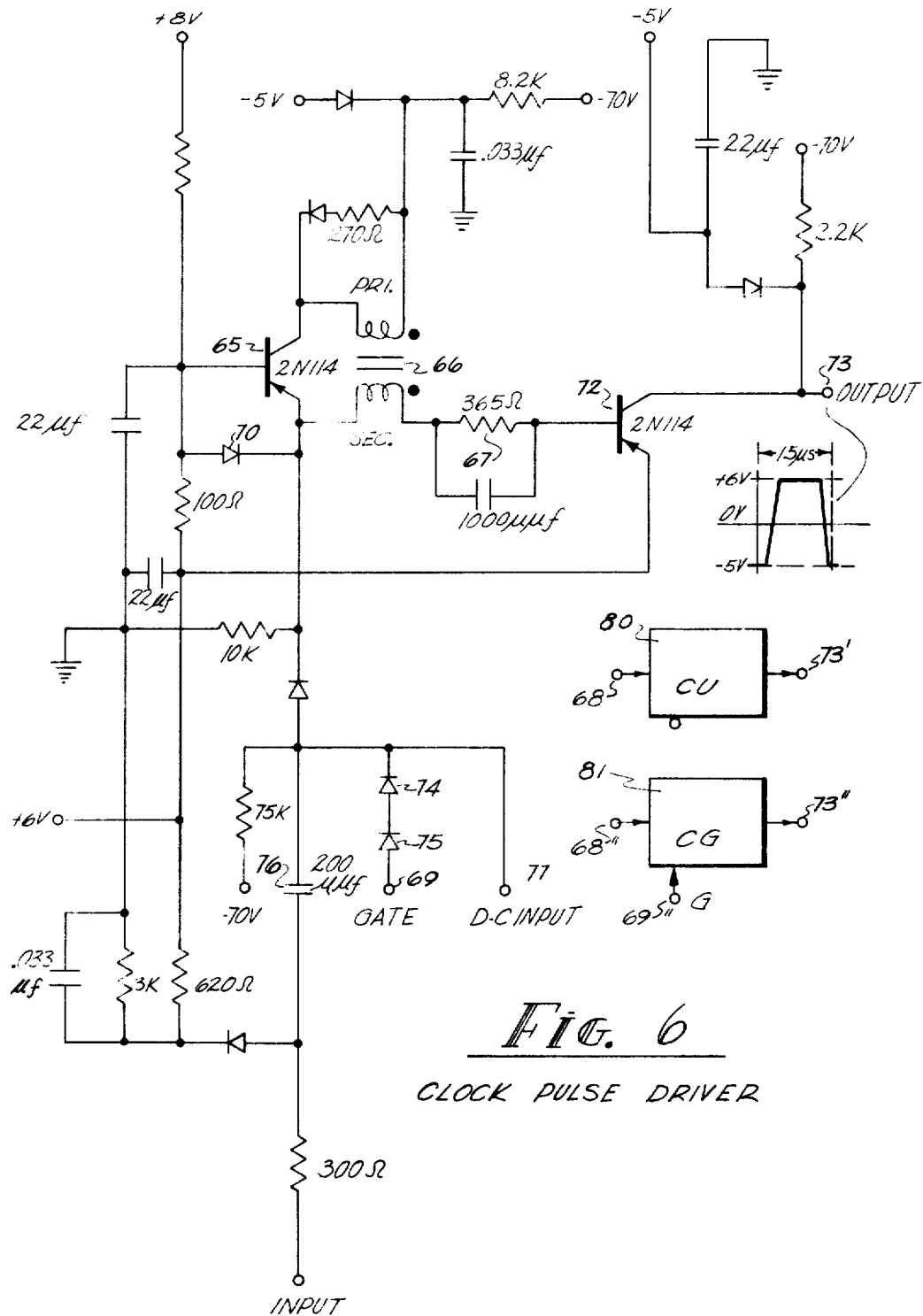
FIG. 6 is a clock pulse driver circuit suitable for use the system of the present invention.

The clock pulse driver of FIG. 6 provides clock pulse signals to drive other clock pulse drivers or for direct application to flip-flops and one-shots to control respectively the entry of data into flip-flops and the firing of one-shots. The clock pulse driver responds to positive trigger signals supplied by a clock pulse generator to generate corresponding clock pulses. The clock pulse driver may be gated to provide single clock pulses or clock pulses at the 250 kc. rate. When gated on, the clock pulse driver generates a clock pulse for each trigger signal received, but when gated off, no clock pulses are generated.

The clock pulse driver is basically a triggered blocking oscillator with output amplifier. A transistor 65, a transformer 66, a transistor 67, and associated biasing and power supply circuits, shown in FIG. 16, comprise the blocking oscillator portion of the clock pulse driver. A trigger signal supplied by the clock pulse generator is received at input terminal 68 and triggers the blocking oscillator to produce an output clock pulse. The trigger signal is only effective to trigger the blocking oscillator if the oscillator is not gated off by a negative voltage applied to gate terminal 69.

In the quiescent state, the base electrode of transistor 65 is at approximately +6.7 v., and transistor 65 is non-conducting due to the reverse bias applied thereto by the conduction of diode 70. The input trigger signals of the clock pulse generator have a peak-to-peak swing from −5 v. to +5 v., or a total excursion of about 10 v. When the gate input terminal 69 is enabled, a +6 v. signal is applied thereto. At this time the input trigger signal has sufficient amplitude to overcome the reverse bias applied to transistor 65.

The input trigger signal initates the flow of a small emitter current in transistor 65. This, in turn, causes the flow of a small collector current through the primary winding of transformer 66. This increase in collector current in the primary winding of transformer 66 induces a voltage in the secondary winding thereof in a direction to apply a positive voltage to the emitter electrode of transistor 65. This induced voltage causes the emitter electrode to conduct more heavily. Thus, the circuit is highly regenerative and will quickly drive the transistor into saturation, wherein the impedance of the transistor between electrodes is substantially zero, and the entire applied voltage is developed across the transformer primary winding. The resulting large voltage developed across the secondary winding of transformer 66 saturates transistor 72 of the output amplifier, so that only resistor 67 limits the flow of emitter current in transistor 65. Since the total applied voltage appears across the primary winding of transformer 66, the collector current of transistor 65 rises linearly toward the maximum allowable value of collector current, as determined by the emitter current. The time for this current to rise to the maximum value is determined by the inductance of transformer 66.

When the collector current of transistor 65 reaches its maximum value, the resulting voltage induced in the transformer terminates. Another regenerative action takes place and the transistor cuts off rapidly.

When transistor 65 is conducting, transistor 72 conducts, and the clock pulse driver output signal, at terminal 73, is at approximately +6 v. When transistor 65 is non-conducting, transistor 72 is non-conducting, and the output signal from the clock pulse driver is clamped at −5 v. The clock pulse provided at terminal 73 is illustrated immediately below terminal 73.

When the clock pulse driver is gated off, by application of a −5 v. signal to terminal 69, a voltage drop of approximately 1 volt occurs across diodes 74 and 75. Thus, −4 v. is provided at the corresponding terminal of capacitor 76. The receipt of the input trigger signal, with swing of +10 v., will drive the emitter electrode of transistor 65 to only +6 v. Inasmuch as the base electrode of transistor 65 is at +6.7 v., the transistor will not conduct and a clock pulse will not be delivered. Therefore, only when the clock pulse driver is enabled by the application of an appropriate gating signal thereto, will output clock signals be provided thereby.

If the clock pulse driver is to operate continuously and to provide an output clock pulse at a continuous 250 kc. rate, a +6 v. D.-C. bias is applied to input terminal 77.

Two symbols, shown in FIG. 6 are employed to represent the clock pulse driver. Symbol 80 represents a continuous clock pulse driver. Input trigger signals are received from a clock pulse generator by the input lead 78 on the left-hand side of the block. A positive 6 volt level is applied to the input lead 79. Output clock pulses are delivered continuously from the output lead on the right-hand side of the block. The symbol 81 represents a gated clock pulse driver. Input trigger signals are received by the upper lefthand input lead, and gated output clock pulses are delivered at the right-hand output lead. The gating signal is applied to the terminal "G" at the bottom of the symbol. The G terminal represents the gate input terminal 69 of the clock pulse driver. So long as the gating signal is at the −5 v. level no output clock pulses are delivered from the right-hand lead. When the gating signal is increased to +6 v., the clock pulse driver delivers a clock pulse for every input trigger signal received.

*Flip-flops*

Figure 7:
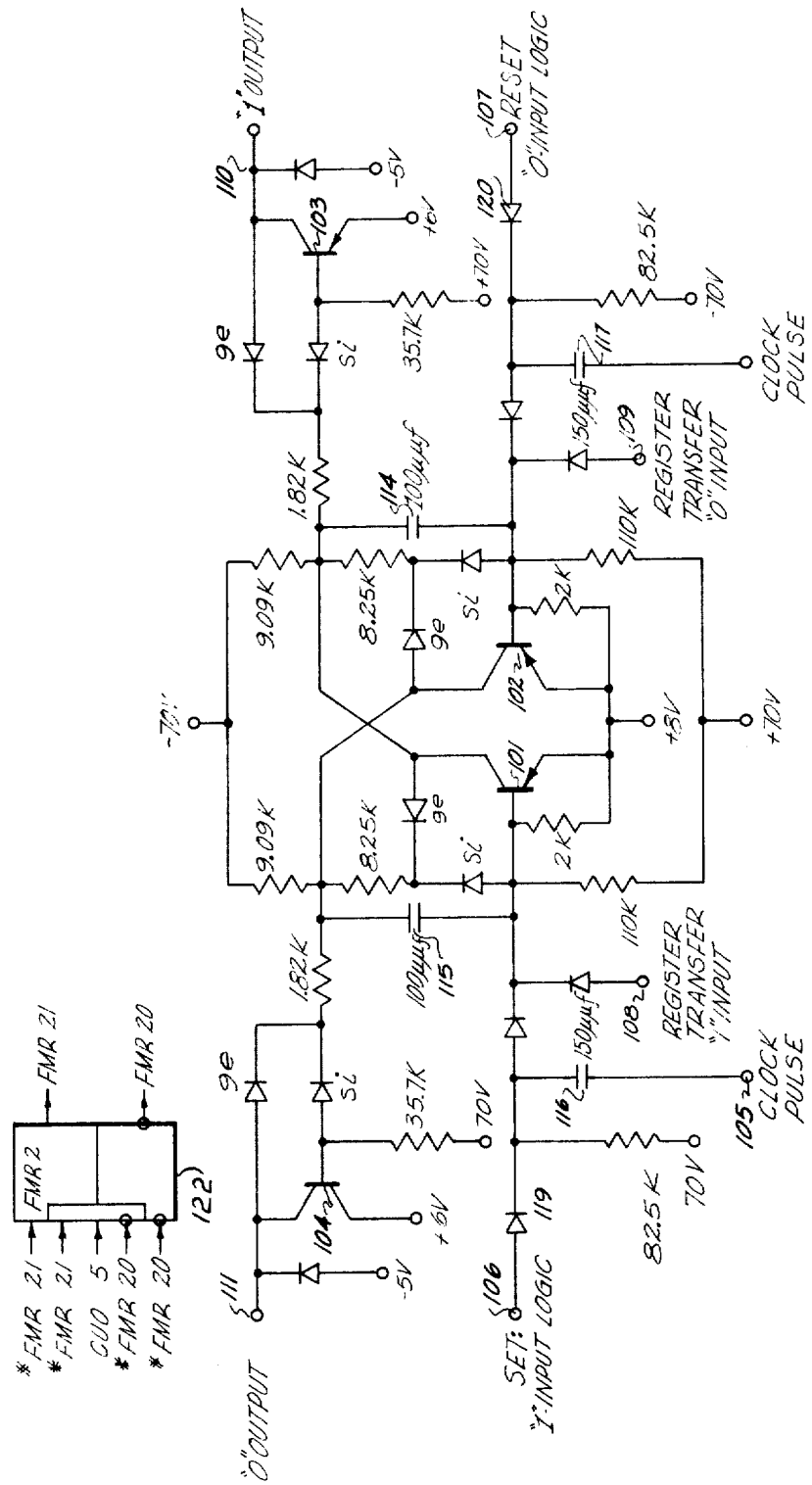
FIG. 7 illustrates a flip-flop circuit suitable for use in the system of the present invention.

The flip-flop of FIG. 7 provides temporary storage of a data word bit or provides temporary storage of a control signal.

The flip-flop is a circuit adapted to operate in either one of two stable states, and to transfer from the state in which it is operating to the other stable state upon application of a trigger signal thereto. In one state of operation the flip-flop represents the binary 1 (1-state) and in the other state the binary 0 (0-state). The flip-flop circuit includes a pair of collector-coupled transistor amplifiers, comprising the respective transistors 101, 102. The coupled transistor amplifier pair is connected to a pair of grounded-emitter transistor output amplifiers, the output signals thereof representing respectively the binary numbers 1 and 0, according to the stable state in which the flip-flop is operating. The two output amplifiers are designated respectively the 1-output amplifier and the 0-output amplifier, and comprise the respective transistors 103 and 104.

The flip-flop is adapted to receive three input signals; as follows:

(a) A clock pulse signal, received at input terminals 105 and 105′, and supplied by a clock pulse driver, (b) An input logical signal for triggering the flip-flop to its 1-state, received at input terminal 106, and usually supplied by a logic gate, (c) An input logic signal for triggering the flip-flop to its 0-state, received at input terminal 107, and usually supplied by a logical gate.

A flip-flop output signal representing the 1-state of the flip-flop is delivered at output terminal 110 and an output signal representing the 0-state of the flip-flop is delivered at output terminal 111.

The operation of the flip-flop will now be described. In both of the stable states of the flip-flop one of transistors 101 and 102 is conducting and the other is non-conducting. Assume that transistor 101 is conducting and transistor 102 is not conducting. When transistor 101 conducts, its collector electrode voltage is approximately at +8 v. This voltage, when coupled to the base electrode of transistor 102 causes the potential thereof to be approximately +8.3 v. and maintains transistor 102 in its non-conducting state. The flip-flop will continue in this state until application of a positive voltage greater than +8 v. to the base electrode of transistor 101. Transistor 101 will momentarily cease conducting. When transistor 101 ceases conducting, the collector electrode potential thereof becomes momentarily more negative. This negative change is coupled through capacitor 114 to the base electrode of transistor 102, which will then commence conducting. The collector electrode potential of transistor 102 will begin rising, and this potential rise will be coupled by a capacitor 115 to the base electrode of transistor 101. The positive-going voltage coupled to the base electrode of transistor 101 tends to further decrease its tendency to conduct. This regenerative action continues until transistor 102 is fully conducting and transistor 101 is non-conducting. At this time the flip-flop has transferred from the state in which it was operating to the other stable state.

When transistor 101 is conducting and transistor 102 is non-conducting the flip-flop is in its defined 0-state, and when transistor 102 is conducting and transistor 101 is non-conducting, the flip-flop is in its 1-state. Thus, the state of operation of the flip-flop represents a binary digit.

When the flip-flop is in its 0-state, the +8 v. of the collector electrode of transistor 101 is coupled to transistor 103 and maintains transistor 103 in a state of non-conduction. The signal provided at output terminal 110 at this time is at the −5 v. level. Inasmuch as the system logical elements and flip-flops respond to positive signals of approximately +6 v. the −5 v. delivered at output terminal 110 denotes a binary 0. Similarly, when transistor 110 is conducting, a negative voltage is coupled to transistor 104 so that transistor 104 conducts and delivers a +6 v. signal at output terminal 111. The elements of the system are adapted to respond to the +6 v. signal, and it is, therefore, denoted as a binary 1. Therefore, when the flip-flop is in the 0-state, a 0-output signal is provided by the 1-output terminal and a 1-output signal is provided by the 0-output terminal. Thus, system elements adapted to respond to the flip-flop 0-state will be enabled by the +6 v. signal delivered at terminal 111, whereas elements adapted to respond to the flip-flop 1-state will be disabled by the −5 v. signal delivered at terminal 110.

Conversely, when transistor 102 is conducting, so that the flip-flop is in its 1-state, a +6 v. signal, representing a binary 1, is supplied at terminal 110 and a −5 v. signal representing a binary 0, is supplied at terminal 111. Thus, the designation of output terminal 110 as a 1-output terminal indicates that when the flip-flop is in its 1-state, a binary 1-output signal is provided therefrom. The designation of terminal 111 as a 0-output terminal indicates that when the flip-flop is in its 0-state, a binary 1-output signal is provided therefrom.

Consider now the input signals which will trigger the flip-flop; that is, those signals which will transfer the flip-flop from the state in which is is operating to its other stable state. The signals applied to terminals 106 and 107 result from the logical combination of other data-representing signals. When a logical combination represents a binary 0, the resulting logic signal is approximately −5 v. When a logical combination represents a binary 1, the resulting logic signal is approximately +6 v. Inasmuch as +8 v. is applied to the emitter electrode of the one of the transistors 101 and 102 that is non-conducting, neither a 0-logic signal nor a 1-logic signal is adequate, alone, to trigger the flip-flop when applied to terminal 106 or 107.

The input logic signals applied to terminals 106 and 107 are coupled to the respective capacitors 116 and 117 and charge the corresponding capacitors to the logic voltage level. When a clock pulse is applied to terminals 105 and 105′, the terminals will experience a positive voltage swing of approximately +11 v., as described in the previous section on the clock pulse driver. If a 1-logic signal is present at terminal 106 or terminal 107, the clock pulse signal is superposed thereon and momentarily drives the corresponding base electrode of transistors 101 and 102 to +17 v., a voltage sufficient to momentarily cause the transistor to stop conduction, if it is conducting, and, therefore, to change the state of the flip-flop. However, any one of the terminals 106 and 107 which is receiving a 0-logic signal when the clock pulse occurs will cause a signal of but +6 v. to be applied to the base electrode of the corresponding flip-flop transistors, a signal insufficient to change the state of the flip-flop. This type of flip-flop triggering is known as clock pulse pedestal triggering and enables the flip-flops of the system to change their state in synchronism with the clock pulses. Between clock pulses, which occur no more frequently than every four microseconds, there is adequate time for the logic elements of the system to change their state and for the resulting logical combination signals to stablize at the logic input terminals 106 and 107 of all flip-flops. Then when clock pulses are applied to any one of the flip-flops, the input logic signal levels will determine whether the flip-flop changes state. Since clock pulses are applied to both sides of the flip-flop simultaneously, only one of the logic inputs to the flip-flop is ordinarily permitted to be in the 1-state at any given time. If both logic inputs are in the 1-state, the clock pulse would attempt to turn off both transistors simultaneously and the flip-flop would not change its state. If both logic inputs are in the 0-state, the flip-flop does not change.

The diodes 119 and 120 isolate the input logic signal source from the flip-flop when the clock pulse occurs. The combination of the silicon and germanium diodes coupled to transistors 101 and 102 prevent saturation and are similar to those described for the clock pulse generator.

Flip-flops are identified in accordance with the function they perform. For example, a typical flip-flop employed for storing information is identified as the FMR2 flip-flop. The F designation stands for "Flip-flop," the MR stands for "Memory Register," and the 2 indicates the second flip-flop of that register. The flip-flop of FIG. 7 is identified as the FMR2 flip-flop, and its input and output terminals are identified with the corresponding input and output signals of the FMR2 flip-flop.

The symbol 122, shown in FIG. 7, is employed to represent a flip-flop. The symbol 122 in this instance, represents the FMR2 flip-flop.

The FMR2 flip-flop is employed to temporarily store one bit of the contents of the memory register. The five leads entering the left-hand side of the flip-flop symbol represent the five input terminals. The two upper input leads receive the 1-input signals and the two lower leads receive the 0-input signals. The central input lead receives the clock pulse signal.

The symbol indicates that the FMR2 flip-flop receives the clock signals of the CU05 clock pulse driver. The first and fifth input leads to symbol 122 represent the respective register transfer input terminals 108 and 109. The #FMR21 opposite the first input lead, identifies the register transfer signal adapted to trigger the FMR2 flip-flop to the 1-state. Correspondingly, the notation #FMR20 opposite the fifth lead identifies the register transfer signal adapted to trigger the FMR2 flip-flop to the 0-state. Similarly, the *FMR21 and *FMR20 identify the logic input signals adapted to trigger the FMR2 flip-flop to the respective 1 and 0-states. However, although the *FMR21 or the *FMR20 signal may represent a binary 1, it will not change the state of the flip-flop until the clock pulse driver CU05 supplies a clock pulse. If only register transfer signals are applied to a flip-flop, no clock pulse driver is connected thereto, and no input lead will be placed opposite the clock pulse input terminal of the flip-flop.

The two leads leaving the right-hand side of symbol 122 represent the two output terminals. The upper output lead delivers the 1-output signal of the flip-flop and the lower output lead delivers the 0-output signal. The notations FMR21 and FMR20 identify the respective 1 and 0-output signals of the FMR2 flip-flop. Thus, the notation FMR2 has the dual function of identifying the FMR2 flip-flop and of identifying the 1-output signal thereof.

In the ensuing system description, a flip-flop in its 1-state is also said to be in the "set" state or in the "on" state. Conversely, a flip-flop in its 0-state is also said to be in the "reset" state or in the "off" state. When a flip-flop is transferred to its 1-state it is often said to be "set" or turned "on." Conversely, when a flip-flop is transferred to its 0-state, it may said to be "reset" or to be turned "off."

*AND-gate*

Figure 8:
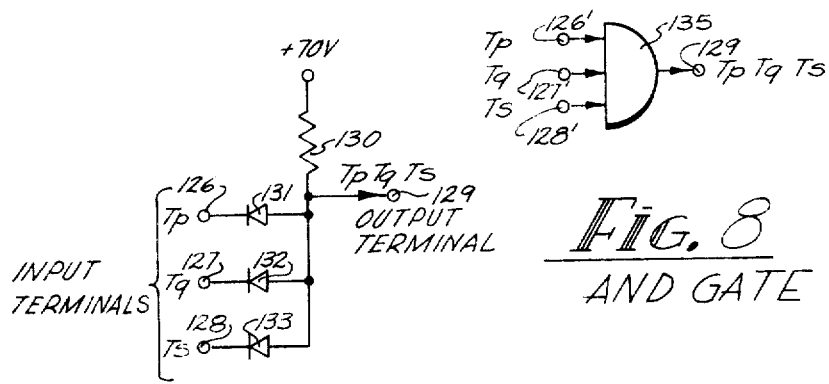
FIG. 8 illustrates an AND circuit suitable for use in in the system of the present invention.

The AND-gate of FIG. 8 provides the logical operation of Conjunction for positive input signals applied thereto. In the system a binary 1 is represented by a signal of approximately +6 v. Therefore, the AND-gate provides an output signal of approximately +6 v., representing a binary 1, only when all of the input signals applied thereto represent binary 1's.

The AND-gate of FIG. 8 is illustrated, by way of example, as having three input terminals 126, 127 and 128, and a single output terminal 129. The AND-gates employed in the system are not limited to three input terminals, but may have from two input terminals to the maximum number necessary for the required Conjunctive operation.

A logic input signal applied to an input terminal of the AND-gate represents either a binary 0 or a binary 1, and is provided as a corresponding signal of −5 v. or +6 v. Current flows from a positive voltage source through resistor 130 and the diodes 131, 132 and 133 to respective terminals 126, 127 and 128. If any one of the input signals is at the −5 v. level, the corresponding diode will conduct and all other diodes of the AND-gate receiving +6 v. input signals will be back-biased and will not conduct. In such instance, the output signal from terminal 129 will be at −5 v. and represent a binary 0. Therefore, only when all input signals are at the +6 v. level will the output signal be at the +6 v. level.

The symbol 135, shown in FIG. 8, is employed to represent the AND-gate. Symbol 135 represents an AND-gate having three input terminals. The three input signals to the particular AND-gate shown are respectively denoted T$p$, T$q$ and T$s$. Therefore, the output signal is denoted T$p$ T$q$ T$s$.

The expression T$p$ T$q$ T$s$ is the logic expression for the Conjunctive, or AND, combination of the individual signals T$p$, T$q$ and T$s$. This form of expression is used in logical equations, which are also known as Boolean equations, to be employed hereinafter. The Conjunctive operation on any two signals, such as the T$p$ and T$q$ signals, is indicated by writing the two signal terms adjacent each other with no operator notation therebetween, or with the operator notation (·) between the two terms; as follows; T$p$·T$q$. This expression is read as "T$p$ AND T$q$."

*OR-gate*

Figure 9:
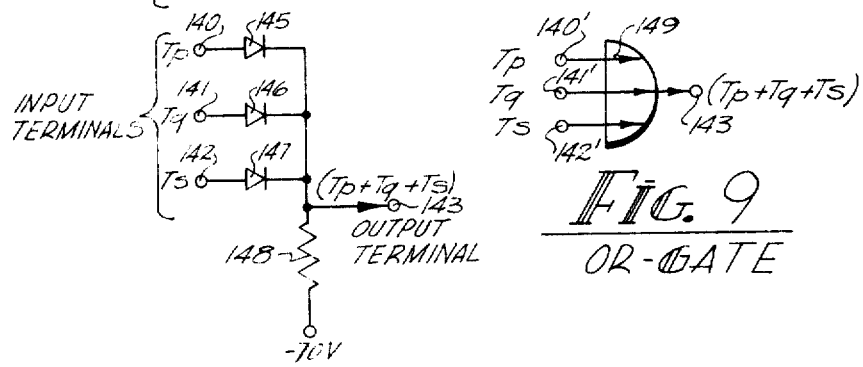
FIG. 9 illustrates an OR circuit suitable for use in the system of the present invention.

The OR-gate of FIG. 9 provides the logical operation of Inclusive-Or for positive input signals applied thereto. The OR-gate provides an output signal of approximately +6 v., representing a binary 1, when any one or more of the input signals applied thereto represent binary 1's.

The OR-gate of FIG. 9 is illustrated, by way of example, as having three input terminals 140, 141 and 142 and a single output terminal 143. The OR-gates employed in the system are not limited to three input terminals, but may have from two input terminals to the maximum number necessary for the required Inclusive-Or operation. A logic input signal applied to an input terminal of the OR-gate represents either a binary 0 or a binary 1, and is provided as a corresponding signal of −5 v. or +6 v. Current flows from the input terminals through the diodes 145, 146 and 147, and resistor 148 to a negative voltage source. If any one of the input signals is at the +6 v. level, the corresponding diode will conduct and all other diodes of the OR-gate receiving −5 v. input signals will be back-biased and will not conduct. In such instance, the output signal from terminal 143 will be at +6 v. and will represent a binary 1. Therefore, when any one or more of the input signals are at the +6 v. level the output signal will be at the +6 v. level.

The symbol 149, shown in FIG. 9, is employed to represent the OR-gate. Symbol 149 represents an OR-gate having three input terminals. The three input signals to the particular OR-gate shown are respectively denoted $Tp$, $Tq$ and $Ts$. Therefore, the output signal is denoted $Tp+Tq+Ts$.

The expression $Tp+Tq+Ts$ is the logic expression for the Inclusive-Or; or OR, combination of the individual signals $Tp$, $Tq$ and $Ts$. This form of expression is used in the logical equations to be employed hereinafter. The Inclusive-Or operation on any two signals, such as the $Tp$ and $Tq$ signals, is indicated by writing the two signal terms adjacent each other with the (+) operator notation therebetween; as follows: $Tp+Tq$. This expression is read as "$Tp$ OR $Tq$."

*Inverter*

Figure 10:
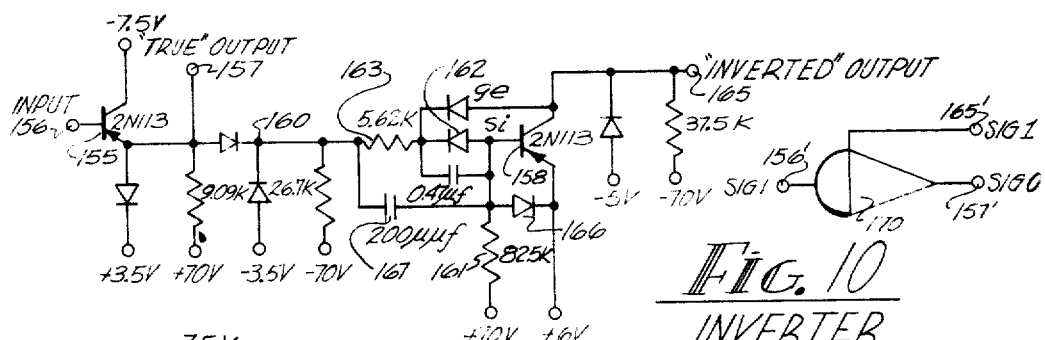
FIG. 10 illustrates an inverter circuit suitable for use in the system of the present invention.

The inverter circuit of FIG. 10 provides the logical operation of Inversion, or NOT, for an input signal applied thereto. The inverter is adapted to provide an output signal of approximately +6 v., representing a binary 1, when the input signal received thereby has a −5 v. level, representing a binary 0. Conversely, the inverter provides an output signal representing a binary 0 when the input signal represents a binary 1. The inverter supplies an additional output signal having the same logical significance as the input signal. The inverter circuit of FIG. 10 comprises an emitter follower driving a grounded-emitter amplifier. The emitter follower portion of the inverter comprises a transistor 155 having its output signal level clamped to have a total excursion between the extremes of −3.5 v. and +3.5 v. The input signal is applied at terminal 156. The output signal of the emitter follower is taken from the emitter electrode of transistor 155. This signal is also available at terminal 157 as a true logical representation of the inverter input signal. The output signal of the emitter follower is coupled to the grounded-emitter amplifier comprising transistor 158.

To analyze the operation of the inverter assume, first, that a binary 0 input signal is applied to input terminal 156. With an input signal of −5 v. level applied to the base electrode of transistor 155, the emitter electrode of transistor 155 operates approximately at the −5 v. level. However, junction point 160 is clamped to a −3.5 v. At this time current flows from the positive potential source through resistor 161, diode 162, and resistor 163 to the −3.5 v. junction point 160. The value of voltage at the base electrode of transistor 158 is below the value of +6 v., so that transistor 158 conducts and supplies a +6 v. output signal at output terminal 165. Thus, the inverter delivers an output signal representing a binary 1 when the input signal thereto represents a binary 0.

Assume, now, that the input signal represents a binary 1. The application of a +6 v. signal to the base electrode of transistor 155 causes transistor 155 to cease conducting and establishes junction point 160 at the +3.5 v. level. The value of voltage at the base electrode of transistor 158 tends to go above +6 v., so that current flows through diode 166 and cuts off transistor 158. At this time the output signal at terminal 165 is at the −5 v. level. Thus, a binary 1 input signal to the inverter provides a binary 0 output signal from terminal 165.

Capacitor 167 functions to speed the response of the inverter when the inverter input signal level changes from −5 v. to +6 v. Capacitor 168 prevents bypassing of diode 162, and thereby prevents saturation of transistor 158.

The symbol 170, shown in FIG. 10, is employed to represent the inverter. By way of example, the input signal to the inverter is denoted as the Sig 1 signal. The logically inverted output signal provided at terminal 165 of the inverter is designated as Sig 0. The output signal provided from terminal 157 is not logically inverted and is represented by the legend Sig 1.

*Emitter follower*

Figure 11:
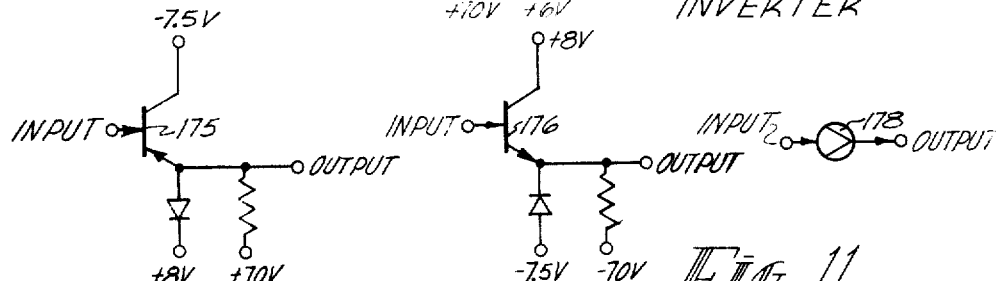
FIG. 11 illustrates an emitter-follower circuit suitable for use in the system of the present invention.

The emitter follower of FIG. 11 is employed in many parts of the logic networks of the system. The primary function of the emitter follower is to supply the input current requirements of a large chain of logical gates, which a flip-flop would be unable to directly drive.

The emitter follower provides an output signal having the same logical sense as the input signal. That is, the emitter follower delivers a binary 1 output signal when the input represents a binary 1, and vice versa. Two types of emitter followers are shown in Fig. 11. The first type, comprising the PNP transistor 175, is identified as a PNP emitter follower. The second type, comprising the NPN transistor 176, is identified as an NPN emitter follower. Generally, the PNP emitter follower drives an AND-gate and the NPN emitter follower drives an OR-gate.

The symbol 178, shown in FIG. 11, is employed to represent the emitter follower. The output signal of the emitter follower bears the same indentification as the input signal applied thereto.

*Register transfer*

Figure 12:
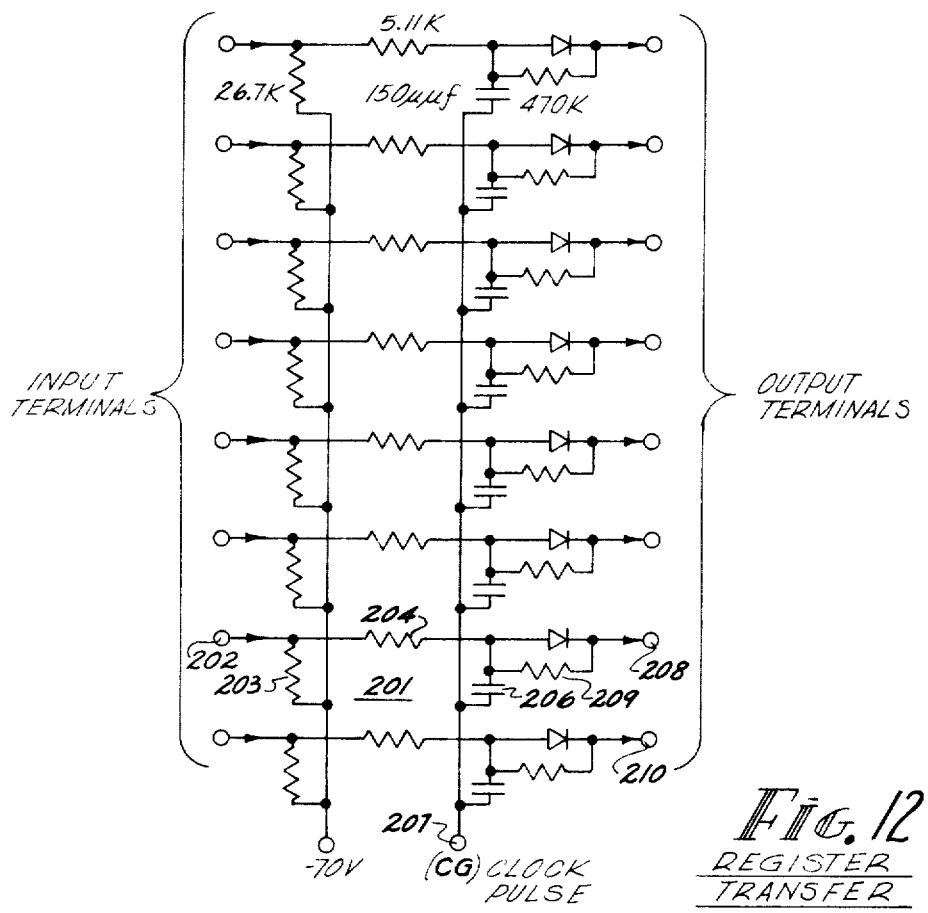
FIGS. 12 and 13 illustrate register transfer circuits suitable for use in the system of the present invention.

The register transfer shown in FIG. 12 provides for the direct transfer of data between a pair of flip-flops, under control of a gated clock pulse driver. Normally, if a first flip-flop (which may be termed a data-receiving flip-flop) is adapted to receive the data bit stored in a second flip-flop (which may be termed a data-transmitting flip-flop), the register transfer input terminals of the first flip-flop are connected through respective register transfers to the corresponding output terminals of the second flip-flop.

Figure 13:
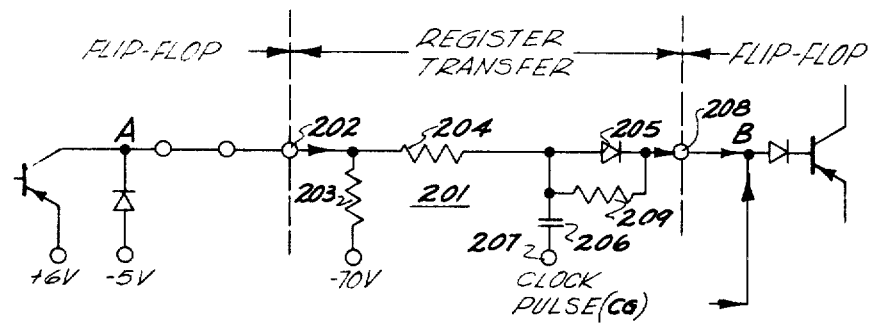

The register transfer circuit of FIG. 12 comprises eight register transfers and is adapted to transfer the contents of four data-transmitting flip-flops, storing a full data digit, to four data-receiving flip-flops, also adapted to store a full data digit. A register transfer circuit is connected between the 1-output terminal of each data-transmitting flip-flop and the register transfer 1-input terminal of the corresponding data-receiving flip-flop. A register transfer is also connected between the 0-output terminal of each data-transmitting flip-flop and the register transfer 0-input terminal of the corresponding data-receiving flip-flop. FIG. 13 illustrates the connection of a register transfer between an output terminal of a data-transmitting flip-flop and the corresponding register transfer input terminal of a data-receiving flip-flop.

The operation of a typical register transfer 201 of FIG. 12 will now be described. Register transfer 201, which is also shown in FIG. 13, is connected between the 1-output terminal of the flip-flop and the register transfer 1-input terminal of the B flip-flop. The A flip-flop 1-output terminal is connected to input terminal 202 of the register transfer circuit. Terminal 202 is connected to one end of resistors 203 and 204. The other end of resistor 203 is connected to a source of minus voltage. Resistor 203 provides collector resistance for the data-transmitting flip-flop output amplifier. Thus, the potential applied to input terminal 202 will be +6 v., when a binary 1 is applied thereto, and −5 v. when a binary 0 is applied thereto. This input signal is transferred through resistor 204 and a diode 205 to output terminal 208. A capacitor 206 is connected to the junction of resistor 204 and diode 205, and is adapted to be charged to the logic voltage level provided by the corresponding data-transmitting flip-flop. Generally, the output signal of a gated clock pulse driver is connected to input terminal 207. Output terminal 208 is connected to the corresponding register transfer input terminal of the data-receiving flip-flop. A resistor 209 functions to discharge any stray capacitance connected across the output terminal 208, thereby preventing spurious triggering of the data-receiving flip-flop.

As described in the previous section entitled "Flip-Flop," neither a −5 v. signal nor a +6 v. signal applied to the register transfer input terminal is sufficient to trigger the flip-flop. However, when a clock pulse is superposed on a +6 v. signal, the flip-flop can be triggered. Thus, if a clock pulse is delivered by a gated clock driver CG when a binary 1-input signal is applied to input terminal 202, the superposed +6 v. and clock pulse delivered at terminal 208 will be adequate to trigger the data-receiving flip-flop.

The eight register transfers of FIG. 12 are adapted to transfer the entire contents of the information stored in the data-transmitting flip-flops to the corresponding data-receiving flip-flops upon receipt of a clock signal from a gated clock driver CG. Inasmuch as a triggering output signal from a register transfer output terminal requires the simultaneous presence of a binary 1 from the corresponding data-transmitting flip-flop output terminal and a clock pulse at terminal 207, the register transfer output signal may be considered as representing a Conjunctive operation on the flip-flop input signal and the clock pulse.

The output terminals of one or more register transfers may be connected to a single register transfer input terminal of a flip-flop. In such instance, the one of the register transfers which has a clock pulse applied thereto will transfer the contents of the corresponding data-transmitting flip-flop to the data-receiving flip-flop.

*One-shot*

Figure 14:
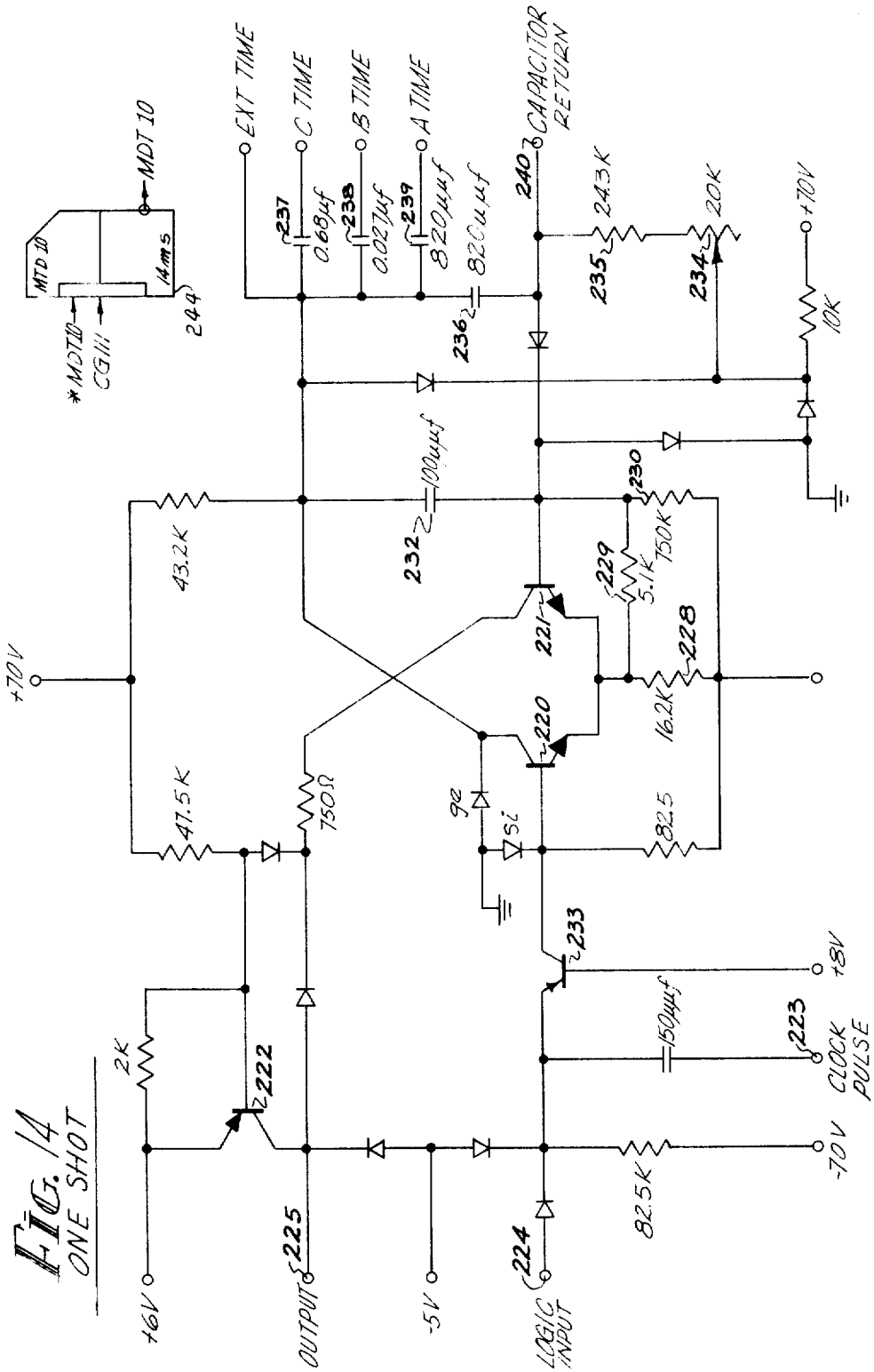
FIG. 14 illustrates a monostable circuit suitable for use in the system of the present invention.

The monostable multivibrator, or one-shot, of FIG. 14 provides an output signal of predetermined duration. The duration of the output signal is usually equal to a non-integral number of clock periods.

The one-shot is a circuit adapted to operate normally in a stable state, but to transfer to an unstable state for a predetermined duration upon application of a trigger signal thereto. In one state of operation the one-shot represents the binary 1 (1-state), and in the other state the binary 0 (0-state). The one-shot circuit includes a pair of coupled transistor amplifiers comprising the respective transistors 220 and 221. The coupled transistor amplifier pair is connected to a grounded-emitter transistor output amplifier, the output signal thereof representing the 0-state of the one-shot. This output amplifier comprises a transistor 222.

The one-shot is adapted to receive two input signals; as follows: (*a*) a clock pulse signal, received at input terminal 223, and supplied by a clock pulse driver, and (*b*) an input logic signal, received at input terminal 224, and usually supplied by a logical gate.

The output signal, representing the 0-state of the one-shot, is delivered at output terminal 225.

The operation of the one-shot will now be described. In the stable state transistor 221 is conducting and transistor 220 is non-conducting. The current flowing through the resistor 228 provides sufficient reverse bias voltage to maintain transistor 220 non-conducting, whereas this bias voltage is divided by resistors 229 and 230 to permit preferential conduction of transistor 221. The base electrode of conducting transistor 221 is approximately at ground, so that the emitter electrodes of transistors 220 and 221 are held negative with respect to ground by only a small voltage. The collector electrode of transistor 221 is also close to 0 v., so that transistor 222 is forward biased and conducts. The conduction of transistor 222 when the one-shot is in the stable state provides an output signal at terminal 225 of +6 v., representing a binary 1.

In the stable state the collector electrode of transistor 220 is approximately at +70 v. Therefore, capacitor 232, which is connected between the collector of transistor 220 and the base of transistor 221, is charged to +70 v.

A transistor 233 serves to isolate transistor 220 from the input terminals of the one-shot. Normally, transistor 233 is non-conducting. The logic input signal applied to terminal 224 is either at the −5 v. level (binary 0) or at the +6 v. level (binary 1). Either level of the logic input signal is insufficient to trigger the one-shot to its unstable state. However, if a clock pulse is applied to terminal 223 when the logic input signal is at its +6 v. level the super-position of the two input signals is sufficient to drive transistor 233 into conduction. This momentary high positive signal, approximately +17 v., is applied to the base electrode of transistor 220, which thereupon commences conduction. When transistor 220 commences to conduct, the collector electrode thereof experiences a sudden potential drop. This potential drop is coupled through capacitor 232 to the base electrode of transistor 221. As the base electrode of transistor 221 swings negatively, the collector current thereof diminishes. The decrease in current flow of transistor 221 reduces the reverse bias applied to transistor 220, which conducts more heavily. Thus, a regenerative action ensues, and transistor 220 is transferred to the conducting state and transistor 221 is rendered non-conducting. Transistor 221 remains cutoff by the high reverse bias applied to its base electrode from capacitor 232.

When transistor 221 is non-conducting, transistor 222 is rendered non-conducting, and the voltage at the output terminal 225 drops to −5 v. Thus, when the one-shot is in its unstable state, its output signal represents a binary 0.

Capacitor 232 now commences to discharge through the path provided. The discharge time of capacitor 232 is determined by the RC-time constant of the circuit loop comprising, basically, capacitor 232, potentiometer 234 and resistor 235. The discharge time is also influenced by the parallel-connected capacitor 236 and any one or more of capacitors 237, 238 and 239, which may be connected to the "capacitor return" terminal 240. The discharge time may also be altered by providing an external capacitor between the "ext time" terminal 241 and terminal 240.

In the unstable state, the emitter electrode of transistor 221 is slightly below ground potential. The base electrode thereof is held below ground in accordance with the voltage across capacitor 232. Therefore, as capacitor 232 discharges, the base electrode of transistor 221 rises toward the potential of the emitter electrode. When the base electrode potential reaches the emitter electrode potential, transistor 221 commences conducting, and the one-shot returns to its stable state, where it remains until it is again triggered.

One-shots are identified in accordance with the function they perform, although all one-shot designations begin with the letter "M." Normally only the 0-output signal is taken from the one-shot. That is, when the one-shot is triggered into its unstable state, the logic signal available at the output terminal of the one-shot represents a binary 0. In its stable state the one-shot output signal represents a binary 1. Thus, in effect, the one-shot output signal turns off when the one-shot is triggered. If desired, another output amplifier may be connected to the collector electrode of transistor 220 to provide an output signal representing the 1-state of the one-shot. Such an amplifier would provide a binary 1 when the one-shot was in its unstable state.

The symbol 244, shown in FIG. 14, is employed to represent the one-shot. Symbol 244, in this instance, represents the MDTI one-shot. The lead entering the left-hand side of symbol 244 represents the logic input terminal. The lead entering the bottom of symbol 244 receives the clock pulse signal. The symbol indicates that the MDTI0 flip-flop receives the clock pulses provided by the CG111 clock pulse driver. The lead leaving the right-hand side of symbol 244 represents the output terminal. The notation MDTI0 identifies the 0-output signal of the MDTI one-shot. The duration of the unstable state of the flip-flop is also included within the symbol. Thus, the unstable state of the MDTI flip-flop is indicated to be 15 milliseconds.

Relay driver

Figure 15:
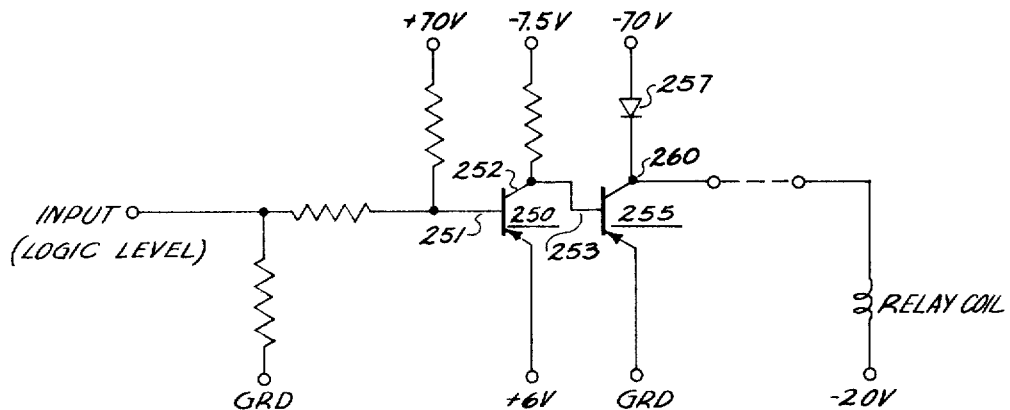
FIG. 15 illustrates a relay driver suitable for use in the system of the present invention.

The relay driver of FIG. 15 provides a suitable signal for operating the actuating coils of various electromagnetic switches throughout the system. The relay driver comprises a first transistor 250 having its collector electrode 252 connected to the base electrode 253 of a second transistor 255. A diode 257 is connected to a negative source of potential and to the collector electrode of the second transistor and is poled so as to be back-biased. The output terminal of the relay driver is connected to one terminal of a relay coil; the other terminal of the relay coil is connected to a voltage source which, in the case chosen for illustration is −20 v.

Under quiescent conditions, transistor 250 is conducting, thus providing a relative positive voltage at the base electrode of transistor 255. This base voltage, positive with respect to the grounded emitter of transistor 255, prevents transistor 255 from conducting and thereby prevents energization of the relay.

The input to the relay driver is applied to the base electrode 251 of the first transistor. The input signal is a logic level signal (+6 v.) which switches the first transistor from a normally conducting state to an off state. When the first transistor ceases conducting, the potential at the collector electrode thereof is lowered; consequently, the potential of the base electrode of the second transistor is also lowered. The decreased potential existing at the base electrode of the second transistor causes it to conduct. When transistor 255 conducts, junction 260, at the collector electrode thereof, is connected to ground through the emitter-collector circuit of transistor 255. The relay coil connected to the output terminal of the relay driver has a negative voltage source (−20 v.) applied to one side thereof, the other side being connected to the output terminal of the relay driver. Thus, when transistor 255 of the relay driver conducts and raises the potential of junction 260 to ground, current will flow through the load. When transistor 255 is subsequently shut off, a negative surge occurs which may cause damage to transistor 255; consequently, diode 257 is provided for clamping the negative voltage at −70 v. to limit the negative voltage surge.

Synchronous timing circuit

Figure 16:
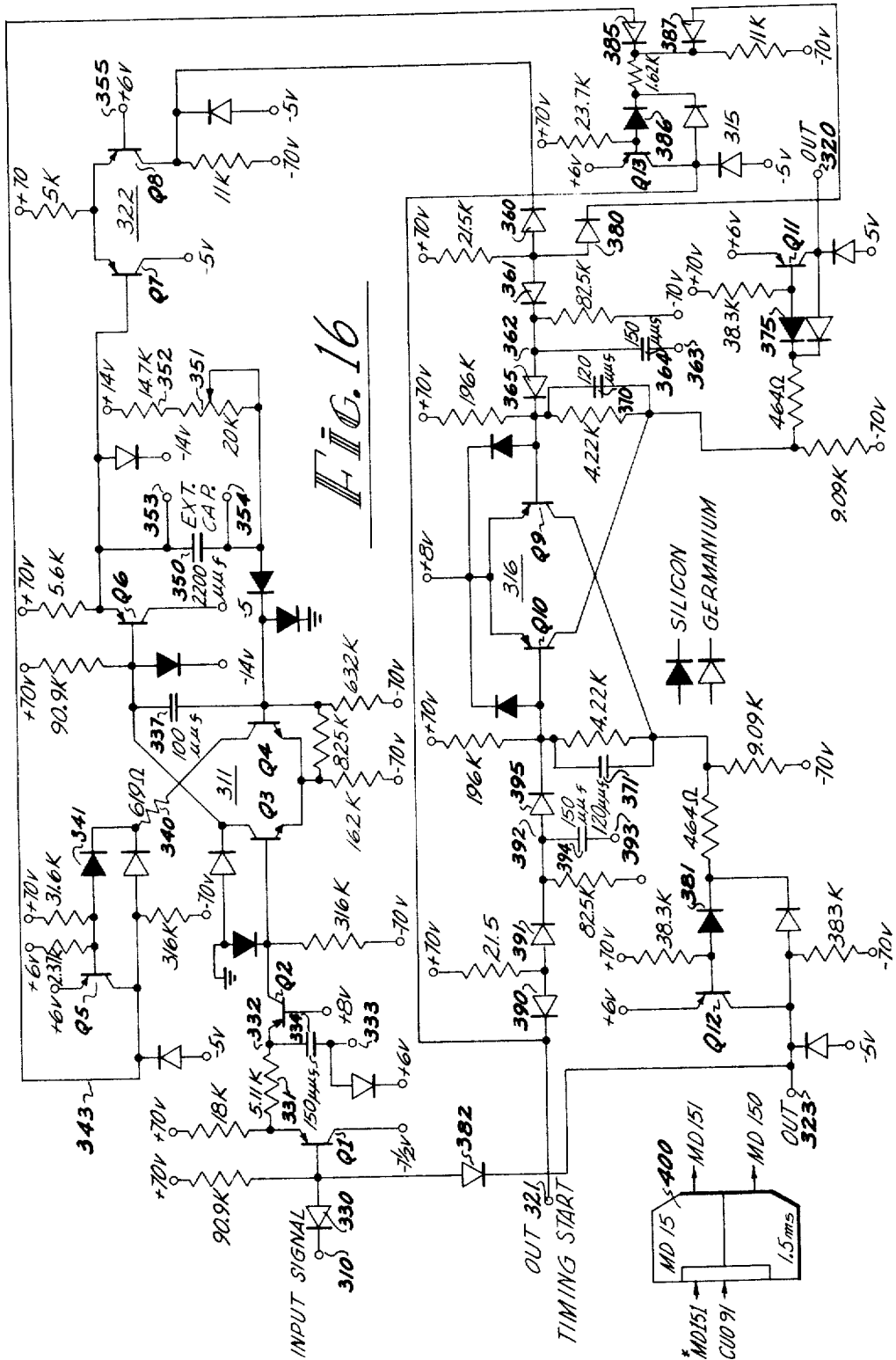
FIG. 16 illustrates a synchronous timing circuit useful in the system of the present invention.

The Synchronous Timing Circuit of FIG. 16 provides a predetermined time delay synchronized with the system clock. Upon application of a triggering pulse, the timing circuit of FIG. 16 provides a timing start signal to indicate the initiation of the timing period, and timing signals which indicate the running of the timing period. The Synchronous Timing Circuit of FIG. 16 is the invention of Norman R. Crain, and is described in greater detail and claimed in application Serial No. 137,405, filed September 11, 1961, and is assigned to the assignee of the present invention.

Referring now to FIG. 16, an embodiment of the present invention will be given. A terminal 310 is provided for receiving input signals to initiate the timing cycle. Input terminal 310 is connected through a diode 330 to transistor Q1. Transistor Q1 provides amplification for the input signal prior to the application of the signal to the primary timing circuit 311. The emitter of transistor Q1 is connected through a suitable resistance 331 to junction 332. A terminal 333 is provided for the receipt of a synchronizing signal from a synchronizing source; the terminal 333 is connected to junction 332 through a coupling capacitor 334. Transistor Q2 is emitter-connected to the junction 332, and provides isolation of the input circuitry from the primary timing circuit 311.

The primary timing circuit 311 comprises a pair of transistors Q3 and Q4 collector-to-base coupled through coupling capacitor 337. The emitters of transistors Q3 and Q4 are connected together and to a suitable source of bias potential. The collector electrode of transistor Q4 is connected, through resistor 340 and diode 341 to the base of a primary timing circuit output transistor Q5. The collector electrode of transistor Q5 is connected to conductor 343 for providing the synchronous timing circuit with a timing signal from the primary timing circuit 311.

The collector electrode of transistor Q3 is connected to the base of a recharging transistor Q6. The transistor Q6 is emitter-follower connected to a RC timing circuit comprising a timing capacitor 350, variable resistor 351, and fixed resistor 352. The value of the RC time constant may be varied by varying the tap position on variable resistor 351 and by adding additional timing capacitors to the external capacitor terminals 353 and 354. The emitter electrode of transistor Q6 is also connected to the base electrode of transistor Q7 of the delay-comparator circuit 322. The delay-comparator circuit 322 includes transistors Q7 and Q8 having their emitters joined together and to a suitable source of bias potential; the base electrode of transistor Q8 is connected to a terminal 355 for receiving a standard potential (shown in FIG. 16 as +6 volts).

The colector electrode of transistor Q8 is connected, through diodes 360 and 361 to junction 362. A terminal 363 is provided for the receipt of a synchronizing signal, and is connected to the junction 362 through a coupling capacitor 364. Junction 362 is connected through a diode 365 to the base electrode of a transistor Q9 of the bistable circuit 316. The bistable circuit 316 includes transistors Q9 and Q10, collector-base connected through coupling capacitors 370 and 371. The emitter electrodes of transistors Q9 and Q10 are joined together and to a suitable source of bias potential. The collector electrode of transistor Q10 is connected through a diode 375 to the base electrode of a transistor Q11. The collector electrode of transistor Q11 is connected to the output terminal 320 to provide a timed output signal. The signal present at the output terminal 320 is fed back through diode 380 to junction 362 at the input to the bistable circuit 316.

The collector electrode of transistor Q9 is connected through diode 381 to the base electrode of transistor Q12. The collector electrode of transistor Q12 is connected to an output terminal 323 to provide a second timed output signal. The output signal present at terminal 323 is fed back through diode 382 to the base electrode of transistor Q1 to inhibit further triggering until the bistable circuit can return to its initial state.

The timing signal present on conductor 343, presented by the primary timing circuit 311, is applied to the base electrode of transistor Q13 through diodes 385 and 386 of gating circuit 315. The output signal existing at terminal 320 is also applied to the gating circuit 315 through diode 387.

The collector electrode of transistor Q13 is connected through diodes 390 and 391 to junction 392. A terminal 393 is provided for the receipt of synchronizing pulses and is coupled to the junction 392 through a coupling capacitor 394. Junction 392 is connected to the base electrode of transistor Q10 through diode 395. The collector electrode of transistor Q13 is also connected to an output terminal 321 to provide a timing start signal.

The description of the operation of the circuit shown in FIG. 16 will now be given. To facilitate the description of the operation of the circuit, it will be assumed that the circuit is initially in the quiescent condition, that is, the synchronous timing circuit has not been trigged into a timing cycle. Under quiescent conditions, the voltage presented at terminal 310 of the synchronous timing circuit is at a —5 volt level, the output signal presented at terminal 323 is at a positive 6 volt level, the output signal provided at terminal 320 is at a negative 5 volt level, and the output signal provided at terminal 321 is at a negative 5 volt level. Since a negative 5 volts exists at the input terminal 310, diode 330 is forward biased, and transistor Q1 conducts. Thus, the potential at junction 332 is insufficient to cause transistor Q2 to conduct; therefore, transistor Q3 is also non-conducting by virtue of the negative bias potential applied to the base electrode thereof. In the quiescent condition, transistor Q4 is conducting, and the emitter-collector current maintains a sufficiently low potential at the base electrode of transistor Q5 to maintain the latter conducting. Since the bias potential at the emitter electrode of transistor Q5 is a positive 6 volts, and since transistor Q5 is conducting, the potential existing on conductor 343 is a positive 6 volts. When transistor Q3 is non-conducting, the cross coupling capacitor 337 is charged to a value just greater than the 14 volt potential by the amount of forward drop developed by the silicon diode. The emitter of Q6 is, at this time, more positive than the 14 volt potential by the amount of forward drop developed by the germanium diode. Thus, the base electrode of transistor Q6 is sufficiently positive to maintain Q6 non-conducting. When transistor Q6 is non-conducting, a charging potential connected to the emitter electrode thereof charges the timing capacitor 350. The charging potential existing across charging capacitor 350 is clamped at a positive 14 volts.

This 14 volt level is applied to the base electrode of transistor Q7. Since transistors Q7 and Q8 are supplied from a common biasing potential to the emitter electrodes thereof, and since the base potential on transistor Q8 is at a standard potential of +6 volts, the 14 volts at the base electrode of transistor Q7 causes transistor Q8 to conduct, thus presenting a positive 6 volt level to diode 360. Since, as has been stated, the output existing at terminal 320 is at a negative 5 volt level, the diode 380 is forward biased to the —5 volt level, and the potential applied to the diode 361 clamps the latter to —5 v.

Transistor Q9 is held in a non-conducting state by the relatively positive voltage applied to the base electrode thereof. Transistor Q10 is conducting, and the positive 8 volt level applied to the emitter electrode thereof is connected through the collector electrode and diode 375 to the base electrode of transistor Q11. Therefore, transistor Q11 is held in the non-conducting state, and the —5 v. clamping voltage applied to collector electrode thereof provides the —5 v. logic level at the output terminal 320. When transistor Q9 is non-conducting, the base electrode of transistor Q12 is sufficiently negative with respect to the emitter electrode thereof that transistor Q12 will conduct. Thus, the positive 6 volt bias supply applied to the emitter electrode of transistor Q12 is transmitted to the output terminal 323 to provide the appropriate logic level.

As stated previously, the voltage existing on conductor 343 is at a positive 6 volt level, and is applied to the gate circuit 315 through diode 385; similarly, the negative 5 volt level existing at terminal 320 is applied to the gating circuit through diode 387. Since diode 385 is clamped to a +6 v. by conductor 343, a relatively positive potential is applied to the diode 386 to cause it to become clamped at +6 v. Thus, the base electrode of transistor Q13 remains at a relatively positive potential with respect to the emitter electrode thereof, and the transistor remains non-conducting. When transistor Q13 is non-conducting, the —5 v. clamping voltage at the collector electrode thereof maintains the bistable circuit 316 in the quiescent state (Q10 conducting, Q9 non-conducting), and provides a —5 v. level to the output terminal 321.

When a positive logic level (+6 v.) is applied at the input terminal 310, diode 330 becomes clamped at +6 v., and since diode 382 is already clamped at +6 v., the potential existing at the emitter electrode of transistor Q1 rises correspondingly, thus causing the potential at junction 332 to rise. However, the increased potential at junction 332 is not enough to cause transistor Q2 to conduct. To cause conduction of transistor Q2, the increased potential at junction 332, caused by the positive 6 volt logic input to terminal 310, is combined with a synchronizing signal applied to terminal 333 and coupled to junction 332 through coupling capacitor 334. The superimposed voltages provided by the conduction of transistor Q1 and the synchronizing voltage applied to terminal 333 are sufficient to cause transistor Q2 to conduct. When transistor Q2 conducts, the base electrode of transistor Q3 rises, and transistor Q3 begins to conduct.

As transistor Q3 begins conduction, the potential at the collector electrode thereof experiences a sudden drop, which is transmitted through the coupling capacitor 337 to the base electrode of transistor Q4. The reduction in the voltage at the base electrode of transistor Q4 reduces the current flowing in the emitter-collector circuit of transistor Q4, providing an additional forward biasing for transistor Q3. The turning on of transistor Q3 and the turning off of transistor Q4 is a regenerative action which causes the conduction to switch from one transistor to the other very rapidly. When transistor Q4 ceases conducting, the base electrode of transistor Q5 rises, and transistor Q5 ceases to conduct; the —5 v. clamping voltage provided to the conductor 343, and the non-conduction of transistor Q5, cause the voltage on conductor 343 to drop from a positive 6 volt level to a —5 v. level. When conductor 343 is at a —5 v. level, diode 386 is no longer clamped at +6 v., and the potential existing at the base electrode of transistor Q13 drops sufficiently to cause conduction in the emitter-collector circuit thereof. Thus, the potential of the collector circuit of transistor Q13 rises to a positive 6 volt level, and this positive 6 volt level is applied to the output terminal 321 to provide a timing start signal.

When the collector circuit of transistor Q13 rises to a positive 6 volt level, diode 390 becomes clamped at +6 v. thus raising the potential at junction 392. The increased potential caused by the conduction of transistor Q13 is superimposed at junction 392 with a synchronizing signal applied at terminal 393 and through coupling capacitor 394. The superimposed voltages are sufficient to raise the potential of the base electrode of transistor Q10 through diode 395 and cause the transistor Q10 to cease conducting. As the transistor Q10 begins to shut off, the negative-going voltage at the collector electrode thereof is transmitted through the coupling capacitor 370 to the base electrode of transistor Q9. This negative going voltage at the base electrode of transistor Q9 rapidly turns transistor Q9 on which, in turn, causes a positive going voltage to be applied to the base electrode of transistor Q10 through coupling capacitor 371. The result of the cross-coupling action causes a rapid turn off of transistor Q10 and rapid turn on of transistor Q9. When transistor Q9 conducts, the positive potential existing at the emitter electrode thereof is applied through the collector electrode to diode 381 to clamp the latter to the collector voltage and cause the potential at the base electrode of transistor Q12 to rise. The increased potential at the base electrode of transistor Q12 causes the latter to turn off, and the voltage existing at output terminal 323 to drop to the clamping voltage level of —5 volts. Simultaneously with the turning off of transistor Q12, the turning off of transistor Q10 causes the base electrode voltage of transistor Q11 to drop, resulting in the turning on of transistor Q11 and the rising of the potential existing at the output terminal 320 to a positive 6 volt level. The positive 6 volts, now existing at output terminal 320 is coupled through diode 387 to diode 386 to clamp the latter to +6 volts and cause the base electrode potential of transistor Q13 to rise. The rise in the base electrode potential causes transistor Q13 to cease conducting, thereby resulting in a drop in potential of the collector electrode thereof from a positive 6 volts to the negative 5 volt clamping level. As the result of the fall in the potential of the collector electrode of transistor Q13, the output voltage existing at terminal 321 returns to the —5 v. level.

When transistor Q3 conducts, the voltage at the base electrode of transistor Q6 drops, and transistor Q6 is turned on. When transistor Q6 is turned on, a discharge path is provided for the timing capacitor 350 (and any external timing capacitors connected between terminals 353 and 354). The discharge path exists through resistors 352 and 351, to one side of the capacitor, and from the other side of the capacitor, through the emitter-collector circuit of transistor Q6 to the —5 v. collector bias potential. The resulting drop in the emitter voltage of transistor Q6, and the corresponding drop in the base electrode voltage of transistor Q7 causes transistor Q7 to begin conduction which, in turn, turns transistor Q8 off. When transistor Q8 is turned off, the collector circuit is clamped to a —5 v. thus lowering the potential of the junction between diodes 360 and 361.

The circuit thus remains in this state until the charging capacitor 350 has been partially discharged, and the primary timing circuit has returned to its stable state. When timing capacitor 350 begins to discharge, the potential existing at the base electrode of transistor Q4 "floats"; that is, while the potential across the timing capacitor decays according to the RC time constant of the discharge circuit, the potential at the base electrode of transistor Q4 drops rapidly to approximately 14 volts below ground. As a consequence, transistor Q4 is maintained in the off condition for the discharge period of the timing capacitor 350. However, as the potential at the base electrode rises, while capacitor 350 discharges, transistor Q4 begins to conduct. The beginning of conduction of transistor Q4 reduces the current flowing in the emitter-collector circuit of transistor Q3; as a result of the reduced current through transistor Q3, the collector voltage thereof rises. As a result of this action, transistor Q3 is turned off and transistor Q4 is turned on. When transistor Q3 turns off, the potential at the collector electrode thereof rises, thus raising the potential at the base electrode of transistor Q6 and turning the latter off. When transistor Q6 turns off, the discharge path for timing capacitor 350 is interrupted, and a charging potential is applied thereto. As the potential on capacitor 350 rises, and the capacitor becomes charged, the base voltage existing at the base electrode of transistor Q7 rises, and when this voltage exceeds approximately 6 volts (the base electrode voltage of transistor Q8), transistor Q7 turns off, and transistor Q8 turns on.

The delay-comparator circuit 322 prevents the triggering of the bistable circuit 316 until the gate 315 is turned off by a negative 5 volt level on conductor 343. The delay comparator 322 thus prevents the gate circuit 315 from generating a second timing start signal when the bistable circuit 316 is returned to the original quiescent state. The delay is caused by the charging time required to charge the timing capacitor to a particular voltage (+6 volts in the case chosen for illustration); since, during the timing period, transistor Q7 is conducting, conduction will not be switched to transistor Q8 until the charging potential on timing capacitor 350 exceeds the positive 6 volts applied to the base electrode of transistor Q8.

As transistor Q4 turns on, and the primary timing circuit 311 assumes its stable state, current flows through diode 341 thus lowering the potential at the base electrode of transistor Q5 and turning the latter on. When transistor Q5 conducts, the collector voltage rises to approximately a positive 6 volts thus raising the voltage on conductor 343 to a positive 6 volt level. Thus, the potential on conductor 343 is at a positive 6 volt level, the voltage at the base electrode of transistor Q13 will rise, and Q13 is maintained in the non-conducting state which, in turn, maintains the voltage at output terminal 321 at a —5 volt level. When transistor Q8 conducts, and raises the potential of its collector electrode circuit to a positive 6 volt level, diode 360 becomes clamped to +6 volts. Since diode 380 is clamped to +6 volts by the positive 6 volt level from the collector electrode circuit of transistor Q11, diode 361 will also become clamped to +6 volts and will cause the potential at junction 362 to rise. The superimposed potential existing at junction 362 (superimposed on a synchronizing signal applied at terminal 363 and coupled to junction 362 through coupling capacitor 364) will sufficiently raise the base electrode of transistor Q9 to cause it to start to turn off. The regenerative action between transistors Q9 and Q10 causes transistor Q9 to turn off and transistor Q10 to turn on. When transistor Q10 turns on, the potential at the base electrode of transistor Q11 rises, and the latter becomes non-conducting; therefore, the voltage presented at the output terminal 320 becomes clamped to the —5 volt logic level. Correspondingly, with the turn off of transistor Q9, the voltage at the base electrode of transistor Q12 is lowered, and transistor Q12 begins conducting. As a result of the conduction of transistor Q12, the output terminal voltage at terminal 323 is raised to a positive 6 volt level.

The symbol 400, shown in FIG. 16, is employed to represent the synchronous timing circuit. The symbol 400, in this instance, represents the MD15 synchronous timing circuit. The upper lead entering the left-hand side of the symbol 400 represents the logic input terminal. The lower lead entering the left-hand side of the symbol 400 represents the clock signal supplied to the synchronous timing circuit. The symbol indicates that the MD15 synchronous circuit receives the clock pulses provided by the CU09 clock pulser driver. The leads leaving the right-hand side of symbol 400 represents the output signals provided by the synchronous circuit. The notation MD151 represents the unstable, or timing, state of the synchronous timing circuit; whereas, the notation MD150 represents the non-timing state of the circuit. The duration of the unstable state of the synchronous timing circuit is also included within the symbol. Thus, the unstable state of the MD15 synchronous circuit is indicated to be 1.5 milliseconds.

GENERAL SYSTEM DESCRIPTION

As described previously, the High Speed Printer Control System of the present invention may be utilized "on-line" or "off-line" with an electronic data processing system. However, because of the speed with which modern data processing systems provide computations and results, it is frequently more advantageous to utilize a magnetic tape unit as a transducing means to receive the information directly from the data processing system. As a result, printing systems are usually supplied from a tape unit rather than from a central processor of a data processing system. Accordingly, the present invention will be described in terms of receiving information from a tape unit rather than from the central processor of a data processing system.

In addition, the system of the present invention may be used with more than one printer mechanism. Provision is made in the instant embodiment for using the High Speed Printer Control System with a single font printer mechanism having 47 Gothic characters rather than the dual font printer mechanism having 44 Gothic and 14 MICR characters. To distinguish between the printer mechanisms, the Printer Control System utilizes two cable signals JRN11 and JRE11. A positive 6 volts and a negative 5 volt conductor are supplied to the printer mechanisms. When the dual font printer mechanism is used, a jumper is placed from the positive 6 volt conductor to the JRE11 cable and from the —5 volt conductor to the JRN11 cable; when the alternative printer mechanism is used, the cable connections are reversed. Thus, an indication is provided to enable the logic circuits of the Control System to determine the specific printer mechanism being controlled. It will be apparent that the Printer Control System of the present invention is readily adaptable to controlling a plurality of printer mechanisms each having a different number of fonts, or a different arrangement of type fonts in the specific printer mechanisms.

Figure 17:
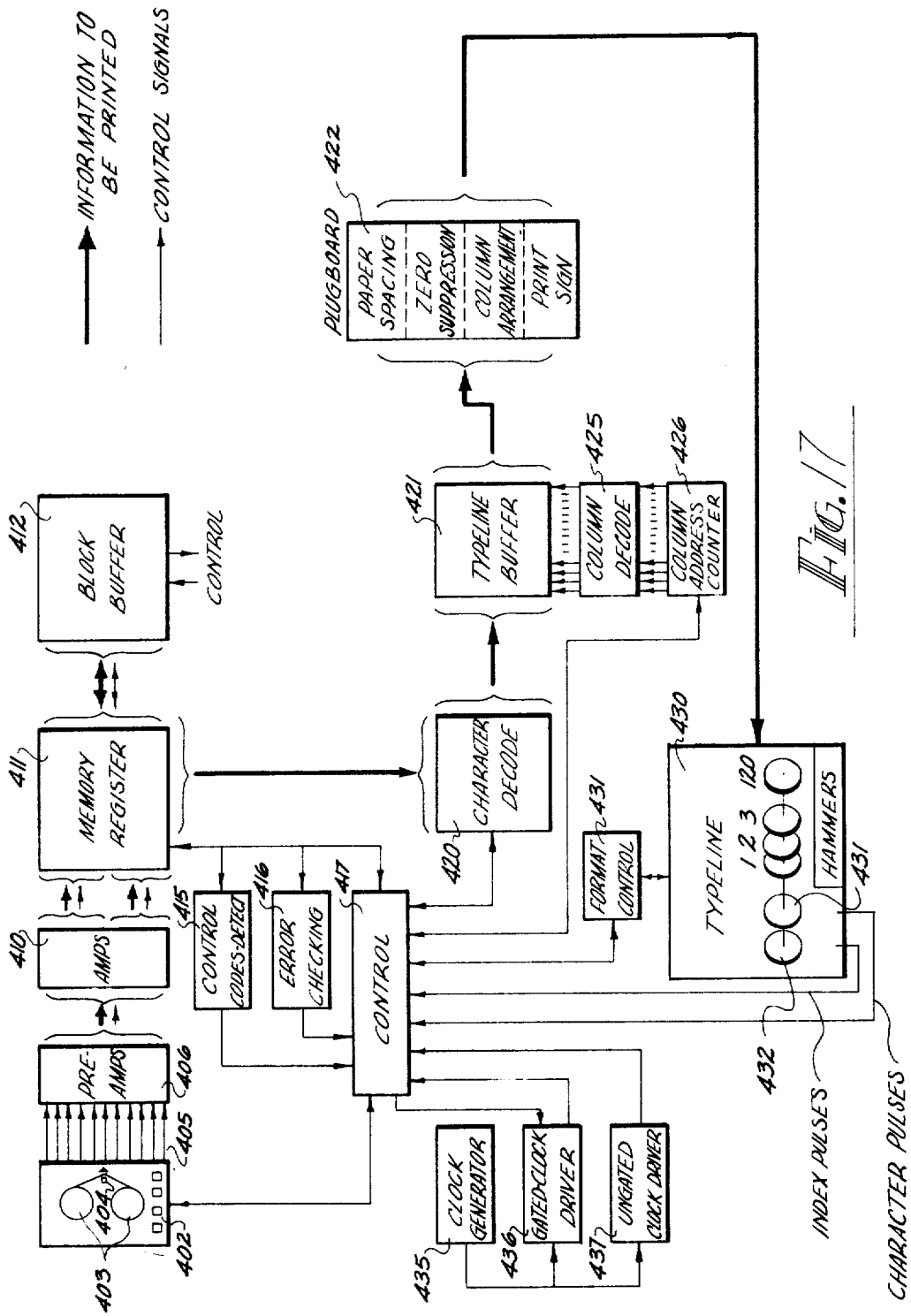
FIG. 17 is a simplified block diagram illustrating the general system organization of the present invention.

A simplified block diagram of a preferred embodiment of a Printer Control System constructed in accordance with the teachings of the present invention is shown in FIG. 17. A magnetic tape unit 402 is shown having reels of magnetic tape 403 containing information stored thereon from a data processing system. The magnetic tape contains information stored thereon in accordance with the tape format described previously. Each of the channels is sensed by a read head indicated generally at 404. The signals thus derived from the magnetic tape are supplied over lines 405 to preamplifiers 406. The preamplifiers are intended to amplify the signal from the magnetic tape and provide a suitably polarized signal of the proper duration for application to an amplifier 410 which, in turn, amplifies each signal to the appropriate logic level for the printer system.

The information thus derived from the magnetic tape, and amplified by preamplifiers 406 and amplifiers 410 represents ten bits forming an alphanumeric character, plus parity or two 4 bit numeric digits, each with an appropriate column parity bit. The track markers are also sensed by the read heads and amplified in preamplifiers 406 and amplifiers 410. The information to be printed (indicated by the heavy lines), and the control signals (light lines) are both supplied from the magnetic tape to the amplifiers for amplification to the appropriate logic levels of the Printer Control System.

The information and the control signals are supplied to a memory register 411 from the amplifiers 410 in two groups of bits. These groups may be two numeric digits or, combined, they may represent an alphanumeric character. The memory register applies the information supplied to it by the amplifiers to several other destinations. The information to be printed and the control signals are supplied to a block buffer 412 for temporary storage. Simultaneously with the transfer of the information to be printed and control signals from the memory register 411 to the block buffer 412, the control signals from the memory register are applied to a control code detect 415, an error checking circuit 416, and a control system 417. The control code detect 415 detects when codes are presented from the memory register pertaining to the operation to be performed on the information being transferred by the memory register 411. For example, if a selected code is to indicate that a particular block of information present on the magnetic tape is to be printed, the control code detect 415 will detect that code and provide an appropriate signal to the control system 417 to indicate the presence of information to be printed.

The error checking circuits 416 provide parity checking and various housekeeping error checking functions to provide a means for detecting errors occurring during information and control signal transfer from the memory register 411. The control system 417 provides the necessary coordination between the various circuits of the Printer Control System, and accepts information regarding errors, codes, clocks, formats, and other signals, and provides logical decision making and subsequently supplies signals for the control of the Printer System.

When the information to be printed and the control signals have been temporarily stored in the block buffer 412, they are subsequently retransferred to the memory register 411 when a control code is detected indicating that the information is to be printed. The signals representing the information to be printed are thus applied to a character decode 420 which provides the code translation between the magnetic tape code and the appropriate code to be utilized to select the character to be printed. The decoded information from the character decode 420 is applied to a typeline buffer 421. The typeline buffer 421 stores the information provided to it from the character decode 420 in appropriate form to be sensed and applied to a printer mechanism. Signals from the typeline buffer 421 are applied to a plugboard 422 which provides interchangeability of character column and permits selection of zero suppression and sign printing as well as column arrangement. The information transferred from the typeline buffer 421 through the plugboard 422 is read from the typeline buffer by applying column read signals from a column decode 425. The column decode is supplied by control signals from a column address counter 426 which, in combination with the common decode, addresses the typeline buffer 421 in a sequential manner to permit the typeline buffer 421 to empty its contents through the plugboard 422 to a typeline 430.

The typeline comprises a plurality of type wheels each having characters to be printed displaced about the periphery thereof. As the signals are applied from the typeline buffer through the plugboard 422 to the typeline 430, appropriate hammers are energized to force the document to be printed against the type wheels to cause the selected character to be printed. To provide for the proper registration of the hammers with the type wheels, character pulses are derived from a character pulse wheel 431 mounted on a common shaft with the type wheels. Further, to provide for synchronization of the type wheels with the typeline buffer, an index pulse is derived from an index wheel 432.

To provide for the overall synchronization of the printing system, a clock generator 435 is provided for supplying clock pulses to the entire system. The clock pulses from the clock generator 435 are applied simultaneously to gated clock drivers 436 and ungated clock drivers 437. The ungated clock drivers 437 supply appropriately amplified clock pulses to the control system 417 from the clock generator 435. The gated clock drivers 436 supply clock pulses to the control system 417 when, and only when, a pulse from the clock generator 435 and a signal from the control system 417 are simultaneously received by the gated clock drivers 436.

Thus, FIG. 17 indicates the overall organization, in simplified block form, of a printer control system constructed in accordance with the teachings of the present invention. To understand the teachings of the present invention, it will be necessary to go into greater detail; accordingly, the block diagram of FIG. 17 will be amplified, and to provide greater clarity, will be divided into three detailed block diagrams. To facilitate the description of the present invention, the system will be described in terms of four functional cycles of operation: first, a Fill cycle wherein information is sensed on a tape and applied to the Printer Control System and stored in a block buffer; second, a Transfer cycle wherein the contents of the block buffer are emptied into other portions of the system and into a typeline buffer; third, a Print cycle wherein the information transferred in the preceding cycle is applied to the printer mechanism to cause printing of the appropriate characters in the selected font; and fourth, the document which is being printed is positioned and moved to the next printing position to provide the appropriate format.

Fill cycle

Figure 18:
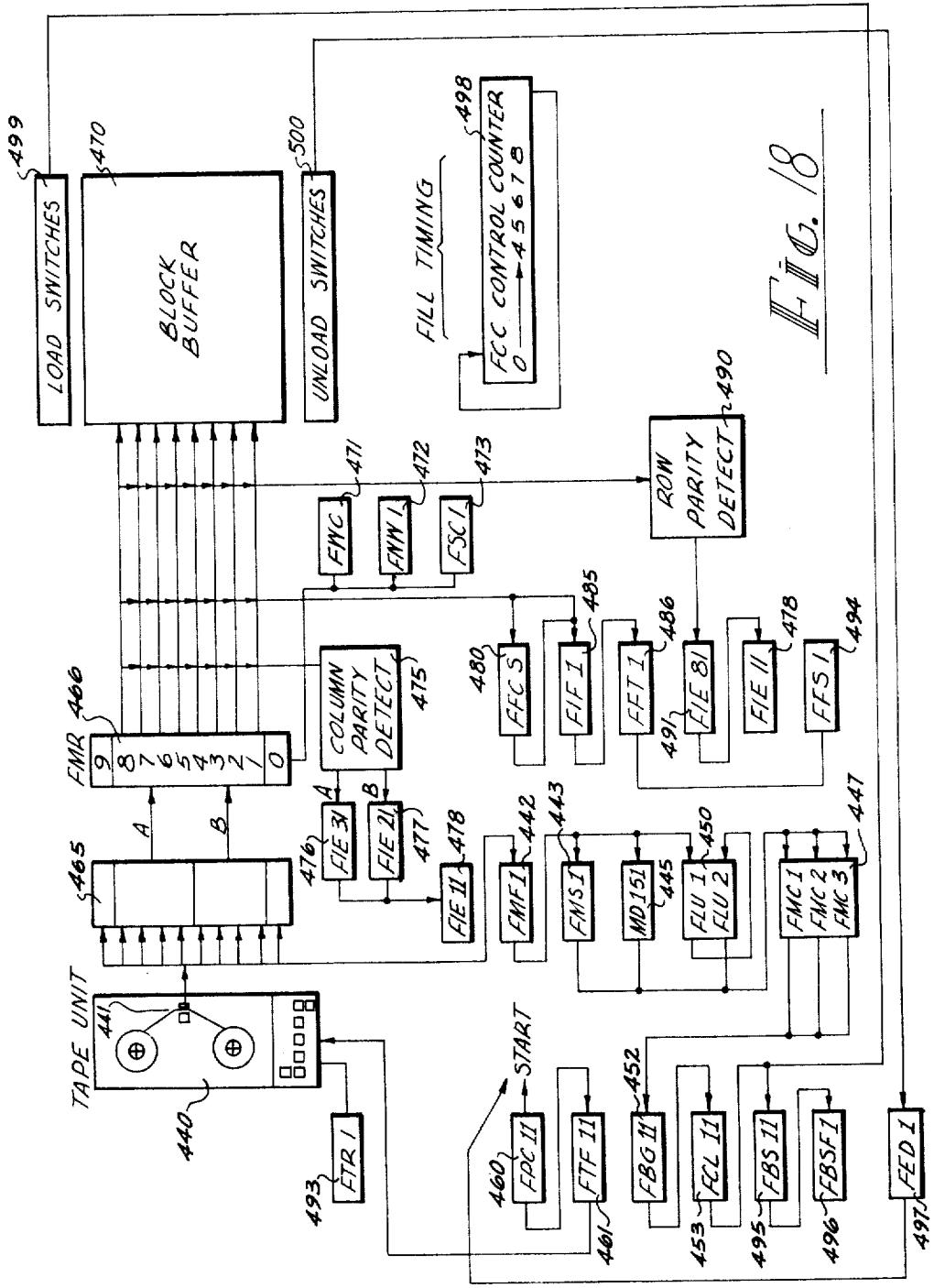
FIG. 18 is a simplified block diagram illustrating the general relationships of certain components during the Fill cycle.

Referring to FIG. 18, a tape unit 440 having appropriate read heads 441 reads the information on all eleven channels of the magnetic tape. The information contained in the marker channel of the magnetic tape is applied from the tape unit to a Marker Follower flip-flop 442. Each time a signal is sensed on the magnetic tape by the appropriate read head of the marker channel, the pulse thus derived is applied to the Marker Follower flip-flop to cause the flip-flop to assume the set state. The Marker Follower flip-flop 442 will reset itself upon receipt of the next clock pulse after being set. A Marker Scaling flip-flop 443 is provided which changes state, from "set" to "reset" or from "reset" to "set," each time the Marker Follower flip-flop is set. The "set" state of the Marker Follower flip-flop 442 also provides a pulse to the marker track detect enable one-shot 445. The marker track detect enable one-shot 445, when triggered, enables a marker track counter 447. The marker track counter counts the number of pairs of marker pulses detected in the marker channel of the magnetic tape. The marker track counter 447 thus provides a means for determining the code existing in the marker channel of the magnetic tape (i.e., Alpha, Beta or Gamma).

Marker Check Lockup flip-flops 450 are provided for generating a strobe pulse during the time that the marker track detect enable one-shot 445 is triggered.

A Beta-Gamma Tracking flip-flop 452 is provided for receiving pulses from the marker track counter 447. The Beta-Gamma Tracking flip-flop 452 is set when a beta marker is sensed and reset when a gamma marker is sensed. The Beta-Gamma Tracking flip-flop 452 provides a pulse to the Character Loaded Detect flip-flop 453 which, when "set," indicates that characters have been loaded into the block buffer during the reading of a block of data from the tape.

A program counter 460 determines the appropriate cycle of operation (in FIG. 18 the Fill cycle), and provides an appropriate signal to a Tape Forward flip-flop 461 which, in turn, provides an appropriate signal to the tape unit 440 to move the tape forward. The information read from the remaining channels of the magnetic tape is applied to suitable amplifying elements 465 which amplify the detected signals to appropriate logic levels for operation in the rest of the system. The amplified signals are applied to a memory register 466 in two half-column portions, A and B. These two portions combined may represent an alphanumeric character each half of which has an appropriate parity bit included. Alternatively, each portion may individually represent a numeric digit with an accompanying parity bit. The information thus transferred to the memory register 466 is subsequently supplied to a block buffer 470. The information, while being transferred from the memory register to the block buffer is sampled and a determination is made as to the correctness of the form of the information (e.g., parity) and the type of information being transferred. The information in the memory register 466 is compared to a word character counter 471 which determines the character position of the information within the word being read from the magnetic tape. If the character position sensed is a 0 position, then the character or information being transmitted from the magnetic tape through the memory register is interpreted as a control column (first column of bits in a word) and the Mod 3 bits are examined for identification of the word structure to determine if the word to be received is numeric or alphanumeric (if both Mod 3 bits are ones, then the word is treated as alphanumeric). If a word has been determined as a numeric word, a numeric word flip-flop 472 is "set" and will not "reset" until an alphanumeric word is received from the magnetic tape. A Stop Code Store flip-flop 473 is also provided and is used to store an end of data condition when a stop code character is detected during the Fill cycle. The "set" state of this flip-flop will cause the Printer System to stop when an End of File is detected and all data has been printed as will be explained more fully hereinafter. Each portion, A and B, of the information transmitted from the magnetic tape to the memory register 446 is checked for column parity by a column parity detect 475. A plurality of Input Error flip-flops are provided; however, the setting of any one of the Input Error flip-flops subsequently sets Input Error flip-flop FIF11 shown in FIG. 18 at 478.

Information that is to be printed by the Printer System of the present invention is contained, in the embodiment chosen for illustration, on magnetic tape and is coded in such a manner that information to be printed will be prefaced by a Begin File code and will end with an End File code. Information to be printed, and thus prefaced by a Begin File code, and ended with an End of File code, must be detected between the Begin and End codes. Therefore, the sequence of codes to be received from the magnetic tape will be: Begin File, End File, Begin File . . . etc. A File Code Sequence flip-flop 480 is provided for checking the proper file code sequence. An error will be indicated if two Begin File or End File codes are received successively. An In File flip-flop 485 is provided for generating a pulse when an In File status is established. A File Tracking flip-flop 486 is also provided for storing the In File or Out of File status at the beginning of a block of data to be entered into the block buffer. The In File flip-flop 485 and the File Tracking flip-flop 486 permit information being transferred from the memory register 466 to the block buffer 470 to be stored in the block buffer 470 until the information in the block buffer 470 is ready to be printed. Information presented by the memory register 466 to the block buffer 470 while the In File flip-flop 485 is not "set" will be discarded; however, it will be noted that the information thus discarded will nevertheless be parity checked.

A row parity detect circuit 490 provides a signal, upon detection of a row parity error, to Input Error flip-flop 491 which, in turn, provides a means for setting Input Error flip-flop 478.

When an error is detected during the reading of a block of information on the magnetic tape, the system is stopped upon completion of reading the block and the Input Error flip-flop 478 is "set"; the tape may be caused (under operator control) to back up one block and have the information causing the input error re-read. The tape reversal is initiated by a Tape Reverse flip-flop 493. Upon back spacing one block, the contents of the File Tracking flip-flop 486 are copied into the File Status flip-flop 494. A Block Buffer Status flip-flop 495 is provided for determining the status of the block buffer, that is, whether the block buffer is in a load condition or an unload condition. A Buffer Status Follower flip-flop 496 is provided and is "set" at the end of the Transfer cycle (to be described) and establishes that the block buffer has been completely unloaded on the preceding line of print. An End of Data Character flip-flop 497 is provided for determining when input to the block buffer is complete although the block buffer has been loaded with less than the number of characters equal to its capacity (in the embodiment chosen for illustration, 400 characters). A control counter 498 is provided and is synchronized with the information being received by the printing system from the tape unit. The control counter provides synchronized clock pulses to the system and remains synchronized to the information being received from the magnetic tape only during the Fill cycle.

The block buffer 470 is a ferromagnetic core storage device the operation of which is based on coincident-current techniques. The addresses at which the cores are located are scanned sequentially by magnetic stepping switches shown in FIG. 18 as "load" and "unload" switches 499 and 500. The block buffer 470 may conveniently be any one of several commercially available core storage devices.

The operation of the abbreviated block diagram for the Fill cycle of the present invention shown in FIG. 18, may be described as follows. Magnetic tape is loaded into the tape unit 440 and the operator depresses the appropriate start switch (not shown) on the control console. The Program Counter flip-flop 460 then becomes "set" and the counter indicates that the Fill cycle is to be entered. The appropriate signal from the Program Counter flip-flop 460 to the Tape Forward flip-flop 461 then provides a forward signal to the tape unit 440 to move the tape past the read heads 441. The magnetic tape passing the read heads 441 contains eleven channels, ten of which contain information to be printed and parity digits, and one channel for block markers. The marker channel energizes the Marker Follower flip-flop 442, Marker Scaling flip-flop 443, and triggers the marker track detect one-shot 445. The marker counter 447 detects the number of pulses received from the marker channel, and determines which code is being received from the magnetic tape. When a Beta code is detected by the marker counter 47, the Beta-Gamma flip-flop 452 is "set." When a Gamma is received from the marker channel of the magnetic tape, the Beta-Gamma flip-flop 452 is "reset." When a Beta code is received, thus indicating that a block of information is to follow, the following column of ten bits is amplified in amplifier 465, and applied to the memory register 466.

The ten bits transferred to the memory register 466 may be considered either an eight bit alphanumeric character with two parity bits, or, two numeric digits each having four bits and a single parity bit. The column represented by the ten bits in the memory register is compared to the word character counter 471 to determine if the column then present is a control column. If the column is a control column, a determination will be made whether the word structure is numeric or alphanumeric and this information is stored in the Numeric Work flip-flop 472. If the word is alphanumeric, then the last column of that word (least significant character position) is examined for command codes. If the following information is to be printed, a Begin File code will be detected, and the following information presented to the memory register will be transferred to the block buffer, at which time the memory register 466 will be available for receiving the next ten bit column. If the Begin File code is not present, the information contained in the memory register will be discarded, and the search will continue until a Begin File code is discovered. The File Code Sequence flip-flop 480 is utilized to determine when a Begin File code is sensed and when an End File code is sensed, and provides a means for detecting errors when these codes occur out of sequence. When a Begin File code is sensed, an In File flip-flop 485 is "set," and utilized to provide appropriate signals throughout the system indicating that information to be printed is being received from the magnetic tape. In the event of an input error, an Input Error flip-flop 478 will be set, and a subroutine may be entered under operator control in which the magnetic tape is stopped, and the tape unit is reversed by setting Tape Reverse flip-flop 493 until the tape has been back-spaced one complete block. After back-spacing, the tape is stopped and run forward again to re-read the information previously causing the input error. Since the backing and re-running of the magnetic tape may destroy the proper file code sequence, a File Status flip-flop 494 is utilized to store the condition of the File Tracking flip-flop.

The column in the memory register 466 is row parity checked by the row parity detect circuit 490, and row parity errors result in the "set" condition of Input Error flip-flop 478. The control counter 498 provides the overall timing during the Fill cycle, and is synchronized to the magnetic tape being read during the Fill cycle.

*Transfer cycle*

Figure 19:
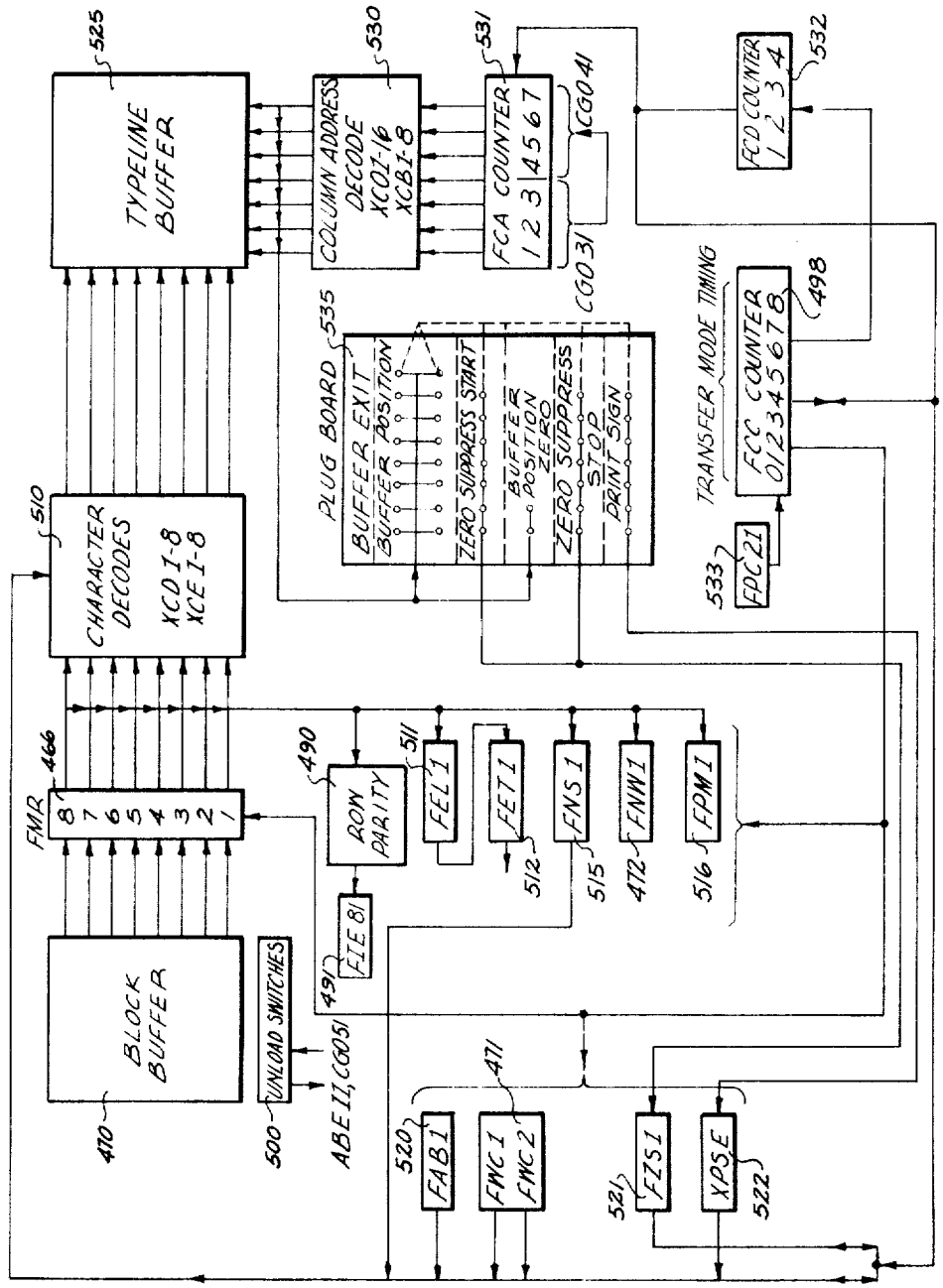
FIG. 19 is a simplified block diagram illustrating the general relationships of certain components during the Transfer cycle.

Referring to FIG. 19, a simplified block diagram of a printer control system constructed in accordance with the teachings of the present invention is shown during the Transfer cycle. The block buffer 470, having been previously loaded with a block of information to be printed during the Fill cycle, is connected to the memory register 466 for emptying the contents of the block buffer through the memory register to a character decode circuit 510. The block buffer 470 is unloaded through operation of unload switches 500 upon receipt of a clock signal CG051 from a gated clock of the clock system (to be described). Upon emptying the contents of the block buffer 470, a Block Buffer empty signal ABE11 is generated. The information supplied to the memory register from the block buffer 470 comprises eight bits representing a control column (including Mod 3 bits, sign bit, and row parity bits), or two 4 bit numeric characters, or one 6 bit alphanumeric character. The row parity detect circuit 490, mentioned previously, is utilized to maintain row parity detection through the Transfer cycle. A row parity error results in the setting of an Input Error flip-flop 491. An End of Line Code Detect flip-flop 511 is provided for detecting when an End of Line code is being supplied to the character decode 510 from the memory register 466. Also, an End of Transfer Cycle Detect flip-flop 512 is utilized to generate a signal when the end of the Transfer cycle occurs. The Numeric Work flip-flop 472 is utilized to detect the presence of numeric words, and generate a signal to provide for the handling of the eight bits in the memory register 466 sequentially in groups of four bits. That is, since numeric characters require only four bits, bits 1–4 will be processed a one numeric character, and bits 5–8 will be processed as a separate numeric character. Thus, as mentioned previously, a column of eight bits, if representing numeric data, will be processed as two numeric characters. Thus, the Numeric Work flip-flop 472, when set, will generate an appropriate signal for the handling of the column then present in the memory register as two numeric characters. The Numeric Sign flip-flop 515 is provided for storing the presence of a numeric sign when a numeric sign bit is detected in the control column of a numeric word.

Since, in the embodiment chosen for illustration, the Printer Control System of the present invention provides for the printing of specific information in either Gothic or Magnetic Ink Character Recognition (MICR) fonts, a Print MICR flip-flop 516 is provided for detecting the presence of the appropriate code. Obviously, if more than two fonts were to be selected, the Printer Control System of the present invention could be extended to include other "Font Print" flip-flops such as flip-flop 516 for the detection of appropriate font codes in the control column of numeric words. For purposes of illustration, however, the present embodiment is being described in terms of conventional Gothic font and Magnetic Ink Character Recognition font E13B.

Information being presented to the Printer Control System contains information to be printed and control codes to indicate various commands. As mentioned previously, the first column of a word presented to the Printer Control System is the control column which contains the sign bit, the Mod 3 bits, and the row parity bits. The Mod 3 bits may be utilized to indicate whether the word being presented is a numeric word or an alphanumeric word. To provide for such commands as In File, Out of File, Print MICR, etc., the least significant character position of selected alphanumeric characters is utilized. Thus, for example, when the Printer Control System is being presented information that is not to be printed, an Out of File condition exists, and received information, although parity checked, will ultimately be discarded. As the words are received, they are detected as numeric or alphanumeric, and when an alphanumeric word is detected, the least significant character position (the last column of the word) is sensed for the presence of a Begin File code. When this Begin File code is detected, the following information is supplied from the memory register to the block buffer as described previously in connection with the Fill cycle. Similarly, in the Transfer cycle, the word character counter 471 is utilized to determine which column of the word is being presented to the memory register from the block buffer. Thus, when a least significant character position of an alphanumeric character is presented with an appropriate command code, the word character counter permits the sensing of this code as a command code and permits the Printer Control System to treat the information contained in the command code accordingly.

If a numeric word is being transferred from the block buffer to the character decode 510, the two halves of the column present in the memory register are processed sequentially as two numeric characters as described previously. A Numeric Word A-B flip-flop 520 is provided to enable the character decode 510 to provide the decoded character information in sequential fashion. A Zero Suppress flip-flop 521 is provided for the detection of a numeric 0 when the character being processed is a numeric character. The Zero Suppression flip-flop 521 enables the Printer Control System to inhibit the printing of any information in the selected space when the character to be printed is a numeric 0 and a zero suppression field has been programmed for that particular position in a plugboard. If the character being printed is a numeric character, and the control column preceding the character indicated that a numeric sign was to be printed, a print numeric sign enable circuit 522 is provided for storing the numeric sign to be printed after the characters of the numeric word have been printed. The information from the block buffer 470 is thus transferred through the memory register 466 to the character decode 510 wherein the information is decoded from the code format described previously to an appropriate code for storage in a typeline buffer 525 prior to application of the information directly to a printer for printing.

The typeline buffer 525 is a magnetic core storage device for receiving decoded character information from the character decode circuit 510 and storing that information prior to supplying the information to the printer mechanism for printing. A column address decode circuit 530 is provided, and a column address counter 531 is provided for addressing respective columns of the typeline buffer 525 to enable the information obtained in the typeline buffer to be applied to the typeline mechanism. During the Transfer cycle, the information is applied to the typeline buffer and stored in the column currently being addressed by the column address decode and column address counter 530 and 531. Thus, the information presented to the typeline buffer is stored in magnetic cores which may be addressed through the utilization of the same column address decode 530 and column address counter 531. During the Transfer cycle, the column address counter 531 is advanced by the column address counter gated clocks CG031 and CG041. A plugboard 535 is provided for connection of the typeline buffer 525 to the typeline mechanism (not shown in FIG. 19). The plug board 535 provides a means for interchanging the columns of the information presented by the typeline buffer 525, and a means for initiating a zero suppression in a particular column and ending the zero suppression in another particular column. Also, the plugboard 535 provides a means for including a sign for numeric words through the expedient of print sign terminals which may be connected to a desired buffer position or output terminals. A fast countdown counter 530 is provided which steps through twelve counts each time it is forced out of the reset state. The fast countdown counter 532 is utilized to prevent information from being read into or out of the typeline buffer 525 at a rate greater than the capacity of the typeline buffer. During the Transfer cycle, the fast countdown counter 532 begins stepping upon receipt of a signal from the control counter 598. The control counter 498 provides central timing for the Transfer cycle when an appropriate signal is received from the program counter 533.

The operation of the abbreviated block diagram of FIG. 19 during the Transfer cycle may be described as follows. The information stored in the block buffer 470 is to be transferred to the typeline buffer 525. When the unload switches 500 of the block buffer 470 receive an appropriate clock signal CG051, the block buffer begins to unload its contents to the memory register 466 in eight bit columns. As mentioned previously, these eight bit columns may represent an alphanumeric character or two numeric characters. As the data are unloaded from the block buffer into the memory register, the character position within each word is determined by quizzing the word character counter 471 which is advanced for each character position within a word. The Mod 3 bits of the first character position, or control column, of each word are quizzed for word type, i.e., numeric or alphanumeric. If the word is numeric, the next character is unloaded into the memory register, and the two digits represented thereby are processed separately in sequence. The column address counter 531 which selected the column to be loaded in the typeline buffer is advanced one count. If the digit detected is a numeric 0, and zero suppression is on, the digit is discarded, and the column address counter is advanced another count leaving a space in the suppressed zero column of print. The second digit is then processed and if it is a numeric 0, and the zero suppression field is still on, will be treated as the first digit. When the next character is unloaded into the memory register, it also will be treated sequentially as two numeric characters. If the succeeding digit is a non-zero, or if the zero suppression field has been plugged off and the digit is a numeric 0, the appropriate core selection lines of the typeline buffer will be addressed and the column will be loaded.

Zero suppression fields are selected by plugging on the plugboard between the zero suppress start field and the buffer position hub corresponding to the column preceding the first column to be zero suppressed. Zero suppress will be turned off, and will remain off until the next plugged zero suppress start, if a non-zero numeric digit is detected, if an alphanumeric word is detected, or if a zero suppress stop has been plugged on the plugboard. The zero suppress stop is also plugged to the buffer position corresponding to the last position to be zero suppressed.

When the last numeric character of the word has been processed, a quiz is made to determine whether the numeric sign for that word is to be printed. If the print sign field on the plugboard has been plugged to the buffer position hub corresponding to the column of the last numeric digit of the word, the Numeric Sign flip-flop is interrogated, and if set, causes a minus sign to be loaded into the column corresponding to the last numeric digit. If it is off, a space is loaded. Alphanumeric words are not affected by zero suppression or print sign hubs.

When alphanumeric words are unloaded into the memory register, only the six least significant bits of each character are sensed for print character recognition. A special code appears in alphanumeric words which acts as a filler, called Ignore. Recognition of this code does not advance the column address counter, nor is it loaded into the typeline buffer. The least significant character position of alphanumeric words will contain any command codes, if present, and the two most significant bits are examined for codes of the form 01XX XXXX. If detected, these codes are treated as Ignores, but if they are of the form 010X XXXX they constitute an End of Line code. Transferring of data from the block store buffer to the type-line buffer proceeds until either End of Line code or an error is detected. The typeline buffer is checked to insure that no more than 120 columns are loaded. Row parity and forbidden code configurations are also checked. If the least significant character of the first word of a line of data is the code 0111 0001, the interpretation of the data following is considered in terms of MICR characters. The MICR Control flip-flop 516 is set, which acts as the control for printing the line of MICR font.

All printable data contained within the line of MICR printing must be in numeric words and only printable codes will be accepted. Within the numeric codes possible, only the & has no MICR counterpart. Also, no alphanumeric codes have MICR counterparts. If, during the course of loading the typeline buffer, an & is detected in a numeric word, or alphanumeric words containing other than Ignores or command codes, the MICR flip-flop 516 will be turned off, and the line will be printed as Gothic. It should be noted that data codes for MICR printing are identical with the numeric Gothic codes and are loaded into precisely the same typeline buffer cores. Thus, if an error causes the MICR information to be printed in Gothic, the information is not lost, but is merely printed in a different font. Also, the typeline buffer need not contain special core positions for the second font; rather, the same core positions may be utilized for a plurality of fonts thus substantially saving the cost and size of an enlarged typeline buffer to handle an increased number of fonts. The MICR flip-flop 516 will be turned off upon completion of printing the line of MICR. Therefore, each line of MICR printing requires a MICR command preceding the data.

When an End of Line code is sensed, the transferal of data to the typeline buffer is halted. The Transfer cycle is not brought to a conclusion until a "look ahead" is accomplished, to ascertain whether or not another line of print remains in the block buffer. This is accomplished by checking the following words in store sequentially until one of three conditions is satisfied:

(1) A numeric word is detected immediately indicating another line of print.
(2) An alpha word is sensed, which does not necessarily imply another line of print. Search continues. Ignore characters do not imply additional data, therefore, search will continue until either a printable alphanumeric character or another end of line is detected.
(3) The "End of Data in Block Buffer" code is detected.

It is also possible that the last line of print also coincides with the last block buffer address. The end of line code then fails in this last address and when read out, causes the block buffer to emit an empty signal. When the look ahead search is terminated, the conditions for ending the Transfer cycle are completed, and an entry into the Print cycle is made. If the empty signal or the end of data in block buffer have been sensed, entry to Fill cycle is also made. Thus, a Fill cycle cycle usually be accomplished concurrently with a Print cycle, thus, in this and other ways, the present Printer Control System enables a printer to operate at increased speed.

During the Transfer cycle, if a line is not terminated in an end of line code, the following line of print will be construed to be part of the preceding line. Only if the total number of characters of the two exceed 120, an error will be indicated. If an empty signal is detected with an end of line having been sensed, a block buffer empty overflow error will be activated.

Thus, the information in the block buffer 470 is read into the typeline buffer 525. As the columns of information from the block buffer are passed through the memory register and the character decode 510, the information is applied to the typeline buffer one column at a time. Simultaneously, with the application of this information to the typeline buffer 525, the column address decode circuit 530 addresses, sequentially, predetermined columns in the typeline buffer to enable the information presented to the typeline buffer from the character decode circuit 510 to be read into the appropriate column in the typeline buffer.

The Transfer cycle timing provided by the control counter 498 provides appropriate sequencing during the transfer of the information from the block buffer 470 to the typeline buffer 525. When the control counter 498 reaches a count of six, the fast countdown counter 532 is actuated, which then proceeds to step through twelve counts. The fast countdown counter 532 thereby provides an appropriate delay for the information being presented to the typeline buffer and insures that the information has had sufficient time to be entered into the typeline buffer in the appropriate location. The column address counter 531 provides the column address decode circuit 530 with properly clocked signals in sequence to permit the column address decode 530 to energize the proper columns of the typeline buffer 525 to receive and store the information presented to the buffer by the character decode circuit 510. The print sign enable circuit 522, when programmed through the plugboard 535, stores the information contained in a sign bit to ultimately be printed in combination with a numeric word. Similarly, the Zero Suppression flip-flop 521 stores the zero suppression information when a numeric zero is detected to thereby provide an appropriate signal to cause a "space" to be left in the corresponding column rather than the numeric zero.

Therefore, during the Transfer cycle illustrated by the simplified block diagram of FIG. 19, information to be printed, in addition to the command codes stored concurrently with this information, is transferred from the block buffer 470 through the memory register 466 where the command codes are detected and signals generated to provide the appropriate processing for the information following the command codes. The information to be printed is thus transferred from the memory register 466 through a character decode circuit 510 to the typeline buffer 525. The location within the typeline buffer 525 is determined by appropriately addressing the typeline buffer through the expediency of a column address decode circuit 530. The information is thus transferred, control information is stored, and information to be printed is prepared for entry to the typing mechanism.

*Print-Slew cycle*

Figure 20:
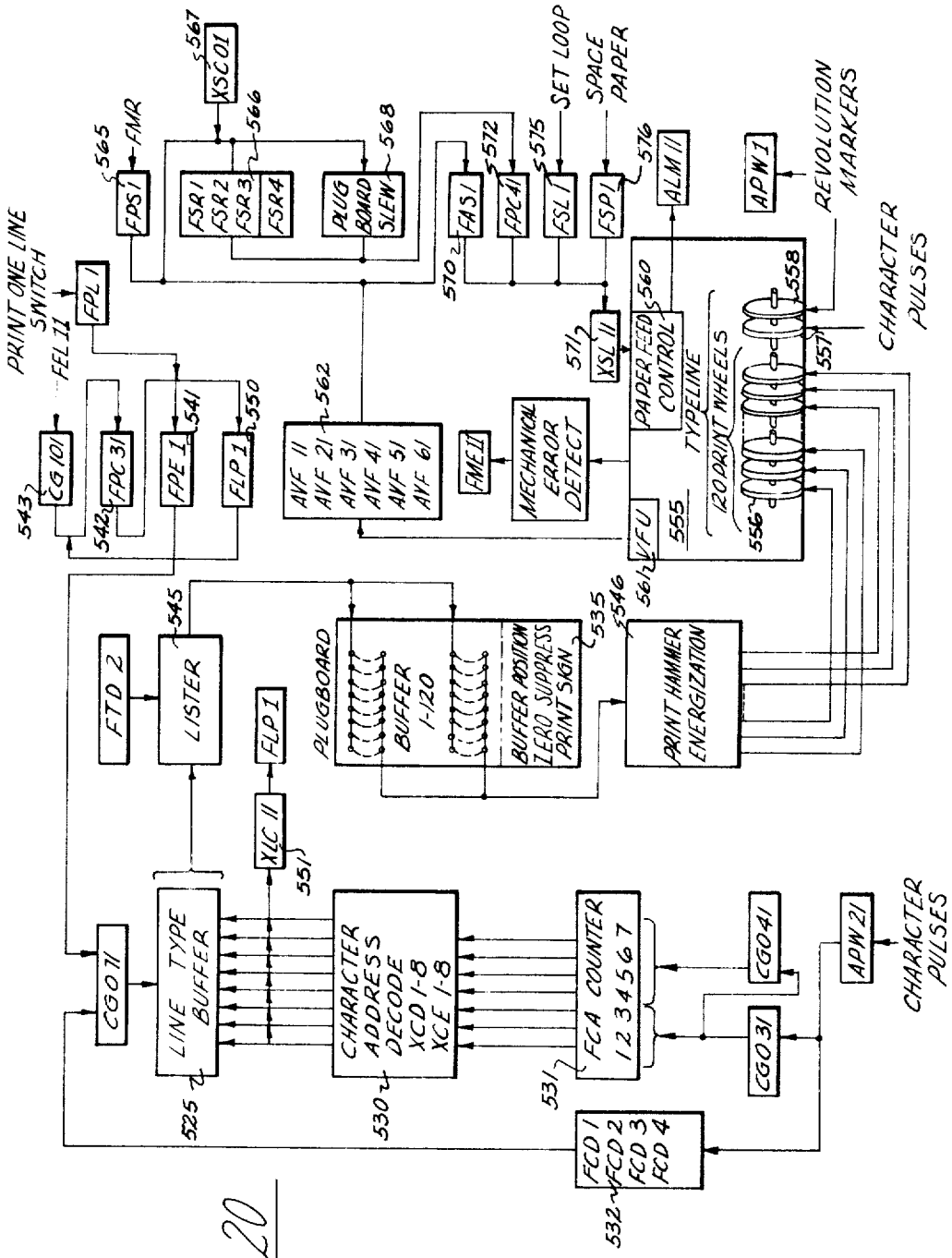
FIG. 20 is a simplified block diagram illustrating the general relationships of certain components during the Print-Slew cycle.

During the Print-Slew cycle, the information contained in the typeline buffer is unloaded through a lister to a printing mechanism for actuation of print hammers to cause the characters represented by the information in the typeline buffer to be printed. Referring to FIG. 20, the typeline buffer 525 begins to unload the information contained therein upon receipt of a typeline buffer unload synchronization signal from the gated clock driver CG071. The information stored in the typeline 525 is transferred through a lister circuit 545 to the plugboard 535. The plugboard 535, as mentioned previously in connection with the Transfer cycle, provides a means for rearranging the columns of print and for inserting zero suppression and numeric signs. The lister circuit 545 provides appropriate amplication of the logic level signals provided to it from the typeline buffer 525. A print hammer energization circuit 546 is connected to receive signals from the lister 545 through the plugboard 535. The print hammer energization circuit 546 provides amplification for the signals from the lister circuit to appropriate level for energization of the print hammers on the printing mechanism. Upon completion of printing a line, a Line Printed flip-flop 550 is set to signal completion of the printing cycle. A column address counter lock out detect circuit 551 provides energization for the set state of the Line Printed flip-flop.

A typeline, shown generally at 555, is provided for printing appropriate information on paper. The typeline 555 comprises 120 print wheels 556, one for each column of print, a character pulse wheel 557, and a revolution marker wheel 558. The typeline 555 also includes a paper feed control 560 and a vertical format unit (VFU) 561. Each of the print wheels contains 58 characters spaced about the periphery thereof. The 58 characters represent the total number of printable characters in a respective column of print. The 120 print wheels 556 are all mounted on a common shaft and rotate continuously and in synchronism with the remainder of the print wheels. The character pulse wheel 557 includes 58 detectable indicia about the periphery thereof so that when the character pulse wheel 557 (which is mounted on a common shaft with the print wheels) rotates, an indicia will be detected and provide a character pulse each time a character on the 120 print wheels is coming into position to enable it to be struck by a corresponding print wheel hammer (not shown). The revolution marker wheel 558 is provided with a detectable indicia positioned on the periphery thereof to indicate a complete revolution of all typewheels.

The paper feed control 560 positions the paper through appropriate drive means and includes conventional paper advance means, paper tension means, etc. A vertical format unit 561 is provided for spacing the paper in accordance with a predetermined vertical format. The vertical format unit 561 provides a plurality of vertical format brush signals 562. A Program Slew Detect flip-flop 565 is provided for receiving appropriate coded information from the memory register to detect the presence of a program slew. A slew code register 566 is provided for counting an appropriate number of lines for the paper to slew when the appropriate slew code is detected. A stop code detect circuit 567 provides signals for inhibiting slew when an appropriate stop code is detected. A plugboard slew 568 is provided for manually predetermining the number of spaces to be advanced between each line of print in the absence of the detection of a code to indicate to the contrary. An Automatic Slew flip-flop 570 is provided for receiving logical indications of an automatic slew condition, and responds thereto by assuming a set state and providing a slew paper control 571 with a signal to feed the paper accordingly. The program counter 572 provides signals indicating the Print-Slew cycle.

A Set Loop flip-flop 575 is provided for assuming the set state upon energization from the manual set loop control for causing the paper under the control of the paper feed control 560 to synchronize with a punched paper tape under the control of the vertical format unit 561. A Space Paper flip-flop 576 is provided for assuming the set state upon energization of the manual space paper control and for providing an appropriate signal to cause the paper to advance under the control of an operator.

The application of the character pulses to the fast countdown counter 532 causes the counter to step through the twelve counts mentioned previously in connection with the transfer mode, and causes the gated clock CG071 to initiate the transfer of the information in the typeline buffer 525 to the typeline. Simultaneously, gated clocks CG031 and CG041 initiate the stepping of the column address counter 531. The signals thus derived from the column address counter 531 are applied to the typeline buffer 525 through the character address decode circuit 530. The information thus in the typeline buffer 525 is supplied through the lister 545 for amplification through the plugboard to the print hammer energization circuit for amplification to appropriate hammer actuation level, and the corresponding hammers are actuated to cause corresponding characters on the 120 print wheels to be struck, thereby printing the information. The operation of the simplified block diagram for the Print-Slew mode shown in FIG. 20 may be described as follows. The information in the typeline buffer 525 is to be applied to type hammers (not shown) so that they may be energized to strike type wheels 556 at the appropriate moments to cause an impression of suitable characters on the paper. Accordingly, the information contained in the typeline buffer is read out of the buffer when appropriate signals are received indicating that the mechanism is prepared for the printing operation. The Print Enable flip-flop 541 is instrumental in causing the appropriate unload synchronization signal from the gated clock CG071 to cause the typeline buffer to begin unloading the information contained therein. Upon receipt of this signal, the typeline buffer 525 is addressed by the character address decode 530 so that the buffer is addressed for a given character in each of the 120 columns simultaneously. The addressing of the typeline buffer is synchronized with the print wheels through the expediency of the character pulse wheel 557. This pulse wheel provides a pulse for each character on each of the 120 print wheels as that particular character comes into position to be imprinted on the paper. For example, if the alphanumeric character "b" is to be printed in the fifth and sixty-first column of the 120 columns, the character address decode would address each of the 120 columns simultaneously for the existence of a "b." The fifth and sixty-first columns would provide a signal to the lister circuit 545 which would amplify the logic level provided by the typeline buffer to a suitable level for applying to the input of the print hammer energization circuit 546. These signals, representing the alphanumeric character "b" in the fifth and sixty-first columns, would energize the appropriate print hammers to cause the hammers to strike the fifth and sixty-first print wheels of the typeline 555 thereby causing the character "b" to be printed.

As mentioned previously, the addressing of the typeline buffer is synchronized with the print wheels through the expediency of the character pulse wheel 557. These character pulses derived from the character pulse wheel 557 are utilized to energize gated clocks CG031 and CG041 to apply appropriate pulses to the column address counter 531. Similarly, the fast countdown counter 532 is energized to cause a delay between the addressing of the typeline buffer for successive characters. The fast countdown counter 532 therefore provides a means for insuring that the typeline buffer has emptied the contents of the addressed character lines.

Upon the completion of printing a line of print, the Line Printed flip-flop 550 will become set, and appropriate signals will be generated for advancing the paper and printing the next line of print. If a command code in a word is a programmed slew code, the Program Slew flip-flop 565 will become set during the Transfer cycle. The slew register 566 provides a means for counting the number of spaces to be advanced if a slew code is presented which dictates that a given number of lines be spaced. If no slew code is detected, and no other provision is made for spacing, the plugboard slew 568 will provide a means for determining what spacing will be implemented in the absence of a slew command. The paper may be synchronized with the paper tape loop in the vertical format unit 561 by energizing Set Loop flip-flop 575 which then permits the paper tape to orient itself with the print paper. The paper may also be advanced by energizing the Space Paper flip-flop 576. The vertical format unit 561 detects holes present in the closed loop paper tape and provides amplified vertical format signals to vertical format amplifiers as indicated at 562. Signals from the vertical format amplifiers 562 may be utilized to control the positioning and slewing of the paper since the closed loop paper tape is synchronized with the print paper. The VFU will be described in greater detail in connection with FIGURES 212 and 213. The typeline 555 is also provided with a mechanical error detect circuit for sensing such mechanical errors as failure to slew, failure of print hammers, torn print paper, etc. The detection of a mechanical error sets the Mechanical Error flip-flop FME11.

Since the information contained in the typeline buffer may be either Gothic or MICR font, and since the determination of font has been stored in a Print MICR flip-flop during the transfer mode, an indication is needed from the typeline when the MICR characters are coming beneath the print hammers rather than the Gothic characters. Accordingly, revolution marker wheel 558 provides a detectable marker on the periphery thereof for indicating when the beginning of the print wheel characters are coming beneath the print hammers. Accordingly, if the information in the typeline buffer is Gothic, and the Print MICR flip-flop is reset, the information from the typeline buffer will not be addressed and provided to the print hammers until the revolution marker indicating the beginning of the Gothic characters on the type wheels is received by the column address counter. When the characters to be printed are MICR characters, the column address counter gated clocks are not gated until the MICR characters come into printing position. In this manner, it is possible to store several fonts of information in the typeline buffer and utilize the same typeline buffer for all of these fonts without providing additional storage capacity. Alternatively, a separate revolution marker may be provided for each font contained on the print wheels. Thus, the revolution marker wheel would contain two revolution markers instead of one.

INDEX OF COMPONENTS AND SIGNALS

Amplifiers

ABE1: Block buffer empty signal—this amplifier amplifies signals from the block buffer when the latter has been emptied.

ABF1: Block buffer full signal—this amplifier provides a signal when the block buffer is full.

ALM1: Line marker pulses from printer indicate that paper has been advanced one line.

APW1: Revolution marker pulse amplifier—this amplifier amplifies signals derived from the revolution marker on the revolution marker wheel of the typeline.

APW2: Character pulse amplifier—this amplifier amplifies signals derived from the character pulse wheel of the typeline. A character pulse is provided by the character pulse amplifier for each character as the character on the periphery of the print wheel comes into position to be struck by a print hammer. In the embodiment chosen for illustration, the character pulse amplifier provides 58 character pulses per revolution of the print wheels.

ASC1: Single Clock Pulse—this amplifier amplifies the single clock pulses received from the Clock System and is used during test modes to advance system circuits one clock pulse.

AVF1–6: Vertical Format amplifiers—provide signals indicating holes present in respective Vertical Format Loop positions.

Bus functions

BF – – –: Bus Functions are descriptors given to combinations of logical terms which do not have a specific function in themselves but are useful in the combination of logical elements and terms to provide an input signal to several other circuits or elements. Since certain combinations of logical terms are utilized throughout the system in several places, it is more feasible to combine these logical terms and provide a central "supply point." Therefore, a Bus Function is the combination of several of these logic terms to provide a common "supply point" for these combined logical terms. The Bus Functions do not necessarily have logical meaning aside from the combination of logical terms which they comprise.

Clocks

CU – –: An ungated 250 kc. clock signal.

CG01: Used to advance the Marker Pulse Counter when reading tape. A clock pulse is generated for every second marker pulse detected. During reset command it causes marker counter to become reset.

CG02: Block Buffer Load Sync. A clock pulse is generated for each character to be loaded into the Block Buffer during the Fill cycle.

CG03: Used to advance the first three stages of the Column Address Counter. During the Transfer cycle, a pulse is generated for each character loaded into the Typeline Buffer, or for each space to be generated. During the Print cycle, a pulse is generated for each typewheel character pulse or each skip count detected. During turn-on operations, clock pulses are generated every 52 µseconds for the length of time the Typeline Buffer Clear signal is present, to unload spurious data stored in the Typeline Buffer.

CG04: Used to advance the last four stages of the column address counter. Used the same as CG03.

CG05: Block Buffer Unload Sync. A clock pulse is generated for each character to be unloaded during the Transfer cycle. Operative only during Transfer and only when both the Block Buffer and Typeline Buffer are operative.

CG06: Corner Buffer Load Sync. Causes loading of character presented to the Character Decode matrix into the Typeline Buffer. One pulse is generated for each character loaded during Transfer cycle.

CG07: Typeline Buffer Unload Sync. Causes all cores addressed by the Character Decode matrix to be switched to the unloaded state. One pulse is generated for each character position during Print or the turn-on sequence.

CG08: Block Buffer Switch Clear. This pulse causes the Block Buffer to switch from Load to Unload if less than 400 characters are loaded. The pulse is generated when the End of Data generator has loaded two End of Data characters into the Block Buffer during the Fill cycle. If the 400th character has been loaded, the Block Buffer Status flip-flop will inhibit the generation of this pulse.

CG09: Block Buffer Electronic Clear. This pulse is generated in the Transfer cycle when the End of Data character is detected, and causes the Block Buffer to switch from Unload to Load.

CG10: Typeline Buffer Switch Clear. This pulse causes the Typeline Buffer to switch from Load to Unload. It is generated when an End of Line code is detected in the Transfer cycle and paper slewing has ceased, or during the turn on cycle when the Typeline Buffer Clear Line is true.

CG11: Typeline Buffer Electronic Clear. This pulse causes the Typeline Buffer to switch from Unload to Load and is generated in the Print cycle when the Stop Print count is detected, or when the Reset Line is true.

CMC1: 205 kc. master clock—this clock is the master clock circuit providing the original clock pulses to the remainder of the system.

CMD1: Master Clock Driver. Master clock drivers receive pulses directly from the master clock CMC1 and provide preliminary amplification of the clock signals for application to line drivers.

CLD1–2: Clock Line Drivers. These line drivers receive pulses from the master clock drivers and provide ungated clock pulses to the remainder of the system.

Flip-flops

FAB1: Numeric Word A–B Flip-Flop. Used in Transfer cycle to decode the eight bit columns of numeric words into two four bit characters for entry into the Typeline Buffer.

FAS1: Automatic Slew Flip-Flop. Used in Print-Slew cycles to advance paper when a slew command terminates on a "4" punch in the vertical format loop. Automatic slew terminates upon sensing a "5" punch in the vertical format loop.

FBE1: Buffer Error Flip-Flop. This flip-flop is set when any error is detected in modes other than Fill, except for Beta-Gamma marker sequence error when off-line. This flip-flop causes the Error flip-flop to become set. Reset by the Reset line.

FBG1: Beta-Gamma Tracking Flip-Flop. When used in Fill cycle, off-line, it is set when a Beta marker is sensed; reset when a Gamma marker is sensed. When in Fill cycle, on-line, it is set by the Strobe Data pulse, and is used to retime the pulse. This flip-flop is also active when the Tape Forward switch is actuated.

FBLU: Backspace Lockup Flip-Flop. This flip-flop is set when the tape is backspaced more than one block. The set state of this flip-flop establishes an Out of File conduction thereby locking out various gating elements which would cause false responses.

FBS1: Block Buffer Status Flip-Flop. This flip-flop tracks the Load or Unload status of the Block Buffer. It is set by either a Buffer Full pulse from the buffer or by a Block Buffer Switch Clear signal. Reset by either the Reset Line, a Buffer Empty signal or a Block Buffer Electronic Clear signal.

FBSF: Block Buffer Status Follower Flip-Flop. The state of this flip-flop is established at the end of the Transfer cycle, assuming the state of FBS1. Used primarily in error recovery modes, and establishes whether the Block Buffer had been completely unloaded on the preceding line of print.

FCA1-7: Column Address Counter. In the Transfer cycle this counter is used to determine the column into which the character being loaded into the Typeline Buffer will be stored. It is advanced by the Column Address Counter Clocks. During the Print-Slew cycles, this counter is used to unload the Typeline Buffer and follows the code progression of the typewheel characters. It is advnaced by the Typewheel Character pulses. The counter is reset by the Typewheel Revolution Marker pulses or by the Unedited Mode Reset Decode.

FCC1-7: Control Counter. This counter is used to generate a timing sequence for control purposes. Once advanced to any count other than reset, the counter steps through the counts until the all reset, or rest count is reached, where it locks up. During the Fill cycle, the sensing of a data column causes the counter to assume a "5" count, proceeding through the count of "8" to "0." During the Transfer cycle, it is stepped into a "1" count whenever a character is to be unloaded from the Block Buffer, and will step through the count of "5." If the character in process is to be loaded into the Typeline Buffer, the counter is allowed to step through the remaining counts to "0." If the character in process is not to be loaded into the Typeline Buffer, the counter will be "jumped" back to the count of "1." In the case of numeric words, the Block Buffer will be unloaded on the count of "1," only if both halves of the 8 bit column have been processed as two 4 bit characters.

FCD1-4: Fast Countdown Scaler. This counter is arranged to pass through 12 counts each time it is stepped out of the reset state. It is used to control the timing and sequence of events pertaining to the Typeline Buffer, which can be loaded or unloaded only once every 50 µsecs. In the Transfer cycle, the sensing of a "6" count of the Control Counter starts the FCD into operation. During the Print-Slew cycle the Typewheel Character Pulses start this counter. During the turn-on cycle, the Typeline Buffer Clear Line causes the counter to run continuously until the entire Typeline Buffer has been cleared.

FCL1: Character Loaded Detect Flip-Flop. Used in the Fill cycle to detect whether any characters have been loaded into the Block Buffer. If during the reading of a block of data from tape (or on line) no characters have been loaded, this flip-flop causes the tape to continue running until a block is reached having a character to be loaded, whereupon the flip-flop is set, allowing the tape to stop on the next Gamma marker (or when On Line, allows the Load Anticipate signal to fall), and permits the operation to continue into Transfer and Print.

FED1: End of Data Character Generator. Set when end of data transmission from input equipment is complete and Block Buffer has been loaded with less than 400 characters. Causes forbidden character codes to be loaded into the Block Buffer. Reset when Block Buffer status changes to Unload.

FEL1: End of Line Code Detect Flip-Flop. Set in Transfer cycle when an End of Line code is detected. Prevents further operation in Transfer and allows stepping to Print if Slew cycle is not present. If the Block Buffer Status flip-flop is reset, the Fill cycle is initiated at the same time Print is entered.

FET1: End of Transfer Detect. Set when an End of Line Code has been detected during Transfer and the next character unloaded from the Block Buffer is a numeric word, or an End of Data character or a non-ignore alphabetic character. Used to determine whether Block Buffer is to be filled during next Print-Slew cycle.

FFCS1: File Code Sequence Check. Set when a Start File code is sensed and reset when an End File code is sensed. Used to check sequence.

FFT1: File Tracking Flip-Flop. This flip-flop is used to store the "In File" or "Out of File" status at the beginning of a block of data to be entered into the Block Buffer. This flip-flop is reset/or set only at the time a Beta marker is detected with tape running forward.

FHH1: Load Anticipate Flip-Flop (On-Line). During On Line operation, this flip-flop remains set throughout the Fill cycle, and is reset upon receipt of a Go Ahead and Print signal from the processor only if a character has been loaded into the Block Buffer. The set state of this flip-flop signifies that the printer system is ready for receipt of data.

FIE1: Input Error. This flip-flop is set whenever an input error is detected. Row parity, column parity, forbidden code detect, and buffer overflow are checked.

FIF1: In File Flip-Flop. This flip-flop serves as a Fill selector for the Block Buffer. When a Start File "N" code is detected, which corresponds to a plugboard File "N" Selection, this flip-flop is set, allowing following data to be loaded into the Block Buffer. It is reset when it has been set and an End of File Code is detected. During a Backspace Tape command, when an Error is on, the status of the File Tracking flip-flop is transferred to this flip-flop when a Beta marker is sensed. During an unedited mode, this flip-flop is locked out in set, since all data is considered to be "In File."

FLP1: Line Printed Flip-Flop. Initially, upon entry into the Print cycle, this flip-flop is reset. When the line has been printed, this flip-flop is set, preventing a second printing should it be necessary to remain in the Print cycle. It will be reset during Transfer when the Block Buffer status flip-flop is set, signifying an Unload State.

FLPF1: Last Paper Form. Set when the last paper form has passed through the print station. Signifies that paper is to be replaced.

FLU1-2: Marker Check Lockup Flip-Flops. These two flip-flops together form the marker stroke pulse. When the Marker Enable Gate One Shot is triggered, FLU1 will be set. FLU2 will be set when the Marker Enable Gate one shot has reset and FLU1 is set. FLU2 resets itself on the following clock—generating a one clock period strobe pulse.

FMC1-3: Marker Track Counter. This counter counts the number of pairs of marker pulses detected during the interval that the Marker Enable Gate one shot is operating. The counter is reset when the Marker Enable Gate one shot is reset and a Marker Track Follower gated clock pulse is generated. Under normal circumstances this would be the second marker pulse of a group. The counter is not closed loop, i.e., it counts up to a count of "7" and ignores any further pulses.

FME1–6: Mechanism Error Flip-Flop. Used to detect errors chargeable to the printer mechanism and paper feed engine. Paper runaway, No Slew Code, Vertical Format tape parity, illegal slewing, and broken VFU Tape loop are detected.

FMF1: Tape Marker Follower Flip-Flop. This flip-flop tracks the marker channel of the tape, providing a retiming function. It is set each time a signal is sensed and resets itself on the next clock pulse. During on line operation, it forms part of the retiming pulse network for the Data Strobe Pulse.

FMR0–9: Memory Register: These flip-flops serve as the In/Out register for the Block Buffer. In a rest state they are set, input data representing "0's" resetting the selected flip-flops. The purpose of pre-setting allows the detection of open data lines. If a Data Strobe is received, but no data, the status of the Memory Register would indicate a Forbidden Code configuration. Zeros rather than ones are stored in the Block Buffer. Therefore, if data is lost through malfunction of the buffer magnetics, the Memory Register again would signify a Forbidden Code.

FMS1: Marker Scaling Flip-Flop. This flip-flop is a binary scaler and will change state each time the Marker Track Follower flip-flop is set.

FNS1: Numeric Word Sign Store Flip-Flop. Used in Transfer cycle to store the algebraic sign of numeric words. Format of data is such that the numeric sign precedes the digits of numeric words. In printing, however, the sign is to be printed following the least significant digit. This flip-flop acts as a short term memory, allowing the sign to be printed as desired.

FNW1: Numeric Word Flip-Flop. This flip-flop determines the sequence of events in Transfer and also acts as a "lock" during Fill and Transfer. It can only be set or reset on a Word Character Counter count of "0." The determination of a word being numeric causes this flip-flop to be set, conversely, an alpha-numeric word causes it to be reset. It is locked in the Set state (Numeric) when in the Unedited printout mode, causing all data to be treated as numerics.

FPC1–4: Program Counter Flip-Flops. These four flip-flops determine the cycles of operation; Fill, Transfer, Print, and Slew. They are set and reset under specific sets of conditions described elsewhere.

FPE1: Print Enable Flip-Flop. This flip-flop is used in Print cycle and determines the period of time when printing may actually take place. The class of print desired for the particular line causes the time at which this flip-flop is set and reset to differ. When print is to be Gothic, this flip-flop is set upon sensing the first Typewheel Character Index pulse following the Typewheel Revolution Index Pulse, and is reset upon completion of Gothic characters on the typewheel. When E13B printing is selected, this flip-flop is not set until the first E13B character is in the print position, and is reset when the last E13B has been sensed on the typewheel.

FPM1: Print MICR Characters Flip-Flop. This flip-flop controls the type of characters printed in the Print cycle. It is set in Transfer by recognition of the proper control character. It will be reset if an alpha-numeric character other than a space is sensed during Transfer, or an & is sensed in a numeric word. It will also be reset when the line has been printed.

FPNS: Print Negative Sign. Set when numeric word sign store flip-flop is set. Used to cause printing of negative sign when detected if FNS1 is set.

FPL1: Print One Line Flip-Flop. This flip-flop acts as a mode selector and is set by depressing either "Print One Line" or "Stop" on the operator's panel. When set, it causes one line to be printed and then the printer stops. Its usefulness lies in determining the proper restart point following an error. It is reset by either the Reset line, "Reset" switch, or the "Print" switch.

FPRA1: Paper Runaway Detect. Set when a top of page, "4 & 5" code is detected. Causes Mechanism Error flip-flop to be set if slewing continues. Reset when slew command ceases.

FPS1: Programmed Slew Character Detected Flip-Flop. This flip-flop is used to determine whether a programmed Slew Code has been sensed and if not, causes a Plugboard Slew entry to be made into the first four stages of the Slew Character Register. It is reset upon completion of a Slew cycle.

FRS1: On Line Reset Flip-Flop. Sets only when operating On Line and a reset signal is received from the central processor. Reset automatically after 100 millisecond delay by On Line Reset Delay One Shot.

FRP1–4: Row Parity Flip-Flops. Each flip-flop is an independent binary scaler, connected to corresponding pairs of data lines. Logic is such that the flip-flop is upset only if one of the two data pulses is present, and will not be upset if neither, or both, are present. They are operative in both Fill and Transfer.

FSC1: Stop Code Store Flip-Flop. This flip-flop is used as a memory store and control when a Stop Code character is detected during an "In File" when in Fill cycle. Setting of this flip-flop causes the printer to stop when an End of File is detected and all data has been printed. It signifies that all data pertaining to the selected file has been printed. It is reset by the Reset Line only.

FSL1: Set VFU Loop Flip-Flop. This flip-flop controls the proper indexing of the Vertical Format Unit paper control loop. Depression of the "Position Loop" button on the operator's panel sets this flip-flop, causing the paper transport mechanism to advance. It will be reset upon sensing a "4–5" punch code in the paper tape loop, and will stop the mechanism. It is used to permit the paper forms to be properly synchronized with the paper loop.

FSP1: Space Paper Flip-Flop. Depression of the "Space Paper" button on the operator's panel sets this flip-flop and causes paper to be advanced; reset being established by the next Line Marker pulse, stopping paper movement.

FSPR: Stop Processing Flip-Flop. Used during Print cycle to reset the Print Enable flip-flop. May be set by Stop Print decode or if errors occur that make proper printing impossible.

FSR1–3: Slew Code Register Flip-Flops. These three flip-flops store the slew information pertaining to the completion of the line in process. The particular mode of operation is determined by FSR4. When a Slew N Lines code is detected, the three flip-flops act as a binary counter. When a Slew to Code N is detected, the flip-flops remain static throughout the slew. If no slew code has been detected for the line in process, a slew code is entered from the Plugboard Slew hubs.

FSR4: Slew Code Mode Flip-Flop. This flip-flop is set or reset by sensing the appropriate bit of a Slew Code character during Transfer, or is set from the Plugboard Slew hub if no slew code has been detected. When set, this flip-flop causes the Slew cycle to progress in the Slew N Lines mode, and causes the first three Slew Code Register flip-flops to operate as a binary counter. When reset, the Slew to Code N decode logic is enabled.

FTF1: Tape Forward Flip-Flop. This flip-flop controls the forward motion of the magnetic tape in Off Line operation. When set, tape is caused to move forward. This flip-flop is set whenever a Fill cycle is entered, if a Stop Code or Out of File, condition is not detected, and the Block Buffer is in a Load state. Depression of the "Tape Forward" button will also set this flip-flop. Reset is accomplished by the detection of a Gamma marker and that either a character has been loaded into the Block Buffer or an Error has been sensed. This is overriden when the "Tape Forward" button is depressed. Upon release of the "Tape Forward" button, reset is as described above.

FTR1: Tape Reverse Flip-Flop. This flip-flop controls the reverse motion of the magnetic tape in an Off Line operation. What set, tape is caused to move in reverse. This flip-flop is set by depression of the "Backspace Tape" button on the operator's panel. Reset is accomplished when an Alpha marker is detected. Each time the "Backspace Tape" button is depressed, the tape will reverse one record block.

FWC1-2: Word Character Counter. These two flip-flops constitute a modulo 4 binary counter, and are used to properly index data during Fill and Transfer cycles. On the count of Zero, Control Column detection circuitry is enabled. On the count of 3 of alpha-numeric words, special command character decodes are enabled. When numeric words are detected, the counter is stepped in Transfer when both 4 bit characters of the 8 bit columns have been processed.

FZS1: Zero Suppress Flip-Flop. This flip-flop is used to suppress unwanted zeros of a numeric word, and functions only in the Transfer cycle. It is set by plugboard Zero Suppress Start selection. When set, zero characters are inhibited from entry into the Typeline Buffer. The flip-flop is reset either when the plugboard Zero Suppress Stop is detected, or a non-zero is detected. Sensing an alphanumeric word will also reset the flip-flop.

*Cable signals*

JAH1: Transfer Data A side from Tape
JBH1: Transfer Data B side from Tape
JBT1: Beginning of Tape Signal-Off Line
J101–J110: On Line Input Data Lines
JCD1: On Line Data Strobe
JPRT0: Proceed to Print-On Line
JTM1: Tape Marker Track Amplifier Output
JT01–JT10: Tape Amplifier Outputs
JLF1: Last Form Detect From Printer
JPC1: Both Sides of Data Transferred Off Line
JET1: End of Tape Signal-Off Line
JCPR: Printer Reset—On Line
JTL1: Tape Loaded Signal—Off Line
JTRW: Tape in Rewind—Off Line
JPW1–JPW2: Typewheel Sync Pulses
JLM1: Line Marker Sync Pulse

*Relays*

KRS1: Power Turn On FF Reset Line
KPB1: Power Turn On Buffer Clear Signal
KCEP: Printer On—On Line

*One shots*

MD11: Block Buffer Load-Unload Inhibit. This one-shot is triggered each time the mode of operation of the Block Buffer is to be changed. During the operation of this one shot the operation of the Block Buffer is inhibited.

MD15: Marker Track Detect Enable. This synchronous one-shot, when triggered, enables the Marker Counter to be operative. It is triggered by the Marker Track Follower gated clock.

MD20: Typeline Buffer Load-Unload Inhibit. This one-shot is triggered each time the mode of operation of the Typeline Buffer is to be changed. During the operation of this one-shot, the operation of the Typeline Buffer is inhibited.

MD70: Slew Decelerate Time Delay. This one-shot is triggered when slewing is stopped and prevents printing until paper has come to a full stop.

MRD1: On Line Flip-Flop Reset Delay One-Shot.
MRD2: Buffer Clear Delay One-Shot.

*Plugboard*

PPS1: Print Sign Enable
PSE1: Slew Patch
PSF1-5: Select File N Patch
PZS01-24: Zero Suppress Start Patch
PZF01-24: Zero Suppress Stop Patch
PPR1: Plugboard On Patch

*Switches*

SBT1: Backspace Tape
SIN1: Input Select 1 On Line 0 Off Line
SRWT: Rewind Tape
SPL1: Print One Line
SPR1: Print
SRT1: Mode Select 1 Unedited 0 Edited
SRS1: Reset
SSL1: Set VFU Loop
SSP1: Space Paper
SST1: Stop
SNP1: Read Tape—Non Print
SNC1: Clock Select 1 Normal 0 Single Clk P
STM1: Test Mode Select 1 Test 0 Normal
SEI1: Error Ignore

*Decodes*

XAD1: Alpha Marker Detect. Detects Alpha marker sensed in Marker Counter at strobing time.

XC01-15: Typeline Buffer Column Address Decodes. Each decode forms one of the two selection lines necessary to determine the column into which a bit is to be stored in the Typeline Bufler. Operative only in the Transfer cycle.

XCB1-8: Typeline Buffer Column Address Decodes. Each decode forms one of the two selection lines necessary to determine the column into which a bit is to be stored in the Typeline Buffer. Operative only in the Transfer cycle.

XCD1-8: XCE1-8: Typeline Buffer Character Decodes. Each decode forms one of the two selection lines necessary to determine the row (character position) into which a bit is to be stored in the typeline buffer during Transfer, and which character line is to be strobed during Print. One "D" line and one "E" line are required to select any one character line.

XCP1-6: Column Parity Checks. Two separate column parity checks are made during the Fill cycle. Each half of the 8 bit data character is compared with the column parity bit for that half. If incorrect, the Input Error flip-flop will be set.

XED1: Block Buffer End of Data Code Detect. This decode is used to detect when all useful data has been unloaded from the Block Buffer during unload, but less than 400 characters had been stored during Fill. The End of Line Detect flip-flop must be set, and the Word Character Counter must not be on "Zero."

XEF1: End of File Code Detect. True whenever an End of File code is detected in the least significant character position of an alpha-numeric word, in Fill cycle only.

XEL1: End of Line Code Detect. True whenever any End of Line code is detected in the least significant character position of an alpha-numeric word during Transfer.

XFB1: Forbidden Character Detect. Detects the presence of four one's in either half of an 8 bit character. It is disabled when an End of Line code is sensed, so that End of Data characters may be detected without tripping the error circuits. It is also disabled in an Unedited print mode.

XFC1: File Code "N" Detect. Detects the presence of a File Code "N" character during the Fill cycle.

XFS1: File Select Decode. When a File Code "N" character is detected and corresponds to the file selected by the plugboard, this decode is true and is used to set the In File flip-flop.

XFCS: File Code "START" Detect. True when any File Code "Start" is detected during Fill.

XIC1: Program Counter Error. Used to detect invalid combinations of program counts. Sets Buffer Error flip-flop if true.

XIG1: Ignore Character Code Detect. True if an Ignore character is detected in an alpha-numeric word. It is used in the Transfer cycle to cause the next character to be processed without advancing the Typeline Buffer Column Address Counter. The Ignore character is not loaded into the Typeline Buffer.

XLC1: Typeline Buffer Column Address Counter Lockup Detect. Detects that the counter is in the lockup count (1111111). Used as a rest state for the Print cycle.

XNP1: Non-Print Character Detect. Used to detect control characters in the least significant character positions of alpha-numeric words. Prevents the control characters from being loaded into the Typeline Buffer. Locked out in Unedited print modes.

XNZ1: Numeric Word Non-Zero Detect. True when a bit is present in either half of an 8 bit character. Used to detect the presence of a non-zero numeric when the Zero Suppress flip-flop is set.

XPS1: Plugboard Slew Entry Gate. Causes the plugboard slew code to be entered into the Slew Register if no Slew Code character has been entered.

XPC0: Zero Program Count. Detects the Rest state of the printer system.

XPR1: Printer Ready Decode. True when printer is not in error, Reset line is down and power is on.

XRC1: Unedited Mode Sign Character Print Enable. True when an Unedited print mode is selected. Allows the Sign character of words to be entered into the Typeline Buffer as numeric equivalents.

XRP1: Row Parity Detect. Detects a row parity error; during Fill when a tape Gamma marker is detected; during Transfer when the last character of a word has been transferred.

XRS1: Reset Line. Returns printer system to a Rest state.

XRT1: Unedited Mode Column Address Counter Reset. Resets Column Address Counter in Unedited Mode and primes conditions for entry into Print cycle.

XSC1: Stop Code Detect. Detects a Stop Code character in the least significant character position of an alphanumeric word during Fill cycle.

XSCD: Slew Countdown Gate. True when clocked by the Line marker pulse and the Slew Register flip-flops have not been reset. Causes the Slew Register to be "down" counted by one for each Line Marker pulse.

XSD1: Slew Completed Detect. Senses when the Slew Code stored in the Slew Register corresponds to the Vertical Format Unit tape code. It is clocked by the Line Marker pulse.

XSE1: Beta-Gamma Sequence Error. Used in Fill cycle, Off Line to detect the proper sequence of Beta and Gamma markers. Sets error flip-flop if wrong sequence is encountered.

XSF1: XSF6: Start of File "N" Code Detect. Used to enable the In File flip-flop when a Start File code has been detected. Compares the plugboard selection with the code stored in the Memory Register. Goes true if in agreement.

XPSE: Print Numeric Sign Enable Gate. Allows the numeric sign of a numeric word to be printed in the column selected by the plugboard selection. Causes the proper code to be entered into the Typeline Buffer to print a minus sign if detected or space if a plus sign is detected.

XSK11: Typeline Buffer Column Address Counter Skip Count Detect. During Print cycle, detects those counts in the binary progression for which there is no printable character, and causes the counter to continue counting until the next valid count is reached.

XSL1: Slew Paper Control. Control line which directly feeds slewing mechanism on the printer. True whenever paper is to be slewed.

XSLE: Slew Entry Enable Decode. True when conditions for entry into Slew are sensed.

XSP1: Stop Print Decode. Used during the Print cycle to reset the Print Enable flip-flop. Detects the last printable character on the typewheel in position.

XSR1: Slew Code Detect. Detects a Slew Code character in the Transfer cycle.

XSS1: Slew Character in Store Detect. Detects when one of the Slew Code Register flip-flops is in the Set state.

XVP1: VFU Brush Parity. Detects incorrect hole punching on the VFU tape.

XVB1: Broken VFU Loop Detect. Sensed when all VFU loop channels are "Holes" indicating no VFU loop in place.

DETAILED SYSTEM DESCRIPTION

A more detailed description will now be given of the system of the present invention. The description will be divided into topics, each pertaining to a specific area of the system. The topics will be presented in the order thought to most clearly describe the invention.

Operator's panel

Figure 21:
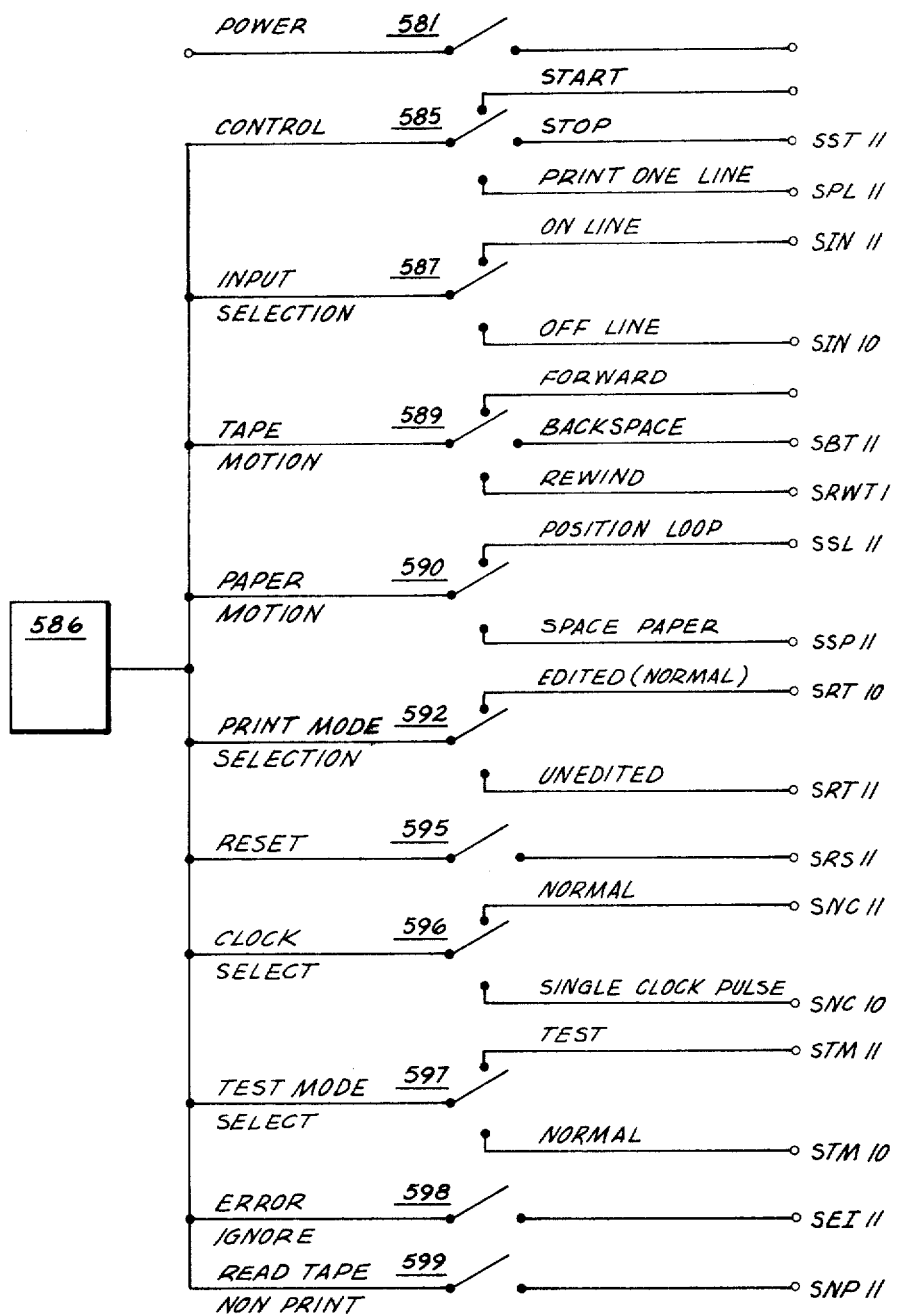
FIG. 21 is a schematic illustration of the Operator's Panel of the system of the present invention.

The operator's panel provides a means for controlling the operation of the Multiple Font High Speed Printer Control System. Switches, represented schematically in FIG. 21, provide a means for supplying appropriate voltage levels to the various portions of the system. A power switch 581 is connected to a suitable voltage supply source (not shown) at terminal 582. The switch, when closed, connects the power source to the system of the present invention thereby enabling logic circuitry, control circuits, and power supplies to perform their respective functions. The representation of the power switch 581 in FIG. 21 merely illustrates the function performed by a power control switch on the operator's panel. The switch 581 may, in practice, take the form of a relay operated switch which, when energized, will close other switches for the connection of power to the system.

A control switch 585 is provided to control the operation of the system of the present invention. The control switch 585 is connected to a voltage source 586 which supplies appropriate voltage levels to the various switches of the operator panel. The control switch 585 may momentarily be closed in any one of three positions viz START, STOP, and PRINT ONE LINE. Closing of the control switch in the START position causes the operation of the Multiple Font High Speed Printer Control System of the present invention to commence. Closing of the control switch at the STOP position stops the operation of the system upon completion of the printing of the line in print in process at the time the switch is closed. When the control switch 585 is closed at the PRINT ONE LINE position, the voltage signal provided by the control switch causes the operation of the system to commence and then stop upon the completion of the processing of one line of print.

An input selection switch 587 is provided to enable the operator to select the appropriate type of input information being supplied to the Multiple Font High Speed Printer Control System. When the input selection switch 587 is in the "On Line" position, the system of the present invention will treat all incoming information in a manner appropriate to the handling and processing of information received directly from a data processing system. When the input selection switch is in the "Off Line" position, the system will provide appropriate file searching and control signals to accept information from a magnetic tape and control the reading of the tape.

A tape motion switch 589 is provided for selecting the appropriate tape motion for the operation being performed. The tape motion switch 589 may be placed in one of three positions: Forward, Back Space, and Rewind. When the tape motion switch is placed in the Forward position, the magnetic tape is caused to run forward as long as the switch is maintained in that position. When the switch is moved from the Forward position, the tape stops at the end of the next block in information. When the tape motion switch is placed in the Back Space position, the tape is caused to back up one block for each actuation of the tape motion switch in the Back Space position. When the tape motion switch is placed in the Rewind position, the magnetic tape is caused to rewind; the rewind signal provided by the tape motion switch 589 will continue to cause the rewinding motion until the switch is moved from the Rewind position.

A paper motion switch 590 is provided to permit the operator to position and control paper movement. The operator may place the switch 590 in the POSITION LOOP position, to cause the punched paper tape loop to advance until correct registration between the paper tape position and the paper is obtained. The paper motion switch is also provided with a space paper position which permits the operator to advance the paper one line.

A print mode selection switch 592 enables the operator to choose between two modes of operation. When the print mode selection switch is in the edited (or normal) position, the information presented to the control system from the magnetic tape is searched for a specific code indicating that the information about to be received is to be printed. When the print mode selection switch is in the unedited position, the blocks of information received from the magnetic tape are all loaded into the system and the words are all treated as numeric words.

A reset switch 595 is also provided to enable the operator to reset the various counters, flip-flops, and other logical elements of the Printer Control System. A clock select switch 596 is provided to permit the selection of normal clock frequency, and thus normal operation, or a single clock pulse to permit the operator to advance the logical development of the system only a single clock pulse thus enabling him to detect possible errors in the operation.

A test mode selection switch 597 is provided to enable the operator to select a normal operation (thus providing switch signal STM10), or a test mode of operation which may be useful during certain testing procedures (thus providing switch signal STM11). An error ignore switch 598 is also provided to enable the operator to cause the system to disregard input errors and continue operation. The closing of the error ignore switch 598 provides switch signal SEI11.

A run tape non-print switch 599 is provided for permitting the operator to cause the Printer Control System to advance the magnetic tape without reading or printing that information. The signal provided by closing the switch 599 is switch signal SNP11.

It will be noted that with the exception of the power switch 581, the remaining switches on the operator's panel are all connected to a suitable voltage supply to thereby provide a correct logic level signal to the selected terminals or positions chosen by the manual operation of the several switches. The power switch 581 is connected to a power source (not shown) suitable for the supply of electrical power to the entire Multiple High Speed Printer Control System. The switches shown in FIG. 21 are schematic representations, and therefore, merely indicate the function or functions performed by the various control switches provided on the operator's panel of the system of the present invention. It will be apparent to those skilled in the art that in many instances, it may be necessary to provide different voltages to different switches, and provide electromagnetically operated relay contacts for response to the operation of the manual switches such as shown in FIG. 21.

The signals provided by the switches may be designated by prime logic descriptors similar to those previously described. Accordingly, adjacent to each output terminal of each appropriate switch, a prime logic descriptor is given for those signals that are to be utilized in the logical development of other signals in various locations throughout the system. For example, the input selection switch 587 may provide one of two signals that are utilized to indicate On Line operation (SIN11), or Off Line operation (SIN10). Similarly, the print mode selection switch 592 may be placed in either the edited print mode position to provide the switch signal SRT10, or may be placed in the unedited mode position to provide the switch signal SRT11.

*Code*

As stated previously, information presented to the Multiple Font High Speed Printer Control System of the present invention from magnetic tape is presented in columns of ten bits. Two of the ten bits are reserved for parity checking, and the remaining eight bits may represent a single alphanumeric character, or, two numeric characters. The first column, or control column, of a word contains the Mod 3 bits which indicate whether the following characters are numeric or alphanumeric; accordingly, the bits following the first column are treated in accordance with the indication of the type of characters indicated in the first column.

The last column (least significant character position) of a word, if the word is alphanumeric, may also be utilized for control commands. The control commands may contain instructions to the system to indicate such things as "End of Line," "Begin File," "Print MICR," etc. It may be noted that the code for numeric words is the same for any given word regardless of the font in which the word is to be typed. For example, the MICR character 2 and the Gothic character 2 both have the code 0010. The information regarding the font to be utilized is contained in the control command code 0111 0001 which may be found in the control command code position of the immediately preceding alphanumeric word.

The following table illustrates the code utilized for each print character.

PRINT CODES

| Character | | Code |
|---|---|---|
| E13B | Gothic | |
| 0 | 0 | 0000 |
| 1 | 1 | 0001 |
| 2 | 2 | 0010 |
| 3 | 3 | 0011 |
| 4 | 4 | 0100 |
| ∎⌐ | $ | 0101 |
| | | 0110 |
| ∎∎⌐ | & | 0111 |
| 5 | 5 | 1000 |
| 6 | 6 | 1001 |
| 7 | 7 | 1010 |
| 8 | 8 | 1011 |
| 9 | 9 | 1100 |
| ⌐∎ | . | 1101 |
| ⌐⌐∎ | , | 1110 |
| | Space | 0001 0000 |
| | A | 0001 0001 |
| | B | 0001 0010 |
| | C | 0001 0011 |
| | D | 0001 0100 |
| | % | 0001 0101 |
| | # | 0001 0110 |
| | Ignore | 0001 0111 |
| | E | 0001 1000 |
| | F | 0001 1001 |
| | G | 0001 1010 |
| | H | 0001 1011 |
| | I | 0001 1100 |

PRINT CODES—Continued

| Character | | Code |
|---|---|---|
| E13B | Gothic | |
| | = | 0001 1110 |
| | J | 0010 0001 |
| | K | 0010 0010 |
| | L | 0010 0011 |
| | M | 0010 0100 |
| | + | 0010 0110 |
| | N | 0010 1000 |
| | O | 0010 1001 |
| | P | 0010 1010 |
| | Q | 0010 1011 |
| | R | 0010 1100 |
| | — | 0010 1110 |
| | / | 0011 0001 |
| | S | 0011 0010 |
| | T | 0011 0011 |
| | U | 0011 0100 |
| | V | 0011 1000 |
| | W | 0011 1001 |
| | X | 0011 1010 |
| | Y | 0011 1011 |
| | Z | 0011 1100 |
| | ? | 0011 1110 |

The following table illustrates the control command codes utilized to instruct the Multiple Font High Speed Printer Control System of the present invention:

CONTROL COMMAND CODES

| Command | Code |
|---|---|
| Slew to Code N    N=0 | 0100 0000 |
| Do              N=1 | 0100 0001 |
| Do              N=2 | 0100 0010 |
| Do              N=3 | 0100 0011 |
| Do              N=4 | 0100 0100 |
| Slew N Lines    N=0 | 0100 1000 |
| Do              N=1 | 0100 1001 |
| Do              N=2 | 0100 1010 |
| Do              N=3 | 0100 1011 |
| Do              N=4 | 0100 1100 |
| Slew to Code N  N=5 | 0100 0101 |
| Do              N=6 | 0100 0110 |
| Do              N=7 | 0100 0111 |
| Slew N Lines    N=5 | 0100 1101 |
| Do              N=6 | 0100 1110 |
| END OF LINE | 0100 0101 |
| STOP CODE | 0101 1110 |
| END OF FILE | 0101 0000 |
| BEGIN FILE 1 | 0110 0001 |
| BEGIN FILE 2 | 0110 0010 |
| BEGIN FILE 3 | 0110 0011 |
| BEGIN FILE 4 | 0110 0100 |
| BEGIN FILE 5 | 0110 1000 |
| BEGIN FILE 6 | 0110 1001 |
| PRINT MICR (E13B) | 0111 0001 |
| SPECIAL CODE—end of data in Block Buffer—may occur in any column but the control column. | 0000 1111 |

*Clock system*

The operation of the Multiple Font High Speed Printer Control System of the present invention is synchronized through the utilization of a clock system. The clock system compriess a master 250 kc. clock with suitable clock drivers for providing synchronizing pulses to the various circuits of the system. In addition to the regular clock pulses, clock line drivers are utilized to amplify the clock pulse to the appropriate logic levels necessary for operation of the various circuits. Further, to enable the clock pulses to perform certain logical functions, several of the clock line drivers are "gated." The gating of the various clocks enables clock pulses to be delivered to specified circuits in the Multiple Font High Speed Printer Control System at predetermined times, thus enabling the operation of the respective circuits only when the corresponding clock pulses are received.

Figure 22:
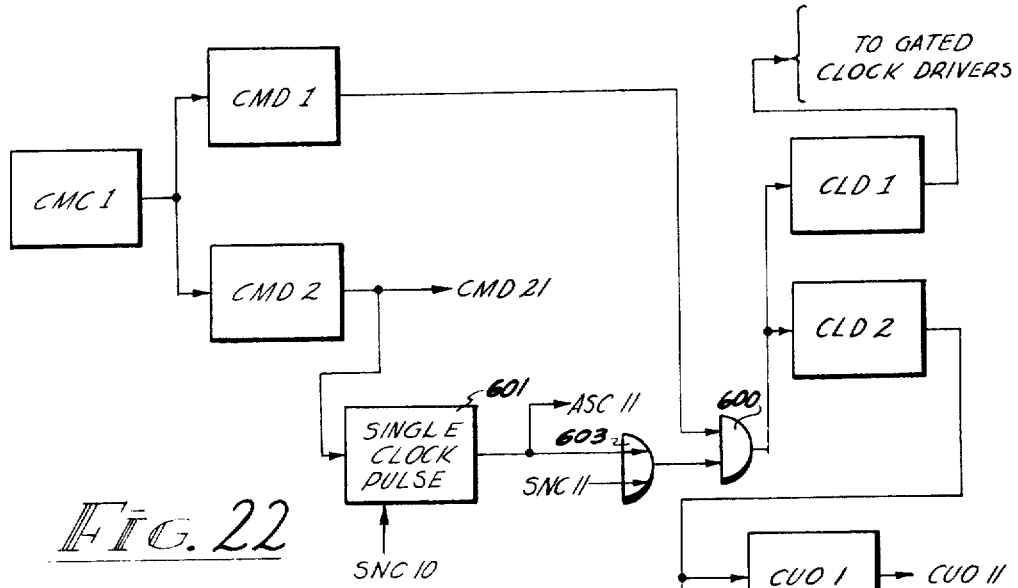
FIG. 22 is a schematic illustration of the Master Clock System of the present invention.

Refering to FIG. 22, a block diagram is shown of the master clock system. A master 250 kc. clock CMC1 is shown which provides a 250 kc. clock pulse to two master clock drivers CMD1 and CMD2. Pulses from master clock driver CMD1 are applied to an AND-gate 600. Output pulses from the master clock driver CMD2 are utilized throughout the system, and the signal therefrom is indicated as CMD21. The output from the master clock driver CMD2 is also applied to a single clock pulse circuit 601 which, when provided by an appropriate triggering signal SNC10 from the operator's panel will provide a single clock pulse output before immediately resetting itself and prohibiting further clock pulses to be presented at its output.

The single clock pulse circuit 601 is used when it is desired to enter a single clock pulse into the Multiple Font High Speed Printer Control System. The single clock pulse may be utilized in the checking of system operation or in the performance of certain logical manipulations. The output from the single clock pulse 601 is applied to an OR-gate 603 which, in turn, is connected to the AND-gate 600. Under normal operation, when a single clock pulse is not desired, a signal from the operator's panel SNC11 is applied to the OR-gate 603 to thus enable the AND-gate 600 to produce a pulse each time a pulse is received from master clock driver CMD1.

The output from the AND-gate 600 is applied to line drivers CLD1 and CLD2. The output pulse thus provided by the line driver CLD1 is applied to a plurality of gated clock drivers which, upon receipt of appropriate logic signals in combination with the output signal from the line driver CLD1 will provide clock signals to various circuits throughout the Multiple Font High Speed Printer Control System.

The output from the line driver CLD2 is applied to a plurality of ungated clock drivers CU01–CU04. The ungated clock drivers provide clock pulses, synchronized to the master clock pulse of 250 kc., to the appropriate circuits of the Printer Control System continuously, without the necessity of gating signals. While only four ungated clock drivers are shown, it may be advantageous to use more than four; thus, each succeeding driver would be numbered in succession such as CU05, CU06, etc.

Figure 23:
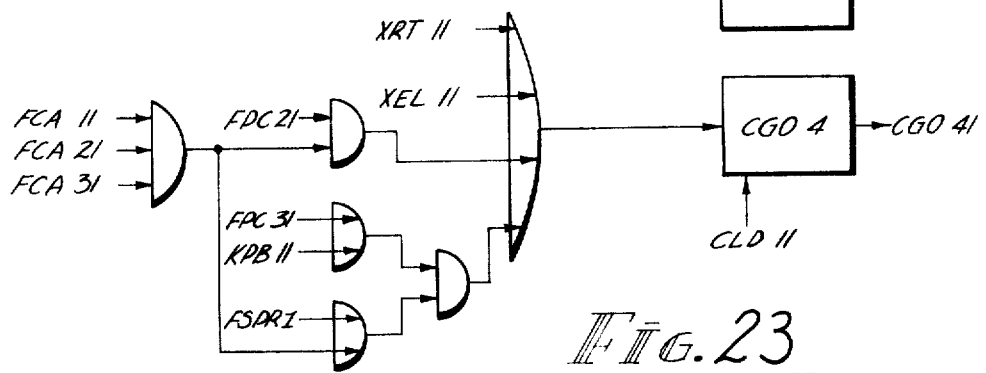
FIG. 23 is a schematic illustration of a gated clock driver-column address counter.

Referring to FIG. 23, a gated clock driver CG04 is shown. The gated clock driver CG04 receives a clock signal from the line driver CLD11. Thus, the clock driver CG04 provides a clock pulse output only when a clocking signal is received from the appropriate line driver. The logical input to the gated clock driver CG04 is provided by the logical arrangement of OR- and AND-gates connected to the Column Address Counter flip-flop signals FCA11–FCA31, the Program Counter flip-flop signals FPC21–FPC31, relay signal KPB11, the Stop Printing flip-flop signal FSPR1, and the decoding circuit signals XRT11 and XEL11. The output of the gated clock driver CG04 provides the necessary clock pulse to the Column Address Counter.

Figure 24:
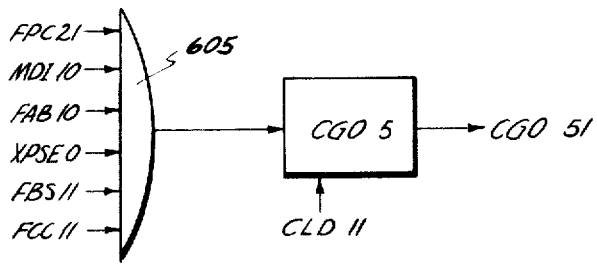
FIG. 24 is a schematic illustration of the gated clock driver-block buffer unload synchronizing signal.

Referring to FIG. 24, gated clock driver CG05 is shown in block form. The gated clock driver CG05 receives clock pulses from the line driver CLD11 and a logical input from an AND-gate 605 which provides the logical conjunction of the Program Counter flip-flop signal FPC21, the one-shot signal MD110, Numeric Word Select flip-flop signal FAB10, decode circuit signal XPSE0, the Block Buffer Status flip-flop signal FBS11, and the Control Counter flip-flop signal FCC11. The output of the gated clock driver CG05 provides synchronizing pulse to unload the block buffer.

Figure 25:
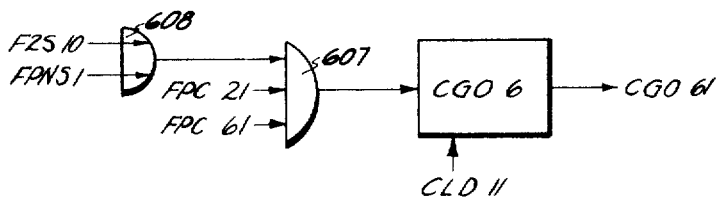
FIG. 25 is a schematic illustration of the gated clock driver-typeline buffer load synchronizing signal.

Refering to FIG. 25, gated clock driver CG06 is illustrated in block diagram form. The gated clock driver CG06 receives a clock pulse from the line driver CLD11, and a logical input from AND-gate 607. AND-gate 607 provides the logical conjunction of the outputs of flip-flops FPC21, FPC61, and an OR-gate 608. OR-gate 608 receives signals from the Zero Suppress flip-flop FZS10 and the Print Negative Sign flip-flop FPNS1. The output of the gated clock driver CG06 provides a loading synchronizing signal for the typeline buffer.

Figure 26:
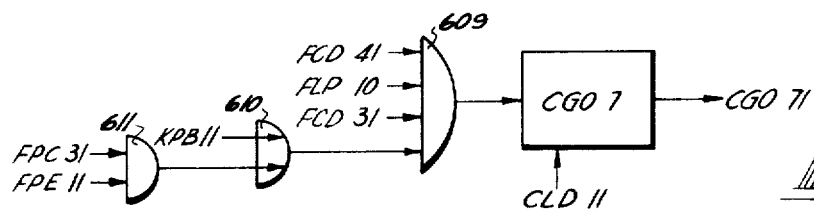
FIG. 26 is a schematic illustration of the gated clock driver-typeline buffer unload synchronizing signal.

Referring to FIG. 26, the gated clock driver CG07 is shown in block diagram form. The gated clock driver CG07 receives a synchronizing signal from the line driver CLD11, and a logical input from an AND-gate 609. AND-gate 609 provides the logical conjunction of the outputs of Fast Clock Counter flip-flop FCD41, the Line Printed flip-flop FLP10, and the Fast Clock Counter flip-flop FCD31. The AND-gate 609 is also provided with a signal from an OR-gate 610. The OR-gate 610 is supplied with signals from relay KPB11 and a second AND-circuit 610. AND-gate 610 provides a logical conjunction of the outputs of the Program Counter flip-flop FPC31, and the Print Enable flip-flop FPE11. The output of the gated clock driver CG07 provides the synchronizing pulse to the typeline buffer during the unloading operations thereof.

Figure 27:
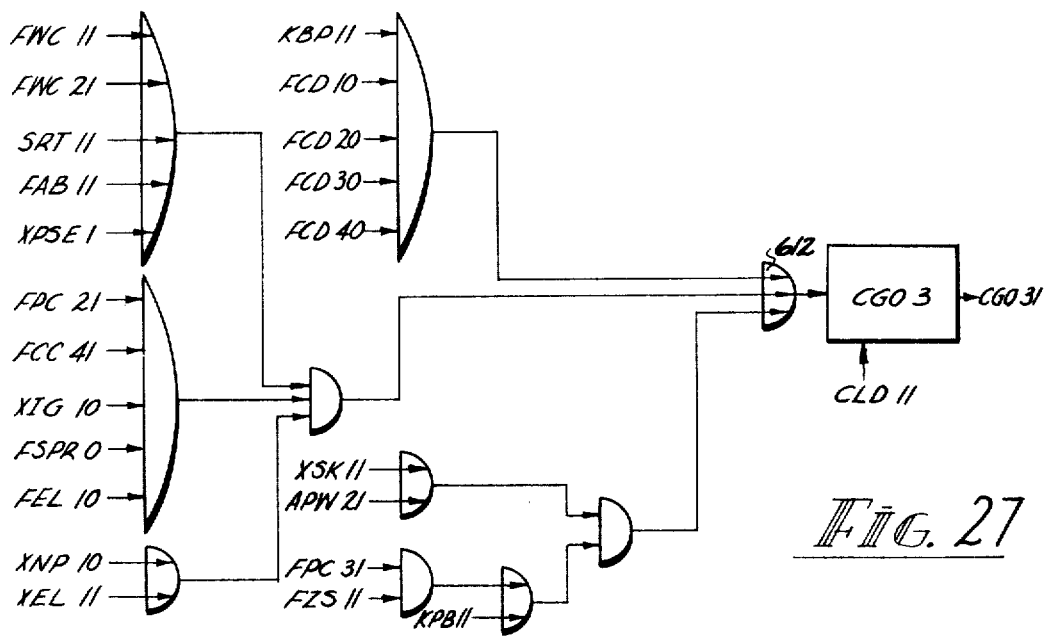
FIG. 27 is a schematic illustration of a gated clock driver-column address counter.
Figure 28:
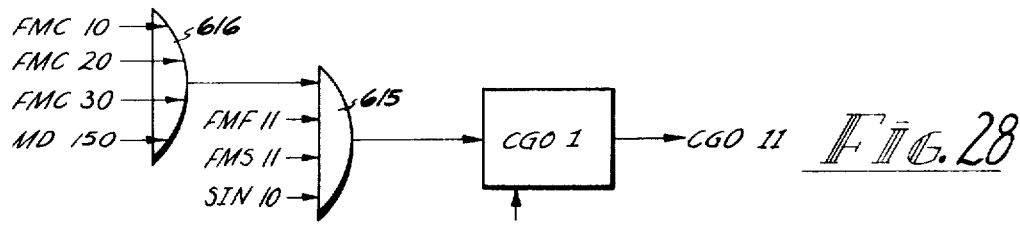
FIG. 28 is a schematic illustration of the gated clock driver-marker track follower.

Referring to FIG. 27, the gated clock driver CG03 is shown in schematic form. The gated clock driver CG03 is provided with a clock signal from the line driver CLD11 and a logical input from an OR-gate 612. OR-gate 612 is provided with the logical input from other OR- and AND-gates which combine signals from other circuits of the Printer Control System according to the logic arrangement shown in FIG. 27. The logic signal thus provided by the OR-gate 612 to the gated clock driver CG03, will provide, when a clock pulse is received from line driver CLD11, a gated clock signal CG031 which, in combination with the previously discussed clock signal CG41, provides the necessary synchronization signals to the Column Address Counter of the Printer Control System.

Referring to FIG. 8, the gated clock driver CG01 is shown in block diagram form. The gated clock driver CG01 receives a clock pulse from line driver CLD11, and a logical signal from the AND-gate 615. AND-gate 615 receives an input signal from OR-gate 616, an input signal from the output of Marker Follower flip-flop FMF11, Marker Scaling flip-flop FMS11, and from the input selection switch SIN10 (indicating that the Printer Control System is operating off line). The OR-gate 616 receives signals from the Marker Track Counter flip-flops FMC10–FMC30, and a signal from the marker track one-shot MD150. When the gated clock driver CG01 receives a logical signal from AND-gate 615, and a clock pulse from line driver CLD11, an output pulse is provided to the marker track follower to provide the appropriate synchronization of that circuit with the remainder of the Printer Control System.

Figure 29:
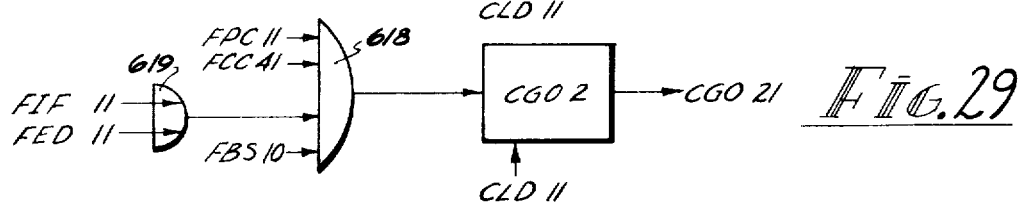
FIG. 29 is a schematic illustration of the gated clock driver-block buffer load synchonizing signal.

Referring to FIG. 29, the gated clock driver CG02 is indicated in block form. The gated clock driver CG02 receives a clock pulse signal from line driver CLD11, and a logical signal from AND-gate 618. The AND-gate 618 receives input signals from the output of the Program Counter flip-flop FPC11, the Control Counter flip-flop FCC41, and the Block Buffer Status flip-flop FBS1. The AND-gate 618 is also provided with an input from the output of an OR-gate 619, which, in turn, receives signals from the In File Detect flip-flop FIF11, and the End of Data Character flip-flop FED11. When the gated clock driver CG02 receives a logical signal from the AND-gate 618, and a clock pulse from the line driver CLD11, an output signal is provided to the block buffer to provide appropriate synchronization for the block buffer during the loading operation thereof.

Figure 30:
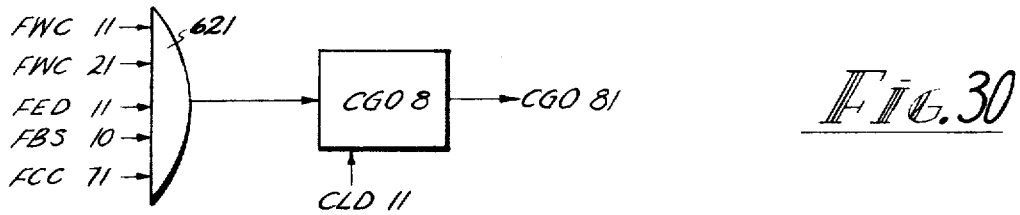
FIG. 30 is a gated clock driver-block buffer switch clear.

Referring to FIG. 30, the gated clock driver CG08 is shown in block form. The gated clock driver CG08 receives a clock pulse from line driver CLD11, and a logical signal from AND-gate 621. AND-gate 621 receives signals from the Word Character Counter flip-flops FWC11 and FWC21, the End of Data Character flip-flop FED11, the Block Buffer Status flip-flop FBS10, and the Control Counter flip-flop FCC71. When the gated clock driver CG08 receives a logical signal from the AND-gate 621, and a clock pulse from the clock line driver CLD11, an output pulse is provided to the block buffer to clear the switches that are utilized to address the block buffer and gain access thereto or direct information thereto.

Figure 31:
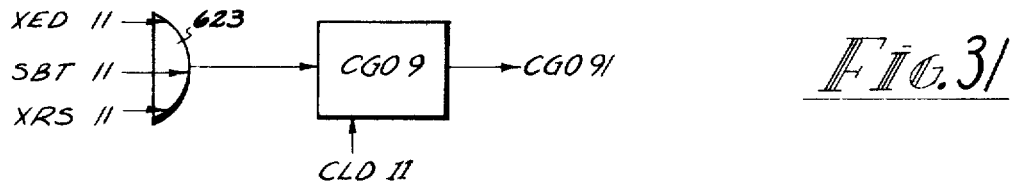
FIG. 31 is a gated clock driver-block buffer electronic clear.

Referring to FIG. 31, the gated clock driver CG09 is shown in block form. The gated clock driver CG09 receives a clock pulse from the clock line driver CLD11, and a logical signal from an OR-gate 623. The OR-gate 623 receives signals from the buffer end of data code detect decode XED11, the reset line decode XRS11, and the back space tape switch SBT11. When the gated clock driver CG09 receives signals from the OR-gate 623, and the clock line driver CLD11, an appropriate clock signal is applied to the block buffer to clear all electronics connected thereto to enable the block buffer to receive information.

Figure 32:
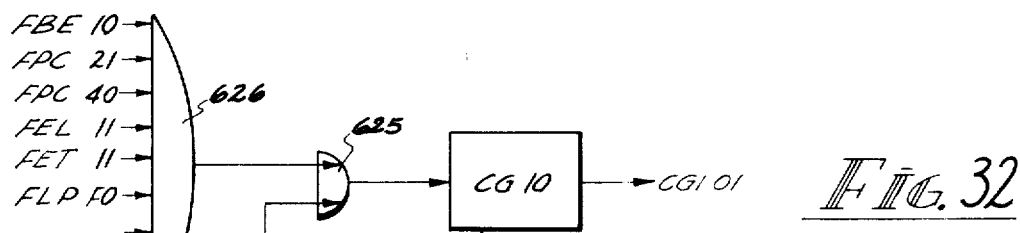
FIG. 32 is a gated clock driver-typeline buffer switch clear.

Referring to FIG. 32, the gated clock driver CG10 is shown in block form. The gated clock driver CG10 receives a clock pulse from clock line driver CLD11 and a logical signal from OR-gate 625. The OR-gate 625 receives a signal from an AND-gate 626 and an AND-gate 627. AND-gate 626 receives signals from the Buffer Error flip-flop FBE10, the Program Counter flip-flops FPC21 and FPC40, the End of Line flip-flop FEL11, the End of Transfer Cycle flip-flop FET11, the Last Paper Form flip-flop FLPF0, the Mechanism Error flip-flop FME10, and the slew decelerate one-shot MD700. The AND-gate 627 receives signals from the Line Printed flip-flop FLP10, the Print Enable flip-flop FPE10, the power on relay KPB11, and the typeline buffer unload inhibit one-shot MD200. When the gated clock driver CG10 receives a clock pulse from the clock line driver CLD11 and a logical signal from the OR-gate 625, a signal is provided to the typeline buffer for clearing all of the switches utilized to gain access to the information stored therein. This switch clearing action may be utilized to enable new information to be read into the typeline buffer.

Figure 33:
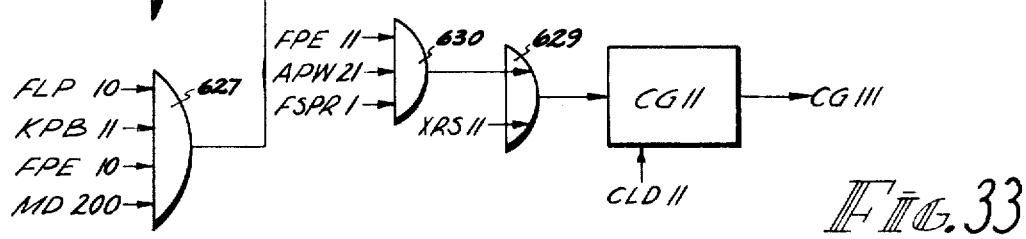
FIG. 33 is a gated clock driver-typeline buffer electronic clear.

Referring to FIG.33, the gated clock driver CG11 is shown in block form. The gated clock driver CG11 receives a clock pulse from the clock line driver CLD11, and the logical signal from an OR-gate 629. The OR-gate 629 receives signals from an AND-gate 630 and a reset decode circuit XRS11. The AND-circuit 630 receives signals from the Print Enable flip-flop FPE11, the Stop Printing flip-flop FSPR1, and the character pulse amplifier APW21. When the gated clock driver CG11 receives a clock pulse from the clock line driver 11, and a logical input signal from the OR-gate 629, a clock pulse is provided to the typeline buffer for clearing the electronic circuitry associated therewith. The operation of electronic clear may be utilized to prepare the typeline buffer for receiving new information to be stored therein.

It will be noted that in the discussion of the clock system of the Multiple Font High Speed Printer Control System discussed above, that the various sources of signals derived from circuits throughout the Printer Control System were not explained in detail. These signals are derived from the respective circuits when the circuit is in a described condition. For example, in the discussion concerning the gated clock driver CG11 (FIG. 33), an AND-gate 630 was provided for receiving signals from two flip-flops, FPE1, and FSPR, and from an amplifier APW2. It may be noted, from the discussion of logic terminology given previously, that the Print Enable flip-flop FPE1 must be in the "set" state to provide a signal FPE11. Accordingly, referring to the inputs of the AND-gate 630, it may be seen that the flip-flops FPE1 and FSPR must both be in the "set" state to provide the appropriate logical signal for the actuation of the AND-gate 630. Similarly, the amplifier APW2 must sense and amplify a character marker on the character marker wheel to provide an appropriate amplifier signal APW21. Thus, the AND-gate 630 must be provided with "set" signals from all three circuit elements before a logical signal is passed from the AND-gate 630 to the OR-gate 629. To alleviate the necessity of describing each and every one of the logical levels provided to the various AND- and OR-gates of the clock system, the respective circuits were merely indicated by their usual descriptors to indicate the necessary logical output for the operation of the connected logic gate.

Bus functions

Figure 34:
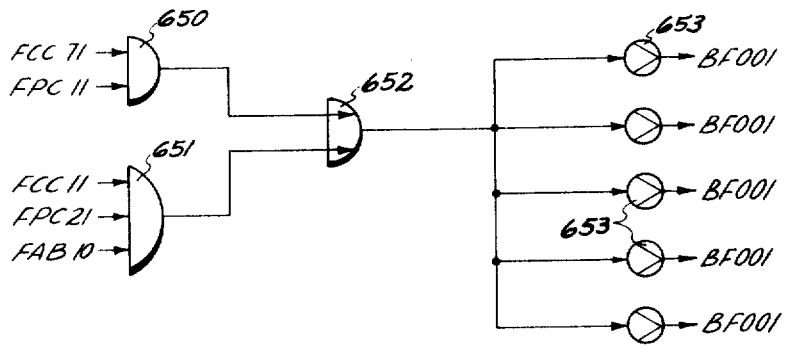
FIG. 34 is a schematic illustration of the development of the Bus Function BF001.

To facilitate the description and operation of the Multiple Font High Speed Printer Control System of the present invention, it is frequency necessary to combine signals from various circuits throughout the system in a logical manner. The many signals that are logically combined may be utilized to form a separate and distinct signal which, in turn, may be used by several circuits at various places throughout the Printer Control System. It has been found convenient to combine electrical signals from various circuits in a logical manner to provide a distinct signal which, although having no specific logical meaning in and of itself, may be utilized by other circuits throughout the system. By combining signals in this manner to provide these separate and distinct electrical signals, called Bus Functions, it has become possible to alleviate the necessity of combining large numbers of electrical signals each time the logical combination of these signals is to be utilized. Bus Functions will be indicated by the letters "BF" followed by three numerals to distinguish between the respective Bus Functions. For example, referring to FIG. 34, a schematic illustration of the development of the Bus Function BF001 is shown. An AND-gate 650 is provided for receiving signals from the Control Counter flip-flop FCC71 and Program Counter flip-flop FPC11. AND-gate 650 provides the logical conjunction of these two signals and supplies the appropriate logical signal to an OR-gate 652. A second AND-gate 651 receives signals from the Control Counter flip-flop FCC11 and Program Counter flip-flop FPC21 as well as the Numeric Word A–B Select flip-flop FAB10. The logical conjunction provided by the AND-gate 651 supplies a true signal, when the condition for the conjunction is present to the OR-gate 652. The output of the OR-gate is applied to a plurality of emitter followers 653 each of which provides appropriate amplification of the signal provided from the OR-gate 652 to enable the signal provided thereby to be applied at the proper logic level to various circuits throughout the Printer Control System.

Figure 35:
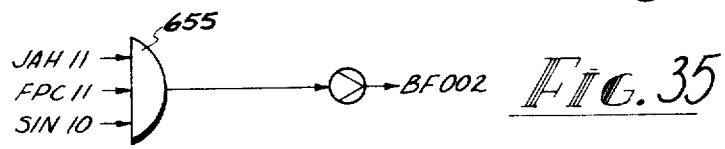
FIG. 35 is a schematic illustration of the development of the Bus Function BF002.

Referring to FIG. 35, a schematic illustration of the development of Bus Function BF002 is shown. An AND-gate 655 is supplied for receiving signals (JAH11) indicating that data is being transferred from the "A" half column of the ten bit column on the magnetic tape, from the Program Counter flip-flop FPC11, and from the input selection switch SIN10. The output signal from the AND-gate 655 is appropriately amplified by an emitter follower prior to the application of the resulting signal to various circuits throughout the Printer System as the Bus Function BF002.

Figure 36:
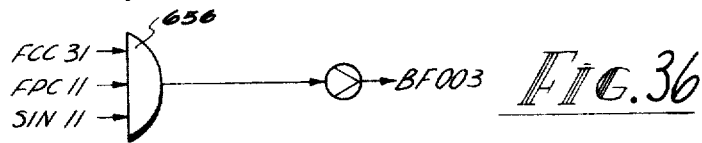
FIG. 36 is a schematic illustration of the development of Bus Function BF003.

Referring to FIG. 36, a schematic illustration of the development of Bus Function BF003 is shown. An AND-gate 656 is provided for receiving signals from the Control Counter flip-flop FCC31, the Program Counter flip-flop FPC11, and the input selection switch SIN11. The output of the AND-gate 656 is applied through an appropriate emitter follower prior to the application of the resulting signal to various circuits of the Printer Control System as the Bus Function BF003.

Figure 37:
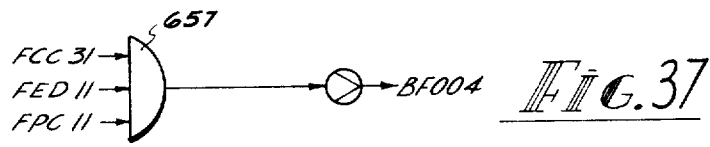

Referring to FIG. 37, a schematic illustration of the development of Bus Function BF004 is shown. An AND-gate 657 is provided for receiving signals from the Control Counter flip-flop FCC31, the End of Data Character flip-flop FED11, and the Program Counter flip-flop FPC11. The output of the AND-gate 657 is applied to an appropriate emitter follower prior to the application of the signal to appropriate circuits of the Printer System.

Figure 38:
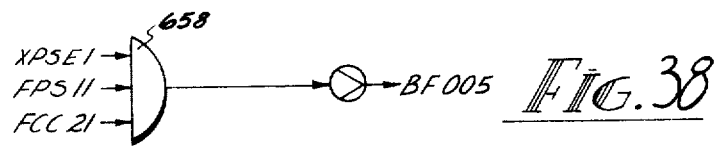

Referring to FIG. 38, a schematic illustration of the development of Bus Function BF005 is shown. An AND-gate 658 is provided for receiving signals from the Control Counter flip-flop FCC21, the Program Slew Detect flip-flop FPS11, and the print sign enable decode circuit XPSE1. The output of the AND-gate 658 is applied to an appropriate emitter follower prior to the application of the resulting signal to various circuits of the Printer Control System.

Figure 39:
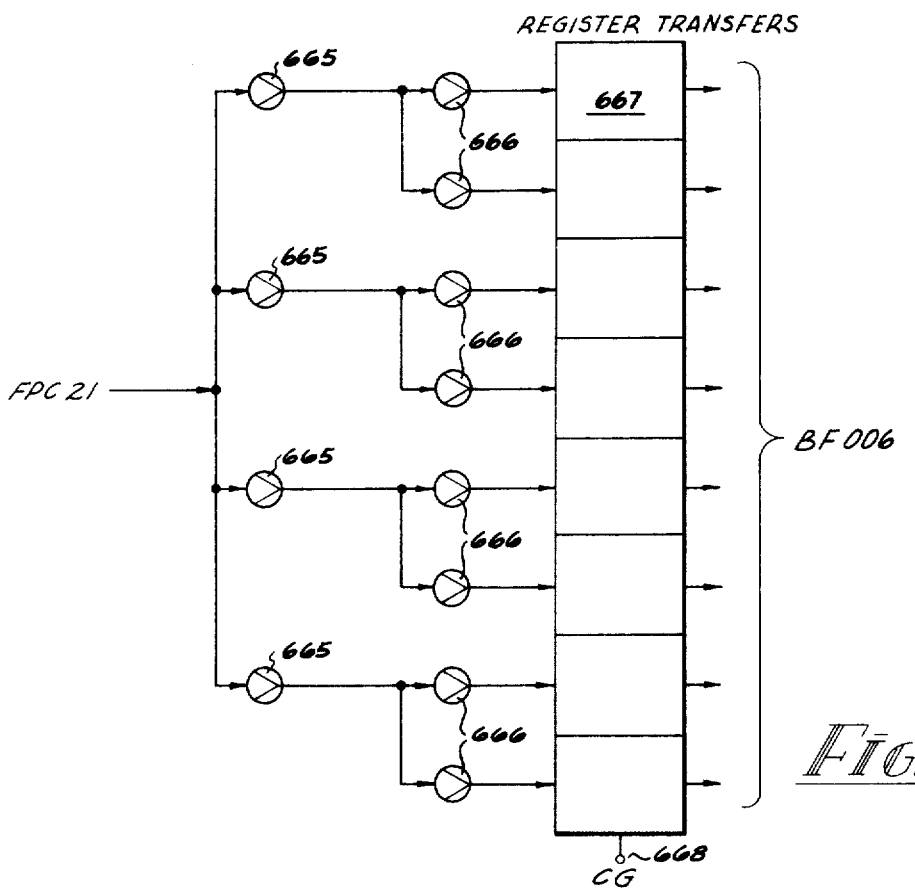

Referring to FIG. 39, a schematic illustration of the development of the Bus Function BF006 is shown. As can be seen from FIG. 39, the Bus Function BF006 is logically identical to the output of the Program Control Counter flip-flop FPC21. The output of this flip-flop is applied to a plurality of emitter followers 665 which provides suitable amplification to the output of the flip-flop for application to a second plurality of emitter followers 666. The resulting logical signals from the emitter followers 666 represent the identical signal received from the flip-flop FPC21 with the exception that the electrical signal is now present in eight lines instead of one line. The output of the emitter followers 666 are applied to a plurality of register transfer circuits 667. The register transfer circuits were shown and described in detail in connection with FIGS. 12 and 13. A terminal 668 is indicated as connected to the register transfer circuits 667 to represent the application of the appropriate gated clock drivers to the respective register transfer circuits. The resulting electrical signal from the register transfer circuits is the Bus Function BF006. It may be seen that the only difference between the output of the Program Control Counter flip-flop FPC21 and the Bus Function BF006 is the fact that the former has been divided, amplified, applied through a register transfer circuit, and clocked by a gated clock driver.

Figure 40:
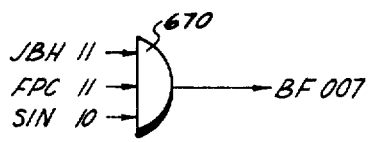

Referring to FIG. 40, a schematic illustration of the development of Bus Function BF007 is shown. An AND-gate 670 is provided for receiving signals (JBH11) indicating that data is being received from the "B" half column of the tape for receiving signals, from the Program Counter Control flip-flop FPC11, and from the input selection switch SIN10. The output of the AND-gate 670 represents the Bus Function BF007.

Figure 41:
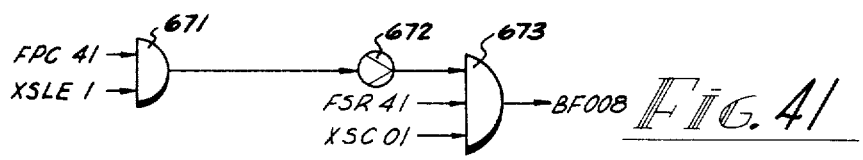

Referring to FIG. 41, a schematic illustration of the development of Bus Function BF008 is shown. An AND-gate 671 is provided for receiving signals from the Program Counter flip-flop FPC41, and the slew entry detect decode circuit XSLE1. The output of the AND circuit 671 is applied through an emitter follower 672 to a second AND circuit 673. The second AND circuit 673 also receives signals from the Slew Code Register flip-flop FSR41, and the stop code detect decode circuit XSC01. The output of the AND-gate 673 represents the Bus Function BF008.

Figure 42:
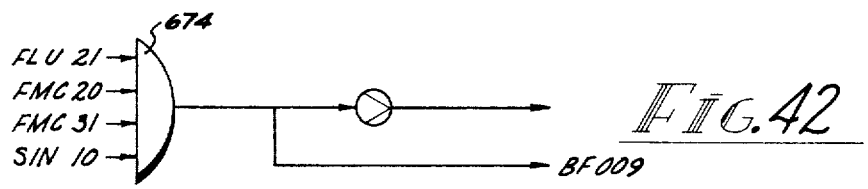

Referring to FIG. 42, a schematic illustration of the development of Bus Function BF009 is shown. An AND-gate 674 is provided for receiving signals from the Marker Track Lockup flip-flop FLU21, the Marker Track Counter flip-flops FMC20 and FMC31, and input selection switch SIN10. The output of the AND-gate 674 represents the Bus Function BF009.

Referring to FIG. 43, a schematic illustration of the development of Bus Function BF010 is shown. An AND-gate 675 is provided for receiving signals from Column Address Counter flip-flop FCA41, FCA51, and FCA61. The logical conjunction provided by the AND-gate 675 of the three input signals represents the Bus Function BF010.

Referring to FIG. 44, a schematic illustration of the development of Bus Function BF011 is shown. An AND-gate 676 is provided for receiving signals from Column Address Counter flip-flops FCA11, and FCA21. The logical conjunction of the input signals provided by AND-gate 676 represents the Bus Function BF011.

Referring to FIG. 45, a schematic illustration of the development of Bus Function BF012 is shown. An AND-gate 678 is provided for receiving signals from the Program Counter flip-flop FPC11, the Control Counter flip-flop FCC51, and the End of Data Character flip-flop FED10. The logical conjunction of the input signals provided by AND-gate 678 is applied to a second AND-gate 680. A third AND-gate 679 is provided for receiving signals from Program Counter flip-flop FPC21, Control Counter flip-flop FCC41, the Numeric Word A–B flip-flop FAB10, the End of Transfer Cycle flip-flop FET10, the Stop Printing flip-flop FSPR0, and the print numeric word sign enable decode circuit XPSE0. The output of the AND-gate 679 is applied to the AND-gate 680. The logical conjunction of the input signals provided by the AND-gate 680 is appropriately amplified by an emitter follower circuit and the resulting signal derived therefrom represents the Bus Function BF012.

Referring to FIG. 46, a schematic illustration of the development of Bus Function BF013 is shown. An AND-gate 681 is provided for receiving signals from the Program Counter flip-flop FPC11, the Control Counter flip-flop FCC41, and the End of Data Character flip-flop FED10. A second AND-gate 682 is provided for receiving signals from the Program Counter flip-flop FPC21, the Numeric Word A–B flip-flop FAB10, and the Control Counter flip-flop FCC21. The logical conjunctions provided by AND-gates 681 and 682, present in the form of electrical signals, are applied to an OR circuit 683. The output of the OR circuit is applied through an emitter follower 684 to a third AND-gate 685. The AND-gate 685 also receives signals from the Word Character Counter flip-flops FWC10 and FWC20. AND-gate 685 also receives a signal from the print numeric word sign enable decode circuit XPSE0. The logical conjunction of the input signals provided by 685 represents the Bus Function BF013.

Referring to FIG. 47, a schematic illustration of the development of Bus Function BF104 is shown. An AND-gate 690 is provided for receiving signals from the Program Counter flip-flop FPC21, the Numeric Word flip-flop FNW10, and the End of Transfer flip-flop FET10. A second AND-gate 691 is provide for receiving signals from the Program Counter flip-flop FPC21, the End of Transfer flip-flop FET10, the Numeric Word A–B flip-flop FAB10, and the numeric word print sign enable decode circuit XPSE0. The outputs from AND-gates 690 and 691 are applied to an OR-gate 692 together with a signal from the Program Counter flip-flop FPC11. The output of the OR-gate 691 is appropriately amplified in an emitter follower prior to being applied to various circuits of the Printer Control System as the signal BF014.

Referring to FIG. 48, a schematic illustration of the development of Bus Function BF015 is shown. An AND-gate 695 is provided for receiving signals from the Control Counter flip-flop FCC01, the Block Buffer Status flip-flop FBS11, and the Program Counter flip-flop FPC10. The logical conjunction of the input signals provided by the AND-gate 695 represents the Bus Function BF015.

Referring to FIG. 49, a schematic illustration of the development of Bus Function BF016 is shown. An AND-gate 700 is provided for receiving signals from the Numeric Word A–B flip-flop FAB10, and from the numeric print sign enable decode circuit XPSE0. The output of the AND-gate 700 is applied to a second AND-gate 701. The second AND-gate 701 also receives signals from the Numeric Word flip-flop FNW10. The output of the second AND-gate 701 is appropriately amplified in an emiter follower 702 and applied to a third AND-gate 703. The third AND-gate 703 is provided with signals from the Program Counter flip-flop FPC21, the Control Counter flip-flop FCC41, the Stop Printing flip-flop FSPR0, and the End of Transfer flip-flop FET10. The output of the AND-gate 703, representing the logical conjunction of the inputs thereto, is the Bus Function BF016.

Referring to FIG. 50, a schematic illustration of the development of Bus Function BF017 is shown. An AND-gate 705 is provided for receiving signals from the Marker Track Counter flip-flops FMC20 and FMC31, and Marker Track Lockup flip-flop FLU21. The output of the AND-gate 705 represents the Bus Function BF017.

Referring to FIG. 51, a schematic illustration of the development of Bus Function BF018 is shown. An OR-gate 706 is provided for receiving signals from the Control Counter flip-flop FCC41 and for receiving the Bus Function BF017 described previously. The output of the OR-gate 706 is applied to an AND-gate 707 with signals from the Program Control Counter flip-flop FPC11. The output of the AND-gate 707 is applied to a second OR-gate 708. OR-gate 708 also receives signals representing the Bus Function BF016 discussed previously. The output of the OR-gate 708 is appropriately amplified by an emitter follower 709 prior to being applied to various circuits throughout the Printer Control System of the present invention as the Bus Function BF018.

Referring to FIG. 52, a schematic illustration of the development of Bus Function BF021 is shown. An OR-gate 715 is provided for receiving signals from the Program Counter flip-flop FPC11, the Tape Reverse flip-flop FTR11, and the Tape Forward flip-flop FTF11. The output of the OR-gate 715 represents the Bus Function BF021.

Referring to FIG. 53, a schematic illustration of the development of Bus Function BF023 is shown. An AND-gate 716 is provided for receiving signals from the line marker pulse amplifier ALM11, and from vertical format amplifiers AVF41 and AVF50. The output of the AND-gate 716 represents the Bus Function BF023.

Referring to FIG. 54, a schematic illustration of the development of Bus Function BF022 is shown. An AND-gate 717 is provided for receiving signals from the Program Counter flip-flop FPC11, and the Bus Function signal BF023, discussed previously. The conjunction of these two signals represents the Bus Function BF022.

Referring to FIG. 55, a schematic illustration of the development of Bus Function BF024 is shown. An AND-gate 718 is provided for receiving signals from the Program Counter flip-flop FPC11, the Marker Track Lockup flip-flop FLU21, the Marker Track Counter flip-flops FMC20 and FMC31, and the Tape Forward flip-flop FTF11. The logical conjunction provided by the AND-gate 718 of the signals applied thereto represents the Bus Function BF024.

Referring to FIG. 56, a schematic illustration of the development of Bus Function BF025 is shown. An AND-gate 719 is provided for receiving signals from Memory Register flip-flops FMR11 and FMR50. A second AND-gate 720 is provided for receiving signals from Memory Register flip-flops FMR10 and FMR51. The outputs of AND-gate 719 and 720 are applied to an OR-gate 721. The output of OR-gate 721 represents the Bus Function BF025.

Figure 57:
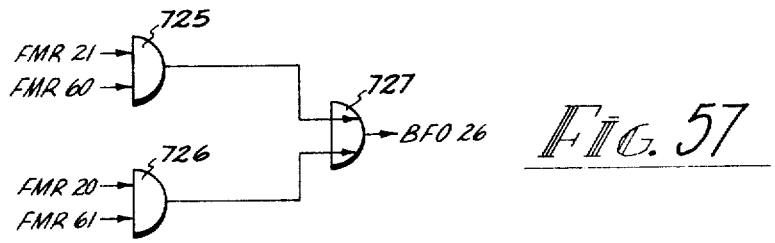

Referring to FIG. 57, a schematic illustration of the development of Bus Function BF026 is shown. An AND-gate 725 is provided for receiving signals from Memory Register flip-flops FMR21 and FMR60. A second AND-gate 726 is provided for receiving signals from Memory Register flip-flops FMR20 and FMR61. The outputs of AND-gates 725 and 726 are applied to an OR-gate 727. The output of OR-gate 727 represents the Bus Function BF026.

Figure 58:
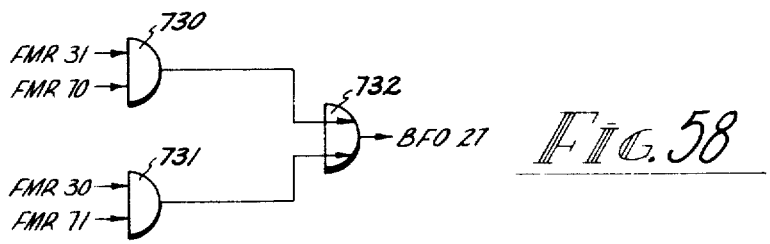

Referring to FIG. 58, a schematic illustration of the development of Bus Function BF027 is shown. An AND-gate 730 is provided for receiving signals from Memory Register flip-flops FMR31 and FMR70. A second AND-gate 731 is provided for receiving signals from Memory Register flip-flops FMR30 and FMR71.

The outputs of AND-gate 730 and 731 are applied to an OR-gate 732. The output of OR-gate 732 represents the Bus Function BF027.

Figure 59:
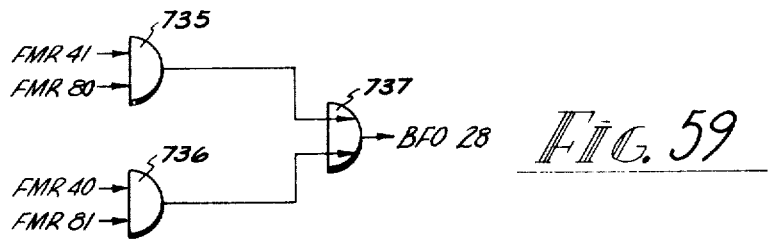

Referring to FIG. 59 a schematic illustration of the development of Bus Function BF028 is shown. An AND-gate 735 is provided for receiving signals from the Memory Register flip-flops FMR41 and FMR80. A second AND-gate 736 is provided for receiving signals from Memory Register flip-flops FMR40 and FMR81. The outputs of AND-gate 735 and 736 are applied to OR-gate 737. The output of OR-gate 737 represents the Bus Function BF028.

Figure 60:
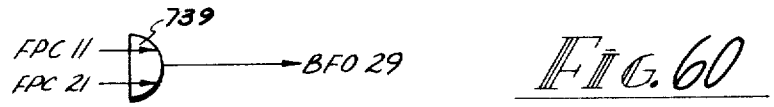

Referring to FIG. 60, a schematic illustration of the development of Bus Function BF029 is shown. Bus Function BF029 represents the logical OR between two Program Counter flip-flop outputs FPC11 and FPC21. The logical operation of OR is provided by OR-gate 739.

Figure 61:
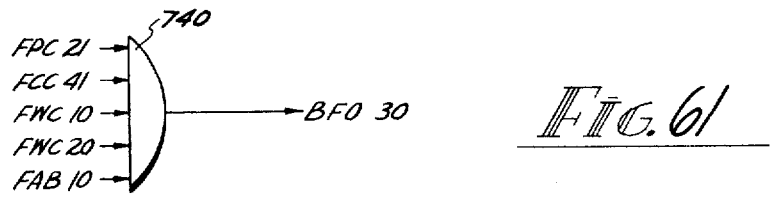

Referring to FIG. 61, a schematic illustration of the development of Bus Function BF030 is shown. An AND-gate 740 is provided for receiving signals from Program Control Counter flip-flop FPC21, Control Counter flip-flop FCC41, Word Character Counter flip-flops FWC10 and FWC20, and Numeric Word A–B flip-flop FAB10. The logical conjunction of these input signals to the AND-gate 740 represents the Bus Function BF030.

Figure 62:
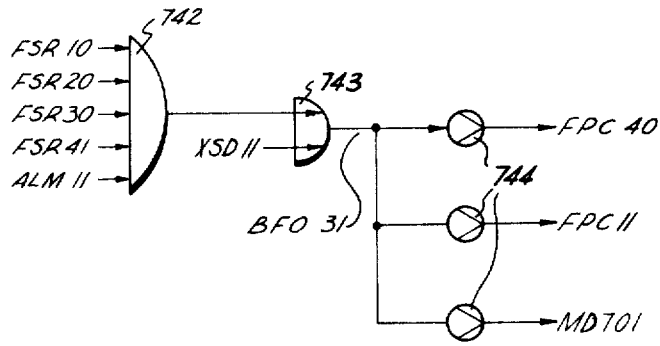

Referring to FIG. 62, a schematic illustration of the development of Bus Function BF031 is shown. An AND-gate 742 is provided for receiving signals from the line marker pulse amplifier ALM11, and Slew Code Register flip-flops FSR10, FSR20, FSR30, and FSR41. The output of AND-gate 742 is applied to an OR-gate 743. OR-gate 743 also receives a signal from the slew completed detect decode circuit XSD11. The output of OR-gate 743 represents the Bus Function BF031. This Bus Function may be amplified in emitter followers 744 prior to application of the Bus Function to Program Counter flip-flop FPC40, Program Counter flip-flop FPC11, and slew decelerate delay one-shot MD701.

Figure 63:
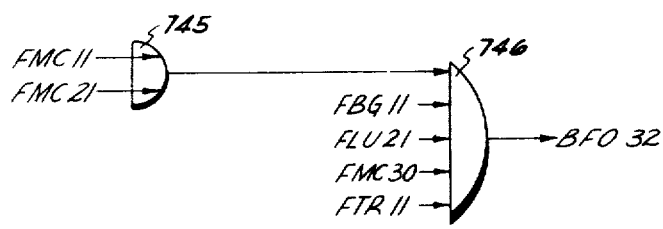

Referring to FIG. 63, a schematic illustration of the development of Bus Function BF032 is shown. An OR-gate 745 is provided for receiving signals from the Marker Counter flip-flops FMC11 and FMC21. The output of OR-gate 745 is applied to an AND-gate 746. AND-gate 746 also receives signals from the Beta-Gamma Tracking flip-flop FBG11, the Marker Track Lockup flip-flop FLU21, the Marker Counter flip-flop FMC30, and the Tape Reverse flip-flop FTR11. The output of AND-gate 746 represents the Bus Function BF032.

Figure 64:
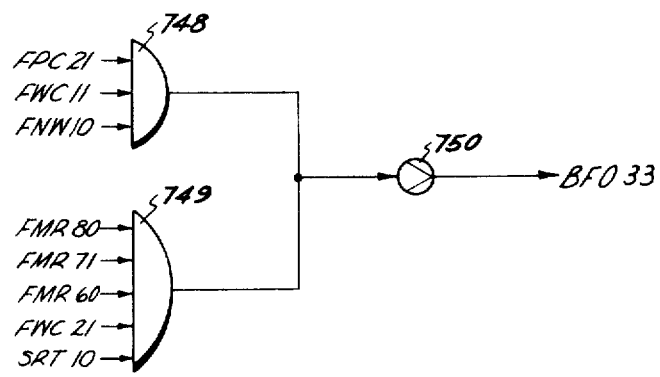

Referring to FIG. 64, a schematic illustration of the development of Bus Function BF033 is shown. An AND-gate 748 is provided for receiving signals from the Program Counter flip-flop FPC21, the Word Character Counter flip-flop FWC11, and the Numeric Word flip-flop FNW10. A second AND-gate 749 is provided for receiving signal from the Memory Register flip-flops FMR80, FMR71, and FMR60, the Word Character Counter flip-flop FWC21, and the print mode selection switch SRT10. The outputs from the AND-gates 748 and 749 are amplified by an emitter follower 750. The signal presented by the emitter follower 750 represents the Bus Function BF033.

Figure 65:
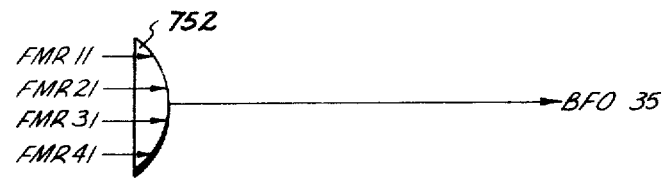
FIG. 65 is a schematic illustration of the development of Bus Function BF035.

Referring to FIG. 65, a schematic illustration of the development of Bus Function BF035 is shown. An OR-gate 752 is provided for receiving signals from the Memory Register flip-flops FMR11, FMR21, FMR31, and FMR41. The OR function provided by the OR-gate 752 of the input from the various Memory Register flip-flops represents the Bus Function BF035.

Figure 66:
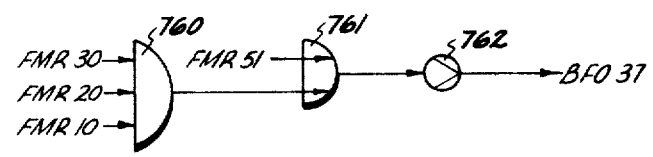
FIG. 66 is a schematic illustration of the development of Bus Function BF037.

Referring to FIG. 66, a schematic illustration of the development of Bus Function BF037 is shown. An AND-gate 760 is provided for receiving signals from the Memory Register flip-flops FMR30, FMR20, and FMR10. The output of AND-gate 760 is applied to an OR-gate 761. OR-gate 761 is also provided with an input from the Memory Register flip-flop FMR51. The output of OR-gate 761 is applied to an emitter follower 762. The output of emitter follower 762 represents the Bus Function BF037.

Figure 67:
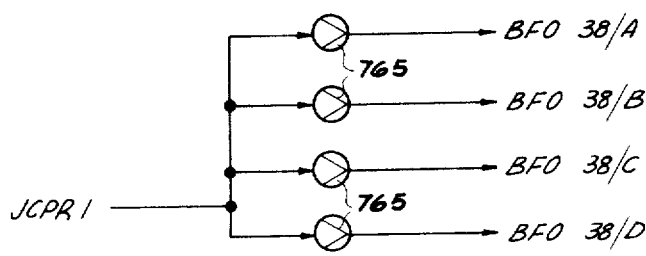
FIG. 67 is a schematic illustration of the development of Bus Function BF038.

Referring to FIG. 67, a schematic illustration of the development of Bus Function BF038 is shown. The Bus Function BF038 is a Bus Function representation of the logical signal derived from the central processor connected to the Multiple Font High Speed Printer Control System of the present invention. The central processor of the Data Processor System connected to the Printer Control System may develop logical signals indicating that the Printer System is to be reset. Accordingly, the printer reset signal from the central processor JCPR is applied to a plurality of emitter followers 765. The emitter followers provide electrical signals representing the Bus Function BF038.

Figure 68:
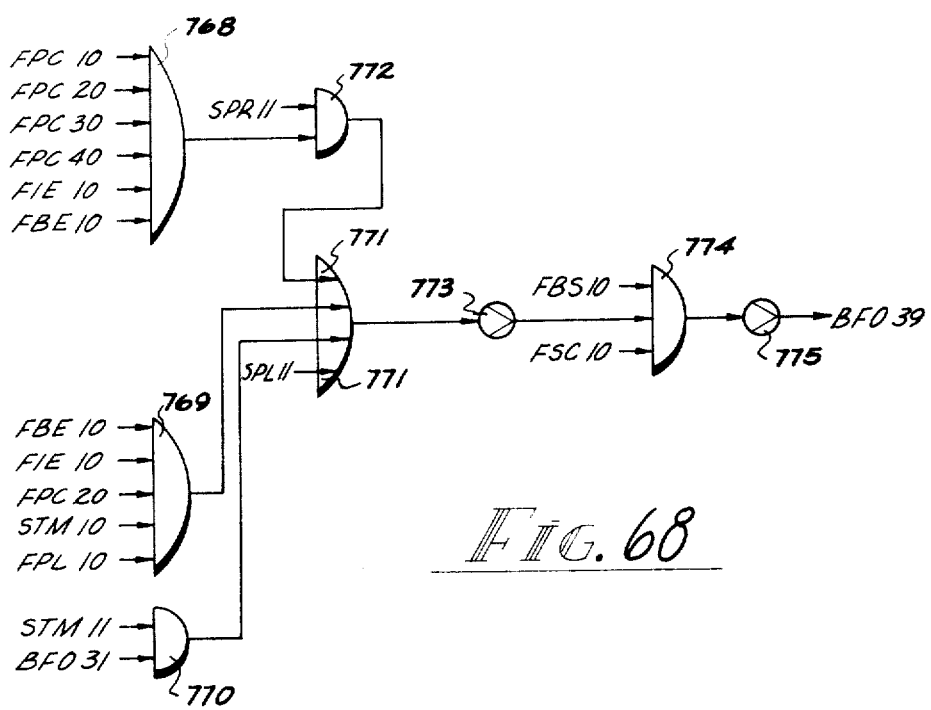
FIG. 68 is a schematic illustration of the development of Bus Function BF039.

Referring to FIG. 68, a schematic illustration of the development of Bus Function BF039 is shown. An AND-gate 768 is provided for receiving signals from the Program Counter flip-flops FPC10, FPC20, FPC30, and FPC40, the Input Error flip-flop FIE10, and the Buffer Error flip-flop FBE10. A second AND-gate 769 is provided for receiving signals from the Buffer Error flip-flop FBE10, the Input Error flip-flop FIE10, the Program Counter flip-flop FPC20, a test mode selection switch STM10, and Print One Line flip-flop FLP10. A third AND-gate 770 is provided for receiving signals from the test mode selection switch STM11 and for receiving the Bus Function BF031 described previously.

The output of the AND-gate 768 is applied to a fourth AND-gate 772. AND-gate 772 also receives a signal from the print switch SPR11. The output of AND-gate 772 is applied to an OR-gate 771. OR-gate 771 also receives signals from AND-gates 769 and 770 as well as signals from the print one line switch SPL11. The output of OR-gates 771 is applied through an emitter follower 773 to AND-gate 774. AND-gate 774 also receives signals from the Block Buffer Status flip-flop FBS10 and the Stop Code Detect flip-flop FSC10. The output of AND-gate 774, amplified by emitter follower 775, represents the Bus Function BF039.

Figure 69:
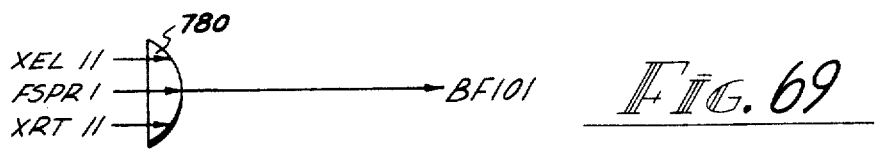
FIG. 69 is a schematic illustration of the development of Bus Function BF101.

Referring to FIG. 69, a schematic illustration of the development of Bus Function BF101 is shown. An OR-gate 780 is provided for receiving signals from the end of line code detect decode circuit XEL11, the unedited print mode column address counter decode circuit XRT11, and the Stop Printing flip-flop FSPR1. The output of the OR-gate 780 represents the Bus Function BF101.

Figure 70:
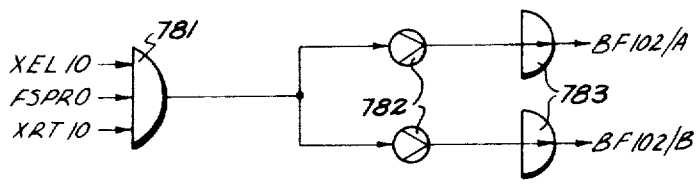
FIG. 70 is a schematic illustration of the development of Bus Function BF102.

Referring to FIG. 70, a schematic illustration of the development of Bus Function BF102 is shown. An AND-gate 781 is provided for receiving signals from the end of line code detect decode circuit XEL10, the unedited print mode column address counter reset decode circuit XRT10, and the Stop Printing flip-flop FSPR0. The output of AND-gate 781 is applied to emitter followers 782. The output of emitter followers 782 is applied to dummy OR-gates 783, respectively. It will be noted that OR-gates 783 do not provide a logical function; however, it is sometimes convenient to utilize dummy OR or dummy AND-gates for providing necessary impedance matching and amplification of logical signals without implementing any logical function. The output of OR-gates 783 represents the Bus Function BF102.

Figure 71:
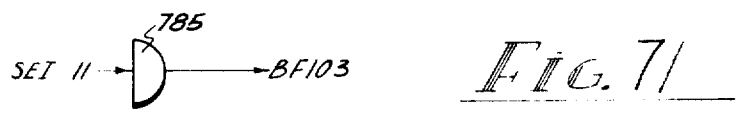
FIG. 71 is a schematic illustration of the development of Bus Function BF103.

Referring to FIG. 71, a schematic illustration of the development of Bus Function BF103 is shown. An AND-gate 785 receives signals from the error ignore switch SEI11. It may be noted that the AND-gate 785 is a "dummy" AND-circuit as mentioned previously. The output of the AND-circuit 785 represents the Bus Function BF103. It may therefore be seen that the Bus Function BF103 represents the error ignore signal from the switch SEI11 properly amplified through the expediency of a "dummy" AND-circuit.

Figure 72:
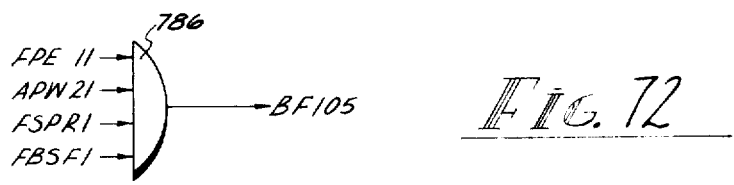
FIG. 72 is a schematic illustration of the development of Bus Function BF105.

Referring to FIG. 72, a schematic illustration of the development of Bus Function BF105 is shown. An AND-gate 786 is provided for receiving signals from the Print Enable flip-flop FPE11, character pulse amplifier APW21, the Stop Printing flip-flop FSPR1, and the Block Buffer Status Follower flip-flop FBSF1. The logical conjunction of these signals provided by the AND-circuit 786 represents the Bus Function BF105.

Figure 73:
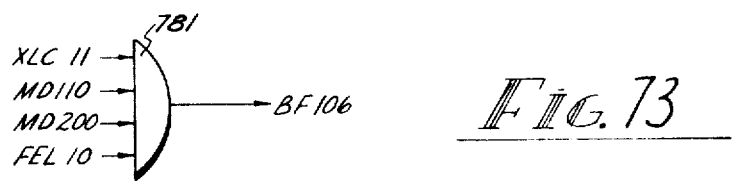
FIG. 73 is a schematic illustration of the development of Bus Function BF106.

Referring to FIG. 73, a schematic illustration of the development of Bus Function BF106 is shown. An AND-gate 787 is provided for receiving signals from the column address counter lockout count detect decode circuit XLC11, the block buffer load-unload inhibit one-shot MD110, the typeline buffer unload inhibit one-shot MD200, and the End of Line flip-flop FEL10. The logical conjunction of these input signals provided by the AND-gate 787 represents the Bus Function BF106.

Figure 74:
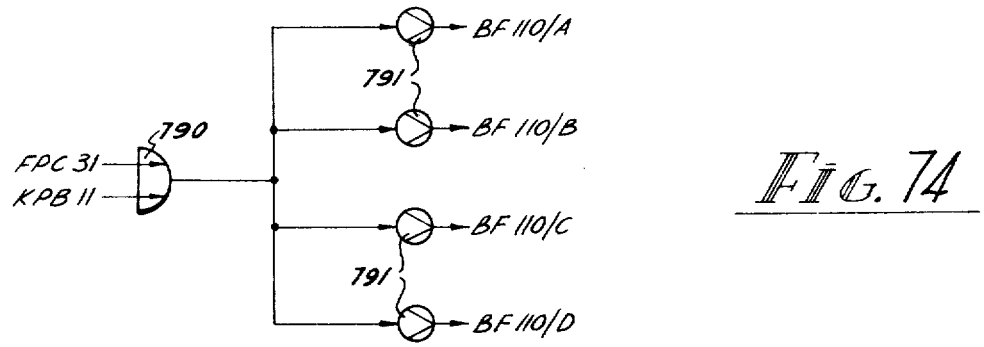
FIG. 74 is a schematic illustration of the development of Bus Function BF110.

Referring to FIG. 74, a schematic illustration of the development of Bus Function BF110 is shown. An OR-gate 790 is provided for receiving signals from the Program Counter flip-flop FPC31, and the power turn on buffer clear relay KPB11. The output of the OR-gate 790 is applied to a plurality of emitter followers 791 to provide appropriate amplification of the signal prior to application to appropriate circuits of the Multiple Font High Speed Printer Control System of the present invention. The signals derived from the emitter followers 791 represent the Bus Function BF110.

Figure 75:
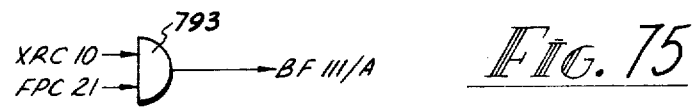
FIGS. 75 and 76 are schematic illustrations of the development of Bus Function BF111.
Figure 76:
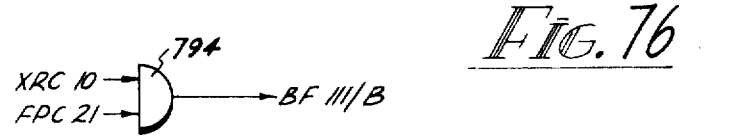

Referring to FIGS. 75 and 76, schematic illustrations of the development of Bus Function BF111 are shown. In each of these figures, the Bus Function BF111 is developed; however, it has been found convenient to develop this specific Bus Function through two independent circuits to provide Bus Function signals to the logical circuits of the Printer Control System in the corresponding physical locations. As has been indicated in figures discussed previously, a particular Bus Function may be represented by a letter following the Bus Function designation. This added letter merely indicates that the Bus Function is derived from a different immediate source though the same ultimate source. Therefore, Bus Function BF111 may be designated as BF111/A or BF111/B. The A and B in the foregoing designation merely indicates the physical source from which the Bus Function is derived. In both instances, the signal was derived by the logical combination of the same source signals. For the development of the Bus Function BF111, AND-gates 793 and 794 are provided each for receiving signals from the Program Control Counter flip-flop FPC21 and the unedited mode sign print enable decode circuit XRC10.

Figure 77:
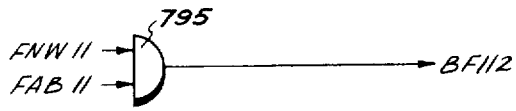
FIG. 77 is a schematic illustration of the development of Bus Function BF112.

Referring to FIG. 77, a schematic illustration of the development of Bus Function BF112 is shown. An AND-gate 795 is provided for receiving signals from the Numeric Word flip-flop FNW11, and the Numeric Word A–B flip-flop FAB11. The logical conjunction of these two signals provided by the AND-gate 795 represents the Bus Function BF112.

Figure 78:
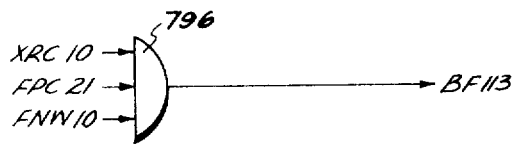
FIG. 78 is a schematic illustration of the development of Bus Function BF113.

Referring to FIG. 78, a schematic illustration of the development of Bus Function BF113 is shown. An AND-gate 796 is provided for receiving signals from the Numeric Word flip-flop FNW10, the Program Control Counter flip-flop FPC21, and the unedited mode sign print enable decode circuit XRC10. The logical conjunction of these signals provided by the AND-gate 796 represents the Bus Function BF113.

Figure 79:
FIG. 79 is a schematic illustration of the development of Bus Function BF114.

Referring to FIG. 79, a schematic illustration of the development of Bus Function BF114 is shown. An AND-gate 798 is provided for receiving signals from the unedited mode sign print enable decode circuit XRC11, and the Program Control Counter flip-flop FPC21. The logical conjunction of these signals provided by the AND-gate 798 represents the Bus Function BF114.

Figure 80:
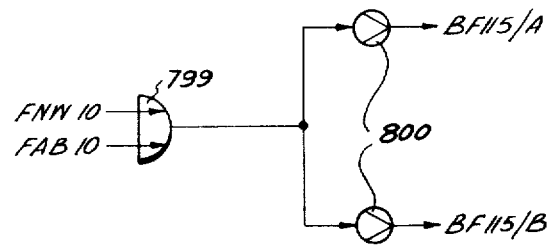
FIG. 80 is a schematic illustration of the development of Bus Function BF115.

Referring to FIG. 80, a schematic illustration of the development of Bus Function BF115 is shown. An OR-gate 799 is provided for receiving signals from the Numeric Word flip-flop FNW10, and the Numeric Word A–B flip-flop FAB10. The output of the OR-gate 799 is connected to two emitter followers 800. The emitter followers provide the necessary amplification to the signals derived from the OR-gate 799 prior to the application of these signals to appropriate circuits of the Printer Control System. The signals presented by the emitter follower represent the Bus Function BF115. It may be noted, as discussed previously, that the outputs of the respective emitter followers are designated by letters; therefore, the output shown of the schematic representation of FIG. 80 represents BF115/A and BF115/B.

Figure 81:
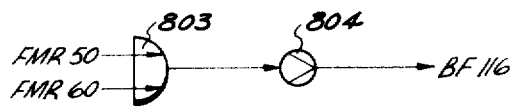
FIGS. 81 and 82 are schematic illustrations of the development of Bus Function BF116.

Referring to FIG. 81, a schematic illustration of the development of Bus Function BF116 is shown. An OR-gate 803 is shown for receiving signals from the Memory Register flip-flops FMR50 and FMR60. The output of the OR-gate 803 is appropriately amplified by an emitter follower 804, and the resulting signal derived therefrom represents the Bus Function BF116.

Figure 82:
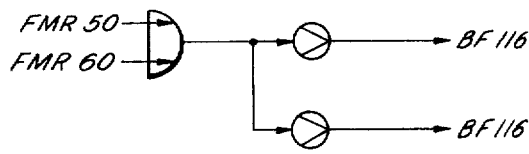

In FIG. 82, the Bus Function BF116 is generated in an identical manner as in FIG. 81; however, two emitter followers are used to provide a signal fan-out and enable the utilization of the Bus Function BF116 from a plurality of sources.

An illustration may now be given of the utilization of Bus Functions to alleviate the necessity for describing complex logical circuitry. The Numeric Sign flip-flop FNS1, shown in FIG. 164, is set and reset in accordance with signals received from AND-gates 1590 and 1591. These AND-gates provide the logical conjunction of several signals applied at the inputs thereof. The Bus Function signal BF030 is shown as one of the two inputs to each of the AND-gates. It may be seen, by referring to FIG. 61, that the Bus Function BF030 is actually the logical conjunction of signals provided by five other flip-flops. Thus, the utilization of the Bus Function BF030, shown in FIG. 61, enables the use of a single electrical signal (BF030) in lieu of five separate flip-flop signals.

Therefore, it is unnecessary to describe the logical combination of the signals from the five flip-flops of FIG. 61 when referring to the Bus Function signal BF030 in FIG. 164. Also, the Bus Function BF030 may be utilized at several points throughout the Printer Control System and, in each instance, it is unnecessary to resort to the description of the combination of the five flip-flop signals shown in FIG. 61.

*Control Counter*

The Control Counter comprises eight flip-flops of the type described previously in connection with FIG. 7. Each of these flip-flops has input terminals for receiving signals to cause the flip-flop to assume the 1-state and to assume the 0-state. Each flip-flop is also adapted to receive a clock signal to enable the flip-flop to change state in synchronism with the system clock. As noted in the previous discussion of the flip-flops utilized in the system of the present invention, terminals are also provided on each flip-flop for receiving signals to cause the flip-flop to change state without the requirement of a simultaneous receipt of a clock signal. These register transfer terminals enable a flip-flop to change state in synchronism with another circuit elsewhere in the system. Accordingly, the Control Counter, comprising, a plurality of flip-flops each having input terminals, clock terminals, register transfer input terminals, and a pair of output terminals, are interconnected with each other and with the remainder of the Multiple Font High Speed Printer Control System of the present invention to provide signals for controlling the overall operation of the system. The Control Counter, when triggered, steps through the counts until a rest count is reached.

Figure 83:
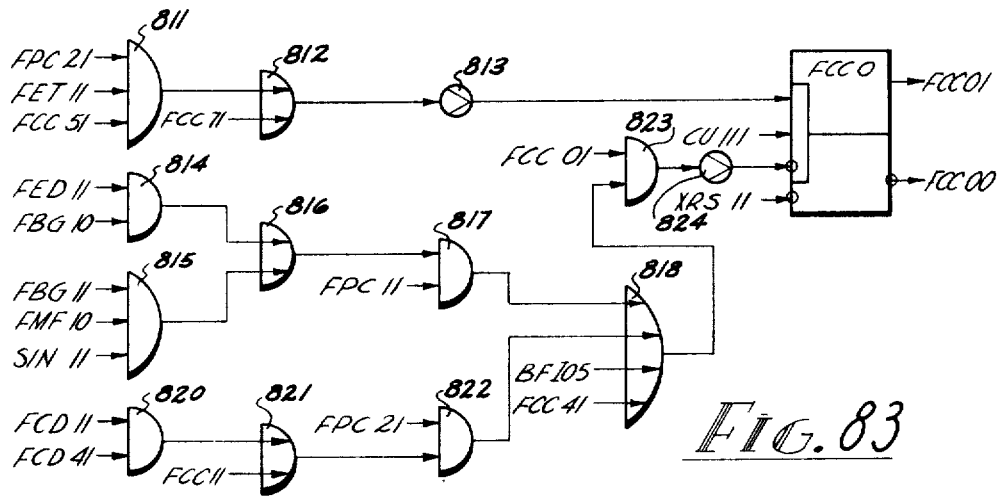
FIG. 83 is a schematic illustration of the Control Counter flip-flop FCC0 and the associated logical circuitry.

Referring to FIG. 83, a schematic illustration of the Control Counter flip-flop FCC0 and the associated logical circuitry are shown. An AND-gate 811 is provided for receiving signals from the Program Counter flip-flop FPC 21, and the End of Transfer Mode flip-flop FET11, and Control Counter flip-flop FCC 51. The logical conjunction of these signals provided by the AND-gate 811 is applied to an OR-gate 812. The OR-gate 812 also receives a signal from the Control Counter flip-flop FCC71. The output of the OR-gate 812 is applied through an emitter follower 813 to the set input of the Control Counter flip-flop FCC0. An AND-gate 814 is provided for receiving signals from the End of Data Character flip-flop FED11, and the Beta-Gamma Tracking flip-flop FBG10. The output of the AND-gate 814 is applied to an OR-gate 816. AND-gate 815 is provided for receiving signals from the Beta-Gamma Tracking flip-flop FBG11, the Marker Follower flip-flop FMF10, and the input selection switch SIN11. The logical conjunction of these signals provided by the AND-gate 815 is applied to the OR-gate 816. The output of OR-gate 816 is applied to an AND-gate 817. AND-gate 817 also receives signals from the Program Counter flip-flop FPC11. The output of AND-gate 817 is applied to an OR-gate 818.

An AND-gate 820 is provided for receiving signals from Fast Clock Counter flip-flops FCD11 and FCD41. The logical conjunction of these signals provided by AND-gate 820 is applied to an OR-gate 821. OR-gate 821 also receives signals from the Control Counter flip-flop FCC11. The output of OR-gate 821 is applied to an AND-gate 822. AND-gate 822 also receives signals from the Program Counter flip-flop FPC21. The output of AND-gate 822 is applied to OR-gate 818. OR-gate 818 also receives signals from the Control Counter flip-flop FCC41, and also receives the Bus Function signal BF105. The output of OR-gate 818 is applied to an AND-gate 823. AND-gate 823 also receives signals from the Control Counter flip-flop FCC01. The output of the AND-gate 823 is applied through an emitter follower 824 to the reset input of the flip-flop FCC0.

The flip-flop FCC0 also receives an ungated clock signal CU111, and a reset register transfer signal from the reset decode circuit XRS11. The Control Counter flip-flop FCC0 therefore provides either a set signal FCC01, or a reset signal FCC00.

Figure 84:
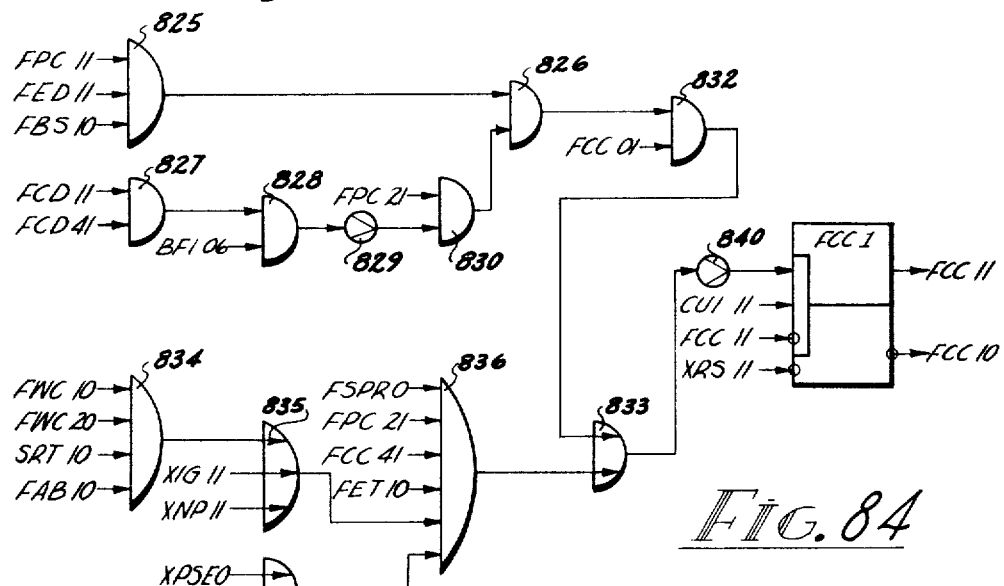
FIG. 84 is a schematic illustration of the Control Counter flip-flop FCC1 and the associated logical circuitry.

Referring to FIG. 84, a schematic illustration of the Control Counter flip-flop FCC1 and the associated logical circuitry are shown. An AND-gate 825 is provided for receiving signals from the Program Counter flip-flop FPC11, the End of Data Character flip-flop FED11, and the Block Buffer Status flip-flop FBS10. The logical conjunction of these signals provided by the AND-gate 825 is applied to AND-gate 826. AND-gate 826 also receives a signal developed by the following logical circuitry. AND-gate 827 receives signals from the Fast Clock Counter flip-flops FCD11 and FCD41. The logical conjunction of these signals provided by AND-gate 827 is applied, together with Bus Function BF106, to AND-gate 828. The output of AND-gate 828, appropriately amplified by the emitter follower 829, is applied to an AND-gate 830, AND-gate 830 also receives signals from the Program Counter flip-flop FPC21. The output of the AND-gate 830 provides the second input to the AND-gate 826. The output of AND-gate 826, together with the Control Counter flip-flop signal FCC01 are applied to the AND-gate 832. The output of AND-gate 832 is applied to an OR-gate 833.

An AND-gate 834 is provided for receiving signals from the Word Character Counter flip-flops FWC10 and FWC20, the mode selection switch SRT10, and the Numeric Word A–B Select flip-flop FAB10. The logical conjunction of these signals provided by the AND-gate 834 is applied to an OR-gate 835. OR-gate 835 also receives signals from the ignore character code detect decode circuit XIG11, and the non-print character decode detect decode circuit XNP11. The output of the OR-gate 835 is applied to an AND-gate 836.

An OR-gate 837 is provided for receiving signals from the print numeric word sign enable decode circuit XPSE0, and the Numeric Sign flip-flop FNS10. The output of the OR-gate 837 is also applied to the AND-gate 836. The AND-gate 836, in addition to receiving signals from OR-gate 835 and 837, also receives signals from the Stop Printing flip-flop FSPR0, the Program Counter flip-flop FPC21, the Control Counter flip-flop FCC41, and the End of Transfer Mode flip-flop FET10. The logical conjunction of these signals provided by the AND-gate 836 is applied to the OR-gate 833. The resulting logical OR operation performed by the OR-gate 833 results in a signal which, appropriately amplified by an emitter follower 840, is applied to the set input terminal of the Control Counter flip-flop FCC1.

The Control Counter flip-flop FCC1 receives a clock signal from the ungated clock CU111, a reset input signal from the set output terminal of the same flip-flop FCC11, and a register transfer reset input signal from the reset decode circuit XRS11. The Control Counter flip-flop FCC1 therefore provides either a set output signal FCC11, or a reset output signal FCC10.

Figure 85:
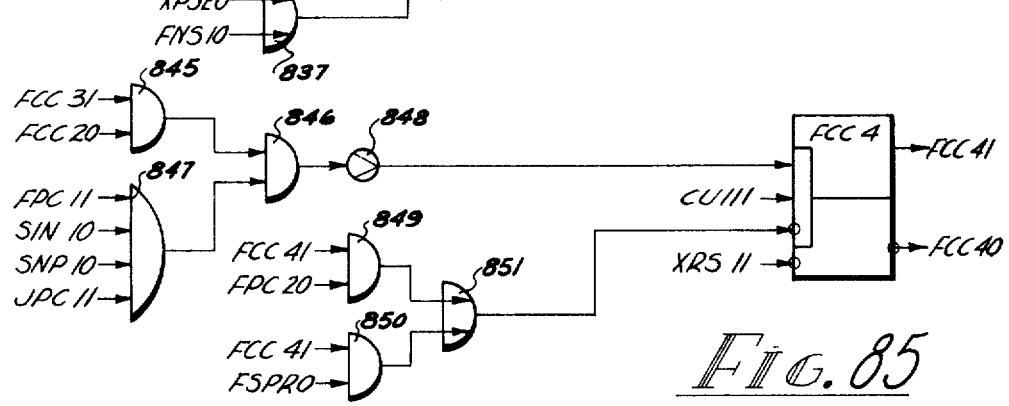
FIG. 85 is a schematic illustration of the Control Counter flip-flop FCC4 and the associated logical circuitry.

Referring to FIG. 85, a schematic illustration of the Control Counter flip-flop FCC4 and the associated logical circuitry are shown.

An AND-gate 845 is provided for receiving signals from the Control Counter flip-flops FCC31 and FCC20. The logical conjunction of these signals provided by the AND-gate 845 is applied to an AND-gate 846. A third AND-gate 847 is provided for receiving signals from the Program Counter flip-flop FPC11, the input selection switch SIN10, the read tape non-print switch SNP10, and for the cable signal JPC11. The logical conjunction of the signals applied to the AND-gate 846 provides a signal, appropriately amplified by the emitter follower 848, which causes the flip-flop FCC4 to assume the set state. An AND-gate 849 is provided for receiving signals from the Control Counter flip-flop FCC41, and the Program Counter flip-flop FPC20. The logical conjunction of these signals is provided by the AND-gate 849 as applied to an OR-gate 851. An AND-gate 850 is provided for receiving signals from the Control Counter flip-flop FCC41, and the Stop Printing flip-flop FSPR0. The output of AND-gate 850 is also applied to the OR-gate 851. The output of OR-gate 851 is applied to the reset input of the flip-flop FCC4.

The Control Counter flip-flop FCC4 also receives ungated clock signals CU111, and a reset register transfer signal from the reset decode circuit XRS11. The Control Counter flip-flop FCC4 therefore provides a set output signal FCC41, or a reset output signal FCC40.

Figure 86:
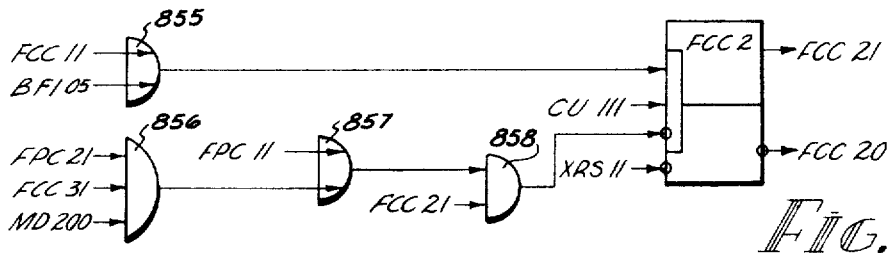
FIG. 86 is a schematic illustration of the Control Counter flip-flop FCC2 and the associated logical circuitry.

Referring to FIG. 86, a schematic illustration of the Control Counter flip-flop FCC2 and the associated logical circuitry are shown. An OR-gate 855 is provided for receiving signals from a Control Counter flip-flop FCC11, and for receiving the Bus Function BF105. The output of OR-gate 855 is applied to the set input terminals of the flip-flop FCC2. An AND-gate 856 is provided for receiving signals from the Program Counter flip-flop FPC21, the Control Counter flip-flop FCC31, and the Typeline Buffer unload inhibit one-shot MD200. The logical conjunction of these signals provided by the AND-gate 856 is applied to an OR-gate 857. OR-gate 857 also receives signals from the Program Counter flip-flop FPC11. The output from the OR-gate 857 is applied to an AND-gate 858. AND-gate 858 also receives signals from the Control Counter flip-flop FCC21. The output of the AND-gate 858 is applied to the reset input terminal of the flip-flop FCC2. The Control Counter flip-flop FCC2 also receives an ungated clock signal from the ungated clock CU111, and a reset register transfer signal from the reset decode circuit XRS11. The Control Counter flip-flop FCC2 thereby provides a set output signal FCC21, or a reset output signal FCC20.

Figure 87:
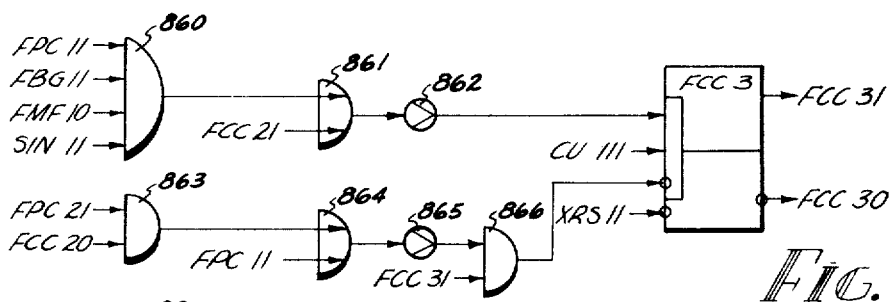
FIG. 87 is a schematic illustration of the Control Counter flip-flop FCC3 and the associated logical circuitry.

Referring to FIG. 87, a schematic illustration of the Control Counter flip-flop FCC3 and the associated logical circuitry are shown. An AND-gate 860 is provided for receiving signals from the Program Counter flip-flop FPC11, the Beta-Gamma Tracking flip-flop FBG11, the Marker Follower flip-flop FMF10, and the input selection switch SIN11. The logical conjunction of these signals provided by the AND-gate 860 is applied to an OR-gate 861. OR-gate 861 also receives signals from the Control Counter flip-flop FCC21. The output of the OR-gate 861, appropriately amplified by an emitter follower 862, is applied to the set input terminal of the flip-flop FCC3.

An AND-gate 863 is provided for receiving signals from the Program Counter flip-flop FTC21, and the Control Counter flip-flop FCC20. The signal representing the logical conjunction of these signals provided by the AND-gate 863 is applied to an OR-gate 864. OR-gate 864 also receives a signal from the Program Counter flip-flop FPC11. The output of the OR-gate 864 is amplified by an emitter follower 865 and applied to an AND-gate 866. The AND-gate 866 also receives a signal from the Control Counter flip-flop FCC31. The output of the AND-gate 866 is applied to the reset input terminal of the flip-flop FCC3. Flip-flop FCC3 also receives a clock signal from the ungated clock driver CU111, and a reset transfer signal from the reset decode circuit XRS11.

The Control Counter flip-flop FCC3 therefore provides either a set signal FCC31, or a reset signal FCC30.

Figure 88:
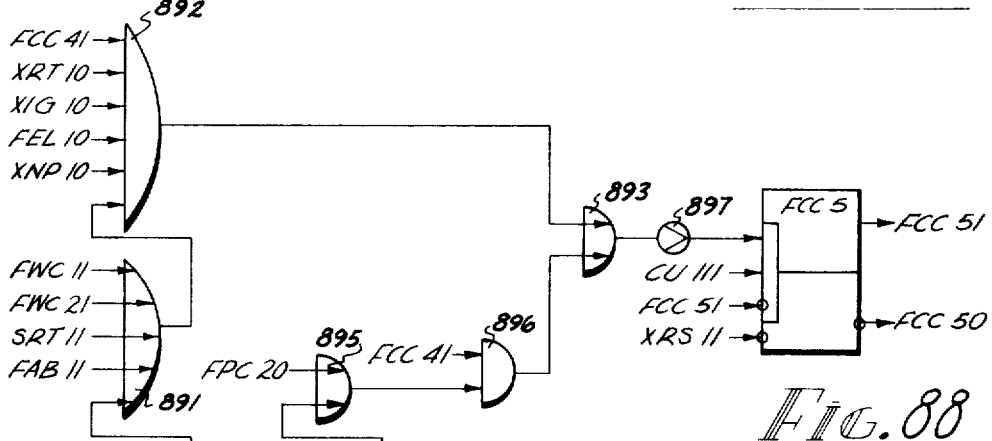
FIG. 88 is a schematic illustration of the Control Counter flip-flop FCC5 and the associated logical circuitry.

Referring to FIG. 88, a schematic illustration of the Control Counter flip-flop FCC5 and the associated logical circuitry are shown. An AND-gate 890 is provided for receiving signals from the Numeric Sign flip-flop FNS11, and the print numeric sign enable decode circuit XPSE1. The output of AND-gate 890 is applied to an OR-gate 891. The OR-gate 891 is also adapted to receive signals from the Word Character Counter flip-flops FWC11 and FWC21, the Numeric Word A–B Select flip-flop FAB11, and the mode selection switch SRT11. The output of the OR-gate 891 is applied to an AND-gate 892. AND-gate 892 also receives signals from the Control Counter flip-flop FCC41, the unedited mode column address counter reset decode circuit XRT10, the ignore character code detect decode circuit XIG10, the End of Line flip-flop FEL10, and the non-print character code detect decode circuit XNP10. The signal provided by the logical conjunction of the signals applied to the AND-gate 892 is applied to an OR-gate 893.

An AND-gate 894 is provided for receiving signals from the End of Transfer Mode flip-flop FET11, the Stop Printing flip-flop FSPR0. The output of AND-gate 894 is applied to an OR-gate 895. OR-gate 895 also receives signals from the Program Counter flip-flop FPC20. The output of OR-gate 895 is applied, with signals from the Control Counter flip-flop FCC41, to an AND-gate 896. The output of AND-gate 896 is applied to the OR-gate 893. The output of the OR-gate 893 is appropriately amplified by an emitter follower 897 and applied to the set input terminal of the flip-flop FCC5.

The flip-flop FCC5 also receives a clock signal from the ungated clock driver CU111, a reset register transfer signal from the reset decode circuit XRS11, and a reset signal from its own output terminal (FCC51). The Control Counter flip-flop FCC5 therefore provides a set signal FCC51, or a reset signal FCC50.

Since the set output signal FCC51 of the Control Counter flip-flop FCC5 is applied directly to the reset input terminal of the same flip-flop, it may be seen that each time the flip-flop FCC5 assumes the set state, the application of the next succeeding clock pulse at the clock pulse terminal will cause the flip-flop to assume the reset state and provide a reset signal FCC50.

Figure 89:
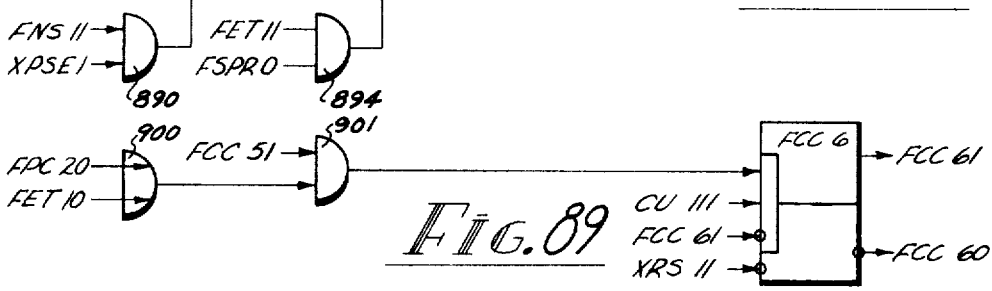
FIG. 89 is a schematic illustration of the Control Counter flip-flop FCC6 and the associated logical circuitry.

Referring to FIG. 89, a schematic illustration of the Control Counter flip-flop FCC61 and the associated logical circuitry are shown. An OR-gate 900 is provided for receiving signals from the Program Counter flip-flop FPC20, and the End of Transfer Mode flip-flop FET10. The output of the OR-gate 900 is applied, together with signals from the Control Counter flip-flop FCC51, to an AND-gate 901. The signal provided by the logical conjunction of the signals applied to the AND-gate 901 is applied to the set input of the flip-flop FCC6. Flip-flop FCC6 also receives clock signals from the ungated clock driver CU111, a reset register transfer signal from the reset decode circuit XRS11, and a reset signal from its own set output terminal FCC61. The Control Counter flip-flop FCC6 therefore provides a set output signal FCC61, a or a reset output signal FCC60. Since the output signal FCC61 is tied directly into the reset input terminal of the flip-flop FCC6, it may be seen that when the flip-flop assumes the set state, it will re-assume the reset state immediately upon the receipt of the next succeeding clock signal.

Figure 90:
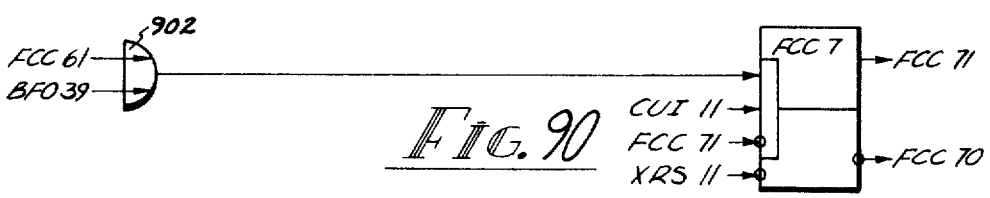
FIG. 90 is a schematic illustration of the Control Counter flip-flop FCC7 and the associated logical circuitry.

Referring to FIG. 90, a schematic illustration of the Control Counter flip-flop FCC7 and the associated logical circuitry are shown. An OR-gate 902 is provided for receiving signals from the Control Counter flip-flop FCC61, and for receiving the Bus Function BF039. The output of the OR-gate 902 is applied to the said input terminal of the flip-flop FCC7. Flip-flop FCC7 also receives clock signals from the ungated clock driver CU111, and a reset register transfer signal from the reset decode circuit XRS11. Reset signal to the flip-flop FCC7 is provided from the set output signal FCC71. Therefore, the Control Counter flip-flop FCC7 provides a set output signal FCC71, or a reset output signal FCC70.

*Program Counter*

The Program Counter provides the necessary signals to determine the cycle of operation; Fill, Transfer, Print, and Slew. The Program Counter receives signals from various circuits throughout the Multiple Font High Speed Printer Control System, and yields signals indicating the particular cycle of operation at that instant. For example, when the fill cycle is complete, the resulting signals received by the Program Counter will cause the counter to generate signals from the four flip-flops of the counter to signal the entire Printer Control System that the fill cycle is complete. The Program Counter enables the Printer Control System to enter into more than one cycle simultaneously. Therefore, under the control of the Program Counter, it may be possible for the Printer Control System to enter into the fill cycle while previously received information is being printed.

Referring to FIG. 91, a schematic illustration of the Program Counter flip-flop FPC1 and the associated logical circuitry are shown. An AND-gate 920 is provided for receiving signals from the Beta-Gamma Tracking flip-flop FBG10, and the input selection switch SIN10. The logical conjunction of these signals provided by the AND-gate 920 yields a signal which is applied to an OR-gate 921. OR-gate 921 also receives signals from the AND-gate 922, which, in turn, receives signals from the input selection switch SIN11, the Load Anticipate flip-flop FHH10, and to receive the cable signal JPRT0. The output of the OR-gate 921 is applied to an AND-gate 923. The AND-gate 923 also receives a signal from the Program Counter flip-flop FPC30, the Block Buffer Status flip-flop FBS11, the End of Data Character flip-flop FED10, the Control Counter flip-flop FCC01, and the Character Loaded flip-flop FCL10. The output signal from the AND-gate 923, representing the logical conjunction of the input signals to the AND-gate, is amplified by an emitter follower 924 and applied to the reset input terminal of the flip-flop FPC1. The Bus Function BF039 is amplified by an emitter follower 925 and applied to the set input terminal of the flip-flop FPC1.

The flip-flop FPC1 also receives clock signals from the ungated clock driver CU021, and a reset register transfer signal from the reset decode circuit XRS11. The Program Counter flip-flop FPC1 therefore provides a set output signal FPC11 or a reset output signal FPC10.

Referring to FIG. 92, a schematic illustration of the Program Counter flip-flop FPC on the associated logical circuitry are shown. An AND-gate 930 is provided for receiving signals from the Print One Line flip-flop FLP10, the Program Counter flip-flop FPC10, the Buffer Error flip-flop FBE10, the Line Printed flip-flop FLP11, the End of Data Character flip-flop FED10, and the test mode select switch STM10. The output of the AND-gate 930 is applied to an OR-gate 931.

An AND-gate 932 is provided for receiving signals from the Beta-Gamma Tracking flip-flop FBG10, and the input selection switch SIN10. The output of the AND-gate 932 is applied to an OR-gate 933. The OR-gate 933 also receives an input from an AND-gate 934 which receives signals from the input selection switch SIN11, the Load Anticipate flip-flop FHH10, and also receives the cable signal JPRT0. The output of the AND-gate 933 is amplified by an emitter follower 935 and applied to an AND-gate 936. The AND-gate 936 also receives signals from the Input Error flip-flop FIE10, the Program Counter flip-flops FPC11 and FPC30, the End of Data Character flip-flop FED10, the Character Loaded flip-flop FCL10, and the Control Counter flip-flop FCC10. The output of the AND-gate 936 is also applied to the OR-gate 931.

An AND-gate 938 is provided for receiving signals from Slew Register flip-flops FSR10, FSR20, FSR30, and FSR41, and for receiving signals from the line marker amplifier ALM11. The output of the AND-gate 938 is applied, together with signals from the slew completed detect decode circuit XSD11, to an OR-gate 939. The output of the OR-gate 939 is applied to an AND-gate 940 which also receives signals from the Print One Line flip-flop FPL10, and the test mode selection switch STM11. The output of the AND-gate 940 is also applied to the OR-gate 931. The OR-gate 931, in addition to receiving output signals from AND-gates 930, 936, and 940, also receives signals from the print one line switch SPL11, and the print switch SPR11. The output of the OR-gate 931 is applied, together with a Block Buffer Status flip-flop FBS11, to an AND-gate 942. The output of the AND-gate 942 is amplified through an emitter follower 943 and applied to the said input terminal of the flip-flop FPC2.

An AND-gate 945 is provided for receiving signals from the Program Counter flip-flop FPC40, the End of Line flip-flop FEL10, the Control Counter flip-flop FCC10, the slew character in store detect decode circuit XSS11, the Line Printed flip-flop FLP10, and the Mechanism Error flip-flop FME10. The signal representing the logical conjunction of the signals provided to the AND circuit 945 is amplified by an emitter follower 946 and applied to the reset input terminal of the flip-flop FPC2. The flip-flop FPC2 also receives a clock signal from the ungated clock driver CU021, and a reset register transfer signal from the reset decode circuit XRS11. The Program Counter flip-flop FPC2 therefore provides a set signal FPC21 or a reset signal FPC20.

Referring to FIG. 93, a schematic illustration of Program Counter flip-flop FPC3 and the associated logical circuitry are shown. The flip-flop FPC3 receives a clock signal from the ungated clock driver CU021. Signals from the reset decode circuit XRS11 are supplied to the reset input terminal of the flip-flop FPC3. Register transfer signals are applied as follows: to the set register transfer input terminal, the gated clock signal CG101; to the reset register transfer input terminal, the gated clock signal CG111. It may be noted that the input signals to the register transfer terminals of the flip-flop FPC3 are derived from gated clock drivers. These gated clock drivers are, in turn, gated when the appropriate logical operations have been performed in the Printer Control System. The output of the flip-flop FPC3 may therefore be the set output signal FPC31 or the reset output signal FPC30.

Figure 94:
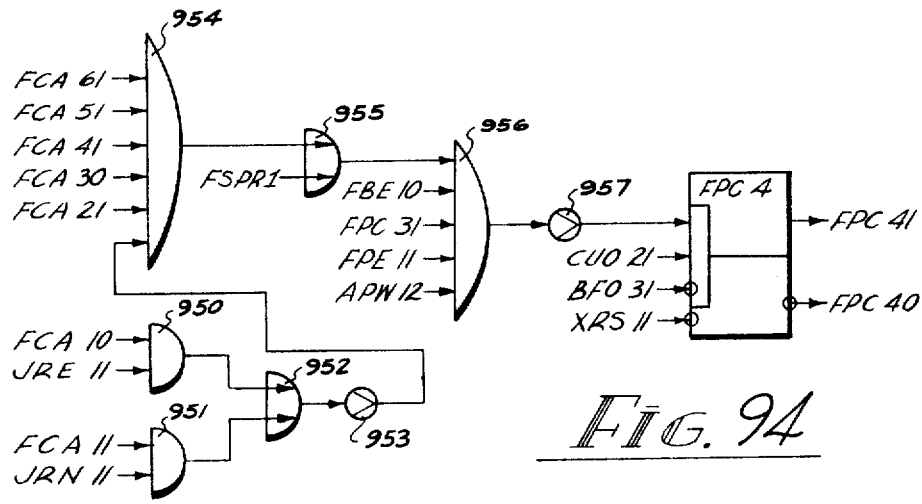
FIG. 94 is a schematic illustration of the Program Counter flip-flop FPC4 and the associated logical circuitry.

Referring to FIG. 94, a schematic illustration of the Program Counter flip-flop FPC4 and the associated logical circuitry are shown. An AND-gate 950 is provided for receiving the cable signal JRE11 and for receiving signals from the column address counter flip-flop FCA10. The output of the AND-gate 950 is applied, along with the output of an AND-gate 951, to an OR-gate 952. The AND-gate 951 receives signals from the Column Address Counter flip-flop FCA11, and receives the cable signal JRN11. The output of the OR-gate 952 is appropriately amplified by an emitter follower 953 and applied to an AND-gate 954. AND-gate 954, in addition to receiving the output of the OR-gate 952, also receives signals from the Column Address Counter flip-flops FCA61, FCA51, FCA41, FCA30, and FCA21. The signal representing the logical conjunction of the input signals to the AND-gate 954 is applied to an OR circuit 955. OR-gate 955 also receives a signal from the Stop Printing flip-flop FSPR1. The output of the OR-gate 955 is applied to an AND-gate 956. AND-gate 956 also receives signals from the Buffer Error flip-flop FBE10, the Program Counter flip-flop FPC31, the Print Enable flip-flop FPE11, and character pulse amplifier APW21. The output of the AND-gate 956 is amplified by an emitter follower 957 and applied to the set input terminal of the flip-flop FPC4.

Flip-flop FPC4 also receives clock signals from the ungated clock driver CU021. The reset input terminal of the flip-flop FPC4 is provided with signals from the Bus Function BF031. The reset register transfer input terminal of the flip-flop FPC4 is provided with signals from the reset decode circuit XRS11. Flip-flop FPC4 therefore provides output signals representing either the set state FPC41 or the reset state FPC40.

*Fill cycle components*

To facilitate the description of the Multiple Font High Speed Printer Control System of the present invention, those groups of elements that can most expeditiously be explained in light of their functional relationships with other elements of the groups will now be described. The structural elements of the present invention may be described in terms of the operative relation between and among the elements during a given cycle of operation. Therefore, it is believed that the principal elements of the Printer Control System may be described in groups in accordance with their primary functions as related to the cycles of operation of the present invention: Fill, Transfer, Print and Slew. It may be noted that the following elements, while having a functional relationship that facilitates their description in connection with the Fill cycle components, have functions that are also pertinent to other cycles. However, if an element has equal pertinency to two or more cycles of operation, the element will be described only in connection with the first cycle. For example, the Word Character Counter flip-flops FWC1–2 play an important role during the Fill and Transfer cycles; therefore, since Fill cycle components are being considered first, the Word Character Counter flip-flops will be discussed only in this section concerned with the Fill cycle components. The interrelationship of all components, regardless of how they are structurally described in the functional groups of Fill, Transfer, Print, and Slew, will become apparent in the description of operation of the Multiple Font High Speed Printer Control System. Accordingly, the following elements have functions primarily concerned with the Fill cycle of the Multiple Font High Speed Printer Control System of the present invention.

Referring to FIG. 95, a schematic illustration of the Tape Forward flip-flop FTF1 and the associated logical circuitry are shown. This flip-flop provides the signal to cause the tape to move forward and to divulge the information stored thereon to the Printer Control System. Thus, to instigate a Fill cycle in an off line mode, the Tape Forward flip-flop must assume the set state to provide a set output signal FTF11. The conditions necessary for the setting and the resetting of the flip-flop FTF1 are provided by the logical circuitry associated with the input terminals thereof. An AND-gate 1000 is provided for receiving signals from the Block Buffer Status flip-flop FBS10, and Stop Code Detect flip-flop FSC10, the reset output of the Tape Forward flip-flop FTF10, the Program Counter flip-flop FPC11, the End of Data Character flip-flop FED10. The logical conjunction of these signals provided by the AND-gate 1000 yields a signal which is applied to an OR-gate 1001. OR-gate 1001 also receives signals from the run tape non-print switch SNP11. Thus, upon receipt of the signals at the input to the AND-gate 1000 or, a receipt of a signal from the switch SNP11, the OR-gate 1001 applies an output signal to the input of a second AND-gate 1002. AND-gate 1002 also receives signals from the input selection switch SIN10, and cable signal JET10. The output of the AND-gate 1002 is applied to the set input terminal of the flip-flop FTF1.

An OR-gate 1003 is provided for receiving signals from the Character Loaded flip-flop FCL11, and the Input Error flip-flop FIE11. The output of OR-gate 1003 is applied to an AND-gate 1004 which also receives signals from the Beta-Gamma Tracking flip-flop FBG10, the set output terminal of the Tape Forward flip-flop FTF1, and the run tape non-print switch SNP10. The output of the AND-gate 1004 is disjunctively combined in OR-gate 1005 with the cable signal JET11. The output of the OR-gate 1005 is applied to the reset input terminal of the flip-flop FTF1. Flip-flop FTF1 also receives a clock signal from the ungated clock driver CU071, and a reset register transfer circuit signal from the reset decode circuit XRS11.

Referring to FIG. 96, a schematic illustration of the Block Buffer Status flip-flop FBS1 and the associated logical circuitry are shown. This flip-flop provides signals indicating the load or unload status of the block buffer. The flip-flop is set or reset in accordance with buffer empty or buffer full signals from the block buffer, or is set and reset in accordance with gated clocks which are gated in accordance with a reset function. An OR-gate 1007 is provided for receiving block buffer full signals from the block buffer full amplifier ABF11, and the gated clock driver CG081. The output of the OR-gate 1007 is applied to the set register transfer input terminal of the flip-flop FBS1. A second OR-gate 1008 is provided for receiving signals from the block buffer empty amplifier ABE11, and the gated clock driver CG091. The output of the OR-gate 1008 is applied to the reset register transfer input terminal of flip-flop FBS1. The output of the flip-flop FBS1 therefore is either a set signal indicating a block buffer unload state FBS11, or a reset signal indicating a block buffer load state FBS10.

Referring to FIGS. 97 and 98, schematic illustrations of the Marker Track Lockup flip-flops FLU1 and FLU2 are shown. These two flip-flops together form the marker strobe pulse. These two flip-flops are set and reset in accordance with signals from the marker track detect enable one-shot MD15.

An AND-gate 1009 is provided for receiving signals from the Marker Track Lockup flip-flop reset output FLU10, and the marker track enable one-shot MD151. The output of the AND-gate 1009 is applied to the set input terminal of the flip-flop FLU1. A second AND-gate 1010 is provided for receiving signals from the Marker Track Lockup flip-flop FLU11, and FLU21. The output of the AND-gate 1010 is applied to the reset input terminal of the flip-flop FLU1. The flip-flop FLU2 is gated by signals applied to its set input terminal from an AND-gate 1012. AND-gate 1012 receives signals from the Marker Track Enable one-shot MD150, and the set and reset output signals reset output signals respectively of the Marker Track Lockup FLU1 and FLU2, respectively. An AND-gate 1013, acting as a dummy AND-gate (for reasons explained previously) receives the set output signal from the flip-flop FLU2 to be applied to the reset input terminal of the same flip-flop FLU2. Both flip-flops FLU1 and FLU2 of FIGS. 97 and 98 are clocked by signals from the ungated clock driver CU091.

Referring to FIG. 99, a schematic illustration of the Marker Track Pulse Follower flip-flop FMF1 is shown. This flip-flop tracks the marker channel of the tape when the system is operating off line, and provides a re-timing function. An AND-gate 1015 is provided for receiving the cable signal JTM10, and the input selection switch signal SIN10. The output of the AND-gate 1015 is applied to an OR-gate 1017. Or-gate 1017 also receives a signal from an AND-gate 1016 which, in turn, receives signals from the Beta-Gamma Tracking flip-flop FBG11, and the input selection switch signal SIN11. The OR-gate 1017 provides a signal which is applied to another AND-gate 1018. AND-gate 1018 also receives signals from the Marker Follower flip-flop FMF10, and receives signals of the Bus Function BF021. The output of the AND-gate 1018 is applied to the set input terminal of the flip-flop FMF1. An AND-gate 1019 is provided for receiving signals from the input selection switch SIN11, and for receiving the cable signal JCD10. The logical conjunction of these signals provided by the AND-gate 1019 is utilized as an input to an OR-gate 1020. OR-gate 1020 also receives an input signal from the input selection switch signal SIN10. The output of the OR-gate 1020 is amplified by an emitter follower 1021 and applied to an OR-gate 1022 which also receives signals from the set output terminal of the Marker Track Pulse Follower flip-flop FMF11, and from the Bus Function BF021. The output of the AND-gate 1022 is applied to the reset input terminal of the flip-flop FMF1. Flip-flop FMF1 also receives a clock from the ungated clock driver CU091, and a reset register transfer signal from the reset decode circuit XRS11. The set output signal of the flip-flop FMF1 is represented by the signal FMF11, and the reset output signal represented by FMF10.

Figure 100:
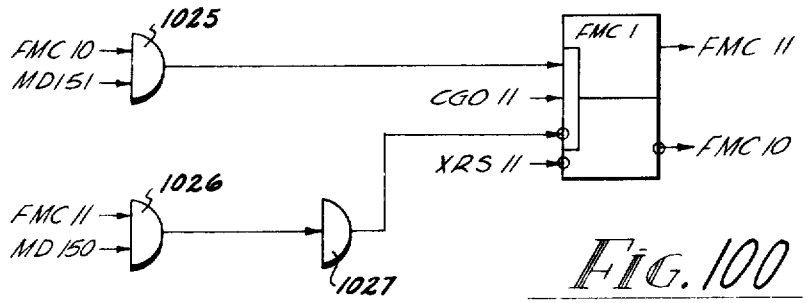
FIGS. 100–102 are schematic illustrations of the Marker Track Counter flip-flops FMC3 and the associated logical circuitry.
Figure 101:
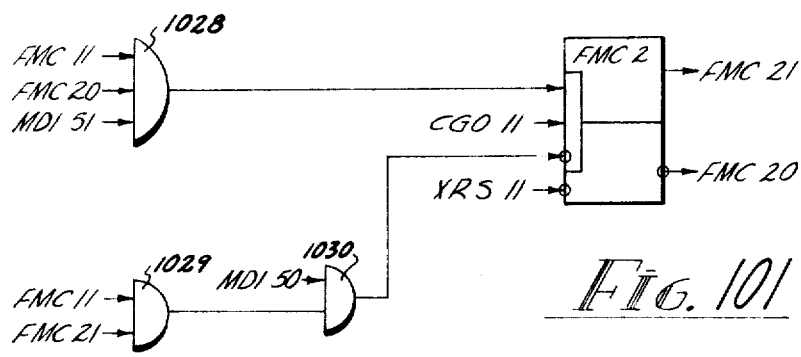
Figure 102:
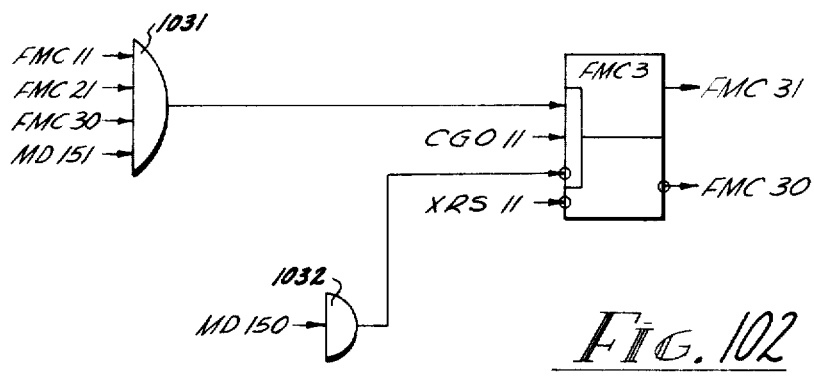

Referring to FIGS. 100, 101, and 102, schematic illustrations of the Marker Track Counter flip-flops and the associated logical circuitry are shown. The Marker Track Counter flip-flops count the number of pairs of marker pulses detected from the marker channel of the magnetic tape. The marker track counter therefore provides output signals indicating the existence of an alpha, beta, or gamma code. An AND-gate 1025 is provided for receiving signals from the reset output terminal of the Marker Track Counter flip-flop FMC10, and the marker track detect enable one-shot MD151. The output of the AND-gate 1025 is applied to the set input terminal of the flip-flop FMC1. A second AND-gate 1026 is provided for receiving the set output signal of the flip-flop FMC11, and for receiving signals from the marker track detect enable one-shot MD150. The output of AND-gate 1026, after passing through a dummy AND-gate 1027, is applied to the reset input terminal of flip-flop FMC1. The set input terminal of the flip-flop FMC2 is connected to the output of an AND-gate 1028 which receives signals from the Marker Track Counter flip-flops FMC11 and FMC21, and from the marker track detect enable one-shot MD151. An AND-gate 1029 is provided for receiving signals from the Marker Track Counter flip-flops FMC11 and FMC21. A logical conjunction of the set output signals from these two flip-flops is applied to an AND-gate 1030 which also receives signals from the marker track detect enable one-shot MD150. The output of the AND-gate 1030 is applied to the reset input terminal of the flip-flop FMC2. The set input terminal of the flip-flop FMC3 is connected to the output of an AND-gate 1031. AND-gate 1031 receives signals from the set output terminals of the Marker Track Counter flip-flops FMC1 and FMC2, and the reset output terminal of the Marker Track Counter flip-flops FMC3. AND-gate 1031 also receives signals from the marker track detect enable one-shot MD151. An AND-gate 1032, utilized as a dummy AND-gate, receives signals from the marker track detect enable one-shot MD150 and applies signals to the reset input terminal of the flip-flop FMC3.

The Marker Track Counter flip-flops FMC1, FMC2, and FMC3 all receive clock signals from the gated clock drivers CG011. Similarly, each of these flip-flops receives a reset signal at the reset register transfer input terminal thereof from the reset decode circuit XRS11. The signals provided by the flip-flops FMC1, FMC2, and FMC3 may be utilized throughout the Printer Control System of the present invention to indicate to the various circuits concerned that a group of marker pulses have been detected.

Referring to FIG. 103, a schematic illustration of the Marker Scaling flip-flop FMS1 and the associated logical circuitry are shown. The Marker Scaling flip-flop operates as a binary scaler and changes state each time the Marker Track Follower flip-flop FMF1 is set. An AND-gate 103 is provided for receiving signals from Marker Follower flip-flop FMF11, the reset output of the Marker Scaling flip-flop FMS10, and the input selection switch SIN10. The output of the AND-gate 1035 is applied to the set input terminal of the Marker Scaling flip-flop FMS1. An AND-gate 1036 is provided for receiving signals from the Marker Follower flip-flop FMF11, the Marker Scaling flip-flop set output signal FMS11, and the input selection switch SIN10. The output of the AND-gate 1036 is applied to the reset input terminal of the flip-flop FMS1. Flip-flop FMS1 also receives a clock signal from the ungated clock driver CU091 and a reset signal applied at the reset register transfer terminal from the reset decode circuit XRS11.

Referring to FIG. 104, the marker track detect enable synchronous one-shot MD15 is shown. The marker track detect enable synchronous one-shot provides a signal to initiate the operation of the marker counter. The marker track detect enable synchronous one-shot MD15 is provided with clock signals from the ungated clock driver CU091. The synchronous one-shot MD15 is triggered to its unstable state through receipt of a gated clock signal CG011 received at the triggering input terminal thereof. Therefore, when a gated clock signal CG011 is received by the synchronous one-shot MD15, the one-shot will assume its unstable state at the next received clock pulse from the ungated clock driver CU091. The synchronous one-shot will remain in the unstable state for 1500 microseconds at which time it will return, at the receipt of the next succeeding clock pulse from CU091, to its stable state. Accordingly, synchronous one-shot MD15 will present an output signal MD151 during the timing period at the recept of the triggering signal CG011. The remainder of the time the synchronous one-shot MD15 will present the output signal MD150.

Referring to FIG. 105, the Beta-Gamma Tracking flip-flop FBG1 and the associated logical circuitry are shown. When the Printer Control System of the present invention is being used in the off line mode, the Beta-Gamma Tracking flip-flop FBG1 will be set during the Fill cycle when a beta marker is sensed. Similarly, it is reset when a gamma marker is sensed. When the Printer Control System of the present invention is being utilized in the on line mode in the Fill cycle, the Beta-Gamma Tracking flip-flop FBG1 is set by the strobe data pulse received from the data processor. An AND-gate 1039 is provided for receiving signals from the Marker Track Lockup flip-flop FLU21, the Marker Track Counter flip-flops FMC20 and FMC31, and the input selection switch SIN10. The output of the AND-gate 1039 is applied to an OR-gate 1040. OR-gate 1040 also receives signals from an AND-gate 1041 which receives signals from the Beta-Gamma Tracking flip-flop FBG10, the Marker Follower flip-flop FMF10, the input selection switch SIN11, and also receives the cable signals JCD11, and JPRT1. The output of the OR-gate 1040 is applied to the set input terminal of the flip-flop FBG1. An AND-gate 1042 is provided for receiving signals from the set output terminal of the Beta-Gamma Tracking flip-flop FBG11, the Marker Follower flip-flop FMF10, and the input selection switch SIN11. The output of the AND-gate 1042 is disjunctively combined in an OR-gate 1043 with the Bus Function BF009. The output of the OR-gate 1043 is applied to the reset input terminal of the flip-flop FBG1. The Beta-Gamma Tracking flip-flop FBG1 precedes clock signals from the ungated clock driver CU101, and receives a resetting signal at the register transfer reset input terminal from the reset decode circuit XRS11. The flip-flop FBG1 presents a set output signal FBG11 when a Beta marker is sensed, and presents a reset output signal FBG10 when a Gamma marker is sensed.

Referring to FIG. 106, a schematic illustration of the Word Character Counter flip-flop FWC1 and the associated logical circuits are shown. An AND-gate 1045 is provided for conjunctively combining Word Character Counter flip-flop signal FWC10, Control Counter flip-flop signal FCC41, and Bus Function signal BF014. The output of the AND-gate 1045 is applied to the set input terminal of the Word Character Counter flip-flop FWC1. An AND-gate 1046 is provided for receiving signals from the Word Character Counter flip-flop set output terminal FWC11, and for receiving the Bus Function BF018. The output of the AND-gate 1046 is supplied to an OR-gate 1047 where is is conjunctively combined with Bus Functions BF015 and BF039. The output of the OR-gate 1047 is appropriately amplified in an emitter follower 1048 and applied to the reset input terminal of the flip-flop FWC1. The Word Character Counter flip-flop FWC1 receives clock signals from the ungated clock driver CU041 and also receives reset signals at the register transfer input terminal thereof from the reset decode circuit XRS11. The function and purpose of the flip-flop FWC1 will be explained in more detail at the description of flip-flop FWC2 shown schematically in FIG. 107.

Figure 107:
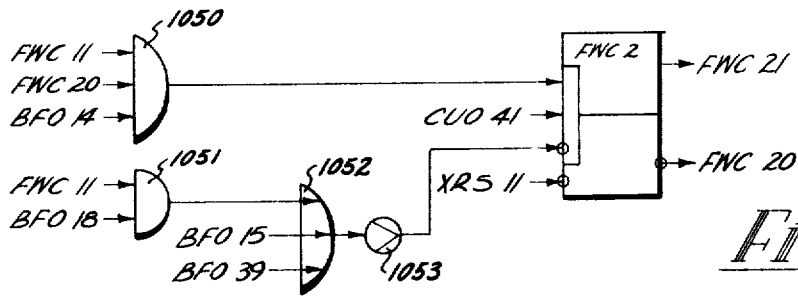

Referring to FIG. 107, a schematic illustration of the Word Character Counter flip-flop FWC2 and the associated logical circuitry are shown. An AND-gate 1050 is shown for receiving signals from the Word Character Counter flip-flops FWC11 and FWC20, and the Bus Function BF014. The logical conjunction of the signals provided to the AND-gate 1050 supplies a signal to the set input terminal of the flip-flop FWC2. A second AND-gate 1051 is provided for receiving signals from the Word Character Counter flip-flop FWC11, and the Bus Function BF018. The output of the AND-gate 1051 is applied to an OR-gate 1052. OR-gate 1052 also receives Bus Function signals BF015 and BF039. The output of the OR-gate 1052 is appropriately amplified by an emitter follower 1053 and applied to the reset input terminal of the flip-flop FWC2.

The Word Character Counter flip-flops FWC1 and FWC2 provide a modulo 4 binary counter. As data is received from the tape transport, the characters of a word initiate the word character counter. When the count stands at zero, the sign code detection circuitry is enabled. When the word being read is an alphanumeric, the count of three of the word character counter indicates that a command character position is being presented to the system, and command character decode circuits are enabled so that special codes may be detected if they are present. When the data from the tape transport is being read, the word character counter is advanced only when both halves of the 8 bit column have been transferred.

Figure 108:
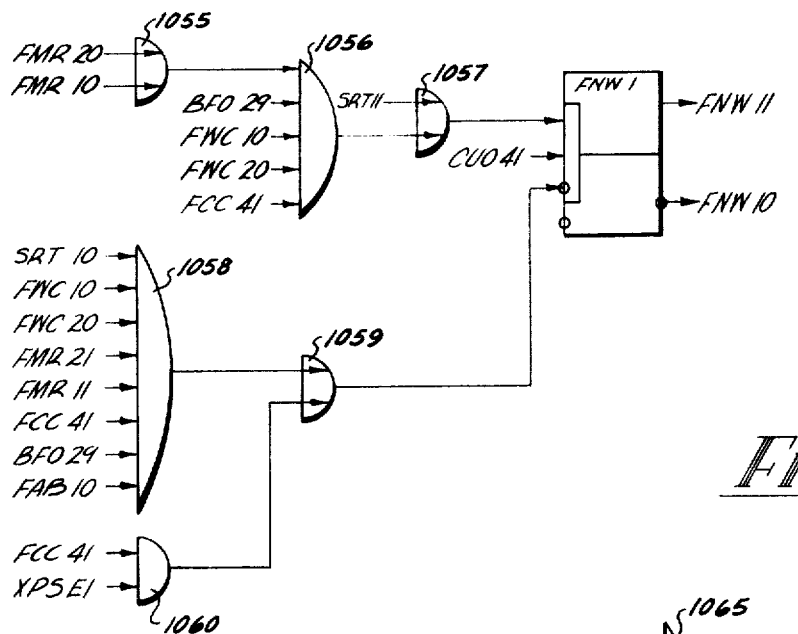
FIG. 108 is a schematic illustration of the Numeric Word flip-flop FNW1.

Referring to FIG. 108, a schematic illustration of the Numeric Word flip-flop FNW1 and the associated logical circuitry are shown. An OR-gate 1055 is provided for receiving signals from Memory Register flip-flops FMR20 and FMR10. The output of the OR-gate 1055 is applied to an AND-gate 1056 which also receives signals from the Control Counter flip-flop FCC41, the Word Character Counter flip-flops FWC10 and FWC20, and the Bus Function BF029. The logical conjunction of the input signals provided to the AND-gate 1056 yields a signal which is applied to an OR-gate 1057 to be disjunctively combined with a signal supplied from the mode selection switch SRT11. The output of the OR-gate 1057 is applied to the set input terminal of flip-flop FNW1.

An AND-gate 1058 is provided for receiving signals from the mode selection switch SRT10, the Word Character Counter flip-flops FWC10 and FWC20, the Memory Register flip-flops FMR21 and FMR11, the Control Counter flip-flops FCC41, the Numeric Word A–B Select flip-flop FAB10, and the Bus Function BF029. The logical conjunction of these signals provided by the AND-gate 1058 yields a signal which is applied to an OR-gate 1059. OR-gate 1059 also receives a signal from an AND-gate 1060 which provides the logical conjunction of signals received from the Control Counter flip-flop FCC41 and the print numeric word sign enable decode circuit XPSE1. The output of the OR-gate 1059 is applied to the reset input terminal of the Numeric Word flip-flop FNW1. Flip-flop FNW1 also receives a clock signal from the ungated clock driver CU041. The determination of a word being read from the magnetic tape as a numeric word causes the flip-flop FNW1 to be set. The flip-flop will remain in the set state until an alphanumeric word is detected, at which time the flip-flop will be reset. Thus, the Numeric Word flip-flop FNW1 will present a set output signal FNW11 when a numeric word is detected, and a reset output signal FNW10 when an alphanumeric word is sensed.

Figure 109:
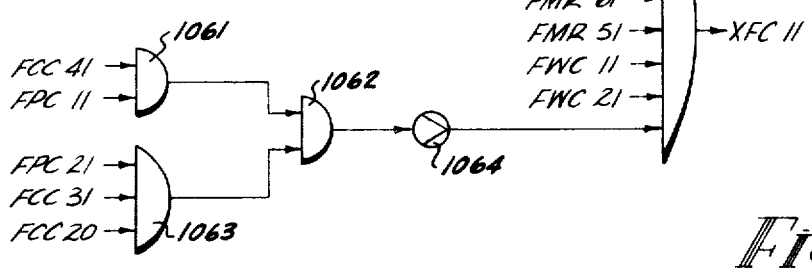
FIG. 109 is a schematic illustration of the decoding circuit for the development of the File Code N detect decode signal XFC11.

Referring to FIG. 109, a schematic illustration of the decoding circuit for the development of the file code "N" detect signal XFC11 is shown. The file code "N" detect decode circuit detects the presence of a file code character during the Fill cycle of operation. An AND-gate 1061 is provided for receiving signals from the Control Counter flip-flop FCC41 and the Program Counter flip-flop FPC11. The output of the AND-gate 1061 is applied to an AND-gate 1062 which also receives signals from an AND-gate 1063. AND-gate 1063 receives signals from the Program Control flip-flop FPC21, and the Control Counter flip-flops FCC31 and FCC20. The output of the AND-gate 1062 is appropriately amplified by an emitter follower 1064 and applied to an AND-gate 1065. AND-gate 1065 also receives signals from Memory Register flip-flops FMR80, FMR71, FMR61, FMR51, and Word Character Counter flip-flops FWC11 and FWC21. The logical conjunction of the input signals applied to the AND-gate 1065 represents the file code "N" detect decode signal XFC11.

Figure 110A:
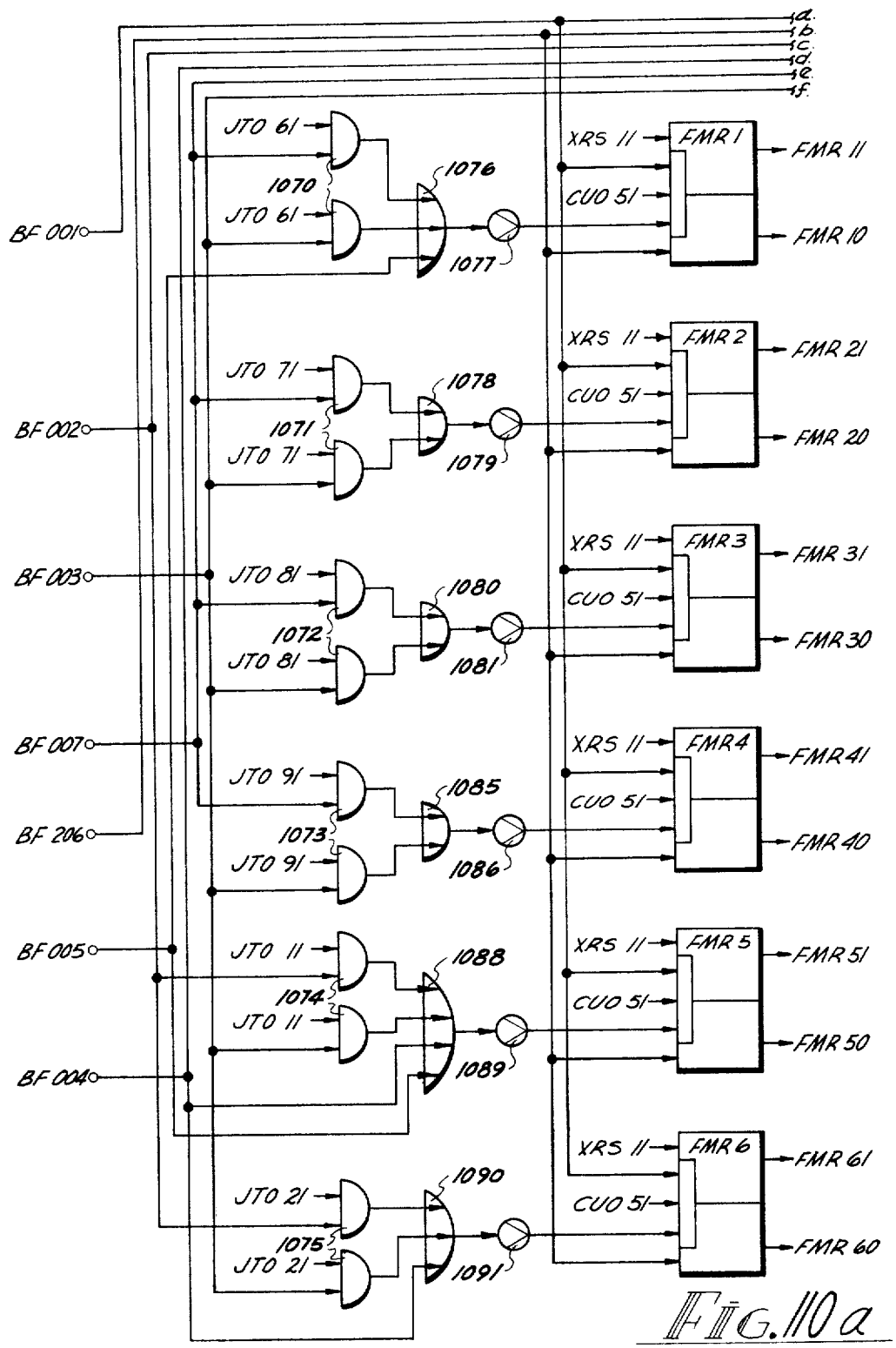
FIGS. 110a and 110b are schematic illustrations of the Memory Register and the associated logical circuitry.
Figure 110B:
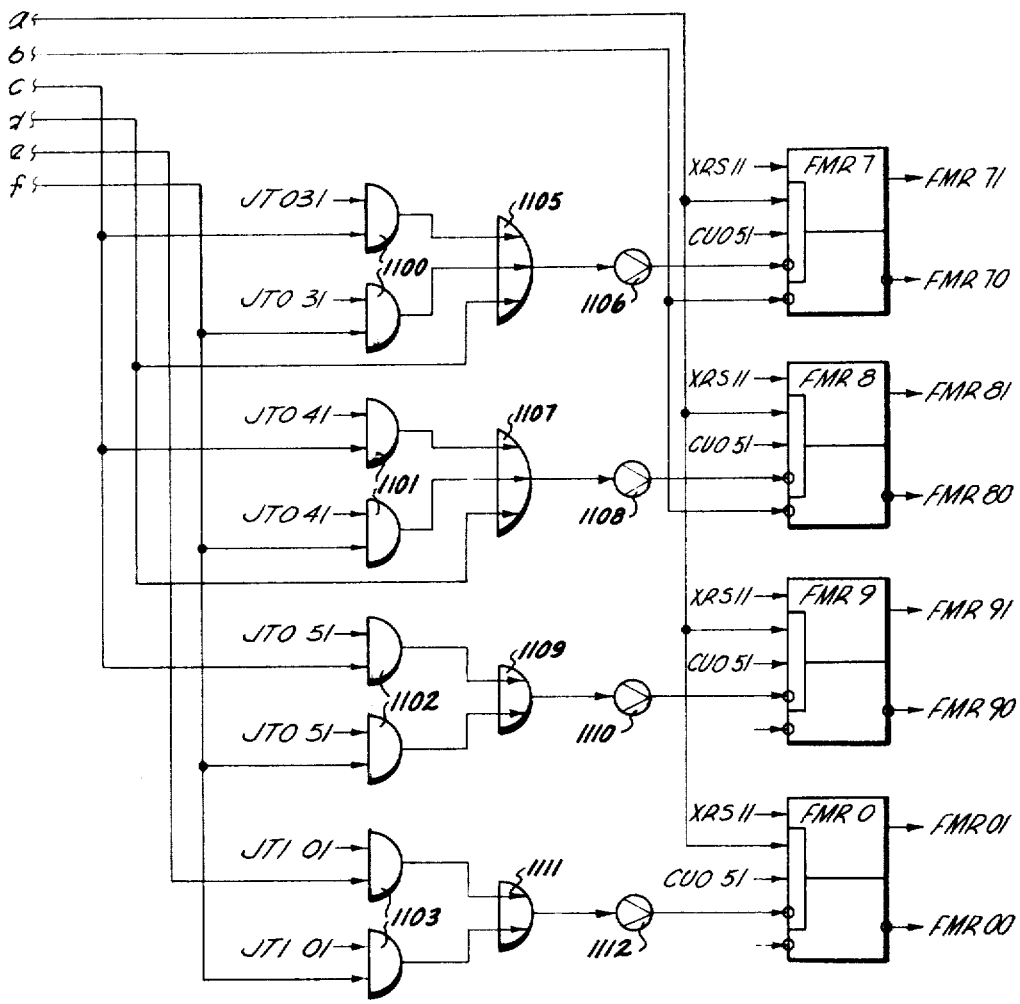

Referring to FIGS. 110a and 110b, a schematic illustration of the memory register is shown. The memory register of the Multiple Font High Speed Printer Control System of the present invention receives information in the form of ten bit columns. The column may be divided into two half columns of five bits each, each half column containing four bits of information and a parity bit. When the word being transferred from the block buffer to the memory register is a numeric word, each half column is treated as a separate character whereas, if the word is an alphanumeric word, both half columns are treated as a single character. The column of bits is received by the memory register from the input source in two groups of five bits each and transferred out of the memory register in parallel as a group of eight bits to the block buffer (column parity bits are not stored in the block buffer). The memory register comprises ten flip-flops FMR1 through FMR0. Each of the Memory Register flip-flops receives signals from a corresponding amplifier which, in turn, receives signals from the magnetic tape through a preamplifier. These signals, appropriately gated by the logical circuitry indicated in FIGS. 110a and 110b, are applied to the reset input terminals of the Memory Register flip-flops.

A pair of AND-gates 1070 are provided for receiving cable signals JT061 from the first channel amplifier. The first of these AND-gates also receives the Bus Function signal BF007, and the second of these gates receives the Bus Function signal BF003. The signals from the AND-gates 1070 are applied to an OR-gate 1076. OR-gate 1076 also is connected to receive Bus Function signal BF005. The output of the OR-gate 1076 is appropriately amplified by an emitter follower 1077 and applied to the reset input terminal of the Memory Register FMR1. Thus, when a zero bit is detected on the magnetic tape in the first channel (it may be noted that only zero bits are detected in the non-return-to-zero method of recording utilized here) the cable signal JT061 will cause one of the AND-gates 1070 to apply an appropriate signal to the OR-gate 1076. The OR-gate 1076, through the emitter follower 1077, causes the Memory Register flip-flop FMR1 to assume the reset state. The memory register is clocked by the ungated clock driver CU051. The Memory Register flip-flop FMR1 thus remains in the reset state to present the reset output signal FMR10 until the flip-flop is set. Flip-flop FMR11 may be set upon application of the Bus Function BF001 to the set input terminal thereof, or, alternatively, the flip-flop may be set upon receipt of a signal from the reset decode circuit XRS11 applied to the set register transfer terminal thereof.

A pair of AND-gates 1071 are provided for receiving cable signals JT071. The first of these AND-gates receives the Bus Function BF007, and the second AND-gate receives the Bus Function BF003. The output of AND-gates 1071 are applied to an OR-gate 1078. The output of OR-gate 1078 is amplified through an emitter follower 1079 and applied to the reset input terminal of Memory Register flip-flop FMR2. Thus, a bit recorded in the second channel of the magnetic tape will cause the appropriate channel amplifier to present a cable signal JT071 to the two AND-gates 1071. If either the Bus Functions BF007 or BF003 are presented to the AND-gate 1071, the OR-gate 1078 will apply a resetting signal to the Memory Register flip-flop FMR2. The resetting signal will cause the flip-flop FMR2 to assume the reset state upon the receipt of the next clock signal.

Memory Register flip-flop FMR2 also receives clock signals from the ungated clock driver CU051. The Memory Register flip-flop may also be driven to the reset state by application of the Bus Function signal BF206 at the reset register transfer input terminal thereof. The memory register may be returned to the set state upon application of the Bus Function BF001 and a clock signal CU051, or, a reset signal from the reset decode circuit XRS11 applied to the set register transfer input terminal of the flip-flop. Therefore, when a zero bit is present in the second channel of the magnetic tape, the Memory Register flip-flop FMR2 will present a reset output signal FMR20, and when one bit is recorded in the second channel of the magnetic tape (no change in magnetic orientation), the Memory Register flip-flop FMR2 will present a set output signal FMR21.

Memory Register flip-flops FMR3, FMR4, FMR5, and FMR6 are each provided with a pair of AND-gates 1072, 1073, 1074 and 1075, respectively. Each AND-gate of a pair receives a cable signal (JT081, JT091, JT011, and JT021, respectively) from a corresponding amplifier which amplifies signals from associated channels of the magnetic tape.

An OR-gate 1080 is provided for receiving signals from the AND-gates 1072; the output of the OR-gate 1080 is amplified through the emitter follower 1081 and applied to the reset input terminal of the Memory Register flip-flop FMR3. Memory Register flip-flop FMR3 also receives clock signals from the ungated clock driver CU051. Memory Register flip-flop FMR3 may also be driven to the reset state upon the receipt of the Bus Function signal BF206. The Memory Register flip-flop may be returned to the set state upon the receipt of a Bus Function signal BF001 and a clock signal CU051; or, upon receipt of a reset decode circuit signal XRS11 applied to the set register transfer input terminal of the flip-flop.

An OR-gate 1085 is provided for receiving signals from the AND-gates 1073. OR-gate 1085 is connected through an emitter follower 1086 to the reset input terminal of memory register FMR4. Memory register FMR4 receives clock signals from the ungated clock driver CU051. Memory register 4 may also be driven to the reset state through the application of the Bus Function BF206 to the reset input register transfer terminal. Memory Register flip-flop FMR4 may be returned to the reset state upon simultaneous receipt of the clock signal CU051 and a Bus Function signal BF001. The flip-flop may also be returned to the set state upon receipt of a reset decode circuit signal XRS1 applied to the set input register transfer terminal of the flip-flop.

An OR-gate 1088 is provided for receiving signals from the AND-gate 1074, and for receiving Bus Function signals BF004 and BF005. OR-gate 1088 is connected through an emitter follower 1089 to the reset input terminal of Memory Register flip-flop FMR5. Memory Register flip-flop FMR5 may also be forced into the reset state by application of the Bus Function signal BF206 to the reset register transfer input terminal of the flip-flop.

Memory Register flip-flop FMR5 also receives clock signals from the ungated clock driver CU051. The Memory Register flip-flop FMR5 may be returned to the set state by the simultaneous application of clock signal CU051 and Bus Function BF001. It may also be returned to the set state by the application of the reset decode circuit signal XRS11 applied to the set register transfer input terminal of the flip-flop FMR5.

An OR-gate 1090 is provided for receiving signals from AND-gate 1075 and for receiving the Bus Function signal BF004. The output of the OR-gate 1090 is amplified through an emitter follower 1091 and applied to the reset input terminal of the Memory Register flip-flop FMR6. Memory Register flip-flop FMR6 also receives a clock signal from the ungated clock driver CU051. The flip-flop may also be forced into the reset state through the application of Bus Function BF206 to the reset input register transfer terminal thereof. The Memory Register flip-flop FMR6 may be returned to the set state by the simultaneous application of a clock signal CU051 and a Bus Function signal BF001; alternatively, the flip-flop may be returned to the set state by the application of a reset decode circuit signal XRS11 to the set register transfer input terminal of the flip-flop.

Memory Register flip-flops FMR7, FMR8, FMR9, and FMR0 are each provided with a pair of AND-gates 1100, 1101, 1102, and 1103 respectively. Each of these pairs of AND-gates receives cable signals (JT031, 41, 51, 101) from on appropriate channel of the magnetic tape.

AND-gates 1100 each receive cable signals JT031; AND-gates 1101 receive cable signals JT041, AND-gates 1102 receive JT051; AND-gates 1103 receive cable signals JT101. An OR-gate 1105 is provided for receiving signals from AND-gates 1100 and for receiving Bus Function BF004. The output of OR-gate 1105 is amplified through an emitter follower 1106 and applied to the reset input terminal of Memory Register flip-flop FMR7. Memory Register flip-flop FMR7 receives clock signals from the ungated clock driver CU051. The flip-flop may also be forced into the reset state through the application of Bus Function BF206 to the reset input register transfer terminal thereof. The flip-flop FMR7 may be returned to the set state through the simultaneous application of Bus Function signal BF001 and the clock signal CU051; alternatively, the flip-fiop may be returned to the set state by the receipt of a signal from the reset decode circuit XRS11 applied to the set register transfer input terminal thereof.

An OR-gate 1107 is provided for receiving signals from the AND-gates 1101 and for receiving Bus Function signal BF004. The output of the OR-gate 1107 is amplified through an emitter follower 1108 and applied to the reset input terminal of Memory Register flip-flop FMR8. Memory Register flip-flop FMR8 receives clock signals from the ungated clock driver CU051. The flip-flop may also be forced into the reset state through the application of Bus Function signal BF206 applied to the reset register transfer input terminal thereof. The Memory Register flip-flop FMR8 is returned to the set state through the simultaneous application of clock signal CU051 and Bus Function signal BF001; alternatively, the flip-flop may be returned to the set state to the application of a reset decode circuit signal XRS11 to the set register transfer input terminal thereof.

An OR-gate 1109 is provided for receiving signals from AND-gates 1102. The output of OR-gate 1109 is amplified through an emitter follower 1110 and applied to the reset input terminal of Memory Register flip-flop FMR9. Flip-flop FMR9 receives clock signals from the ungated clock driver CU051. Flip-flop FMR9 may be returned to the set state through the simultaneous application of clock signal CU051 and Bus Function signal BF001; alternatively, the flip-flop may also be set through the receipt of a reset decode circuit signal XRS11 applied to the register transfer set input terminal thereof.

An OR-gate 1111 is provided for receiving signals from AND-gates 1103. The output of the OR-gate 1111 is amplified in an emitter follower 1112 and applied to the reset input terminal of the Memory Register flip-flop FMR0. Flip-flop FMR0 receives clock signals from the ungated clock driver CU051. The flip-flop may be forced to return to the set state through the simultaneous receipt of clock signal CU051 and Bus Function signal BF001. The flip-flop may also be forced to return to the set state through the application of the reset decode circuit signal XRS11 applied to the set register transfer input terminal of the flip-flop.

The memory register of FIGS. 110a and 110b therefore provide logic level signals indicative of the presence of zero or one bits in the respective channels of the magnetic tape. When magnetic tape is not utilized, or when the Printer Control System of the present invention is being utilized to control a printer that is generating on line, the memory register will receive information in the form of bits directly from the central processor or the data processing system in which the present invention is being utilized.

Each of the flip-flops FMR1–FMR0 provide a set output signal to indicate that a binary 1 exists in the respective channel (no change in the direction of magnetic saturation in that channel of the magnetic tape), and present reset signals when a binary zero is detected (the direction of magnetization has changed at the particular loctation to thereby indicate the recordation of a binary 0). The binary information, in the form of ten bit columns thus recorded on the magnetic tape may be read, the signals derived therefrom amplified and applied to the Memory Register flip-flop to present signals of appropriate logic amplitude and duration for utilization in the Printer Control System.

Referring to FIG. 111, a schematic illustration of the decoding circuit for the development of the decode signal XFS11 is shown. The decode signal XFS11 is a file select decode which indicates that a file code character is detected that corresponds to a selected file chosen by the appropriate plugboard insertions. When the decode signal XFS11 assumes the "true" state, that is, the system of the present embodiment, assumes a positive 6 volt level, this signal is then applied to the In File flip-flop to indicate that the system is now "In File" and information received from the magnetic tape may now be processed. An OR-gate 1115 is provided for receiving signals from the start of file "N" code detect decode circuits XFS11, XSF21, XSF31, XSF41, XSF51 and XSF61. The output of the OR-gate 1115 is applied to an AND-gate 1116 wherein the signal provided by the OR-gate is conjunctively combined with the file code "N" detect decode circuit signal XFC11 and the Program Counter flip-flop signal FPC11. When the input signals to the AND-gate 1116 are true, the file select decode signal XFS11 is true.

Referring to FIG. 112, a schematic illustration of the decoding circuit for the development of the decode signal XFCS1 is shown. The file code start detect decode signal XFCS1 is a signal that represents the instigation of a file code in the Printer Control System. When any file code starting signal is detected during the Fill cycle, the file code start detect decode signal XFCS becomes true, i.e., becomes XFCS1. This signal is derived through the logical conjunction of Bus Function signal BF035, and file code "N" detect decode circuit signal XFC11 in the AND-gate 1117.

Referring to FIG. 113, a schematic illustration of the decoding circuits for the development of decode signals XSF11–XSF61 are shown. The start of file "N" code detect decode circuits are utilized to enable the In File flip-flop to assume a set state when a start file code is detected in the command code position of an alphanumeric word. The decode circuit compares the plugboard selection of the desired file "N" code with the code stored in the memory register of the alphanumeric command code column. The start of the file "N" code detect decode circuits XSF1 through XSF6 are formed of AND-gates 1119–1124, respectively. The conjunction formed by the AND-gates of appropriate signals presents the start of file "N" code detect decode circuit signals XSF11–XSF61.

AND-gate 1119 is provided for receiving signals from the Memory Register flip-flops FMR11, FMR20, FMR40, and the select file patch of the plugboard PSF11. The logical conjunction of these signals provided by the AND-gate 1119 represents the start of file "1" code detect signal.

AND-gate 1120 is provided for receiving signals from Memory Register flip-flops FMR10 and FMR20, and for receiving signals from the select file patch of the plugboard PSF21. The logical conjunction of these signals provided by the AND-gate 1120 represents the start of file "2" code detect signal XSF21. AND-gate 1121 is provided for receiving signals from the Memory Register flip-flops FMR11 and FMR21 and for receiving signals from the select file patch of the plugboard PSF31. The logical conjunction of these signals provided by the AND-gate 1121 represents the start of file "3" code detect signal.

The AND-gate 1122 is provided for receiving signals from the Memory Register flip-flop FMR31, and the select file patch PSF41 of the plugboard. The logical conjunctions of these signals provided by the AND-gate 1122 represents the start of file "4" code detect signal XSF41. The AND-gate 1123 is provided for receiving signals from the Memory Register flip-flops FMR41 and FMR10, and for receiving signals from the select file patch PSF51 of the plugboard. The logical conjunction of these signals provided by the AND-gate 1123 represents the start of file "5" code detect signal XFS51. AND-gate 1124 is provided for receiving signals from Memory Register flip-flops FMR41 and FMR11, and for receiving signals from the select file patch PSF61 of the plugboard. The logical conjunction of these signals provided by the AND-gate 1124 represents the start of file "6" code detect signal XSF61.

Referring to FIG. 114, a schematic illustration of the File Code Sequence flip-flop FFCS is shown. The File Code Sequence flip-flop FFCS is sensitive to start file codes and is set when such codes are detected, the File Code Sequence flip-flop FFCS is reset. Therefore, since information must be bracketed with a start file code and an end of file code, the flip-flop FFCS must alternate between the set and reset states. Thus, the File Code Sequence flip-flop FFCS is utilized to check the sequence of the file codes to insure that the information received, and being processed, is properly located within a desired file. An AND-gate 1125 is provided for receiving signals from the Market Track Lockup flip-flop FLU21, the Market Track Counter flip-flop FMC20 and FMC31, the Tape Reverse flip-flop FPR11, and the File Tracking flip-flop FFT11. The output of the AND-gate 1125 is applied to an OR-gate 1126 which also receives signals from the second AND-gate 1127. AND-gate 1127 receives signals from the Program Counter flip-flop FPC11, the Numeric Word flip-flop FNW10, and the file code start detect decode circuit XFCS1. The output of the OR-gate 1126 is supplied to the set input terminal of the flip-flop FFCS.

An AND-gate 1129 is provided for receiving signals from Program Counter flip-flop FPC11, and the end of file detect decode circuit XEF11. The second AND circuit 1130 is provided for receiving signals from the mode selection switch SRT10, the Marker Track Lockup flip-flop FLU21, the Marker Track Counter flip-flops FMC20 and FMC31, the File Tracking flip-flop FFT10, and the Tape Reverse flip-flop FTR11. The output signals derived from the AND-gates 1129 and 1130 are applied to an OR circuit 1131 which, in turn, is connected to the reset input terminal of the File Code Sequence flip-flop FFCS. Flip-flop FFCS receives clock signals from the ungated clock driver CU061; the flip-flop FFCS may also be reset through the application of a signal from the reset decode circuit XRS11 to the reset register transfer input terminal of the flip-flop. Therefore, the File Code Sequence flip-flop FFCS will provide a set output signal FFCS1 when a start file code is sensed; and will present a reset output signal FFCS0 when an end of file code is sensed.

Referring to FIG. 115, a schematic illustration of the File Tracking flip-flop FFT1 is shown. The File Tracking flip-flop FFT1 is utilized as a memory to store the In File or Out of File status at the beginning of a block of data to be entered into the block buffer. Therefore, this flip-flop may be set or reset only when a Beta marker (beginning of a block of data) is detected. An AND-gate 1135 is provided for receiving the Bus Function signal BF024 and the In File flip-flop FIF11. The output of the AND-gate 1135 is applied to the set input terminal of the flip-flop FFT1. A second AND-gate 1136 is provided for receiving the Bus Function signal BF024, and the reset output signal FIF10 of the In File flip-flop. The output of the AND-gate 1136 is applied to the reset input terminal of the flip-flop FFT1. The File Tracking flip-flop FFT1 receives clock signals from the ungated clock driver CU081. Therefore, flip-flop FFT1 presents a set output signal FFT11 when an in file condition is established, and presents a reset output signal FFT10 when an out of file condition is established.

Figure 116:
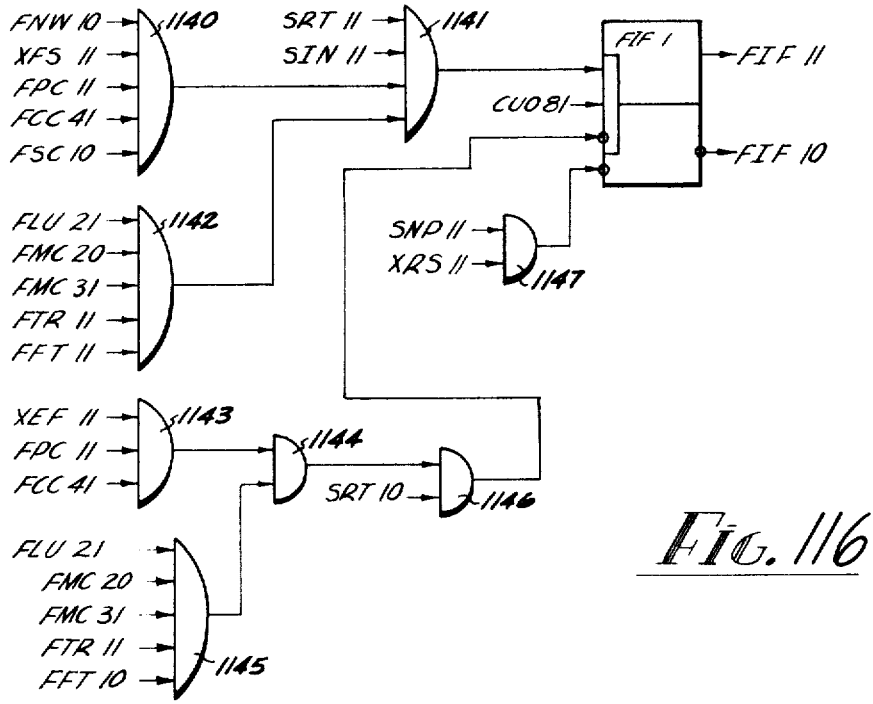
FIG. 116 is a schematic illustration of the In File Detect flip-flop FIF1 and the associated logical circuitry.

Referring to FIG. 116, a schematic illustration of the In File flip-flop FIF1 and the associated logical circuitry are shown. When a begin file code is detected that corresponds to the selected file code inserted in the plugboard, this flip-flop is set. When flip-flop FIF1 is set, data may be loaded into the block buffer. The flipflop is reset when it receives an end of file code. Therefore, the In File flip-flop FIF1 acts as a "switch" to enable the block buffer to accept information when an appropriate code is detected. Similarly, the flip-flop inhibits information from being loaded into the block buffer when the information being presented at the particular moment is not preceded by the designated code.

An AND-gate 1140 is provided for receiving signals from the Numeric Word flip-flop FNW10, the file select decode circuit XFS11, the Program Counter flip-flop FPC11, the Control Counter flip-flop FCC41, the Stop Code Detect flip-flop FSC10. The logical conjunction of these signals provided by the AND-gate 1140 is applied to an AND-gate 1141. AND-gate 1141 also receives signals from the mode selection switch SRT11, the input selection switch SIN11, and another AND-gate 1142. AND-gate 1142 receives signals from the Marker Track Lockup flip-flop FLU21, the Marker Track Counter flip-flops FNC20, and FNC31, the Tape reverse flip-flop FTR11, and the File Tracking flip-flop FFT11.

The output of the AND-gate 1141 is applied to the set input terminal of the flip-flop FIF1. An AND-gate 1143 is provided for receiving signals from the Control Counter flip-flop FCC41, the Program Counter flip-flop FCC11, and the end of file code decode circuit XEF11. The output of the AND-gate 1143 is applied to a second AND-gate 1144 which also receives signals from AND-gate 1145, the latter provided for receiving signals from the Marker Track Lockup flip-flop FLU21, the Marker Track Counter flip-flops FMC20 and FMC31, the Tape Reverse flip-flop FTR11, and the File Tracking flip-flop FFT10. The output of the AND-gate 1144 is applied to an AND-gate 1146 which also receives signals from the mode selection switch SRT10. The output of the AND-gate 1146 is applied to the reset input terminal of the In File flip-flop FIF11. In File flip-flop FIF1 receives clock signals from the ungated clock driver CU081. Flip-flop FIF1 may be forced to the reset state through the application of a signal from an AND-gate 1147 to the reset register transfer input terminal thereof. AND-gate 1147 receives signals from the reset decode circuit XRS11, and the run tape non-print switch SNP11. The In File flip-flop FIF1 therefore presents a set output signal FIF11 when an In File condition is established, thereby permitting informaiton to be loaded into the block buffer. Similarly, the In File flip-flop FIF1 presents a reset output signal FIF10 when an Out of File condition exists; therefore, inhibiting information being presented to the buffer from entering the buffer.

Figure 117:
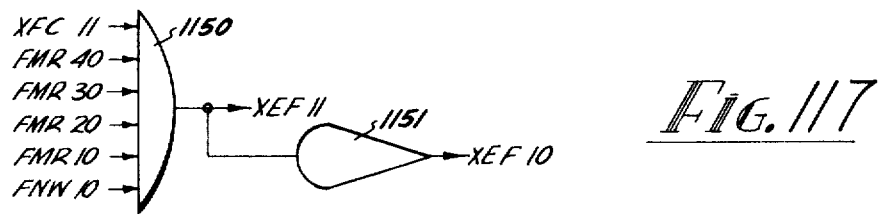
FIG. 117 is a schematic illustration of the decoding circuit for the development of the End of File code detect signal XEF10.

Referring to FIG. 117, a schematic illustration of the decoding circuit for the development of decode signal XEF11 and XEF10 are shown. The end of file code detect circuit XEF1 shown in FIG. 117 presents a true signal (+6 v.) whenever an end of file code is detected in the least significant character position of an alphanumeric word in the Fill cycle. The in file code detect signal XEF11 is provided by an AND-gate 1150 which receives signals from the file code detect decode circuit XFC11, the Memory Register flip-flops FMR40, FMR30, FMR20, FMR10, and the Numeric Word flip-flop FNW10. The end of file code detect signal XEF10 is provided by inverting the signal XEF11 by means of an inverter circuit 1151. Therefore, the end of file code detect circuit XEF1 of FIG. 117 presents a signal XEF11 when an end of file code is detected, and provides a signal XEF10 at all other times.

Figure 118:
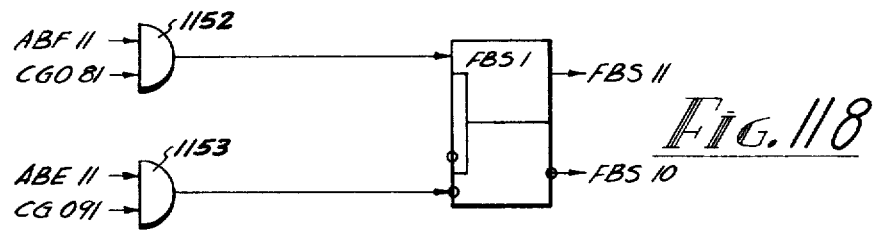
FIG. 118 is a schematic illustration of the Block Buffer Status flip-flop FBS1 and the associated logical circuitry.

Referring to FIG. 118, a schematic illustration of the Buffer Status flip-flop FBS1 is shown. The Buffer Status flip-flop FBS1 provides a signal indicating the present status of the block buffer. This flip-flop enables other circuits of the Printer Control System to perform operations depending on the load or unload status of the block buffer. An AND-gate 1152 is provided for receiving a block buffer full signal from the block buffer amplifier ABF11, and for receiving the gated clock pulse CG081.

The output of the AND-gate 1152 is applied to the set register transfer input terminal of the Buffer Status flip-flop FBS1. A second AND-gate 1153 is provided for receiving signals from the block buffer empty signal amplifier ABE11, and for receiving signals from the gated clock driver CG091. The output of the AND-gate 1153 is applied to the reset register transfer input terminal of the Buffer Status flip-flop FBS1. It will be noted that this flip-flop does not have a clock signal applied thereto; instead, all input signals are applied to the register transfer input terminals thereof, and, in turn, these signals are conditioned by clock signals applied through the means of the gated clock pulse applied to an AND-gate prior to the application of the signal to the flip-flop. Therefore, the Buffer Status flip-flop FBS1 will provide a set output signal FBS11 indicating that the block buffer is full; alternatively, the flip-flop will present a reset output signal FBS10 indicating that the block buffer is empty.

Figure 119:
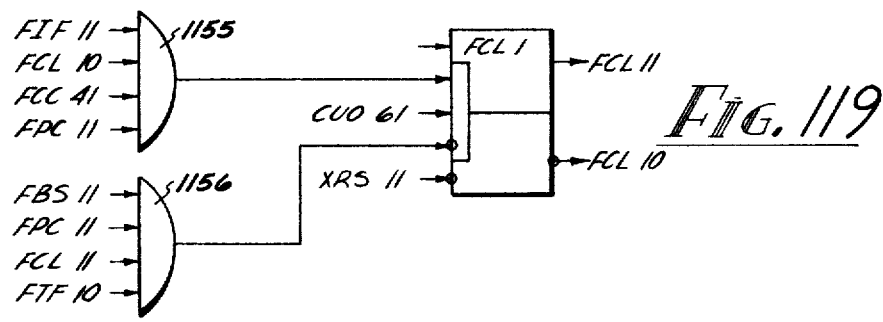
FIG. 119 is a schematic illustration of the Character Loaded flip-flop FCL1 and the associated logical circuitry.

Referring to FIG. 119, a schematic illustration of the Character Loaded flip-flop FCL1 and associated logical circuitry are shown. The character Loaded flip-flop FCL1 is utilized during the Fill cycle to detect whether any characters have been loaded into the block buffer. Therefore, when the character has been detected and loaded into the block buffer, the Character Loaded flip-flop FCL1 will be set, and will permit the magnetic tape to continue running until a Gamma marker is detected indicating the end of the block of information. If no characters have been loaded into the block buffer, the Character Loaded flip-flop FCL1 will remain in the reset state thereby causing the tape to continue running until a block of information is reached wherein a character is loaded into the block buffer.

An AND-gate 1155 is provided for receiving signals from the In File Detect flip-flop FIF11, the reset output of the Character Loaded flip-flop FCL10, the Control Counter flip-flop FCC41, and the Program Counter flip-flop FPC11. The output of the AND-gate 1155 is applied to the set input terminal of the Character Loaded flip-flop FCL1. An AND-gate 1156 is provided for receiving signals from the Block Buffer Status flip-flop FBS11, the Program Counter flip-flop FPC11, the set output terminal of the Character Loaded flip-flop FCL11, and the Tape Forward flip-flop FTF10. The output of the AND-gate 1156 is applied to the reset input terminal of the Character Loaded flip-flop FCL1. Flip-flop FCL1 receives clock signals from the ungated clock driver CU061, and receives reset signals from the reset decode circuit XRS11 at the reset input register transfer terminal thereof. Therefore, the Character Loaded flip-flop FCL1 will provide a set output signal FCL11 when a character has been loaded into the block buffer, and will provide a reset output signal FCL10 when no character has been loaded into the block buffer.

Referring to FIG. 120, a schematic illustration of the End of Data Character flip-flop FEB1 and associated logical circuitry are shown. The End of Data Character flip-flop FED1 is utilized to load a designated code into the block buffer when the block buffer has been loaded with less than 400 characters and an end of data transmission from input equipment to the Printer Control System is received. Thus, the block buffer will be loaded and the Printer Control System may proceed into the Transfer cycle from the Fill cycle even though the block buffer contains less than 400 characters. Therefore, the flip-flop FED1 will present a set output signal when an end of data transmission code is detected and the block buffer has been loaded with less than 400 characters.

The End of Data flip-flop FED1 will be reset when the block buffer status changes to the unload state. An AND-gate 1160 is provided for receiving signals from the Beta-Gamma Tracking flip-flop FBG10, and the cable signal JPRT0. The output of the AND-gate 1160 is applied to a second AND-gate 1161. AND-gate 1161 also receives signals from the End of Data Character Generator flip-flop FED10, the mode selection switch SRT10, the Block Buffer Status flip-flop FBS10, the Program Counter flip-flop FPC11, the Control Counter flip-flop FCC01, and the Character Loaded flip-flop FCL11. The output of the AND-gate 1161 is applied to the set input terminal of the End of Data Character flip-flop FED1. An AND-gate 1162 is provided for receiving signals from the End of Data Character Generator flip-flop FED11 (the set output signal from the flip-flop FED1), the Block Buffer Status flip-flop FBS11, and the Control Counter flip-flop FCC01. The output of the AND-gate 1162 is applied to the reset input terminal of the flip-flop FED1. Flip-flop FED1 also receives clock signals from the ungated clock driver CU021, and a resetting signal from the reset decode circuit XRS11 applied to the reset register transfer input terminal of the flip-flop FED1. Therefore, the flip-flop FED1 will present a set output signal FED11 when an end of data transmission signal is received from input equipment to the Printer Control System and the block buffer has been loaded with less than 400 characters; similarly, the flip-flop FED1 will present a reset output signal FED10 when the block buffer status changes to the unload state, and will remain in the reset state at all other times.

Figure 121B:
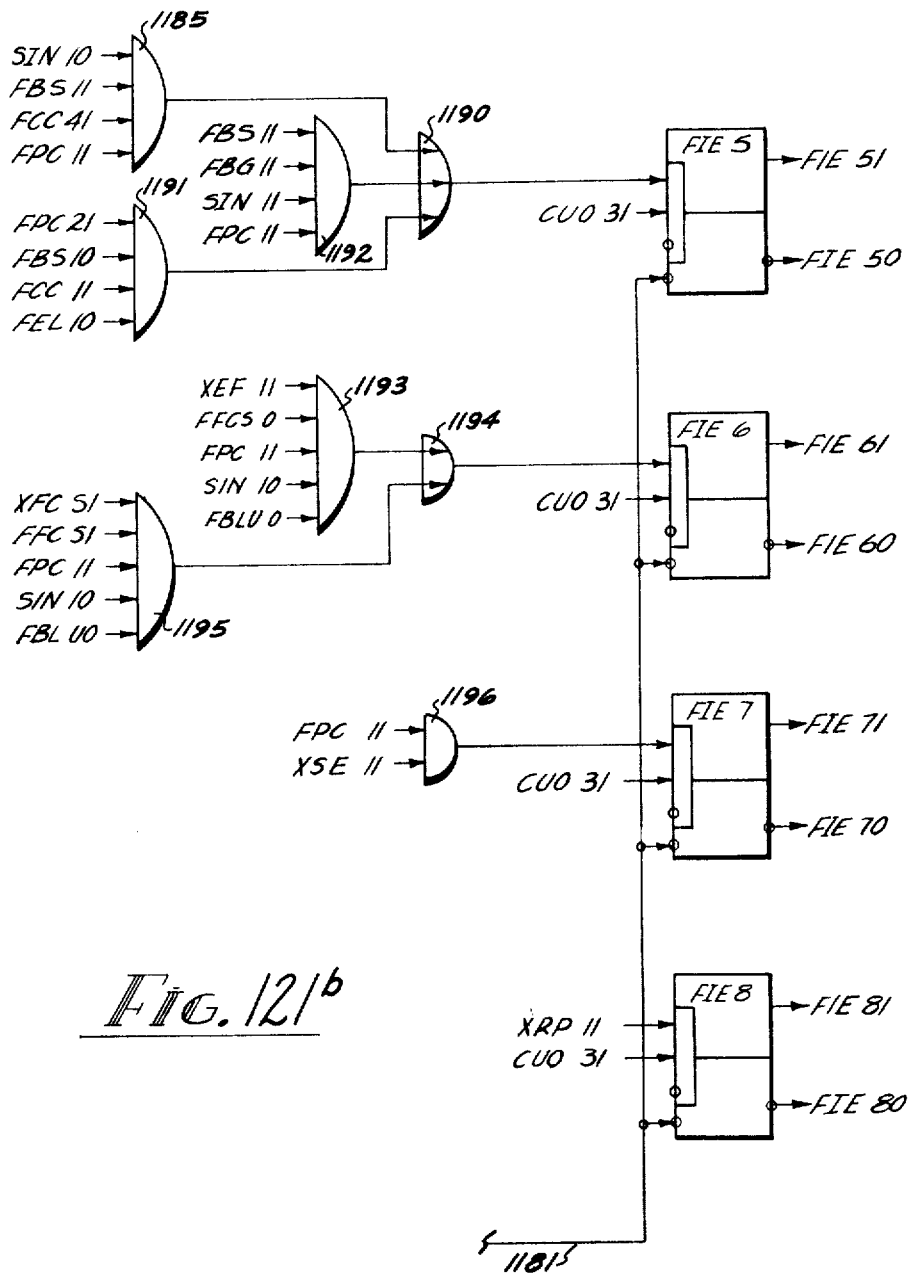

Referring to FIGS. 121a and 121b, a schematic illustration of the Input Error flip-flops FIE1–8 is shown. Input Error flip flop FIE1 is set whenever an input error is detected by any of the logical circuits provided, as shown in FIG. 121a, for the detection of logical errors. Flip-flops FIE2–8 are each responsive to a particular set of logical conditions that indicate an error or errors occurring in the Printer Control System. The outputs of the various FIE flip-flops are applied, in a logical manner, to the first Input Error flip-flop FIE1 which acts as the Master Input Error flip-flop signal generator. An AND-gate 1165 is provided for receiving signals from the Beta-Gamma Tracking flip-flop FBG10, and the input selection switch SIN10. The output of the AND-gate 1165 is applied to an OR-gate 1166 which also receives signals from an AND-gate 1167. AND-gate 1167 receives cable signal JPRT0, the Load Anticipate flip-flop FHH11, and the input selection switch SIN11. The signal provided by the OR-gate 1166 is applied to an AND-gate 1168. An AND-gate 1169 receives signals from the Input Error flip-flop FIE41, and the Program Counter flip-flop FPC11. The output of the AND-gate 1169 is applied to an OR-gate 1170. AND-gate 1171 receives signals from the Input Error flip-flop FIE51 and Program Counter flip-flop FPC11. AND-gate 1172 receives signals from the Input Error flip-flop FIE81 and the Program Counter flip-flop FPC11. The outputs of the AND-gates 1171 and 1172 are also applied to the OR-gate 1170. OR-gate 1170, in addition to receiving signals from the AND-gates 1169, 1171, and 1172 also receive signals from the Input Error flip-flops FIE21, FIE31, FIE61, and FIE71. The output of the OR-gate 1170 is applied to the AND-gate 1168 along with signals from the AND-gate 1166 and the error ignore signal SEI10. Output of AND-gate 1168 is applied to the set input terminal of the Input Error flip-flop FIE1. The Input Error flip-flop FIE1 receives a clock signal from the ungated clock driver CU031, and a reset signal from the error ignore switch SEI11 applied to the reset input terminal thereof.

An AND-gate 1173 is provided for receiving signals from the Program Counter flip-flop FPC11, the column parity detect decode circuit XCT31, the run tape non-print switch SNP10, and the input selection switch SIN10. The output of the AND-gate 1173 is applied to the set input terminal of the Input Error flip-flop FIE2. The Input Error flip-flop FIE2 receives a clock signal from the ungated clock driver CU031.

An AND-gate 1174 is provided for receiving signals from the Program Counter flip-flop FPC11, the column parity decode circuit XCP61, the run tape non-print switch SNP10, and the input selection switch SIN10. The output of the AND-gate 1174 is applied to the set input terminal of the Input Error flip-flop FIE3. Input Error flip-flop FIE3 also receives a clock signal from the ungated clock driver CU031.

An AND-gate 1175 is provided for receiving signals from the run tape non-print switch SNP10, the End of Data Character flip-flop FED10, and the Programmed Slew Detect flip-flop FPS11. AND-gate 1175, which provides the logical conjunction of the signals applied thereto, provides a signal which is applied to an OR-gate 1176. OR-gate 1176 also receives a signal from an AND-gate 1177 which, in return, receives signals from the Program Counter flip-flop FPC21, the End of Line flip-flop FEL10, and the print numeric word sign enable decode circuit XPSE0. The output of the AND-gate 1176 is applied to an OR-gate 1178 which also receives signals from the forbidden character code detect decode circuit XFB11, and an OR-gate 1179. OR-gate 1179 receives signals from the Word Character Counter flip-flops FWC11 and FWC21. The output of the AND-gate 1178 is applied to the set input terminal of the Input Error flip-flop FIE4. Input Error flip-flop FIE4 also receives a clock signal from the ungated clock driver CU031.

An AND-gate 1180 is provided for receiving signals from the reset decode circuit XRS11, and the backspace tape switch SBT11. The output of the AND-gate 1180 is applied to the reset register input terminals of Input Error flip-flops FIE1, FIE2, FIE3, and FIE4, and is also applied to the reset register transfer input terminals of Input Error flip-flops FIE5, FIE6, FIE7, and FIE 8 via conductor 1181.

An AND-gate 1185 is provided for receiving signals from the input selection switch SIN10, the Block Buffer Status flip-flop FBS11, the Control Counter flip-flop FCC41, and the Program Counter flip-flop FPC11. The output of the AND-gate 1185 is applied to an OR-gate 1190. OR-gate 1190 also receives signals from AND-gates 1191 and 1192. AND-gate 1191 receives signals from the Program Counter flip-flop FPC21, the Block Buffer Status flip-flop FBS10, the Control Counter flip-flop FCC11, and the End of Line flip-flop FEL10. The AND-gate 1192 receives signals from the Block Buffer Status flip-flop FBS11, the Beta-Gamma Tracking flip-flop FBG11, the input selection switch SIN11, and the Program Counter flip-flop FPC11. The output of the OR-gate 1190 is applied to the set input terminal of the Input Error flip-flop FIE5. Input Error flip-flop FIE5 also receives clock signals from the ungated clock driver CU031.

An AND-gate 1195 is provided for receiving signals from the file select decode circuit XFCS1, the File Code Sequence flip-flop FFCS1, the Program Counter flip-flop FPC11, the input selection switch SIN10, and the Backspace Lockup flip-flop FBLU0.

AND-gate 1193 is provided for receiving signals from the end of file code detect decode circuit XEF11, the File Code Sequence flip-flop FFCS0, the Program Counter flip-flop FPC11, the Input Selection switch SIN10, and the Backspace Lockup flip-flop FBLU0. The output of the AND-gate 1193 is applied to the OR-gate 1194 to be disjunctively combined with signals from the AND-gate 1195. The output of OR-gate 1194 is applied to the set input terminal of the Input Error flip-flop FIE6. Input Error flip-flop FIE6 also receives clock signals from the ungated clock driver CU031.

AND-gate 1196 is provided for receiving signals from the Program Counter flip-flop FPC 11, and the Beta-Gamma sequence error detect decode circuit XSE11. The output of the AND-gate 1196 is applied to the set input terminal of the Input Error flip-flop FIE7. The Input Error flip-flop FIE7 also receives clock signals from the ungated clock driver CU031.

Input Error flip-flop FIE8 receives clock signals from the ungated clock driver CU031, and receives set signals from the row parity detect decode circuit XRP11.

The Input Error flip-flops FIE1–8 therefore are sensitive to errors occurring throughout the High Speed Printer Control System of the present invention and provide signals to indicate that an error has occurred. The error signals originating in the Input Error flip-flops FIE 2–8 are logically combined to cause Input Error flip-flop FIE1 to assume the set state and deliver a signal indicating that an input error has occurred.

Figure 122:
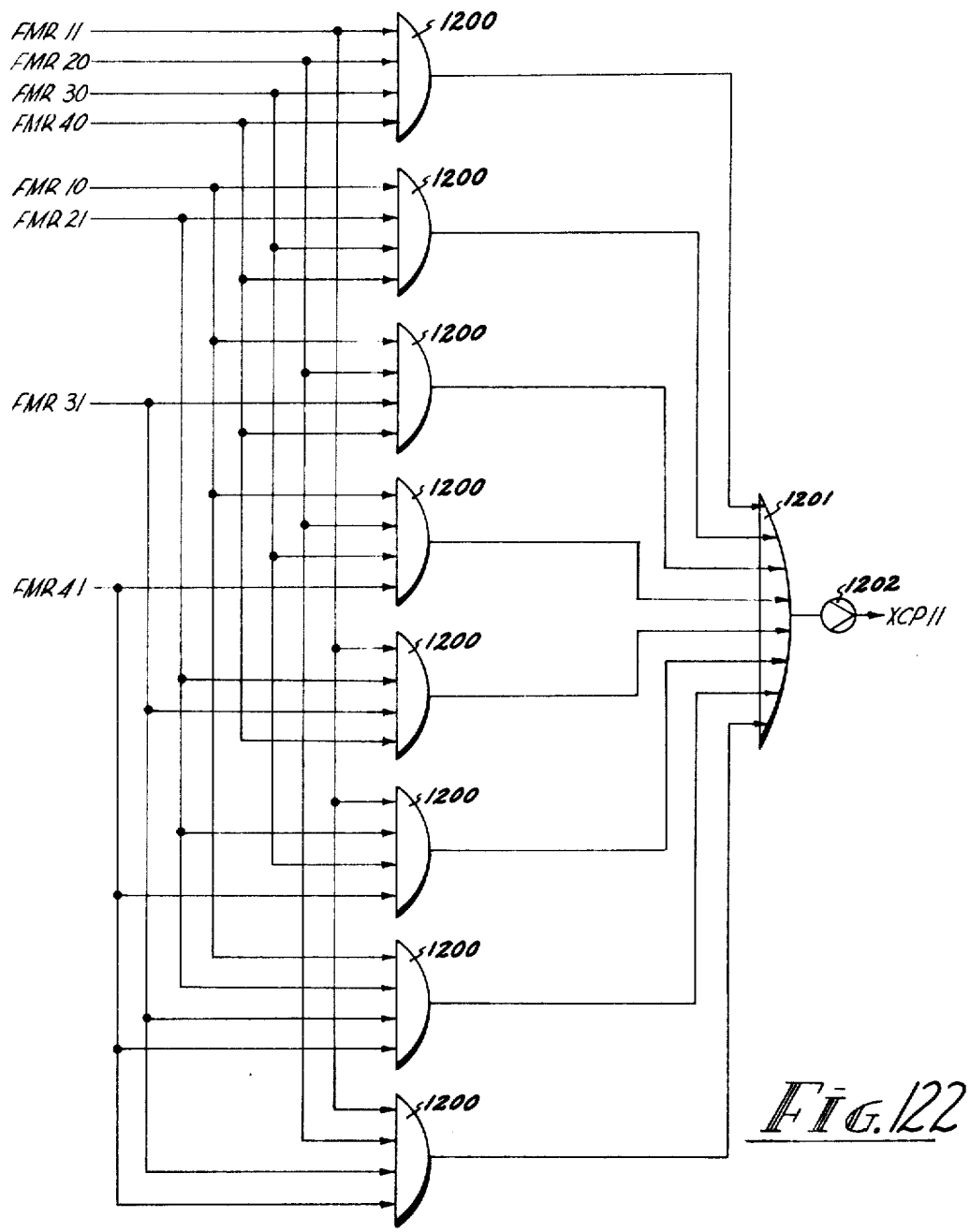
FIGS. 122–127 are schematic illustrations of the decoding circuits for the development of the column parity decode signals XCP11–XCP61.
Figure 123:
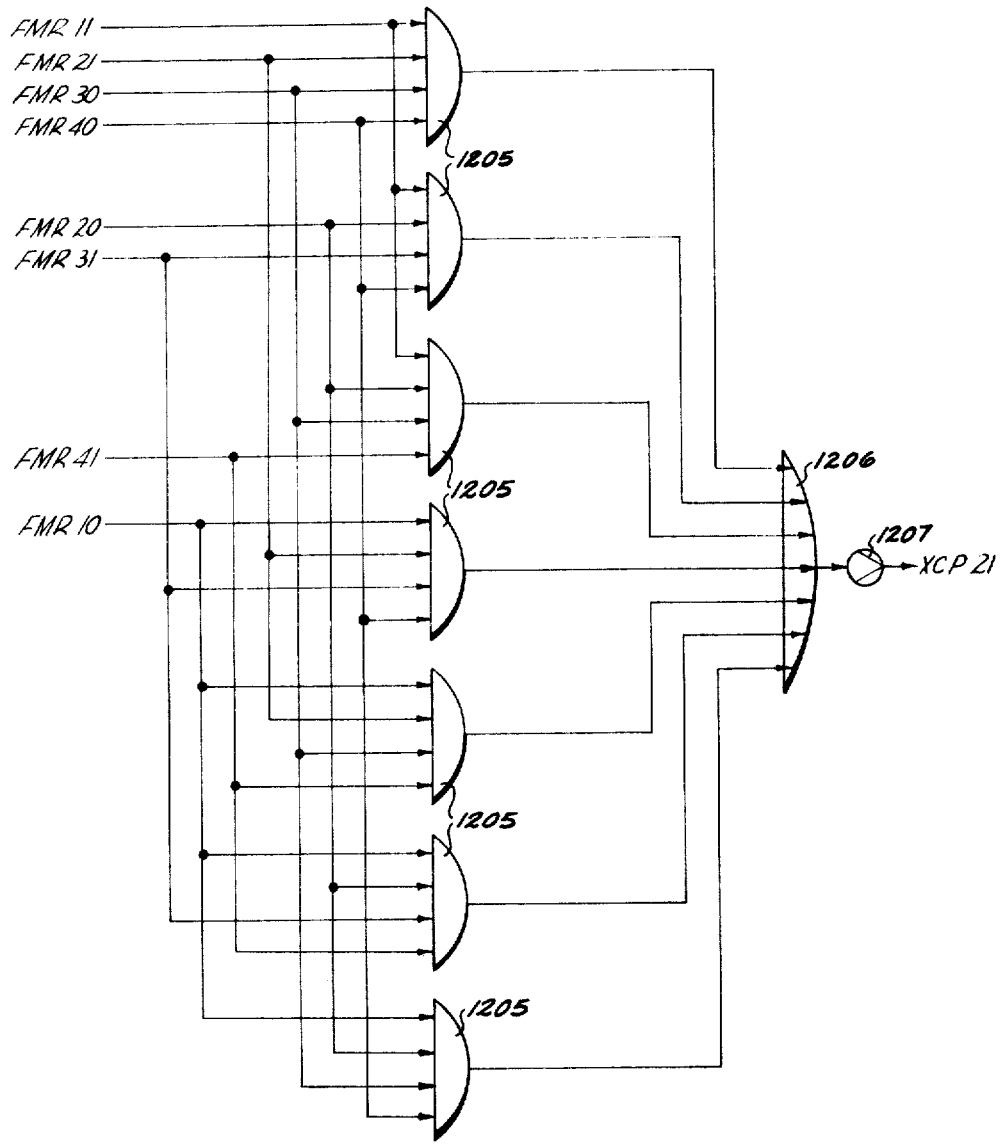

Referring to FIG. 122, a schematic illustration of the decoding circuit for the development of decode signal XCP11 is shown. The decoding signal XCP11 is generated by the sensing of bit combinations in each half of the eight bit data character that are out of parity. As each ten bit column is received by the memory register during the Fill cycle, each half of the ten bits (5 bits) represents either a single numeric character, plus a parity bit, or one-half of an alphanumeric character plus a parity bit. Thus, each half of the eight bits of information received by the memory register is checked with its corresponding parity bit. The column parity checks are derived by the logical combination of the parity bits with the configuration of the bits occurring in the respective flip-flops of the memory register. The various forbidden combinations of bits violative of parity are developed in the column parity decode circuits. FIG. 122 illustrates one of these decode circuits; FIG. 123 illustrates that circuit for developing the column parity signal XCP11.

The decode signal for indicating a column parity error XCP11 is developed through the utilization of a plurality of AND-gates 1200, each for receiving a combination of outputs from four Memory Register flip-flops. If the logical conjunction of the four inputs to any one of the AND-gates 1200 is true, the output of that AND-gate is applied to an OR-gate 1200, and amplified by an emitter follower 1202 and provides the appropriate column parity error signal XCP11. The column parity decode signal XCP11 will subsequently be compared with the parity bit for the corresponding half of the data character, and if the corresponding parity bit is not also true, an error will be indicated and the Input Error flip-flop will be set. Thus, when Memory Register flip-flops FMR1–4 are in the true, false, false, and true states, respectively, the AND-gate 1200 at the top of FIG. 122 will provide a true signal to the OR-gate 1201, which will be amplified by the emitter follower 1202 and be compared to the parity bit (contained in Memory Register flip-flop FMR0). If the parity bit is also true, then no error is indicated; however, if the parity bit is false, then an error will be indicated and the Input Error flip-flop will be set. Accordingly, each of the AND-gates 1200 receives a predetermined combination of signals from the Memory Register flip-flops FMR1-FMR4 and provides appropriate signals at the output thereof for comparison with the column parity bit stored in Memory Register flip-flop FMR0 for that particular half column.

Referring to FIG. 123, a schematic illustration of the decoding circuit for the development of the decode signal XCP21 is shown. The development of the decode signals XCP21 is similar to that of the signal XCP11 discussed previously in connection with FIG. 122. AND-gates 1205 are provided for receiving various combinations of signals from the Memory Register flip-flops FMR1–4. These various combinations, if present, result in signals being generated by the AND-gates 1205 and passed through the OR-gate 1206 and an emitter follower 1207 to represent the column parity decode signal XCP21. As stated previously in connection with the signal XCP11, the decode signal XCP21 will be compared with the parity bit for the corresponding half column to determine the presence or absence of a parity error.

Figure 124:
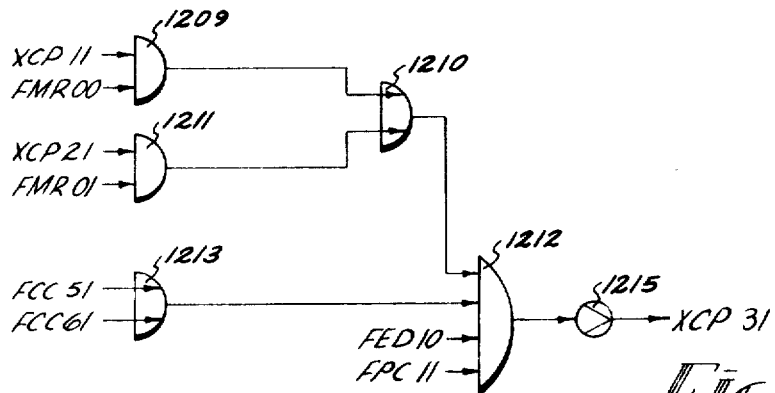

Referring to FIG. 124, a schematic illustration of the decoding circuit for the development of the decode signal XCP31 is shown. Column parity decoding signals XCP11 and XCP21 were discussed in connection with FIGS. 122 and 123. In that discussion it was pointed out that these signals were developed by the appropriate combination of signals from Memory Register flip-flops FMR1–4, and these signals were to be presented in another circuit for the comparison of the signal with the parity bits stored in the Memory Register flip-flop FMR0. Accordingly, the decoding circuit for the development of the decode signal XCP31 is the circuit in which this comparison is made. AND-gate 1209 is provided for receiving column parity decode signal XCP11 and signals from the Memory Register flip-flop FMR00. A second AND-gate 1211 is provided for receiving column parity decode signals XCP21 and the Memory Register flip-flop signal FMR01. The outputs of AND-gates 1209 and 1211 are disjunctively combined in an OR-gate 1210. Thus, it may be seen that when the column parity decode signal XCP11 is true (an odd number of bits exists in Memory Register flip-flops FMR1–4) the Memory Register flip-flop FMR0 must be in the set state or the signal FMR00 will be true and cause the AND-gate 1209 to present a signal to the OR-gate 1210. Similarly, when the decode signal XCP21 is true (when the bits in Memory Register flip-flops FMR1–4 total an even number) the Memory Register flip-flop FMR0 must be true or a signal FMR01 will be presented to AND-gate 1211 to cause that AND-gate to present a signal to the OR-gate 1210. The OR-gate 1210 is connected to an AND-gate 1212 which receives signals from the End of Data Character flip-flop FED10, the Program Counter flip-flop FPC11, and also receives signals from an OR-gate 1213. Or-gate 1213 receives signals from Control Counter flip-flops FCC51 and FCC61. The output of the AND-gate 1212 is amplified by an emitter follower 1215 and is presented as the column parity decode signal XCP31.

Therefore, when an odd number of bits exists in Memory Register flip-flops FMR1–4, the parity bit register FMR0 must be in the true state to prevent a parity error signal from being generated in AND-gate 1209, passed through the OR-gate 1210 and applied to the AND-gate 1212. Similarly, when the Memory Register flip-flops FMR1–4 contain an even number of bits, the Memory Register flip-flop FRM0, containing a parity bit, must be in the false or reset state to prevent a parity error signal from being generated in AND-gate 1211 and passing through OR-gate 1210 to the AND-gate 1212.

The AND-gate 1212 will pass the parity error signal, if any, to the remainder of the Printer Control System as the column parity decode signal XCP31, provided, however, that the proper program count (FPC11) is received, that the proper control count is received (FCC51 and FCC61), and provided further that the parity check was not made during an end of data character (FED10).

Figure 125:
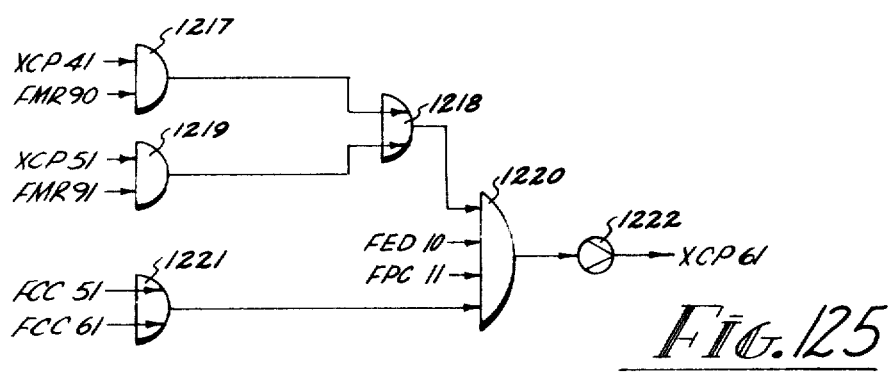

Referring to FIG. 125, a schematic illustration of the decoding circuit for the development of decode signal XCP61 is shown. The column parity decode signal XCP61 indicates a column parity error occurring in the half column stored in the Memory Register flip-flops FMR5–8. Column parity errors developed in these memory registers result in the development of column parity decode signals XCP41 and XCP51. Accordingly, these two column parity decode signals are compared with the parity bits stored in the Parity Bit flip-flop of the Memory Register (FMR9) for that half column of the eight bit data character. AND-gate 1217 is provided for receiving the column parity decode signal XCP41, and the Memory Register flip-flop FMR90 reset signal. The output of the AND-gate 1217 is applied to an OR-gate 1218. OR-gate 1218 also receives signals from an AND-gate 1219 which receives the column parity decode signal XCP51 and the Memory Register flip-flop set output signal FMR91. Thus, in a manner similar to that discussed in connection with FIG. 124, the parity bit stored in the Memory Register FMR9 is compared to an odd parity (XCD41) or even parity XCD51) decode signal derived through the odd and even combination of output signals from the Memory Register flip-flops FMR5–8.

The output of the OR-gate 1218 is applied to an AND-gate 1220. AND-gate 1220 also receives signals from the End of Data Character flip-flop FED10, the Program Counter flip-flop FPC11, and the OR-gate 1221. OR-gate 1221 receives signals from the Control Counter flip-flops FCC51 and FCC61. The output of the OR-gate 1220 is amplified by an emitter follower 1222 and is represented as the column parity decode signal XCP61 which becomes true whenever a column parity error is detected in the half column of the data character contained in the Memory Register flip-flops FMR5–8. Similarly, as discussed previously in connection with FIG. 124, the parity error signal XCP61 may only occur when the proper program count is received (FPC11), the proper control counter signal is received (FCC51 and 61) and when the parity error did not occur in an end of data character (FED10).

Figure 126:
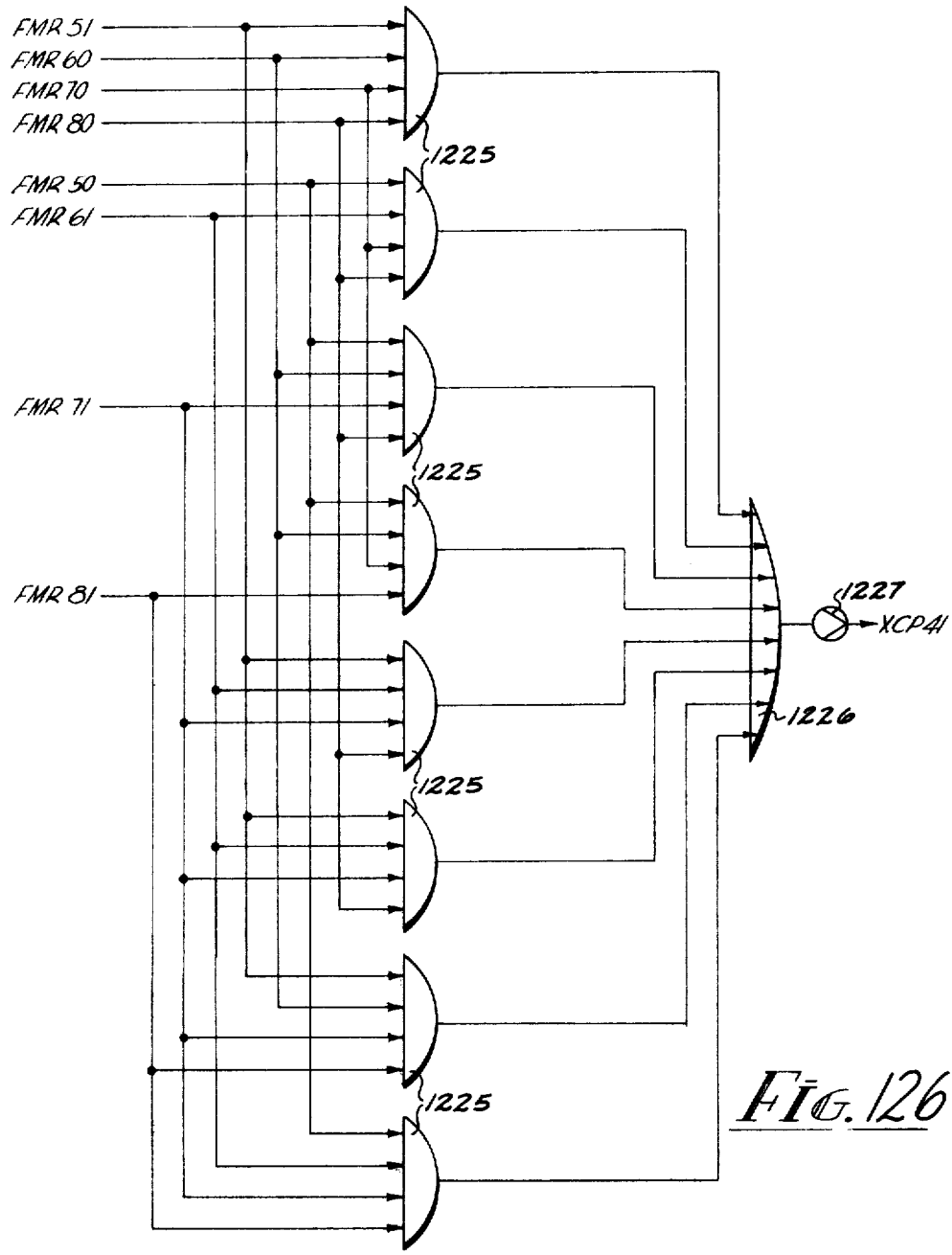

Referring to FIG. 126, a schematic illustration of the decoding circuit for the development of the decode signal XCP41 is shown. The decoding signal XCD41 is developed through the utilization of a plurality of AND-gates 1225, each for receiving a designated combination of signals from Memory Register flip-flops FMR5–8. The outputs of the AND-gates 1225 are applied through an OR-gate 1226 and an emitter follower 1227 to represent the column parity signal XCP41. This decode signal XCP41 is subsequently compared to the parity bit for the corresponding half column data character to determine the presence or absence of a parity error.

Figure 127:
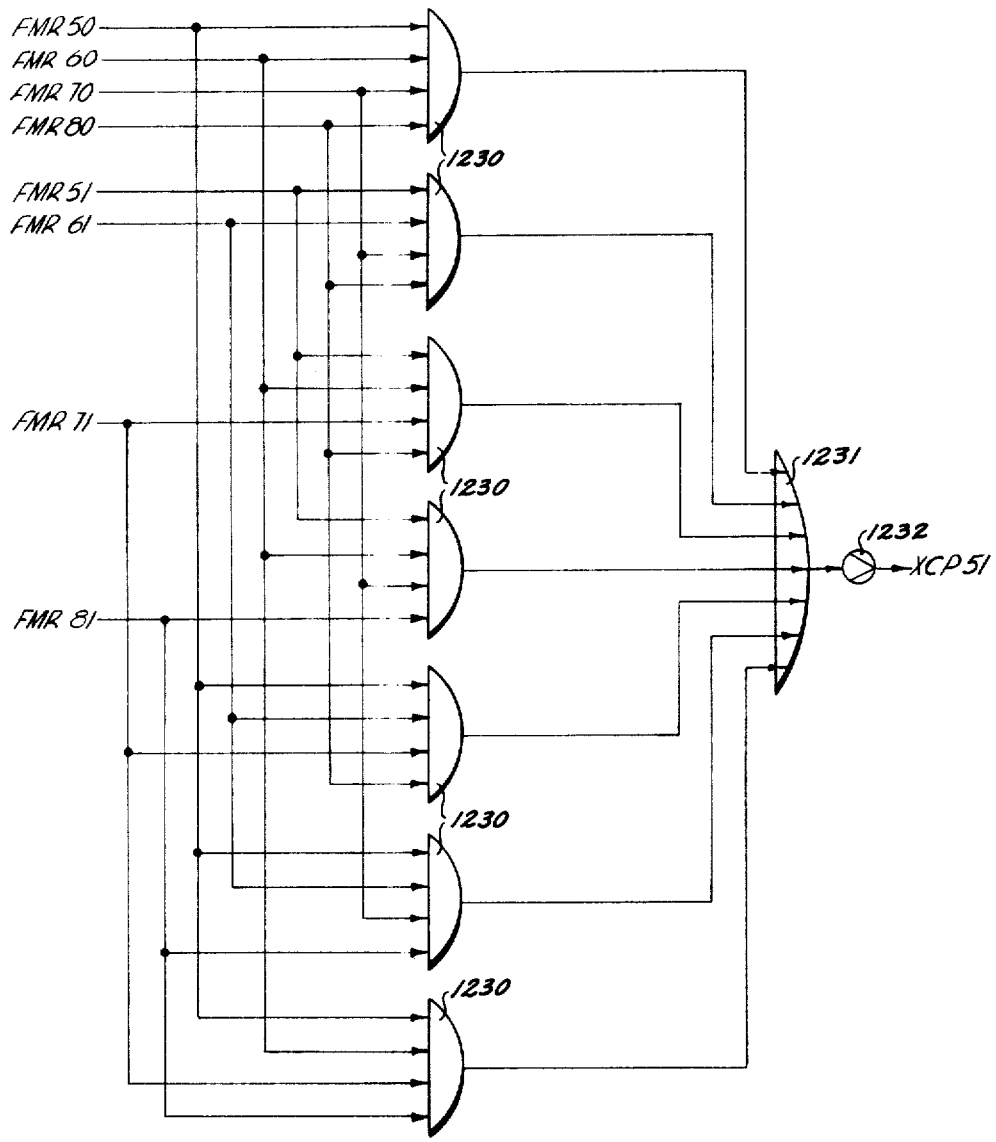

Referring to FIG. 127, a schematic illustration of the decoding circuit for the development of the decode signal XCP51 is shown. The column parity decoding signal XCP51 is developed through the utilization of a plurality of AND-gates 1230 each adapted to receive a predetermined combination of signals from Memory Register flip-flops FMR5–8. The combined signals applied to each AND-gate 1230, if resulting in an even number of bits, yields a signal which is applied to an OR-gate 1231, and is subsequently amplified in an emitter follower 1232 to represent the column parity decode signal XCP51. This decode signal, similar the decode signal XCP41, is subsequently compared to the parity bit for the corresponding half column data character stored in Memory Register FMR9. The comparison of column parity decode signals XCP41 and XCP51 with their corresponding parity bit stored in the Memory Register FMR9 is shown and discussed in connection with FIG. 125.

Referring to FIGS. 128, 129, 130, and 131, schematic illustrations of the Row Parity flip-flops FRP1, FRP2, FRP3, and FRP4 are respectively shown. The Row Parity flip-flops receive signals from the magnet read heads positioned to read the four row parity bits in each control column of each word. The signals from the read heads appropriately combine with other signals for a logical determination of parity, are presented to the Row Parity flip-flops in the form of Bus Functions. Accordingly, the Row Parity flip-flops FRP1–4 are set or reset in accordance with the presence or absence of bits in the row parity bit positions of the control column of each data word.

Figure 128:
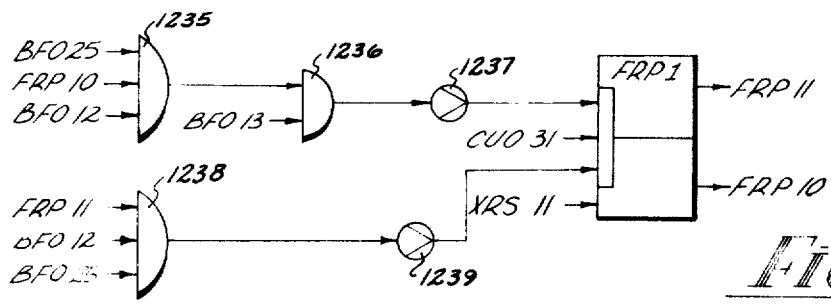
FIGS. 128–131 are schematic illustrations of the Row Parity flip-flops FRP1–4.

Referring to FIG. 128, an AND-gate 1235 is provided for receiving Bus Function signals BF012 and BF025, and for receiving signals from the reset output terminal signal FRP10 from the flip-flop FRP1. The output of the AND-gate 1235 is applied to an AND-gate 1236 where the output signal is conjunctively combined with the Bus Function signal BF013. The output of AND-gate 1236 is amplified in an emitter follower 1237 and applied to the set input terminal of the Row Parity flip-flop FRP1.

An AND-gate 1238 is provided for receiving Bus Function signals BF012 and BF 025, and for receiving the set output signal FRP11 from the flip-flop FRP1. The output of the AND-gate 1238 is appropriately amplified by an emitter follower 1239 and applied to the reset input terminal of the Row Parity flip-flop FRP1. The flip-flop FRP1 receives clock signals from the ungated clock driver CU031, and also receives reset signals from the reset decode circuit XRS11 applied to the register transfer reset input terminal thereof.

Figure 129:
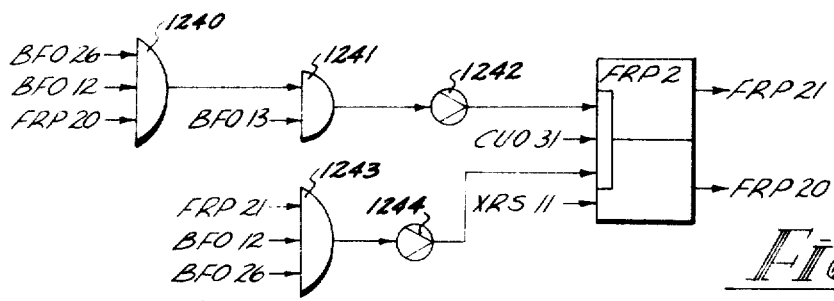

Referring to FIG. 129, an AND-gate 1240 is provided for receiving Bus Function signals BF012 and BF026, and for receiving the reset output signal FRP20 of the flip-flop FRP2. The output of the AND-gate 1240 is conjunctively combined with the Bus Function signals BF013 and an AND-gate 1241. The output of the AND-gate 1241 is amplified by an emitter follower 1242 and applied to the set input terminal of the flip-flop FRP2. An AND-gate 1243 is provided for receiving Bus Function signals BF012 and BF026, and also receives signals from the set output FRP31 of the flip-flop FRP2. The output of the AND-gate 1243 is amplified in an emitter follower 1244 and applied to the reset input terminal of the row parity flip-flop FRP2. The flip-flop FRP2 receives clock signals from the ungated clock driver CU031, and also receives resetting signals from the reset decode circuit XRS11 applied to the reset register transfer input terminal thereof.

Figure 130:
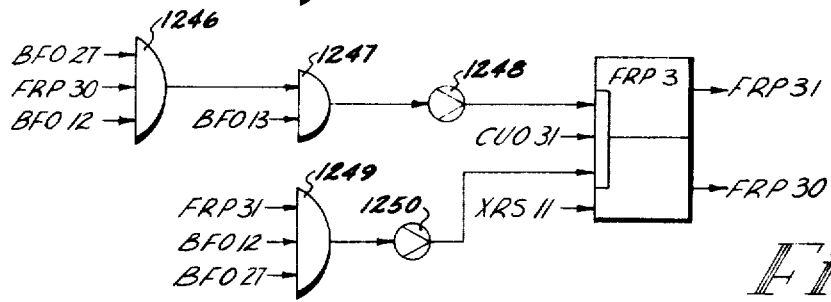

Referring to FIG. 130, an AND-gate 1246 is provided for receiving Bus Function signals BF012 and BF027, and for receiving the reset output signal FRP30 from the Row Parity flip-flop FRP3. The output of the AND-gate 1246 is conjunctively combined with the Bus Function BF013 and an AND-gate 1247. The output of the AND-gate 1247 is appropriately amplified in an emitter follower 1248 and applied to the set input terminal of the Row Parity flip-flop FRP3. An AND-gate 1249 is provided for receiving Bus Function signals BF012 and BF027, and for receiving the set output signal FRP31 of the flip-flop FRP3. The output of the AND-gate 1249 is amplified by an emitter follower 1250 and applied to the reset input terminal of the flip-flop FRP3. The Row Parity flip-flop FRP3 also receives clock signals from the ungated clock driver CU031 and receives resetting signals from the reset decode circuit XRS11 applied to the reset register transfer input terminal thereof.

Figure 131:
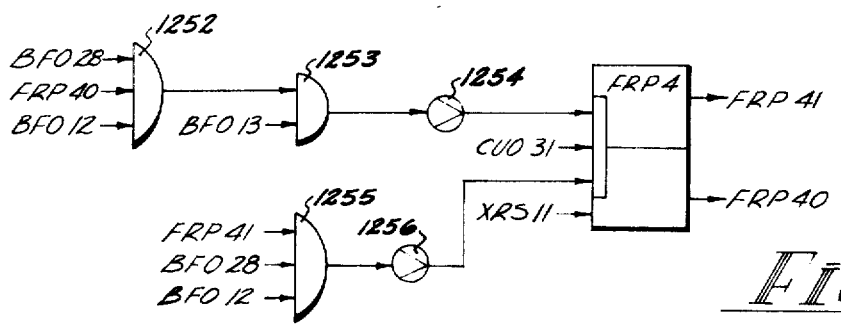

Referring to FIG. 131, an AND-gate 1252 is provided for receiving Bus Function signals BF012 and BF028, and for receiving reset output signals FRP40 from the Row Parity flip-flop FRP4. The output of the AND-gate 1252 is conjunctively combined with the Bus Function signal BF013 in an AND-gate 1253. The output of the AND-gate 1253 is amplified by an emitter follower 1254 and applied to the set input terminal of the Row Parity flip-flop FRP4. An AND-gate 1255 is provided for receiving Bus Function signals BF012 and BF028, and for receiving the set output signal FRP41 of the Row Parity flip-flop FRP4. The output of the AND-gate 1255 is amplified by an emitter follower 1256 and applied to the reset input terminal of the Row Parity flip-flop FRP4. The flip-flop FRP4 receives clock signals from the ungated clock driver CU031 and also receives resetting signals from the reset decode circuit XRS11 applied to the reset register transfer input terminal thereof.

Figure 132:
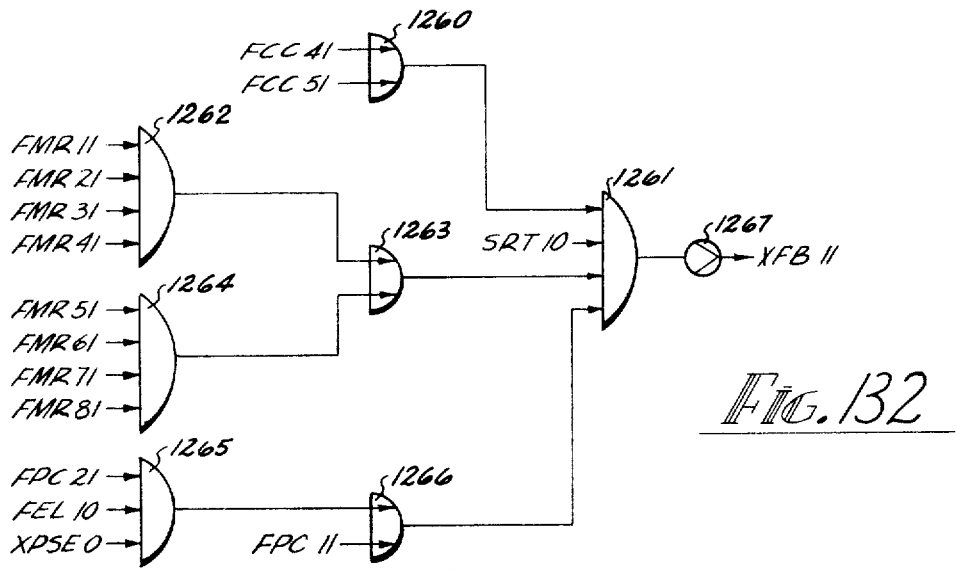
FIG. 132 is a schematic illustration of the decoding circuit for the development of the Forbidden Character Code detect signal XFB1.

Referring to FIG. 132, a schematic illustration of the decoding circuit for the development of decode signal XFB11 and associated logical circuitry are shown. The decode signal XFB11, and the decoding circuit for the development of that signal, provide a means for detecting the presence of four "1" bits in either half column of an eight bit character column. The presence of four 1's is, in the embodiment chosen for illustration, designated a forbidden character code. Therefore, the forbidden character detect circuit XFB1, for developing the forbidden character detect decode signal XFB11, is utilized to detect this forbidden character and present the appropriate signal to the error indicating circuits. The circuit for the development of the decoding signal XFB11 is disabled when an end of line code is sensed so that end of data characters may be detected without tripping the error circuits.

An OR-gate 1260 is provided for receiving Control Counter flip-flop signals FCC41 and FCC51. The output of the OR-gate 1260 is applied to an AND-gate 1261. An AND-gate 1262 is provided for receiving Memory Register flip-flop signals FMR11, FMR21, FMR31, and FMR41. The output of the AND-gate 1262 is applied to an OR-gate 1263. An AND-gate 1264 is provided for receiving Memory Register flip-flop signals FMR51, FMR61, FMR71, and FMR81. The output of the AND-gate 1264 is also applied to the OR-gate 1263. OR-gate 1263, in combination with AND-gates 1262 and 1264, therefore provides the necessary logical determination of the presence of four "1" bits in either half column of a data character. That is, Memory Register flip-flops FMR1–4 detect the first four characters of the eight bit character, and the Memory Register flip-flops FMR5–8 detect the remaining four bits of any bit data character. In the event that either of the four bit groups are all 1's, AND-gate 1262, or AND-gate 1264, will provide a true signal to the OR-gate 1263, which, in turn, presents this signal to the AND-gate 1261.

An AND-gate 1265 is provided for receiving Program Counter flip-flop signals FPC21, end of line signals from the End of Line flip-flop FEL10 (this input to the decode circuit is provided to disable the circuit and prevent the generation of a decoding signal XFB11 when an end of line code is detected). AND-gate 1265 also receives signals from the print numeric sign enable gate decode circuit XESE0. The output of the AND-gate 1265 is applied to an OR-gate 1266 which also receives signals from the Program Counter flip-flop FPC11. The output of the OR-gate 1266 is applied to the AND-gate 1261. AND-gate 1261 therefore provides the logical conjunctive of the signals provided to it from the OR-gate 1260, the OR-gate 1263, and the OR-gate 1266, as well as the mode selection switch signal SRT10. The output of the AND-gate 1261 is amplified through an emitter follower 1267, and is utilized as the forbidden character code detect decode signal XFB11. It may be noted here that a Special Code 0000 1111, described previously in connection with Control Command Codes, would normally result in the decode signal XFB11. However, since the decode is disabled when an end of line code is detected, and since the Special Code should properly occur only after an end of line code, the Special Code may properly be detected without the generation of decode signal XFB11.

Figure 133:
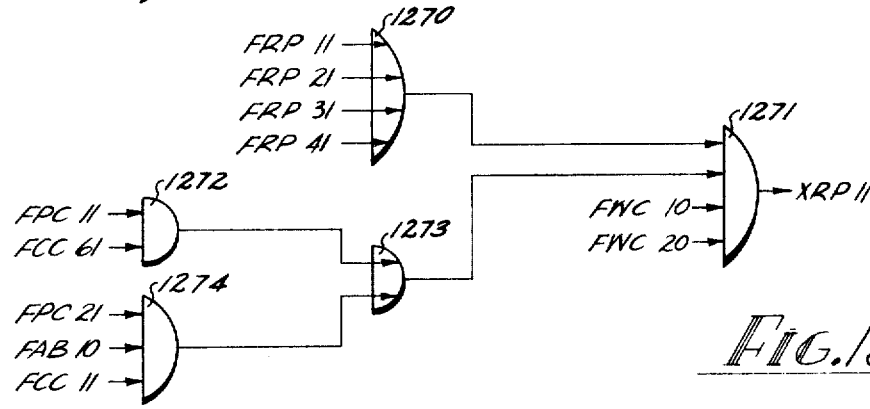
FIG. 133 is a schematic illustration of the decoding circuit for the development of the Row Parity detect signal XRP11.

Referring to FIG. 133, a schematic illustration of the decoding circuit for the development of the row parity decode signal XRP11 is shown. The row parity decode signal XRP11 is the result of the combination of the row parity signals derived from Row Parity flip-flops FRP1–4. As indicated previously in connection with the Row Parity flip-flops FRP1–4 in FIGS. 128–131, the Row Parity flip-flops detect the presence of bits in the row parity bit positions of the control column of each data word. The Row Parity flip-flop signals are now combined to yield a row parity error signal when a row parity error exists. An AND-gate 1270 is provided for receiving signals from the set output terminals of Row Parity flip-flops FRP1–4. The output of the OR-gate 1270 is applied to an AND-gate 1271. An AND-gate 1272 is provided for receiving Program Counter flip-flop output signal FPC11, and the Control Counter flip-flop signal FCC61. The output of the AND-gate 1272 is applied to an OR-gate 1273 which also receives signals from another AND-gate 1274. AND-gate 1274 receives signals from the Program Counter flip-flop FPC11, and the Numeric Word A–B Select flip-flop FAB10. Output of OR-gate 1273 is applied to the AND-gate 1271. AND-gate 1271 therefore receives signals from OR-gates 1270 and 1273, and also receives signals from Word Character Counter flip-flops FWC10 and FWC20. The signals from the Word Character Counter flip-flops are utilized to detect the appropriate column for the parity check; that is, the bits in the control column of the data word representing the row parity bits must be detected first by the detection of the appropriate column of each word. Therefore, the word character counter will indicate when a control column is being read, thereby indicating that row parity bits may be expected. The output of the AND-gate 1271 represents the row parity decode circuit signal XRP11, which signal is true when a row parity error exists.

Figure 134:
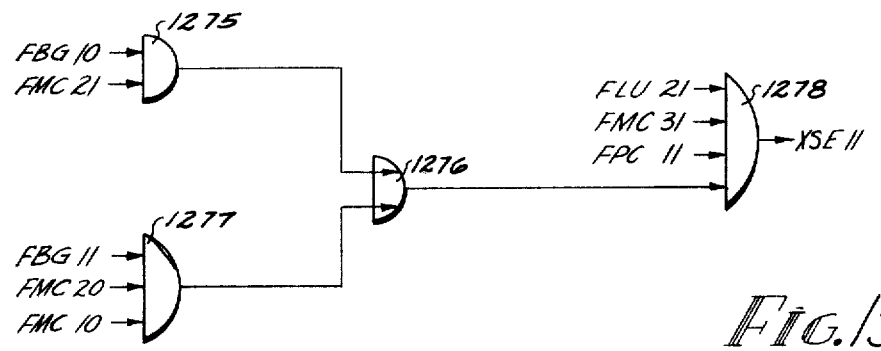
FIG. 134 is a schematic illustration of the decoding circuit for the development of the Beta - Gamma Sequence Error detect signal XSE11.

Referring to FIG. 134, a schematic illustration of the decoding circuit for the development of the decoding signal XSE11 is shown. The decoding signal XSE11 is utilized to indicate the presence of a sequence error in the Beta-Gamma sequence markers present on the magnetic tape. The Beta-Gamma Sequence flip-flop FBG1, discussed previously in connection with FIG. 105, provides signals when a Beta or a Gamma marker is detected on the magnetic tape. The Beta-Gamma sequence error decode circuit XSE1, shown in FIG. 134, detects the presence of two successive Beta markers or two successive Gamma markers. This error in Beta-Gamma sequence results in the decoding signal XSE11 which may be utilized to trip error circuitry. An AND-gate 1275 is provided for receiving signals from the Beta-Gamma Tracking flip-flop FBG10, and the Marker Track Counter flip-flop FMC21. The output of the AND-gate 1275 is applied to an OR-gate 1276. An AND-gate 1277 is provided for receiving signals from the Beta-Gamma tracking flip-flop FBG11, and the Marker Track Counter flip-flops FMC20 and FMC10. The output of the AND-gate 1277 is also applied to the OR-gate 1276. The output of OR-gate 1276 is applied to an AND-gate 1277 which also receives signals from the Program Counter flip-flop FPC11, the Marker Track Counter flip-flop FMC31, and the Marker Track Lockup flip-flop FLU21. The output of the AND-gate 1278 represents the Beta-Gamma sequence error decode circuit signal XSE11.

Referring to FIG. 135, a schematic illustration of the decoding circuit for the development of decode signal XNP10 is shown. The non-print character detect decode signal XNP10 is utilized to detect command characters in the least significant character position of alphanumeric words. Since these control characters are being utilized to direct and control the operation of portions of the Printer Control System, it is undesirable to have these characters loaded into the typeline buffer from the block buffer. Thus, a decoding circuit is necessary to determine when a command character exists in the least significant character position of an alphanumeric word, to block out that particular character and prevent it from being loaded into the typeline buffer and subsequently printed. An OR-gate 1280 is provided for receiving Memory Register flip-flop signals FMR81 and FMR71. The output of OR-gate 1280 is applied to an AND-gate 1281. AND-gate 1281 also receives signals from the Numeric Word flip-flop FNW10, the Word Character Counter flip-flops FWC11 and FWC21, the mode selection switch SRT10, and the Program Counter flip-flop FPC21. The output of the AND-gate 1281 represents the non-print character detect decode circuit signal XNP11. The signal XNP11 when true, indicates that a command character has been detected in the least significant character position of an alphanumeric word. An inverter 1282 is also connected to the output of AND-gate 1281 to provide a true signal when no command character has been detected in the least significant character position of an alphanumeric word. This "no control character detected" signal is represented by the nonprint character detect decode signal XNP10.

Referring to FIG. 136, a schematic illustration of the decoding circuit for the development of decode signal XSC11 is shown. The decode circuit signal XSC11 is true when a stop code character is detected in the least significant character position of an alphanumeric word during the Fill cycle. The stop core detect decode signal XSC11 is the result of the logical conjunction in an AND-gate 1285 of the following signals: Memory Register flip-flop signals FMR80, FMR71, FMR60, FMR51, FMR41, FMR31, FMR21, and FMR10, Word Character Counter flip-flop signals FWC10 and FWC21, and mode selection switch signal SRT10.

Referring to FIG. 137, a schematic illustration of the Stop Code Detect flip-flop FSC1 is shown. The Stop Code Detect flip-flop FSC1 is utilized as a memory, which may be tripped to its set state upon receipt of appropriate signals when a stop code character is detected in the least significant character position of an alphanumeric word. The set output signal of this flip-flop will cause the printer mechanism to stop when an end of file signal is detected, and all data has been printed. The Stop Code Detect flip-flop FSC1, when set, signifies that all the data pertaining to a selected file code has been printed.

An AND-gate 1286 is provided for receiving signals from the In File Detect flip-flop FIF11, the Numeric Word flip-flop FNW10, the stop code detect circuit XSC11, the Control Counter flip-flop FCC41, the Program Counter FPC10, and the mode selection switch SRT10. The output of the AND-gate 1286 is applied to the set input of the Stop Code Detect flip-flop FSC1. Flip-flop FSC1 also receives clock signals from the ungated clock driver CU081, and receives resetting signals from the reset decode circuit XRS11 applied to the reset register transfer input terminal thereof. It may be noted that the Stop Code Detect flip-flop FSC1 may be reset only upon receipt of a resetting register transfer signal from the reset decode circuit XRS11.

Referring to FIG. 138, a schematic illustration of the Backspace Lockup flip-flop FBLU is shown. The Backspace Lockup flip-flop FBLU is provided for receiving signals indicating that an error has occurred in the receipt of information from magnetic tape, and that the magnetic tape is to be backspaced and re-read. When the magnetic tape is backspaced and re-read, and the error still occurs, the tape is then backspaced again for a distance in excess of one block of information. If the information being received from the tape transport is received during an "in file" sequence, and the tape is backed more than one block of information, the sequence of "in file," "out of file," "in file," "out of file," etc. as detected by the File Code Sequence flip-flop FFCS described in connection with FIG. 114, will be upset, and a file code sequence error will be indicated. To prevent an error from being indicated when more than one block passes the read heads during a backspacing operation, the Backspace Lockup flip-flop FBLU is provided. The "out of file" status of the system is preserved, and the file code sequence decode circuit XFCS1 (FIG. 112) is locked out to prevent a false indication of error.

An AND-gate 1288 is provided for receiving signals from the Marker Track Counter flip-flops FMC31 and FMC21, the Marker Track Lockup flip-flop FLU21, the input selection switch SIN10, and the backspace tape switch SBT11. The output of the AND-gate 1288 is applied to an AND-gate 1289. An AND-gate 1290 is provided for receiving signals from the reset decode circuit XRS11, and the cable signal JBT11. The output of the AND-gate 1290 is applied to the AND-gate 1289. AND-gate 1289 therefore receives signals from AND-gates 1288, 1290 and also receives signals from the run tape non-print switch SNP11, the input selection switch SIN11, and the mode selection switch SRT11. The output of the AND-gate 1289 is amplified in an emitter follower 1291 and applied to the set input terminal of the Backspace Lockup flip-flop FBLU.

An AND-gate 1292 is provided for receiving signals from the Program Counter flip-flop FPC11, the Tape Forward flip-flop FTF11, and the file code N detect XFC11. The output of the AND-gate 1292 is applied to an AND-gate 1293 where it is conjunctively combined with the cable signal JBT11. The output of the AND-gate 1293 is applied to the reset input terminal of Backspace Lockup flip-flop FBLU. The flip-flop FBLU receives clock signals from the ungated clock driver CU101.

Referring to FIG. 139, a schematic illustration of the Tape Reverse flip-flop FTR1 and the associated logical circuitry are shown. The manipulation of the backspace tape switch on the operator's panel will cause the magnetic tape to backspace one block. The Tape Reverse flip-flop FTR1 is set on receipt of a signal from the tape reverse switch, and will be reset when an Alpha marker is detected in the marker channel of the magnetic tape. An AND-gate 1295 is provided for receiving signals from the tape reverse switch SRT11, the input selection switch SIN10, the tape forward switch FTF10, and for receiving the cable signal JBT10. The output of the AND-gate 1295 is applied to the set input terminal of the Tape Reverse flip-flop FTR1. An AND-gate 1296 is provided for receiving the cable signal JBT11 (AND-gate 1296 is acting in a dummy capacity as described previously), and for applying its output signal to an OR-gate 1297. OR-gate 1297 provides the logical disjunctive of the cable signal JBT11 and the Bus Function BF032. The output of the OR-gate 1297 is applied to the reset input input terminal of the Tape Reverse flip-flop FTR1.

Tape Reverse flip-flop FTR1 receives clock signals from the ungated clock driver CU071, and receives resetting signals from the reset decode circuit XRS11 applied to the reset input register transfer terminal thereof. Therefore, the Tape Reverse flip-flop FTR1 will present a set output signal FTR11 when the Tape Reverse switch SRT is depressed, and will return to the reset state and provide a reset output signal FRT10 when either the register transfer reset signal is received from the reset decode circuit XRS11, or when an Alpha marker is detected on the magnetic tape.

*Transfer cycle components*

Those components to be described now are those which may be described in terms of their relationship to the Transfer cycle of the Multiple Font High Speed Printer Control System. These components, while functioning in cycles other than Transfer, are usually primarily concerned with the Printer Control System during the Transfer cycle.

Referring to FIG. 140, a schematic illustration of the Numeric Word flip-flop and the associated logical circuitry are shown. Numeric words, which are received by the Printer Control System in eight bit columns (the same as alphanumeric data), actually comprise two four bit words. The eight bit column is divided into an A half column and a B half column and processed as two successive numeric characters. Thus, during the Transfer cycle, the Numeric Word A–B flip-flop is utilized to separate the eight bit column into two four bit half columns each half column containing a four bit numeric character. An OR-gate 1300 is provided for receiving signals from the Word Character Counter flip-flops FWC11 and FWC21. The output of the OR-gate 1300 is applied to and AND-gate 1301. AND-gate 1301 also receives signals from the Numeric Word flip-flop FNW11, the Control Counter flip-flop FCC41, the Program Counter FPC21, and the reset output signal from the Numeric Word A–B flip-flop FAB10. The output of the AND-gate 1301 is applied to the set input terminal of the Numeric Word A–B flip-flop FAB1. An AND-gate 1302, acting as a dummy AND-gate, receives signals from the Control Counter flip-flop FCC41, and applies this signal to an OR-gate 1303 to be disjunctively combined with a signal from the Numeric Word flip-flop FNW10. The output of the OR-gate is conjunctively combined with signals from the Program Counter flip-flop FPC21 and the set output signal of the Numeric Word A–B flip-flop FAB11 in an AND-gate 1304. The signal provided by the AND-gate 1304 is applied to the reset input terminal of the Numeric Word A–B flip-flop FAB1.

Numeric Word A–B flip-flop FAB1 receives clock signals from the ungated clock driver CU061, and receives reset signals from the reset decode circuit XRS11 applied to the reset register transfer input terminal thereof.

Referring to FIG. 141, a schematic illustration of the block buffer load-unload inhibit one-shot MD11 is shown. The block buffer load-unload inhibit one-shot MD11 is provided for causing a delay between the load and unload operations of the block buffer. During the time that the one-shot MD11 is in its unstable state, operation of the block buffer in inhibited. A dummy AND-gate 1310 receives a constant 6 volt (true) signal from a voltage source and applies this signal to an OR-gate 1311. This constant signal, of itself, is insufficient to cause OR-gate 1311 to apply a triggering signal to the one-shot MD11. However, a terminal 1312 is provided for receiving a buffer empty signal ABE11, to be applied through a coupling capacitor 1313 to terminal 1314. The signal ABE11 superimposed on the constant 6 volt signal applied through the dummy AND-gate 1310 is sufficient to cause the OR-gate 1311 to apply a triggering signal to the one-shot MD11. Similarly, AND-gate 1315 is provided for receiving a constant 6 volt signal, and a terminal 1316 receives buffer full signals ABF11 to be applied through coupling capacitor 1317 to terminal 1318.

A dummy AND-gate 1320 also receives a constant 6 volt signal, and terminal 1321 receives a gated clock signal CG081 which is applied through coupling capacitor 1322 to terminal 1323. Dummy AND-gate 1325 receives a constant 6 volt signal which, when combined with a gated clock signal CG091 applied to terminal 1326 through a coupling capacitor 1327 to the terminal 1328, provides sufficient voltage to cause the OR-gate 1311 to apply a triggering signal to the block buffer load-unload inhibit one-shot MD11. One-shot MD11 receives an ungated clock signal from the ungated clock driver CU121; further, the one-shot MD11 has an unstable period, or timing period, of 110 microseconds.

Referring to FIG. 142, a schematic illustration of the typeline buffer load-unload inhibit one-shot MD20 is shown. The typeline buffer load-unload inhibit one-shot MD20 provides the same type of inhibiting operation for the typeline buffer as the block buffer load-unload inhibit one-shot MD11 does for the block buffer. During the time that the one-shot MD20 is in its unstable state, the further operation of the typeline buffer is inhibited.

An AND-gate 1340 is provided for receiving a one-shot signal MD200 which, as seen from the code designation thereof, represents a signal from the one-shot MD20 when the latter is in its stable state. This signal, MD200, may be derived by inverting the output signal of the one-shot MD20. The AND-gate 1340 also receives a signal from the Print Enable flip-flop FPE10, and from the power turn on buffer clear signal relay KPB11. The output of the AND-gate 1340 is supplied through a dummy AND-gate 1341 to an OR-gate 1342. The signal provided from the AND-gate 1340 is insufficient to cause the OR-gate 1342 to apply a triggering signal to the one-shot MD20. Therefore, a terminal 1345 is provided for receiving a gated clock signal CG121 to be applied through a coupling capacitor 1346 to junction 1347. The combination of the clock signal CD121 superimposed on the signal provided by the AND-gate 1340 is sufficient to cause the OR-gate 1342 to apply a triggering signal to the one-shot MD20. An AND-gate 1350 receives a constant 6 volt signal which, when combined with a gated clock signal CG101 applied to terminal 1351 through coupling capacitor 1352 to junction 1353, is sufficient to cause the OR-gate 1342 to apply a triggering signal to the one-shot MD20. Similarly, AND-gate 1355 is provided for receiving a constant 6 volt signal, and terminal 1356 is provided for receiving gated clock signals CG111 to be applied through coupling capacitor 1357 to the junction 1358. Typeline buffer load-unload inhibit one-shot MD20 receives ungated clock signals from the ungated clock driver CU121.

Figure 143:
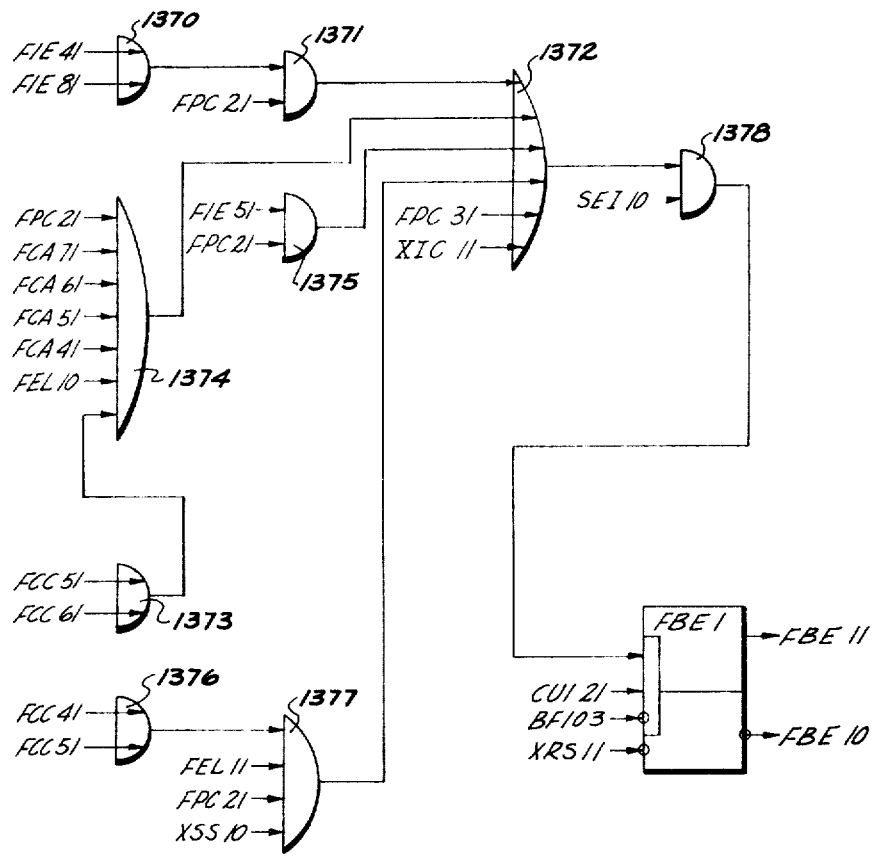
FIG. 143 is a schematic illustration of the Buffer Error flip-flop FBE1 and the associated logical circuitry.

Referring to FIG. 143, a schematic illustration of the Buffer Error flip-flop FBE1 is shown. The Buffer Error flip-flop FBE1 is provided for generating buffer error signals when errors are detected in the Transfer, Print or Slew cycles. An OR-gate 1370 is provided for receiving signals from Input Error flip-flop FIE41 and FIE81. The output of the OR-gate 1370 is conjunctively combined in an AND-gate 1371 with signals from the Program Counter flip-flop FPC21. The output of the AND-gate 1371 is applied to an OR-gate 1372.

An OR-gate 1373 receives signals from the Control Counter flip-flops FCC51 and FCC61. The output of the OR-gate 1372 is conjunctively combined in an AND-gate 1374 with signals from the Program Counter flip-flop FPC21, the Column Address Counter flip-flops FCA71, FCA61, FCA51, and FCA41, and from the End of Line flip-flop FEL10. The output of the AND-gate 1374 is also applied to the OR-gate 1372.

An AND-gate 1375 is provided for receiving signals from the Input Error flip-flop NIE51, and the Program Counter flip-flop FPC21. The logical conjunction of these signals provided by the AND-gate 1375 yields a signal which is applied to the OR-gate 1372. An OR-gate 1376 is provided for receiving signals from Control Counter flip-flops FCC41 and FCC51. The output signal of the OR-gate 1376 is conjunctively combined in an AND-gate 1377 with signals from the End of Line flip-flop FEL11, the Program Counter flip-flop FPC21, and the slew character in store detect decode circuit XSS10. The output of the AND-gate 1377 is also applied to the OR-gate 1372. OR-gate 1372 therefore receives signals from AND-gates 1371, 1374, 1375, 1377, and signals from the Program Counter flip-flop FPC31 and the program counter error decode circuit XIC11. An AND-gate 1378 is provided for receiving signals from the OR-gate 1372 and conjunctively combining these signals with signals from the error ignor switch SEI10. The output of the AND-gate 1378 is applied to the set input terminal of the Buffer Error flip-flop FBE1. The Buffer Error flip-flop receives clock signals from the ungated clock driver CU121, and also receives as resetting signals the Bus Function BF103. Flip-Flop FBE1 also receives resetting signals from the reset decode circuit XRS11 applied to the reset register transfer input terminal thereof. The Buffer Error flip-flop FBE1 therefore provides a set output signal FBE11 when a buffer error occurs, and provides a reset output signal FBE10 at all other times.

Figure 144:
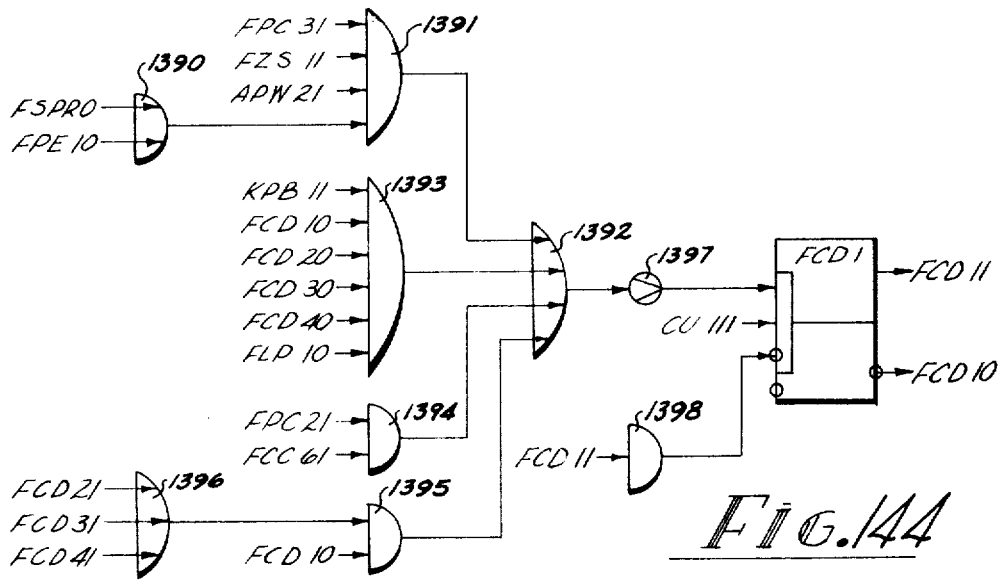
FIGS. 144–147 are schematic illustrations of the Fast Clock Counter flip-flops FCD1–4 and the associated logical circuitry.
Figure 145:
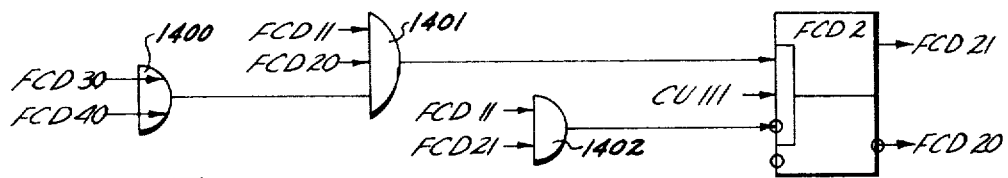

The fast countdown scaler comprises four flip-flops FCD1, FCD2, FCD3, and FCD4. This fast countdown scaler is utilized to control the timing and sequence of events pertaining to the typeline buffer. Since information may be supplied to the typeline buffer faster than the typeline buffer can accept the information for storage therein, the fast countdown scaler is triggered to proceed through a designated number of counts to provide the necessary delay in the application of information to the typeline buffer. Referring to FIG. 144, the Fast Countdown Scaler flip-flop FCD1 is schematically illustrated. An OR-gate 1390 is provided for receiving signals from the Program Error flip-flop FPE10, and from the Stop Processing flip-flop FSPR0. The output of the OR-gate 1390 is conjunctively combined in an AND-gate 1391 with signals from the Program Counter flip-flop FPC31, the Zero Suppress flip-flop FZS11, and the signals from the typewheel marker pulse amplifier APW21. The output of the AND-gate 1391 is applied to an OR-gate 1392. OR-gate 1392 also receives input signals from three other AND-gates 1393, 1394 and 1395. AND-gate 1393 receives signals from the power turn on buffer clear signal relay KPB11, the Fast Countdown Scaler flip-flop signals FCD10, FCD20, FCD30, and FCD40, and the Line Printed flip-flop FLP10.

The AND-gate 1394 receives signals from the Program Counter flip-flop FPC21 and the Control Counter flip-flop FCC61. The AND-gate 1395 receives signals from the Fast Countdown Scaler flip-flop signal FCD10, and from an OR-gate 1396. OR-gate 1396 receives signals from the Fast Countdown Scaler flip-flops FCD21, FDC31, and FCD41. OR-gate 1392 provides a signal, appropriately amplified by an emitter follower 1397, to the set input terminal of the Fast Countdown Scaler flip-flop FCD1. Flip-flop FCD1 receives clock signals from the ungated clock driver CU111, and receives reset signals from the set output terminal thereof, FCD11. These resetting signals may be appropriately applied to the reset input terminal thereof through a dummy AND-gate 1398.

Figure 195:
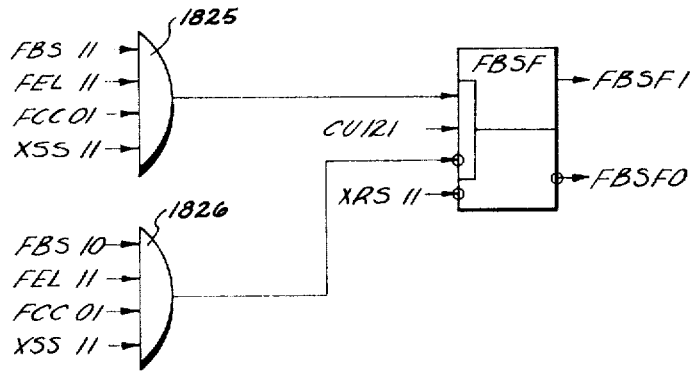
FIG. 195 is a schematic illustration of the Block Buffer Status Follower flip-flop FBSF and the associated logical circuitry.

Referring to FIG. 195, a schematic illustration of the Fast Countdown Scaler flip-flop FCD2 is shown. An OR-gate 1400 is provided for receiving signals from the Fast Countdown Scaler flip-flops FCD30 and FCD40. The output of the OR-gate 1400 is conjunctively combined in an AND-gate 1401 with Fast Countdown Scaler flip-flop signals FCD11 and FCD20. The output of the AND-gate 1401 is applied to the set input terminal of the Fast Countdown Scaler flip-flop FCD2. Flip-flop FCD2 receives resetting signals from an AND-gate 1402 which conjunctively combines signals from Fast Countdown Scaler flip-flops FCD11 and FCD21. The flip-flop FCD2 also receives clock signals from the ungated clock driver CU111.

Figure 146:
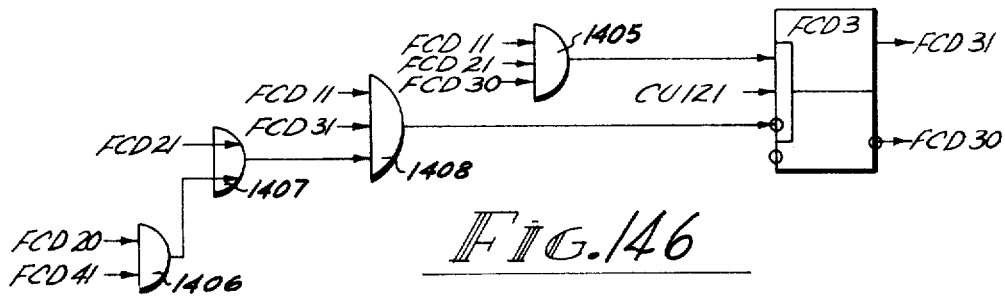

Referring to FIG. 146, a schematic illustration of the Fast Countdown Scaler flip-flop FCD3 is shown. An AND-gate 1405 is provided for receiving signals from the Fast Countdown Scaler flip-flop signals FCD11, FCD21, and FCD30. The output of the AND-gate 1405 is applied to the set input terminal of the flip-flop FCD3. An AND-gate 1406 is provided for receiving signals from the Fast Countdown Scaler flip-flops FCD20 and FCD41. The output of the AND-gate 1406 is appleid to an OR-gate 1407 which also receives signals from the Fast Countdown Scaler flip-flop FCD21. The output of the OR-gate 1407 is conjunctively combined in an AND-gate 1408 with Fast Countdown Scaler flip-flop signals FCD11 and FCD31. The output of the AND-gate 1408 is applied to the reset input terminal of the Fast Countdown Scaler flip-flop FCD3. The flip-flop FCD3 receives clock signals from the ungated clock driver CU121.

Figure 147:
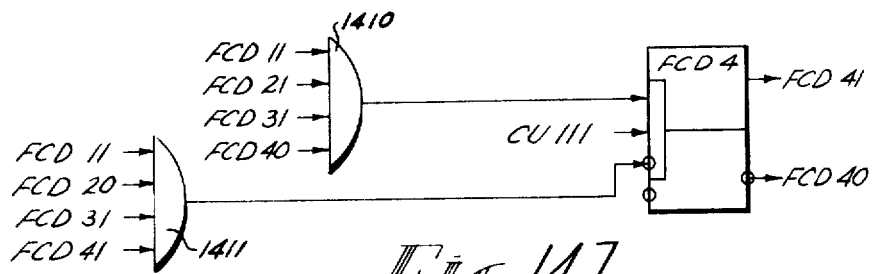

Referring to FIG. 147, a schematic illustration of the Fast Countdown Scaler flip-flop FCD4 is shown. An AND-gate 1410 is provided for receiving the Fast Countdown Scaler flip-flop signals FCD11, FCD21, FCD31 and FCD40. The output of the AND-gate 1410 is applied to the set input terminal of the Fast Countdown Scaler flip-flop FCD4.

An AND-gate 1411 is provided for receiving Fast Countdown Scaler flip-flop signals FCD11, FCD20, FCD31, and FCD41. The logical conjunction of these signals provided by the AND-gate 1411 is applied to the reset input terminal of the Fast Countdown Scaler flip-flop FCD4. The flip-flop FCD4 receives clock signals from the ungated clock driver CU111.

Figure 148:
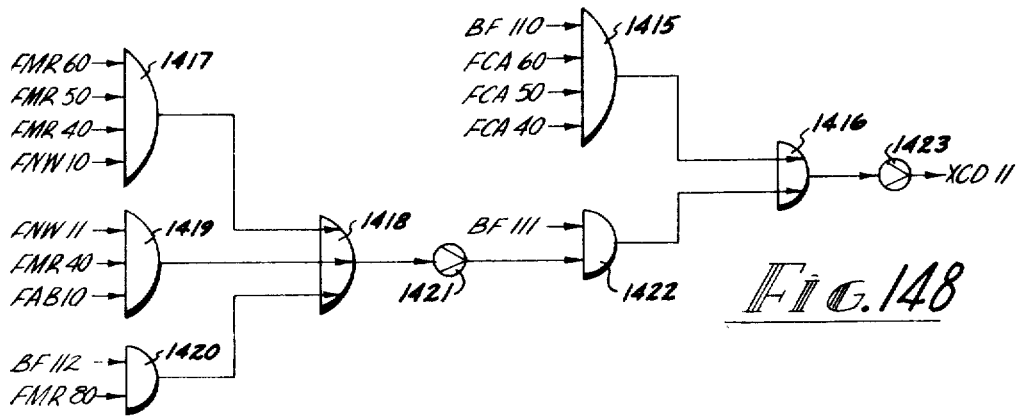
FIGS. 148–155 are schematic illustrations of the decoding circuits for the development of the character select decode signals XCD11–XCD81.

Referring to FIG. 148, a schematic illustration of the decoding circuit for the development of the decoding signal XCD11 is shown. The typeline buffer character address decode circuit, schematically shown in FIG. 148, forms one of the selection lines necessary to determine the row (character position) into which a bit is to be stored during the Transfer cycle. The selection lines are also utilized to address a specific character during the Print cycle. One of the typeline buffer character decode signals XCD is required and one of the typeline buffer character decodes XCE is required for each character being addressed in the typeline buffer. Referring to FIG. 148, an AND-gate 1415 is provided for receiving Bus Function signal BF110, and for receiving signals from the Column Address Counter flip-flops FCA60, FCA50, and FCA40. The output of the AND-gate 1415 is applied to an OR-gate 1416.

An AND-gate 1417 is provided for receiving signals from the Memory Register flip-flops FMR60, FMR50, and FMR40, and from the Numeric Word flip-flop FNW10. The output of the AND-gate 1417 is applied to an OR-gate 1418. OR-gate 1418 also receives signals from AND-gates 1419 and 1420. AND-gate 1419 receives signals from the Numeric Word flip-flop FNW11, the Memory Register flip-flop FMR40, and the Numeric Word A-B Select flip-flop FAB10. The AND-gate 1420 receives Bus Function signal BF112, and the Memory Register flip-flop signal FMR80. The OR-gate 1418 provides a signal which is appropriately amplified through an emitter follower 1421 and applied to an AND-gate 1422 to be conjunctively combined with the Bus Function signal BF111. Output of the AND-gate 1422 is applied to the OR-gate 1416 along with the output of the AND-gate 1415. The output signal provided by the OR-gate 1416 is approximately amplified by an emitter follower 1423 and represents the typeline buffer character address decode signal XCD11.

Figure 149:
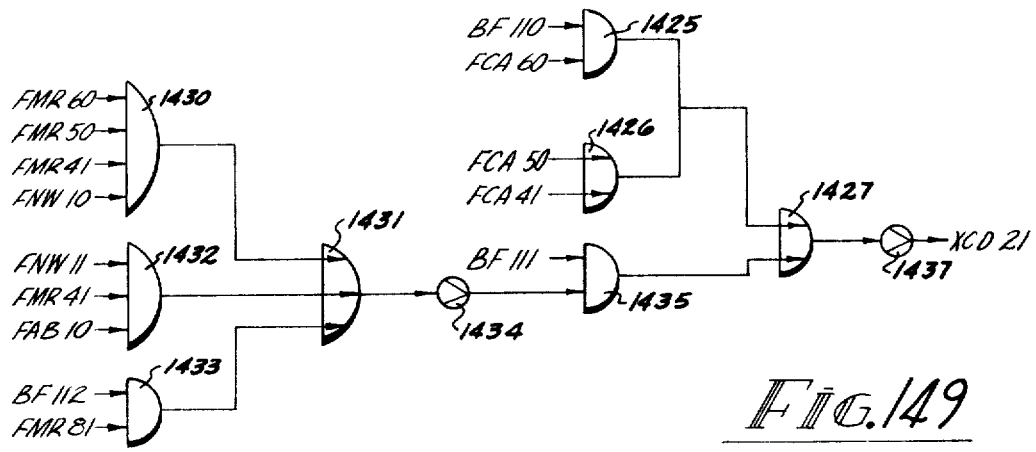

Referring to FIG. 149, a schematic illustration of the decoding circuit for the development of the decode signal XCD21 is shown. An AND-gate 1425 receives Bus Function signals BF110, and conjunctively combines these signals with the Column Address Counter flip-flop signals FCA60. An OR-gate 1426 receives Column Address Counter flip-flop signals FCA50 and FCA40. The outputs of the AND-gate 525 and the OR-gate 426 are applied to an OR-gate 1427. An AND-gate 1430 is provided for receiving Memory Register flip-flop signals FMR60, FMR50 and FMR41, and for receiving the Numeric Word flip-flop signals FNW10. The output of the AND-gate 1430 is applied to an OR-gate 1431. OR-gate 1431 also receives signals from AND-gates 1432 and 1433. AND-gate 1432 receives signals from the Numeric Word flip-flop FNW11, the Memory Register flip-flop FMR41, and the Numeric Word A-B Select flip-flop FAB10.

The AND-gate 1433 receives Bus Function signals BF112, and the Memory Register flip-flop signals FMR81. The OR-gate 1431, connected to receive signals from AND-gates 1430, 1432 and 1433, provides a signal, when amplified through an emitter follower 1434, which is conjunctively combined in an AND-gate 1435 with the Bus Function signal BF111. Output of AND-gate 1435 is applied to the OR-gate 1427. The OR-gate 1427 provides a signal which, when amplified by an emitter follower 1437, presents the typeline buffer character decode signal XCD21.

Figure 150:
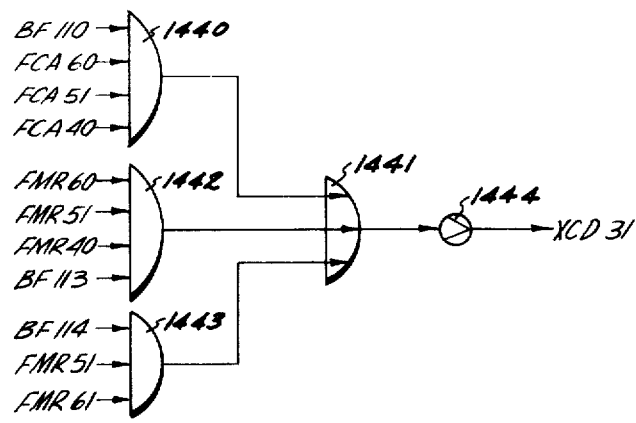

Referring to FIG. 150, a schematic illustration of the decoding circuit for the development of the typeline buffer character address decode signal XCD31 is shown. An OR-gate 1441 is provided for receiving signals from three AND-gates: 1440, 1442, and 1443. AND-gate 1440 receives signals from the Column Address Counter flip-flops FCA60, FCA51, and FCA40, and also receives the Bus Function signal BF110. The AND-gate 1442 receives Memory Register flip-flop signals FMR60, FMR51, and FMR40, and also receives Bus Function signal BF113. AND-gate 1443 receives the Memory Register flip-flop signals FMR51 and FMR61, and Bus Function signal BF114. The OR-gate 1441 provides a signal, appropriately amplified by an emitter follower 1444, which represents the typeline buffer character address decode signal XCD31.

Figure 151:
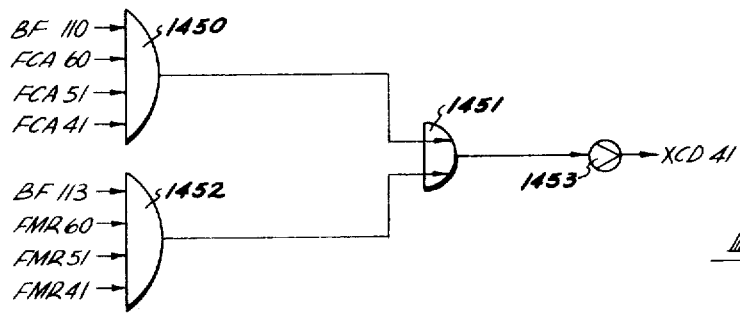

Referring to FIG. 151, a schematic illustration of the decoding circuit for the development of the typeline buffer character address decode signal XCD41 is shown.

An AND-gate 1450 is provided for receiving Column Address Counter flip-flop signals FCA60, FCA51, and FCA41, and for receiving Bus Function signal BF110. The output of the AND-gate 1450 is applied to an OR-gate 1451 which also receives signals from an AND-gate 1452. AND-gate 1452 receives signals from the Memory Register flip-flops FMR60, FMR51, and FMR41, and also receives Bus Function signal BF113. The output of the AND-gate 1451, appropriately amplified by an emitter follower 1453, represents the typeline buffer character address decode signal XCD41.

Figure 152:
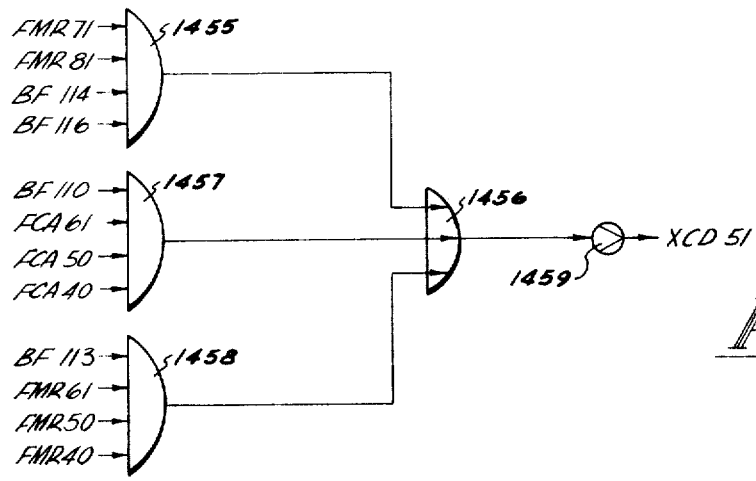

Referring to FIG. 152, a schematic illustration of the decoding circuit for the development of the typeline buffer character decode signal XCD51 is shown. An AND-gate 1455 is provided for receiving signals from Memory Register flip-flops FMR71 and FMR81, and for receiving Bus Function signals BF114 and BF116. The output of the AND-gate 1455 is applied to the OR-gate 1456. OR-gate 1456 also receives signals from AND-gates 1457 and 1458. AND-gate 1457 receives Column Address Counter flip-flop signals FCA61, FCA50 and FCA40, and for receiving Bus Function signal BF110. AND-gate 1458 receives Memory Register flip-flop signals FMR61, FMR50 and FMR40, and also receives Bus Function signal BF113. The output of the OR-gate 1456, appropriately amplified by an emitter follower 1459, represents the typeline buffer character address decode signal XCD51.

Figure 153:
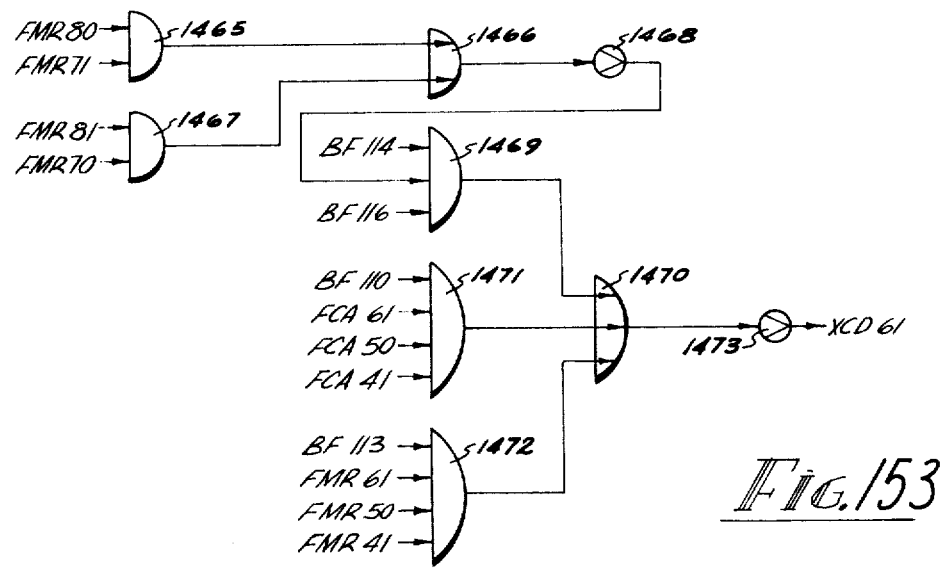

Referring to FIG. 153, a schematic illustration of the decoding circuit for the development of the typeline buffer character address decode signal XCD61 is shown. An AND-gate 1465 is provided for receiving Memory Register flip-flop signals FMR60 and FMR71. The output of the AND-gate 1465 is applied to an OR-gate 1466 which also receives signals from a second AND-gate 1467. AND-gate 1467 receives Memory Register flip-flop signals FMR81 and FMR70. The output of the OR-gate 1466, appropriately amplified by an emitter follower 1468, is applied to an AND-gate 1469 to be conjunctively combined with Bus Function signals BF114 and BF116. The output of AND-gate 1469 is provided to an OR-gate 1470 which also receives signals from AND-gates 1471 and 1472. AND-gate 1472 receives Column Address Counter flip-flop signals FCA61, FCA50, and FCA41, and also receives Bus Function signal BF110. AND-gate 1472 receives Memory Register flip-flop signals FMR61, FMR50, and FMR41, and also receives Bus Function signal BF113. The output of the OR-gate 1470, appropriately amplified by emitter follower 1473, represents the typeline buffer character decode signal XCD61.

Figure 154:
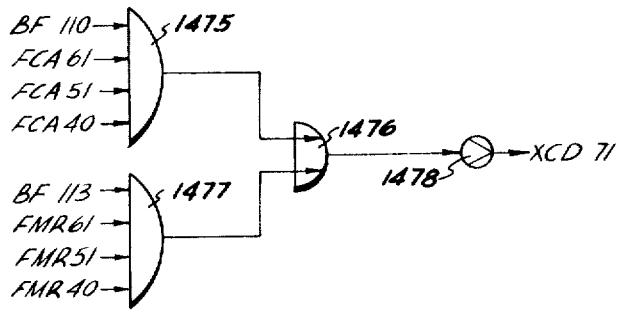

Referring to FIG. 154, a schematic illustration of the decoding circuit for the development of the typeline buffer character address decode signal XCD71 is shown. An AND-gate 1475 is provided for receiving Column Address Counter flip-flop signals FCA61, FCA51, and FCA40, and for receiving the Bus Function signal BF110. The output of the AND-gate 1475 is applied to an OR-gate 1476 which also receives signals from an AND-gate 1477. AND-gate 1477 receives Memory Register flip-flop signals FMR61, FMR51, and FMR40, and also receives Bus Function signals BF113. The output of the OR-gate 1476, appropriately amplified by an emitter follower 1478, represents the typeline buffer character address decode signals XCD71.

Figure 155:
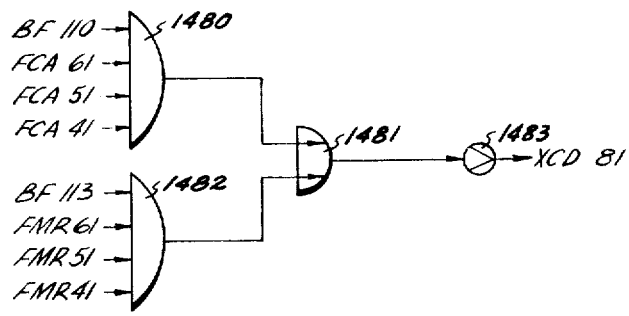

Referring to FIG. 155, a schematic illustration of the decoding circuit for the development of the typeline buffer character address decode signal XCD81 is shown. An AND-gate 1480 is provided for receiving Column Address Counter flip-flop signals FCA61, FCA51, and FCA41, and for receiving Bus Function signals BF110. The output of the AND-gate 1480 is applied to an OR-gate 1481 which also receives signals from a second AND-gate 1482. AND-gate 1482 receives signals from Memory Register flip-flops FMR61, FMR51, and FMR41, and also receives a Bus Function signal BF113. The output of the OR-gate 1481, appropriately amplified by an emitter follower 1483, represents the typeline buffer character address decode signal XCD81.

Figure 156:
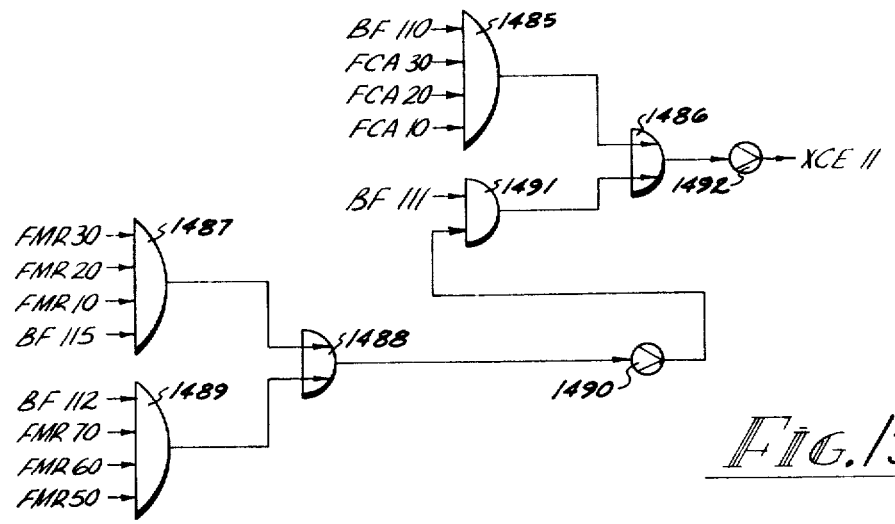
FIGS. 156–163 are schematic illustrations of the decoding circuits for the development of the character select decode signals XCE11–XCE81.

Referring to FIG. 156, a schematic illustration of the decoding circuit for the development of the typeline buffer character address decode signal XCE11 is shown. An AND-gate 1485 is provided for receiving Column Address Counter flip-flop signals FCA30, FCA20, and FCA10, and for receiving the Bus Function signal BF110. The output of the AND-gate 1485 is applied to an OR-gate 1486 which also receives signals from an AND-gate 1491. An AND-gate 1487 is provided for receiving signals from the Memory Register flip-flops FMR30, FMR20 and FMR10, and also for receiving the Bus Function signal BF115. The output of the AND-gate 1487 is provided to an OR-gate 1488 which also receives signals from another AND-gate 1489. AND-gate 1489 receives Memory Register flip-flop signals FMR70, FMR60, and FMR50, and also receives the Bus Function signal BF112. The output of the OR-gate 1488 is appropriately amplified in an emitter follower 1490 and is conjunctively combined in an AND-gate 1491 with the Bus Function signal BF111. The output of the AND-gate 1491 is applied to the OR-gate 1486. The output of the OR-gate 1486, appropriately amplified in an emitter follower 1492, represents the typeline buffer character address decode signal XCE11.

Figure 157:
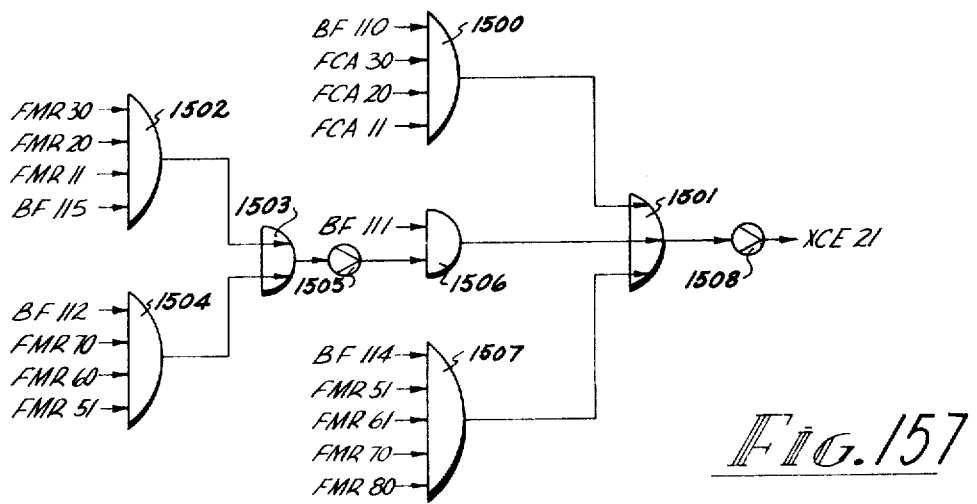

Referring to FIG. 157, a schematic illustration of the decoding circuit for the development of the typeline buffer character address decode signal XCE21 is shown. An AND-gate 1500 is provided for receiving Column Address Counter flip-flop signals FCA30, FCA20 and FCA11, and for receiving the Bus Function signal BF110. The output of the AND-gate 1500 is applied to an OR-gate 1501. An AND-gate 1502 is provided for receiving Memory Register flip-flop signals FMR30, FMR20 and FMR11, and for receiving the Bus Function signal BF115. The output of the AND-gate 1502 is applied to an OR-gate 1503 which also receives signals from an AND-gate 1504. AND-gate 1504 receives signals from the Memory Register flip-flops FMR70, FMR60 and FMR51, and receives signals from the Bus Function BF112. The output of the OR-gate 1503 is appropriately amplified in an emitter follower 1505 and is conjunctively combined in an AND-gate 1506 with the Bus Function signal BF111. The output of the AND-gate 1506 is also applied to the OR-gate 1501.

An AND-gate 1507 is provided for receiving Memory Register flip-flop signals FMR51, FMR61, FMR70 and FMR80, and for receiving Bus Function signal BF114. The output of the AND-gate 1507 is also applied to the OR-gate 1501. The output of the OR-gate 1501, appropriately amplified through an emitter follower 1508, represents the typeline buffer character address decode signal XCE21.

Figure 158:
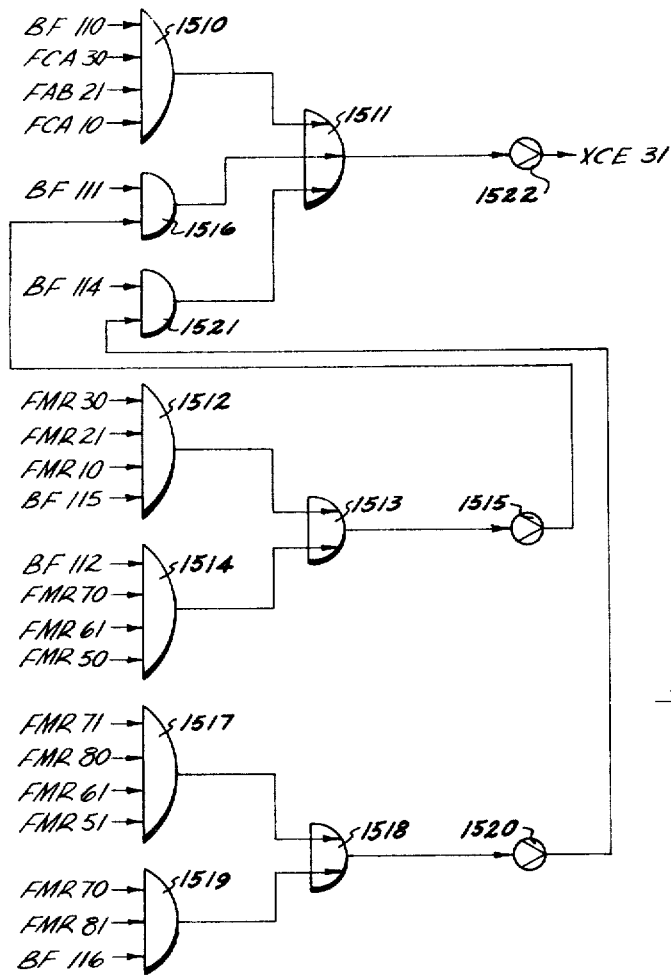

Referring to FIG. 158, a schematic illustration of the decoding circuit for the development of the typeline buffer character address decode signal XCE31 is shown. An AND-gate 1510 is provided for receiving Column Address Counter flip-flop signals FCA30 and FCA10, the Numeric Word A–B Select flip-flop signal FAB21, and the Bus Function signal BF110. The output of the AND-gate 1510 is applied to an OR-gate 1511. An AND-gate 1512 is provided for receiving Memory Register flip-flop signals FMR30, FMR21, and FMR10, and for receiving Bus Function signal BF115. The output of the AND-gate 1512 is applied to an OR-gate 1513. An AND-gate 1514 receives Memory Register flip-flop signals FMR70, FMR61 and FMR50, and also receives Bus Function signal BF112. Output of the AND-gate 1514 is also applied to the OR-gate 1513. OR-gate 1513 provides a signal which is appropriately amplified in an emitter follower 1515 and is conjunctively combined in an AND-gate 1516 with the Bus Function signal BF111. Output of the AND-gate 1516 is applied to the OR-gate 1511. An AND-gate 1517 is provided for receiving Memory Register flip-flop signals FMR71, FMR80, FMR61 and FMR51. Output of the AND-gate 1517 is applied to an OR-gate 1518. AND-gate 1519 is provided for receiving Memory Register flip-flop signals FMR70, FMR81, and Bus Function signal BF116. Output of the AND-gate 1519 is also applied to the OR-gate 1518. The output of the OR-gate 1518 is appropriately amplified in an emitter follower 1520 and is conjunctively combined in an AND-gate 1521 with the Bus Function signal BF114. The output of the AND-gate 1521 is also applied to the OR-gate 1511. The signal provided by the OR-gate 1511, appropriately amplified by an emitter follower 1522, represents the typeline buffer character address decode signal XCE31.

Figure 159:
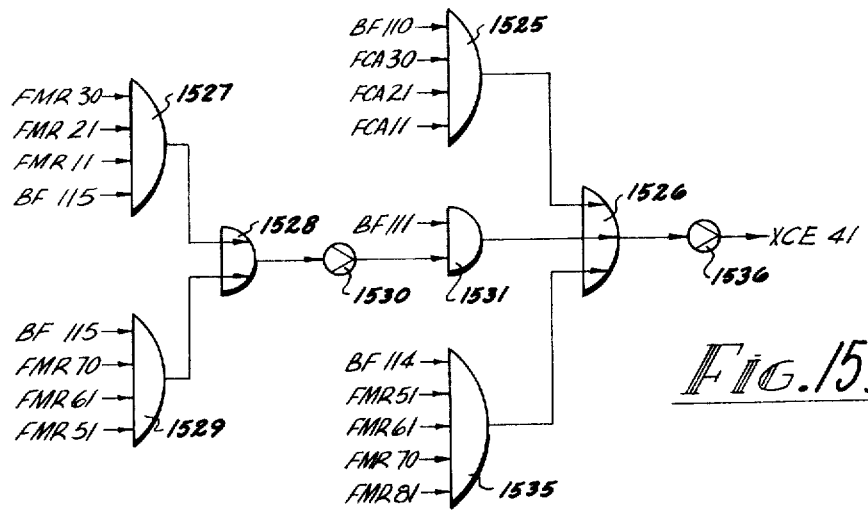

Referring to FIG. 159, a schematic illustration of the decoding circuit for the development of a typeline buffer character address decode signal XCE41 is shown. An AND-gate 1525 is provided for receiving Column Address Counter flip-flop signals FCA30, FCA21, and FCA11, and also for receiving Bus Function signal BF110. The output of the AND-gate 1525 is applied to the OR-gate 1526. An AND-gate 1527 receives Memory Register flip-flop signals FMR30, FMR21 and FMR11, and also receives Bus Function signal BF115. The output of the AND-gate 1527 is applied to an OR-gate 1528 which also receives signals from an AND-gate 1529. AND-gate 1529 receives Memory Register flip-flop signals FMR70, FMR61 and FMR51, and receives Bus Function signals BF115. The output of the OR-gate 1528 is amplified by an emitter follower 1530, and conjunctively combined in an AND-gate 1531 with the Bus Function signal BF111. Output of AND-gate 1531 is also applied to the OR-gate 1526. And-gate 1535 receives Memory Register flip-flop signals FMR51, FMR61, FMR70 and FMR81, and Bus Function signal BF114. The logical conjunction of these signals provided by the AND-gate 1535 is applied to the OR-gate 1526. The signal provided by the OR-gate 1526, appropriately amplified by the emitter follower 1536, represents the typeline buffer character address decode signal XCE41.

Figure 160:
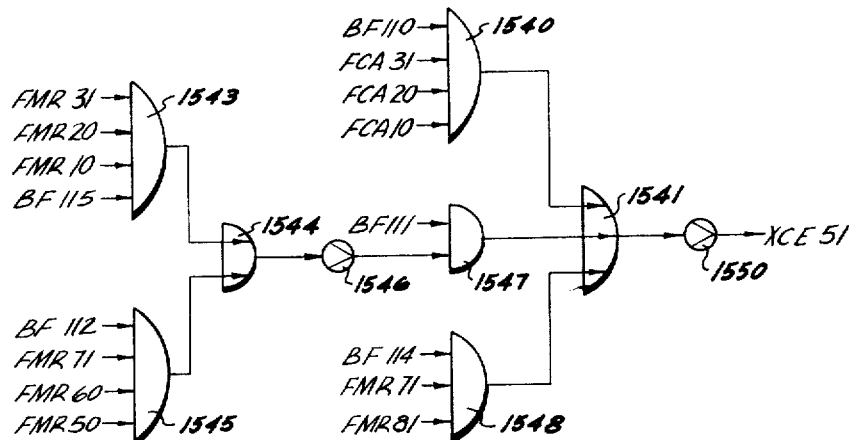

Referring to FIG. 160, a schematic illustration of the decoding circuit for the development of the typeline buffer character decode signal XCE51 is shown. An AND-gate 1540 receives Column Address Counter flip-flop signals FCA31, FCA20 and FCA10, and Bus Function signal BF110. Output of the AND-gate 1540 is applied to an OR-gate 1541. An AND-gate 1543 receives the Memory Register flip-flop signals FMR31, FMR20 and FMR10, and Bus Function signal BF115. And-gate 1545 receives Memory Register flip-flop signals FMR71, FMR60 and FMR50, and Bus Function signal BF112. The output signals from the AND-gates 1543 and 1545 are combined in an OR-gate 1544. The output signal provided by the OR-gate 1544 is appropriately amplified by an emitter follower 1546 and conjunctively combined in an AND-gate 1547 with the Bus Function BF111. Output of the AND-gate 1547 is also applied to the OR-gate 1541. An AND-gate 1548 receives Memory Register flip-flop signals FMR71 and FMR81, and Bus Function signal BF114. Output of the AND-gate 1547 is also applied to the OR-gate 1541. The output signal provided by the OR-gate 1541, appropriately amplified by an emitter follower 1550, represents the typeline buffer character address decode signal XCE51.

Figure 161:
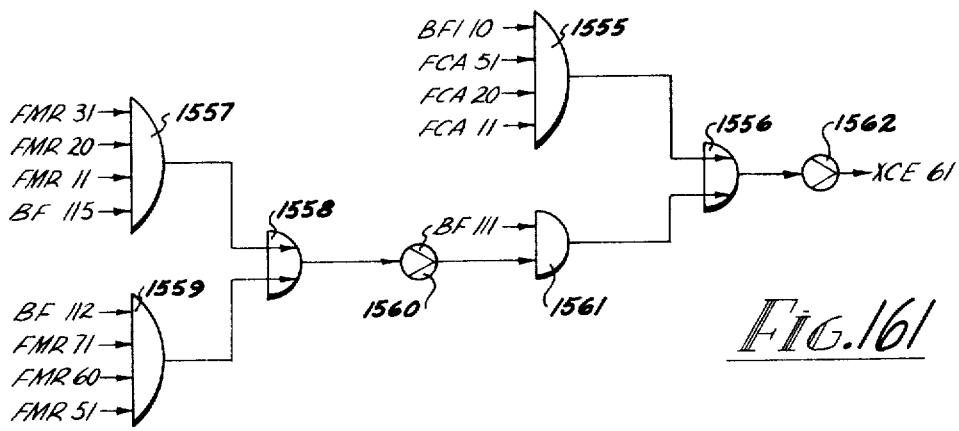

Referring to FIG. 161, a schematic illustration of the decoding circuit for the development of the typeline buffer character address decode signal XCE61 is shown. An AND-gate 1555 receives Column Address Counter flip-flop signals FCA51, FCA20 and FCA11, and receives Bus Function signal BF110. The output of the AND-gate 1555 is applied to the OR-gate 1556. An AND-gate 1557 receives Memory Register flip-flop signals FMR31, FMR20, and FMR11, and Bus Function signal BF115. An AND-gate 1559 receives Memory Register flip-flop signals FMR71, FMR60 and FMR51, and Bus Function signal BF112. The output signals provided by the AND-gates 1557 and 1559 are applied to an OR-gate 1558. OR-gate 1558 provides signals which, appropriately amplified by an emitter follower 1560, are conjunctively combined in an AND-gate 1561 with the Bus Function signals BF111. The output of AND-gate 1561 is also applied to the OR-gate 1556. Output of the OR-gate 1556, appropriately amplified by an emitter follower 1562, represents the typeline buffer character address decode signal XCE61.

Figure 162:
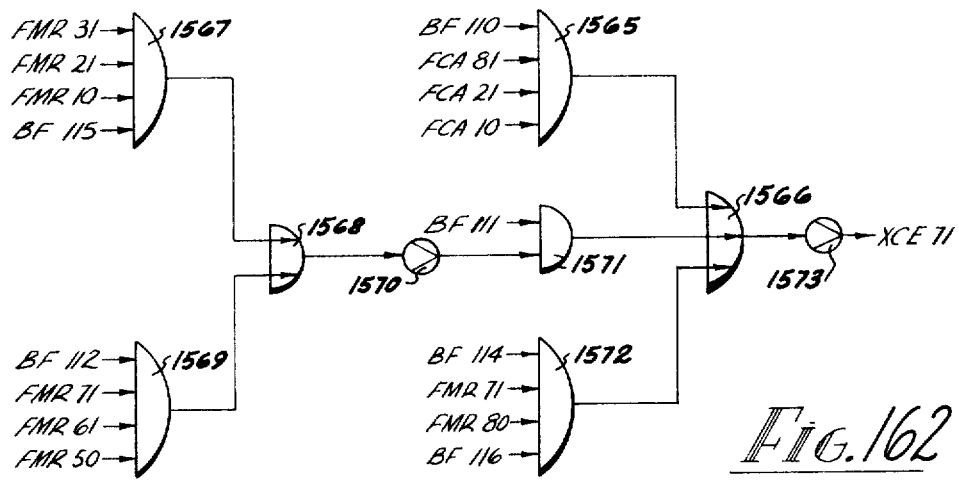

Referring to FIG. 162, a schematic illustration of the decoding circuit for the development of the typeline buffer character decode signal XCE71 is shown. An AND-gate 1565 is provided for receiving Column Address Counter flip-flop signals FCA81, FCA21 and FCA10, and Bus Function signal BF110. The output of the AND-gate 1565 is applied to an OR-gate 1566. An AND-gate 1567 receives signals from the Memory Register flip-flops FMR31, FMR21 and FMR10, and also receives the Bus Function signal BF115. The output of the AND-gate 1567 is applied to an OR-gate 1568 which also receives signals from a second AND-gate 1569. AND-gate 1569 receives Memory Register flip-flop signals FMR71, FMR50 and FMR61, and Bus Function signal BF112. The output of the OR-gate 1568 is appropriately amplified in an emitter follower 1570 and is conjunctively combined in an AND-gate 1571 with the Bus Function signal BF111. Output of the AND-gate 1571 is also applied to the OR-gate 1566.

An AND-gate 1572 receives the Memory Register flip-flop signals FMR71 and FMR80, and Bus Function signals BF114 and BF116. The output of the AND-gate 1572 is also applied to the OR-gate 1566. The output signal of the OR-gate 1566, appropriately amplified in an emitter follower 1573, represents the typeline buffer character decode signal XCE71.

Figure 163:
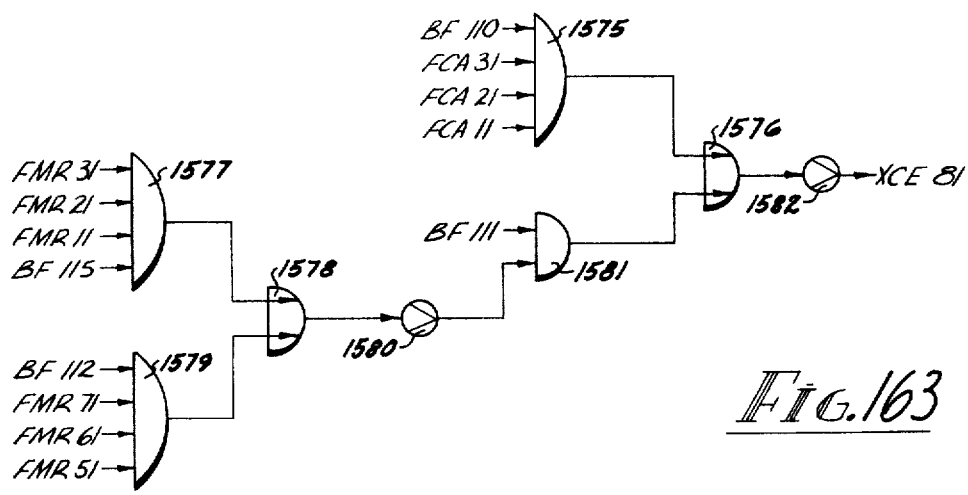
Figure 167:
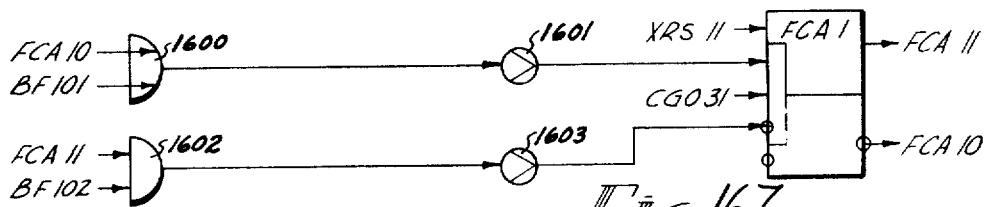
FIGURES 167–173 are schematic illustrations of the Column Address Counter flip-flops FCA1–FCA7 and the associated logical circuitry.

Referring to FIG. 163, a schematic illustration of the decoding circuit for the development of the typeline buffer character address decode signal XCE81 is shown. An AND-gate 1575 receives Column Address Counter flip-flop signals FCA31, FCA21, FCA11, and Bus Function signal BF110. Output of the AND-gate 1575 is applied to an OR-gate 1576. An AND-gate 1577 receives Memory Register flip-flop signals FMR31, FMR21 and FMR11, and Bus Function signal BF115. An AND-gate 1579 receives the Memory Register flip-flop signals FMR71, FMR61 and FMR51, and Bus Function signal BF112. The outputs of the AND-gates 1577 and 1579 are applied to an OR-gate 1578, which provides an output signal to be amplified by an emitter follower 1580 and conjunctively combined in an AND-gate 1581 with the Bus Function signal BF111. The output of the AND-gate 1581 is also applied to the OR-gate 1576. The output of the OR-gate 1576, appropriately amplified by an emitter follower 1582, represents the typeline buffer character decode signal XCE81.

Referring to FIG. 164, a schematic illustration of the Numeric Word Sign Store flip-flop FNS1 is shown. The Numeric Word Sign Store flip-flop FNS1 is utilized to store the algebraic sign of numeric words. It will be remembered that the format of the data received by the High Speed Printer Control System of the present invention required that the algebraic sign of numeric words precedes the digits of the numeric word. However, in the embodiment chosen for illustration here, the algebraic sign is to be printed following the least significant digit. Therefore, the Numeric Word Sign Store flip-flop FNS1 acts as a short term memory to store the algebraic sign of the numeric word to allow the sign to be printed as desired. An AND-gate 1590 is provided for receiving Memory Register flip-flop signal FMR31, and the Bus Function signal BF030. The conjunctive combination of these signals provided by the AND-gate 1590 yields a signal which is applied to the set input terminal of the Numeric Word Sign Store flip-flop FNS1. A second AND-gate 1591 receives the Memory Register flip-flop signal FMR30, and the Bus Function signal BF030. The output of the AND-gate 1591 is applied to the reset input terminal of the Numeric Word Sign Store flip-flop FNS1. Flip-flop FNS1 receives clock signals from the ungated clock driver CU021, and resetting signals from the resetting decode circuit XRS11 applied to the reset register transfer input terminal thereof.

Referring to FIG. 165, a schematic illustration of the Print Negative Sign flip-flop FPNS is shown. The Print Negative Sign flip-flop FPNS stores the negative sign of numeric words. The flip-flop is set upon receipt of, among other signals, a set signal from the Numeric Word Sign Store flip-flop described in FIG. 164. The flip-flop FPNS is reset when the print enable signal from the print sign enable decode circuit goes false. An AND-gate 1593 is provided for receiving the Program Counter flip-flop signal FPC21, the Word Character Counter flip-flop signals FWC10 and FWC20, the Numeric Word A–B flip-flop signal FAB10, the Control Counter flip-flop signal FCC41, the Numeric Word Sign Store flip-flop signal FNS11, and the print sign enable decode circuit signal XPSE1. The output of the AND-gate 1593 is applied to the set input terminal of the Print Negative Sign flip-flop FPNS. The flip-flop FPNS receives clock signals from the gated clock driver CG031, and resetting signals from the print sign enable decode circuit signal XPSE0. Therefore, the Print Negative Sign flip-flop FPNS will provide a set output signal FPNS1 when a negative sign is to be printed, and presents a reset output signal FPNS0 at all other times.

Referring to FIG. 166, a schematic illustration of the decoding circuit for the development of the print numeric sign enable decode signal XPSE1 is shown. The print numeric sign enable decode circuit is utilized to enable the numeric sign of a numeric word to be printed in the column selected in the plugboard. A true signal from this decode causes the proper code to be entered into the typeline buffer to print a minus sign if detected or a space if a plus sign is detected. An AND-gate is provided for receiving signals from the plugboard positions PPS01–PPS25. These plugboard positions enable the selection to be made as to the location of sign printing during the Print cycle. The output of the AND-gate 1595 is amplified by an emitter follower 1596 and applied to an AND-gate 1597. The AND-gate 1597 also receives signals from the Numeric Word flip-flop FNW11, the mode selection switch SRT10, and the Program Counter flip-flop FPC21. The logical conjunction of these signals provided by the AND-gate 1597 represents the print numeric sign enable decode signal XPSE1. An inverter 1598 is provided for receiving signals from the AND-gate 1597 and inverting these signals to be represented, after amplification in emitter followers 1599, as the print numeric sign enable decode signal XPSE0.

In the Transfer and Print cycles, a column address counter is utilized to provide signals to the column address decode circuits to thereby enable the proper addressing of the typeline buffer. Therefore, the column address counter, through the column address decode, determines the column of the typeline buffer into which the character being loaded will be stored. The column address counter is advanced by the receipt of the appropriate gated clocks during the Transfer cycle, and is advanced by receipt of signals indicating typewheel character pulses during the Print cycle. The column address counter comprises flip-flops FCA1–FCA7 shown schematically in FIGS. 167–173. Referring to these figures, it may be seen that each of the flip-flops receives a signal from the reset decode circuit XRS11 applied to the set register transfer input terminal of the respective flip-flop. Flip-flops FCA1–FCA3 receive clock signals from the gated clock driver CG031; flip-flops FCA4–FCA7 receive their clock signals from gated clock driver CG041.

Column Address Counter flip-flop FCA1 (FIG. 167) receives its set signal from an OR-gate 1600 through an emitter follower 1601. OR-gate 1600 receives Column Address Counter flip-flop signal FCA10 and Bus Function signal BF101. The resetting signal is applied from an AND-gate 1602 through an emitter follower 1603. AND-gate 1602 receives Column Address Counter flip-flop signal FCA11 and Bus Function signal BF102.

Figure 168:
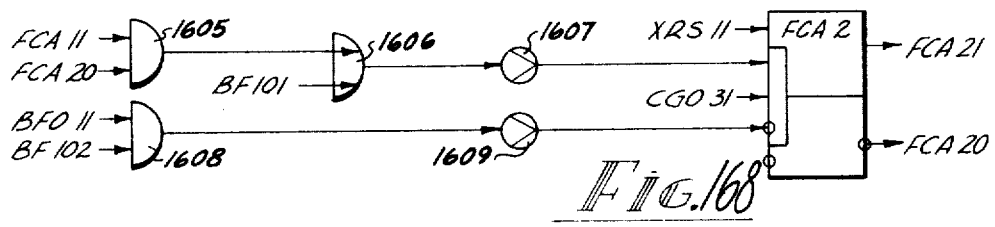

Column Address Counter flip-flop FCA2, shown in FIG. 168, receives its set signal from an AND-gate 1605, the output signal of which is combined in an OR-gate 1606 with the Bus Function BF101 to yield a signal amplified by an emitter follower 1607 and ultimately applied to the set input terminal. AND-gate 1605 receives Column Address Counter flip-flop signals FCA11 and FCA20. The reset input signal of flip-flop FCA2 is derived by the conjunctive combination of Bus Function signal BF011 and GF102 in an AND-gate 1608 which generates a signal to be amplified by an emitter follower 1609 prior to its application to the reset input terminal of the flip-flop.

Figure 169:
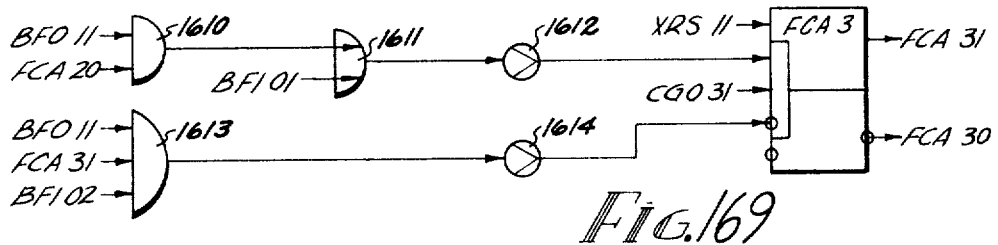
Figure 170:
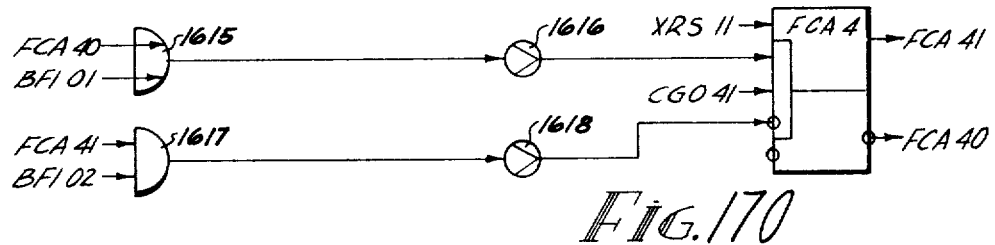

Column Address Counter flip-flop FCA3 shown in FIG. 169, receives its setting input signal from an AND-gate 1610 through an OR-gate 1611 and an emitter follower 1612. The AND-gate 1610 provides the logical conjunction of signals from the Column Address Counter flip-flop FCA20 and the Bus Function signal BF011. The output of the AND-gate 1610 is combined in OR-gate 1611 with the Bus Function signal BF101. The input reset signal to the flip-flop FCA3 is provided by an AND-gate 1613 which conjunctively combines Bus Function signals BF011 and BF102 and Column Address Counter flip-flop signal FCA31. The output signal of AND-gate 1613 is amplified in an emitter follower 1614 prior to its application to the flip-flop FCA3. The Column Address Counter flip-flop FCA4 receives its setting input signal from an OR-gate 1615 through an emitter follower 1616. The OR-gate 1615 receives Column Address Counter flip-flop signal FCA40 and Bus Function signal BF101. The resetting signal to the flip-flop FCA4 is received through an emitter follower 1618 from an AND-gate 1617 which provides the logical conjunction of Column Address Counter flip-flop signal FCA41 and Bus Function BF102.

Figure 171:
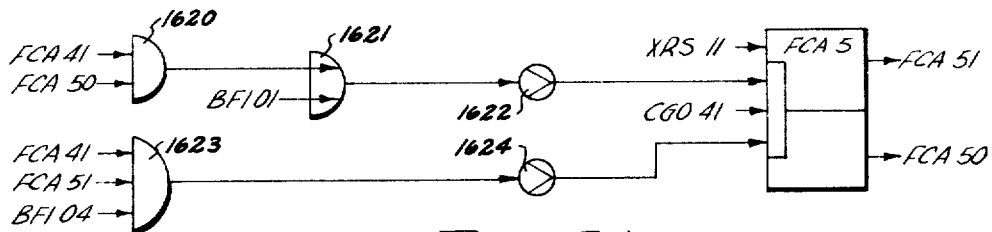
Figure 172:
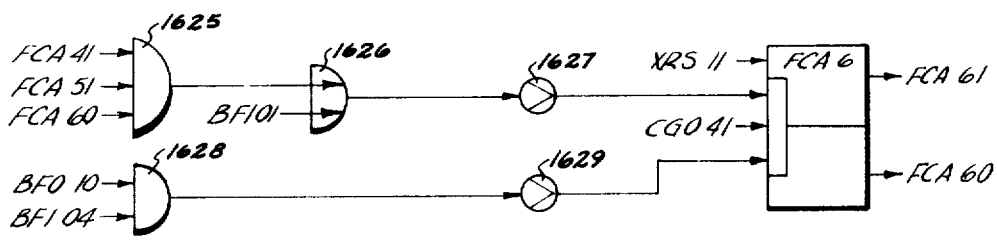
Figure 173:
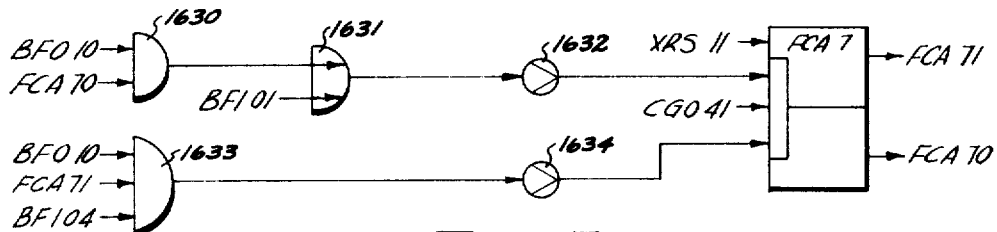

The Column Address Counter flip-flop FCA5, shown in FIG. 171, receives a setting input signal through an emitter follower 1622 from an OR-gate 1621. An AND-gate 1620 receives Column Address Counter flip-flop signals FCA41 and FCA50 and provides a signal to the OR-gate 1621 to be combined with the Bus Function signal BF101. AND-gate 1623 provides a logical conjunction of Column Address Countr flip-flop signals FCA41 and FCA51 and Bus Function signal BF104. The output signal of AND-gate 1623 is amplified by emitter follower 1624 and applied to the reset input terminal of flip-flop FCA5. The Column Address Counter flip-flop FCA6 receives an input signal from an AND-gate 1625 which receives Column Address Counter signals FCA41, FCA51, FCA60 and provides the logical conjunction of those signals to be applied to an OR-gate 1626 which combined that signal with the Bus Function BF101. The output of the OR-gate 1626 is amplified by emitter follower 1627 and applied to the set input terminal. An AND-gate 1628 receives Bus Function signals BF010 and BF104 and provides a signal representative of the logical conjunction of those input signals which is subsequently amplified in an emitter follower 1629 and applied to the reset terminal of the flip-flop FCA6.

Column Address Counter flip-flop FCA7 receives an input signal from AND-gate 1630 through an OR-gate 1631 and an emitter follower 1632. AND-gate 1630 provides the logical conjunction of the Bus Function signal BF010 and the Column Address Counter flip-flop signal FCA70. Output signal of the AND-gate 1630 is combined in an OR-gate 1631 with the Bus Function BF101. An AND-gate 1633 receives Bus Function signals GF010 and BF104 and receives the Column Address Counter flip-flop signal FCA71. The logical conjunction of these signals provided by the AND-gate 1633 yields a signal which is amplified by the emitter follower 1634 and applied to the reset input terminal of the Column Address Counter flip-flop FCA7.

Figure 174:
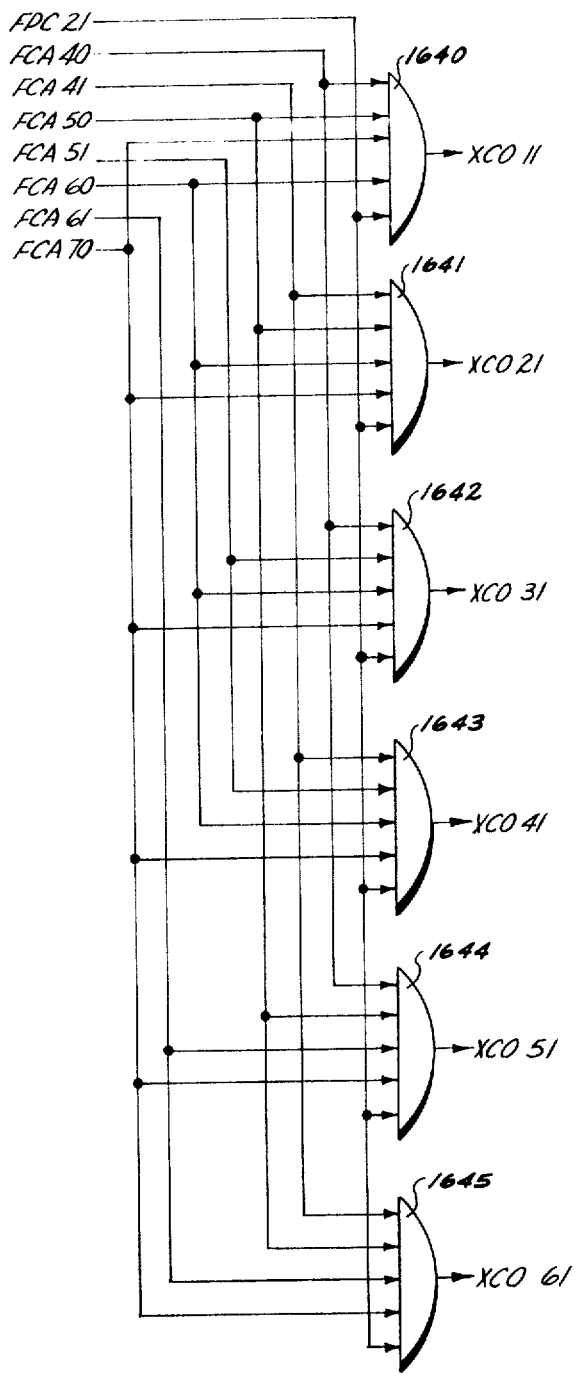
FIG. 174 is a schematic illustration of the decoding circuit for the development of the column address decode signals XC011–XC061.

FIGS. 174 through 177 are schematic illustrations of the decoding circuit for the development of the typeline buffer column address decode signals. These decode signals XC01–XC15 and XCB1–XCB8 provide the signals necessary to address each bit in the typeline buffer. These decoding circuits receive signals from the Column Address Counter flip-flops as the Column Address Counter steps through the addressing count. As the respective counts are reached, the decoding circuits decode the combination of signals received from the column address counter and provide signals for addressing appropriate selection lines of the typeline buffer so that information may be stored in the typeline buffer. Referring to FIG. 174, the typeline buffer column address decode circuits XC01 through XC06 are shown. Each of the decode circuits comprise an AND-gate 1640 through 1645, respectively, each of which receives a predetermined combination of signals from the Column Address Counter flip-flops FCA4 through FCA7, and the Program Counter flip-flop FPC2.

Figure 175:
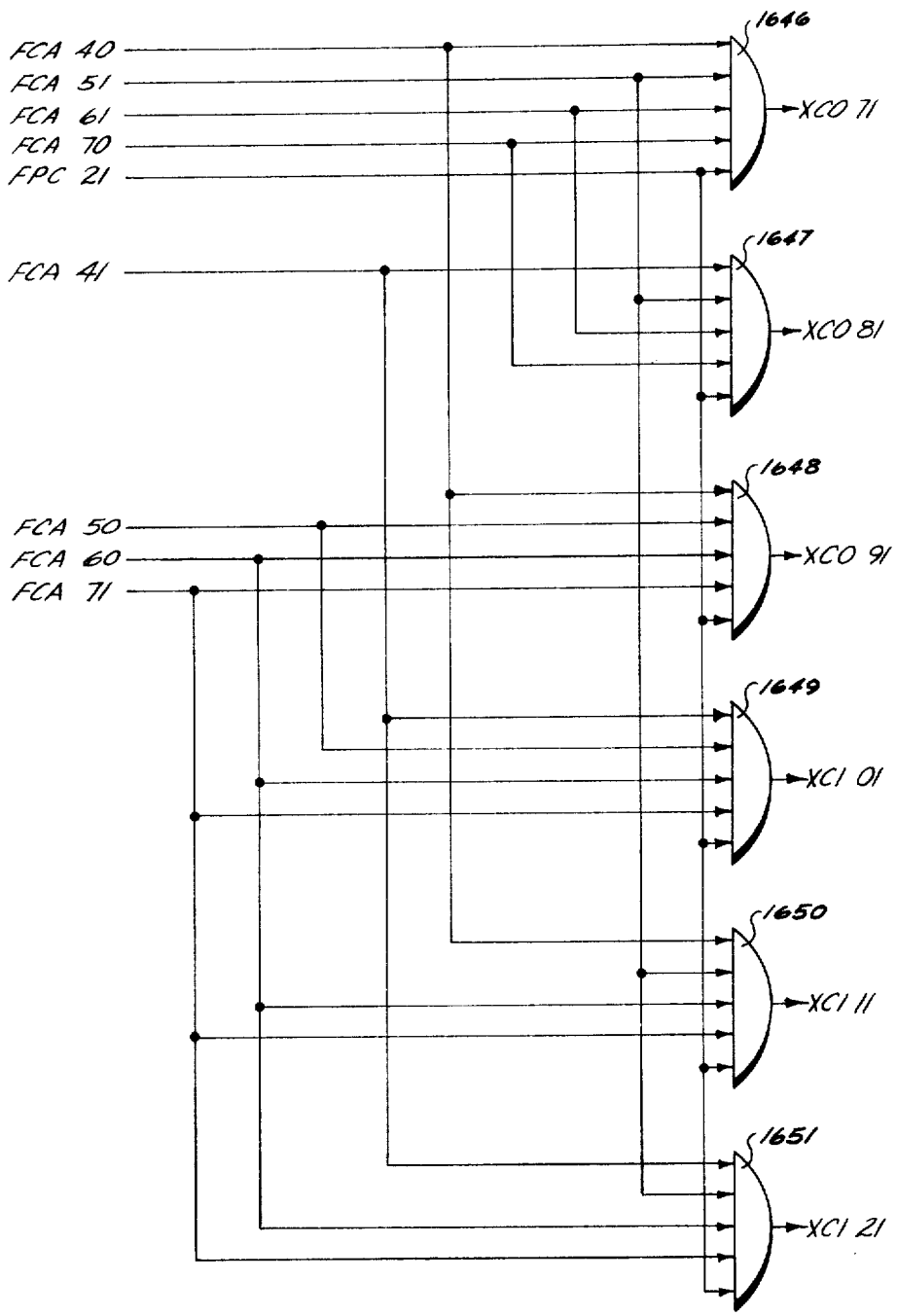
FIG. 175 is a schematic illustration of the decoding circuit for the development of the column address decode signals XC071–XC121.

FIG. 175 illustrates the typeline buffer column address decode circuits XC07–XC09 and XC10–XC12. Each of the decode circuits XC07–XC12 comprises an AND-gate 1646–1651, respectively, each arranged to receive signals from the Column Address Counter flip-flops FCA4–FCA7 and the Program Counter flip-flop FPC2. When the desired true and false conditions of the set and reset output signals of the previously mentioned flip-flops presents itself to the respective AND-gates, the associated decode signal will become true and provide a means for addressing a selection line in the typeline buffer.

Figure 176:
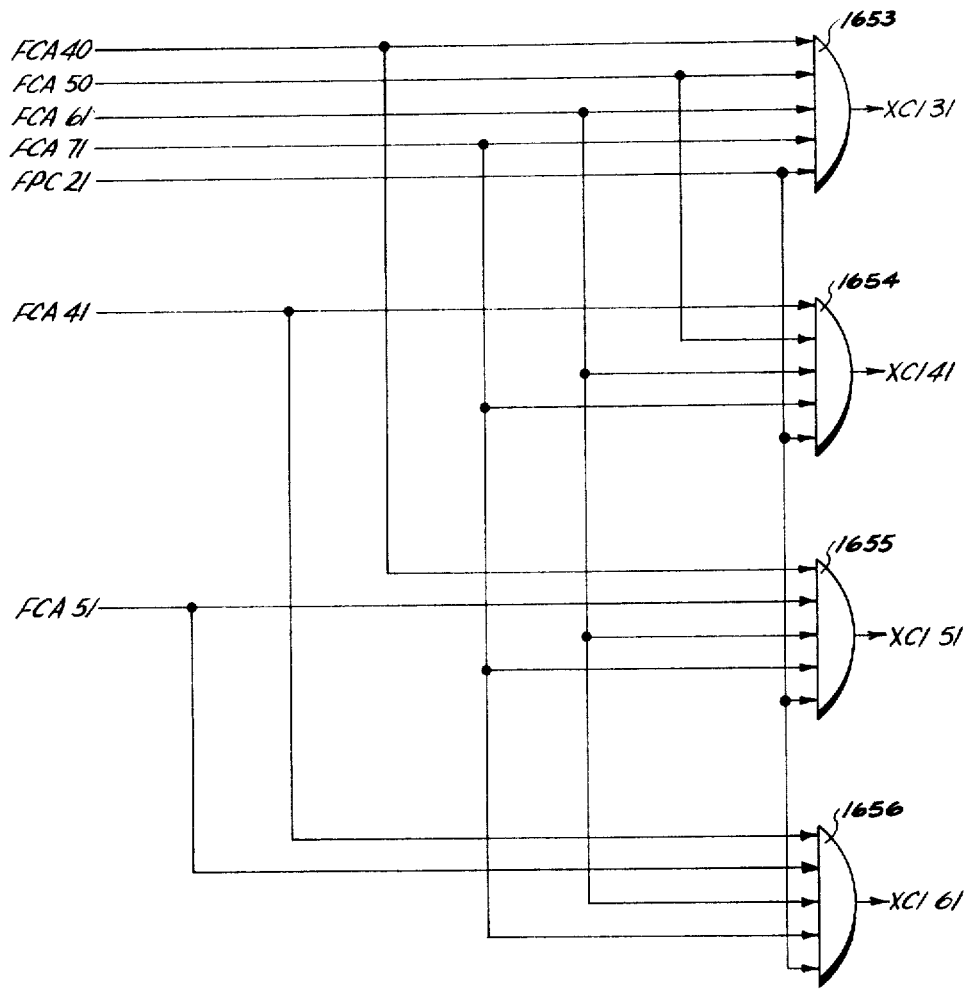
FIG. 176 is a schematic illustration of the decoding circuit for the development of the column address decode signals XC131–XC161.

Referring to FIG. 176, a schematic illustration of the decoding circuits for the development of the typeline buffer column address decode signals XC131–XC161 are shown. The decode circuits of FIG. 176, like those shown in FIGS. 174 and 175, comprise AND-gates 1653–1656, respectively, each connected to receive a designated combination of signals from the Column Address Counter flip-flops FCA4–FCA7, and from the Program Counter flip-flop FPC21.

Figure 177:
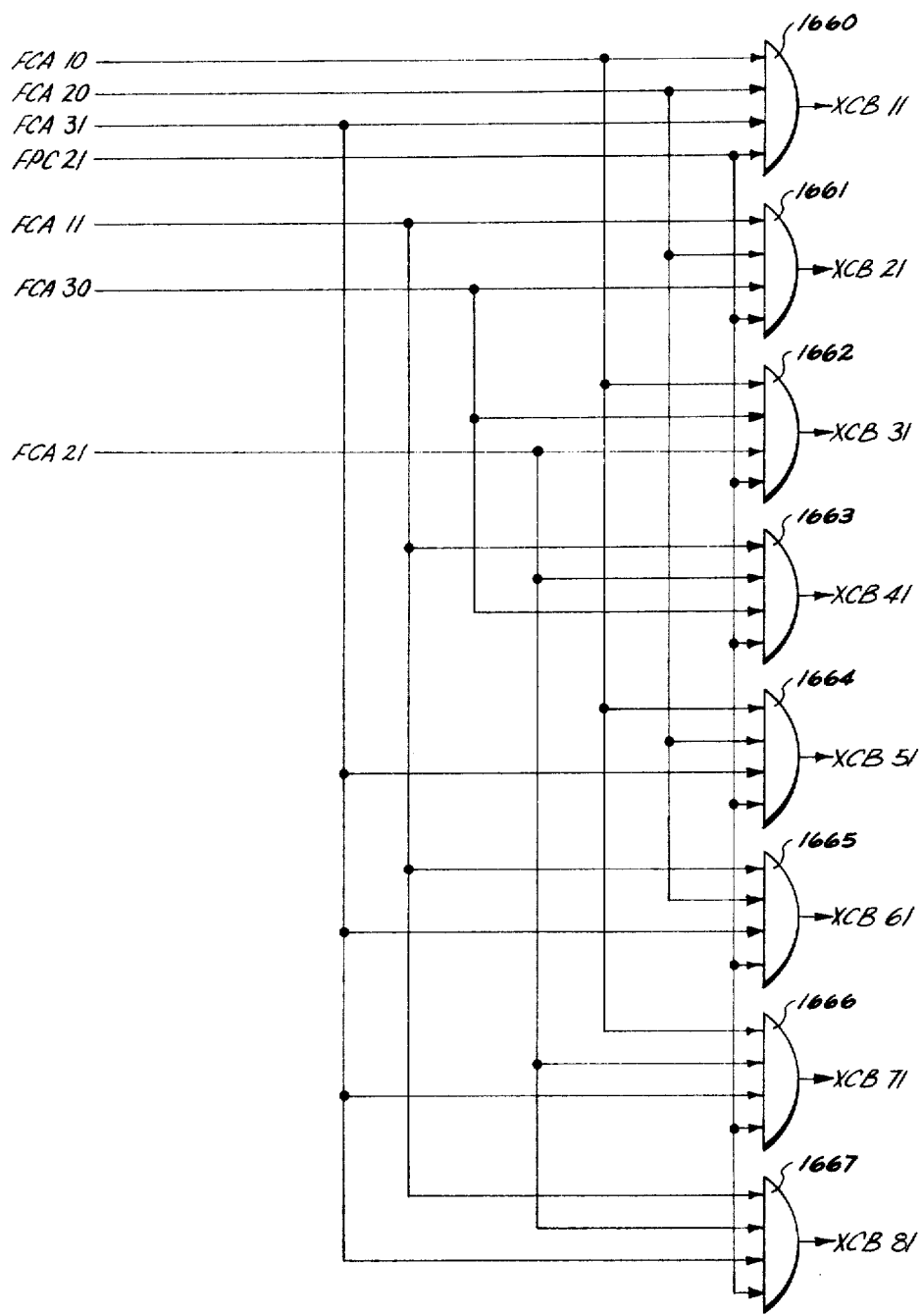
FIG. 177 is a schematic illustration of the development of the column address decode signals XCB11–XCB81.

Referring to FIG. 177, a schematic illustration of the decoding circuits for the development of the decoding signals XCB11–XCB81 is shown. Each of these decoding circuits comprises AND-gates 1660–1667, respectively, and is adapted to receive a predetermined combination of signals from Column Address Counter flip-flops FCA1–FCA3, and from the Program Counter flip-flop FPC21. When the appropriate flip-flop output signals are true, and the Program Counter flip-flop FPC21 yields a true signal at the set output thereof, the decoding circuit receiving four true signals will present a true output signal to thereby enable a column in the typeline buffer to be addressed.

Figure 178:
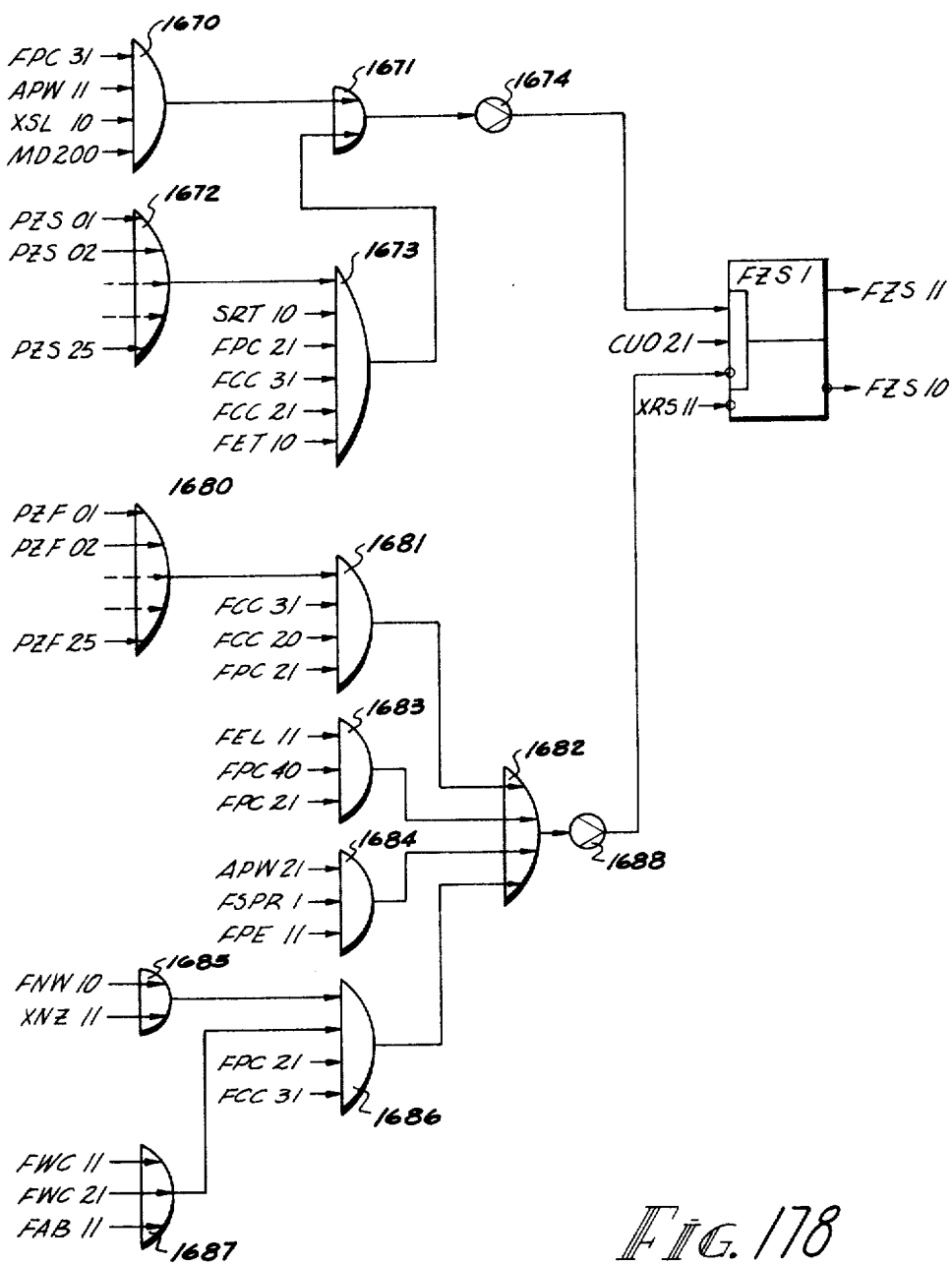
FIG. 178 is a schematic illustration of the Zero Suppress flip-flop FZS1 and the associated logical circuitry.

Referring to FIG. 178, a schematic illustration of the Zero Suppress flip-flop FZS1 is shown. The Zero Suppress flip-flop is utilized to provide a signal when unwanted zeros are to be suppressed of a numeric word. The zero suppression function is active only during the Transfer cycle, and is set by appropriately patching the plugboard in those positions in which the zero suppress function is to be active. When the FZS1 flip-flop is set, the characters to be entered into the zero suppressed plugged positions are inhibited from entering into the typeline buffer if the character is a zero. The Zero Suppress flip-flop is reset either when the plugboard indicates a zero suppress stop or when a non-zero is detected. Of course, the sensing of an alphanumeric word indicates that there are no numeric characters to be received from that word and hence, zero suppression is meaningless; therefore, sensing an alphanumeric word will also reset the Zero Suppress flip-flop. An AND-gate 1672 receives signals from the plugboard zero suppress start plug positions PZS01–PZS25. These plugboard positions are plugged when a zero suppress function is to be performed in that column of the information being printed. Therefore, when a column of print is addressed (that is, when the information to be printed in that column is fed to the typeline buffer), the zero suppression start signal in that column, derived from the plugboard position, will enable the OR-gate 1672 to provide a true signal to an AND-gate 1673. AND-gate 1673, in addition to receiving signals from the OR-gate 1672, also receives signals from the mode selection switch SRT10, the Program Counter flip-flop signal FPC21, the Control Counter flip-flop FCC31 and FCC21, and the End of Transfer Cycle flip-flop signal FET10. Thus, the AND-gate in addition to receiving the zero suppress start signal from the plugboard, via the OR-gate 1672, also requires that certain control counter and program counter conditions obtain before a true signal will be presented by the AND-gate 1673. Also, the mode of operation must be correct for zero suppression (SRT10), and the cycle must be the Transfer cycle (FET10). The logical conjunction of these signals provided by the AND-gate 1673 yields a signal which is applied to an OR-gate 1671 with the signal from the AND-gate 1670. An AND-gate 1670 receives signals from the Program Counter flip-flop FPC31, from the revolution marker pulse amplifier APW11, the slew paper control decode XSL10, and the typeline buffer unload inhibit one-shot MD200. Thus, the AND-gate provides the necessary logical conjunction of signals to set the Zero Suppress flip-flop FZS1. The AND-gate receives signals indicating that the proper program counter count exists, the paper in the print is not being slewed (XSL10) and the mode of operation of the typeline buffer is not currently being changed (MD200). Also, signals from the revolution marker pulse amplifier APW11 indicate that a typewheel revolution marker has been detected. The output of the AND-gate 1670 is provided to the OR-gate 1671. The output of the OR-gate 1671, amplified by an emitter follower 1674, may be applied to the set input terminal of the Zero Suppress flip-flop FZS1, and causes the latter to provide a true signal at its set output terminal FZS11.

The resetting of the Zero Suppress flip-flop FZS1 may be caused by one of four predetermined conditions. The first of these conditions is determined by an OR-gate 1680 in combination with an AND-gate 1681. The OR-gate 1680 receives the plugboard signals PZF01–PZF25. The PZF signals from the plugboard are provided as a means to end the zero suppression function in the respective positions of a line of print. For example, if the zero suppress function is desired in positions 23 to 45 of the 120 character positions of a type line, the zero suppress start terminal of the plugboard would be plugged by the zero suppress start plug PZS01. This plug PZS01 would be plugged to the 22nd buffer exit position on the plugboard. Therefore, when a line of print is being fed to the typeline buffer, for subsequent printing, the 23rd character position would be left blank if the numeric zero were contained therein. The zero suppress function will remain on and all subsequent numeric zeros contained in the character positions after the 23rd character position will result in blanks in the ultimate printed information.

To stop the zero suppress function, in the example chosen for illustration at the 45th of the 120 character positions, a zero suppression stop plug PZF01 would be plugged to the 45th buffer exit position. Thus, after the buffer exit position 45 had been reached, the zero suppression function would no longer obtain, and numeric zeros would be printed as such. Therefore, since there are 25 zero suppress start plugs PZS01–PZS25, and 24 zero suppress stop plugs PZF01–PZF25, the zero suppress function may be plugged into the 120 character buffer exit positions twenty-five times and may be stopped twenty-four times. It is therefore possible to obtain twenty-five separate fields of zero suppression in the 120 character positions.

Thus, the OR-gate 1680 receives signals from the zero suppress plugboard terminals PZF01–PZF24. Before the signal derived from the OR-gate 1680 may be utilized to reset the Zero Suppression flip-flop FZS1, this signal must be conjunctively combined with the control counter signals FCC31 and FCC20, as well as the Program Counter flip-flop FPC21. Therefore, an AND-gate 1681 provides this logical conjunction of these signals to insure that the proper control count and program count exists at the time the zero suppression stop signal is received from the plugboard. The signal provided by the AND-gate 1681 is supplied to an OR-gate 1682.

The second logical signal that may be utilized to reset the Zero Suppression flip-flop FZS1, is developed through an AND-gate 1683 which receives signals from the Program Counter flip-flops FPC40 and FPC21, and receives signals from the End of Line flip-flop FEL11. Therefore, the zero suppression function may not be carried from the end of one line into the next line of print. To inhibit this situation, the End of Line flip-flop FEL1 is connected to the AND-gate 1683, and when the set output signal from the End of Line flip-flop is received (FEL11), the end of line has been detected, and the signal is developed in the AND-gate 1683 to cut off this zero suppression function. The output signal of the AND-gate 1683 is also applied to an OR-gate 1682.

The third logical signal that may be used for resetting the Zero Suppression flip-flop FZS1 is developed in an AND-gate 1684. This AND-gate receives typewheel marker pulse amplifier signal APW21, and signals from the Stop Processing flip-flop FSPR1 and the Print Enable flip-flop FPE11. Output of the AND-gate 1684 is also applied to the OR-gate 1682. The fourth logical signal that may be used for resetting the Zero Suppression flip-flop FZS1 is developed by a logical combination of signals developed through the utilization of OR-gate 1685, AND-gate 1686, and OR-gate 1687. OR-gate 1685 receives signals from the Numeric Word flip-flop FNW10, and from the numeric word non-zero detect decode signal XNZ11. The OR-gate 1685 therefore receives information indicating that the word being processed is an alpha-numeric (non-numeric), and also receives information that if a numeric word is being received, the characters of the word are non-zeros (XNZ11). If the word being processed is not a numeric word, or if it is a numeric word and the characters thereof are not zeros, the Zero Suppression flip-flop FZS must be reset. Therefore, the OR-gate 1685 receives signals indicating these conditions, and applies a signal to an AND-gate 1686. AND-gate 1686 receives this information from the OR-gate 1685 and combines it with the necessary information concerning the location of the detected numeric or non-numeric signals from the OR-gate 1685, and also determines the appropriate control counter and program counter counts to enable a signal to be applied to the Zero Suppress flip-flop FZS1. OR-gate 1687 receives signals from the Word Character Counter flip-flops FWC11 and FWC21, and from the Numeric Word A–B Select flip-flop FAB11. The output of the OR-gate 1687 is applied to the AND-gate 1686 which, in addition to receiving signals from OR-gates 1685 and 1687, also receives signals from the Program Counter flip-flop FPC21 and Control Counter flip-flop FCC31. The output of AND-gate 1686 is also applied to the OR-gate 1682. Thus, signals received from any one of the AND-gates 1681, 1683, 1684 or 1686, will result in a true signal from the OR-gate 1682, amplification of the signal by an emitter follower 1688, and the application of the amplified signal to the reset input terminal of the Zero Suppress flip-flop FZS1. Receipt of this resetting signal will cause the Zero Suppress flip-flop FZS1 to return to the reset state and provide an output reset signal FZS10 to terminate the further zero suppression functions. The Zero Suppress flip-flop also receives a clock signal from the ungated clock driver CU021, and a resetting signal from the reset decode circuit XRS11 applied to the register transfer reset input terminal of the flip-flop.

Figure 179:
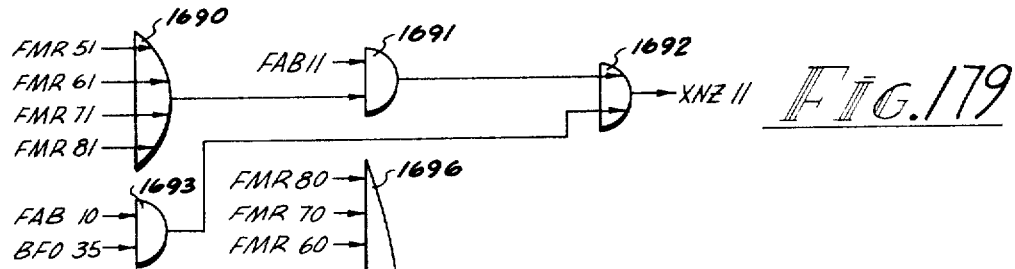
FIG. 179 is a schematic illustration of the decoding circuit for the development of the numeric zero decode signal XNZ11.

Referring to FIG. 179, a schematic illustration of the decoding circuit for the development of the numeric word non-zero detect decode signal XNZ11 is shown. As discussed previously in connection with the Zero Suppress flip-flop FZS1 (FIG. 178), the zero suppression function is to be inoperative even though plugged, and even though a numeric word is received, if the numeric word contains non-zero characters. This indicates that in the Transfer cycle, characters being loaded into the typeline buffer are not to be suppressed unless the particular position into which they are to be loaded has been plugged for the zero suppression function, and if the word being loaded is a numeric, and further, only if the character itself is a zero. Therefore, the numeric word non-zero detect decode shown in FIG. 179, detects the presence of non-zero characters in either half of the eight bit column being presented to the typeline buffer for storage as two successive numeric characters. An OR-gate 1690 is provided for receiving signals from Memory Register flip-flops FMR51, FMR61, FMR71, and FMR81. Thus, if any one of the four flip-flops FMR5–FMR8, are yielding a true indication of a bit being present in the four bit character of the eight bits of information, an indication is thus made that the numeric character being received is a non-zero. Therefore, the OR-gate 1690 receiving this information develops a signal which is combined in an AND-gate 1691 with signals from the Numeric Word A–B Select flip-flop FAB11, and ultimately yields a signal which may be disjunctively combined in an OR-gate 1692 to present the numeric word non-zero detect decode signal XNZ11. The flip-flop signal FAB11 is utilized to indicate that it is the A half of the eight bits of information. That is, the A half of the eight bits of information is a four bit numeric character, and the signal FAB11 indicates that it is the A half or the A character that is a non-zero.

Similarly, an AND-gate 1693 receives signals from the Numeric Word A–B Select flip-flop FAB10, and this signal indicates that it is the B half of the eight bits of information or the B numeric character of four bits. The other signal received by the AND-gate 1693 is the Bus Function BF035. As discussed previously in connection with the Bus Functions, it is frequency convenient to combine certain logical signals at a centralized point within the system and utilize the combined signal throughout the system. The Bus Function BF035 is one such signal. Rather than combine signals from Memory Register flip-flops FMR1–4, these signals have been combined previously and formed into a Bus Function signal BF035 which may be utilized at various points throughout the system without the necessity of providing another OR-gate to combine the four separate signals. Therefore, the AND-gate 1693 is identical to the AND-gate 1691, and the input signals represent the combination of the flip-flop signal FAB10, and an OR-gate signal which, in turn, receives signals indicating the B half of the eight bits of information or the B numeric character of the two numeric characters A and B. The output of the AND-gate 1693 is also applied to the OR-gate 1692. Therefore, if either half of the numeric word represented by the signals received from Memory Register flip-flops FMR5–8 or FMR1–4 is a non-zero, either the AND-gate 1691 or the AND-gate 1693 will be true, and the OR-gate 1692 will yield a signal which is designated as a numeric word non-zero detect decode signal XNZ11.

Figure 180:
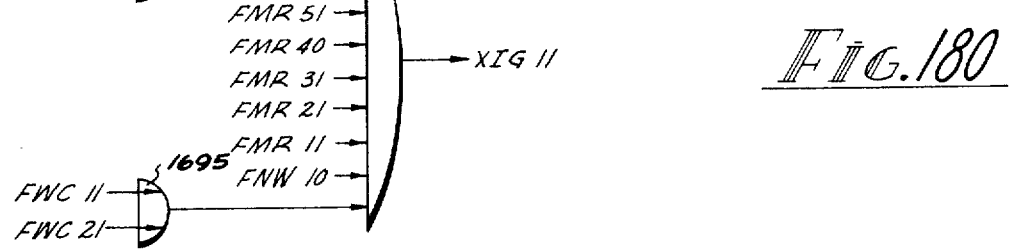
FIG. 180 is a schematic illustration of the decoding circuit for the development of the ignore character code detect signal XIG11.

Referring to FIG. 180, a schematic illustration of the decoding circuit for the development of the ignore character code detect decode signal XIG11 is shown. It is convenient sometimes to load an ignore character into the block buffer. The use of these ignore characters will become more apparent when the operation of the present system is discussed. However, these ignore characters, existing in the block buffer, are not to be loaded into the typeline buffer. Therefore, the ignore character code detect decode circuit XIG1 is utilized to detect these ignore codes and inhibit the advancement of the typeline buffer column address counter FCA. These ignore characters are therefore literally ignored and treated as if no character were present. To detect the ignore code, it is necessary to receive signals from the memory register, and to receive signals from each of the Memory Register flip-flops FMR1–FMR8. Therefore, an AND-gate 1696 is provided for receiving the following memory register signals: FMR80, FMR70, FMR60, FMR51, FMR40, FMR31, FMR21, and FMR11. The AND-gate 1691 also receives signals from the Numeric Word flip-flop FNW10, and from an OR-gate 1695. The OR-gate 1695 is provided for receiving signals from the Word Character Counter flip-flips FWC11 and FWC21. The signals from the word character counter are provided as an indication of the column in which the ignore character is stored. The output of the AND-gate 1696 represents the ignore character code detect decode signal XIG11.

Figure 181:
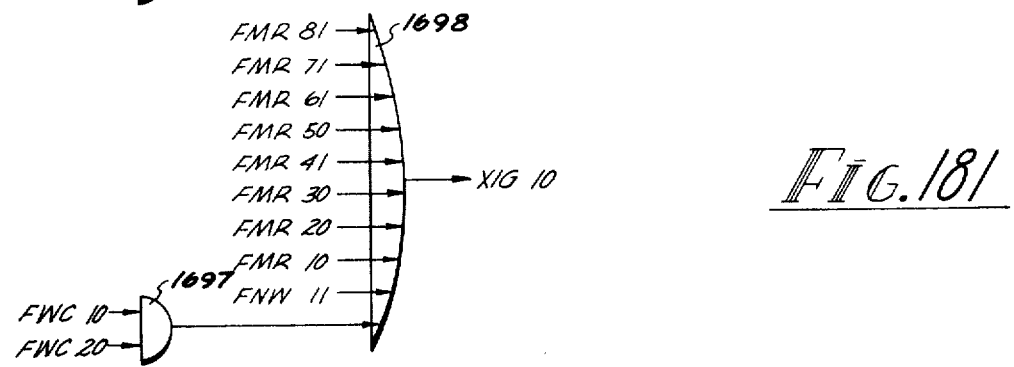
FIG. 181 is a schematic illustration of the decoding circuit for the development of the ignore character code detect signal XIG10.

Referring to FIG. 181, a schematic illustration of the decoding circuit for the development of the ignore character code detect decode signal XIG10 is shown. The signal XIG10 is the logical inverse of the ignore character code detect decode signal XIG11. Therefore, the inputs to the AND-gate 1698 and the OR-gate 1697 are just the logical inverse of those signals received by the AND-gate 1696 and OR-gate 1695 of FIG. 180, respectively.

Figure 182:
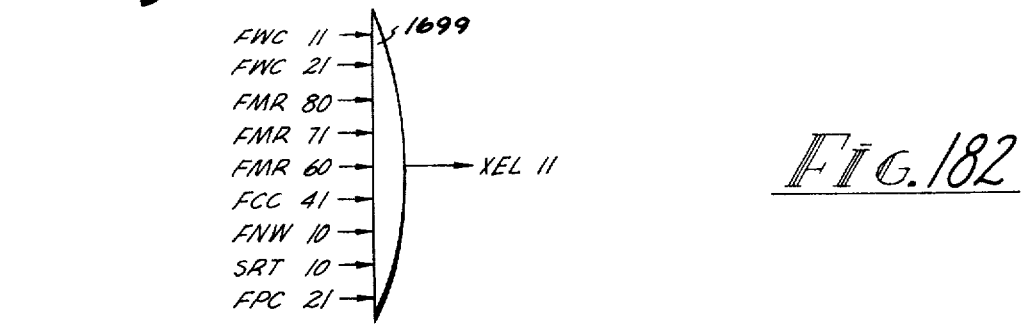
FIGS. 182 and 183 are schematic illustrations of the decoding circuits for the development of the end of line decode signals XEL11 and XEL10, respectively.

Referring to FIG. 182, a schematic illustration of the decoding circuit for the development of the end of line code detect decode signal XEL11 is shown. This decode signal may be utilized to indicate the end of line of information to be printed and therefore stored in the typeline buffer. This code is detected in the least significant character position of an alphanumeric word during the Transfer cycle. Thus, signals must be received from the word character counter to indicate that the code being analyzed is, in fact, in the least significant character position of an alphanumeric word.

Figure 183:
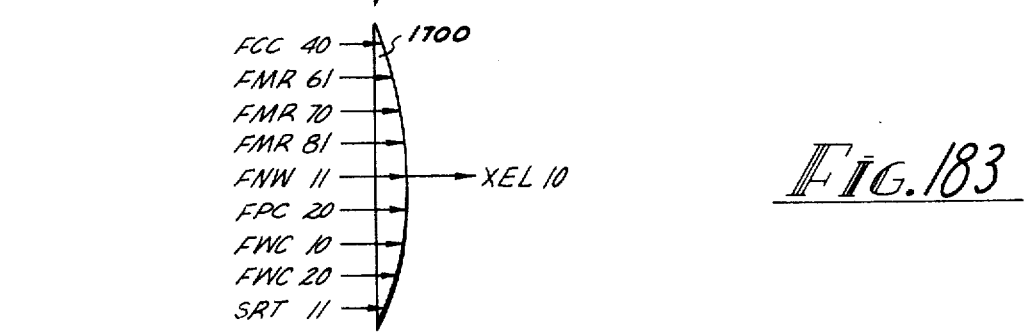

The end of line decode signal is true when an end of line code is detected in the least significant character position of an alphanumeric word. Accordingly, the end of line decode signal XEL11 is developed by providing the logical conjunction of the following input signals in an AND-gate 1699: Word Character Counter flip-flop signals FWC11 and FWC21, Memory Register flip-flop signals FMR80, FMR71, and FMR60, Control Counter flip-flop signal FCC41, Numeric Word flip-flop signal FNW10, mode selection switch signal SRT10, and Program Counter flip-flop signal FPC21. It may be noted that the end of line code is detected by detecting only three bits of the eight bit code representing the end of line code. It is possible to detect an end of line code by detecting merely the first three digits of the code since the end of line code is of the form 010X XXX, and all other command codes having similar form represent commands that include the end of line function. For example, the slew codes are all of the same form, and each represents a function that requires an end of line prior to slew. Therefore, it is unnecessary to detect the entire eight bits of the end of line code to provide the end of line function. Accordingly, the Memory Register flip-flops FMR6, FMR7, and FMR8 are connected to the AND-gate 1699 and provide an indication of the first three bits of the command code to indicate the presence of an end of line code. The logical inversion of the end of line decode signal XEL11 is developed through the utilization of an OR-gate 1700 shown in FIG. 183. Thus, the end of line decode signal XEL11 will be present whenever an end of line code is detected in the least significant character position of an alphanumeric word; whereas, the end of line character decode signal XEL10 will be present at all other times.

Figure 184:
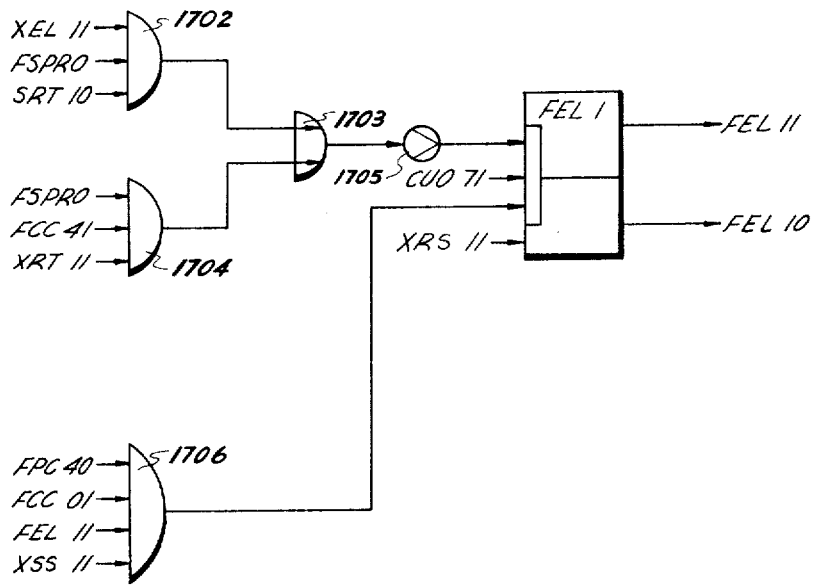
FIG. 184 is a schematic illustration of the End of Line flip-flop FEL1 and the associated logical circuitry.

Referring to FIG. 184, a schematic illustration of the End of Line flip-flop FEL1 is shown. The End of Line flip-flop FEL1 is set upon receipt of signals from the end of line decode circuit XEL1. The set output signal from the End of Line flip-flop FEL1 prevents further operation in the Transfer cycle and allows the Printer Control System to step to the Print cycle. If the Block Buffer Status flip-flop FBS1 is in the reset state, the Fill cycle may be initiated simultaneously with the Print cycle when the End of Line flip-flop FEL1 is set. An AND-gate 1702 is provided for receiving signals from the end of line decode circuit XEL11, the Stop Processing flip-flop FSPR0, and the mode selection switch SRT10. Thus, an end of line code must have been detected by the end of line decode circuit, and the Stop Processing flip-flop must be in the reset state to indicate that the stop processing signal is not present. The logical conjunction of these signals provided by the AND-gate 1702 yields a signal which is applied to an OR-gate 1703 along with signals from a second AND-gate 1704. The second AND-gate 1704 receives signals from the Stop Processing flip-flop FSPR0, the Control Counter flip-flop FCC41, and the unedited mode column address counter reset decode circuit XRT11.

The output of the OR-gate 1703 is amplified in an emitter follower 1705 and applied to the set input terminal of the End of Line flip-flop FEL1. An AND-gate 1706 is provided for receiving Program Counter flip-flop signal FPC40, Control Counter flip-flop signal FCC01, End of Line flip-flop set output signal FEL11, and slew character in store detect decode signal XSS11. The logical conjunction provided by these signals in the AND-gate 1706 yields a signal which is applied to the reset input terminal of the End of Line flip-flop FEL1. Flip-flop FEL1 also receives clock signals from the ungated clock driver CU071, and resetting signals from the reset decode circuit XRS11 applied to the reset register transfer input terminal thereof.

Figure 185:
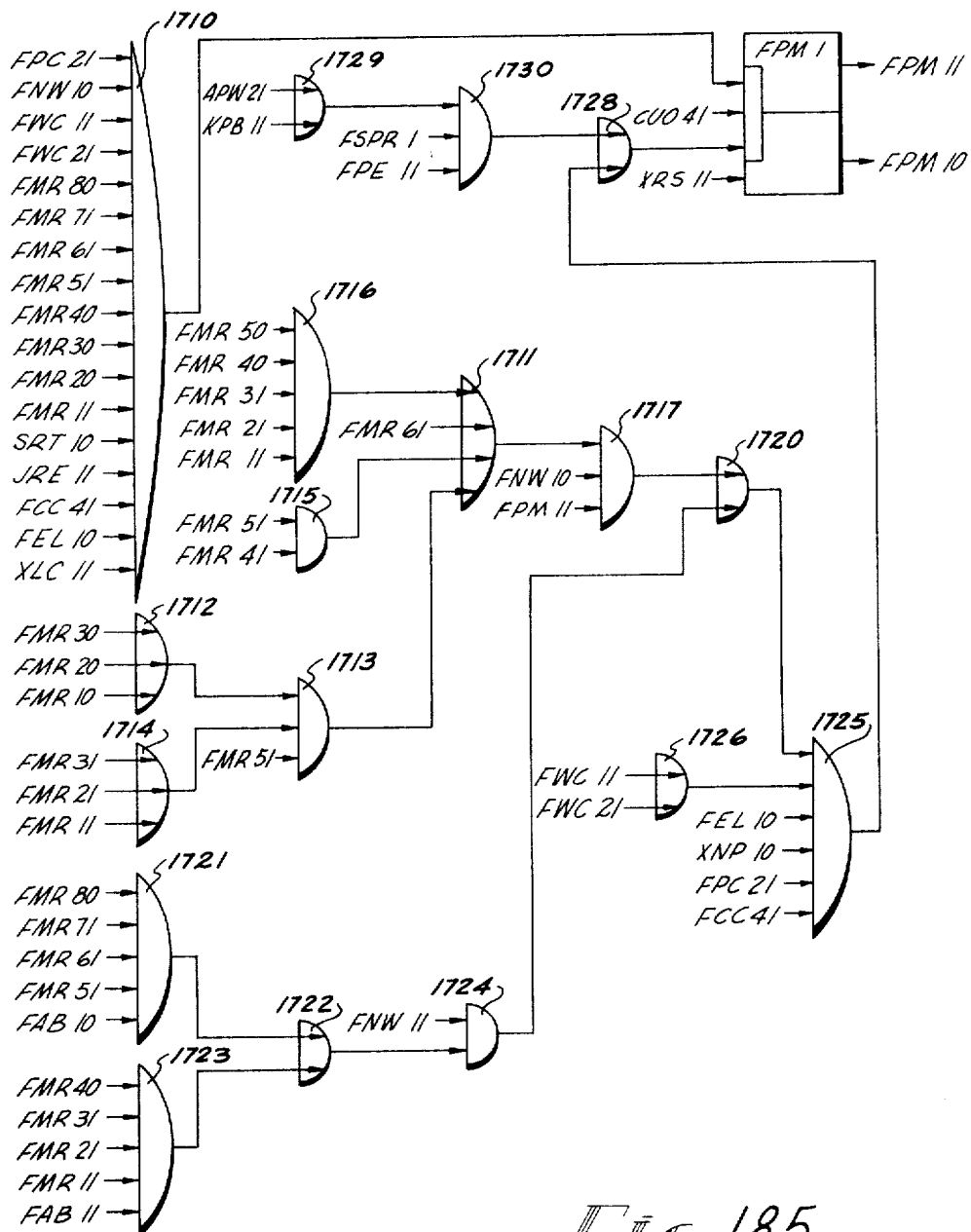
FIG. 185 is a schematic illustration of the Print MICR flip-flop FPM1 and the associated logical circuitry.

Referring to FIG. 185, a schematic illustration of the Print MICR Character flip-flop FPM1 is shown. The Print MICR Character flip-flop FPM1 is set when a print MICR font code is sensed. The set output signal of this flip-flop FPM1 is utilized to gate the revolution marker signals APW2 and the forty-fifth to fifty-eighth character pulse signals immediately following thereafter to permit the printer to print only MICR font characters instead of Gothic characters (the forty-fifth through fifty-eighth characters on each typewheel are MICR font characters). The flip-flop FPM1 is set during the Transfer cycle by the recognition of the proper control character 0111 0001 in the first word of a line of print data. The flip-flop will be reset if an alphanumeric character other than a space is sensed during the Transfer cycle, or when an ampersand is sensed in a numeric word. The flip-flop FPM1 is also reset when the line has been printed. To detect the presence of the print MICR font control character, an AND-gate 1710 is provided for receiving signals of Memory Register flip-flops FMR1–FMR8. In addition to these signals from the Memory Register flip-flops, certain other conditions must be satisfied before the flip-flop FPM1 is set. Accordingly, the AND-gate 1710 also receives signals from the Word Character Counter flip-flops FWC11 and FWC21, the Numeric Word flip-flop signal FNW10, the Program Counter flip-flop signal FPC21, the mode selection switch signal SRT10, the cable signal JRE11, the Control Counter flip-flop signal FCC41, the End of Line flip-flop signal FEL10, and the column address counter lockout count detect decode circuit signal XLC11. The logical conjunction of these signals provided by the AND-gate 1710 yields a signal which is applied to the set input terminal of the Print MICR Character flip-flop FPM1.

An OR-gate 1711 receives signals from the Memory Register flip-flop FMR61 and also receives signals from AND-gates 1713, 1715 and 1716. AND-gates 1716 and 1715 each receive a specific combination of signals from the Memory Register flip-flops FMR1–FMR5. The AND-gate 1713 provides the logical conjunction of the Memory Register flip-flop signal FMR51 and signals from OR-gates 1712 and 1714. Each of the latter OR-gates receives signals from the Memory Register flip-flops FMR1–3. The output of the OR-gate 1711 is applied to an AND-gate 1717 to be conjunctively combined with signals from the Numeric Word flip-flop FNW10 and the set output signal from the Print MICR Character flip-flop FPM11. Output of the AND-gate 1717 is applied to an OR-gate 1720. An AND-gate 1721 is provided for receiving signals from Memory Register flip-flops FMR5, FMR6, FMR7 and FMR8, and for receiving signals from the Numeric Word A–B Select flip-flop FAB10. The output of the AND-gate 1721 is applied to an OR-gate 1722 to be disjunctively combined with signals from an AND-gate 1723. The latter AND-gate receives signals from Memory Register flip-flops FMR1, FMR2, FMR3, and FMR4, and receives the set output signal from the Numeric Word A–B Select flip-flop FAB11. Output of the OR-gate 1722 is conjunctively combined in an AND-gate 1724 with signals from the Numeric Word flip-flop FNW11. Output of the AND-gate 1724 is applied to the OR-gate 1720. OR-gate 1720 yields a signal which is conjunctively combined in an AND-gate 1725 with the Control Counter flip-flop signal FCC41, the Program Counter flip-flop signal FPC21, the non-print character code detect decode circuit signal XNP10, and the End of Line flip-flop signal FEL10. The AND-gate 1725 also receives a signal from an OR-gate 1726 which provides the logical OR of Word Character Counter flip-flop signals FWC11 and FWC21. The output of the AND-gate 1725 is applied to an OR-gate 1728 prior to its application to the reset input terminals of the Print MICR Character flip-flop terminal FPM1. The second input to the OR-gate 1728 is derived from an OR-gate 1729 which receives typewheel marker pulse amplifier signals APW21, and power turn on buffer clear relay signal KPB11. This OR-gate yields a signal which is conjunctively combined in an AND-gate 1730 with the Print Enable flip-flop signal FPE11, and the Stop Processing flip-flop signal FSPR1. After the logical conjunction provided by the AND-gate 1730, this signal is applied to the OR-gate 1728 and subsequently to the reset input terminal of the Print MICR Character flip-flop FPM1. The flip-flop FPM1 also receives clock signals from the ungated clock driver CU041, and resetting signals from the reset decode circuit XRS11, applied to the reset register transfer input terminal thereof.

Referring to FIG. 186, a schematic illustration of the decoding circuit for the development of the reset decode signal XRS11 is shown. The reset decode signal XRS11 is developed through the logical conjunction of Bus Function signal BF033, Memory Register flip-flop signal FMR50, Program Counter flip-flop FPC40, and Control Counter flip-flop signal FCC41 in an AND-gate 1735. The logical conjunction of these signals, provided by the AND-gate 1735, yields a signal, when amplified by an emitter follower 1736, and represents the reset decode circuit signal XRS11.

Referring to FIG. 187, a schematic illustration of the Program Slew Character Detect flip-flop FPS1 is shown.

The Program Slew Character Detect flip-flop is utilized to determine whether a programmed slew code has been sensed and, to indicate that a plugboard slew should be utilized if a programmed slew code is not detected. The Program Slew Character Detect flip-flop FPS1 is reset at the end of the Slew cycle. This flip-flop is described here in connection with the Transfer cycle in that the presence of the programmed slew code is determined during the Transfer cycle. AND-gate 1737 receives signals from Memory Register flip-flops FMR31, FMR21 and FMR11. The logical conjunction of these signals yields a signal which is once again conjunctively combined in an AND-gate 1738 with the reset decode circuit signal XRS11. The output of the AND-gate 1738 is amplified in an emitter follower 1739 and applied to the set input terminal of the Program Slew Character Detect flip-flop FPS1. The flip-flop FPS1 receives clock signals from the master clock driver CMD21, and receives resetting signals at the reset input terminal thereof from the Bus Function signal BF031. The flip-flop also receives resetting signals from the reset decode circuit XRS11 applied to the register transfer reset input terminal thereof.

Referring to FIG. 188, a schematic illustration of the Stop Processing flip-flop FSPR is shown. This flip-flop is utilized to produce a signal when a slew code is detected and the Slew cycle for the previous line of print has not been completed. This signal causes the Printer Control System to stop the Transfer cycle until the Slew cycle is complete and allows the new slew code to be stored. An OR-gate 1741 is provided for receiving the Program Counter flip-flop signal FPC41, slew decelerate delay one-shot signal MD701, Automatic Slew flip-flop signal FAS11, Last Paper Form flip-flop signal FLPF1, and Mechanism Error flip-flop signal FME11. The output of the OR-gate 1741 is applied to an AND-gate 1742. AND-gate 1742 also receives signals from an AND-gate 1743, which receives Control Counter flip-flop signals FCC31 and FCC20, through an OR-gate 1744 which also receives Control Counter flip-flop signal FCC41. AND-gate 1742 also receives Program Counter flip-flop signal FPC21. An AND-gate 1747 provides the logical conjunctive of signals received from the Memory Register flip-flops FMR80, FMR71 and FMR60, Word Character Counter flip-flops FWC11 and FWC21, Numeric Word flip-flop FNW10, and mode selection switch SRT10. The logical conjunction of these signals provided by the AND-gates 1745 is applied to an OR-gate 1746 along with the reset decode circuit signal XRS11. The output of the OR-gate 1746 is also applied to the AND-gate 1742. AND-gate 1742 supplies the logical conjunctive of the input signals thereto to an OR-gate 1740 with signals from the stop print detect decode circuit XSP11. Output of the OR-gate 1740 is applied to the set input terminal of the Stop Processing flip-flop FSPR. An inverter circuit 1749 also receives signals from the OR-gate 1740, and inverts the signals provided by the OR-gate to be applied to the reset input terminal of the flip-flop FSPR. Therefore, when the logical conditions shown to the left of the OR-gate 1740 in FIG. 188 obtain, a true signal is applied to the flip-flop FSPR causing the latter to assume a set state upon the application of the next ungated clock pulse from the ungated clock driver CU041. Simultaneously, the true signal supplied by the OR-gate 1740 is inverted by the inverter 1749 to provide a pulse signal to the reset input terminal of the flip-flop FSPR. When the signal provided by the OR-gate 1740 goes false, the output of the inverter circuit 1749 goes true. Therefore, the flip-flop FSPR will return to the reset state.

Figure 189:
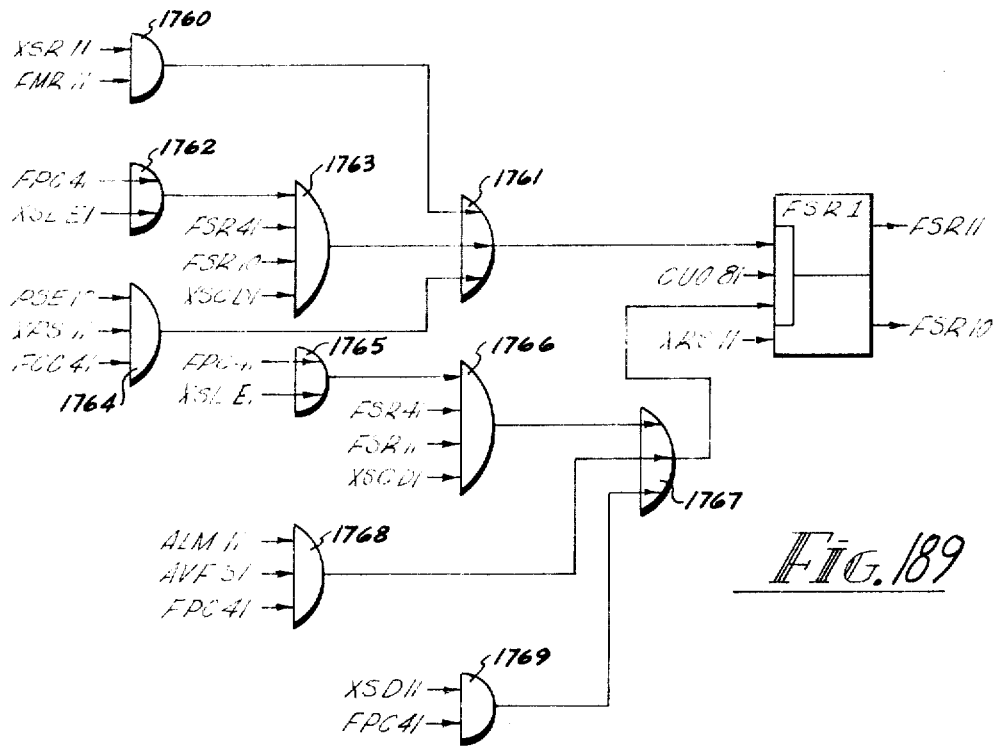
FIGS. 189–192 are schematic illustrations of the Slew Register flip-flops FSR1–FSR4 and the associated logical circuitry.

FIGS. 189–192 are schematic illustrations of the Slew Code Register flip-flops FSR1–4. The four flip-flops comprising the slew code register store the slew information pertaining to the completion of the line in process. The particular slew code is determined by the state of the fourth Slew Register flip-flop FSR4. It is the latter flip-flop that determines whether the slew code is a slew N line code (0100 1XXX) or the slew to code N code (0100 0XXX). If no slew code is detected for the line in process, a slew code is entered from the plugboard slew hubs. Thus, when the Slew Code Register flip-flop FSR4 is set, the set signal presented thereby indicates that the Slew cycle is to progress in the slew N lines mode and causes the first three Slew Code Register flip-flops FSR1–3 to operate as a binary counter. When the flip-flop FSR4 is reset, the slew to code N decode logic is enabled. Referring to FIG. 189, an AND-gate 1760 receives signals from the Memory Register flip-flop FMR11, and slew code detect decode circuit signal XSR11. The logical conjunction of these signals provided by the AND-gate 1760 yields a signal which is applied to an OR-gate 1761. An OR-gate 1762 receives Program Counter flip-flop signal FPC41, and slew entry detect decode signal XSLE1. The output of the OR-gate 1762 is applied to an AND-gate 1763 to be conjunctively combined with signals from Slew Code Register flip-flops FSR41, and FSR10, and slew countdown gate decode detect signal XSCD1. The output of the AND-gate 1763 is also applied to the OR-gate 1761. An AND-gate 1764 receives the plugboard signal PSE10 (the signal indicating the number of lines to be slewed as plugged on the plugboard), the plugboard slew entry enable decode circuit signal XPS11, and the Control Counter flip-flop signal FCC41. Output of the AND-gate 1764 is also applied to the OR-gate 1761. The output of the OR-gate 1761 is applied to the set input terminal of the Slew Code Register flip-flop FSR1.

The resetting input signal to the Slew Code Register flip-flop FSR1 is provided by a plurality of logical gates including an OR-gate 1765 connected to receive Program Counter flip-flop signal FPC41, and the slew entry detect decode circuit XSLE1. Output of the OR-gate 1765 is applied to an AND-gate 1766 to there be conjunctively combined with Slew Code Register flip-flop signals FSR41, and FSR11, and slew countdown gate decode circuit signal XSCD1. The signal provided by the AND-gate 1766 is applied to an OR-gate 1767. The latter also receives signals from AND-gates 1768 and 1769. AND-gate 1768 conjunctively combines signals received from the line marker pulse amplifier ALM11, the vertical format signal amplifier AVF51, and the Program Counter flip-flop signal FPC41. AND-gate 1769 receives Program Counter flip-flop signal FPC41, and the slew completed detect decode circuit signal XSD11. The output of the OR-gate 1767 is applied to the reset input terminal of the flip-flop FSR1. The flip-flop FSR1 also receives clock signals from the ungated clock driver CU081, and resetting signals from the reset decode circuit XRS11 applied to the reset register transfer input terminal thereof.

Figure 190:
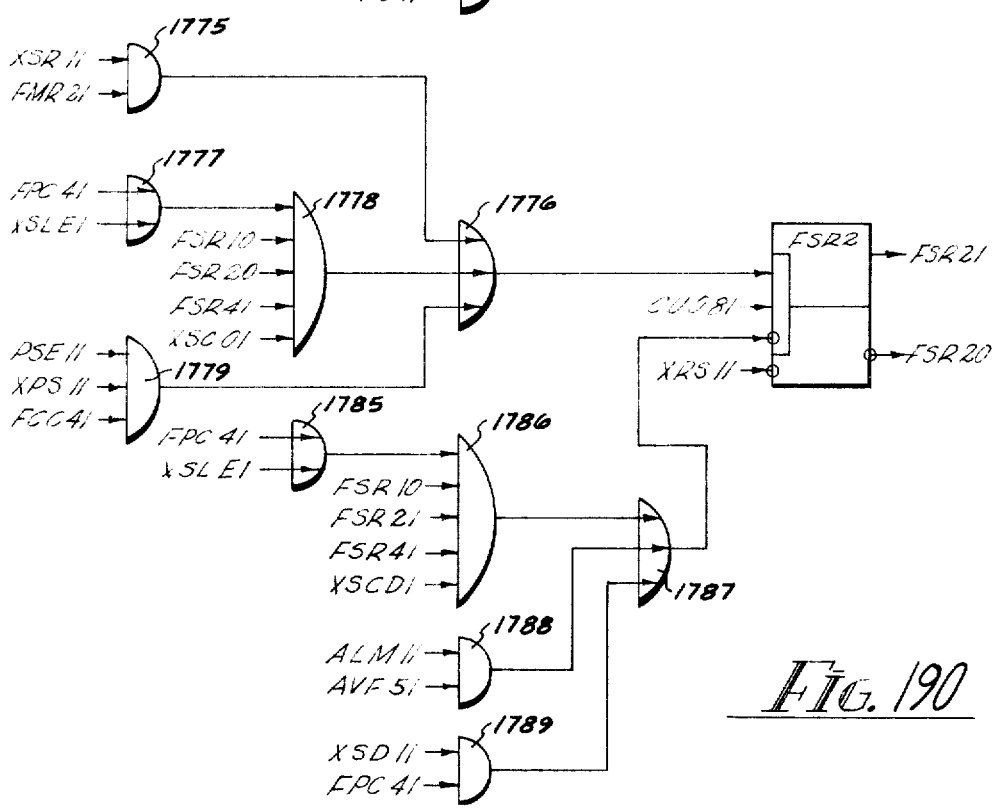

Referring to FIG. 190, the Slew Code Register flip-flop FSR2 is shown. An AND-gate 1775 provides the logical conjunction of signals received from the slew code detect decode circuit XSR11, and the Memory Register flip-flop signal FMR21. The signal provided by AND-gate 1775 is applied to an OR-gate 1776 which also receives signals from AND-gates 1778 and 1779. AND-gate 1778 receives signals from an OR-gate 1777 which, in turn, is connected to receive the Program Counter flip-flop signal FPC41 and the slew entry detect decode circuit signal XSLE1. AND-gate 1778 also receives Slew Code Register flip-flop signals FSR10, FSR20 and FSR41, and the stop code detect decode circuit signal XSC01. AND-gate 1779 receives the plugboard slew signal PSE11, the plugboard slew entry enable decode circuit signal XPS11, and the Control Counter flip-flop signal FCC41. The output of the OR-gate 1776 is applied to the set input terminal of the Slew Code Register flip-flop FSR2.

An OR-gate 1785 receives Program Counter flip-flop signal FPC41 and slew entry detent decode circuit signal XSLE1. The signal provided by the OR-gate 1785 is conjunctively combined in an AND-gate 1786 with Slew Code Register flip-flop signals FSR10, FSR21, and FSR41, and with slew countdown gate decode detect circuit signal XSCD1.

Output of the AND-gate 1786 is applied to an OR-gate 1787 where it is disjunctively combined with signals from AND-gates 1788 and 1789. AND-gate 1788 provides logical conjunction of the signals from the line marker pulse amplifier ALM11, and the vertical format signal amplifier AVF51. AND-gate 1789 provides similar logical conjunction between signals received from the Program Counter flip-flop FPC41, and the slew completed detect decode circuit XSD11. Output of the OR-gate 1787 is applied to the reset input terminal of the Slew Code Register flip-flop FSR2. The flip-flop FSR2 also receives ungated clock signals from the ungated clock driver CU081, and resetting signals from the reset decode circuit XRS11 applied to the reset register transfer input terminal thereof.

Referring to FIG. 189, a schematic illustration of the Slew Code Register flip-flop FSR3 is shown. An AND-gate 1795 conjunctively combines signals from the slew code detect decode circuit XSR11 and the Memory Register flip-flop FMR31. The logical conjunctive of these signals provided by the AND-gate 1795 is applied to the set input terminal of the flip-flop FSR3. The reset input signal applied to the flip-flop FSR3 is derived through the utilization of an OR-gate 1796 which receives signals from the Program Counter flip-flop FPC41, and the slew entry detect decode circuit XSLE1, which, in turn, applies the output signal thereof to an AND-gate 1797. AND-gate 1797, in addition to receiving signals from the OR-gate 1796, receives Slew Code Register flip-flop signals FSR10, FSR20, FSR31, and FSR41, and also receives signals from the slew countdown gate decode circuit signal XSCD1. The output of the AND-gate 1797 is applied to an OR-gate 1798 wherein the signal provided thereby is disjunctively combined with the output of an AND-gate 1799 and the slew completed detect decode circuit signal XSD11. The AND-gate 1799 provides the logical conjunction of signals received from the Program Counter flip-flop FPC41, the vertical format signal amplifier AVF51, and the line marker pulse amplifier ALM11. The output of the OR-gate 1798 is applied to the reset input terminal of the Slew Code Register flip-flop FSR3. The flip-flop FSR3 also receives signals from the ungated clock driver CU081, and resetting signals from the reset decode circuit XRS11 applied to the reset input register transfer terminal thereof.

Figures 191, 192:
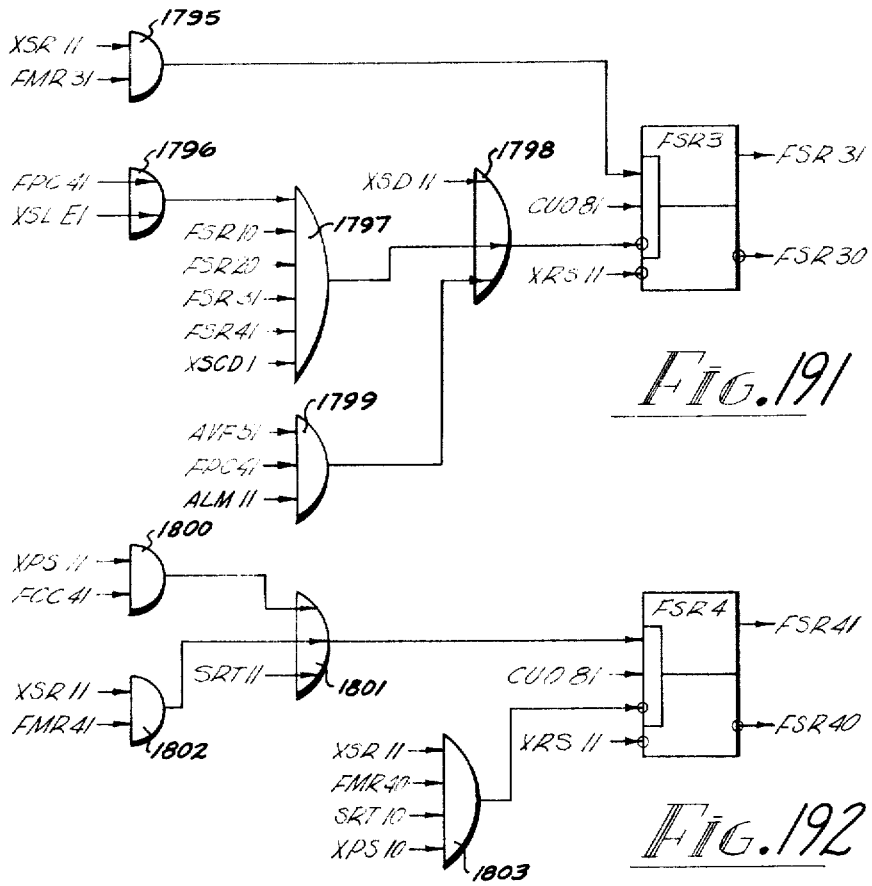

Referring to FIG. 192, a schematic illustration of the Slew Code Register flip-flop FSR4 is shown. It is this Slew Code Register flip-flop that determines the particular mode of slew code that was sensed. The flip-flop FSR4 will thus assume the set state when the particular code detected is a slew N lines code, and will assume the reset state when a slew to code N is detected. The flip-flop is set by a signal received from an OR-gate 1801 which provides the logical operation of disjunction upon signals received from AND-gates 1800 and 1802 and from the mode selection switch SRT11. The AND-gate 1800 provides the logical conjunctive of signals received from the Control Counter flip-flop FCC41, and the plugboard slew entry enable decode circuit XPS11. The AND-gate 1802 provides the logical conjunctive of signals received from the Memory Register flip-flop FMR41 and the slew code detect decode circuit XSR11. The resetting signal applied to the reset input terminal of the Slew Code Register flip-flop FSR4 is derived from an AND-gate 1803. This AND-gate provides the logical conjunctive of signals received from the mode selection switch SRT10, the Memory Register flip-flop signal FMR40, the plugboard slew entry enable decode circuit signal XPS10, and the slew code detect decode circuit signal XSR11. The flip-flop FSR receives clock signals from the ungated clock driver CU081 and also receives resetting signals from the reset decode circuit XRS11 applied to the reset register transfer input terminal thereof.

Figure 193:
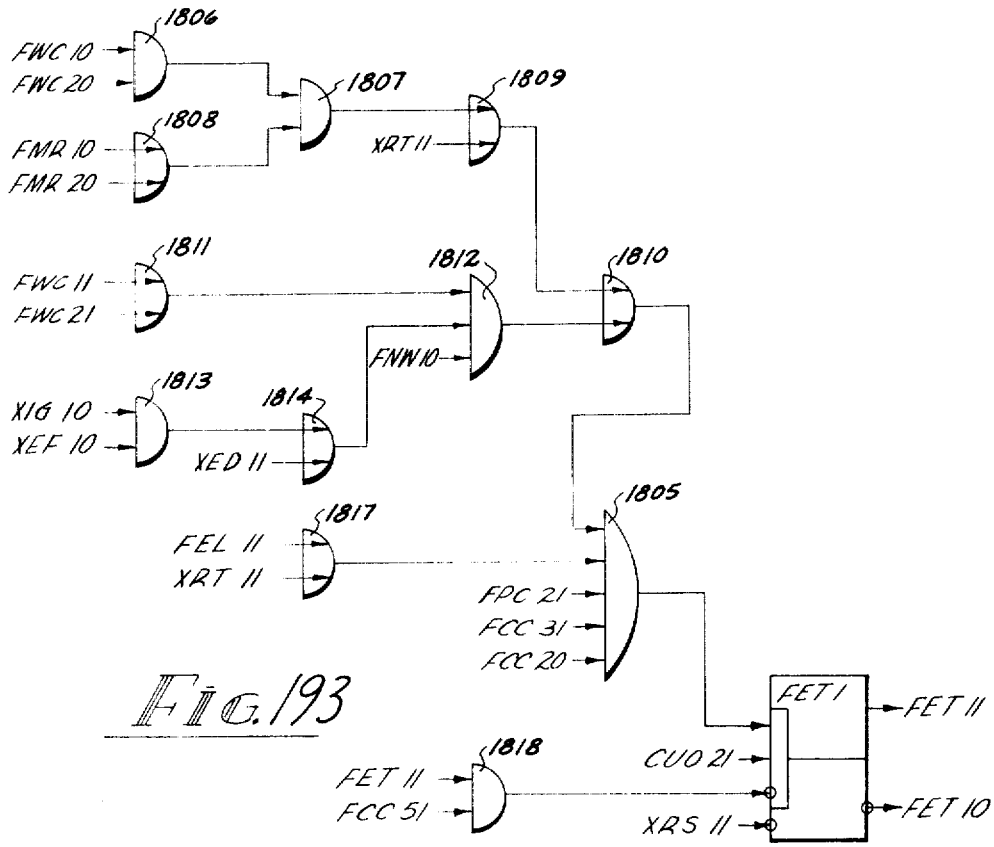
FIG. 193 is a schematic illustration of the End of Transfer flip-flop FET1 and the associated logical circuitry.

Referring to FIG. 193, a schematic illustration of the End of Transfer cycle flip-flop FET1 is shown. The End of Transfer cycle flip-flop FET1 is set when an end of line code has been detected during the Transfer cycle and the next character unloaded from the block buffer is a numeric word, an end of data character, or a non-ignore alphabetic character. When set, the End of Transfer flip-flop FET1 provides a set output signal FET11 that is utilized to determine whether the block buffer is to be filled during the succeeding Print cycle. An AND-gate 1806 provides the logical conjunctive of signals applied thereto from the Word Character Counter flip-flops FWC10 and FWC20. The output of the AND-gate 1806 is applied to an AND-gate 1807. AND-gate 1807 also receives signals from an OR-gate 1808 which, in turn, provides the logical disjunctive function for signals received from Memory Register flip-flops FMR10 and FMR20. The output of the AND-gate 1807 is applied to an OR-gate 1809 which also receives signals from the unedited mode column address counter reset decode circuit XRT11. The output of the OR-gate 1809 is applied to an OR-gate 1810 which also receives signals from an AND-gate 1812. OR-gate 1811 receives signals from the Word Character Counter flip-flops FWC11 and FWC21. The output of the OR-gate 1811 is applied to the AND-gate 1812. AND-gate 1813 receives signals from the end of file code detect decode circuit XEF10, and the ignore character code detect decode circuit signal XIG10. The logical conjunctive of these two signals provided by the AND-gate 1813 is applied to an OR-gate 1814 wherein the signal is logically disjunctively combined with a signal from the buffer end of data code detect decode XED11. The output of the OR-gate 1814 is also applied to the AND-gate 1812. Therefore, AND-gate 1812 provides the logical conjunctive of signals received from the OR-gate 1811, the OR-gate 1814, and the Numeric Word A-B flip-flop FNW10.

The output of the OR-gate 1810 is applied to an AND-gate 1805. The output of this AND-gate, which forms the set input signal to the End of Transfer flip-flop FET1, in addition to receiving signals from the OR-gate 1810, also receives signals from the OR-gate 1817 and signals from the Program Counter flip-flop FPC21 and the Control Counter flip-flops FCC31 and FCC20. The OR-gate 1817 receives End of Line flip-flop signal FEL11, and the unedited mode column address counter reset decode circuit signal XRT11.

The resetting signal applied to the reset input terminal of the End of Transfer flip-flop FET1, is derived from an AND-gate 1818 which provides the logical conjunctive of signals received from the Control Counter flip-flop FCC51, and from the End of Transfer flip-flop itself. This latter signal is the set output signal FET11. The flip-flop FET1 also receives clock signals from the ungated clock driver CU021, and resetting signals from the resetting decode circuit XRS11 applied to the reset register transfer input terminal thereof.

Figure 194:
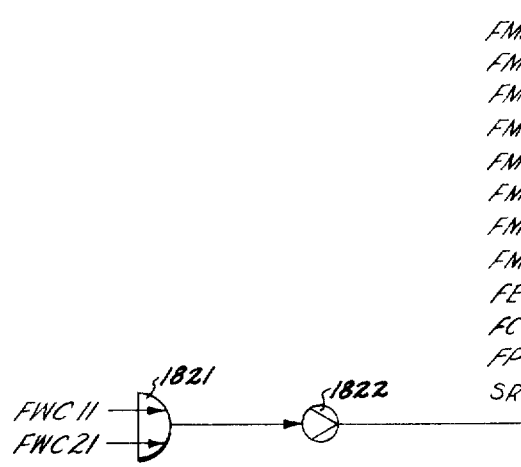
FIG. 194 is a schematic illustration of the decoding circuit for the development of the buffer end of data code detect signal XED11.

Referring to FIG. 194, a schematic illustration of the decoding circuit for the development of the decoding signal XED11 is shown. The block buffer end of data code detect decode XED1, shown in FIG. 194, is utilized to detect the fact that all of the useful data stored in the block buffer has been unloaded when this data comprises less than 400 characters (the capacity of the block buffer). This code, 0000 1111, is thus a special code that may be utilized to load the block buffer when less than 400 characters are being stored during the Fill cycle. When this special code is detected in any character position of a word (with the exception of the 0 or control column which may have any code configuration), the end of data code signal XED11 is produced. This signal is derived from the utilization of an AND-gate 1820 which receives signals from the Memory Register flip-flops FMR1-8 to indicate the code, and also receives signals from the END of Line flip-flop FEL11 (the special code must occur only when a complete line has been stored), the Control Counter flip-flop FCC41, the Program Counter flip-flop FPC21, the mode selection switch SRT10, and a signal from the OR-gate 1821. OR-gate 1821 receives signals from the Word Character Counter flip-flops FWC11 and FWC21, and provides a signal which is amplified in an emitter follower 1822 prior to the application of this signal to the AND-gate 1820. The World Character Counter flip-flops FWC11 and FWC21 provide a signal that indicates that the character being sensed is not in the 0 column and therefore is not a control column character. The signal thus provided by the AND-gate 1820 represents the block buffer end of data code detect decode circuit signal XED11.

Referring to FIG. 195, a schematic illustration of the Block Buffer Status Follower flip-flop FBSF is shown. The Block Buffer Status Follower flip-flop is utilized as a memory to store the state of the block buffer during error recovery modes. The set state of this flip-flop is established at the end of the Transfer cycle and after the Block Buffer Status Follower flip-flop FBS1 assumes the set state. During an error recovery mode, it is frequently necessary to remember whether the block buffer had been completely unloaded on the preceding line of print before an error was discovered. Thus, the Block Buffer Status Follower flip-flop FBSF is utilized to store the state of the block buffer at the end of the Transfer cycle. An AND-gate 1825 receives signals from the Block Buffer Status Follower flip-flop FBS11, and End of Line flip-flop FEL11, the Control Counter flip-flop FCC01, and the slew character in store detect decode circuit 5SS11. The logical conjunctive of these signals provided by the AND-gate 1825 yields a signal which is applied to the set input terminal of the flip-flop FBSF. An AND-gate 1826 provides a resetting signal to be applied to the reset input terminal of the FBSF flip-flop. This AND-gate, 1826, receives the same signals as the AND-gate 1825 with the exception of the Block Buffer Status Follower flip-flop FBS1. In the case of AND-gate 1825, the set state of the Block Buffer Status Follower flip-flop was sensed by the receipt of the signal FBS11; in the case of the AND-gate 1826, the reset state of the Block Buffer Status Follower flip-flop is detected by the receipt of the signal FBS10. The Block Buffer Status Follower flip-flop FBSF also receives a clock signal from the ungated clock driver CU121, and a resetting signal from the reset decode circuit XRS11 applied to the reset register transfer input terminal thereof.

Figure 196:
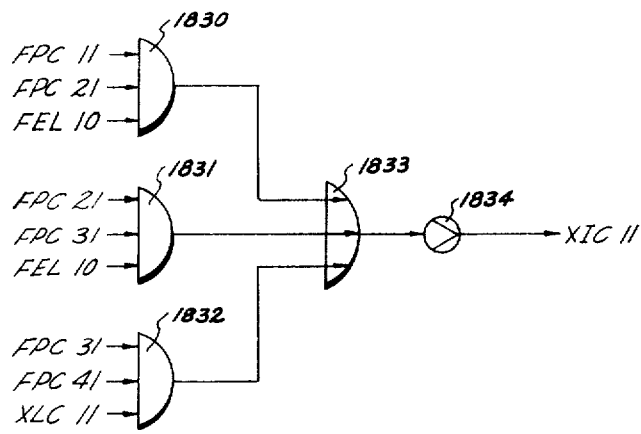
FIG. 196 is a schematic illustration of the decoding circuit for the development of the program counter error decode signal XIC11.

Referring to FIG. 196, a schematic illustration of the decoding circuit for the development of the program counter error decoding signal XIC11 is shown. The program counter error decode circuit shown in FIG. 196 is utilized to detect invalid combinations of program counts of the Program Counter flip-flops FPC1-4. The signal XIC11, if true (indicating a program counter error), will cause the Buffer Error flip-flop to become set. The illegal combinations of program counter signals is detected by three AND-gates 1830, 1831 and 1832, each of which detects a specific illegal combination. AND-gate 1830 receives Program Counter flip-flop signals FPC11 and FPC21, and End of Line flip-flop signal FEL10. AND-gate 1831 receives Program Counter flip-flop signals FPC21 and FPC31, and End of Line flip-flop signal FEL10. AND-gate 1832 receives Program Counter flip-flop signals FPC31 and FPC41, and receives the column address counter lockout count detect decode circuit signal XLC11. The logical conjunctive of the input signals applied to each of the AND-gates yields a signal which is presented to the input of an OR-gate 1833. The output of the OR-gate 1833, appropriately amplified by an emitter follower 1834, represents the program counter error decode signal XIC11.

Print-slew cycle components

Those components of the Multiple Font High Speed Printer Control System of the present invention which operate principally during the Print and Slew cycles may now be described. These components provide signals which may be utilized throughout the Printer Control System during the Print and Slew cycles as well as the Fill and Transfer cycles; however, since their functions are principally designed to provide control signals during the printing and slewing of the printing system being controlled, the description of these components may logically be given here.

Before describing the Print and Slew cycle components of the Printer Control System, a brief description of a typical printer for which the present Multiple Font High Speed Printer Control System may be utilized as the control media may be given here. A typical typeline or printer mechanism is shown schematically in FIG. 20 at 555. Referring to FIG. 20, 120 print wheels 556 are shown connected to a common shaft so that each of the print wheels may be rotated in unison. Alternatively, the 120 print wheels may be replaced by a single cylindrical drum having 120 sectors thereon. Each of the print wheels, or sectors, have spaced about the periphery thereof engravings of characters that are to be printed. Thus, each print wheel or cylinder sector will have alphanumeric, numeric, special characters, and in the case chosen for illustration, MICR characters in E13B font. The following table illustrates the 58 characters spaced about the periphery of each typewheel in the particular embodiment chosen.

TYPEWHEEL CHARACTER SEQUENCE

| Character Position | Gothic | Character Position | MICR |
|---|---|---|---|
| 1 | 0 | 45 | 0 |
| 2 | 1 | 46 | 1 |
| 3 | 2 | 47 | 2 |
| 4 | 3 | 48 | 3 |
| 5 | 4 | 49 | 4 |
| 6 | $ | 50 | ▪ |
| 7 | , | 51 | ▪▪▪ |
| 8 | & | 52 | 5 |
| 9 | 5 | 53 | 6 |
| 10 | 6 | 54 | 7 |
| 11 | 7 | 55 | 8 |
| 12 | 8 | 56 | 9 |
| 13 | 9 | 57 | ▪ |
| 14 | . | 58 | ▪▪ |
| 15 | * | | |
| 16 | A | | |
| 17 | B | | |
| 18 | C | | |
| 19 | D | | |
| 20 | % | | |
| 21 | E | | |
| 22 | F | | |
| 23 | G | | |
| 24 | H | | |
| 25 | I | | |
| 26 | J | | |
| 27 | K | | |
| 28 | L | | |
| 29 | M | | |
| 30 | N | | |
| 31 | O | | |
| 32 | P | | |
| 33 | Q | | |
| 34 | R | | |
| 35 | — | | |
| 36 | / | | |
| 37 | S | | |
| 38 | T | | |
| 39 | U | | |
| 40 | V | | |
| 41 | W | | |
| 42 | X | | |
| 43 | Y | | |
| 44 | Z | | |

In addition to the 120 print wheels or cylinder sectors, two wheels or sectors 557 and 558 are provided as means for detecting when a particular character is coming beneath the print hammers (character pulse wheel 557), and when the print wheels have made a complete revolution (revolution marker wheel 558). The print wheels are aligned so that all characters of a given description come beneath corresponding print hammers at the same time; that is, all A's, B's, C's . . . etc. on all of the print wheels will come beneath the corresponding print hammer at the same time. Thus, for example, if it is desired to print the letter A in the 5th and 20th columns, the revolution marker pulse must be detected and the number of character pulses detected thereafter counted so that the precise moment that the character A comes beneath the print hammers, the 5th and 20th print hammers may be energized and caused to strike the paper (positioned between the hammers and the print wheels) and force the paper into the print wheels to cause an A to be printed on the paper. The print hammers are energized by a print hammer energization circuit 546 which may conveniently be a thyratron or a power transistor energization circuit. The print hammers (not shown in FIG. 20) may, for example, be small slugs of ferromagnetic material that can be forced to strike the paper and urge it against the typewheels by the actuation of a magnetic coil.

The typeline mechanism 555 includes a vertical format unit (VFU) shown at 561 in FIG. 20, which will be described in more detail later. This vertical format unit is utilized to control the spacing of the lines of print, and the slewing of the paper in accordance with a predetermined format. The paper feed control 560 may be any means of causing the paper to slew past the print wheels and typeline hammers. The paper feed control may be arranged in any convenient manner to provide a signal after a predetermined length of paper has been fed past the print hammers. This signal is applied to a line marker amplifier ALM11.

Refering to FIG. 197, a schematic illustration of the decoding circuit for the development of the decoding signal XPR1 is shown. The printer ready signal XPR1 is true when the printer is not in error, and when the power is on and the reset line is not true. The printer ready signal provides a means to determine that the printer is ready for receipt of information and the Printer Control System may then enter the Print cycle. An AND-gate 1850 is provided for receiving signals from the input selection switch SIN10, the tape rewind cable signal JTRW0, and the tape loaded signal JTL1. The output of the AND-gate 1850 is applied to an OR-gate 1851 along with the input selection switch signal SIN11. Thus far, it may be seen that a signal may be derived from the OR-gate 1851 when the input selection switch is placed in the on line position to provide a signal SIN11, or when the input selection switch is on the off line position to provide an output signal SIN10 to be conjunctively combined with the tape not in rewind signal JTRW0, and the tape loaded signal JTL11. The output of the OR-gate 1851 is conjunctively combined in an AND-gate 1852 with Input Error flip-flop signal FIE10, reset decode circuit signal XRS10, Buffer Error flip-flop signal FBE10, Mechanism Eror flip-flop signal FME10, and plugboard signal PPR11. The logical conjunctive of these signals provided by the AND-gate 1852 yields a signal, which when amplified in an emitter follower 1853, represents the printer ready signal XPR1. From an inspection of the input signals provided to the AND-gate 1852, it may be seen that in addition to the logical conditions obtaining for the development of a signal from the OR-gate 1851, there must not be an input error (FIE10), the reset decode circuit must not be true (XRS10), there must not be a buffer error (FBE10), there must not be a mechanism error (FME10), and the plugboard must properly be connected (PPR11).

Referring to FIG. 198, a schematic illustration of the Print Enable flip-flop FPE1 is shown. The Print Enable flip-flop is utilized during the Print cycle and determines the period of time when printing may actually take place.

The enabling of the Print Enable flip-flop is determined by the particular font chosen to be printed. For example, when ordinary Gothic print is to be utilized, the Print Enable flip-flop FPE1 becomes set upon receipt, among other signals, of signals from the typewheel character pulse ampliefier APW21. If the printing is to be MICR characters, the Print Enable flip-flop is not set until the receipt of appropriate signals from the column address counter (which is now counting the character pulses presented to it) are received indicating that the MICR characters are now in position. The determination of the font to be printed is sensed from the print MICR flip-flop FPM1. Thus, when a reset output signal from the print MICR flip-flop FPM10 is received, the Print Enable flip-flop FPE1 assumes a set state upon the receipt of the next typewheel character marker pulse from the character pulse amplifier APW21. When a set signal is received from the Print MICR flip-flop FPM11 (MICR characters are to be printed rather than Gothic), the Print Enable flip-flop FPE1 will be set upon receipt of the 45th signal from the character pulse amplifier APW2 indicating that the MICR characters on the typewheel are now coming under the hammers.

An AND-gate 1855 is provided for receiving signals from the typeline buffer unload inhibit one-shot MD200, the Print Enable flip-flop reset output signal FPE10, the Program Counter flip-flop signal FPC31, and the Line Printed flip-flop signal FLP10. The AND-gate 1855 also receives signals from an OR-gate 1856 which provides a logical disjunctive function for signals applied to it from AND-gates 1857 and 1858. AND-gate 1857 receives signals from the Print MICR flip-flop FPM10, and the column address counter lockout count detect decode circuit signal XLC11. AND-gate 1858 receives Print MICR flip-flop signal FPM11, and Column Address flip-flop signals FCA70, 61, 51, 41, and 31. AND-gate 1855 also receives signals from an OR-gate 1859 which provides the logical disjunctive of power turn on buffer clear relay signal KPB11 and a signal provided by an AND-gate 1860. AND-gate 1860 receives Zero Suppress flip-flop signal FZS11, and character pulses amplifier signal APW21. The logical conjunction of the signals applied to the AND-gate 1855 yields a signal which, when amplified in an emitter follower 1861, is applied to the set input terminal of the Print Enable flip-flop FPE1.

An OR-gate 1863 disjunctively combines character pulse amplifier signal APW21, and power turn on buffer clear relay signal KPB11. The output of the OR-gate 1863 is conjunctively combined in an AND-gate 1864 with the Print Enable flip-flop set output signal FPE11, and the Stop Printing flip-flop signal FSPR1. The output of the AND-gate 1864, appropriately amplified by an emitter follower 1865, is applied to the reset input terminal of the Print Enable flip-flop FPE1. The Print Enable flip-flop also receives clock signals from the ungated clock driver CU071, and may be reset by the application of a resetting signal from the reset decode circuit XRS11 applied to the reset register transfer input terminal thereof.

The Print Enable flip-flop thus provides a set output signal FPE11 which is true when the conditions for printing of Gothic of MICR characters are obtained. The Print Enable flip-flop will provide a reset output signal FPE10 which becomes true when the Stop Processing flip-flop FSPR assumes the set state.

Referring to FIG. 199, a schematic illustration of the decoding circuit for the development of the decoding signal XLC11 is shown. The typeline buffer column address counter lockup detect circuit XLCI provides a means for detecting the existence of the lockup count (1111111). This lockup count is utilized by the column address counter as a rest state which must exist prior to entry into the Print cycle. The development of this lockup detect signal is accomplished by the utilization of an AND-gate 1870 which receives set output signals from the Column Address flip-flops FCA7–FCA1. Thus, when each of the seven Column Address Counter flip-flops are set, and the set output terminals present a true signal, the lockup count exists in the counter. Thus, the logical conjunctive of signals FCA71, FCA61, FCA51, FCA41, FCA31, FCA21, and FCA11, provided by the AND-gate 1870 yields a signal which indicates the presence of a lockup count 1111111. This signal, provided by the AND-gate 1870, is amplified by an emitter follower 1871 and utilized as the typeline buffer column address counter lockup decode signal XLC11.

Figure 200:
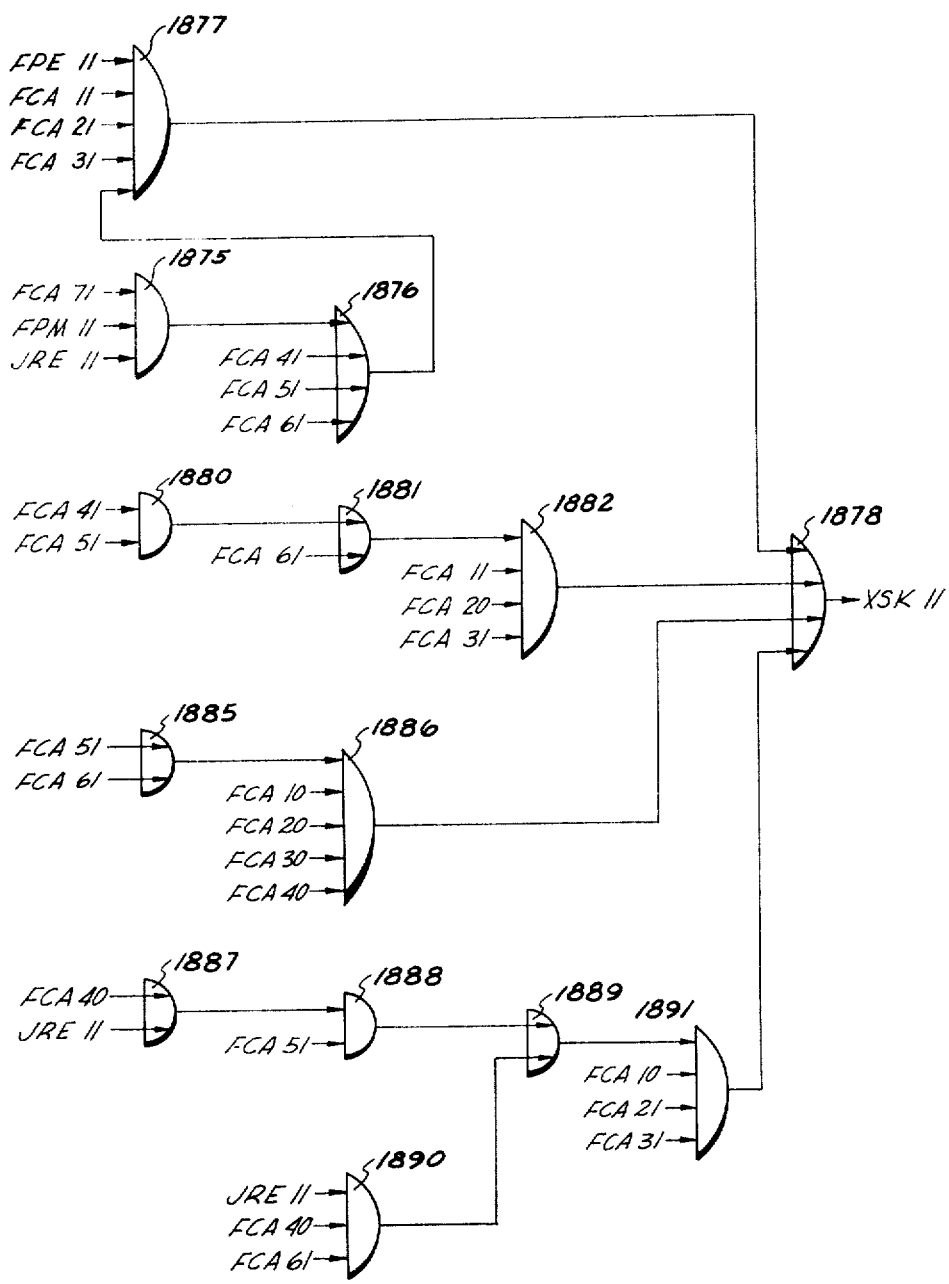
FIG. 200 is a schematic illustration of the decoding circuit for the development of the column address skip count detect signal XSK11.

Referring to FIG. 200, a schematic illustration of the decoding circuit for the development of the skip line decode signal XSK11 is shown. When the column address counter begins to count during the Print cycle, the number of separate and distinct counts presented by the column address counter exceeds the number of characters that may be printed. During the Transfer cycle when information was being transferred from the block buffer to the typeline buffer, the column address counter was utilized to address specific columns in the typeline buffer so that the information being transferred may be placed in the appropriate columns of the latter for ultimate transfer into the printing mechanism. However, during the Print cycle, the column address counters are utilized to address not the specific columns of the typeline buffer but rather the 44 character lines so that when a designated character exists in one of the 120 columns a signal will be presented at the output of that column of the typeline buffer to indicate that that character should be printed.

The typeline buffer may comprise a matrix 120 x 44 ferrite cores which are positioned on a coordinate random access plane, each intersection of which contains a ferrite core and represents a discrete addressable position within the plane. Each core is threaded with two windings—one of which represents one of the 120 columns and the other of which represents one of the 44 characters (it may be noted that some of these characters may be printed in more than one font). When the typeline buffer is being loaded, the column address counter addresses each of the 120 columns sequentially with a half current pulse. As the information is presented to the decoding circuits connected to the character lines of the typeline buffer, the specific characters are decoded and the corresponding character line is energized with a half current pulse. The column then being addressed at that particular moment will have the core located on that column address line that also corresponds to the character address line magnetized in a given direction to indicate the storage of a binary 1. Accordingly, as each column is sequentially addressed, the character being presented to the typeline buffer at that moment will be stored in that particular column. During the print mode, the character positions are addressed with full current pulses. Thus, when the character line is energized with a full current pulse of opposite polarity to the previously mentioned current pulses, each column having a core in that character position which is magnetized to the binary 1 state will experience an induced voltage caused by the change of state of the respective core. Thus, as each character is addressed with a full current pulse, each column having that character stored therein will present a voltage pulse at the output thereof which may be appropriately amplified and utilized to energize the print mechanism to print that character in the corresponding column.

For example, if it were desired to store the alpha-numeric character "B" in the 3rd and 15th column of the typeline buffer, the B character line would be energized with a half current pulse when the column address counter addressed the 3rd and 15th columns. During the Print cycle, when the column address counter addresses the B character line with a full current pulse of opposite polarity, the 3rd and 15th columns will have cores in those positions which will undergo a change of magnetic state which, in turn, will induce an output pulse in the 3rd and 15th column output lines.

It will become obvious that as the column address counter counts through its several binary counts, more counts will be presented to the decoding circuits of the character address lines than there are characters to be printed; therefore, when a specific column address code is reached that has no corresponding character, it is necessary to cause the column address counter to step at a faster rate so that the next succeeding column address counter count will correspond to the next character coming beneath the hammers of the typeline. Accordingly, the skip count decode circuit XSK1 detects counts of the column address counter for which there exists no valid character. When such a count is detected, the column address counter is caused to step rapidly to the next succeeding count so that when the typeline unload pulse, CG071, is required by the timing circuit, the column address counter will be in code equivalent synchronization with the character presented on the typeline.

For example, if the binary count of the column address counter were 0110100, and there were no corresponding characters represented by that binary count, then the skip count decode circuit would present the skip count decode signal XSK11 which would cause the column address counter to count rapidly to the next binary count for which there is a corresponding character. When the skip count decode circuit presents a true signal to the column address counter, the latter begins counting at the speed of the master clock (250 kc.) which will provide a sufficient number of binary counts to reach a count corresponding to a character before the typeline buffer unload pulse is required.

Therefore, the skip count decode circuit of FIG. 200 is utilized to detect counts which have no corresponding characters and is utilized to cause the column address counter to continue the binary count until such a count is obtained that corresponds to a character. The conditions for the skip count signal are obtained as follows: an AND-gate 1875 receives Column Address Counter flip-flop signal FCA71, the Print MICR flip-flop signal FPM11, and the cable signal JRE11. The output of the AND-gate 1875 is applied to an OR-gate 1876 to be disjunctively combined with Column Address Counter flip-flop signals FCA41, FCA51, and FCA61. The output of the OR-gate 1876 is applied to an AND-gate 1877 to be conjunctively combined therein with the Print Enable flip-flop signal FPE11, and the Column Address Counter flip-flop signals FCA11, FCA21, and FCA31. The output of the AND-gate 1887 is applied to an OR-gate 1878. Thus, an output from the AND-gate 1877, after passing through the OR-gate 1878, represents the skip count decode circuit signal XSK11.

An AND-gate 1880 receives signals from the Column Address Counter flip-flops FCA41 and FCA51, and provides the logical conjunction thereof in the form of a signal applied to an OR-gate 1881 to be combined therein with the Column Address Counter flip-flop signal FCA61. Output of OR-gate 1881 is conjunctively combined in an And-gate 1882 with Column Address Counter flip-flop signals FCA11, FCA20, and FCA31. The output of the AND-gate 1882 is also applied to the OR-gate 1878 which therefore may present a skip count decode circuit signal XSK11 upon the obtainment of the logical combination of the Column Address Counter flip-flop signals in the logic chain 1880, 1881 and 1882.

An OR-gate 1885 receives Column Address Counter flip-flop signals FCA51 and FCA61, and provides an output signal which is applied to an AND-gate 1886 for conjunctively combining the output signal of the OR-gate 1885 with column address counter flip-flop signals FCA10, FCA20, FCA30, and FCA40. The logical conjunction of these signals provided by the AND-gate 1886 is also applied to the OR-gate 1878 and may therefore represent skip count decode circuit signal XSK11.

An OR-gate 1887 receives column address counter signal FCA40 and cable signal JRE11. The output of the OR-gate 1887 is conjunctively combined in an AND-gate 1888 with the Column Address Counter flip-flop signal FCA51. The output of the AND-gate 1881 is applied to an OR-gate 1889. Another AND-gate 1890 conjunctively combines signals from the Column Address Counter flip-flops FCA40 and FCA61, and the cable signal JRE11. The output of the AND-gate 1890 is also applied to an OR-gate 1899. OR-gate 1899 provides an input signal to an AND-gate 1891 which also receives signals from the Column Address Counter flip-flops FCA10, FCA21, and FCA31. The logical conjunction of the input signals applied to the AND-gate 1891 yields a signal which is also applied to the OR-gate 1878 and may therefore also represent the skip count decode circuit signal XSK11 when the logical conditions of the appropriate signals are obtained in the logical gates 1887–1891.

Referring to FIG. 201, a schematic illustration of the print one line FPL1 is shown. The Print One Line flip-flop is set by either depressing the "print one line switch" on the operator's panel; or alternatively, by depressing the "stop" switch also on the operator's panel. When set, the flip-flop provides a signal which causes the printer to print one line and then stop. An OR-gate 1895 receives signals from the print one line switch SPL21 and the stop switch SST11. The output of the OR-gate 1895 is applied to the set register transfer input terminal of the flip-flop FPL1.

An OR-gate 1896 receives the print switch signal SPR11, and the reset decode circuit signal XRS11. The output of the OR-gate 1896 is applied to the reset register transfer input terminal of the flip-flop FPL1. Therefore, the Print One Line flip-flop may be set upon the application of signals from the print one line or stop switches of the operator's panel; similarly, a flip-flop may be reset by signals from the printing switch or the reset decode circuit signal XRS11.

Referring to FIG. 202, a schematic illustration of the Line Printed flip-flop FLP1 is shown. The Line Printed flip-flop presents a true signal at its set output terminal when the line being printed is completed, and enables further operations to proceed in the Print cycle without the danger of reprinting the same line of information. AND-gate 1897 receives Print Enable flip-flop signal FPE11, Stop Processing flip-flop signal FSPR1, and character pulse amplifier signal APW21. The logical conjunctive of these signals provided by the AND-gate 1897 represents a signal which is applied to an OR-gate 1898. OR-gate 1898 also receives signals from AND-gate 1899 which provides the logical conjunction of relay signal KPB11, Print Enable flip-flop signal FPE11, and Stop Processing flip-flop signal FSPR1. The output of the OR-gate 1898 is appropriately amplified in an emitter follower 2000 and applied to the set input terminal of the Line Printed flip-flop FLP1. An AND-gate 2001 provides the logical conjunction of the End of Data Character flip-flop signal FED10, the line printed set output signal FLP11, and the Block Buffer Status flip-flop FBS11. The output of the AND-gate 2001 is applied to the reset input terminal of the Line Printed flip-flop FLP1. Flip-flop FLP1 also receives clock signals from the ungated clock driver CU071, and resetting signals from the reset decode circuit XRS11 applied to the reset register transfer terminal thereof.

Referring to FIG. 203, a schematic illustration of the decoding circuit for the development of the decoding signal XSP11 is shown. The stop printing decode signal XSP11 is utilized during the Print cycle to reset the Print Enable flip-flop. The decoding circuit for the development of the stop printing decode signal detects the last printable character on the typewheel. An AND-gate 2005 receives cable signal JRN11, and column address counter signal FCA21. The output of the AND-gate 2005 is applied to an OR-gate 2006 along with signals from an AND-gate 2007. AND-gate 2007 receives cable signal JRE11 and Print MICR flip-flop signal FPM10. The output of the OR-gate 2006 is conjunctively combined in an AND-gate 2008 with column address counter signals FCA61, FCA51, FCA41 and FCA31 and Program Counter flip-flop signal FPC31. The output of the AND-gate 2008 is applied to an OR-gate 2009. AND-gate 2010 receives column address counter signals FCA71, FCA41, FCA31 and FCA21, and receives Print MICR flip-flop signals FPM11, and cable signal JRE11. The output of the AND-gate 2010 is also applied to the OR-gate 2009 with signals from the AND-gate 2008. The output of the OR-gate 2009 is applied to an AND-gate 2011 which also receives Print Enable flip-flop signal FPE11 and conjunctively combines these two signals to provide a signal representing the stop printing decode circuit signal XSP11. Thus, when the last printable character on the typewheel presents itself, the Column Address Counter flip-flop condition is sensed and a signal is provided to the Print Enable flip-flop to indicate that the last printable character on the typewheel is in position.

Referring to FIG. 204, a schematic illustration of the Last Paper Form flip-flop FLPF is shown. The Last Paper Form flip-flop is set when the last paper form has passed through the printer mechanism, the set output signal of the flip-flop FLPF may be utilized to actuate a warning system to indicate that the paper must be replaced in the printer before further operations may take place. An AND-gate 2015 receives cable signal JLF11, line marker pulse amplifier ALM11, and vertical format amplifier signals AVF41 and AVF 51. The logical conjunctive of these signals provided by the AND-gate 2015 yields a signal which is applied to the set input terminal of the Last Paper Form flip-flop FLPF.

An AND-gate 2016 receives cable signal JFL10, and print switch signal SPR11. An AND-gate 2017 receives cable signal JFL10 and print one line switch signal SPL11. The outputs of the AND-gates 2016 and 2017 are applied to an OR-gate 2018 which provides a signal to the reset input terminal of the flip-flop FLPF. The flip-flop FLPF also receives ungated clock signals from the ungated clock driver CU061, and resetting signals from the reset decode circuit XRS 11 which are applied to the reset register transfer input terminal thereof.

Figure 205:
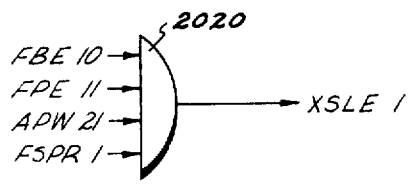
FIG. 205 is a schematic illustration of the decoding circuit for the development of the slew entry detect signal XSLE1.

Referring to FIG. 205, a schematic illustration of the decoding circuit for the development of the slew entry decode circuit signal XSLE1 is shown. The slew entry enable decode XSLE detects when conditions are proper for entry into the slew mode. Those conditions are provided by a sensing Buffer Error flip-flop signal FBE10, the Print Enable flip-flop signal FPE11, the character pulse amplifier signal APW21, and the Stop Processing flip-flop signal FSPR1. These signals are conjunctively combined in an AND-gate 2020 the output of which represents the slew entry enable decode circuit signal XSLE1.

Figure 206:
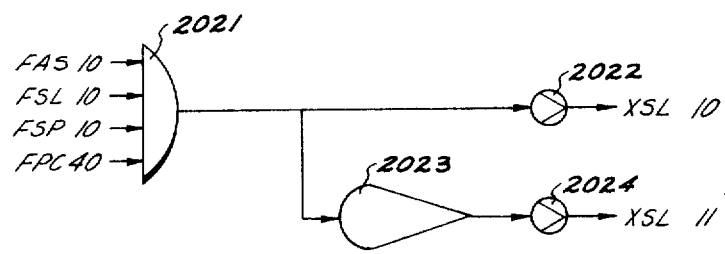
FIG. 206 is a schematic illustration of the decoding circuit for the development of the slew paper control signals XSL10 and XSL11.

Referring to FIG. 206, the schematic illustration of the decoding circuit for the development of the slew paper decode signal XSL10 and the slew code paper signal XSL11 are shown. When the proper conditions present themselves, the slew paper decode circuit detects these conditions and initiates a signal indicating that the proper time exists for slewing the paper. An AND-gate 2021 is provided for receiving automatic slew flip-flop signal FAS10, the Set Vertical Format Unit Loop flip-flop signal FSL10, the Space Paper flip-flop signal FSP10, and the Program Counter flip-flop signal FPC40. The logical conjunctive of these signals provided by the AND-gate 2021 yields a signal which is amplified in an emitter follower 2022 to represent the slew paper decode circuit signal XSL10. An inverter 2023 also receives the output signal from the AND-gate 2021 and logically inverts that signal which, when amplified in an emitter follower 2024 represents the slew paper decode circuit signal XSL11.

Figure 207:
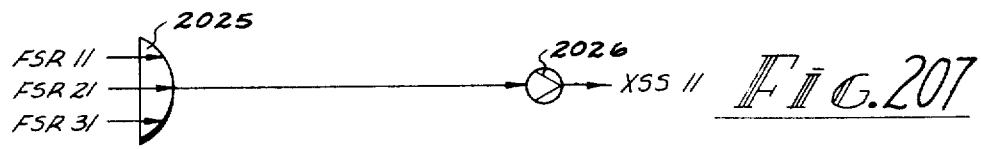
FIG. 207 is a schematic illustration of the decoding circuit for the development of the slew character in store detect signal XSS11.

Referring to FIG. 207, a schematic illustration of the decoding circuit for the development of the slew code detect signal XSS11 is shown. An OR-gate 2025 is provided for receiving signals from the Slew Register flip-flops FSR1, 2, and 3, and detect when any one of the three flip-flops is in the set condition. Thus, upon receiving a true signal from the set output terminal of any of the three Slew Register flip-flops, an indication is thus presented that a slew code character is presented, and is stored in the slew register. The output of the OR-gate 2025 is amplified by an emitter follower 2026 which represents the slew code detect circuit signal XSS11.

Figure 208:
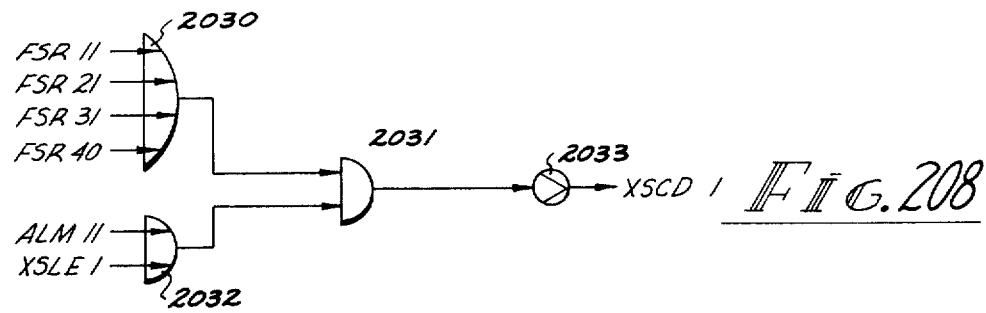
FIG. 208 is a schematic illustration of the decoding circuit for the development of the slew countdown gate signal XSCD1.

Referring to FIG. 208, a schematic illustration of the decoding circuit for the development of the slew countdown gate signal XSCD1 is shown. When a line marker pulse is received by the slew countdown gate circuit, and the Slew Register flip-flops contain a stored slew code, a signal is presented by the slew countdown gate circuit which causes the slew register to be counted down one each time a line marker pulse is received. An OR-gate 2030 is provided for receiving Slew Register flip-flop signals FSR11, FSR21, FSR31, and FSR40. The output of the OR-gate 2030 is applied to an AND-gate 2031 which also receives signals from an OR-gate 2032 connected to receive signals from line marker pulse amplifier ALM11 and slew entry enable decode circuit signal XSLE1. The output of the AND-gate 2031 is amplified in an emitter follower 2033 and represents the slew countdown gate signal XSCD1.

Figure 209:
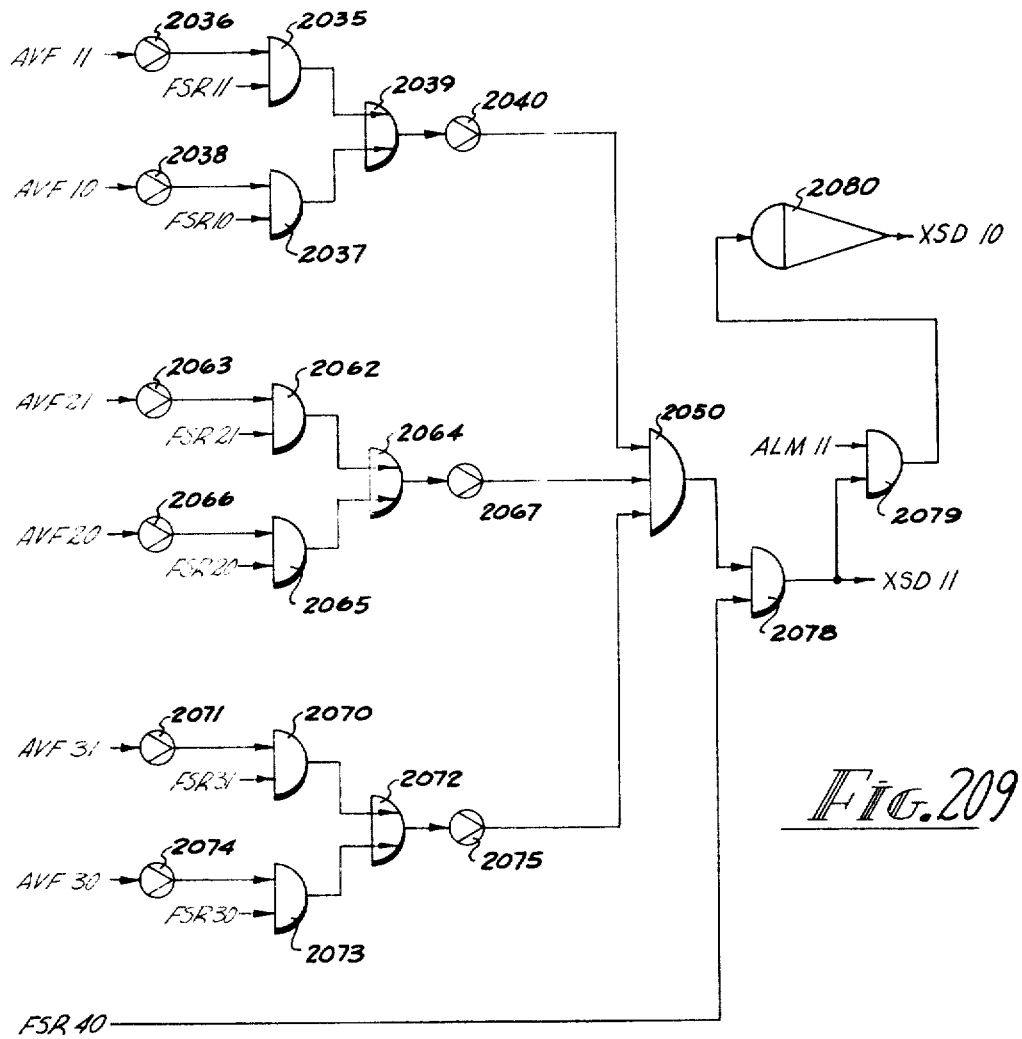
FIG. 209 is a schematic illustration of the decoding circuit for the development of the slew completed detect signals XSD11 and XSD10.

Referring to FIG 209, a schematic illustration of the decoding circuit for the development of the decode signals XSD11 and XSD10 is shown. The slew completed detect decode circuit signals XSD10 and XSD11 are provided to indicate when a slew code stored in the slew register corresponds to the vertical format unit tape code. Thus, when a vertical format unit tape code signal presents itself that corresponds to the slew register contents, the appropriate signal will be provided by the slew completed detect circuit to indicate that the slewing should stop, and further operations should proceed. The signals that are sensed for the determination of the presence of correspondence between the vertical format tape code and the slew register are derived from the slew register flip-flops FSR1–3 and the vertical format amplifiers AVF1–AVF3. Accordingly, an AND-gate 2035 receives vertical format amplifier signal AVF11 through an emitter follower 2036 to be conjunctively combined in the AND-gate with the Slew Register flip-flop signal FSR11. Similarly, vertical format amplifier signal AVF10 is amplified in an emitter follower 2038 and applied to an AND-gate 2037 with Slew Register flip-flop signal FSR10. The outputs of AND-gates 2035 and 2037 are applied to an OR-gate 2039 which yields a signal, which, when amplified in an emitter follower 2040, is applied to an AND-gate 2050. An AND-gate 2062 receives vertical format amplifier signal AVF21 through an emitter follower 2063 to be combined with the slew register flip-flop signal FSR21. Similarly, an AND-gate 2065 receives vertical format signal AVF20 through an emitter follower 2066 to be combined with a slew register flip-flop signal FSR20. The outputs of the AND-gates 2062 and 2065 are combined in an OR-gate 2064 which yields a signal, when amplified in an emitter follower 2067, and is applied to an AND-gate 2050. Vertical format amplifier AVF31 provides a signal which is amplified in an emitter follower 2071 and applied to AND-gate 2070 to be conjunctively combined with the Slew Register flip-flop signal FSR31. The vertical format amplifier signal AVF30 is amplified by an emitter follower 2074 and applied to an AND-gate 2073 to be conjunctively combined therein with Slew Register flip-flop signal FSR30. The outputs of the AND-gates 2070 and 2073 are applied to an OR-gate 2072 which yields a signal when amplified in an emitter follower 2075 which is applied to an AND-gate 2050. When the signals from OR-gates 2039, 2064, and 2072 are all true, the conjunctive combination of these signals in AND-gate 2050 yields a signal which is applied to an AND-gate 2078 to be conjunctively combined with the Slew Register flip-flop signal FSR40. The output of the AND-gate 2078 represents the slew completed detect signal XSD11. The output of the AND-gate 2078 is also applied to an AND-gate 2079 to be combined therein with the line marker pulse amplifier signal ALM11. The output of this AND-gate is inverted in an inverter 2080, the output of which represents the slew completed detect signal XSD10.

Figure 210:
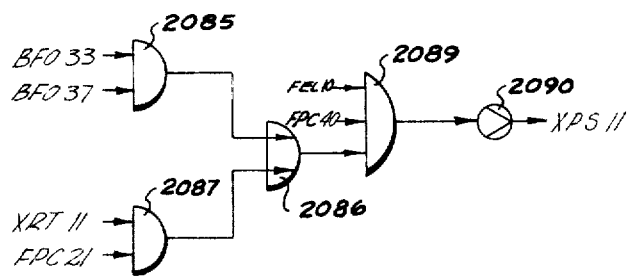
FIG. 210 is a schematic illustration of the decoding circuit for the development of the plugboard slew entry enable signal XSP11.

Referring to FIG. 210, a schematic illustration of the decoding circuit for the development of the decode signal XPS11 is shown. Plugboard slew entry gate decode circuit XPS1 detects the absence of a slew code character and generates a signal causing the plugboard slew code to be entered into the slew register if no slew code character is detected. Accordingly, an AND-gate 2085 conjunctively combines Bus Function signals BF033 and BF037 and applies the output signal thereof to an OR-gate 2086. An AND-gate 2087 receives unedited mode column address counter reset decode circuit signal XRT11 and the Program Counter flip-flop signal FPC21. The output of the AND-gate 2087 is also applied to the OR-gate 2086. The signal provided by the OR-gate 2086 is conjunctively combined in an AND-gate 2089 with the Program Counter flip-flop signal FPC40 and the End of Line flip-flop signal FEL10. The conjunctive combination of these signals in the AND-gate 2089 yields a signal which, when amplified in an emitter follower 2090, represents the plugboard slew entry gate decode signal XPS11.

Figure 211A:
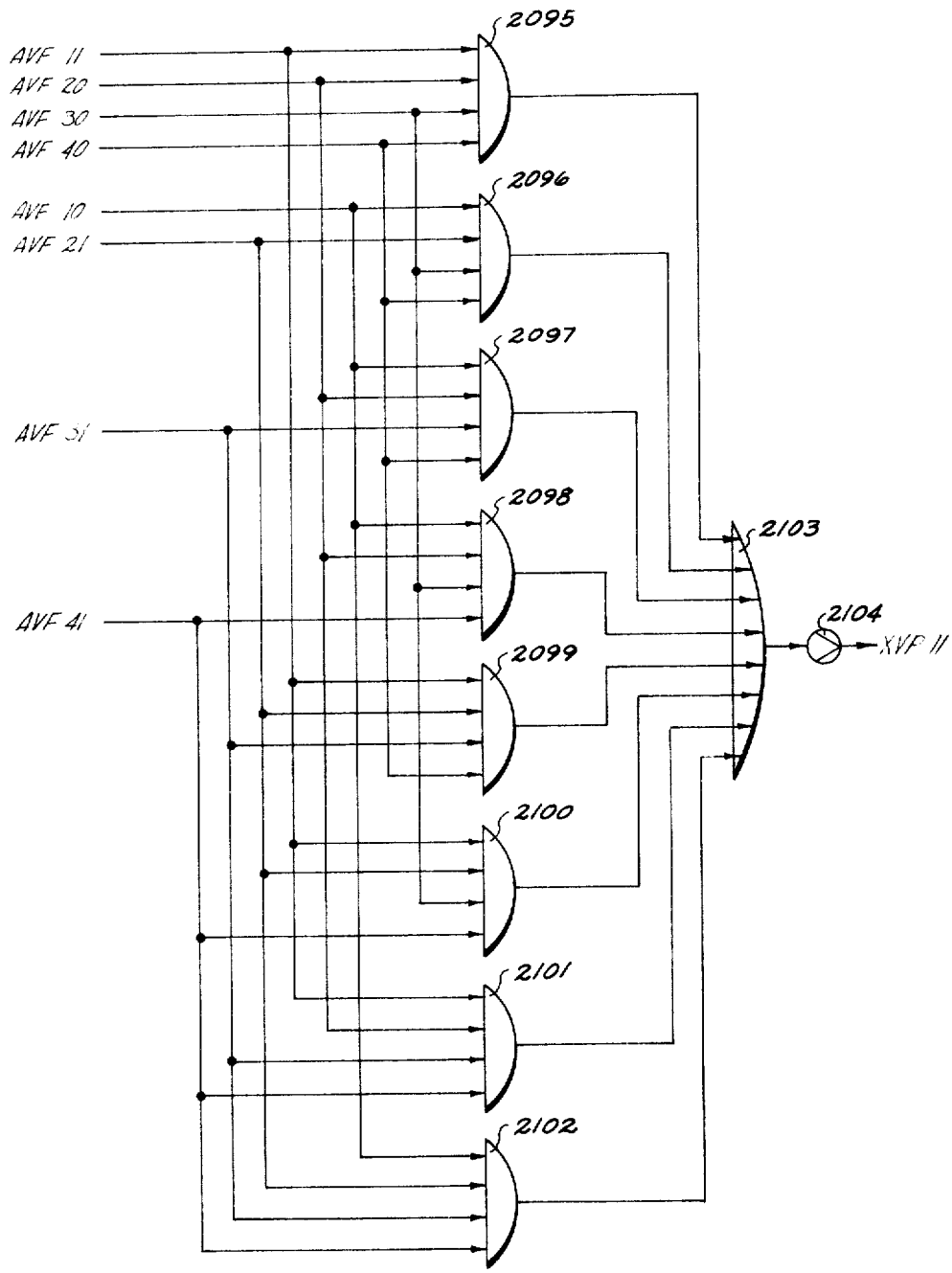
FIGS. 211a–211c are schematic illustrations of the decoding circuits for the development of the vertical format unit brush parity signals XVP11–XVP31.
Figure 211B:
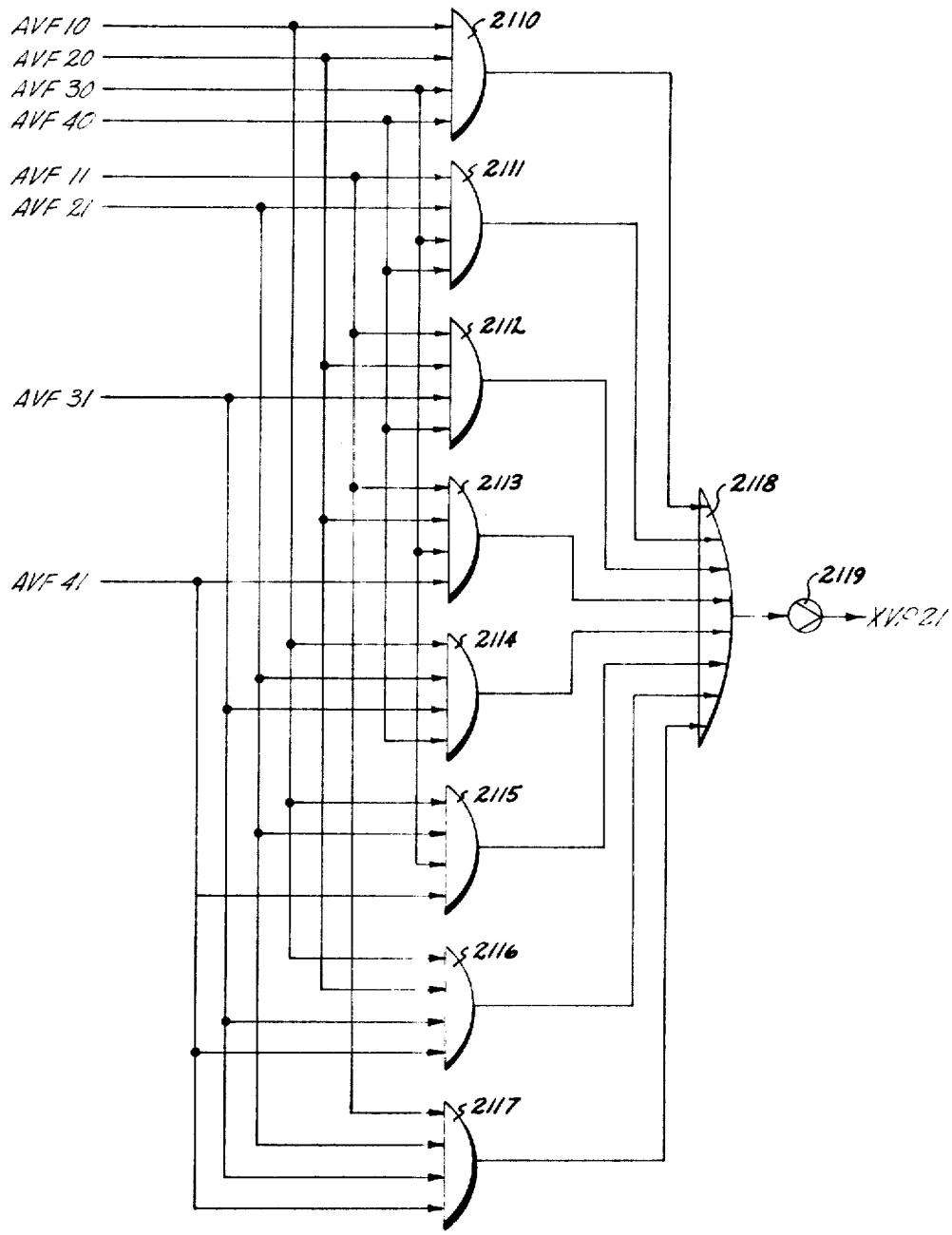

Referring to FIGS. 211a and 211b, schematic illustrations of the decoding circuits for the development of decode signals XVP11 and XVP21 are shown. The two decode circuits shown in FIGS. 211a and 211b represent vertical format brush parity decode circuits utilized to detect incorrect hole punching in the vertical format tape. Accordingly, each of the decoding circuits detects any one of eight illegal combinations of vertical format amplifier output signals. Accordingly, referring to FIG. 211a, AND-gates 2095–2102 receive output signals from vertical format amplifiers AVF1–4. Upon the presentation to any one of these AND-gates, signals from the vertical format amplifiers which indicate an odd number of 1's, the corresponding AND-gate will present a true signal to the OR-gate 2103 which, in turn, yields a signal that is amplified by an emitter follower 2104 to represent the vertical format unit brush parity signal XVP11.

Referring to FIG. 211b, AND-gates 2110–2117 receive various combinations of output signals from vertical format amplifiers AVF1–4. Accordingly, when any combination of these amplifiers presents an even number of binary 1's, or no binary 1's, a corresponding AND-gate generates a true signal at the output thereof which is applied to an OR-gate 2118. The output or the OR-gate 2118, when amplified in an emitter follower 2119, represents the vertical format unit brush parity signal XVP21.

Figure 211C:
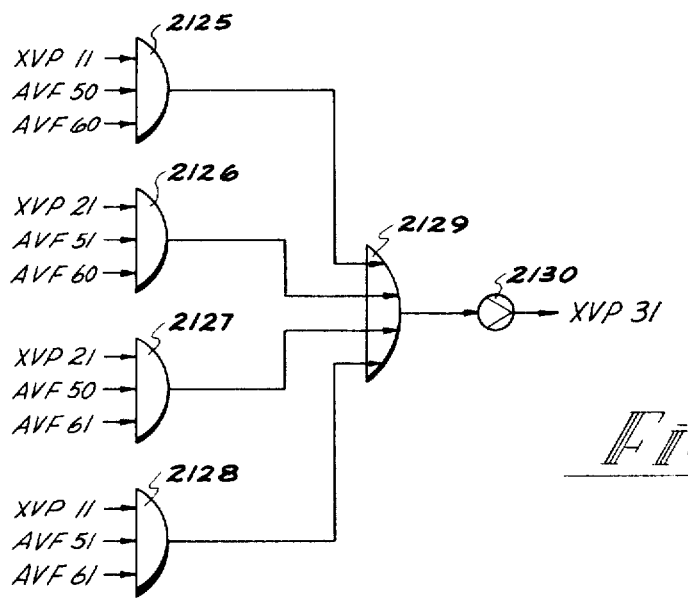

Therefore, the vertical format unit brush parity decode circuits represented in FIGS. 211a and 211b provide an odd and an even parity check respectively of the output signals provided by the vertical format amplifiers AVF1–AVF4. The odd and even parity checks provided by these decode circuits are utilized to be combined with the signals provided by the vertical format amplifiers AVF5 and AVF6 to ultimately yield an odd parity check for the six bits contained in the vertical format unit tape. Referring to FIG. 211c, the utilizations of the VFU brush parity signals XVP21 are shown as they are combined with the vertical format amplifier outputs AVF5 and AVF6 to form a single signal representing the odd parity check of the vertical format unit (VFU). Referring to FIG. 211c, AND-gates 2125–2128 each receive a signal from one of the VFU brush parity circuits shown in FIG. 211a or 211b, and also receive vertical format amplifier output signals AVF5 and AVF6. The logical conjunction of these signals provided by any of the AND-gates 2125–2128 will provide a true signal to the OR-gate 2129 which, in turn, will yield a signal to be amplified by an emitter follower 2130 and will be presented as the odd vertical format unit brush parity signal XVP31. Thus, the odd and even parity checks of the first four vertical format amplifier signals as shown in FIGS. 211a and 211b are ultimately combined with the vertical format amplifier signals from the 5th and 6th vertical format amplifiers to form an odd parity check of the six bit vertical format unit code as shown in FIG. 211c.

It will be convenient to describe a representative type of vertical format unit that may be utilized in the system of the present invention. Referring to FIG. 212, a schematic illustration of a representative vertical format unit, and vertical format amplifiers are shown. A paper tape 2131 is provided having a plurality of holes 2132 punched therein. These holes are arranged in columns each column having from 0 to 6 holes punched therein. These six holes represent the 6 bit vertical format unit code referred to previously in the discussion of the vertical format unit brush parity signal decode circuits of FIGS. 211a, 211b, and 211c. A light source 2133 is positioned on one side of the paper tape 2131, and a plurality of photosensitive devices 2134, one for each bit position of the paper tape, are placed on the opposite side of the paper tape. When one of the holes 2132 presents itself beneath the corresponding photosensitive device 2134, light is permitted to pass from the light source 2133 to the photoelectric device to cause an output signal to be provided thereby. This signal is applied to a corresponding vertical format amplifier AVF11–AVF61 shown schematically in FIG. 212 at 2135. Thus, the output signals provided by the vertical format amplifiers represent the punched paper present on the vertical format unit paper tape 2131.

FIG. 213 shows another schematic diagram of the vertical format unit. The paper tape 2131, the light source 2133, and the photoelectric devices 2134 are also shown in FIG. 213. A pair of drums 2136 are provided for driving the endless paper tape loop. These drums may be mounted on a common shaft with the paper drive mechanism of the printer. Therefore, the paper tape, containing the appropriate vertical format code, will move in synchronism with the paper forms of the printer mechanism.

Referring to FIG. 214, a schematic illustration of the decoding circuit for the development of the decoding signal XVB11 is shown. The broken VFU loop detect signal XVB11 indicates that the vertical format unit in this tape loop is broken, and provides a means for signaling appropriate warning circuits to prevent erroneous operation of the printer. The broken VFU loop detect signal XVB11 is developed through the logical conjunction of vertical format amplifier signals AVF11, AVF21, AVF31, AVF41, AVF51, and AVF61 in an AND-gate 2137. The logical conjunction of these signals indicates that each of the six bit positions of the tape contain holes therein and the tape is therefore either broken, or the forbidden code 111111 exists.

Referring to FIG. 215, a schematic illustration of the Automatic Slew flip-flop FAS1 is shown. The Automatic Slew flip-flop FAS1 is utilized in the Slew cycle to advance the paper when a slew command terminates on a "4" punch in the vertical format loop. The automatic slew will then proceed until a "5" punch is detected in the vertical format loop tape. An AND-gate 2140 receives Slew Register flip-flop signals FSR41, FSR30, FSR20, and FSR10, and provides the logical conjunction thereof in a form of a signal applied to an OR-gate 2141. An AND-gate 2142 receives Slew Register flip-flop signal FSR40, and slew completed detect decode circuit signal XSD11. The output of the AND-gate 2142 is also applied to the OR-gate 2141 along with the output of the AND-gate 2140 and the Programed Slew Detect flip-flop signal FPS10. The output of the OR-gate 2141 is conjunctively combined in an AND-gate 2143 with the Program Counter flip-flop signal FPC41. The output of the AND-gate 2143 is applied to an OR-gate 2144 along with the Space Paper flip-flop signal FSP11. Output of the OR-gate 2144 is conjunctively combined in an AND-gate 2145 with the line marker amplifier signal ALM11, and the vertical format amplifier signals AVF41 and AVF50. The output of the AND-gate 2145 is applied to the set input terminal of the Automatic Slew flip-flop FAS1.

An AND-gate 2146 receives line marker amplifier pulse signal ALM11, and vertical format amplifier signal AVF51. The output of the AND-gate 2146 is applied to the reset input terminal of the flip-flop FAS1. The Automatic Slew flip-flop FAS1 also receives signals from the master clock driver CMD21, and resetting signals from the reset decode circuit XRS11 applied to the reset register transfer input terminal thereof.

Figure 216:
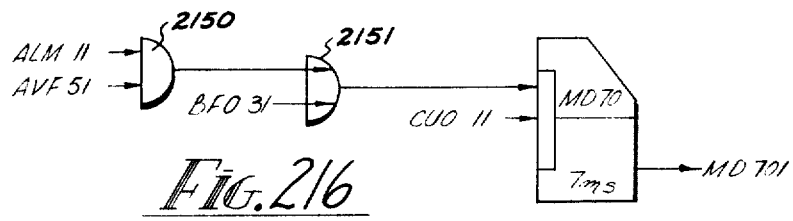
FIG. 216 is a schematic illustration of the slew decelerate delay one-shot MD701.

Referring to FIG. 216, a schematic illustration of the slew decelerate time delay one-shot MD70 is shown. The slew decelerate time delay one-shot MD70 is set to its unstable state upon the completion of the slewing operation, and remains in this state for approximately seven milliseconds. This seven millisecond delay causes the output signal from MD701 to go false for the seven millisecond period. At the end of this delay time, output signal MD701 returns to its true state, thus providing a period in which the output of the one-shot is false. This delay is utilized to prevent printing until the paper has come to a full stop after a slewing operation. An AND-gate 2150 receives line marker amplifier signal ALM11, and vertical format amplifier signal AVF51. The logical conjunction of these signals provided by AND-gate 2150 is combined in an OR-gate 2151 with the Bus Function signal BF031. The output of the OR-gate 2151 is applied to the input terminal of the slew decelerate time delay one-shot MD70. The one-shot MD70 receives clock signals from the ungated clock driver CU011.

Figure 217:
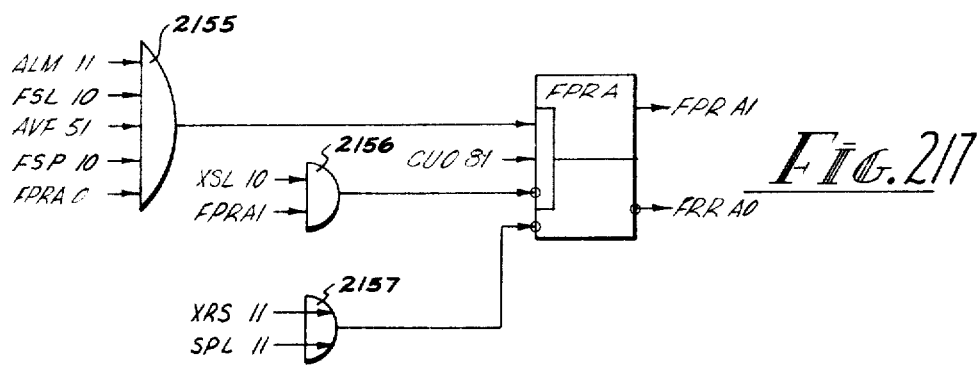
FIG. 217 is a schematic illustration of the Paper Runaway flip-flop FPRA.

Referring to FIG. 217, a schematic illustration of the Paper Runaway Detect flip-flop is shown. The flip-flop FPRA is utilized to detect when paper continues to slew after a "top of page" code is detected in the vertical format unit tape. This code, comprising a "4" and "5" punch in the tape indicates that a top of page has been reached. If slewing continues after the detection of this code, the Paper Runaway Detect flip-flop FPRA is set, and the signal provided thereby is utilized to set the Mechanism Error flip-flop. An AND-gate 2155 receives line marker amplifier signal ALM11, the set VFU Loop flip-flop signal FSL10, the vertical format amplifier signal AVF51, the Space Paper flip-flop signal FST10, and the Paper Runaway flip-flop reset output signal FPRA0. The output of the AND-gate 2155 is applied to the set input terminal of the Paper Runaway flip-flop FPRA. The resetting of the flip-flop FPRA may take place synchronously through the application of a signal from an AND-gate 2156 which receives Paper Runaway flip-flop set output signal FPRA1, and the slew paper control decode circuit signal XSL10. The application of the signal from the AND-gate 2156 to the set input terminal in conjunction with the clock signal from the ungated clock driver CU081 will reset the paper runaway flip-flop FPRA. The flip-flop FPRA may also be reset asynchronously through the application of a signal from OR-gate 2157 which receives reset decode circuit signal XRS11, and the print one line switch signal SPL11. The signal from the OR-gate 2157 is applied to the reset input register transfer terminal of the flip-flop FPRA.

Figure 218:
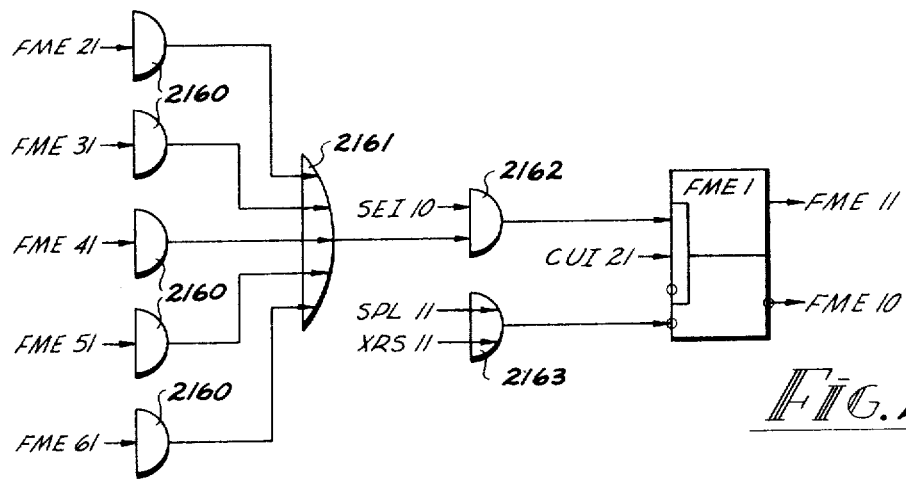
FIGS. 218–223 are schematic illustrations of the Mechanism Error flip-flops FME1–FME6 and the associated logical circuitry.

Referring to FIGS. 218 through 223, a schematic illustration of the Mechanism Error flip-flops is shown. The Mechanism Error flip-flops are utilized to detect errors chargeable to the printer mechanism and to the paper feed apparatus. These flip-flops detect various signals applied to them from the several flip-flops, decode circuits, and amplifiers, and logically combine these signals to detect illegal combinations indicating that an errror exists. The Mechanism Error flip-flop FME1 shown in FIG. 218 is the flip-flop that is responsive to the set output signal of any of the five remaining flip-flops of the Mechanism Error flip-flops described in connection with FIGURES 219–223. The set output signal from the flip-flop FME1 is the signal indicating to the reminder of the system of the present invention that a mechanism error has occurred.

Thus, the Mechanism Error flip-flop FME1 assumes a set state when any of the detectable errors occur and one of the remaining five Mechanism Error flip-flops FME2–6 are set by printed mechanism and paper feed apparatus error such as paper runaway, no slew code, vertical format tape parity error, illegal slewing, and broken vertical format unit tape loop.

Figure 219:
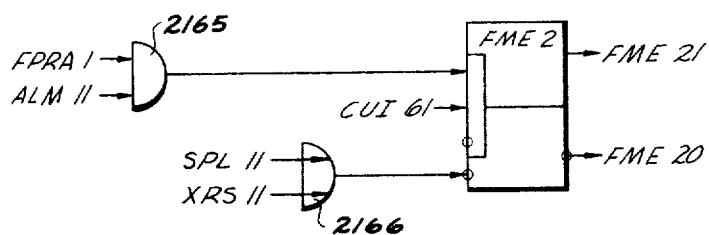

Referring to FIG. 219, the Mechanism Error flip-flop FME2 is shown. The flip-flop FME2 is set upon the detection of a paper runaway condition. An AND-gate 2165 receives Paper Runaway flip-flop signal FPRA1, and line marker amplifier signal ALM11. The logical conjunction of these two signals provided by the AND-gate 2165 yields a signal which when applied to the Mechanism Error flip-flop FME2 causes the latter to assume the set state. The flip-flop FME2 is reset by the application of a signal from OR-gate 2166 applied to the reset input register transfer terminal thereof. The OR-gate 2166 receives print one line switch signal SPL11, and reset decode circuit signal XRS11. Flip-flop FME2 also receives ungated clock driver signal CU161.

Figure 220:
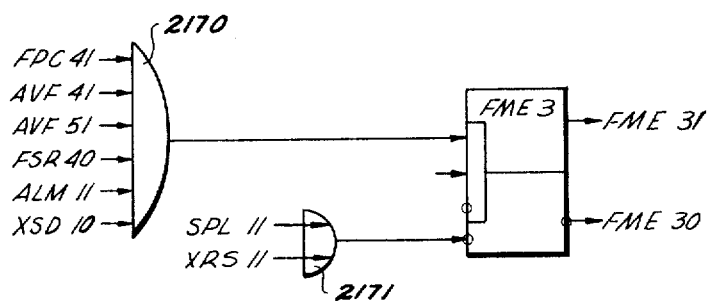

FIG. 220 is a schematic illustration of the Mechanism Error flip-flop FME3. This flip-flop detects illegal slewing conditions through the utilization of an AND-gate 2170 which receives Program Counter flip-flop signal FPC41, vertical format amplifier signals AVF41 and AVF51, Slew Register flip-flop signal FSR40, line marker amplifier signal ALM11, and slew completed detect decode circuit signal XSD10. The output of the AND-gate 2170 is applied to the set input terminal of flip-flop FME3. Flip-flop FME3 receives clock signals from the ungated clock driver CU121, and receives resetting signals from an OR-gate 2171 which receives print one line switch signal SPL11 and reset decode circuit signal XRS11.

Figure 221:
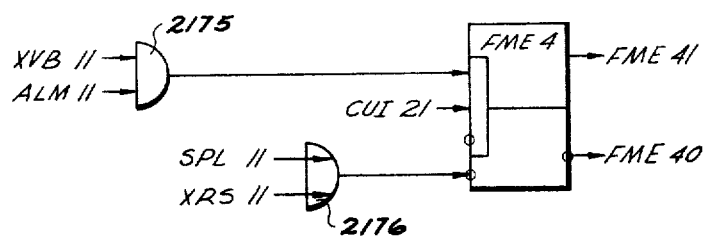

Referring to FIG. 221, a schematic illustration of the Mechanism Error flip-flop FME4 is shown. The flip-flop FME4 is utilized to provide a signal when a broken vertical format unit tape loop is detected. An AND-gate 2175 receives broken vertical format unit tape detect decode circuit signal XVB11, and line marker amplifier signal ALM11. The output of the AND-gate 2175 is applied to the set input terminal of flip-flop FME4. The flip-flop also receives clock signals from the ungated clock driver CU121, and may be reset by the application of a signal from an OR-gate 2176 to the input register transfer reset terminal thereof. OR-gate 2176 also receives print one line switch signal SPL11, and a reset decode circuit signal XRS11.

Figure 222:
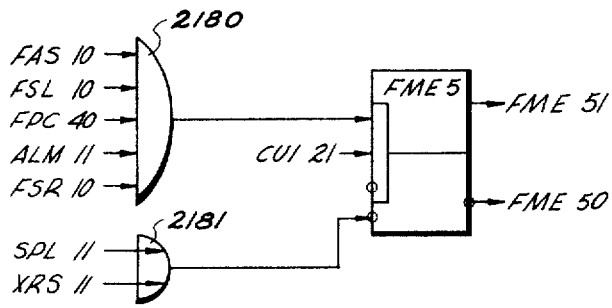

Referring to FIG. 222, a schematic illustration of the Mechanism Error flip-flop FME5 is shown. The flip-flop FME5 is utilized to detect the absence of a slew code upon the entry into the Slew cycle of operation. An AND-gate 2180 is utilized to detect this condition by providing the logical conjunction of Automatic Slew flip-flop signal FAS10, the Set Vertical Format Unit Loop flip-flop signal FSL10, the Program Counter flip-flop signal FPC40, the line marker amplifier signal ALM11, and the Slew Register flip-flop signal FSR10. The output of the AND-gate 2180 is applied to the set input terminal of the flip-flop FME5. The latter also receives clock signals from the ungated clock driver CU121, and may be reset by the application of signals from an OR-gate 2181 to the reset register transfer input terminal thereof. The OR-gate 2181 receives print one line switch signal SPL11, and reset decode circuit signal XRS11.

Figure 223:
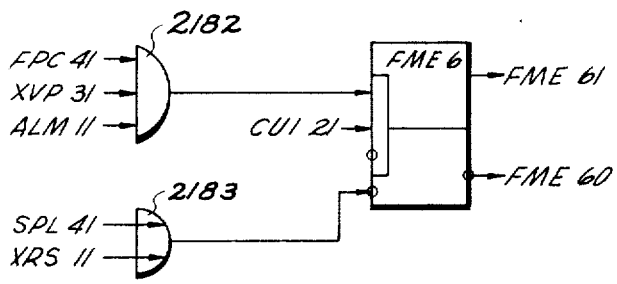

Referring to FIG. 223, a schematic illustration of the Mechanism Error flip-flop FME6 is shown. The flip-flop FME6 is utilized to provide a signal indicating that there is an error in the vertical format tape parity. To provide the detection of the parity error in the vertical format tape, an AND-gate 2182 receives signals from the parity error decode circuit XVP3, and also receives a Program Counter flip-flop signal FPC41 and line marker amplifier signal ALM11. The output of the AND-gate 2182 is applied to the set input terminal of the flip-flop FME6. Flip-flop FME6 also receives clock signals from the ungated clock driver CU121, and may be reset by the application of a signal from an OR-gate 2183 to the reset register transfer input terminal. OR-gate 2183 receives print one line switch signal SPL11 and reset decode circuit signal XRS11.

Figure 224:
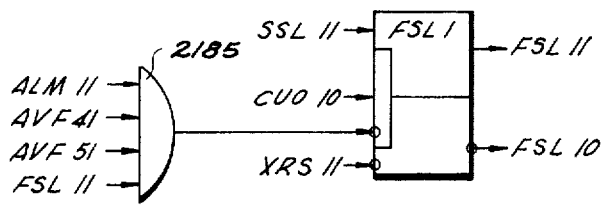
FIG. 224 is a schematic illustration of the Set Vertical Format Unit Loop flip-flop FSL1.

Referring to FIG. 224, a schematic illustration of the Set VFU Loop flip-flop is shown. This flip-flop is set upon receipt of a signal from the set loop switch on the operator control panel, and is reset when a "4–5" punch code is detected in the paper tape loop. When the Set Loop flip-flop is in the set state, the output signal FSL11 provided thereby causes the paper transport mechanism to advance thereby permitting the synchronization of the paper forms with the vertical format paper loop. The Set Loop flip-flop FSL1 receives a setting input signal from the set loop switch SSL11 connected to the set register input terminal thereof. The flip-flop also receives a clock signal from an ungated clock driver CU010, and a resetting signal from a reset decode circuit XRS11 applied to the reset register transfer input terminal thereof. The flip-flop FSL1 also receives a resetting signal from an AND-gate 2185 which logically combines line marker amplifier signal ALM11, vertical format amplifier signals AVF41 and AVF51, and the set output signal of the Set Loop flip-flop FSL11. Thus, the AND-gate 2185 provides a means for sensing a "4–5" punch in the paper tape loop, and yields a signal to the reset input terminal of the flip-flop FSL1 upon the receipt of the next line marker pulse from the line marker pulse amplifier.

Figure 225:
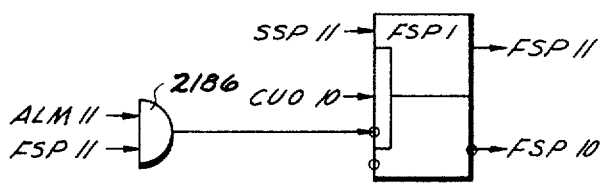
FIG. 225 is a schematic illustration of the Space Paper flip-flop FSE1.

It is frequently desirable to advance the paper in the printer a distance greater than that provided by programming. As a consequence, a space paper switch is provided on the operator's panel to permit the operator to cause the paper to be advanced. Referring to FIG. 225, a schematic illustration of the Space Paper flip-flop FSP1 is shown. This flip-flop is set upon receipt of a signal from the space paper switch on the operator's panel. The flip-flop is reset upon the receipt of the next line marker pulse from the line marker pulse amplifier. The space paper switch signal SSP11 is applied to the set register transfer input terminal of the flip-flop FSP1; the flip-flop receives clock signals from the ungated clock driver CU010. Resetting signals are applied to the flip-flop from an AND-gate 2186 which logically combines line marker pulse amplifier signal ALM11, and space paper set output signal FSP11. The logical conjunction of these signals provided by an AND-gate 2186 yields a signal which is applied to the reset input terminal of the Space Paper flip-flop FSP1.

INDEX OF LOGIC EQUATIONS

Typewheel Marker Pulse Amplifier Signals $APW11 = /CU/JPW11\ MRD20$
$APW21 = /CU/JPW21\ MRD20$

[Line Marker]

$ALM = /CU/JLM11\ MD700$

[Single Clock Pulse Gate]

$ASC11 = /CU/SSC11$

GATED CLOCKS

Marker Track Follower $CG011 = /CU/FMF11\ FMS11(FMC10 + FMC20 + FMC30 + MD150)SIN10$ Block Buffer Load Sync $CG021 = /CU/FPC11\ FCC41(FIF11 + FED11)FBS10$ Column Address Counter Clock 1

$CG031 = /CU/KPB11\ FCD10\ FCD20\ FCD30\ FCD40 + FPC21\ FCC41\ XIG10\ FSPR0\ FEL10[(FWC11 + FWC21) + SRT11 + FAB11 + XPSE1](XNP10 + XEL11) + (FPC31\ FZS11 + KPB11)(XSK11 + APW21)$

Column Address Counter Clock 2

$CG041 = /CG031/FCA11\ FCA21\ FCA31\ FPC21 + (FPC31 + KPB11)(FCA11\ FCA21\ FCA31 + FSPR1) + XRT11 + XEL11$

Block Buffer Unload $CG051 = /CU/FPC21\ FAB10\ XPSE0\ FCC11\ FBS11$

Typeline Buffer Load $CG061 = /CU/FPC21\ FCC61(FZS10 + FPNS1)$

Typeline Buffer Unload $CG071 = /CU/(FPC31\ FPE11 + KPB11)FCD41\ FLP10\ FCD31$

Block Buffer Clear $CG081 = /CU/FWC10\ FWC21\ FED11\ FBS10\ FCC71$

Block Buffer Clear $CG091 = /CU/XED11 + SBT11 + XRS11$

Typeline Buffer Clear $CG101 = /CU/FBE10\ FPC21\ FPC40\ FEL11\ FET11\ FLPF0\ XTFA1\ FME10\ MD700\ EPC30 + FLP10\ KPB11\ FPE10\ MD200$ Typeline Buffer Clear $CG111 = /CU/FPE11\ APW21\ FSPR1 + XRS11$ Clock Line Driver $CLD11 = /CMD11/(SNC11 + ASC11)$ Main Clock Driver $CMD11 = /CMC11/ + 6\ v.$

FLIP-FLOPS

Numeric Word A-B Flip-Flop

*$FAB11 = /CU/FAB10\ FPC21\ FCC41(FWC11 + FWC21)FNW11$
*$FAB10 = /CU/FAB11\ FPC21(FCC41 + FNW10)$
$FAB10 = XRS11$

Automatic Slew Flip-Flop

*$FAS11 = /CU/ALM11\ AVF41\ AVF50[(FSR41\ FSR30\ FSR20\ FSR10 + FSR40\ XSD11 + FPS10)FPC41 + FSP11]$
*$FAS10 = /CU/ALM11\ AVF51$
$FAS10 = XRS11$

Buffer Error Flip-Flop

*$FBE11 = /CU/[FPC21(FIE41 + FIE81) + XIC11 + FPC21\ FCA71\ FCA61\ FCA51\ FCA41\ FEL10(FCC51 + FCC61) + FEL11\ FPC21(FCC41 + FCC51)XSS10 + FPC31\ XTFA0 + FIE51\ FPC21]SEI10$
$FBE10 = XRS11$

Backup Lockout Flip-Flop

*$FBLU1 = /CU/FMC31\ FMC21\ FLU21\ SIN10\ SBT11 + SNP11 + SIN11 + SRT11 + XRS11\ JBT10$
*$FBLU0 = /CU/JBT11 + EPC11\ FTF11\ XFC11$

Beta-Gamma Marker Tracking Flip-Flop

*FBG11=/CU/FLU21 FMC20 FMC31 SIN10
+JCD11 FBG10 FMF10 SIN11 JPRT1
*FBG10=/CU/FLU21 FMC21 FMC31 SIN10+SIN11
FBG11 FMF11+FTR11(FMC11+FMC21)FBG11
FMC30 FLU21
FBG10=XRS11

Buffer Status Flip-Flop

FBS11=ABF11+CG081
FBS10=ABE11+CG091

Block Buffer Status Follower Flip-Flop

*FBSF1=/CU/FBS11 FEL11 FCC01 XSS11
*FBSF0=/CU/FBS10 FEL11 FCC01 XSS11
FBSF0=XRS11

Column Address Counter

FCA11=XRS11
*FCA11=/CG031/FCA10+FSPR1+XEL11+XRT11
*FCA10=/CG031/FCAA11 FSPR0 XRT10 XEL10
FCA11=XRS11
*FCA21=/CG031/FCA11 FCA20+XEL11
+XRT11+FSPR1
*FCA20=/CG031/FCA11 FCA21 XEL10 XRT10
FSPR0
FCA31=XRS11
*FCA31=/CG031/FCA11 FCA21 FCA30+XEL11
+FSPR1+XRT11
*FCA30=/CG031/FCA11 FCA21 FCA31 FSPR0
XRT10 XEL10
FCA41=XRS11
*FCA41=/CG041/FCA40+XEL11+XRT11+FSPR1
*FCA40=/CG041/FCA41 FSPR0 XRT10 XEL10
FCA51=XRS11
*FCA51=/CG041/FCA41 FCA50+FSPR1
+XEL11+XRT11
*FCA50=/CG041/FCA41 FCA51 FSPR0
XEL10 XRT10
FCA61=XRS11
*FCA61=/CG041/FCA41 FCA51 FCA60
+FSPR1+XRT11+XEL11
*FCA60=/CG041/FCA41 FCA51 FCA61 FSPR0
XRT10 XEL10
FCA71=XRS11
*FCA71=/CG041/FCA41 FCA51 FCA61 FCA70
+FSPR1+XRT11+XEL11
*FCA70=/CG041/FCA41 FCA51 FCA61 FCA71
FSPR0 XRT10 XEL10

Control Counter

*FCC01=/CU/FCC71+FET11 FCC51 FPC21
*FCC00=/CU/FCC01[FCP11(FED11 FBS10
+FBG11 FMF10 SIN11)+FPC21(FCD11 FCD41
+FCC11)+FPE11 APW21 FSPR1 FBSF1
+FPC11 SIN10 SNP10 JPC11]
*FCC11=/CU/[FPC11 FED11 FBS10
+FPC21(FCD11 FCD41+XLC11 MD110 MD200
FEL10)]FCC01+FPC21 FCC41(FWC10 FWC20
SRT10 FAB10+XIG11+XNP11)FET10
FSPR0(XPSE0+FNS10)
*FCC10=/CU/FCC11
*FCC21=/CU/FCC11+FPE11 APW21 FSPR1 FBSF1
*FCC20=/CU/FCC21(FPC11+FPC21
FCC31 MD200)
*FCC31=/CU/FPC11 FBG11 FMF10 SIN11+FCC21
*FCC30=/CU/FCC31(FPC11+FPC21 FCC20)
*FCC41=/CU/JPC11 FPC11 SIN10 SNP10
+FCC31 FCC20
*FCC40=/CU/FCC41(FPC20+FSPR0)(FCC11/*
+FCC51/*)
*FCC51=/CU/FCC41 FEL10 XRT10 XIG10
XNP10[FNS`1 XPSE1+(FWC11+FWC21
+FAB11+SRT11)]+FCC41(FPC20
+FSPR0 FET11)
*FCC50=/CU/FCC51

*FCC61=/CU/FCC51(FPC20+FET10)
*FCC60=/CU/FCC61
*FCC71=/CU/FCC61+*FPC11
*FCC70=/CU/FCC71

Fast Countdown Flip-Flop

*FCD11=/CU/FCD10(FCD21+FCD31+FCD41)
+FCP21 FCC61+FPC31 FZS11 APW21
(FSPR0+FPE10)+KPB11 FCD10+FCD20
FCD30 FCD40 FLP10 MD200
*FCD10=/CU/FCD11
*FDC21=/CU/FCD11 FCD20(FCD30+FCD40)
*FCD20=/CU/FCD11 FCD21
*FCD31=/CU/FCD11 FCD21 FCD30
*FCD30=/CU/FCD11 FCD31(FCD21+FCD41)
*FCD41=/CU/FCD11 FCD21 FCD31 FCD40
*FCD40=/CU/FCD11 FCD20 FCD31 FCD41

Character Loaded Flip-Flop

*FCL11=/CU/FIF11 FCL10 FCC41 FPC11
FCL11=SNP21
*FCL10=/CU/FBS11 FPC11 FLC11 FTF10
FCL10=XRS11

End of Line Detect Flip-Flop

*FEL11=/CU/(XEL11 SRT10+XRT11)FCC41
FSPR0
*FEL10=/CU/FPC40 FCC01 FEL11 XSS11
FEL10=XRS11

End of Data Generator Flip-Flop

*FED11=/CU/(FBG10 SIN10+JPRT0 SIN11)
FCL11 FCC01 FPC11 FED10 SRT10 FBS10
*FED10=/CU/FED11 FBS11 FCC01
FED10=XRS11

End of Transfer Cycle Detect

*FET11=/CU/FPC21(FEL11+XRT11)FCC31
FCC20[FWC10 FWC20(FMR10+FMR20)
+XRT11+(FWC11+FWC21)(XED11+XIG10
XEF10)FNW10]
*FET10=/CU/FET11 FCC51
FET10=XRS11

File Code Sequence Flip-Flop

*FCCS1=/CU/FPC11 FNW10 XFCS1+FLU21 FMC20
FMC31 FTR11 FFT11
*FFCS0=/CU/FPC11 XEF11+STR10 FLU21 FMC20
FMC31 FTR11 FFT10
FFCS0=XRS11

File Tracking Flip-Flop

*FFT11=/CU/FIF11 FPC11 FLU21 FMC20
FMC31 FTF11
*FFT0=/CU/FIF10 FPC11 FLU21 FMC20 FMC31
FTF11+FBLU1 FFT11

Load Anticipate Flip-Flop

*FHH11=/CU/FBS10 FCL10 FIE10 SIN11 FPC11
XRS10 FBE10 JTR11
*FHH10=/CU/FHH11 SIN11 JPRT0 FBS11 FPC11
FHH10=XRS11

Input Error Flip-Flop

*FIE11=/CU/[FIE21+FIE31+FIE41 FPC11
+FIE51 FPC11+FIE61+FIE71+FIE81 FPC11]
(JPRT0 FHH11 SIN11+FBG10 SIN10)SEI10
*FIE10=/CU/SEI11
FIE10=SBT11+XRS11
*FIE21=/CU/FPC11 XCP31 SNP10 SIN10
FIE20=SBT11+XRS11
*FIE31=/CU/FPC11 XCP61 SNP10 SIN10
FIE30=SBT11+XRS11
*FIE41=/CU/XFB11(SNP10 FED10 FPC11+FPC21
FEL10 XPSE0)(FWC11+FWC21)
FIE40=SBT11+XRS11
*FIE51=/CU/SIN10 FBS11 FCC41 FPC11+FBS11
FBG11 SIN11 FPC11+FPC21 FBS10 FCC11 FEL10

FIE50=SBT11+XRS11
*FIE61=/CU/XEF11 FFCS0 FPC11 SIN10 FBLU0
+XFCS1 FFCS1 FPC11 SIN10 FBL0
FIE60=SBT11+XRS11
*FIE71=/CU/FPC77 XSE11
FIE70=SBT+XRS11
*FIE81=/CU/XRP11
FIE80=SBT11+XRS11

In File Flip-Flop

*FIF11=/CU/FNW10 XFS11 FPC11 FCC41 FSC10
+FLU21 FMC20 FMC31 FTR11 FFT11+SRT11
+SIN11
*FIF10=/CU/[XEF11 FPC11 FCC41+FLU21 FMC20
FMC31 FTR11 FFT10]SRT10
FIF10=(SNP11+XRS11)

Line Printed Flip-Flop

*FLP11=/CU/FPE11 FSPR1(APW21+KPB11)
*FLP10=/CU/FED10 FLP11 FBS11
FLP10=XRS11

Last Paper Form Flip-Flop

*FLPF1=/CU/JLF11 ALM11 AVF41 5VF51
*FLPR0=/CU/JLF10(SPR11+SPL11)
FLPF0=XRS11

Marker Check Lockup Flip-Flops

*FLU11=/CU/FLU10 MD151
*FLU10=/CU/FLU11 FLU21
*FLU21=/CU/MD150 FLU11 FLU20
*FLU20=/CU/FLU21

Marker Track Counter Flip-Flops

*FMC11=/CG011/FMC10 MD151
*FMC10=/CG011/FMC11+MD150
*FMC21=/CG011/FMC11 FMC20 MD151
*FMC20=/CG011/FMC11 FMC21+MD150
*FMC31=/CG011/FMC11 FMC21 FMC30 MD151
*FMC30=/CG011/MD150

Mechanism Error Flip-Flop

*FME11=/CU/FME21+FME31
+FME41+FME51+FME61
FME10=SPL11+XRS11
*FME21=/CU/FPRA1 ALM11
FME20=SPL11+XRS11
*FME31=/CU/FPC41 AVF41 AVF51
FSR40 ALM11 XSD10
FME30=SPL11+XRS11
*FME41=/CU/XVB11 ALM11
FME40=SPL11+XRS11
*FME51=/CU/FPC40 ALM11 FSL10 FSP10 FAS10
FME50=SPL11+XRS11
*FME61=/CU/FPC41 XVP31 ALM11
FME60=SPL11+XRS11

Tape Marker Follower Flip-Flop

*FMF11=/CU/FMF10(JTM10 SIN10+SIN11
FBG11)(FPC11+SNP11+FTR11)
*FMF10=/CU/FMF11(SIN10+SIN11 JCD10)
(FPC11+SNP11+FTR11)
FMF10=XRS11

Memory Register

*FMR11=/CU/FCC71 FPC11+FCC11 FPC21
FAB10
FMR11=XRS11
*FMR10=/CU/JBR11 FPC11 JT061 SIN10+SIN11
JI061 FCC31 FPC11+XPSE1 FNS11 FCC21
FMR10=AMB11 FPC21
*FMR21=/CU/FCC71 FPC11+FCC11 FPC21
FAB10
*FMR21=/CU/FCC71 EPC11+FCC 11 EPC21
FAB10
JI071 FCC31 FPC11

*FMR20=/CU/JBH11 FPC11 JT071 SIN10+SIN11
JI071 FCC31 FPC11
FMR20=AMB21 EPC21
*FMR31=/CU/FCC71 FPC11+FCC11 FPC21
FAB10
FMR31=XRS11
*FMR30=/CU/JBH11 FPC11 JT081 SIN10+SIN11
JI081 FCC31 EPC11
FMR30=AMB31 FPC21
*FMR41=/CU/FCC71 FPC11+FCC11 FPC21
FAB10
FMR41=XRS11
*FMR40=/CU/JBH11 FPC11 JT091 SIN10+SIN11
JI091 FCC31 FPC11
FMR40=AMB41 FPC21
*FMR51=/CU/FCC71 FPC11+FCC11 FPC21
FAB10
FMR51=XRS11
*FMR50=/CU/JAH11 FPC11 JT011 SIN10+SIN11
JI011 FCC31 FPC11+XPSE1 FNS11 FCC21
+FPC11 FED11 FCC31
FMR50=AMB51 FPC21
*FMR61=/CU/FCC71 FPC11+FCC11 FPC21
FAB10
FMR61=XRS11
*FMR60=/CU/JAH11 FPC11 JT021 SIN10+SIN11
JI021 FCC31 FPC11+FPC11 FED11 FCC31
FMR60=AMB61 FPC21
*FMR71=/CU/FCC71 FPC11+FCC11 FPC21
FAB10
FMR71=XRS11
*FMR70=/CU/JAH11 FPC11 JT031 SIN10+SIN11
JI031 FCC31 FPC11=FPC11 FED11 FCC31
FMR70=AMB70 FPC21
*FMR81=/CU/FCC71 FPC11+FCC11 FPC21
FAB10
FMR81=XRS11
*FMR80=/CU/JAH11 FPC11 JT041 SIN10+SIN11
JI041 FCC31 FPC11+FPC11 FED 11 FCC31
FMR80=AMB81 FPC21
*FMR91=/CU/FCC71 FPC11+FCC11 FPC21
FAB10
FMR91=XRS11
*FMR90=/CU/JAH11 FPC11 JT051 SIN10
*FMR01=/CU/FCC71 FPC11+FCC11 FPC21
FAB10
FMR01+XRS11
*FMR00=/CU/JBH11 FPC11 JT101 SIN10

Marker Scaling Flip-Flop

*FMS11=/CU/FMF11 FMS10 SIN10
*FMS10=/CU/FMF11 FMS11 SIN10
FMS10=XRS11

Numeric Word Sign Flip-Flop

*FNS11=/CU/FPC21 FCC41 FWC10
FWC20 FMR 31 FAB 10
*FNS10=/CU/FPC21 FCC41 FWC10
FWC20 FMR30 FAB10
FNS10=XRS11

Numeric Word Flip-Flop

*FNW11=/CU/FWC10 FWC20(FMR10+FMR20)
FCC41(FPC11+FPC21)XPSE0+SRT11
*FNW10=/CU/FWC10 FWC20 FMR11 FMR21
FCC41(FPC11+FPC21)SRT10 FAB10+FCC41
XPSE1

Program Counter

*FPC11=/CU/[FBE10 FIE10(FPC40 FEL11
FCC01 XSS11 FLPF0 FME10 STM10 FPL10
+(SPR11+SIN11 FRS10)XPC01+SPL11]
+STM11 FPL10(XSD11+FSR10 FSR20 FRS30
FSR41 ALM11 FBS10 FSC10(LPOR1+XPR11)

*FPC10=/CU/FPC30 FBS11 FED10 FCC01 FCL10
(FBG10 SIN10+JPRT0 SIN11 FHH10)
FPC10=XRS11
*FPC21=/CU/[FIE10 FPC11 FPC30 FED10
FCL10 FCC01(FBG10 SIN10+SIN11 JPRT0
FHH10)+FBE10 FLP11 FED10 STM10 EPL10
FPC10+(SPL11+SPR11)]+STM11 EPL10
(XSD11+FSR10 FSR20 FSR30 FSR41 ALM11)
FBS11
*FPC20=/CU/FPC40 FEL11 FCC01 XSS11 FLPF0
FME10
FPC20=XRS11
FPC31=(CG101) C.T.
*FPC30=XRS11
FPC30=(CG111) C.T.
*FPC41=/CU/FBE10 FPC31 FPE11 APW21
[FSPR1+SHSP1 FCA61 FCA51 FCA41 FCA30
FCA21(FCA10 JRE11+FCA11 JRN11)]
*FPC40=/CU/XSD11+FSR10 FSR20 FSR30 FSR41
ALM11+FBE11+AVF51 ALM11+FME11
FPC40=XRS11

Print Enable Flip-Flop

*FPE11=/CU/MD200 FPE10(FPM10 XLC11+FPM11
FCA70 FCA61 FCA51 FCA41 FCA31) FPC31 FLP10
(APW21 FZS11+KPB11)
*FPE10=/CU/FPE11 FSPR1(APW21+KPB11)
FPE10=XRS11

Print One Line Flip-Flop

FPL11=/CU/SPL11+SST11
FLP10=/CU/SPR11+XRS11

Print MICR Characters Flip-Flop

*FPM11=/CU/FPC21 FNW10 FWC11 FWC21 FMR80
FMR71 FMR61 FMR51 FMR40 FMR30 FMR20
FMR11 SRT10 JRE11 FCC41 FEL10 XLC11
*FPM10=/CU/FPC21 FCC41(FWC11+FWC21)
{FNW11(FMR80 FMR71 FMR61 FMR51 FAB10
+FMR40 FMR31 FMR21 FMR11 FAB11)+FNW10
FPM11[FMR61+FMR51 FMR41+FMR51(FMR31
+FMR21+FMR11)(FMR30+FMR20+FMR10)
+FMR50 FMR40 FMR31 FMR21 FMR11]}FEL10
XNP10+FSPR1(APW21+KPB11)FPE11
FPM10=XRS11

Print Negative Sign Flip-Flop

*FPNS1=/CG031/FPC21 FWC10 FWC20 FAB10
FCC41 FNS11 XPSE1
*FPNS0=/CG031/XPSE0

Paper Runaway Flip-Flop

*FPRA1=/CU/ALM11 AVF51 FPRA0 FSL10 FSP10
*FPRA0=/CU/XSL10 FPRA1
FPRA0=XRS11+SPL11

Programmed Slew Flip-Flop

*FPS11=/CU/XRS11(FMR31+FMR21+FMR11)__
*FPS10=/CU/XSD11+FSR10 FSR20 FSR30 FSR41
ALM11
FPS10=XRS11

Row Parity Flip-Flop

*FRP11=/CU/(FMR11 FMR50+FMR10 FMR51)
FRP10(FPC11 FCC51 FED10+FPC21 FCC41
FAB10 FET10 FSPR0 XPSE0)+FWC10 FWC20
(FPC11 FCC41 FED10+FPC21 FCC21 FAB10
XSPE0)
*FRP10=/CU/(FMR11 FMR50+FMR10 FMR51)
FRP11(FPC11 FCC51 FED10+FPC21 FCC41
FAB10 FET10 FSPR0 XPSE0)
FRP10=XRS11
*FRP21=/CU/(FMR21 FMR60+FMR20 FMR61)
FRP20(FPC11 FCC51 FED10+FPC21 FCC41
FAB10 FET10 FSPR0 XPSE0)+FWC10 FWC20
(FPC11 FCC41 FED10+FPC21 FCC21 FAB10
XSPE0)
*FRP20=/CU/(FMR21 FMR60+FMR20 FMR61)
FRP21(FPC11 FCC51 FED10+FPC21 FCC41
FAB10 FET10 FSPR0 XPSE0)
FRP20=XRS11
*FRP31=/CU/(FMR31 FMR70+FMR30 FMR71)
FRP30(FPC11 FCC51 FED10+FPC21 FCC41
FAB10 FET10 FSPR0 XPSE0)+FWC10 FWC20
(FPC11 FCC41 FED10+FPC21 FCC21 FAB10
XSPE0)
*FRP30=/CU/(FMR31 FMR70+FMR30 FMR71)
FRP31(FPC11 FCC51 FED10+FPC21 FCC41
FAB10 FET10 FSPR0 XPSE0)
*FRP30=XRS11
*FRP41=/CU/(FMR41 FMR80+FMR40 FMR81)
FRP40(FPC11 FCC51 FED10+FPC21 FCC41
FAB10 FET10 FSPR00 XPSE0)+FWC10 FWC20
(FPC11 FCC41 FED10+FPC21 FCC21 FAB10
XSPE0)
*FRP40=/CU/(FMR41 FMR80+FMR40 FMR81)
FRP41(FPC11 FCC51 FED10+FPC21 FCC41
FAB10 FET10 FSPR0 XPSE0)
FRP40=XRS11

On Line Reset Flip-Flop

*FRS11=/CU/JCPR1 SIN11 FRS10
*FRS10=/CU/MRD10 FRS11

Stop Code Store Flip-Flop

*FSC11=/CU/FIF11 XSC11 FCC41 FPC11 SIN10
FSC10=XRS11

Stop Printing Flip-Flop

*FSPR1=/CU/XSP11+FPC21(FPC41+MD701
+FAS11+FLPF1+FME11)(FCC31 FCC20
+FCC41)(XRT11+FMR80 FMR71 FMR60 FWC11
FWC21 FNW10 SRT10)
*FSPR0=/CU/(*FSPR1) Inverted Set VFU Loop Flip-Flop

FSL11=SSL11
*FSL10=/CU/ALM11 AVF41 AVF51 FSL11
FSL10=XRS11

Space Paper Flip-Flop

FSP11=SSP11
*FSP10=/CU/ALM11 FSP11

Slew Code Register

*FSR11=/CU/XSR11 FMR11+(FPC41+XSLE1)
FSR41 FSR10 XSCD1+PSE10 XPS11 FCC41
*FSR10=/CU/(FPC41+XSL31)(FSR41 FSR11
XSCD1)+ALM11 AVF51 FPC41+XSD11 FPC41
FSR10=XRS11
*FSR21=/CU/XSR11 FMR21+(FPC41+XSLE1)
FSR10 FSR20 FSR41 XSC01+PSE11 XPS11 FCC41
FSR30=XRS11
*FSR41=/CU/XPS11 FCC41+XSR11 FMR41+SRT11
*FSR40=/CU/XSR11 FMR40 SRT10 XPS10
FSR40=XRS11

Tape Forward Flip-Flop

*FTF11=/CU/(FBS10 FSC10 FTF10 FPC11 FED10
+SNP11)SIN10 JET10
*FTF10=/CU/FBG10 FTF11(FCL11+FIE11)SNP10
+JET11
FTF10=XRS11

Tape Reverse Flip-Flop

*FTR11=/CU/SBT11 SIN10 NBT11 FTF10
*FTR10=/CU/FTR11 FBG11 FLU21 FMC30(FMC11
+FMC21)+JBT11
FTR10=XRS11

Word Character Counter

*FWC11=/CU/FWC10[FCC41 FPC11+FPC21
FCC41(FNW10+FAB10 XPSE0)FET10]
*FWC10=/CU/FWC11[(FCC41+FLU21 FMC20

FMC31)FPC11+FPC21 FCC41(FNW10+FAB10
+XPSE0)FSPR FET10]+FCC01 FPC11 FBS11
+FPC11
FWC10=XRS11
*FWC21=/CU/FWC11 FWC20[FCC41 FPC11
+FPC21 FCC41(FNW10+FAB10 XPSE0)FET10]
*FWC20=/CU/FWC11 FWC21[(FCC41+FLU21
FMC20 FMC31)FPC11+FPC21 FCC41(FNW10
+FAB10 XPSE0) FSPR0 FET10]+FCC01 FPC11
FBS11+FPC11
FWC20=XRS11

Slew Code Register

*FSR20=/CU/(FPC41+XSLE1)(FSR10 FSR21
FSR41 XSCD1)+ALM11 AVF51+XSD11 FPC41
FSR20=XRS11
*FSR31=/CU/XSR11 FMR31
*FSR30=/CU/(FPC41+XSLE1)(FSR10 FSR20 FSR31
FSR41 XSCD1)+XSD11+ALM11 AVF51 FPC41

Zero Suppress Flip-Flop

*FZS11=/CU/FCC21 FCC31(PZS$_{01}^{25}$)FET10 FPC21
SRT10+FPC31 APW11 XSL10 MD200
*FZS10=/CU/FCC20 FCC31[(PZF$_{01}^{25}$)+(FNW10
+XNZ11+FPM11)(FWC11+FWC21+FAB11)]
FPC21+FPC21 FPC40 FEL11+APW21 FPE11
FSPR1
FZS10=XRS11

ONE SHOTS

Marker Track Detect Enable, 1500 μsec.

*MD151=/CU/FMF11 FMS11 SIN10

Corner Buffer Load-Unload Inhibit, 200 μsec.

*MD201=MD200 FPE10 KPB11
MD201=CG101+CG111

End of Slew Delay, 7 millisec.

*MD701=/CU/XSD11+FSR10 FSR20
FSR30 FSR41 ALM11+ALM11 AVF51

Block Buffer Load-Unload Inhibit, 110 μsec.

MD111=ABE11+ABF11+CG081+CG091

On Line Reset Flip-Flop Delay, 100 μsec.

*MRD11=JCPR1 SIN 11 FRS10

Buffer Clear Delay One Shot, 6 millisec.

*MRD21=XRS11
MRD21=MRD20 (inv.)

Lister Flip-Flop Reset Delay, 400 μsec.

*MTD11=/CU/CG071 FTD20

DECODES

Corner Buffer Column Address Decodes

XC011=FCA40 FCA50 FCA60 FCA70 FPC21
XC021=FCA41 FCA50 FCA60 FCA70 FPC21
XC031=FCA40 FCA51 FCA60 FCA70 FPC21
XC041=FCA41 FCA51 FCA60 FCA70 FPC21
XC051=FCA40 FCA50 FCA61 FCA70 FPC21
XC061=FCA41 FCA50 FCA61 FCA70 FPC21
XC071=FCA40 FCA51 FCA61 FCA70 FPC21
XC081=FCA41 FCA51 FCA61 FCA70 FPC21
XC091=FCA40 FCA50 FCA60 FCA71 FPC21
XC101=FCA41 FCA50 FCA60 FCA71 FPC21
XC111=FCA40 FCA51 FCA60 FCA71 FPC21
XC121=FCA41 FCA51 FCA60 FCA71 FPC21
XC131=FCA40 FCA50 FCA61 FCA71 FPC21
XC141=FCA41 FCA50 FCA61 FCA71 FPC21
XC151=FCA40 FCA51 FCA61 FCA71 FPC21
XC161=FCA41 FCA51 FCA61 FCA71 FPC21
XCB11=FCA10 FCA20 FCA30 FPC21
XCB21=FCA11 FCA20 FCA30 FPC21
XCB31=FCA10 FCA21 FCA30 FPC21
XCB41=FCA11 FCA21 FCA30 FPC21
XCB51=FCA10 FCA20 FCA31 FPC21
XCB61=FCA11 FCA20 FCA31 FPC21
XCB71=FCA10 FCA21 FCA31 FPC21
XCB81=FCA11 FCA21 FCA31 FPC21

Corner Buffer Character Decodes

XCD11=[FMR60 FMR50 FMR40 FNW10+FNW11
(FMR40 FAB10+FMR80 FAB11)]FPC21 XRC10
+(FCA60 FCA50 FCA40)(FPC31+KPB11)
XCD21=[FMR60 FMR50 FMR41 FNW10+FNW11
(FMR41 FAB10+FMR81 FAB11)]FPC21 XRC10
+(FCA60 FCA50 FCA41)(FPC31+KPB11)
XCD31=(FMR60 FMR51 FMR40 XRC10 FNW10
+FMR11 FMR21 XRC11)FPC21+(FCA60 FCA51
FCA40)(FPC31+KPB11)
XCD41=FMR60 FMR51 FMR41 XRC10 FPC21
FNW10+(FCA60 FCA51 FCA41)(FPC31+KPB11)
XCD51=[FMR61 FMR50 FMR40 XRC10 FNW10
+FMR31 FMR41(FMR10+FMR20)XRC11]FPC21
+FCA61 FCA50 FCA40(FPC31+KPB11)
XCD61=[FMR61 FMR50 FMR41 XRC10 FNW10
+(FMR40 FMR31+FMR41 FMR30)(FMR10
+FMR20)XRC11]FPC21+(FCA61 FCA50 FCA41)
(FPC31+KPB11)
XCD71=FMR61 FMR51 FMR40 XRC10 FPC21
FNW10+FCA61 FCA51 FCA40(FPC31+KPB11)
XCD81=FMR61 FMR51 FMR41 XRC10 FPC21
FNW10+FCA61 FCA51 FCA41(FPC31+KPB11)
XCE11=[FMR30 FMR20 FMR10(FNW10+FAB10)
+FMR70 FMR60 FMR50 FNW11 FAB11]XRC10
FPC21+FCA30 FCA20 FCA10(FPC31+KPB11)
XCE21=[FMR30 FMR20 FMR11(FNW10+FAB10)
FMR70 FMR60 FMR51 FNW11 FAB11]XRC10
FPC21+FMR40 FMR30 FMR21 FMR11 XRC11
FPC21+FCA30 FCA20 FCA11(FPC31+KPB11)
XCE31={[FMR30 FMR21 FMR10(FNW10+FAB10)
+FMR70 FMR61 FMR50 FNW11 FAB11]XRC10
+[FMR40 FMR31 FMR21 FMR11+FMR41 FMR30
(FMR20+FMR10)]XRC11}FPC21+FCA30 FCA21
FCA10(FPC31+KPB11)
XCE41={[FMR30 FMR21 FMR11(FNW10+FAB10)
+FMR70 FMR61 FMR51 FNW11 FAB11]XRC10
+FMR41 FMR30 FMR21 FMR11 XRC11}FPC21
+FCA30 FCA21 FCA11(FPC31+KPB11)
XCE51={[FMR31 FMR20 FMR10(FNW10+FAB10)
+FMR71 FMR60 FMR50 FNW11 FAB11]XRC10
+FMR41 FMR31 XRC}FPC21
+FCA31 FCA20 FCA10(FPC31+KPB11)
XCE61=[FMR31 FMR20 FMR11(FNW10+FAB10)
+FMR71 FMR60 FMR51 FNW11 FAB11]
XRC10 FPC21+FCA31 FCA20 FCA11(FPC31
+KPB11)
XCE71={[FMR31 FMR21 FMR10 (FNW10
+FAB10)+FMR71 FMR60 FMR51 FNW11
FAB11]XRC10 FPC21+FCA31 FCA20 FCA11
(FPC31+KPB11)
XCE71={[FMR31 FMR21 FMR10 (FNW10+FAB10)
+FMR71 FMR61 FMR50 FNW11 FAB11]XRC10
+FMR40 FMR31(FMR20+FMR10)XRC11}FPC21
+FCA31 FCA21 FCA10(FPC31+KPB11)

Column Parity Checks

XCP11=FMR11 FMR20 FMR30 FMR40+FMR10
FMR21 FMR30 FMR40+FMR10 FMR20 FMR31
FMR40+FMR10 FMR20 FMR30 FMR41+FMR11
FMR21 FMR31 FMR40+FMR11 FMR21 FMR30
FMR41+FMR11 FMR20 FMR31 FMR41+FMR10
FMR21 FMR31 FMR41
XCP21=FMR10 FMR20 FMR30 FMR40+FMR11
FMR21 FMR30 FMR40+FMR11 FMR20 FMR31
FMR40+FMR11 FMR20 FMR30 FMR41+FMR10
FMR21 FMR31 FMR40+FMR10 FMR21 FMR30
FMR41+FMR10 FMR20 FMR31 FMR41
XCP31=(XCP11 FMR00+XCP21 FMR01)
(FCC51+FCC61)FED10 FPC11
XCP41=FMR51 FMR60 FMR70 FMR80+FMR50
FMR61 FMR70 FMR80+FMR50 FMR60 FMR71

FMR80+FMR50 FMR60 FMR70 FMR81+FMR51
FMR61 FMR71 FMR80+FMR51 FMR61 FMR70
FMR81+FMR51 FMR60 FMR71 FMR81+FMR50
FMR61 FMR71 FMR81
$XCP51 = FMR50\ FMR60\ FMR70\ FMR80 + FMR51$
FMR61 FMR70 FMR80+FMR51 FMR60 FMR71
FMR80+FMR51 FMR60 FMR70 FMR81+FMR50
FMR61 FMR71 FMR80+FMR51 FMR60 FMR61
FMR70 FMR81+FMR50 FMR60 FMR71 FMR81
$XCP61 = (XCP41\ FMR90 + XCP51\ FMR91)(FCC51 + FCC61)FED10\ FPC11$

Buffer End of Data Code Detect $XED11 = FMR80\ FMR70\ FMR60\ FMR50\ FMR41$
$FMR31\ FMR21\ FMR11\ FEL11(FWC11 + FWC21)$
$FCC41\ FPC21\ SRT10$ End of File Code Detect $XEF11 = XFC11\ FMR40\ FMR30\ FMR20$
$\qquad FMR10\ FNW10$
$XEF10 = XEF11$ (inv.)

Forbidden Code Detect $XFB11 = (FMR11\ FMR21\ FMR31\ FMR41 + FMR51\ FMR61\ FMR71\ FMR81)FCC41$ File Code "N" Detect $XFC11 = FMR80\ FMR71\ FMR61\ FMR50\ FWC11$
$FWC21(FCC41\ FPC11 + FPC21\ FCC31\ FCC20)$
$FNW10\ SIN10$ End of Line Code Detect $XEL11 = FWC11\ FWC21\ FMR80\ FMR71\ FMR60$
$FCC41\ FNW10\ SRT10\ FPC21$
$XEL10 = FWC10 + FWC20 + FMR81 + FMR70 + FMR61 + FCC40 + FNW11 + SRT11 + FPC20$ File Code Select Decode $XFS11 = XFC11\ FPC11(XSF11 + XSF21 + XSF31 + XSF41 + XSF51)$ File Code Start Detect $XFCS1 = XFC11(FMR11 + FMR21 + FMR31 + FMR41)$ Program Counter Error $XIC11 = FPC11\ FPC21\ FEL10 + FPC21\ FPC31\ FEL10 + FPC31\ FPC41\ XLC11$ Ignore Character Detect $XIG11 = FMR60\ FMR51\ FMR40\ FMR31\ FMR21$
$FMR11(FWC11 + FWC21)FNW10\ FMR70\ FMR80$ Column Address Counter Lockup Detect $XLC11 = FCA71\ FCA61\ FCA51$
$\qquad FCA41\ FCA31\ FCA21\ FCA11$ Non-Print Character Decode $XNP11 = FNW10\ FWC11\ FWC21$
$\qquad SRT10\ FPC21\ FMR80\ FMR71$ Numeric Word Non-Zero Detect $XNZ11 = (FMR11 + FMR21 + FMR31 + FMR41)$
$FAB11 + (FMR51 + FMR61 + FMR71 + FMR81)$
$FAB10$ Zero Program Count Decode $XPC01 = FPC10\ FPC20\ FPC30\ FPC40\ FIE10$ Printer Ready Decode $XPR11 = FIE10\ XRS10\ FBE10\ JTR11\ FME10\ PPR11$
$(SIN11 + SIN10\ JTRW0\ JTL11)$ Plugboard Slew Entry Detect $XPS11 = FEL10\ FPC40[XRT11\ FPC21 + FMR80\ FMR71$
$FMR60\ FPC21\ FWC11\ FWC21\ FNW10\ SRT10$
$(FMR51 + FMR30\ FMR20\ FMR10)]$
$XPS10 = XPS11$ (inv.)

Print Numeric Enable Decode $$XPSE = \left[\sum_1^{24} BPX\ PPS11\right]_{X=0}^{X=120} FNW11\ SRT10$$
$FWC10\ FWC20\ FPC21\ FAB10$ Unedited Mode Sign Character Print Enable $XRC11 = SRT11\ FWC11\ FWC20\ FAB10$
$XRC10 = SRT10 + FWC10 + FWC21 + FAB11$ Row Parity Detect $XRP11 = (FRP11 + FRP21 + FRP31 + FRP41)FWC10$
$FWC20\ [FPC21\ FAB10\ FCC11 + FCC61\ FPC11]$ Reset Line $XRS11 = SRS11 + KRS11$ Unedited Mode Column Address Counter Reset $XRT11 = SRT11\ FCA11\ FCA20\ FCA31\ FCA40$
$FCA50\ FCA60\ FCA71$
$XRT10 = SRT10 + FCA10 + FCA21 + FCA30 + FCA41 + FCA51 + FCA61 + FCA70$ Stop Code Detect $XSC11 = FMR80\ FMR71\ FMR60\ FRM51\ FMR41$
$FMR31\ FMR21\ FMR10\ FWC11\ FWC21\ SRT10$ Slew Count Down Gate $XSCD1 = (ALM11 + XSLE1)(FSR11 + FSR21 + FSR31 + FSR40)$ Slew Completed Detect $XSD11 = (AVF11\ FSR11 + AVF10\ FSR10)(AVF21$
$FSR21 + AVF20\ FSR20)(AVF31\ FSR31 + AVF30$
$FSR30)\ FSR40$
$XSD10 = (XSD11\ ALM11)$ (inv.)

Beta-Gamma Sequence Error $XSE11 = FPC11\ FLU21\ FMC31[FBG10$
$\qquad FMC21 + FBG11\ FMC20\ FMC10]$ Start of File "N" Code Detect $XSF11 = FMR11\ FMR20\ PSF11\ FMR40$
$XSF21 = FMR10\ FMR21\ PSF21$
$XSF31 = FMR11\ FMR21\ PSF31$
$XSF41 = FMR31\ PSF41$
$XSF51 = FMR41\ PSF51\ FMR10$
$XSF61 = FMR41\ FMR11\ PSF61$ Column Address Skip Count Decode $XSK11 = FCA11\ FCA21\ FCA31[FCA70(FCA41 + FCA51 + FCA61)$
$+ FCA71\ FPM11\ JRE11]$
$+ FCA11\ FCA20\ FCA31(FCA41\ FCA51 + FCA61)$
$+ FCA10\ FCA20\ FCA30\ FCA40(FCA51 + FCA61)$
$+ FCA10\ FCA21\ FCA31[FCA51(FCA40 + JRE11)$
$+ JRE11\ FCA40\ FCA61]$ Slew Paper Decode $XSL11 = FPC41 + FAS11 + FSL11 + FSP11$
$XSL10 = FPC40\ FAS10\ FSL10\ FSP10$ Slew Entry Enable Decode $XSLE1 = FBE10\ FSPR1\ FPE11\ APW21$ Stop Print Decode $XSP11 = [FCA61\ FCA51\ FCA41\ FCA31(JRN11\ FCA21 + JRE11\ FPM10)FPC31 + FCA71\ FCA41\ FCA31$
$FCA21\ FPM11\ JRE11]FPE11\ FCA10$ Slew Code Detect $XSR11 = FMR80\ FMR71\ FMR60\ FMR50\ FPC21\ SRT10$
$FWC11\ FWC21\ FNW10\ FPC40\ FCC41\ FEL10$ Slew Character In Store Detect $$XSS11 = FSR11 + FSR21 + FSR31$$

VFU Brush Parity $$XVP11 = AVF11\ AVF20\ AVF30\ AVF40 + AVF10$$
$$AVF21\ AVF30\ AVF40 + AVF10\ AVF20\ AVF31$$
$$AVF40 + AVF10\ AVF20\ AVF30\ AVF41 + AVF11$$
$$AVF21\ AVF31\ AVF40 + AVF11\ AVF21\ AVF30$$
$$AVF41 + AVF11\ AVF20\ AVF31\ AVF41 + AVF10$$
$$AVF21\ AVF31\ AVF41$$
$$XVP21 = AVF10\ AVF20\ AVF30\ AVF40 + AVF11$$
$$AVF21\ AVF30\ AVF40 + AVF11\ AVF20$$
$$AVF31\ AVF40 + AVF11\ AVF20\ AVF30\ AVF41$$
$$+ AVF10\ AVF21\ AVF31\ AVF40 + AVF10\ AVF21$$
$$AVF30\ AVF41 + AVF10\ AVF20\ AVF31\ AVF41$$
$$+ AVF11\ AVF21\ AVF31\ AVF41$$
$$XVP31 = XVP11\ AVF50\ AVF60 + XVP21\ AVF51$$
$$AVF60 + XVP21\ AVF50\ AVF61 + XVP11\ AVF51$$
$$AVF61$$

Broken VFU Loop Detect $$XVB11 = AVF11\ AVF21\ AVF31\ AVF41\ AVF51\ AVF61$$

SYSTEM OPERATION

Normal mode—Off-line

The description of the operation of the Multiple Font High Speed Printer Control System of the present invention will now be given in terms of the four cycles of operation: Fill, Transfer, Print and Slew. The description will be given in connection with timing diagrams to facilitate an appreciation of the interrelationship of the various system components.

Figure 226:
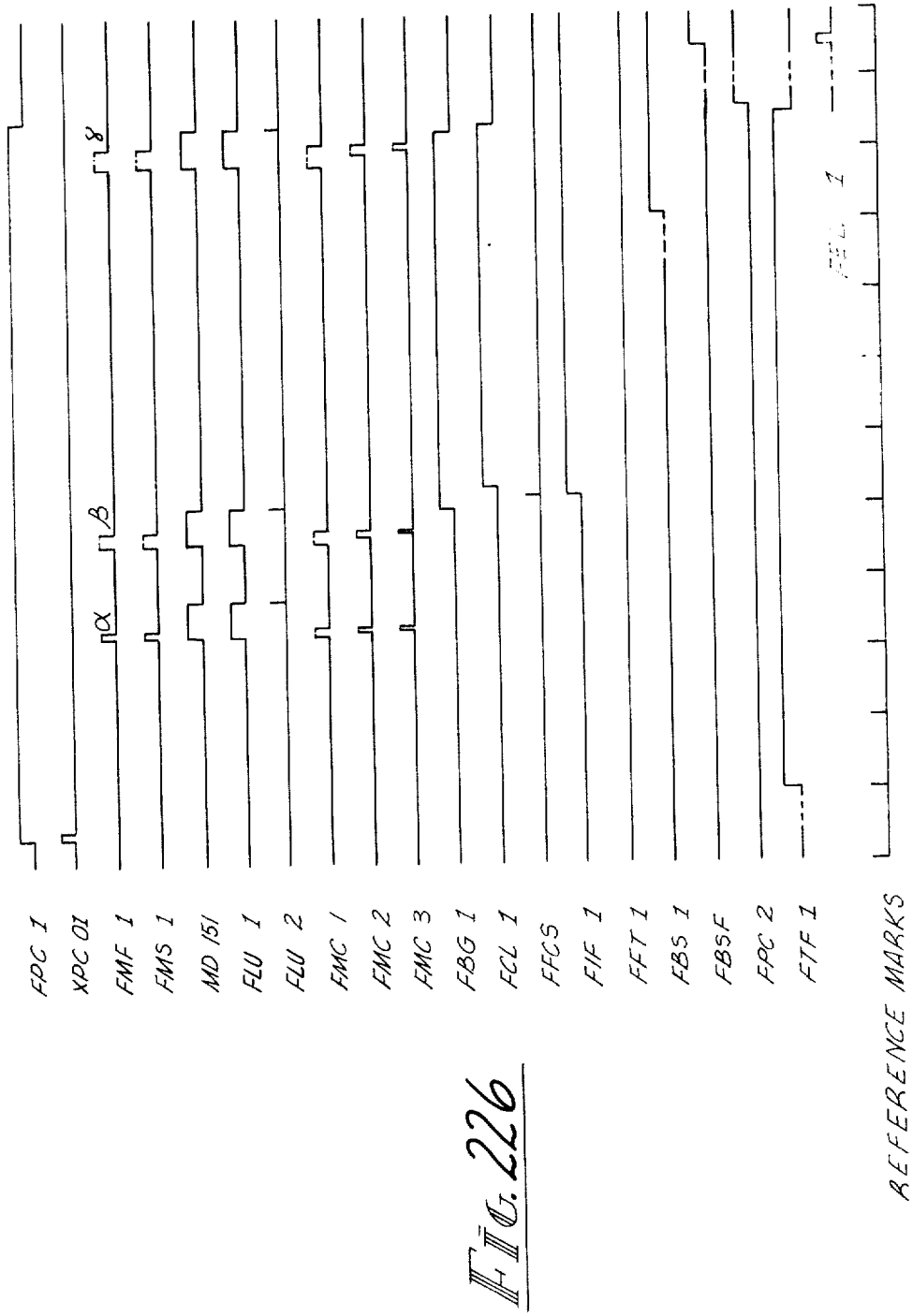
FIG. 226 is a timing diagram illustrating a portion of the operation of the present invention during the Fill cycle.

Assuming the Printer Control System is ready, and that the System is to operate off-line and in the normal mode (information to be received is both alphabetic and numeric and that the information received will be selected according to the appropriate file and edited). Referring to FIG. 226, the Program Counter flip-flop FPC1 assumes a true state indicating that the Fill cycle may now be entered; the zero program count detect decode signal XPC01 is true indicating that the Printer System is in the rest state and ready for operation. Thus, the Fill cycle is entered, and the tape is caused to move forward as indicated by the true state of the Tape Forward flip-flop FTF1. As the tape moves forward, marker track channel pulses are detected causing the marker detect logic to become activated. Upon the detection of an Alpha marker, the Marker Follower flip-flop FMF1, and Marker Scaler flip-flop FMS1 detect the number of pulses present in the marker channel. The marker track enable one-shot MD15 is activated to time the reception of the marker track pulses to insure that the pulses are received within a predetermined time. The Marker Lockup flip-flops FLU1 and FLU2 are set and reset in accordance with the timing of the marker track enable one-shot MD15.

The Marker Counter flip-flops FMC1, FMC2 and FMC3 count the number of pairs of marker pulses detected during the interval that the marker track enable detect one-shot MD15 is operating. The operation of the marker counter and the marker track channel logic will be described in greater detail later.

Upon the detection of a Beta marker, the Beta read channels are activated, and the data received from the tape amplifiers is loaded (in half-column assembly) into the Memory Register flip-flops FMR. After receipt of the information by the Memory Register flip-flops, data processing begins within the Printer Control System. The character position within a word is then compared against the word character counter. If a zero position, or control column, is indicated, the Mod 3 bits are examined for the identification of the word structure— numeric or alphanumeric. If the word is a numeric, the Numeric Word flip-flop FNW1 will assume the set state; conversely, if the word is an alphanumeric, the flip-flop will assume the reset state. The word character counter FWC is advanced for each character processed. The Beta-Gamma flip-flop FBG1 is set upon the detection of a Beta and reset upon the detection of a Gamma marker. This flip-flop is useful for insuring the proper Beta-Gamma, Beta-Gamma, etc. sequence.

Assuming that the word entered into the Memory Register is identified as an alphanumeric, and an Out of File condition exists, the character in the Memory Register flip-flops FMR is discarded as will be all succeeding characters of all words until a Begin File Code 1 is sensed in the least significant character position of an alphanumeric word. When the selected Begin File code has been sensed, the In File condition is established, and words will be loaded into the Block Buffer until either a Gamma tape marker or an End of File code is detected. Thus, the In File flip-flop FIF1 is set. Characters up to and including the End of File will be loaded. The selected file may start and end several times within one tape block; but only In File words are loaded into the Block Buffer. Upon receipt of the Gamma tape marker, the status of the Block Buffer is checked, as is the status of the Character Loaded flip-flop FCL1. If a word has been loaded into the Block Buffer, the Character Loaded flip-flop FCL1 will be set. If the buffer is full, the Buffer Status flip-flop FBS1 will be set. The Buffer Status Follower flip-flop FBSF, the condition of which is shown in FIG. 226, is set only if the Block Buffer had been completely unloaded during the preceding Transfer cycle.

Thus far, the magnetic tape has been moved forward and the information contained thereon has been supplied to the Memory Register of the Printer Control System. As the information is presented to the Memory Register, the character position within each word is compared with the word character counter to determine if the character is in the zero position, thus indicating a control column. When a control column is presented, the Mod 3 bits are examined to identify whether the word is numeric or alphanumeric. If the word is alphanumeric, the word character counter is once again compared with the character being presented to the Memory Register to sense the least significant character position which may contain command codes. When a Begin File code is sensed in this least significant character position of an alphanumeric word, an In File condition is established, and subsequent information may be entered into the Block Buffer for temporary storage.

Figure 227:
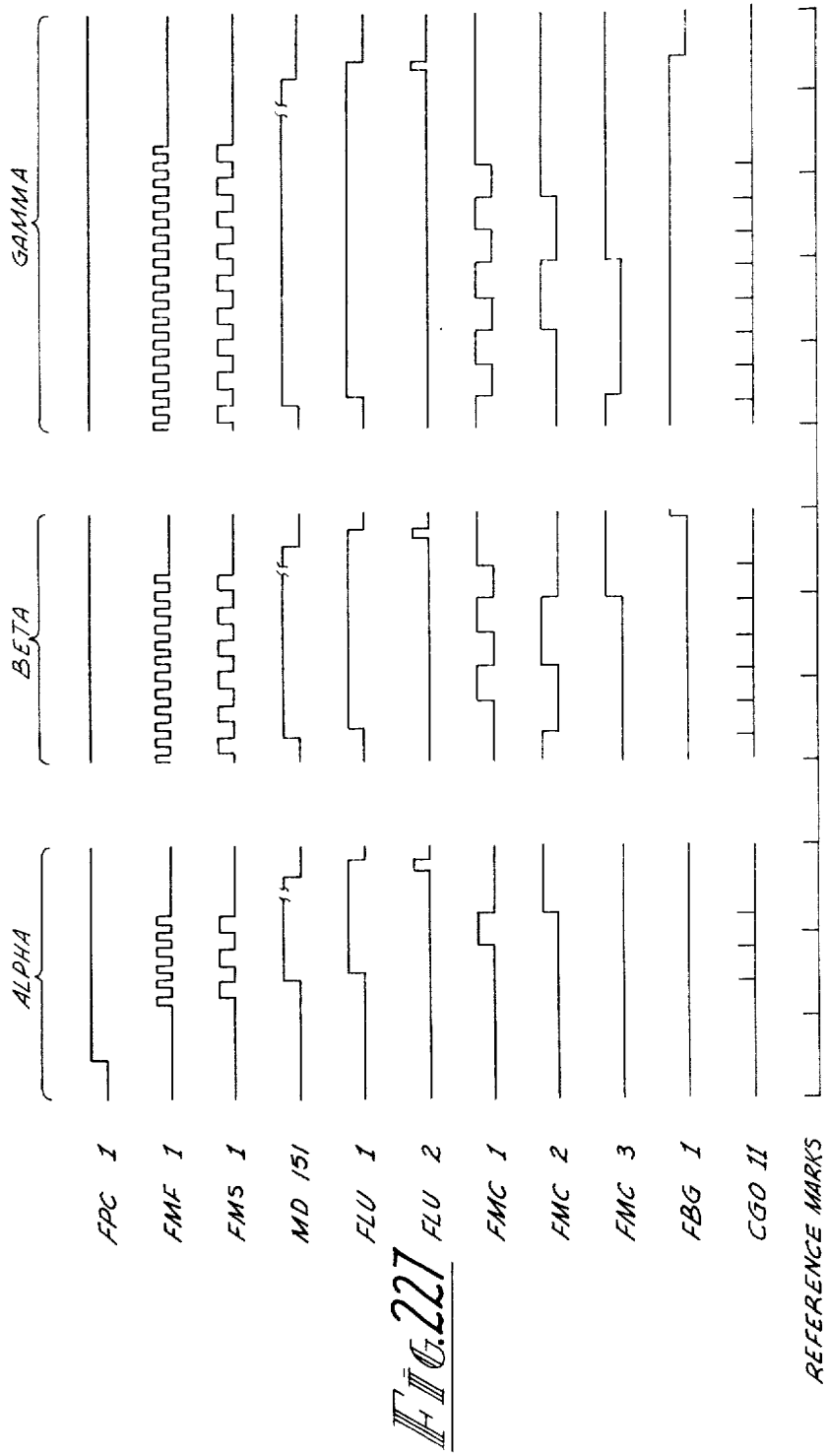
FIG. 227 is a timing diagram illustrating a portion of the operation of the present invention during the Fill cycle-track marker logic.

We may now consider the action of the marker detect logic in more detail with reference to FIG. 227. When the Program Counter flip-flop FPC1 is set, and the Fill cycle is established, the Marker Follower flip-flop FMF detects each bit present in the marker channel. When an Alpha marker is detected, the six bits contained therein cause the Marker Follower flip-flop FMF to change state from set to reset six times as indicated in FIG. 227. The Marker Scaler flip-flop FMS merely acts as a binary scaler and changes state each time the Marker Follower flip-flop is set and reset. The marker track detect enable one-shot MD15 is subsequently energized and forced to assume the unstable state for a predetermined time to insure that the marker track information is received from the tape within a predetermined maximum time. The Marker Check Lockup flip-flops FLU1 and FLU2 provide a means for deriving a timing pulse from the one-shot MD15 by assuming a set state one clock period after the one-shot assumes the unstable state (FLU1) and assuming the reset state after the one-shot MD15 assumes the stable state. Flip-flop FLU2 provides a one clock period pulse at the end of the one-shot MD15 timing period. The Marker Counter flip-flops FMC1-3 count the number of marker pulses to distinguish between the Alpha, Beta, and Gamma markers present in the marker channel of the magnetic tape. The Beta-Gamma flip-flop FBG1 is set after the detection of a Beta marker and is reset after the detection of a Gamma marker. The set condition of the Beta-Gamma flip-flop FBG1 indicates that the position on the magnetic tape for information has been reached and information, if any, may be read therefrom at this time.

Thus, after having reached the point that the character in the Memory Register has been transferred to the Block Buffer, and a complete tape block has been presented to the Memory Register, three possibilities exist:

(1) The Block Buffer is completely filled. In this instance the status is determined by the Block Buffer itself and will present a Buffer Full signal. The tape will be halted and entry into the Transfer cycle will be effected.

(2) Words have been loaded but the Block Buffer is not completely filled. In this instance, the magnetic tape is halted, and a sub-routine is entered, which causes an "End of Data in Buffer" code to be loaded into the block buffer and which changes the buffer status to unload, thus effecting an entry into the Transfer cycle.

(3) Nothing has been loaded during the Fill cycle, and no informamtion has been transferred from the magnetic tape to the Block Buffer during the tape block. The tape is not halted and a next block is read. The tape will continue to run without stopping until at least one character is loaded in the Block Buffer.

During the Fill cycle, all columns are parity checked whether In File or Out of File. Therefore, an input error may be detected although no data has been loaded. As mentioned previously, the file code sequence is checked although the sequence check is inhibited when the cycle has been restarted manually from a reset condition. The sequence of file codes must be Begin File, End of File, Begin File, etc.

Data contained in words between an End of File and Begin File will not be loaded but will be parity checked. Row parity is checked on all data whether In File or Out of File. As mentioned previously, marker track sequence is checked to insure a Beta-Gamma, Beta-Gamma sequence. While In File, the least significant character position of alphanumeric words is searched for a stop code character. When detected, a Stop Code Store flip-flop FSC1 is set and following the End of File, locks out further loading operations and the tape is halted on the Gamma marker and will not be restarted logically.

If an input error occurs, an Input Error flip-flop FIE will be set, and the Printer System data processing is stopped. The tape may be backspaced one block and re-read under operator control. To allow for re-reading of a tape block when an input error is sensed, the In File/Out of File status, upon sensing a Beta marker is stored in a File Tracking flip-flop FFT1. During the reading of the tape block causing the input error, the file status may change. Upon backspacing one block, therefore, the contents of the File Tracking flip-flop are copied into the In File flip-flop FIF1 to therefore preserve the file status. Backspacing more than one block produces an intermediate file status, and a Backspace Lockup flip-flop FBLU is set, establishing an Out of File condition, and locks out the various gating elements which would cause false responses. Upon restarting, the conditions are the same as starting at beginning of tape.

The information contained on the magnetic tape has thus been presented to the Memory Register and searched for an In File code; when detected, the In File code permits the information to be stored in the Block Buffer. Several error checks have been conducted, and the information contained in the Block Buffer is thus free from parity errors, sequence errors, etc.

Figure 228:
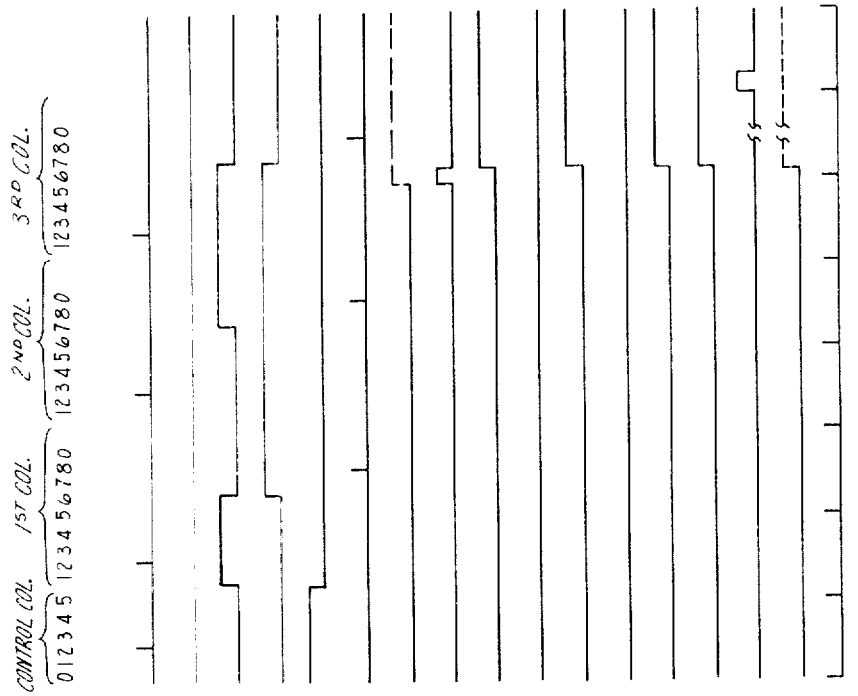
FIG. 228 is a timing diagram illustrating a portion of the operation of the present invention during the Transfer cycle-alphanumeric word.

Completion of the Fill cycle causes entry into the Transfer cycle. During the Transfer cycle, a line of print is assembled in the Typeline Buffer from the information temporarily stored in the Block Buffer. Referring to FIG. 228, the control counter FCC is stepped into a "1" count whenever a character is to be unloaded from the Block Buffer and will be stepped through the count of "5." If the character in process is to be loaded into the Typeline Buffer, the counter is allowed to step through the remaining counts to "0." If the character in process is not to be loaded into the Typeline Buffer, the counter will be "jumped" back to the count of "1." Thus, that information contained in the Block Buffer which may be utilized for controlling the printer during the Print and Slew cycles is not loaded into the Typeline Buffer, and only that information which ultimately is to be printed by the Printer System is transferred during the Transfer cycle from the Block Buffer to the Typeline Buffer. Thus, the illustration shown in FIG. 228 of the control counter FCC, illustrates the receipt of an entire four column word, i.e., first the control column of the word (the control counter permitted to step to the count of 5 and then return to a count of 1), and then three columns each containing an alphanumeric character. The Block Buffer unload gated clock CG05 is generated for each character to be unloaded during the Transfer cycle. The clock is generated after the control counter has reached a count of 1 and before it reaches a count of 2.

The Numeric Word A–B Select flip-flop FAB1 is inactive during the Transfer cycle shown in FIG. 228 since the word chosen for illustration is alphanumeric. The word character counter FWC is advanced for each column of the word. Since we have assumed, for purposes of discussion of FIG. 228, that the word is alphanumeric, the Numeric Word flip-flop FNW1 assumes the reset state and remains there during the transfer of the alphanumeric word. The Typeline Buffer load gated clock signal CG061 is generated each time a character is loaded during Transfer cycle. Thus, three pulses are generated during the transfer of the word, one pulse for each alphanumeric character. The Stop Processing flip-flop FSPR may be set if a slew code is detected in the third column of this alphanumeric word and the detection takes place before the present or previous slew is completed. After the present or previous slew is completed, or if no slew was in process when this particular code was detected, the Stop Processing flip-flop FSPR will assume the reset state and allow the control counter to continue its count thus continuing the Transfer cycle. The slew code detect decode circuit signal XSR11 will assume the set state if a slew code exists in the least significant character position (third column) of the alphanumeric word. This particular slew code shown is a "Slew to Position 6" code. Since the example chosen for illustration is a "Slew to Position 6" code, the code is illustrated by the set condition of Slew Register flip-flops FSR1 and 3. The slew code store decode XSS1 will provide a true signal indicating that one or more of the Slew Register flip-flops have assumed the set state. Also, the Program Slew flip-flop FPS1 will assume the set state to indicate that a command code in the least significant character position of an alphanumeric word has been detected that manifests a programmed slew. If no slew code is detected in this least significant character position, and an End of Line code is detected, the plugboard slew entry detect decode signal XPS11 assumes the true state to indicate that no slew code has been detected, and the subsequent slewing should proceed in accordance with the predetermined plugboard slew.

If the least significant character position of an alphanumeric word contains a print MICR command code, the Print MICR flip-flop FPM1 will assume the set state, and all information received after the command code (succeeding words) will be treated as MICR characters rather than Gothic.

Thus, the data characters are unloaded from the block buffer into the Memory Register. The character position within a word is determined by the word character counter FWC, which is advanced for each character position within the word. The first character position of each word comprises the control column which includes row parity check bits for the word, plus the control digit including the Mod 3 bits, numeric sign bit, and a designator bit. The Mod 3 bits are quizzed for type (a 1,1 code indicates an alphanumeric word, all other combination of these two bits indicate a numeric word). If the word is numeric, the next character is unloaded into the memory register. When alphanumeric words are unloaded into the Memory Register only the six least significant bits of each character are sensed for print character recognition. Only three characters are contained in alphanumeric words as compared to in six in numeric words. A special code appears in the alphanumeric words which acts as a filler, called Ignore (001 0111). Recognition of this code does not advance the column address counter, nor does it load it into the Typeline Buffer.

The least significant character position of alphanumeric words containing any control codes, if present, and the two most significant bits are examined for codes of the form 01XX XXXX. If detected, these codes are treated as Ignores, but if of the form 010X XXXX, they constitute End of Line codes.

The transferring of data from the Block Buffer to the Typeline Buffer proceeds until either an End of Line code or an error is detected. The Typeline Buffer is checked to insure that no more than 120 columns are loaded. Row parity and forbidden code configurations are also checked.

As mentioned previously, if the least significant character position of the first word of a line of data is the code 0111 0001, the interpretation of the data following is considered in terms of MICR characters. The MICR flip-flop FPM1 is set, which acts at the control for printing the line of MICR font.

All printable data contained within the line of MICR printing must be in numeric words and only printable codes will be accepted. Within the numeric codes possible, only the ampersand (&) has no MICR counter part. Also, no alphanumeric codes have MICR counter parts. If, during the course of loading the Typeline Buffer, an ampersand (&) is detected in a numeric word, or alphanumeric words containing other than Ignores or control codes, the MICR flip-flop FPM1 will be turned off, and the line will be printed as Gothic, thus saving the information from complete loss. It should be noted that the data codes for MICR printing are identical with the numeric Gothic codes and are loaded into precisely the same Typeline Buffer cores. The distinction between Gothic and MICR printing is a function of status of the MICR Control flip-flop. The MICR flip-flop FPM1 will be turned off upon completion of printing the line of MICR print. Therefore, each line of MICR printing requires a MICR command preceding the data.

Figure 229:
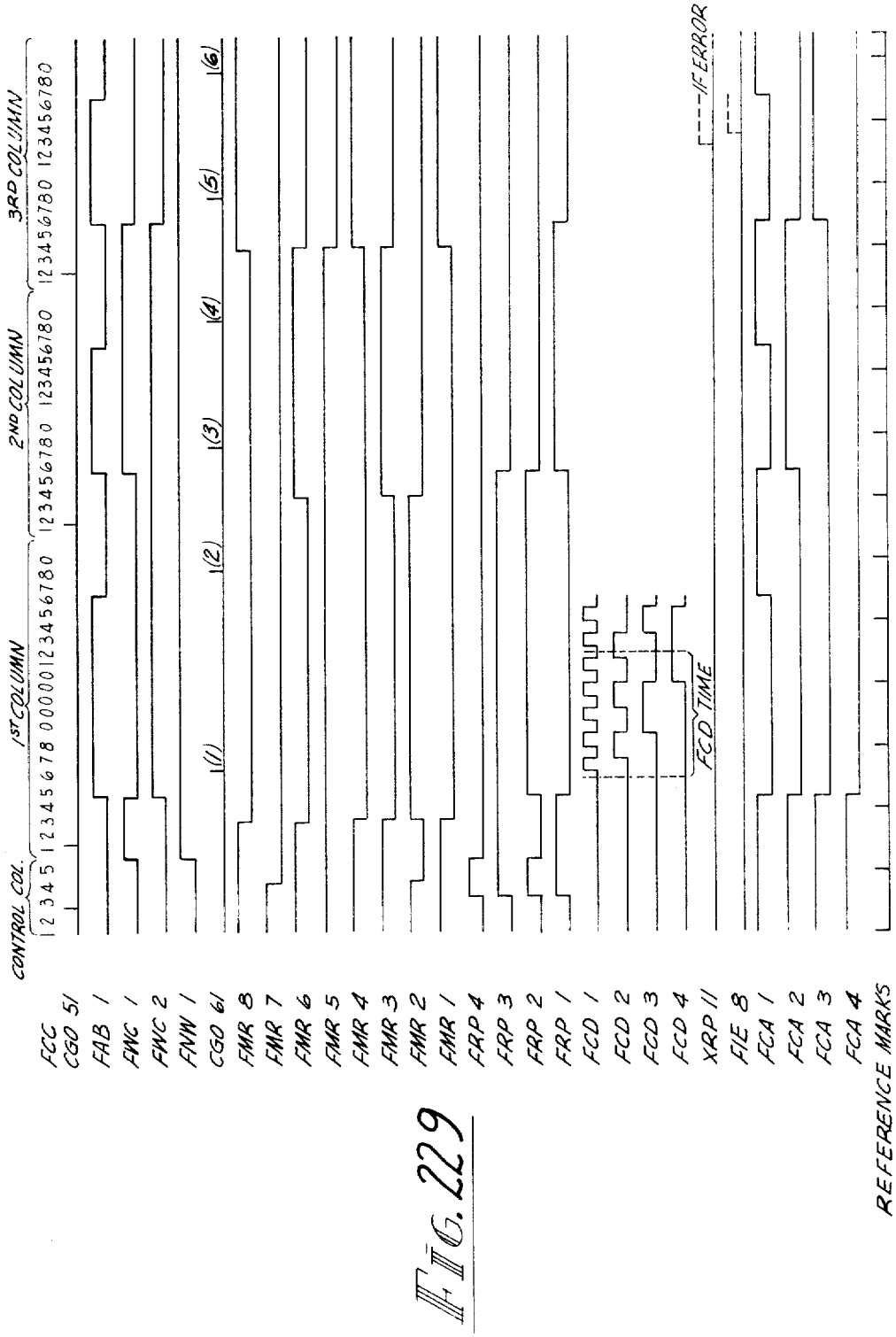
FIG. 229 is a timing diagram illustrating a portion of the operation of the present invention during the Transfer cycle-numeric word.

If the word being transferred is a numeric, each half of each column is treated as a separate character as discussed previously. Referring to FIG. 229, a timing diagram is shown of a normal numeric word transfer. The control counter FCC steps through the counts in a manner similar to that described in connection with FIG. 228 and alphanumeric words. Similarly, the Block Buffer unload clock CG05 also generates signals in a similar manner. At the beginning of the Transfer, the Numeric A–B Select flip-flop FAB1 is in the reset state. Upon entry of Transfer, and detection of the word as numeric (Numeric Word flip-flop FNW1 assumes the set state), the flip-flop FAB1 alternately assumes the set and reset states to provide a signal indicating that the first half of the column (the A half) and subsequently the second half of the column (the B half), is being transferred. The word character counter operates similarly as with alphanumeric words, in each instance storing the number of the character currently being processed. The Typeline Buffer load clock CG061 generates a pulse upon the transfer of each character in a manner similar to that of alphanumeric words. The Memory Register flip-flops FMR1–8 are shown as they present the numeric characters 1, 2, 3, 4, 5, and 6, respectively, at the first and second characters in the first, second and third columns of the numeric word being transferred. In each instance, the flip-flops are considered in groups of four and not simultaneously. The Row Parity flip-flops FRP1–4 are also active, and are utilized to detect the row parity bits present in the control column of each word. As mentioned previously in connection with the Transfer Cycle components, the Fast Clockdown Counter flip-flops FCD1–4 are utilized to provide an appropriate delay to enable the information to be properly stored in the Typeline Buffer. Accordingly, while the Fast Clockdown Counter is stepping through its count (shown in FIG. 229 as FCD time) the Control Counter is held in the zero count, and prevented from stepping through its normal counts until the Fast Clockdown Counter has counted through twelve counts. The row parity detect decode circuit signal XRP11, and the Input Error flip-flop FIE8 each present a true signal if an error occurs during transfer. The Column Address Counter flip-flops FCA1–4, the timing of which is illustrated in FIG. 229, determines the column of the Typeline Buffer into which the character being transferred from the Block Buffer will be stored. The column address counter is also active in the transfer of alphanumeric words as well as numeric words; however, the timing of the Column Address Counter flip-flops FCA1–4 is shown in FIG. 229 only in connection with the numeric word transfer.

Thus, if the word presented to the Memory Register from the Block Buffer is a numeric word, the two digits represented thereby are processed separately in sequence (one half-column at a time). The column address counter, which selects the column to be loaded in the Typeline Buffer, is advanced one count. If the digit is detected as a numeric 0, and zero suppression is on, the digit is discarded, and the column address is advanced another count, leaving a "space" in the suppressed zero column of print. The second digit is then processed and if a numeric 0, in an "On" zero suppression field, it will be treated as the first digit was, and the next character will be unloaded into the Memory Register. If the succeeding digit is a non-zero, or the zero suppression field has been turned "Off" and the digit is a numeric zero, the appropriate core selection lines to the Typeline Buffer will be addressed and the column will be loaded.

Zero suppress fields are selected by patching on the plugboard between the zero suppress start field and the buffer hub position corresponding to the column preceding the first column to be zero suppressed. Zero suppress will be turned "Off" and remain "Off" until the next patched zero suppress start, if a non-zero numeric digit is detected, if an alphanumeric word is detected, or if a zero suppress stop has been patched on the plugboard. This patch is made to the buffer position hub corresponding to the last position to be zero suppressed. When the last numeric character of the word has been processed, a quiz is made to determine whether the numeric sign for that word is to be printed. If the print sign field on the plugboard has been patched to the buffer position hub corresponding to the column of the last numeric digit of the word, the Numeric Sign flip-flop is interrogated, and if set, causes the minus sign to be loaded into the column following the last numeric digit. If Off, a "space" is loaded. Alphanumeric words are not affected by zero suppression nor print sign hubs selected.

When an End of Line code is sensed (010X XXXX) the transfer of data to the Typeline Buffer is halted. If the End of Line code is also a programmed slew command, the least significant character half is loaded into the slew register, unless a Slew cycle is in process and not yet completed. If so, the Transfer cycle comes to a halt until the Slew cycle has been completed, at which time the new slew data is entered into the slew register. A programmed slew command also sets a Programmed Slew flip-flop FPS1.

If the End of Line code is not also a programmed slew command, or if the three least significant slew command bits are X000, the slew register is loaded from the plugboard "spacing" select, thereby insuring that at least one line of paper movement will be effected following printing. The Transfer cycle is not brought to a conclusion until a "look ahead" is accomplished to ascertain whether or not another line of print remains in the Block Buffer. This is accomplished by checking the following words in store, sequentially, until one of three conditions is satisfied:

(1) A numeric word is detected, immediately indicating another line of print.

(2) An Alpha word is sensed, which does not necessarily imply another line of print. Search continues. Ignore characters do not imply additional data, therefore, search will continue until either a printable alphanumeric character or another End of Line is detected.

(3) An "End of Data in Block Buffer" code is detected.

Figure 230:
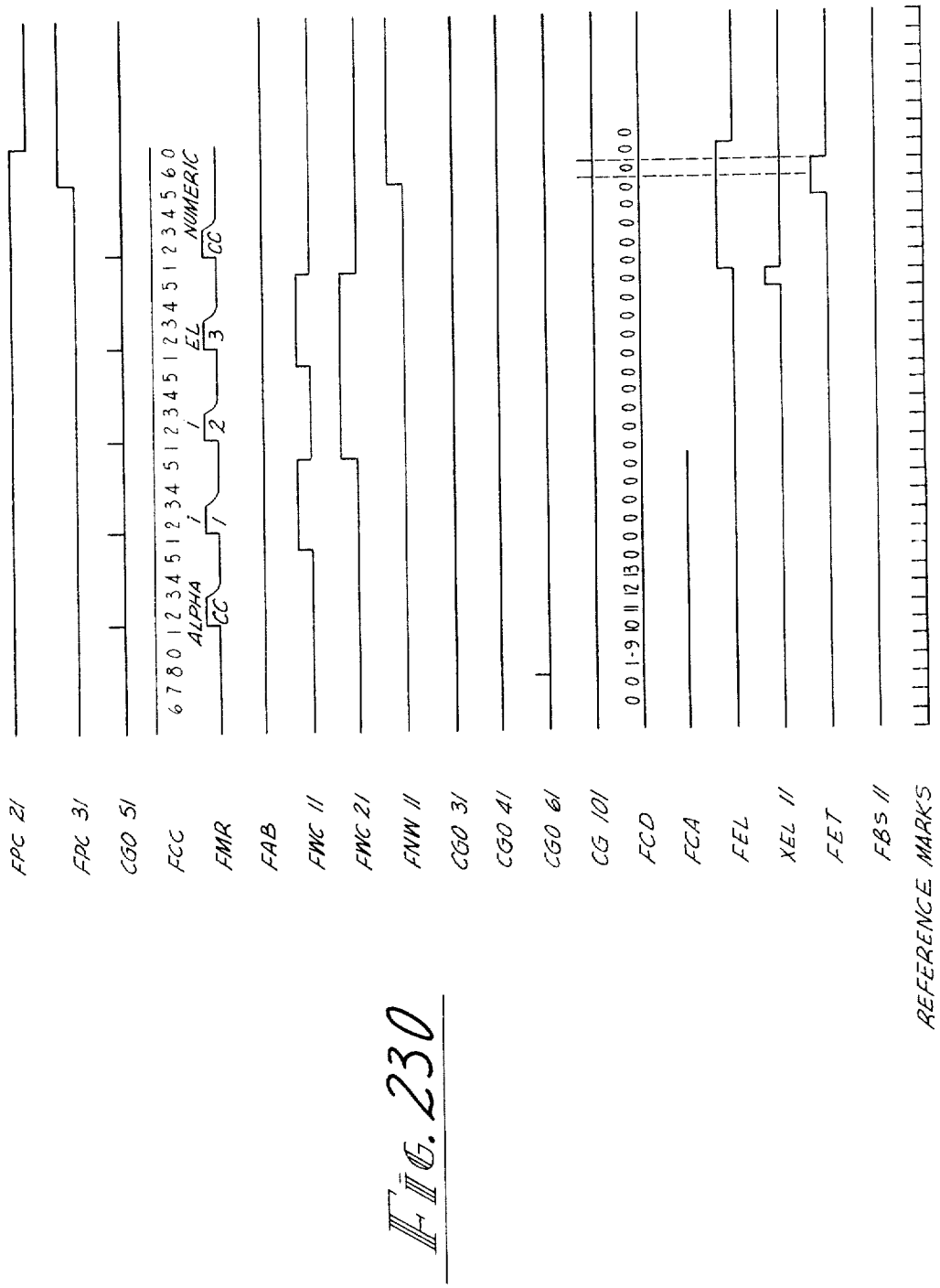
FIG. 230 is a timing diagram illustrating a portion of the operation of the present invention during the Transfer cycle-"look ahead"-numeric follows.

When the first of three conditions are satisfied, that is, when a numeric word follows the End of Line command, FIG. 230 may be utilized to illustrate the timing of this portion of the Transfer cycle. First, it is assumed that the Program Counter flip-flops are in the Transfer cycle condition (FPC21 is true, and FPC31 is false). The unload clock CG05 operates similar to that described in connection with FIGS. 228 and 229. It will be assumed that an End of Line code is detected in FIG. 230; thus, the Memory Register presents a control column (indicating an alphanumeric word), a first and a second column each containing an ignore character (illustrated in FIG. 230 as the letter *i*) and a least significant character position containing an End of Line command code (illustrated in FIG. 230 by letters EL). The succeeding control column yields an indication that the next word is a numeric. Accordingly, the control counter is permitted to count to five and then return to a one count. The word character counter, as illustrated in FIG. 230, keeps track of the respective character being presented from the word. The Numeric Word flip-flop FNW1 remains reset during the receipt of the alphanumeric word, and will be set upon detecting the numeric code in the control column of the succeeding word. Since none of the information contained in the alphanumeric words shown in FIG. 230 is to be loaded into the Typeline Buffer, the column address counter clocks CG03 and CG04 are not pulsed. The load gated clock CG06 operates in a manner similar to FIGS. 228 and 229. The gated clock CG101 is generated when an End of Line code is detected during the Transfer cycle and paper slewing from the previous Slew cycle has ceased. Thus, the gate clock CG101 is utilized to switch the Typeline Buffer from the load to the unload state. Since the column address counter clocks are not activated, the column address counter FCA remains dormant. The End of Line flip-flop FEL1 assumes the set state immediately upon the detection of the End of Line code in the least significant character position of the alphanumeric word. The End of Line detect decode circuit XEL1 detects the End of Line code and provides the appropriate input signal to the End of Line flip-flop FEL1 to cause the latter to assume the set state. Having thus detected the End of Line code in the least significant character position of an alphanumeric word, and having also detected the succeeding word as numeric, the End of Transfer flip-flop FET1 is set thereby permitting the Printer System to enter into the Print cycle by gating the clock CG10 which, in turn, causes the Program Counter flip-flop FPC31 to assume the set state to initiate the Print cycle. The fast clock scaler FCD remains in the zero count since none of the information contained in the alphanumeric word is being loaded into the Typeline Buffer.

Figure 231:
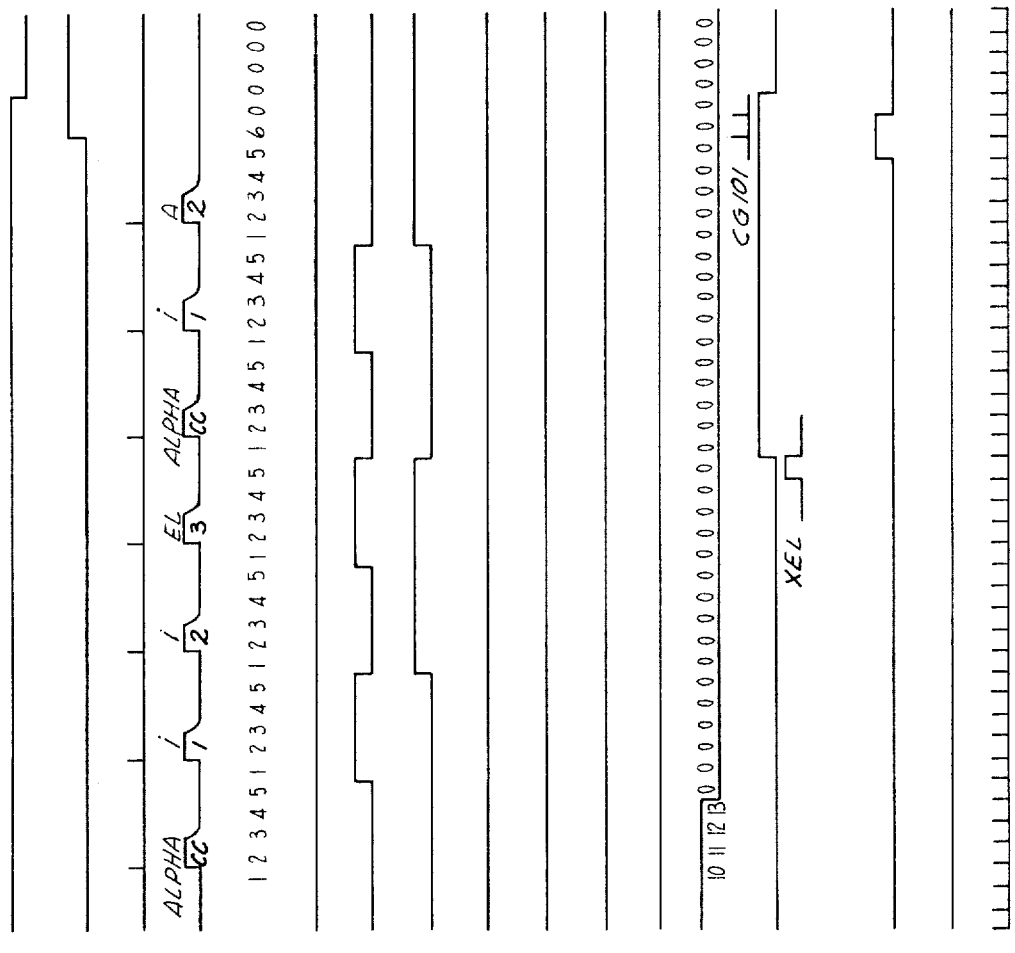
FIG. 231 is a timing diagram illustrating a portion of the operation of the present invention during the Transfer cycle-"look ahead"-alphanumeric follows.

When the second condition is satisfied (when an alphanumeric word is sensed after an End of Line code), FIG. 231 may be utilized to illustrate the timing of this portion of the Transfer cycle. The Program Counter flip-flop FPC2 remains in the set state indicating the Transfer cycle is presently occurring, and the flip-flop FPC3 remains in the reset state until the condition discussed as condition 2 obtains. The buffer unload gated clock CG05 provides a pulse in the manner similar to that discussed in connection with FIGS. 228 and 229. The memory register presents an alphanumeric word as indicated in FIG. 231 as the control column (CC) followed by columnns 1 and 2 each containing an Ignore character, and a column 3 containing an End of Line code. Since none of this information is currently being transferred to the Typeline Buffer, the control counter FCC is returned to the 1 count after the count of 5. The word character counter FWC continues to keep track of the particular character of each word. The succeeding word is also indicated as an alphanumeric word containing control column CC, a first column containing an Ignore character, and a second column containing a printable alphanumeric character A. Since the information is not numeric, the Numeric Word A–B flip-flop FAB1 remains inactive, and the Numeric Word flip-flop FNW1 remains reset. Also, since the information is not being loaded into the Typeline Buffer, the column address counter clocks CG031 and CG041 are not pulsed. Also, the fast clock scaler FCD remains in the zero count. The End of Line flip-flop FEL1 assumes the set state immediately upon the detection of the End of Line code in the least significant character position of the alphanumeric word. The End of Line flip-flop is triggered to the set state by the detection of this code through the End of Line decode circuit indicated in FIG. 231 as XEL. The End of Transfer flip-flop FET1 assumes the set state indicating that the Print cycle may be initiated immediately upon the detection of the printable alphanumeric character contained in the alphanumeric word following the End of Line code. Thus, upon detection of the alphanumeric character A, the End of Transfer flip-flop assumes the set state, thus enabling the gated clock CG10 to present gated clock pulses CG101 to the program counter to enable the latter to indicate that a Print cycle may be entered and the Transfer cycle is at an end.

Figure 232:
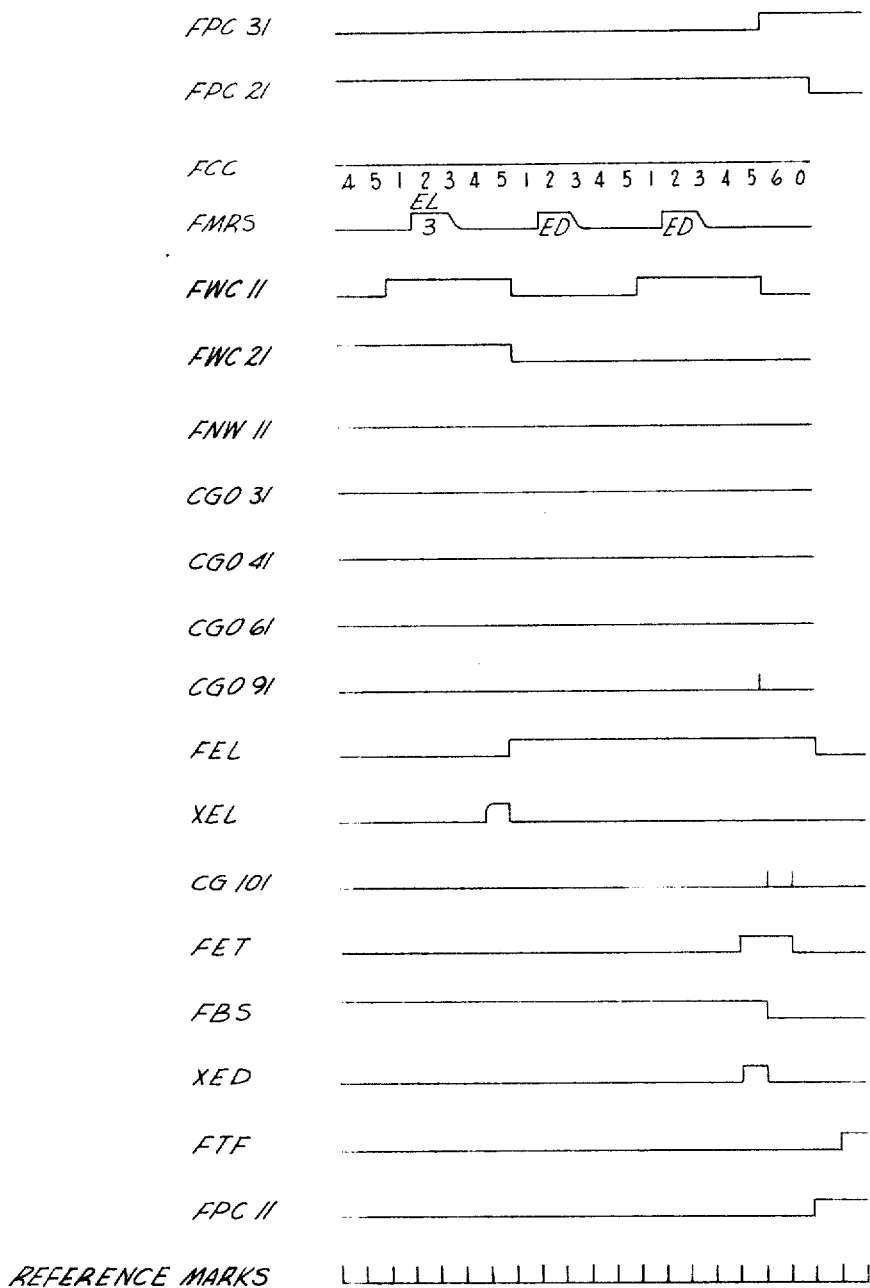
FIG. 232 is a timing diagram illustrating a portion of the operation of the present invention during the Transfer cycle-"look ahead"-"end of data" follows.

The third condition discussed previously (the detection of an "End of Data in Block Buffer" code after an "End of Line" code) is illustrated by a timing diagram of FIG. 232. The Program Counter flip-flops FPC2 and FPC3, and the Control Counter FCC behave similar to those discussed in FIG. 231. The word character counter also keeps track of the character of the respective words. The Memory Register presents an alphanumeric word, only the third column of which is shown as an End of Line code in FIG. 232. The next character detected by the Printer Control System of the present invention indicates an End of Data code. The Numeric Word flip-flop FNW1, the column address counter clocks CG03 and CG04, and the load gated clock CG06 remain inactive. The End of Line flip-flop FEL1 assumes the set state immediately upon detection of an End of Line code by the End of Line decode circuit XEL. After detecting the End of Data code, the End of Transfer flip-flop FET1 assumes the set state to provide a signal to the gated clock CG101, thus permitting the Program Counter flip-flop FPC3 to assume the set state. The Buffer Status flip-flop FBS1 then changes from set to a reset state indicating that the block buffer status has been changed from an unload to a load condition. Thus, all of the inforamtion contained in the block buffer has been transferred to the Typeline Buffer and the Block Buffer is now ready for receipt of information from the magnetic tape. The End of Data decode circuit XED provides an output pulse indicating that the End of Data code has been detected. The Program Counter flip-flop FPC1 may assume the set state indicating that a Fill cycle may now be undertaken so that the Block Buffer may receive information from the magnetic tape. The Tape Forward flip-flop thus may assume the set state to cause the magnetic tape to move forward to provide further information for the Block Buffer. Thus, with the Program Counter flip-flops FPC1 and FPC3 in the set state, the Printer Control System of the present invention enables the printer to enter a Fill cycle (to store information temporarily in the Block Buffer) and the Print cycle (to empty the contents of the Typeline Buffer to the printer mechanism) simultaneously.

It is also possible that the last line of print also coincides with the last Block Buffer address. The End of Line code then falls in the last address and when read out, causes the Block Buffer to emit an empty signal. When the "look ahead" search is terminated, the conditions for ending Transfer are completed, and entry into Print cycle is made. If a Block Buffer empty signal or End of Data in Block Buffer signal have been sensed, an entry into the Fill cycle is also made. Thus, as described previously, a Fill cycle and a Print cycle will usually be accomplished concurrently.

During the Transfer cycle, if a line is not terminated in an End of Line code, the following line of print will be construed as part of the preceding line. Only if the total number of characters of the two exceed 120, will an error be indicated. If an empty signal is detected without an End of Line having been sensed, a Block Buffer empty overflow error will be activated. The slew register is checked when the conditions for terminating Transfer are satisfied. If no bits have been stored in the slew register, a no slew stored error halts the operation.

The Print cycle comprises that time during which the printing system is actually printing a line of information on the print paper. The information contained in the Typeline Buffer is applied to appropriate amplifiers to subsequently energize hammers on the typeline to cause the paper to strike the appropriate typewheel thus leaving the character impresison. As mentioned previously in connection with the print slew components, the Typeline Buffer may be an unfolded typewheel matrix of 100 x 44 intersections, each intersection being a discrete addressable position within the buffer. Each position corresponds to a printable character without regard to the font in which the character is to be printed. Thus, similar characters in MICR and Gothic fonts are stored in identical positions. Unloading of the Typeline Buffer is accomplished by first zeroing the column address counter with the typeline, and then scanning the 44 character addresses in synchronism with the corersponding typewheel characters as they move into print position. As the characters are unloaded from the Typeline Buffer through a lister for amplification, the appropriate hammer actuating logic is energized causing the selected hammers to be tripped, and following this, resets the hammer selection register. Because of the time required to advance paper, it is necessary at high typewheel speed to initiate the Slew cycle prior to the completion of the printing. Thus, a paper advance command is initiated before the last two characters of the sequence are in print position.

Control of Gothic and MICR printing is achieved by a combination of sensing the state of the MICR Control flip-flop FPM1, and the issuance of a revolution marker pulse APW1 from the printer mechanism. When the line to be printed is Gothic, the MICR flip-flop FPM1 will be reset. The Print cycle is entered, and when the revolution marker pulse APW1 is received from the printer mechanism, the print operation proceeds, and will terminate when the Typeline Buffer has been emptied.

When the line to be printed is MICR, the flip-flop FPM1 will be in the set state. The Print cycle is then entered, and when the revolution marker pulse APW1 is received from the printer mechanism, the printer operation proceeds only when the appropriate number of characters have passed beneath the typewheel hammers so that the MICR characters are ready to be presented to the hammers for typing.

In each instance, the Typeline Buffer is unloaded by use of the column address counter feeding the character decode lines of the Typeline Buffer. Once the printing operations are begun, the counter is advanced each time a character marker pulse APW21 is detected. Logic circuitry controls the sequence of counting so that the code equivalent presented by the column address counter corresponds to the code of the character coming into the print position of the typeline. Upon completion of a line of MICR printing, the MICR Control flip-flop FPM1 is turned off.

Figure 233:
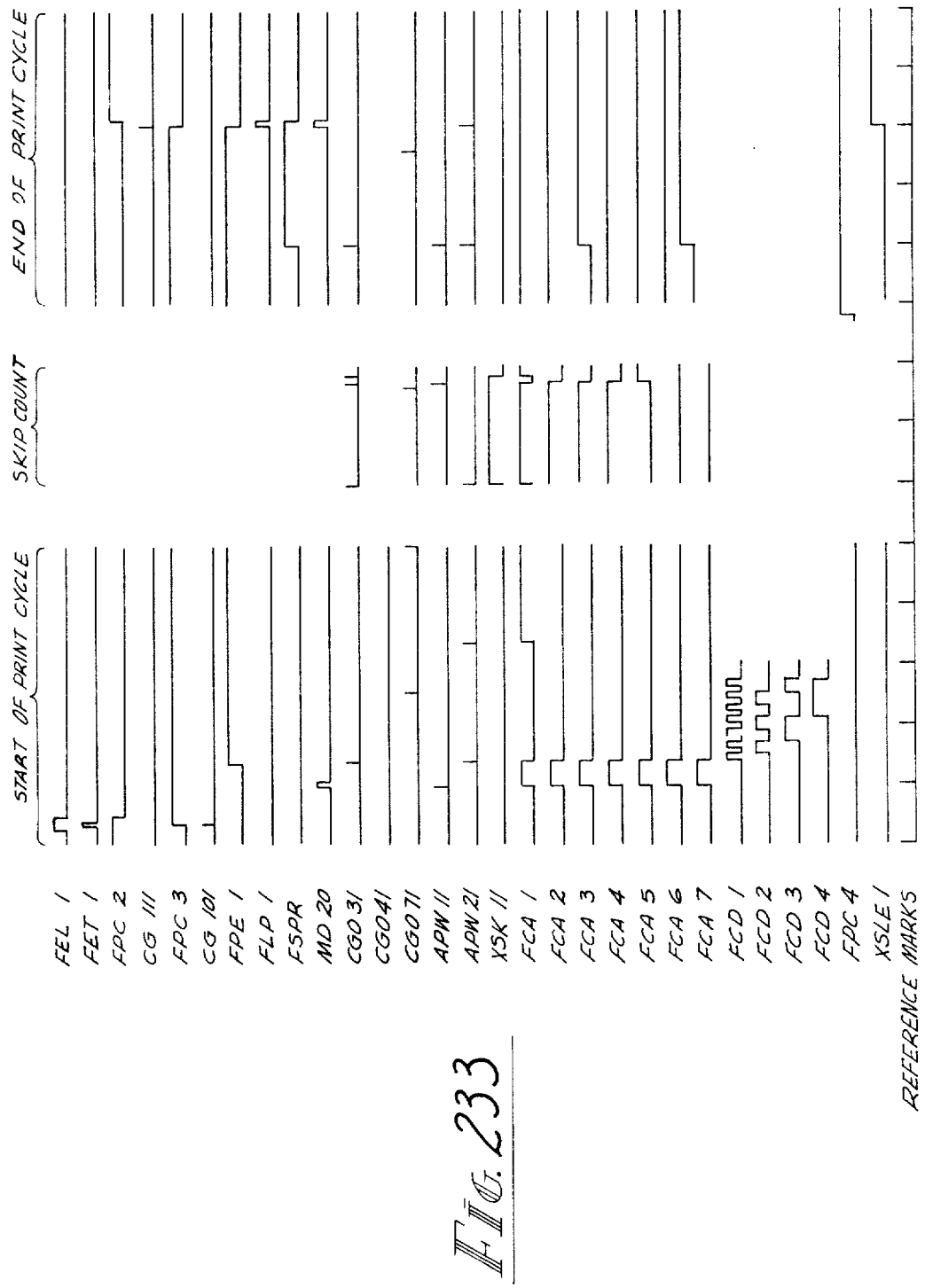
FIG. 233 is a timing diagram illustrating a portion of the operation of the present invention during the Print cycle.

Referring to FIG. 233, a timing diagram is shown for the Print cycle. During the start of the Print cycle, it is assumed that the End of Line flip-flop FEL1 and the End of Transfer flip-flop FET1 change states to indicate that an End of Line and the end of the Transfer cycle are at hand. The Program Counter flip-flop FPC2 assumes the reset state and the flip-flop FPC3 assumes the set state, thus indicating the end of the Transfer cycle and the beginning of the Print cycle. The column address counters are set upon the receipt of the revolution marker pulse APW11. The Column Address Counter flip-flops FCA1–7 then begin counting the character pulses received from the typeline character wheel (APW21) to provide a means for addressing the appropriate character lines of the Typeline Buffer. The Fast Clockdown Counter flip-flops FCD1–4 complete a countdown to insure the appropriate delay after the character decodes have addressed the character columns of the Typeline Buffer.

When the column address counter reaches a binary count for which there is no corresponding character, the skip count detect decode circuit XSK11 detects this count, and provides a true signal. Receipt of the skip count decode signal XSK11 causes the column address counter to continue its binary count, at the master clock rate, until a valid count is reached. Thus, when the next character pulse APW21 is received from the character pulse wheel of the typeline, the column address counter will have a valid count, and a corresponding character will exist on the typewheels.

Therefore, the characters stored in the Typeline Buffer are addressed by the column address counter through the character decodes one character at a time as the corresponding character comes into print position on the typeline. As the last printable character passes the print position, the Stop Processing flip-flop FSPR assumes the set state, and the Line Printed flip-flop FLP1 provides an output pulse to inhibit further printing (otherwise the identical information would be printed a second time). The Print Enable flip-flop FPE1 therefore assumes the reset state, and the Program Counter flip-flop FPC3 assumes the reset state thus marking the end of the Print cycle. If a Fill cycle is not currently in process at the end of the Print cycle, the Program Counter flip-flop FPC2 will assume the set state to enable the Printer Control System to go into the Transfer cycle at this time. However, if a Fill is still taking place, the Transfer cycle will be held until the completion of Fill; in either case, the Slew cycle is entered which advances the paper in accordance with a slew command. The Typeline Buffer inhibit one-shot MD20 also provides a delay time to permit the Typeline Buffer to switch from the unload to the load state. A slew entry enable decode circuit XSLE will provide a true signal at this time to enable the system to enter the Slew cycle.

At the completion of the Print cycle, entry into the Slew cycle is effected. The paper advance is accomplished in one of three basic forms, two programmed modes and a plugboard spacing mode. There is also the capability to provide an automatic space function which causes multiple line skipping to be achieved. Upon entry into slew, the mode of slewing is ascertained by quizzing the Program Slew flip-flop FPS1, and the most significant bit position contained in the slew register.

If the slew command is of the form 0100 1XXX, the command is "Slew N Lines" with N equal to the binary value of XXX. The paper will be advanced and the slew register counted down as each line marker pulse ALM11 is received from the mechanism. When the correct number of lines have been advanced, slewing is stopped. If a 5 punch is sensed during this mode of slewing, the slewing will be halted on the line with the 5 punch even though "N" lines have not been slewed.

If the program slew command is of the form 0100 0XXX, the command is "Slew to Code N" where N is defined by XXX. The paper will be advanced, the code punching on the vertical format tape being compared with the content of the slew register. When a match is sensed, the paper is halted on that line. If a 5 punch is sensed during the search, the paper will be halted, although the search is not satisfied. If a 45 punch is sensed (four and not five), but the search is not satisfied, an error is indicated to inform the operator that a "top of form" was sensed without having satisfied the command.

If either mode of program slewing is satisfied on a line which contains a 45 punching on the format loop, control is transferred to the automatic space logic, described below. In the event that a programmed slew command 0100 XNNN contains zeros in the "N" positions, a substitution will be made by inserting the appropriate "spacing" code as determined by plugboard selection. A "Slew N Line" command will retain identity as a programmed slew, but a "Slew to Position N" command will be altered to a plugboard spacing command.

Figure 234:
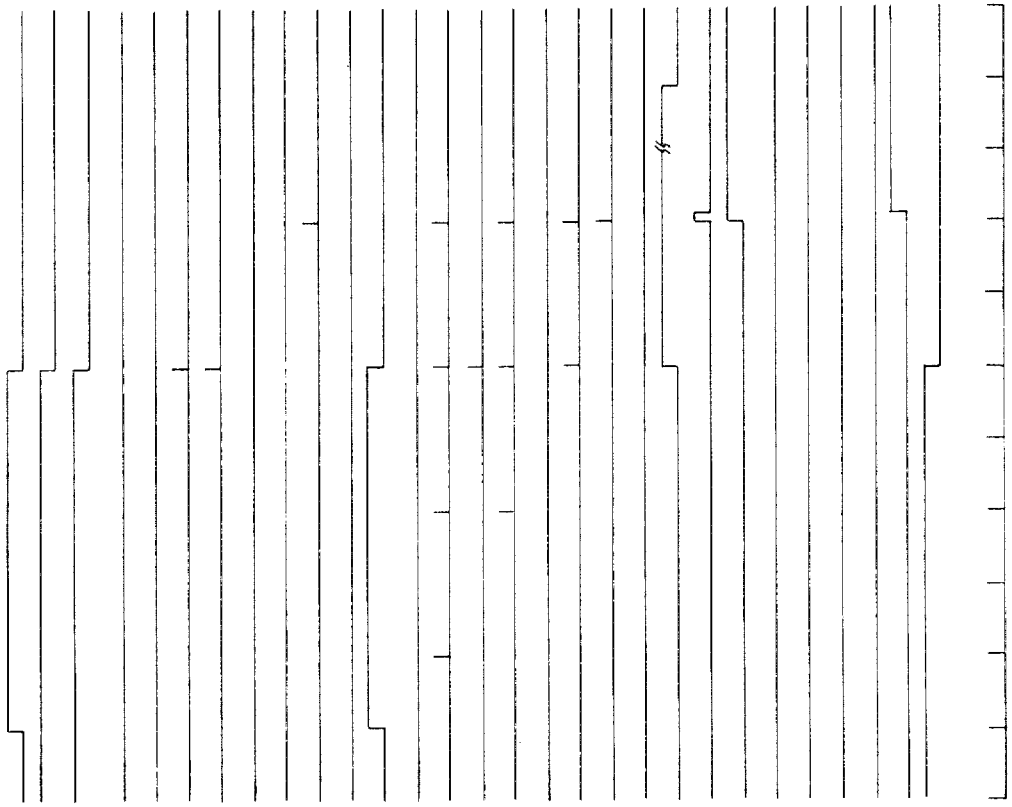
FIG. 234 is a timing diagram illustrating a portion of the operation of the present invention during the Slew cycle-"slew to code N."

Referring to FIG. 234, a timing diagram is shown of the slew portion of the Printer Control System operation; the timing diagram is shown for the slew command "Slew to Code N." The Program Counter flip-flop FPC4 assumes the set state indicating that the Slew cycle is to be entered. The slew control decode signal XSL11 goes true, thus initiating the Slew cycle.

Thus, having received the "Slew to Code N" command, the contents of the Slew Register flip-flops FSR1-3 will be compared with the code punching on the vertical format tape. The paper will be advanced until a match is sensed, at which time the slew code store decode signal XSS11 will go false, the slew control decode signal XSL11 will go false, and the Program Counter flip-flop FPC4 will assume the reset state indicating that the slew is completed. Similarly, the Slew Register flip-flops FSR1 and FSR2, previously in the set state, will be returned to the reset state thereby emptying the slew register of all codes. The slew decelerate delay one-shot MD70 will begin the appropriate time delay to allow the paper to decelerate to a complete stop before permitting printing. In the timing diagram shown in FIG. 234, a mechanism error is shown by the assumption of Mechanism Error flip-flop FME6 of the set state. This flip-flop has assumed the set state, and the Paper Runaway flip-flop FPRA provides a pulse to indicate that the paper has failed to decelerate. Accordingly, Mechanism Error flip-flop FME1 assumes the set state to yield an indication to the operator that a mechanism error has occurred. It is obvious that the mechanism error is not an ordinary occurrence; however, an error is illustrated in the timing diagram of FIG. 234 to indicate the operation of the mechanism error circuitry. It may be noted that the Slew Register flip-flops FSR1 and FSR2 were originally in the set state indicating the code "N" as 110 (binary value of decimal 6). It may also be noted that the code punching on the vertical format tape 110 (binary value of decimal 6) is indicated by the pulses provided by the vertical format amplifiers AVF11 and AVF21, and the no-pulse received from vertical format amplifier AVF31. Thus, a match is made between the vertical format loop code punch and the stored code in the slew register when there is coincidence between vertical format amplifier pulses AVF11 and AVF21, and the Slew Register flip-flop signals FSR11 and FSR21.

Figure 235:
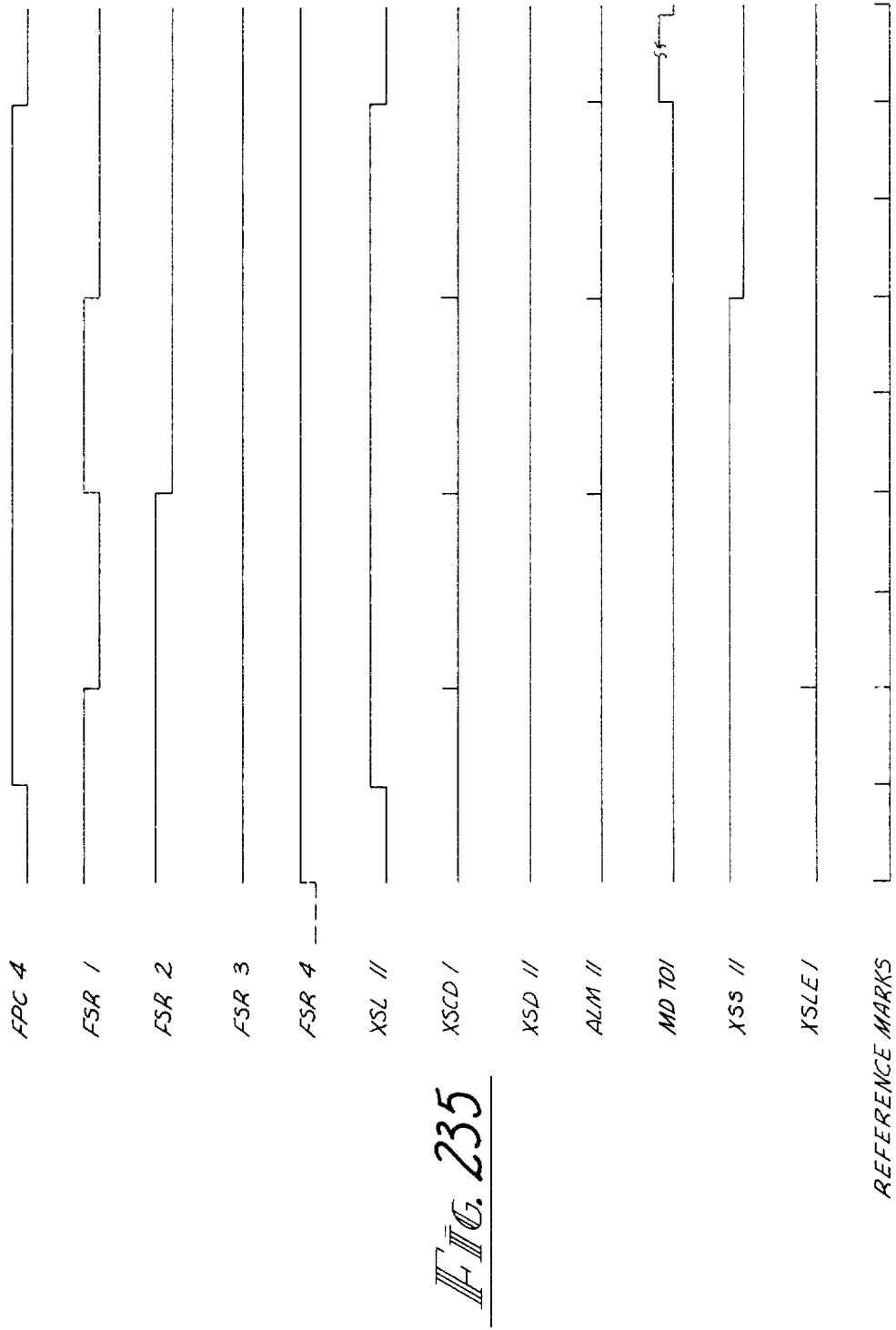
FIG. 235 is a timing diagram illustrating a portion of the operation of the present invention during the Slew cycle-"slew N lines."

Referring to FIG. 235, a timing diagram is shown for the Slew cycle when the programed slew is of the form 0100 1XXX, therefore indicating a command of "Slew N Lines." The XXX of the command represent the binary value of the number "N" and is stored in the Slew Register flip-flops FSR1, FSR2, and FSR3. Accordingly, the Program Counter flip-flop FPC4 assumes the set state, and the slew control decode signal XSL11 goes true. The Slew cycle is thus entered, and the Slew Code Register flipflop FSR4 is in the set state indicating that the program slew is a "Slew N Lines." Thus, the initiation of the Slew cycle causes the countdown of the slew register upon receipt of signals from the slew countdown decode XSCD1. Therefore, the contents of the Slew Register flip-flops FSR1, FSR2, and FSR3 (shown in FIG. 235 as containing the binary equivalent of the decimal 3) begin to count down from 3 to 0. Upon the completion of the countdown, the slew code stored decode circuit signal XSS11 goes false indicating that the slew code, previously contained in the slew register, has been emptied from the latter. Accordingly, at the next line marker pulse ALM11, the slew control circuit signal XSL11 goes false, and the Program Counter flip-flop FPC4 assumes the reset state indicating the end of the Slew cycle. Simultaneously, the slew decelerate delay one-shot MD70 begins the timing period to permit the paper to decelerate to a complete stop before a printing cycle may be entered.

End of Line codes of the form 0101 XXXX cause the paper advance to be accomplished by plugboard selected spacing—either single or double line spacing. Upon detecting the defined End of Line code, the slew register is loaded to produce a spacing function. The paper will be advanced, the slew register being counted down, and the paper will be halted when the select number of lines are spaced. Sensing a 45 punch causes automatic spacing control to assume command. Sensing a 5 punch will stop spacing on that line. Automatic space control enables skipping to be achieved conveniently. This control is turned on as described above, and when turned on causes paper to be advanced until a 5 punch is detected in the vertical format loop regardless of slew register content or other paper format loop punching. Upon completion of a Slew cycle, the paper decelerate delay one-shot MD70 starts the timing cycle to permit the paper to decelerate to a complete stop after which an entry into the Print cycle is allowed.

It will be apparent that the System of the present invention permits several operations to occur simultaneously. Information may be received, stored, processed, and printed as well as error checked with maximum speed and efficiency by providing simultaneous operation cycles such as Fill and Print, Fill, and Slew, Slew and Transfer, etc.

*Normal mode—On-line*

On-line operation differs from off-line only in the Fill cycle. The most essential logical difference is that complete 100 word data blocks are transferred, and the in-file status is permanent. The input selection switch signal indicating that the printer is on-line and ready, the printer busy and load anticipate signals as well as the input error signals from the Printer Control System communicate with the central processor of the data processing system and permit the central processor to select the appropriate action during on-line operation of the Printing System. Each data character is loaded, a full column at a time (2 half columns). When 100 words have been loaded into the Block Buffer, the load anticipate signal goes false. If another character is received, the Block Buffer overflow signal goes true. When the last character is transmitted from the central processor, the latter communicates to the printer with a signal to proceed with printing. If no error has been generated, the Printer System will enter the Transfer cycle and the operation will continue under internal control in the manner identical to off-line operation. If an input error is detected, the appropriate line to the central processor will be true, and either through programming through the central processor, or through operator control, the Printer System may be reset and loading again attempted.

*Unedited mode—On-line or off-line*

In the unedited mode, the Fill cycle is identical with the normal or edited mode with the exception that an in-file condition is established permanently. Therefore, all tape data blocks are completely loaded. In the Transfer cycle, all words are interpreted as numeric words, and the control digit half column of each word is encoded into an alphabetic character unique for each of eight considered combinations of the Mod 3, sign, and designator bits. Each of the encoded characters generated is entered into the Typeline Buffer in the column immediately preceding the 6 numeric digits of the associated word. Typeline Buffer loading continues until 10 words have been loaded. The slew register is interrogated for a busy condition, and when clear, a plugboard spacing selected code is inserted. Entry into print is made, and the Print and Slew cycles are identical to the normal mode of operation. Plugboard zero suppression, print sign, and file select functions are inhibited during the unedited mode. All error checking circuitry is active during this mode.

The normal mode on-line or the unedited mode capabilities of the High Speed Printer Control System add to the flexibility of the system and enable the system to be utilized in a variety of situations. Printer systems are generally utilized off-line with magnetic tape as described previously; however, it is frequently desirable to permit the printer to operate on-line in which instance the Printer Control System of the present invention is readily accommodating.

Figure 236:
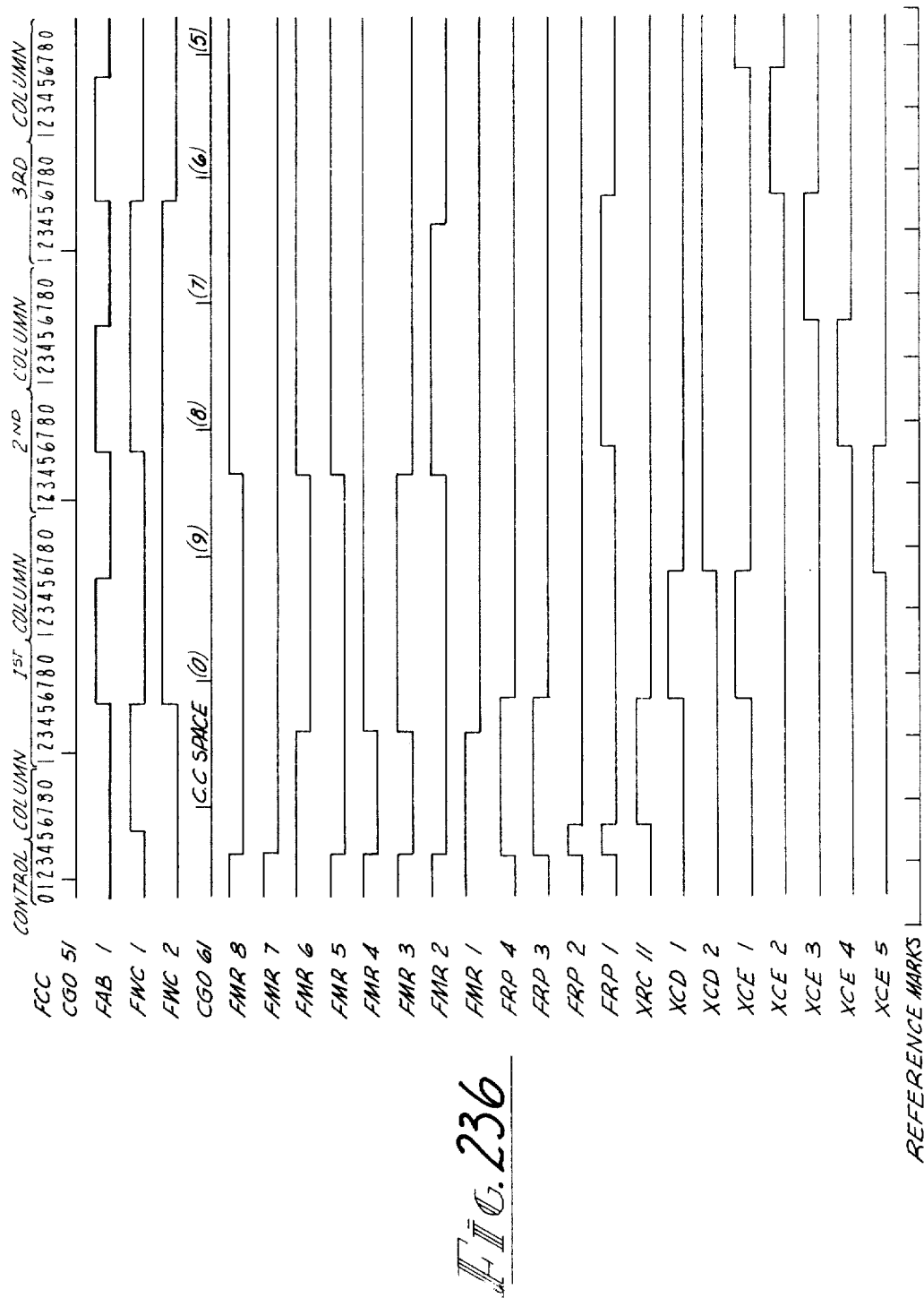
FIG. 236 is a timing diagram illustrating a portion of the operation of the present invention during the unedited mode-Transfer cycle.

Referring to FIG. 236, the timing diagram is shown for the Transfer cycle of the unedited mode off-line operation. The control counter counts in the manner similar to the normal or edited mode. The gated clock pulse CG051 is generated, as in the normal mode, for each character to be unloaded from the Block Buffer. Since the characters contained in the columns of words received in the unedited mode (excluding the control column) are treated as numeric words, the Numeric Word A-B flip-flop FAB1 alternates between the set and reset state for each column received. The word character counter operates in a manner similar to that described in connection with the normal mode, and keeps track of the particular column of the word. The Typeline Buffer load gated clock CG061 is generated for each character loaded during the Transfer cycle in a manner identical to that of the normal mode. In the example chosen for illustration in FIG. 236, the number being transferred to the Typeline Buffer is the number "098765." Accordingly, the Memory Register flip-flops FMR1-8 receive the corresponding binary equivalents from the Block Buffer and transfer these to the Typeline Buffer. The Row Parity flip-flops FRP1-4 are active and detect the row parity bits contained in the control column. The unedited mode sign character print enable signal XRC11 allows the sign character contained in the control column of the word to be entered into the Typeline Buffer as the numeric equivalent. The character decodes address the appropriate character positions of the Typeline Buffer so that the information contained in the respective Memory Register flip-flops may be transferred to the Typeline Buffer from the Block Buffer. Thus, in the unedited mode, information received from a magnetic tape, or a central processor, is treated as numeric words and loaded into the Typeline Buffer accordingly.

While the principles of the invention have now been made clear in an illustrative embodiment, there will be immediately obvious to those skilled in the art many modifications in structure, arrangement, proportions, the elements, materials and components used in the practice of the invention, and otherwise, which are particularly adapted for specific environment and operating requirements, without departing from those principles. The appended claims are therefore intended to cover and embrace any such modifications, within the limits only of the true spirit and scope of the invention.

What is claimed as new and desired to secure by Letters Patent of the United States is:

1. A printer control system comprising, storage means for receiving and storing signals representing characters to be printed and signals representing control codes, decoding means connected to said storage means for receiving signals representative of a selected one of said control codes for providing a print signal indicating a particular one of a plurality of different fonts in which characters are to be printed, at least one of said fonts being primarily humanly recognizable and another of said fonts being primarily machine recognizable, printing means connected to said storage means and said decoding means for receiving signals representative of said stored control codes and for receiving said print signal, said printing means being actuated by said stored control codes for printing characters corresponding to the representations of said characters stored in said storage means in a particular font identifiable by said print signal.

2. A printer control system comprising, storage means for receiving and storing signals representing characters to be printed and signals representing control codes, a plurality of decoding means each connected to said storage means for receiving signals representative of a different one of said control codes for providing a corresponding print signal, each print signal indicating a different font in which characters are to be printed, at least one of said fonts being primarily humanly recognizable and another of said fonts being primarily machine recognizable, printing means connected to said storage means and said decoding means for receiving signals representative of said stored control codes and for receiving each print signal, said printing means being actuated by said stored control codes for printing characters corresponding to the representations of said characters stored in said storage means in a particular font identifiable by one of the print signals.

3. A printer control system comprising, storage means for receiving and storing signals representing characters to be printed and signals representing control codes, decoding means connected to said storage means for receiving signals representative of a selected one of said control codes for providing a first print signal indicating a machine readable font in which characters are to be printed and responsive to the absence of said selected control code for providing a second print signal indicating a human readable font in which characters are to be printed, printing means connected to said storage means and said decoding means for receiving signals representative of said stored control codes and for receiving said print signal, said printing means being actuated by said stored control codes for printing characters corresponding to the representations of said characters stored in said storage means in a particular font identifiable by one of said print signals.

4. A printer control system comprising, a first storage means connected to receive and store signals representing control codes; a second storage means connected to receive and store signals representing characters to be printed; decoding means connected to said first storage means for receiving signals representative of said stored control codes and for selecting one of said control codes for providing a print signal indicating one of a plurality of different fonts in which said characters are to be printed; at least one of said fonts being primarily humanly recognizable and another of said fonts being primarily machine recognizable, and printing means connected to said first and second storage means and said decoding means for receiving signals representative of said control codes and said characters stored in said first and second storage means and for receiving said print signal, said printing means printing characters corresponding to the representations of said characters stored in said second storage means and in a font identifiable by said print signal.

5. A printer control system comprising, a first storage means for receiving and storing signals representing characters to be printed and signals representing control codes, a second storage means for receiving and storing signals representing characters to be printed, means interconnecting said first and second storage means and actuated by signals representing selected ones of said stored control codes in said first storage means for transferring signals representative of the characters stored in said first storage means to said second storage means, decoding means connected to said first storage means for receiving signals representative of said stored control codes and for selecting one of said control codes for providing a print signal indicating one of a plurality of different fonts in which said characters are to be printed, at least one of said fonts being primarily humanly recognizable and another of said fonts being primarily machine recognizable, and printing means connected to said first and second storage means and said decoding means for receiving signals representative of said control codes stored in said first storage means and characters stored in said second storage means and for receiving said print signal, said printing means printing characters corresponding to said representations of said characters stored in said second storage means and in a font identifiable by said print signal.

6. A printer control system comprising, a first storage means for receiving and storing signals representing characters to be printed and signals representing control codes, a second storage means for receiving and storing signals representing characters to be printed, a plurality of decoding means each connected to said first storage means for receiving signals representative of a different one of said control codes and each providing a corresponding print signal, each print signal indicating a different font in which characters are to be printed, at least one of said fonts being primarily humanly recognizable and another of said fonts being primarily machine recognizable, means interconnecting said first and second storage means and actuated by signals representing selected ones of said stored control codes for transferring signals representative of the characters stored in said first storage means to said second storage means, and printing means connected to said first and second storage means and said decoding means for receiving signals representative of said control codes stored in said first storage means and characters stored in said second storage means and for receiving each print signal, said printing means printing characters corresponding to the representations of said characters stored in said second storage means and in a font identifiable by one of said print signals.

7. A printer control system comprising, a first storage means for receiving and storing signals representing control codes, a second storage means for receiving and storing signals representing the characters to be printed, decoding means connected to said first storage means for receiving signals from said first storage means representative of said stored control codes, said decoding means upon the receipt of a selected one of said control codes providing a first print signal indicating a machine readable font in which characters are to be printed, said decoding means upon the absence of said selected one of said control codes providing a second print signal indicating a human readable font in which said characters are to be printed, and printing means connected to said first and second storage means and said decoding means for receiving signals representative of said control codes stored in said first storage means and characters stored in said second storage means and for receiving each of said print signals, said printing means being actuated by said stored control code signals for printing characters corresponding to the representations of said characters stored in said second storage means and in a font identifiable by said print signals.

8. A printer control system comprising, a first storage means for receiving and storing signals representing characters to be printed and signals representing control codes, a second storage means for receiving and storing signals representing characters to be printed, means interconnecting said first and second storage means, said means being actuated by signals representing selected ones of said stored control codes in said first storage means for transferring signals representative of the characters stored in said first storage means to said second storage means, decoding means connected to said first storage means for receiving signals representative of a selected one of said control codes for providing a first print signal indicating a machine readable font in which said characters are to be printed, said decoding means upon the absence of said selected one of said control codes providing a second print signal indicating a human readable font in which said characters are to be printed, and printing means connected to said first and second storage means and said decoding means for receiving signals representative of said control codes stored in said first storage means and said characters stored in said second storage means and for receiving each print signal, said printing means being actuated by said stored control code signals for printing characters corresponding to the representations of said characters stored in said second storage means and in a font identifiable by one of said print signals.

9. A printer control system comprising, a first storage means for receiving and storing signals representing characters to be printed and signals representing control codes, decoding means connected to said first storage means for receiving signals from said first storage means representative of said stored control codes, said decoding means upon the receipt of a selected one of said control codes providing a print signal indicating a particular one of a plurality of different fonts in which characters are to be printed, at least one of said fonts being primarily humanly recognizable and another of said fonts being primarily machine recognizable, a second storage means having discrete addressable positions therein for receiving and storing signals representing the characters to be printed, each discrete addressable position corresponding to a predetermined character which may be printed in any of said plurality of fonts, transfer means connected to said first storage means for transferring said signals representative of characters to be printed from said first storage means to selected discrete addressable positions in said second storage means according to columns in which the characters are to be printed, and printing means connected to said first and second storage means and said decoding means for receiving signals representative of said control codes stored in said first storage means and characters stored in said second storage means and said print signal, said printing means printing characters corresponding to the representations of said characters stored in said second storage means and in a font identifiable by said print signal.

10. A printer control system comprising, a first storage means for receiving and storing signals representing characters to be printed and signals representing control codes, decoding means connected to said first storage means for receiving signals from said first storage means representative of said stored control codes, said decoding means upon the receipt of a selected one of said control codes providing a first print signal indicating a machine readable font in which characters are to be printed, said decoding means upon the absence of said selected one of said control codes providing a second print signal indicating a human readable font in which characters are to be printed, a second storage means having discrete addressable positions therein for receiving and storing signals representing the characters to be printed, each discrete addressable position corresponding to a predetermined character which may be printed in any of said fonts, transfer means connected to said first storage means for transferring signals representative of characters to be printed from said first storage means to selected discrete addressable positions in said second storage means according to columns in which the characters are to be printed, and printing means connected to said first and second storage means and said decoding means for receiving signals representative of said control codes stored in said first storage means and characters stored in said second storage means and said print signals, said printing means printing characters corresponding to the representations of said characters stored in said second storage means and in a font identifiable by said print signals.

11. A printer control system comprising, storage means for receiving and storing signals representing characters to be printed and signals representing control codes, said control codes including a slew code having a number N therein, slewing means connected to said storage means and actuated by signals representing said slew code for advancing the paper upon which said characters are to be printed a distance corresponding to the number N, plugboard means connected to said slewing means for generating a plugboard slew code for transmission to the slewing means, and means connected to said storage means and actuated by signals representing said slew code for determining the value of N and for generating a command signal only when N is zero, said slewing means being actuated by said command signal for disregarding said slew code and advancing paper in accordance with said plugboard slew code.

12. In a printer control system, the combination comprising, a storage means connected to receive and store signals representing characters to be printed and signals representing control codes, said control codes including a slew code having a code number N therein, decoding means connected to said storage means for receiving signals representative of said control codes and for selecting one of said control codes for providing a print signal indicating a particular one of a plurality of different fonts in which characters are to be printed, at least one of said fonts being primarily humanly recognizable and another of said fonts being primarily machine recognizable, printing means connected to said storage means and said decoding means for receiving signals representative of said control codes for printing characters corresponding to said representations of characters stored in said storage means, said printing means being actuated by said print signal for printing said characters in a particular font, slewing means connected to said storage means and actuated by signals representing said slew code for advancing paper upon which said characters are to be printed a distance corresponding to the number N, means connected to said storage means and actuated by signals representing said slew code for determining the value of N and for generating a command signal when N is zero, plugboard means for generating a plugboard slew code, said slewing means being actuated by said command signal for disregarding said slew code and advancing paper in accordance with said plugboard slew code.

13. A printer control system comprising, a first storage means for receiving and storing signals representing characters to be printed and signals representing control codes, said control codes including a slew code having a number N therein, a second storage means for receiving and storing signals representing the characters to be printed, transfer means connected to said first storage means for transferring said signals representative of the characters to be printed from said first storage means to said second storage means, printing means connected to said first and second storage means for receiving signals representative of said control codes stored in said first storage means and characters stored in said second storage means, slewing means connected to said first storage means and actuated by signals representing said slew code for advancing the paper upon which said characters are to be printed a distance corresponding to the number N, plugboard means for generating a plugboard slew code, means connected to said first storage means and actuated by signals representing said slew code for determining the value of N and for generating a command signal only when N is zero, said slewing means being connected to said plugboard and actuated by said command signal for disregarding said slew code and advancing paper in accordance with said plugboard slew code.

14. A printer control system comprising, a register for receiving character signals representing characters to be printed and for receiving control signals representing control codes, a first storage means connected to said register for receiving and storing signals representing characters to be printed and signals representing control codes, decoding means connected to said first storage means for receiving signals from said first storage means representative of said stored codes, said decoding means upon the receipt of a selected one of said control code signals providing a first print signal indicating a particular one of a plurality of different fonts in which characters are to be printed, at least one of said fonts being primarily humanly recognizable and another of said fonts being primarily machine recognizable, said control codes including a slew code having a code number N therein, a second storage means connected to said register for receiving and storing signals representing the characters to be printed, transfer means connected to said first storage means and responsive to said control signals for transferring said signals representative of the characters to be printed from said first storage means to said second storage means through said register, printing means connected to said first and second storage means for receiving signals representative of said control codes stored in said first storage means and characters stored in said second storage means, said printing means arranged to receive said print signal for printing characters in a particular font, slewing means connected to said first storage means and actuated by signals representing said slew code for advancing the paper upon which said characters are to be printed a distance corresponding to the number N, plugboard means for generating a plugboard slew code, means connected to said first storage means and actuated by signals representing said slew code for determining the value of N and for generating a command signal only when N is zero, said slewing means being connected to said plugboard and actuated by said command signal for disregarding said slew code and advancing paper in accordance with said plugboard slew code.

15. A printer control system comprising, a first storage means for receiving and storing signals representing characters to be printed and signals representing control codes, said control codes including a slew code having a number N therein, a second storage means for receiving and storing signals representing the characters to be printed, transfer means connected to said first storage means and actuated by a selected one of said stored control codes for transferring said signals representative of the characters to be printed from said first storage means to said second storage means, printing means connected to said first and second storage means for receiving signals representative of said control codes stored in said first storage means and characters stored in said second storage means, slewing means connected to said first storage means and actuated by signals representing said slew code for advancing the paper upon which said characters are to be printed a distance corresponding to the number N, plugboard means for generating a plugboard slew code, means connected to said first storage means and actuated by signals representing said slew code for determining the value of N and for generating a command signal only when N is zero, said slewing means being connected to said plugboard and actuated by said command signal for disregarding said slew code and advancing paper in accordance with said plugboard slew code.

16. A printer control system comprising, a register for receiving character signals representing characters to be printed and for receiving control signals representing control codes, a first storage means connected to said register for receiving and storing signals representing characters to be printed and signals representing control codes, decoding means connected to said first storage means for receiving signals from said first storage means representative of said stored codes, said decoding means upon the receipt of a selected one of said control code signals providing a first print signal indicating a particular one of a plurality of different fonts in which characters are to be printed, said control codes including a slew code having a code number N therein, at least one of said fonts being primarily humanly recognizable and another of said fonts being primarily machine recognizable, a second storage means connected to said register for receiving and storing signals representing the characters to be printed, said second storage means having discrete addressable positions therein for storing representations of characters to be printed, each discrete addressable position corresponding to a predetermined character which may be printed in any of said plurality of fonts, transfer means connected to said first storage means and responsive to said control signals for transferring said signals representative of the characters to be printed from said first storage means to select discrete addressable positions in said second storage means according to columns in which the characters are to be printed, printing means connected to said first and second storage means for receiving signals representative of said control codes stored in said first storage means and characters stored in said second storage means, said printing means arranged to receive said print signal for printing characters in a particular font, slewing means connected to said first storage means and actuated by signals representing said slew code for advancing the paper upon which said characters are to be printed a distance corresponding to the number N, plugboard means for generating a plugboard slew code, means connected to said first storage means and actuated by signals representing said slew code for determining the value of N and for generating a command signal only when N is zero, said slewing means being connected to said plugboard and actuated by said command signal for disregarding said slew code and advancing the paper in accordance with said plugboard slew code.

17. A printer control system comprising, storage means for receiving and storing signals representing characters to be printed and signals representing control codes, numeric word decoding means connected to said storage means for receiving signals representing characters to be printed for providing a numeric word signal when said characters are numeric, numeric sign decoding means connected to said storage means for receiving signals representative of one of said control codes for providing a numeric sign signal, and printing means connected to said storage means and actuated by signals representing said stored control codes for printing characters corresponding to signals representative of characters stored in said storage means, said printing means being connected to said numeric word decoding means and said numeric sign decoding means and actuated by the logical conjunction of said numeric word signal and said numeric sign signal for printing the numeric sign of numeric words.

18. A printer control system comprising, storage means for receiving and storing signals representing characters to be printed and signals representing control codes, numeric word decoding means connected to said storage means for receiving signals representing characters to be printed for providing a numeric word signal when said characters are numeric, numeric sign decoding means connected to said storage means for receiving signals representative of one of said control codes for providing a numeric sign signal, plugboard means connected to said storage means and actuated by signals representative of said control codes for generating column signals indicating specific print columns in which numeric signs may be printed, printing means connected to said storage means and actuated by signals representing said stored control codes for printing characters corresponding to signals representative of characters stored in said storage means, said printing means being connected to said numeric word decoding means and said numeric sign decoding means and actuated by the logical conjunction of said numeric word signal and said numeric sign signal for printing the numeric sign of numeric words.

19. In a printer control system, the combination comprising, storage means for receiving and storing signals representing characters to be printed and signals representing control codes, decoding means connected to said storage means for receiving signals representative of said stored control codes and for selecting one of said control codes for providing a print signal indicating a particular one of a plurality of different fonts in which characters are to be printed, at least one of said fonts being primarily humanly recognizable and another of said fonts being primarily machine recognizable, numeric word decoding means connected to receive signals representing characters to be printed for providing a numeric word signal when said characters are numeric, numeric sign decoding means connected to receive signals representative of one of said control codes for providing a numeric sign signal, and printing means connected to receive signals representative of said stored control codes for printing characters corresponding to said representations of characters stored in said storage means and to receive said print signal for printing said characters in said particular font, said printing means receiving said numeric word signal and said numeric sign signal and upon the logical conjunction of said numeric word signal and said numeric sign signal printing the numeric sign of numeric words.

20. A printer control system comprising, a first storage means for receiving and storing signals representing characters to be printed and signals representing control codes, decoding means connected to said first storage means for receiving signals from said first storage means representative of said stored control codes, said decoding means upon the receipt of a selected one of said control codes providing a print signal indicating a particular one of a plurality of different fonts in which characters are to be printed, at least one of said fonts being primarily humanly recognizable and another of said fonts being primarily machine recognizable, numeric word decoding means connected to said storage means for receiving signals representing said characters to be printed for providing a numeric word signal when said characters are numeric, numeric sign decoding means connected to said storage means for receiving signals representative of one of said control codes for providing a numeric sign signal, a second storage means for storing representations of characters to be printed, transfer means connected to said first storage means and actuated by selected ones of said stored control codes for transferring representations of characters to be printed from said first to said second storage means, and printing means connected to said first and second storage means and actuated by signals representative of said stored control codes for printing characters corresponding to signals representative of characters stored in said second storage means, said printing means being connected to said numeric word decoding means and said numeric sign decoding means and actuated by the logical conjunction of said numeric word signal and said numeric sign signal for printing the numeric sign of numeric words, said printing means being connected to receive said print signal for printing said characters in a particular font.

21. A printer control system comprising, a first storage means for receiving and storing signals representing characters to be printed and signals representing control codes, decoding means connected to said first storage means for receiving signals from said first storage means representative of said stored control codes, said decoding means upon the receipt of a selected one of said control codes providing a print signal indicating a particular one of a plurality of different fonts in which characters are to be printed, at least one of said fonts being primarily humanly recognizable and another of said fonts being primarily machine recognizable, numeric word decoding means connected to said storage means for receiving signals representing said characters to be printed for providing a numeric word signal when said characters are numeric, numeric sign decoding means connected to said storage means for receiving signals representative of one of said control codes for providing a numeric sign signal, a second storage means having discrete addressable positions for storing representations of characters to be printed, transfer means connected to said first storage means and actuated by selected ones of said stored control codes for transferring representations of characters to be printed from said first storage means to selected discrete addressable positions in said second storage means according to columns in which the characters are to be printed, and printing means connected to said first and second storage means and actuated by signals representative of said stored control codes for printing characters corresponding to signals representative of characters stored in said storage means, said printing means being connected to said numeric word decoding means and said numeric sign decoding means and actuated by the logical conjunction of said numeric word signal and said numeric sign signal for printing the numeric sign of numeric words, said printing means being connected to receive said print signal for printing said characters in a particular font.

22. In a printer control system, the combination comprising, a storage means for receiving and storing signals representing characters to be printed, said storage means having discrete addressable positions therein for storing representations of characters to be printed, each discrete addressable position corresponding to a predetermined character which may be printed in any of a plurality of different fonts, at least one of said fonts being primarily humanly recognizable and another of said fonts being primarily machine recognizable, signal generating means for providing a print signal indicating a particular one of a plurality of fonts in which characters are to be printed, counter means for addressing said discrete addressable positions and having a greater number of counts than said storage means has discrete addressable positions, means connected to said counter means and actuated by those counts of said counter means for which there are no corresponding discrete addressable positions for generating a skip count signal, said skip count signal being applied to said counter means for counting at an increased rate, and printing means connected to receive signals representative of said characters stored in said storage means for printing characters corresponding to said representations, said printing means also being connected to receive said print signal and actuated thereby for printing said characters in said particular font.

23. A printer control system comprising, a first storage means for receiving and storing signals representing characters to be printed and signals representing control codes, a second storage means having discrete addressable positions therein for receiving and storing signals representing the characters to be printed, each discrete addressable position corresponding to a predetermined character which may be printed in any one of a plurality of different fonts, at least one of said fonts being primarily humanly recognizable and another of said fonts being primarily machine recognizable, transfer means connected to said first storage means for transferring signals representative of characters to be printed from said first storage means to selected discrete addressable positions in said second storage means according to columns in which the characters are to be printed, counter means for addressing said discrete addressable positions and having a greater number of counts than said storage means has discrete addressable positions, means connected to said counter means and actuated by those counts of said counter means for which there are no corresponding discrete addressable positions for generating a skip count signal, said skip count signal being applied to said counter means for counting at an increased rate, and printing means connected to said first and second storage means for receiving signals representative of said control codes stored in said first storage means and characters stored in said second storage means for printing characters corresponding to the representations of said characters stored in said second storage means.

24. A printer control system comprising, a first storage means for receiving and storing signals representing characters to be printed and signals representing control codes, decoding means connected to said first storage means for receiving signals from said first storage means representative of said stored control codes, said decoding means upon the receipt of a selected one of said control codes providing a print signal indicating a particular one of a plurality of different fonts in which characters are to be printed, at least one of said fonts being primarily humanly recognizable and another of said fonts being primarily machine recognizable, a second storage means having discrete addressable positions therein for receiving and storing signals representing the characters to be printed, each discrete addressable position corresponding to a predetermined character which may be printed in any of said plurality of fonts, transfer means connected to said first storage means for transferring signals representative of characters to be printed from said first storage means to selected discrete addressable positions in said second storage means according to columns in which the characters are to be printed, counter means for addressing said discrete addressable positions and having a greater number of counts than said storage has discrete addressable positions, means connected to said counter means and actuated by those counts of said counter means for which there are no corresponding discrete addressable positions for generating a skip count signal, said skip count signal being applied to said counter means for counting at an increased rate, and printing means connected to said first and second storage means and said decoding means for receiving signals representative of said control codes stored in said first storage means and characters stored in said second storage means and said print signal, said printing means printing characters corresponding to the representations of said characters stored in said second storage means and in a font identifiable by said print signal.

25. In a printer control system, the combination comprising, a storage means having a buffer for receiving and storing signals representing characters to be printed and signals representing control codes, said control codes including an end of line code, said storage means when full generating a buffer full signal and when empty generating a buffer empty signal, means connected to said storage means and actuated by said end of line code in the absence of said buffer full signal for generating an end of data in buffer signal and for storing representations of said signal in said buffer, decoding means connected to said storage means for receiving signals representative of said stored control codes, said decoding means upon the receipt of a selected one of said control codes providing a print signal indicating a particular one of a plurality of different fonts in which characters are to be printed, at least one of said fonts being primarily humanly recognizable and another of said fonts being primarily machine recognizable, printing means connected to said storage means for receiving signals representative of said stored control codes for printing characters corresponding to said representations of characters stored in said storage means, said printing means also being actuated by said print signal for printing characters in said particular font, and means connected to receive said buffer empty signal and said end of data in buffer signal and actuated by the logical disjunctive of said buffer empty signal and said end of data in buffer signal for enabling said storage means to receive signals representing characters and control codes during said printing.

26. A printer control system comprising, a first storage means having a buffer for receiving and storing signals representing characters to be printed and signals representing control codes, said control codes including an end of line code, said first storage means when full generating a buffer full signal and when empty generating a buffer empty signal, means connected to said first storage means and actuated by said end of line code in the absence of said buffer full signal for generating an end of data in buffer signal and for storing representations of said signal in said buffer, a second storage means for storing representations of characters to be printed, transfer means connected to said first storage means and actuated by selected ones of said stored control codes for transferring representations of characters to be printed from said first to said second storage means and for inhibiting said first storage means from receiving signals representing characters and control codes during said transfer, printing means connected to said first and second storage means and actuated by signals representative of said stored control codes for printing characters corresponding to said representations of characters stored in said second storage means, and means connected to receive said buffer empty signal and said end of data in buffer signal and actuated by the logical disjunctive of said buffer empty signal and said end of data in buffer signal for enabling said first storage means to receive signals representing characters and control codes during said printing.

27. A printer control system comprising, a first storage means having a buffer for receiving and storing signals representing characters to be printed and signals representing control codes, said control codes including an end of line code, said first storage means when full generating a buffer full signal and when empty generating a buffer empty signal, means connected to said first storage means and actuated by said end of line code in the absence of said buffer full signal for generating an end of data in buffer signal and for storing representations of said signal in said buffer, decoding means connected to said first storage means for receiving signals representative of said stored control codes and for selecting one of said control codes for providing a print signal indicating one of a plurality of different fonts in which said characters are to be printed, at least one of said fonts being primarily humanly recognizable and another of said fonts being primarily machine recognizable, a second storage means for storing representations of characters to be printed, transfer means connected to said first storage means and actuated by selected ones of said stored control codes for transferring representations of characters to be printed from said first to said second storage means and for inhibiting said first storage means from receiving signals representing characters and control codes during said transfer, printing means connected to said first and second storage means and said decoding means and actuated by signals representative of said stored control codes for printing characters corresponding to said representations of characters stored in said second storage means in a font identifiable by said print signal received from said decoding means, and means connected to receive said buffer empty signal and said end of data in buffer signal and actuated by the logical disjunctive of said buffer empty signal and said end of data in buffer signal for enabling said first storage means to receive signals representing characters and control codes during said printing.

28. A printer control system comprising, a first storage means having a buffer for receiving and storing signals representing characters to be printed and signals representing control codes, said control codes including an end of line code, said first storage means when full generating a buffer full signal and when empty generating a buffer empty signal, means connected to said first storage means and actuated by said end of line code in the absence of said buffer full signal for generating an end of data in buffer signal and for storing representations of said signal in said buffer, decoding means connected to said first storage means for receiving signals representative of said stored control codes and for selecting one of said control codes for providing a print signal indicating one of a plurality of different fonts in which said characters are to be printed, at least one of said fonts being primarily humanly recognizable and another of said fonts being primarily machine recognizable, a second storage means having discrete addressable positions therein for storing representations of characters to be printed, each discrete addressable position corresponding to a predetermined character which may be printed in any one of said plurality of fonts, transfer means connected to said first storage means and actuated by selected ones of said stored control codes for transferring representations of characters to be printed from said first storage means to selected discrete addressable positions in said second storage means according to columns in which the characters are to be printed and for inhibiting said first storage means from receiving signals representing characters and control codes during said transfer, printing means connected to said first and second storage means and said decoding means and actuated by signals representative of said stored control codes for printing characters corresponding to said representations of characters stored in said second storage means in a font identifiable by said print signal received from said decoding means, and means connected to receive said buffer empty signal and said end of data in buffer signal and actuated by the logical disjunctive of said buffer empty signal and said end of data in buffer signal for enabling said first storage means to receive signals representing characters and control codes during said printing.

29. In a printer control system, the combination comprising, a source of signals representing characters to be printed and signals representing control codes, said control codes including a begin file code signal and an end of file code signal, storage means connected to receive and store said signals representing characters to be printed and control codes, means connected to said storage means and actuated by said end of file code signal for disabling said storage means and by said begin file code signal for enabling said storage means, and means connected to said storage means and actuated by said begin file code signal and by said end of file code signal for generating an error signal when the file code signals occur in other than an alternating sequence.

30. In a printer control system, the combination comprising, a source of signals representing characters to be printed and signals representing control codes, each of said signals comprising a plurality of binary digits, said control codes including a begin file code signal and an end of file code signal, a storage means connected to receive and store said signals representing characters to be printed, means connected to said storage means and actuated by said end of file code signal for disabling said storage means and by said begin file code signal for enabling said storage means, means connected to said storage means and actuated by said begin file code signal and by said end of file code signal for generating an error signal when the file code signals occur in other than an alternating sequence, a decoding means connected to said storage means for receiving signals representative of said stored control codes, said decoding means upon the receipt of a selected one of said control codes providing a print signal indicating a particular one of a plurality of different fonts in which the characters are to be printed, at least one of said fonts being primarily humanly recognizable and another of said fonts being primarily machine recognizable, and printing means connected to said storage means and actuated by signals representing said stored control codes for printing characters corresponding to signals representative of characters stored in said storage means, said printing means being actuated by said print signal for printing characters in a particular font.

31. A printer control system comprising, a source of signals representing characters to be printed and signals representing control codes, each of said signals comprising a plurality of binary digits, said control codes including a begin file code and an end of file code, a register for receiving character signals representing characters to be printed and for receiving control signals representing control codes, a first storage means connected to said register for receiving character signals and control signals from said register and for storing representations of said characters and said control codes, decoding means connected to said storage means for receiving signals from said first storage means representative of selected one of said control codes for providing a print signal indicating a particular one of a plurality of different fonts in which characters are to be printed, at least one of said fonts being primarily humanly recognizable and another of said fonts being primarily machine recognizable, means connected to said first storage means and actuated by said end of file code signal for disabling said first storage means and by said begin file code signal for enabling said first storage means, means connected to said first storage means and actuated by said begin file code signal and by said end of file code signal for generating an error signal when said file code signals occur in other than an alternating sequence, a second storage means connected to said register, transfer means connected to said first storage means and actuated by said control signals for transferring signal representations of characters to be printed from said first storage means to said second storage means through said register, and printing means connected to said first and second storage means and actuated by signals representative of said control codes stored in said first storage means for printing characters corresponding to said representations of characters stored in said second storage means, said printing means also being actuated by said print signal for printing said characters in said particular font.

32. A printer control system comprising, a source of signals representing characters to be printed and signals representing control codes, each of said signals comprising a plurality of binary digits, said control codes including a begin file code and an end of file code, a first storage means connected for receiving character and control signals and for storing representations of said characters and control codes, decoding means connected to receive signals from said first storage means representative of selected one of said control codes for providing a print signal indicating a particular one of a plurality of different fonts in which characters are to be printed, at least one of said fonts being primarily humanly recognizable and another of said fonts being primarily machine recognizable, means connected to said first storage means and actuated by said end of file code signal for disabling said first storage means and by said begin file code signal for enabling said first storage means, means connected to said first storage means and actuated by said begin file code signal and by said end of file code signal for generating an error signal when said file code signals occur in other than an alternating sequence, a second storage means having discrete addressable positions therein for storing representations of characters to be printed, each discrete addressable position corresponding to a predetermined character which may be printed in any of said plurality of fonts, transfer means connected to said first storage means and actuated by said control signals for transferring signals representative of characters to be printed from said first storage means to selected discrete addressable positions in said second storage means according to columns in which the characters are to be printed, and printing means connected to said first and second storage means and actuated by signals representative of said control codes stored in said first storage means for printing characters corresponding to said representations of characters stored in said second storage means, said printing means also being actuated by said print signal for printing said characters in said particular font.

33. In a printer control system, the combination comprising, a register for receiving signals representing characters to be printed and for receiving signals representing control codes, said signals comprising a plurality of binary digits, said register comprising a plurality of flip-flops each for receiving a binary digit and for assuming a corresponding set or reset state in accordance with the binary value of said binary digit, storage means connected to said register for receiving and storing signals representing characters to be printed and signals representing control codes, decoding means connected to said storage means and actuated by a selected one of said control codes for providing a print signal indicating a particular one of a plurality of different fonts in which characters are to be printed, at least one of said fonts being primarily humanly recognizable and another of said fonts being primarily machine recognizable, means for forcing said flip-flops into the set state after said storage means receives said signals from the register, forbidden code detection means connected to said storage means and effective while said storage means is receiving signals from said register to set the state of all of said flip-flops for generating an error signal, and printing means connected to said storage device for receiving signals representative of said stored control codes for printing characters corresponding to said representations of characters stored in said storage means, said printing means printing characters corresponding to the representations of said characters stored in said storage means and in said particular font.

34. A printer control system comprising, a register for receiving signals representing characters to be printed and for receiving signals representing control codes, said signals comprising a plurality of binary digits, said register comprising a plurality of flip-flops each for receiving a binary digit and for assuming a corresponding set or reset state in accordance with the binary value of said binary digit, a first storage means connected to said register for receiving and storing signals representing characters to be printed and signals representing control codes, means connected to said first storage means for forcing said flip-flops into the set state after said first storage means receives said character and control code signals from said register, forbidden code detection means connected to said first storage means and effective while said first storage means is receiving signals from said register to set the state of all of said flip-flops for generating an error signal, a second storage means for storing representations of characters to be printed, transfer means connected to said first storage means and actuated upon the receipt of selected ones of said stored control codes for transferring representations of characters to be printed from said first to said second storage means through said register, decoding means connected to said first storage means for receiving signals from said first storage device representative of said stored control codes, said decoding means upon the receipt of a selected one of said control codes providing a print signal indicating a particular one of a plurality of different fonts in which characters are to be printed, at least one of said fonts being primarily humanly recognizable and another of said fonts being primarily machine recoognizable, and printing means connected to said first and second storage means and said decoding means for receiving signals representative of said control codes stored in said first storage means and characters stored in said second storage means and said print signal, said printing means printing characters corresponding to the representations of said characters stored in said second storage means and in a font identifiable by said print signal.

35. A printer control system comprising, a register for receiving signals representing characters to be printed and for receiving signals representing control codes, said signals comprising a plurality of binary digits, said register comprising a plurality of flip-flops each for receiving a binary digit and for assuming a corresponding set or reset state in accordance with the binary value of said binary digit, a first storage means connected to said register for receiving and storing signals representing characters to be printed and signals representing control codes, means connected to said first storage means for forcing said flip-flops into the set state after said first storage means receives said character and control code signals from said register, forbidden code detection means connected to said first storage means and effective while said first storage means is receiving signals from said register to set the state of all of said flip-flops for generating an error signal, a second storage means having discrete addressable positions therein for storing representations of characters to be printed, each discrete addressable position corresponding to a predetermined character which may be printed in any one of a plurality of different fonts, at least one of said fonts being primarily humanly recognizable and another of said fonts being primarily machine recognizable, transfer means connected to said first storage means and actuated upon the receipt of selected ones of said stored control codes for transferring representations of characters to be printed from said first storage means to selected discrete addressable positions in said second storage means according to columns in which the characters are to be printed, decoding means connected to said first storage means for receiving signals from said first storage device representative of said stored control codes, said decoding means upon the receipt of a selected one of said control codes providing a print signal indicating a particular one of a plurality of said fonts in which characters are to be printed, and printing means connected to said first and second storage means and said decoding means for receiving signals representative of said control codes stored in said first storage means and characters stored in said second storage means and said print signal, said printing means printing characters corresponding to the representations of said characters stored in said second storage means and in a font identifiable by said print signal.

36. A printer control system comprising, a first storage means for receiving and storing signals representing characters to be printed and signals representing control codes, a second storage means for receiving and storing signals representing characters to be printed, said second storage means having discrete addressable positions therein for receiving and storing signals representing the characters to be printed, each discrete addressable position corresponding to a predetermined character which may be printed in any one of a plurality of different fonts, at least one of said fonts being primarily humanly recognizable and another of said fonts being primarily machine recognizable, means connected to said first storage means for transferring signals representative of characters to be printed from said first storage means to selected discrete addressable positions in said second storage means, decoding means connected to said first storage means and actuated by a selected one of said control codes for providing a print signal indicating a particular one of said plurality of fonts in which characters are to be printed, and printing means connected to receive signals representative of said control codes stored in said first storage means and characters stored in said second storage means and said print signal, said printing means printing characters corresponding to the representations of said characters stored in said second storage means and in a font identifiable by said print signal.

37. A printer control system comprising, a register for receiving character signals representing characters to be printed and for receiving control signals representing control codes, a first storage means connected to said register for receiving character signals and control signals from said register and for storing representations of said characters and said control codes, decoding means connected to said first storage means for receiving signals from said first storage means representative of said stored control codes, said decoding means upon the receipt of a selected one of said control codes providing a print signal indicating a particular one of a plurality of different fonts in which characters are to be printed, at least one of said fonts being primarily humanly recognizable and another of said fonts being primarily machine recognizable, a second storage means comprising a magnetic core storage device having a plurality of discrete addressable positions, addressing means actuated by signals representative of the characters stored in said first storage means for addressing selected discrete addressable positions in accordance with the characters to be printed regardless of the font in which the characters are to be printed, magnetic core saturating means for saturating cores at the selected addressable positions, each core thus saturated representing a predetermined character which may be printed in any of a plurality of fonts, means for reversing the saturation of said saturated cores, means actuated by the saturation reversal of said cores for providing signals representing characters to be printed, transfer means actuated by the control signals of said first storage means for transferring signal representations of characters to be printed from said first storage means to said second storage means through said register, printing means connected to said first and second storage means and said decoding means for receiving signals representative of said control codes stored in said first storage means for printing characters corresponding to said representations of characters stored in said second storage means, said printing means being actuated by said print signals for printing said characters in said particular font.

38. A printer control system comprising, a first storage means for receiving and storing signals representing characters to be printed and signals representing control codes, said control codes including a slew code having a number N therein, decoding means connected to said first storage means for receiving signals from said first storage means representative of said stored control codes, said decoding means upon the receipt of a selected one of said control codes providing a print signal indicating a particular one of a plurality of different fonts in which characters are to be printed at least one of said fonts being primarily humanly recognizable and another of said fonts being primarily machine recognizable, numeric word decoding means connected to said first storage means for receiving signals representing said characters to be printed for providing a numeric word signal when said characters are numeric, numeric sign decoding means connected to said first storage means for receiving signals representative of one of said control codes for providing a numeric sign signal, a second storage means having discrete addressable positions for storing representations of characters to be printed, each discrete addressable position corresponding to a predetermined character which may be printed in any of said plurality of fonts, transfer means connected to said first storage means and actuated by selected ones of said stored control codes for transferring representations of characters to be printed from said first storage means to selected discrete addressable positions in said second storage means according to columns in which the characters are to be printed, printing means connected to said first and second storage means and actuated by signals representative of said stored control codes for printing characters corresponding to signals representative of characters stored in said second storage means, slewing means connected to said first storage means and actuated by signals representing said slew code for advancing the paper upon which said characters are to be printed a distance corresponding to the number N, plugboard means for generating a plugboard slew code, and means connected to said first storage means and actuated by signals representing said slew code for determining the value of N and for generating a command signal only when N is zero, said slewing means being connected to said plugboard and actuated by said command signal for disregarding said slew code and advancing paper in accordance with said plugboard slew code, printing means being connected to said numeric word decoding means and said numeric sign decoding means and actuated by the logical conjunction of said numeric word signal and said numeric sign signal for printing the numeric sign of numeric words, said printing means being connected to receive said print signal for printing said characters in a particular font.

39. A printer control system comprising, a first storage means having a buffer for receiving and storing signals representing characters to be printed and signals representing control codes, said control codes including an end of line code and a slew code having a code number N therein, said first storage means when full generating a buffer full signal and when empty generating a buffer empty signal, means connected to said first storage means and actuated by said end of line code in the absence of said buffer full signal for generating an end of data in buffer signal and for storing representations of said signal in said buffer, decoding means connected to said first storage means for receiving signals representative of said stored control codes and for selecting one of said control codes for providing a print signal indicating one of a plurality of different fonts in which said characters are to be printed, at least one of said fonts being primarily humanly recognizable and another of said fonts being primarily machine recognizable, a second storage means having discrete addressable positions therein for storing representations of characters to be printed, each addressable position corresponding to a predetermined character which may be printed in any of said plurality of fonts, transfer means connected to said first storage means and actuated by selected ones of said stored control codes for transferring representations of characters to be printed from said first storage means to selected discrete addressable positions in said second storage means according to columns in which the characters are to be printed and for inhibiting said first storage means from receiving signals representing characters and control codes during said transfer, printing means connected to said first and second storage means and said decoding means and actuated by signals representative of said stored control codes for printing characters corresponding to said representations of characters stored in said second storage means in a font identifiable by said print signal received from said decoding means, means connected to receive said buffer empty signal and said end of data in buffer signal and actuated by the logical disjunctive of said buffer empty signal and said end of data in buffer signal for enabling said first storage means to receive signals representing characters and control codes during said printing, slewing means connected to said storage device and actuated by signals representing said slew code for advancing the paper upon which said characters are to be printed a distance corresponding to the number N, plugboard means for generating a plugboard slew code, and means connected to said storage means and actuated by signals representing said slew code for determining the value of N and for generating a command signal only when N is zero, said slewing means being connected to said plugboard and actuated by said command signal for disregarding said slew code and advancing the paper in accordance with said plugboard slew code.

40. A printer control system comprising a source of signals representing characters to be printed and signals representing control codes, each of said signals comprising a plurality of binary digits, said control codes including a begin file code, an end of file code, and a slew code having a code number N therein, a first storage means for receiving character signals and control signals and for storing representations of said characters and said control codes, decoding means connected to said storage means for receiving signals from said first storage means representative of selected one of said control codes for providing a print signal indicating a particular one of a plurality of different fonts in which characters are to be printed, at least one of said fonts being primarily humanly recognizable and another of said fonts being primarily machine recognizable, means connected to said first storage means and actuated by said end of file code signal for disabling said first storage means and by said begin file code signal for enabling said first storage means, means connected to said first storage means and actuated by said being file code signal and by said end of file code signal for generating an error signal when said file code signals occur in other than an alternating sequence, a second storage means having discrete addressable positions therein for storing representations of characters to be printed, each discrete addressable position corresponding to a predetermined character which may be printed in any of said pluralities of fonts, transfer means connected to said first storage means and actuated by said control signals for transferring signals representative of characters to be printed from said first storage means to selected discrete addressable positions in said second storage means according to columns in which the characters are to be printed, and printing means connected to said first and second storage means and actuated by signals representative of said control codes stored in said first storage means for printing characters corresponding to said representations of characters stored in said second storage means, said printing means also being actuated by said print signal for printing said characters in said particular font, slewing means connected to said storage device and actuated by signals representing said slew code for advancing the paper upon which said characters are to be printed a distance corresponding to the number N, plugboard means for generating a plugboard slew code, and means connected to said storage means and actuated by signals representing said slew code for determining the value of N and for generating a command signal only when N is zero, said slewing means being connected to said plugboard and actuated by said command signal for disregarding said slew code and advancing paper in accordance with said plugboard slew code.

41. A printer control system comprising, a first storage means having a buffer for receiving and storing signals representing characters to be printed and signals representing control codes, said control codes including an end of line code, said first storage means when full generating a buffer full signal and when empty generating a buffer empty signal, means connected to said first storage means and actuated by said end of line code in the absence of said buffer full signal for generating an end of data in buffer signal and for storing representations of said signal in said buffer, numeric word decoding means connected to said storage means for receiving signals representing said characters to be printed for providing a numeric word signal when said characters are numeric, numeric sign decoding means connected to said storage means for receiving signals representative of one of said control codes for providing a numeric sign signal, a second storage means having discrete addressable positions therein for storing representations of characters to be printed, each discrete addressable position corresponding to a predetermined character which may be printed in any of a plurality of different fonts, at least one of said fonts being primarily humanly recognizable and another of said fonts being primarily machine recognizable, transfer means connected to said first storage means and actuated by selected ones of said stored control codes for transferring representations of characters to be printed from said first storage means to selected discrete addressable positions in said second storage means according to columns in which the characters are to be printed and for inhibiting said first storage means from receiving signals representing characters and control codes during said transfer, printing means connected to said first and second storage means and actuated by signals representative of said stored control codes for printing characters corresponding to said representations of characters stored in said second storage means.

42. A printer control system comprising, storage means for receiving and storing signals representing characters to be printed and signals representing control codes, said control codes including a slew code having a number N therein, numeric word decoding means connected to said storage means for receiving signals representing characters to be printed for providing a numeric word signal when said characters are numeric, numeric sign decoding means connected to said storage means for receiving signals representative of one of said control codes for providing a numeric sign signal, printing means connected to said storage means and actuated by signals representing said stored control codes for printing characters corresponding to signals representative of characters stored in said storage means, said printing means being connected to said numeric word decoding means and said numeric sign decoding means and actuated by the logical conjunction of said numeric word signal and said numeric sign signal for printing the numeric sign of numeric words, slewing means connected to said storage means and actuated by signals representing said slew code for advancing the paper upon which said characters are to be printed a distance corresponding to the number N, plugboard means for generating a plugboard slew code, means connected to said storage means and actuated by signals representing said slew code for determining the value of N and for generating a command signal only when N is zero, said slewing means being connected to said plugboard and actuated by said command signal for disregarding said slew code and advancing paper in accordance with said plugboard slew code.

43. A printer control system comprising, a storage means having discrete addressable positions therein for storing representations of characters to be printed, each discrete addressable position corresponding to a predetermined character which may be printed in any of a plurality of fonts, decoding means connected to said storage means for receiving signals representative of selected one of said control codes for providing a print signal indicating a particular one of a plurality of different fonts in which characters are to be printed, at least one of said fonts being primarily humanly recognizable and an other of said fonts being primarily machine recognizable, counter means for addressing said discrete addressable positions and having a greater number of counts than said storage means has discrete addressable positions, means connected to said counter and actuated by those counts of said counter for which there are no corresponding discrete addressable positions for generating a skip count signal, said skip count signal being applied to said counter for counting at an increased rate, and printing means connected to said storage means for receiving signals representative of said stored control codes stored in said storage device for printing characters corresponding to said representations of said characters stored in said storage means, said printing means also being actuated by said print signal for printing said characters in said particular font.

44. A printer control system comprising, a storage means having discrete addressable positions therein for storing representations of characters to be printed, each discrete addressable position corresponding to a predetermined character which may be printed in any of a plurality of different fonts, at least one of said fonts being primarily humanly recognizable and another of said fonts being primarily machine recognizable, said control codes including a slew code having a code number N therein, counter means for addressing said discrete addressable positions and having a greater number of counts than said storage means has discrete addressable positions, means connected to said counter and actuated by those counts of said counter for which there are no corresponding discrete addressable positions for generating a skip count signal, said skip count signal being applied to said counter for counting at an increased rate, printing means connected to said storage means for receiving signals representative of said stored control codes for printing characters corresponding to said representations of characters stored in said storage means, slewing means connected to said storage means and actuated by signals representing said slew code for advancing the paper upon which said characters are to be printed a distance corresponding to the number N, means connected to said storage device and actuated by signals representing said slew code for determining the value of N and for generating a command signal only when N is zero, plugboard means for generating a plugboard slew code, said slewing means being connected to said plugboard and actuated by said command signal for disregarding said slew code and advancing the paper in accordance with said plugboard slew code.

45. A printer control system comprising, a source of signals representing characters to be printed and signals representing control codes, each of said signals comprising a plurality of binary digits, said control codes including a begin file code, an end of file code, and a slew code having a code number N therein, a storage means connected to receive and store said signals representing characters to be printed and control codes, means connected to said storage means and actuated by said end of file code signal for disabling said storage means and by said begin file code signal for enabling said storage means, means connected to said first storage means and actuated by said begin file code signal and said end of file code signal for generating an error signal when the file codes occur in other than an alternating sequence, slewing means connected to said storage means and actuated by signals representing said slew code for advancing the paper upon which said characters are to be printed a distance corresponding to the number N, means connected to said storage means and actuated by signals representing said slew code for determining the value of N and for generating a command signal only when N is zero, and plugboard means for generating a plugboard slew code, said slewing means being connected to said plugboard and actuated by said command signal for disregarding said slew code and advancing paper in accordance with said plugboard slew code.

46. A printer control system comprising, a register for receiving character signals representing characters to be printed and control signals representing control codes, said control codes including a slew code having a code number N therein, said signals comprising a plurality of binary digits, said register comprising a plurality of flip-flops each for receiving a binary digit and for assuming a corresponding set or reset state in accordance with the binary value of said binary digit, first storage means connected to said register for receiving character signals and control signals from said register and for storing representations of said characters and said control codes, means for forcing said flip-flops into the set state after said first storage means receives said signals from the register, forbidden code detection means connected to said storage means and effective while said storage means is receiving signals from said register to set the state of all of said flip-flops for generating an error signal, slewing means connected to said storage means and actuated by signals representing said slew code for advancing the paper upon which said characters are to be printed a distance corresponding to the number N, means connected to said storage means and actuated by signals representing said slew code for determining the value of N and for generating a command signal only when N is zero, plugboard means for generating a plugboard slew code, said slewing means being connected to said plugboard and actuated by said command signal for disregarding said slew code and advancing paper in accordance with said plugboard slew code.

47. A printer control system comprising, a source of signals representing characters to be printed and signals representing control codes, each of said signals comprising a plurality of binary digits, said control codes including a begin file code and an end of file code, storage means connected to receive and store said signals representing characters to be printed and control codes, means connected to said storage means and actuated by said end of file code for disabling said storage means and by said begin file code for enabling said storage means, means connected to said storage means and actuated by said begin file code signal and by said end of file code signal for generating an error signal when said file code signals occur in other than an alternating sequence, numeric word decoding means connected to said storage means for receiving signals representing characters to be printed for providing a numeric word signal when said characters are numeric, numeric sign decoding means connected to said storage means for receiving signals representing one of said control codes for providing a numeric sign signal, printing means connected to said storage means and actuated by signals representing said stored control codes for printing characters corresponding to said representations of characters stored in said storage means, said printing means being connected to said numeric word decoding means and said numeric sign decoding means and actuated by the logical conjunction of said numeric word signal and said numeric sign signal for printing the numeric sign of numeric words.

48. In a printer control system, the combination comprising, a source of signals representing characters to be printed and signals representing control codes, each of said signals comprising a plurality of binary digits, said control codes including a begin file code and an end of file code, a register for receiving character signals representing characters to be printed and for receiving control signals representing control codes, said register comprising a plurality of flip-flops each for receiving a binary digit and for assuming a corresponding set or reset state in accordance with the binary value of said binary digit, storage means connected to said register for receiving character signals and control signals from said register and for storing representations of said characters and said control codes, means for forcing said flip-flops into the set state after said storage means receives said signals from said register, forbidden code detection means connected to said storage means and effective while said storage means is receiving signals from said register to set the state of all of said flip-flops for generating an error signal, means actuated by said end of file code signal for disabling said storage means and actuated by said begin file code signal for enabling said storage means, and means actuated by said begin file code signal and end of file code signal for generating an error signal when said file codes occur in other than an alternating sequence.

49. In a printer control system, the combination comprising, a storage means responsive to signals representing characters to be printed, said storage means having discrete addressable positions therein for storing representations of characters to be printed, each discrete addressable position corresponding to a predetermined character which may be printed in any of a plurality of different fonts, at least one of said fonts being primarily humanly recognizable and another of said fonts being primarily machine recognizable, signal generating means for providing a print signal indicating a particular one of said plurality of fonts in which characters are to be printed, and printing means connected to said storage means and said signal generating means for receiving signals representative of characters to be printed for printing characters corresponding to the representations, said printing means printing said characters in a particular font identifiable by said print signal.

50. In a printer control system, the combination comprising, signal generating means for providing a print signal indicating a particular one of a plurality of different fonts in which characters are to be printed, at least one of said fonts being primarily humanly recognizable and another of said fonts being primarily machine recognizable, a magnetic core storage device having a plurality of discrete addressable positions, addressing means actuated by signals representing characters to be printed for addressing selected discrete addressable positions in accordance with the characters to be printed regardless of the font in which said characters are to be printed, magnetic core saturating means for saturating cores of said storage device at the selected addressable positions, each core thus saturated representing a predetermined character which may be printed in any of said plurality of fonts, means for reversing the saturation of said saturated cores, and printing means actuated by the saturation reversal for printing characters corresponding to said discrete addressable positions, said printing means connected to said generating means and actuated by said print signal for printing said characters in said particular font.

51. In a printer control system, the combination comprising, a source of signals representing characters to be printed and signals representing control codes, each of said signals comprising a plurality of binary digits, said control codes including a begin file code and an end of file code, storage means connected to receive and store said signals representing characters to be printed and control codes, decoding means connected to said storage means for receiving signals from said storage means representative of said stored control codes, said decoding means upon the receipt of a selected one of said control codes providing a print signal indicating a particular one of a plurality of different fonts in which characters are to be printed, at least one of said fonts being primarily humanly recognizable and another of said fonts being primarily machine recognizable, means connected to said storage means and actuated by said end of file code signal for disabling said storage means and by said being file code signal for enabling said storage means, means connected to said storage means and actuated by said begin file code signal and by said end of file code signal for generating an error signal when said file code signals occur in other than an alternating sequence, and printing means connected to said storage means and actuated by signals representing said stored control codes for printing characters corresponding to said representations of characters stored in said storage means, said printing means also being actuated by said print signal for printing said characters in said particular font.

References Cited by the Examiner

UNITED STATES PATENTS

| | | | |
|---|---|---|---|
| 2,923,921 | 2/1960 | Shapin | 340—174 |
| 2,954,731 | 10/1960 | Durand et al. | 340—172.5 |
| 2,981,937 | 4/1961 | Hoberg | 240—146.1 |
| 3,056,110 | 9/1962 | Cypser | 340—172.5 |

ROBERT C. BAILEY, *Primary Examiner.*

MALCOLM A. MORRISON, *Examiner.*

P. L. BERGER, *Assistant Examiner.*